(12) United States Patent
Hyman

(10) Patent No.: US 7,629,400 B2
(45) Date of Patent: Dec. 8, 2009

(54) IMAGE MAKING MEDIUM

(76) Inventor: Sydney Hyman, 51 Greene St., #3, New York, NY (US) 10013

( * ) Notice: Subject to any disclaimer, the term of this patent is extended or adjusted under 35 U.S.C. 154(b) by 693 days.

(21) Appl. No.: 10/170,503

(22) Filed: Jun. 14, 2002

(65) Prior Publication Data

US 2003/0035917 A1    Feb. 20, 2003

Related U.S. Application Data

(63) Continuation of application No. 10/012,259, filed on Dec. 11, 2001, now abandoned, which is a continuation-in-part of application No. PCT/US00/16111, filed on Jun. 12, 2000.

(60) Provisional application No. 60/138,694, filed on Jun. 11, 1999.

(51) Int. Cl.
    *C08K 5/3445*    (2006.01)
(52) U.S. Cl. .................................. 524/106; 528/502 R
(58) Field of Classification Search ................. 524/106; 528/502 R
See application file for complete search history.

(56) References Cited

U.S. PATENT DOCUMENTS

| | | | | |
|---|---|---|---|---|
| 3,424,714 | A | 1/1969 | Anspon et al. | 260/45.95 |
| 3,700,754 | A | 10/1972 | Schmitt et al. | 260/878 R |
| 4,320,174 | A | 3/1982 | Rabinovitch et al. | 428/518 |
| 4,551,493 | A | 11/1985 | Blinne et al. | 524/89 |
| 4,578,294 | A | 3/1986 | Ouchi et al. | 428/35 |
| 4,935,275 | A | 6/1990 | Ushida et al. | 428/31 |
| 5,102,597 | A | 4/1992 | Roe et al. | 264/126 |
| 5,241,006 | A * | 8/1993 | Iqbal et al. | 525/196 |
| 5,461,114 | A * | 10/1995 | Kita | 525/216 |
| 5,512,620 | A | 4/1996 | van Hout et al. | 524/84 |
| 5,523,167 | A | 6/1996 | Hunt et al. | 428/484 |
| 5,532,053 | A | 7/1996 | Mueller | 428/287 |
| 5,674,579 | A | 10/1997 | Ladouce et al. | 428/35.7 |
| 5,700,894 | A | 12/1997 | Krieg et al. | 526/323.2 |
| 5,725,990 | A | 3/1998 | Hirai et al. | 430/203 |
| 5,859,141 | A * | 1/1999 | Tsubaki et al. | 525/218 |
| 6,214,422 | B1 * | 4/2001 | Yializis | 427/488 |
| 6,248,457 | B1 * | 6/2001 | Chen et al. | 428/690 |

FOREIGN PATENT DOCUMENTS

| | | |
|---|---|---|
| DE | 195 22 118 C1 | 3/1997 |
| EP | 0 120 296 B1 | 6/1986 |
| EP | 0 827 981 A2 | 3/1998 |
| EP | 0 921 160 A1 | 6/1999 |
| GB | 974 111 | 11/1964 |
| WO | WO 91/16143 | 10/1991 |

\* cited by examiner

*Primary Examiner*—Edward J Cain

(57) ABSTRACT

The invention relates to an image support medium for creation of an aesthetic image that is an work or object for display. This support medium includes a polymer in an amount sufficient to enable the image to have at least one aesthetic element. In different embodiments, the image support medium is an image support stabilizer, the polymer is a synthetic absorbent or conductive polymer, or the polymer is a transparent or synthetic translucent polymer and a property of this transparent or translucent polymer is enhanced to facilitate the creation or preservation of the image by at least one stabilizer. The invention also relates to a method for preparing this image support medium. The method includes forming a reaction mixture comprising a monomer in an amount sufficient to provide or enable the image to have an aesthetic element, and processing the reaction mixture into a 2- or 3-dimensional shape.

19 Claims, 90 Drawing Sheets

Fig. 1.
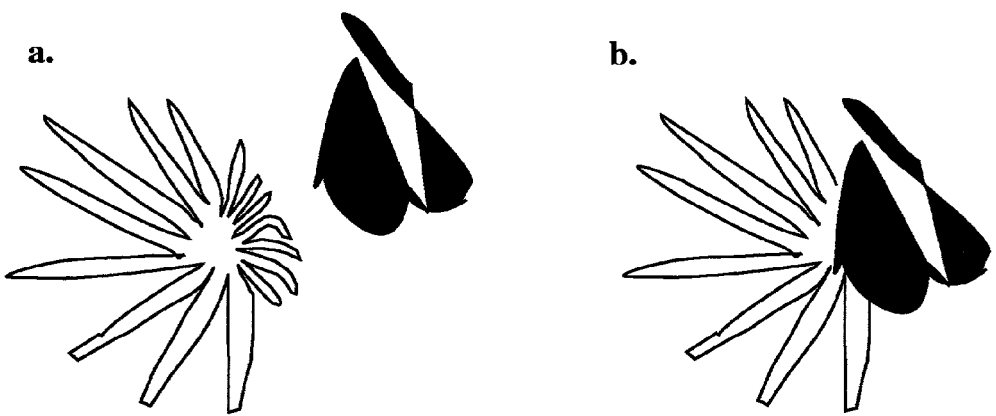
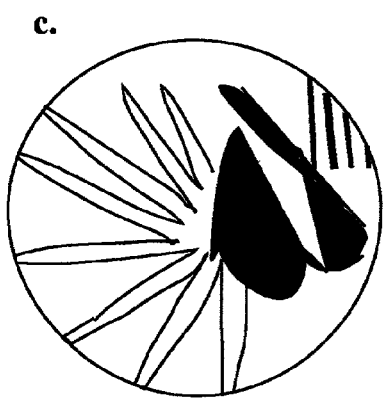
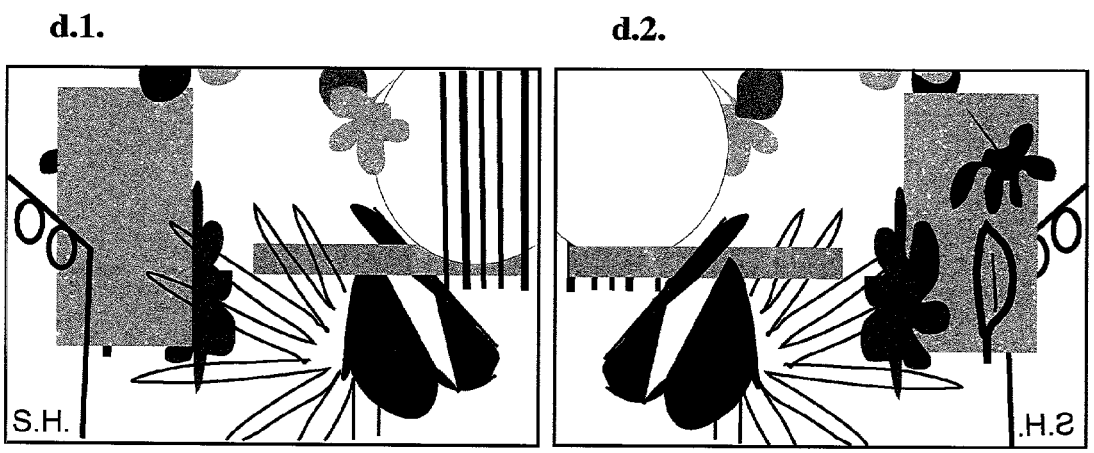

Fig. 2.I.
a.1.
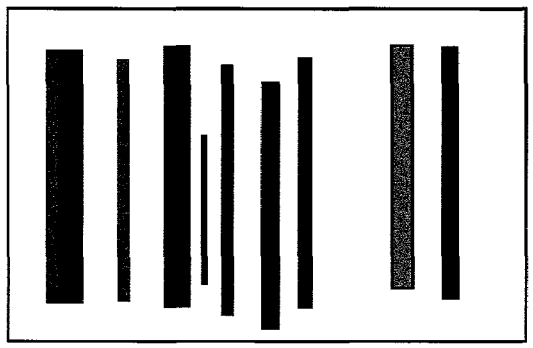
a.2.
b.1.
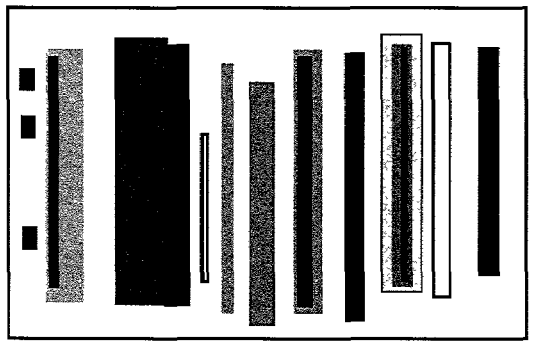
b.2.
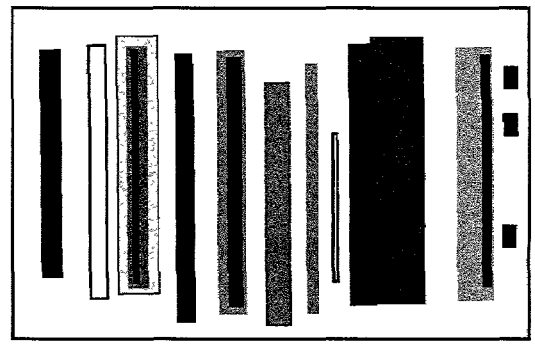
c.1.
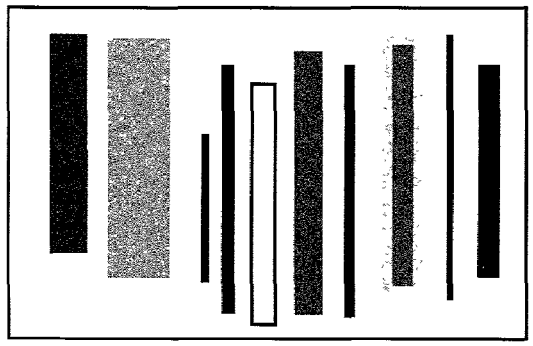
c.2.
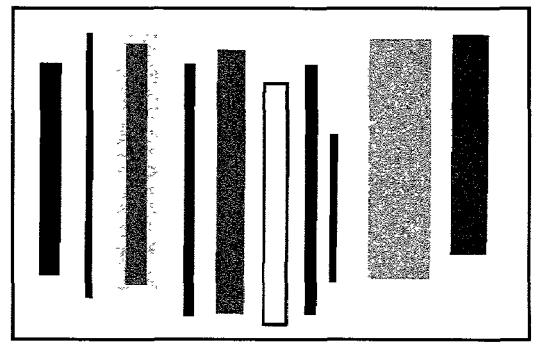

Fig. 2.II.
a.1.
a.2.
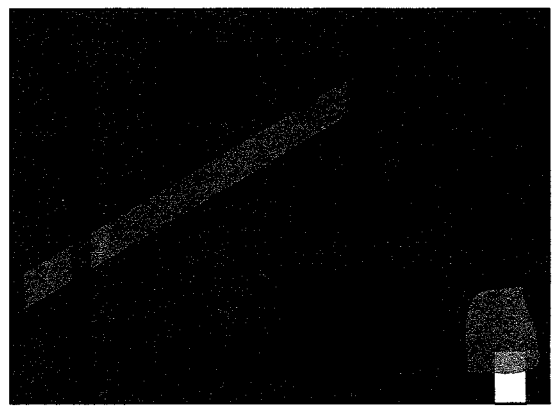
b.1.
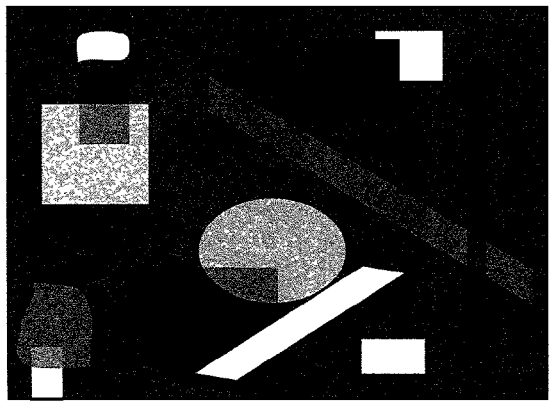
b.2.
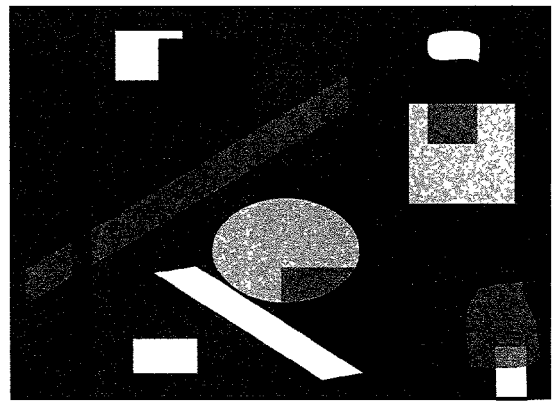
c.1.
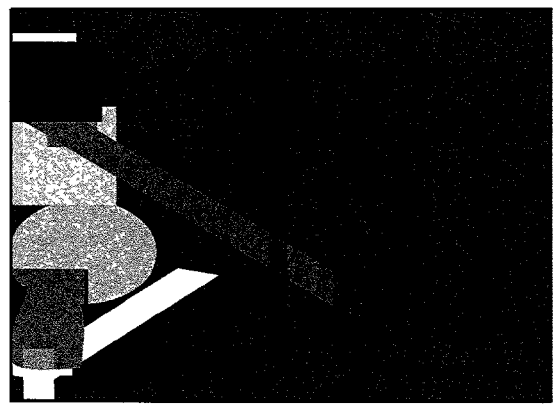
c.2.
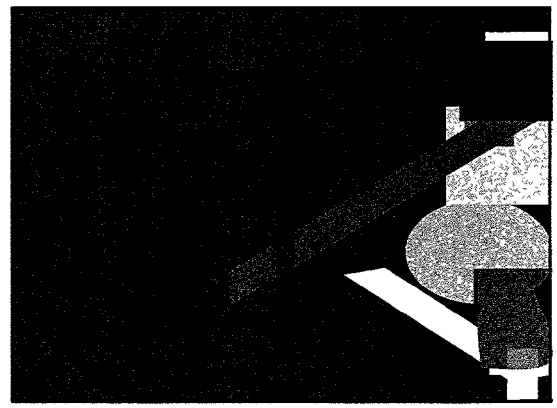

Fig. 3.
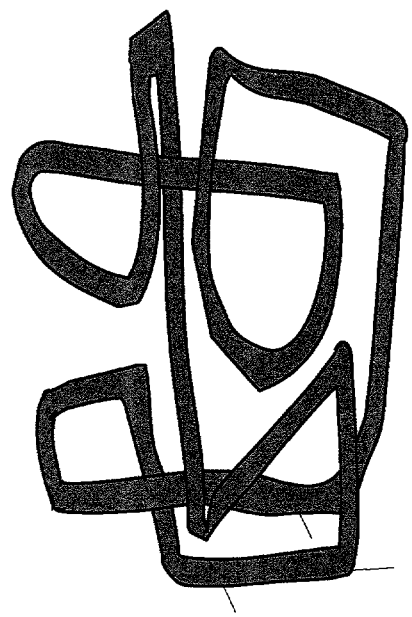
Fig. 4.
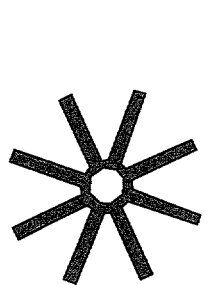 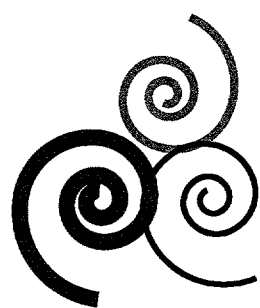 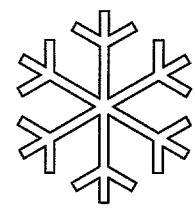
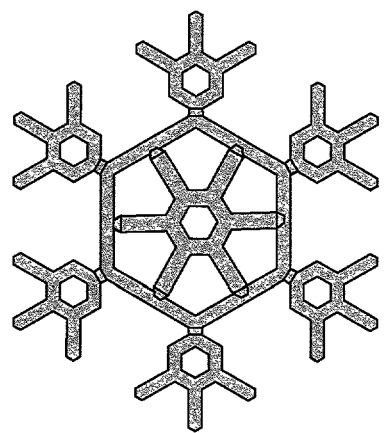 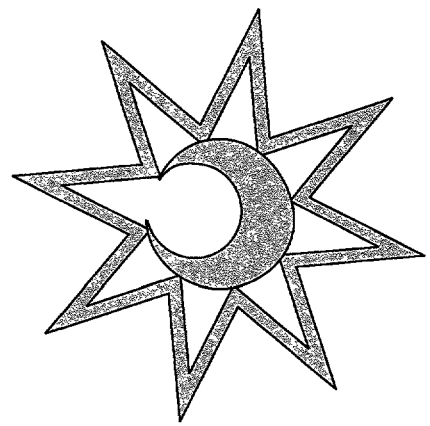

Fig. 5.
I.
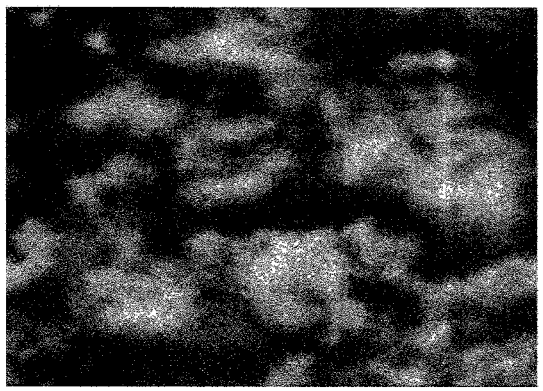
II.
III.
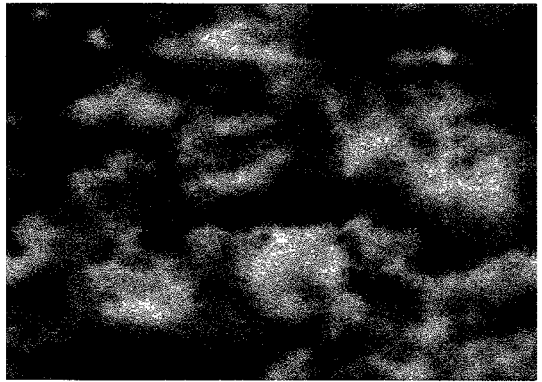
IV.
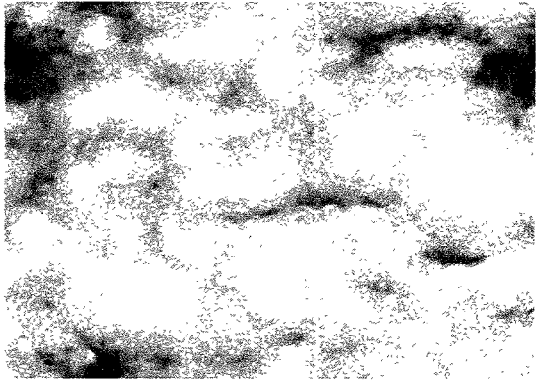

Fig. 5.
VI.
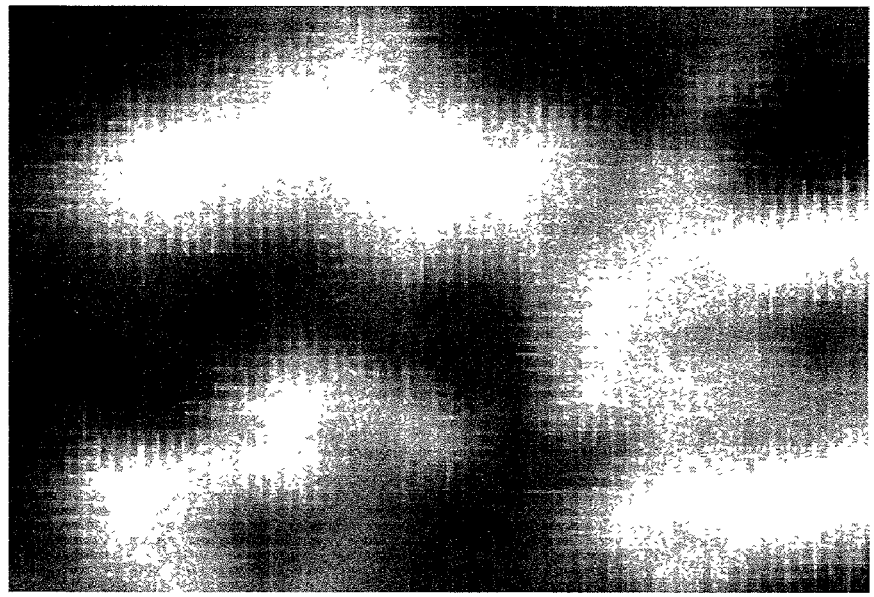
IX.

Fig. 5.
VII.
VIII.
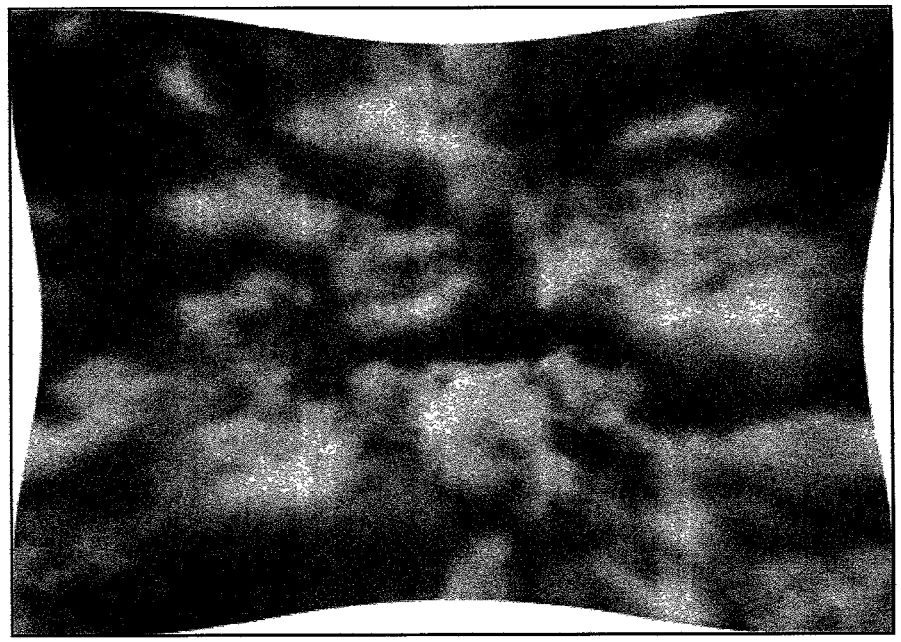
V.
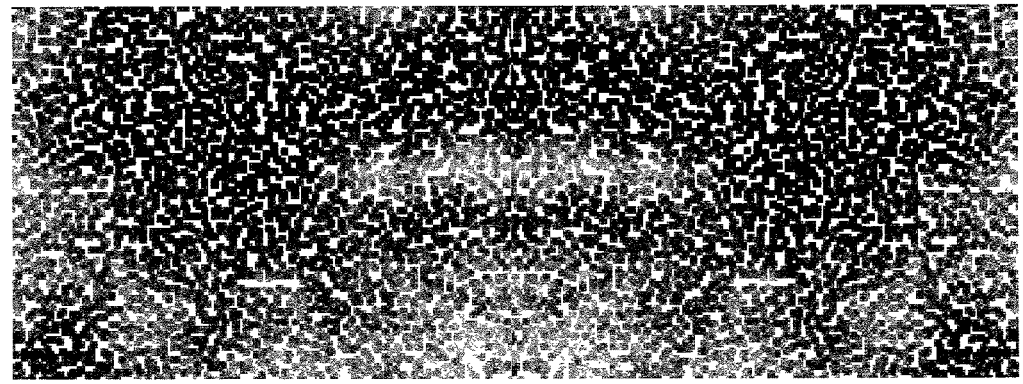
X.

Fig. 8.I. 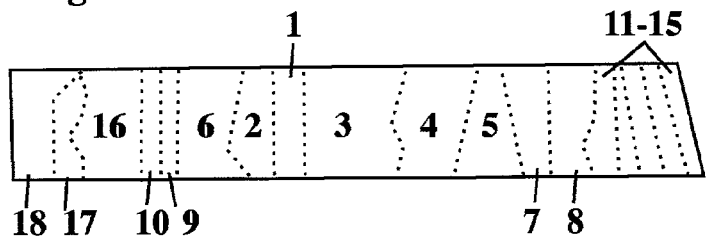
Fig. 8.II. 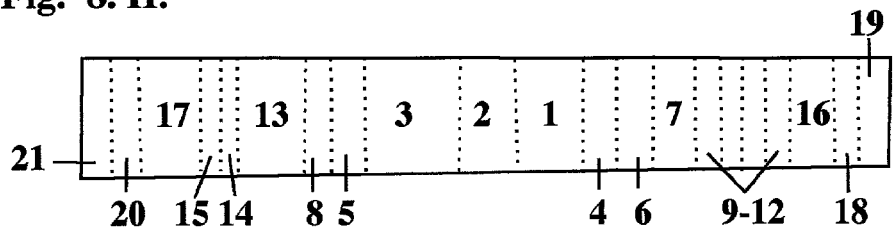
Fig. 9.I. 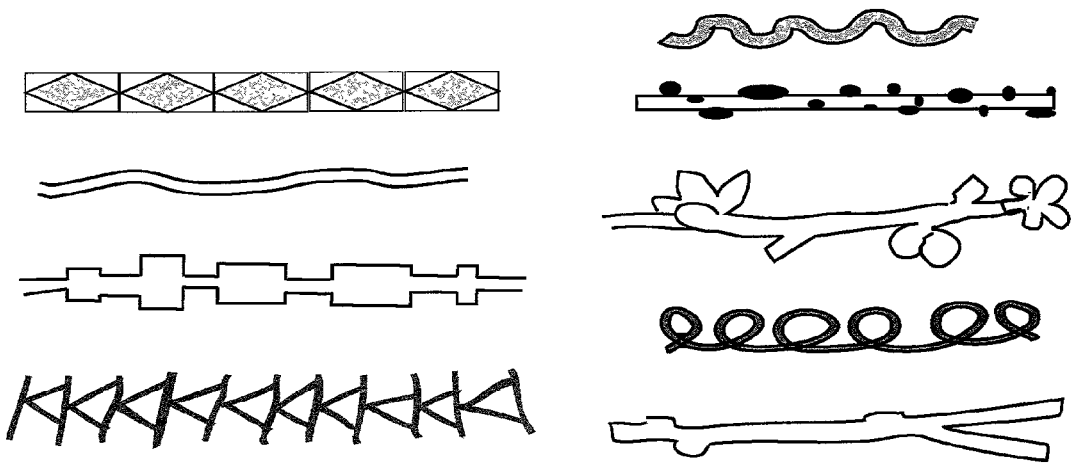
Fig. 9.II. 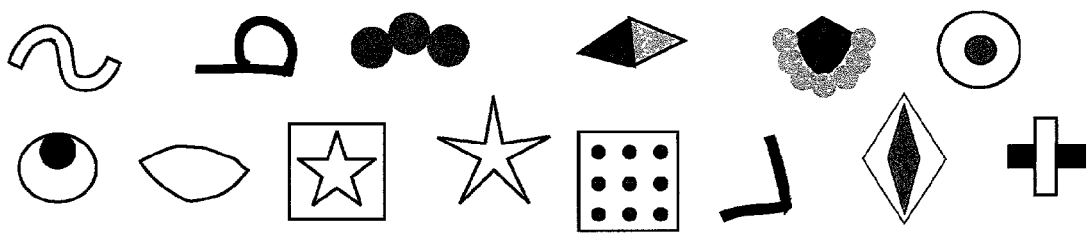

Fig. 7.
I.
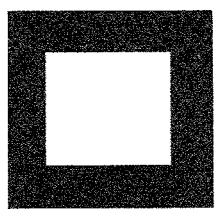
II.
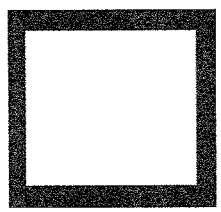
IV.
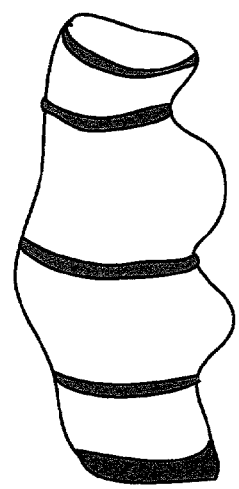
III.
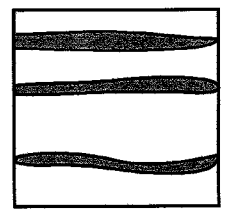
V.
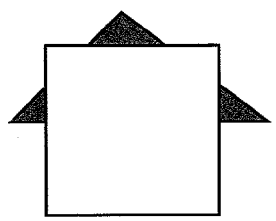
VII.
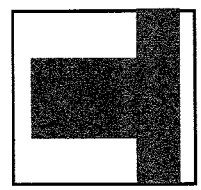
VIII
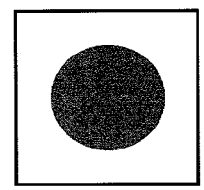
IX.
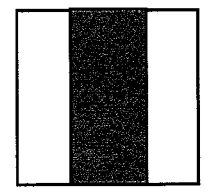
X.
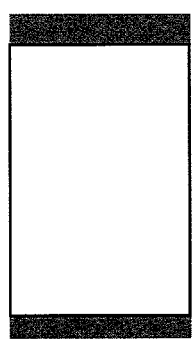
XI.
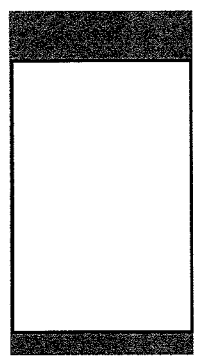
XII.
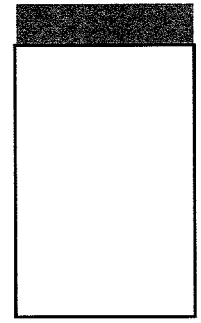
XIII.
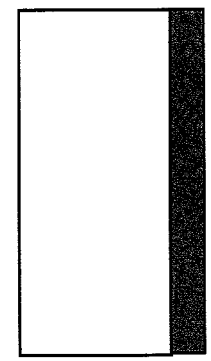

Fig. 10.
Fig. 11.
Fig. 12.
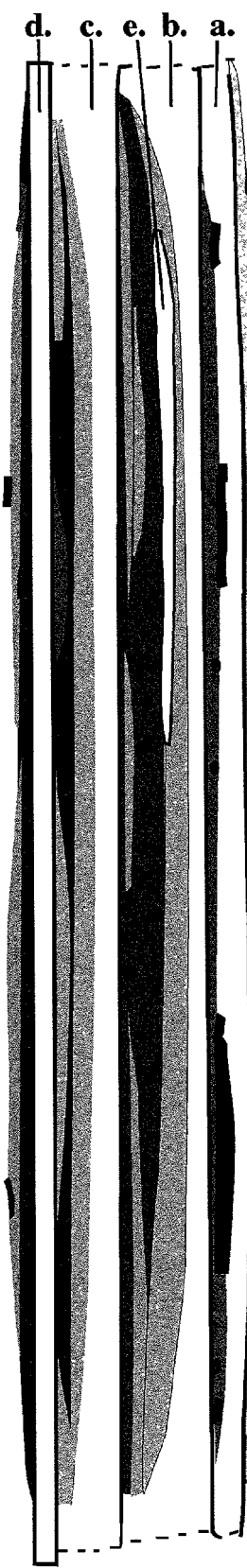
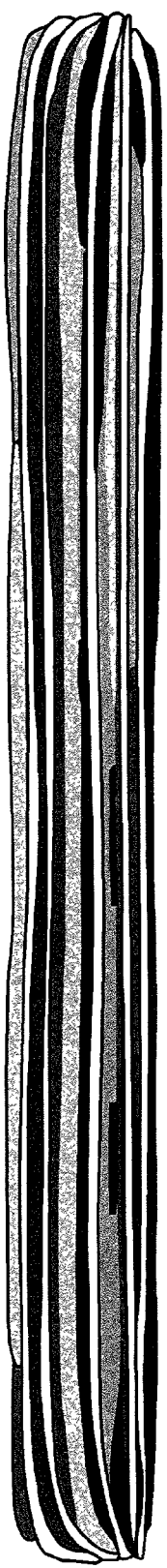

Fig. 14.
I.
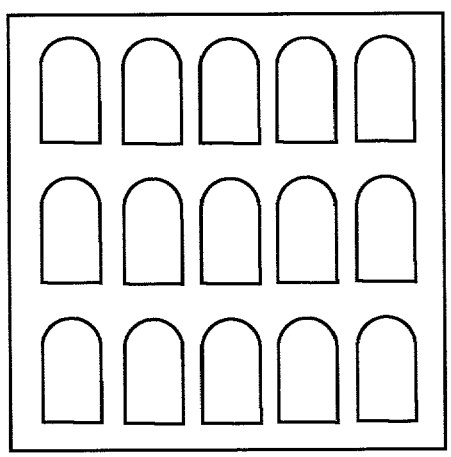
II.
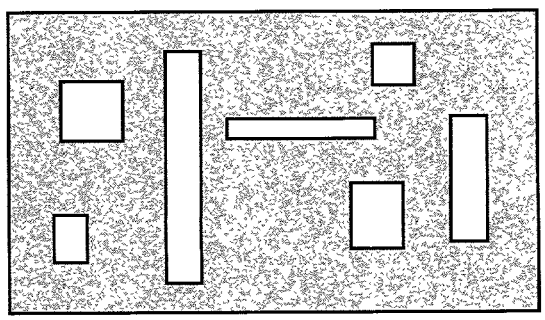
III.
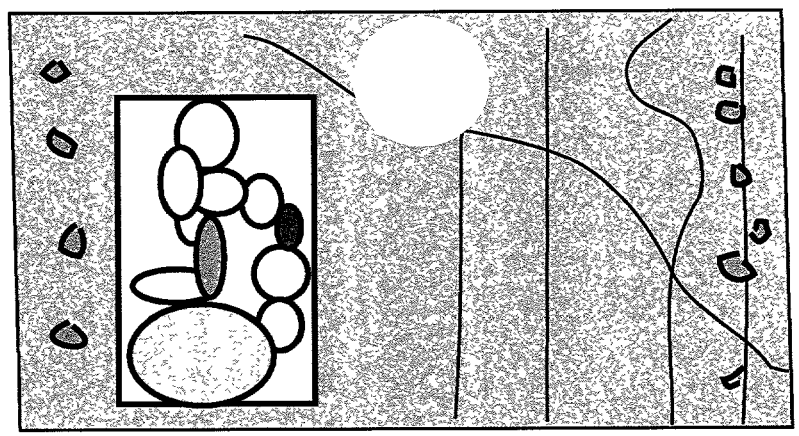

Fig. 14.
IV.
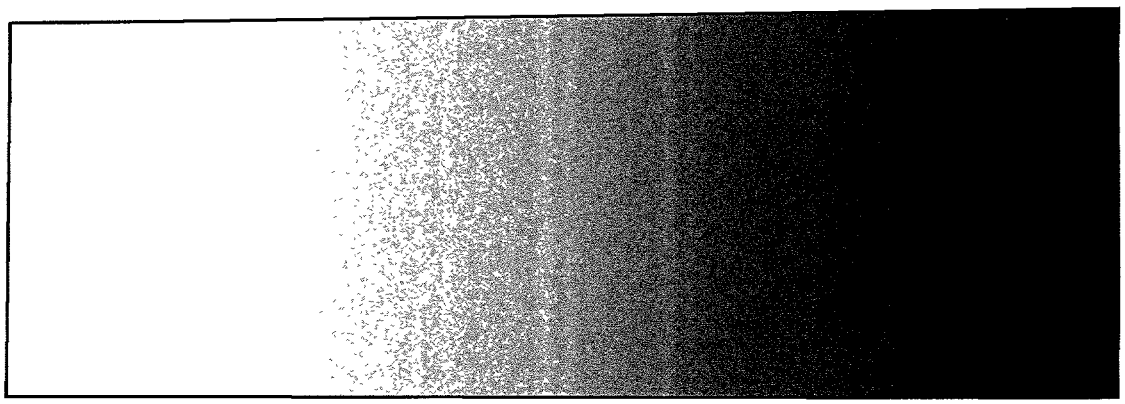
V.
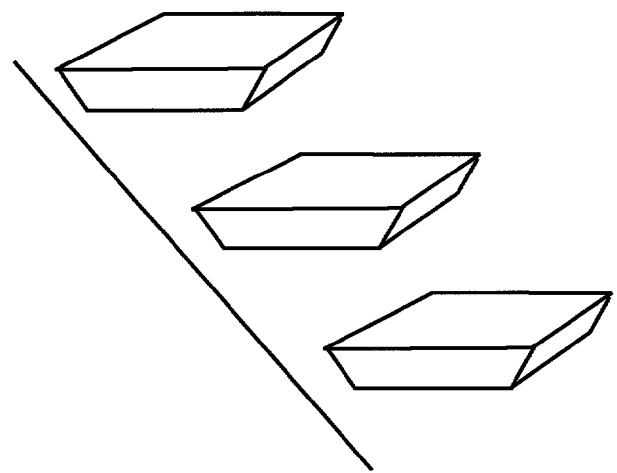

Fig. 15.
Fig. 17.
a. b. c.
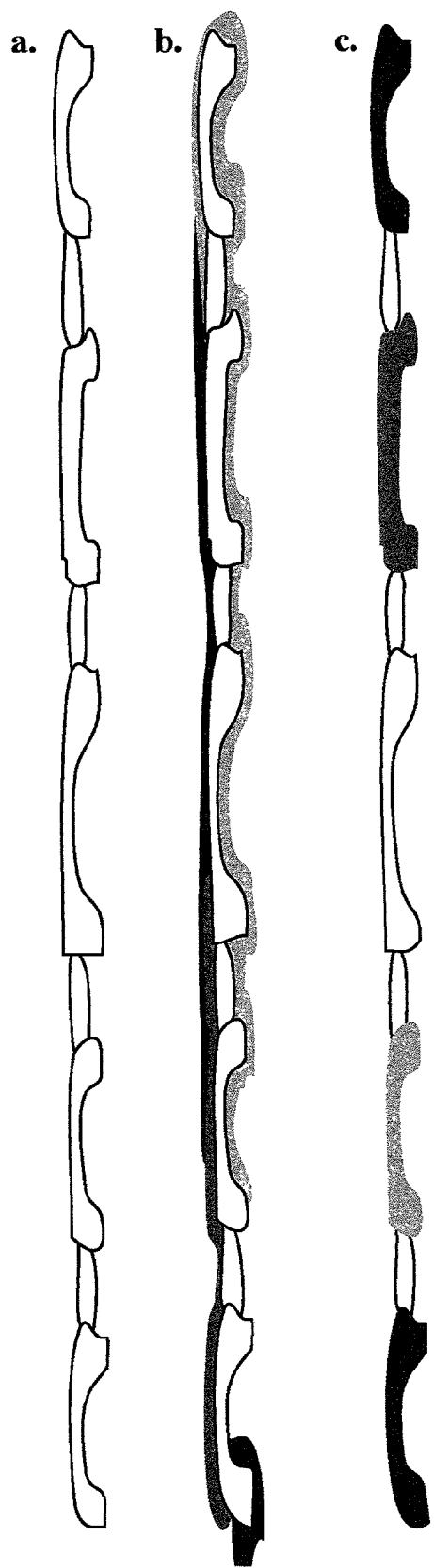

Fig. 18.a.
Fig. 19.
Fig. 20.
Fig. 18.b.
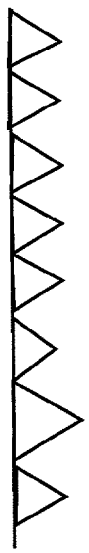

Fig. 21.
Fig. 22.a.
Fig. 22.b.
Fig. 23.
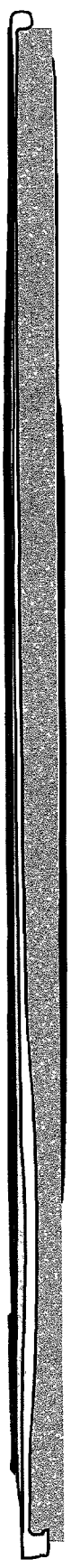

Fig. 33.
Fig. 34.
Fig. 35.
Fig. 36.I.
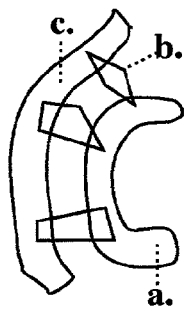
Fig. 36.II.

Fig. 37.
Fig. 39.
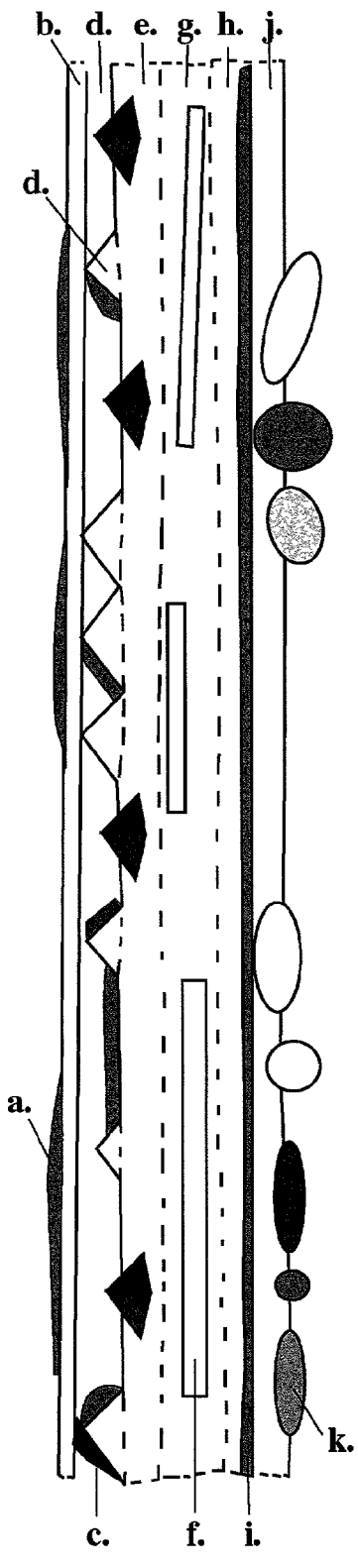
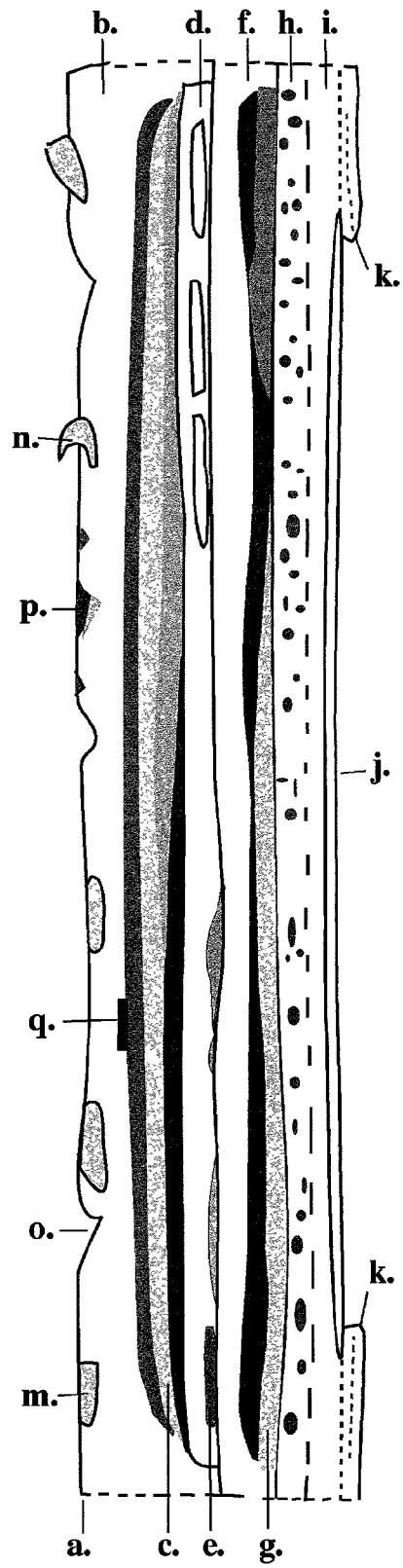

Fig. 41.I.
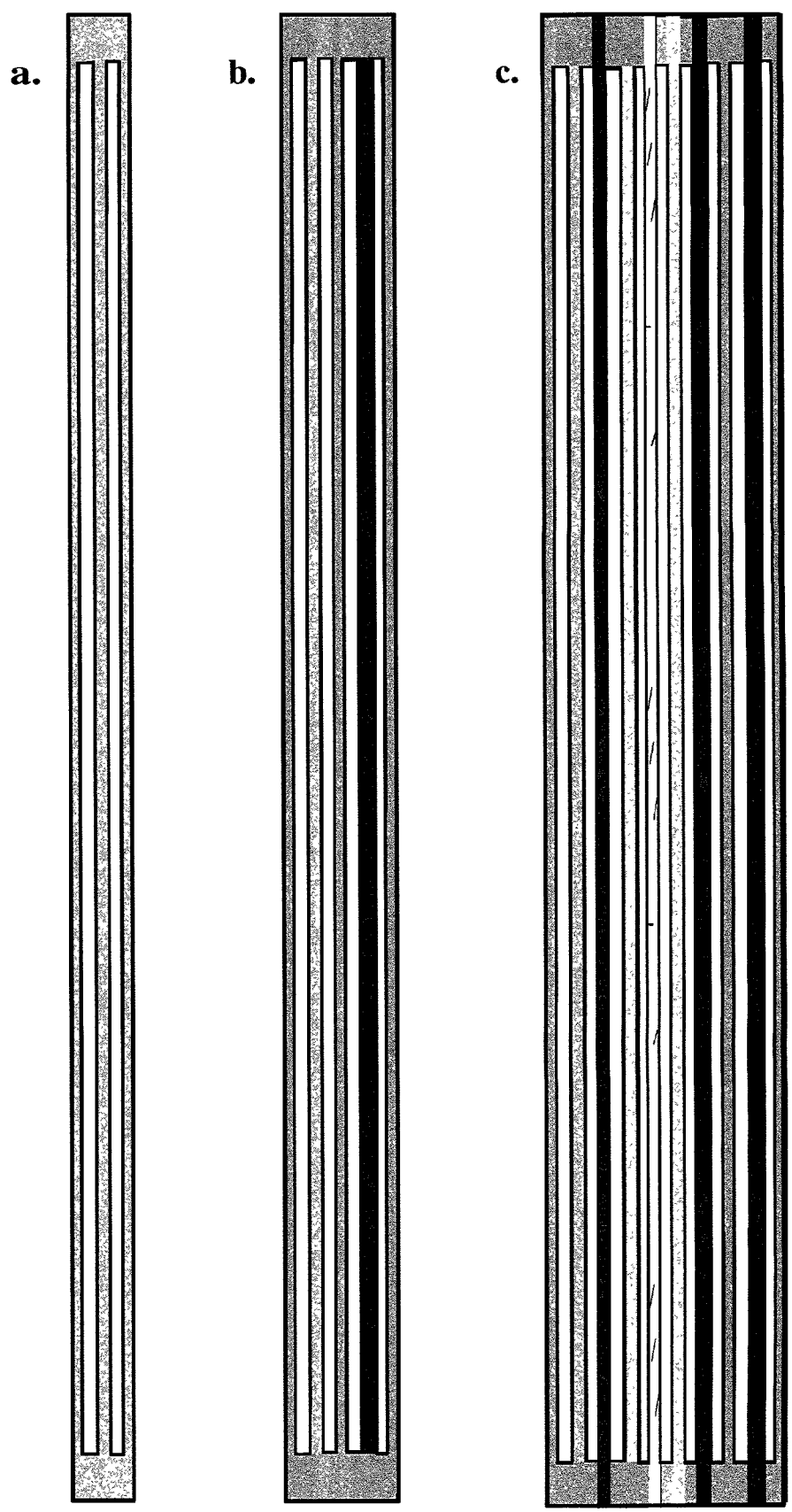

Fig. 41. II.
Fig. 41. III.
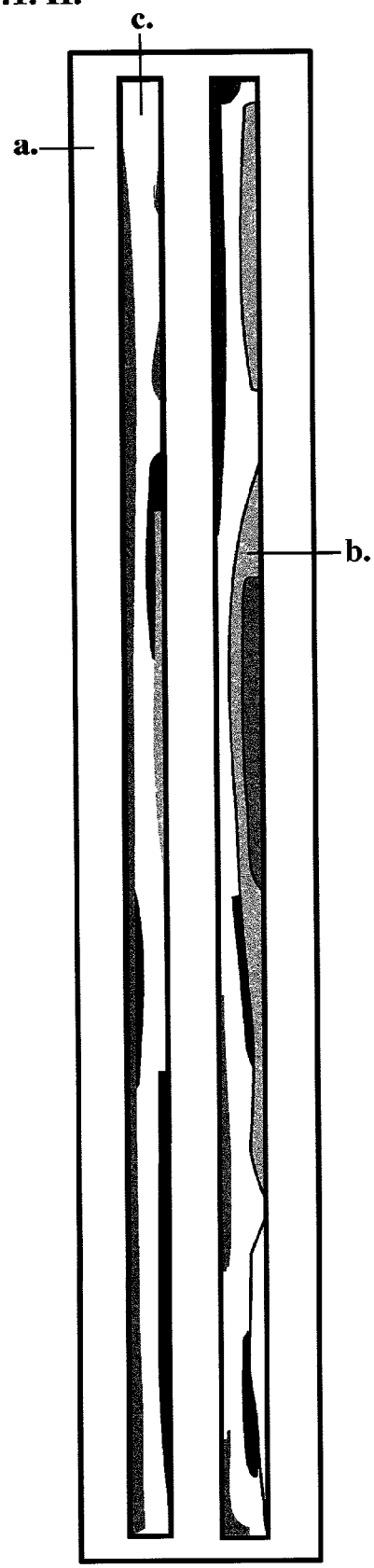

Fig. 42.
a. 
b. 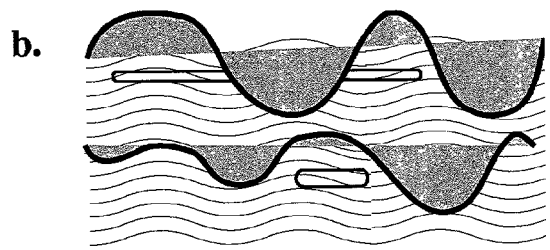
c. 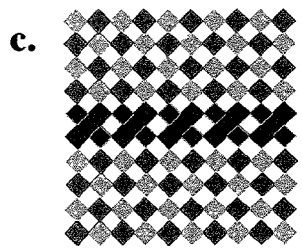
d. 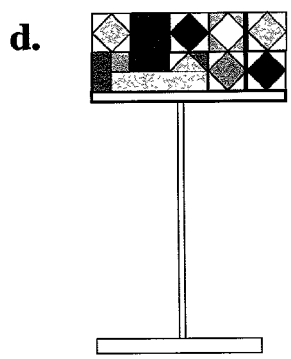
e. 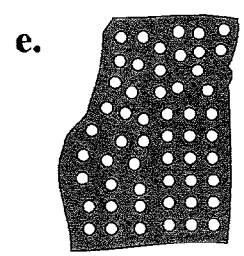
f. 
g. 
h. 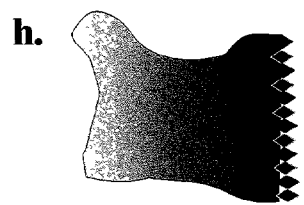
i. 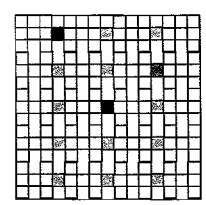
j. 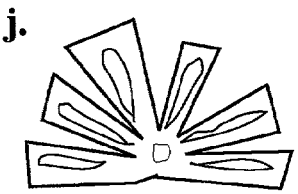

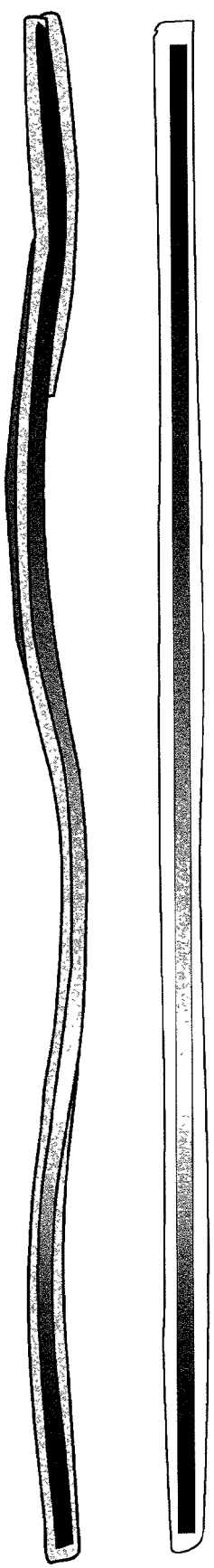
Fig. 43.
Fig. 47.
Fig. 46.
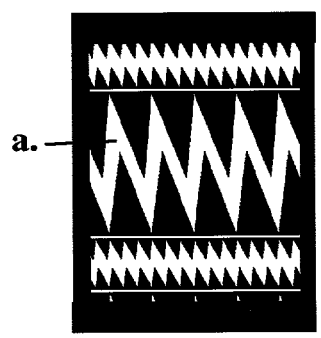

i.
ii.

i.
ii.

I.     II.     III.     IV.

Fig. 51.
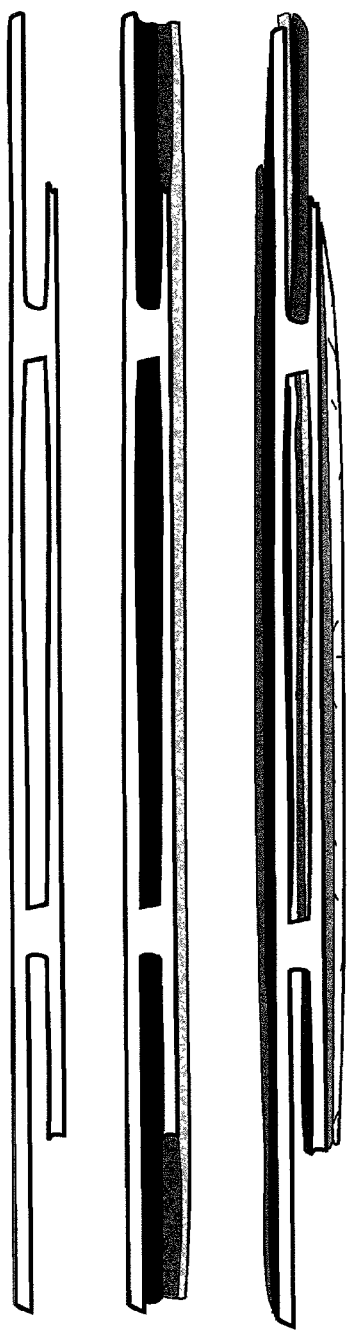
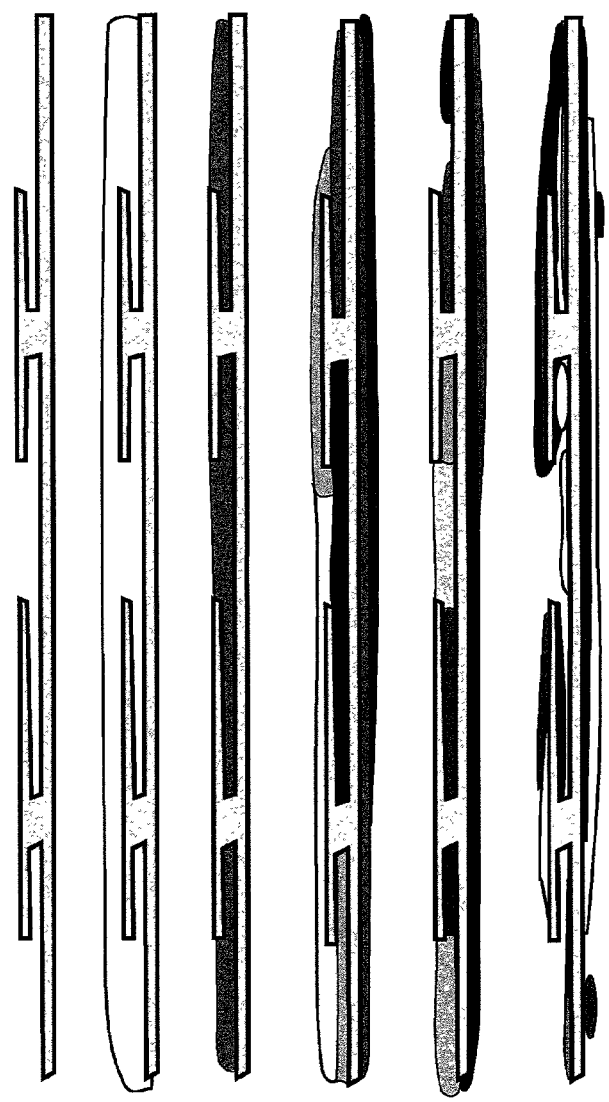

Fig. 51.
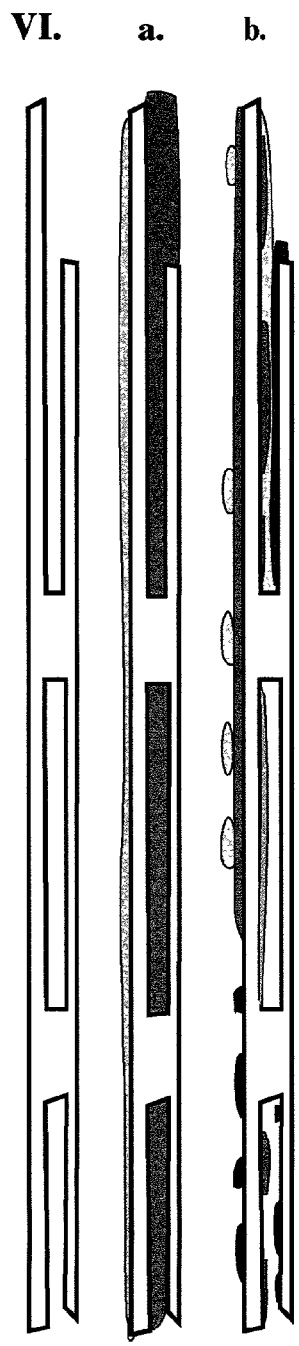
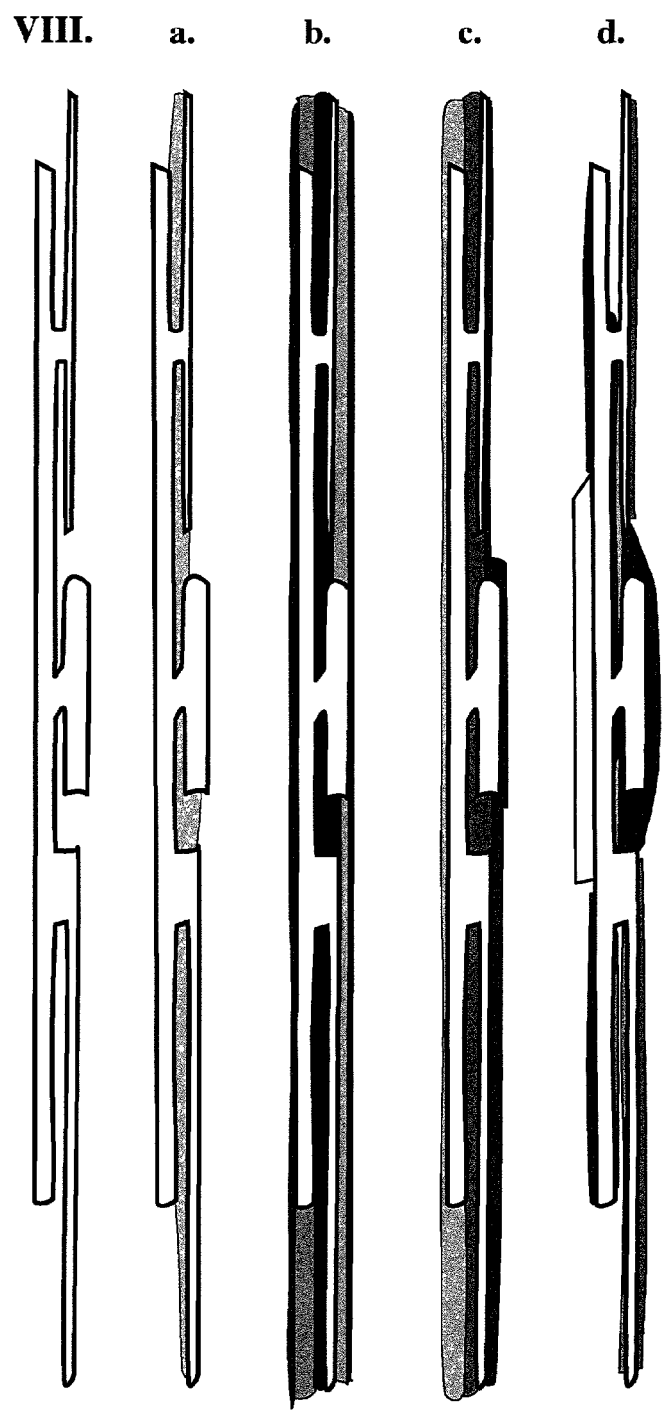

Fig. 51.
VII. e. f. g. h.
    

Fig. 53.
I.
II.
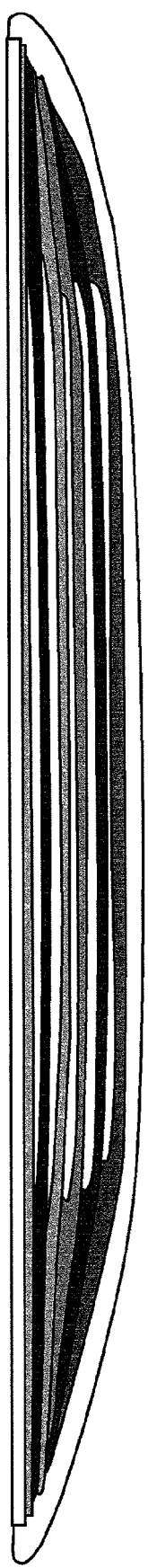
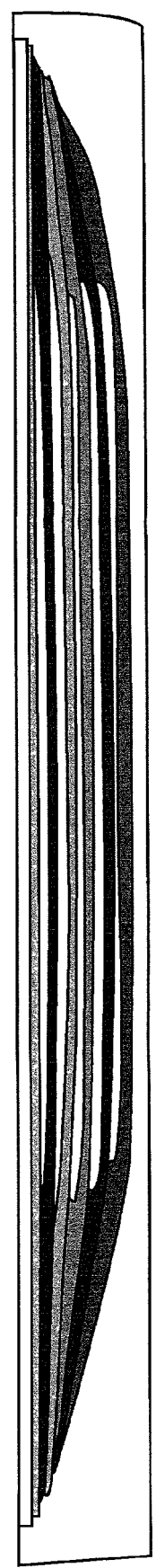

Fig. 54.
I.  II.

Fig. 55.
I.  II.
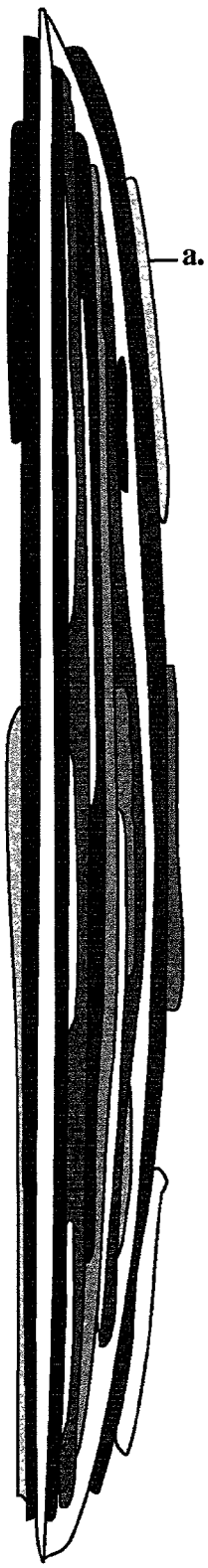
a.

I.   II.

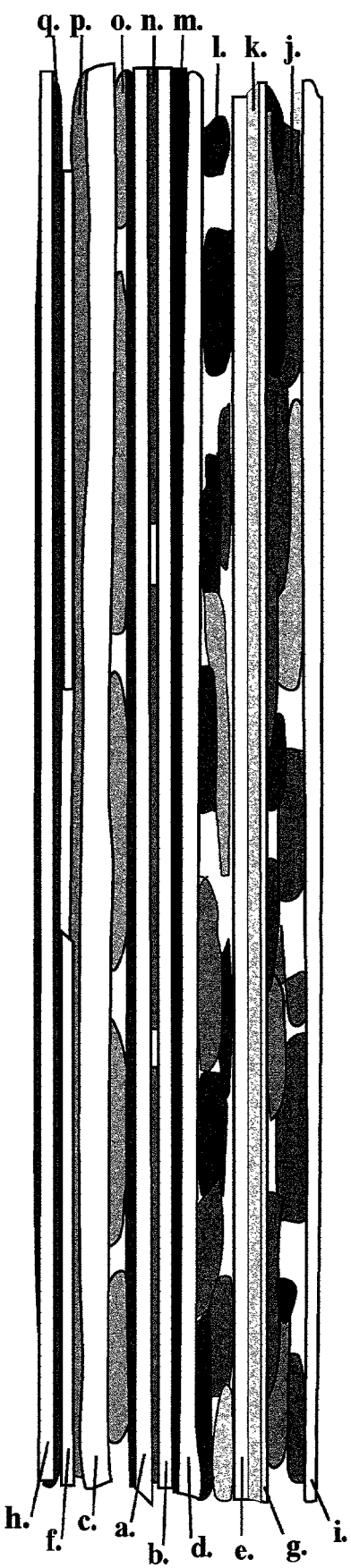
Fig. 61. IV.

Fig. 62.
IV.
V.
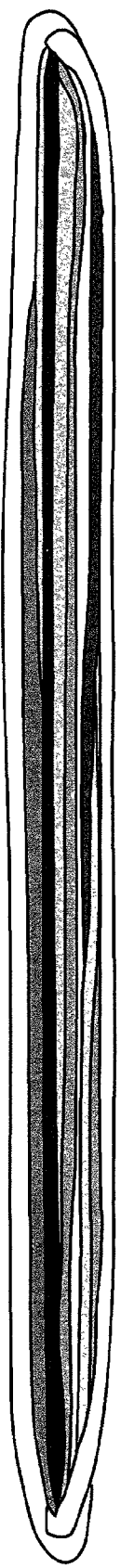
VI.

Fig. 62.
VII.
VIII.
IX.

Fig. 63.
VIII.
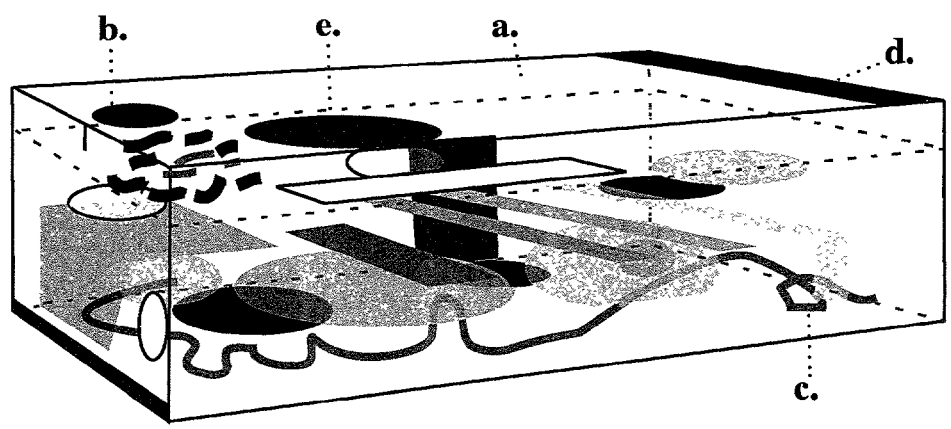
IX.
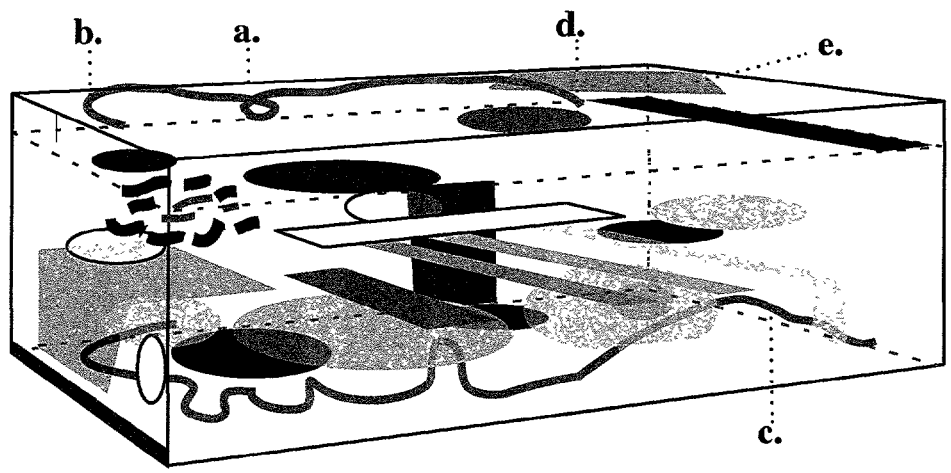

Fig. 63.
X.
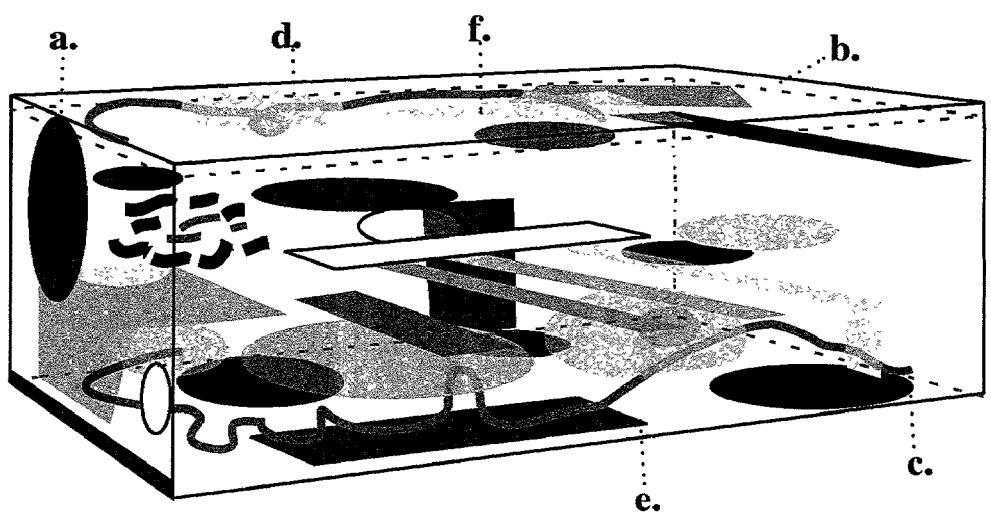
X. i.
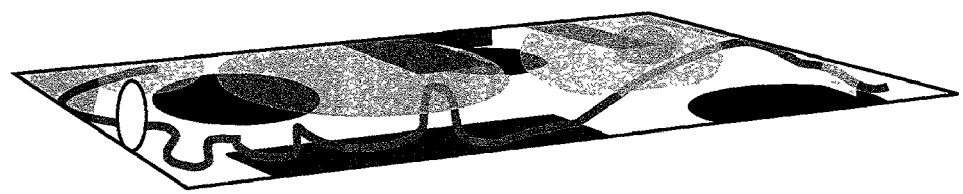

Fig. 63.
XI.
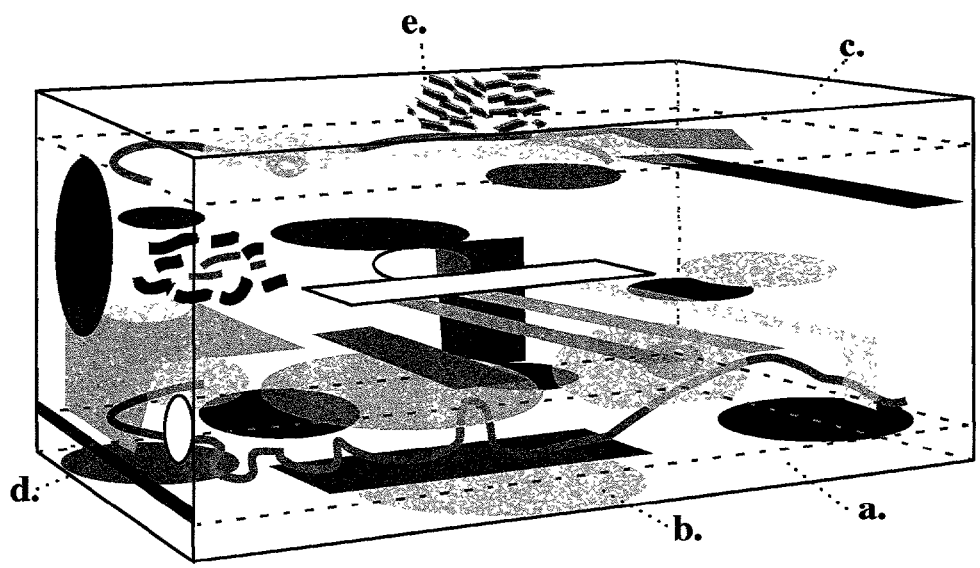
XI.i.
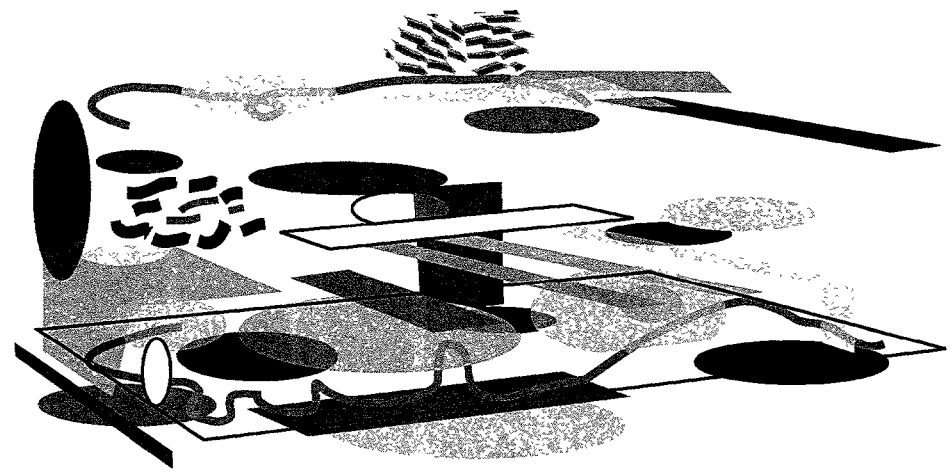

Fig. 63.
XII.
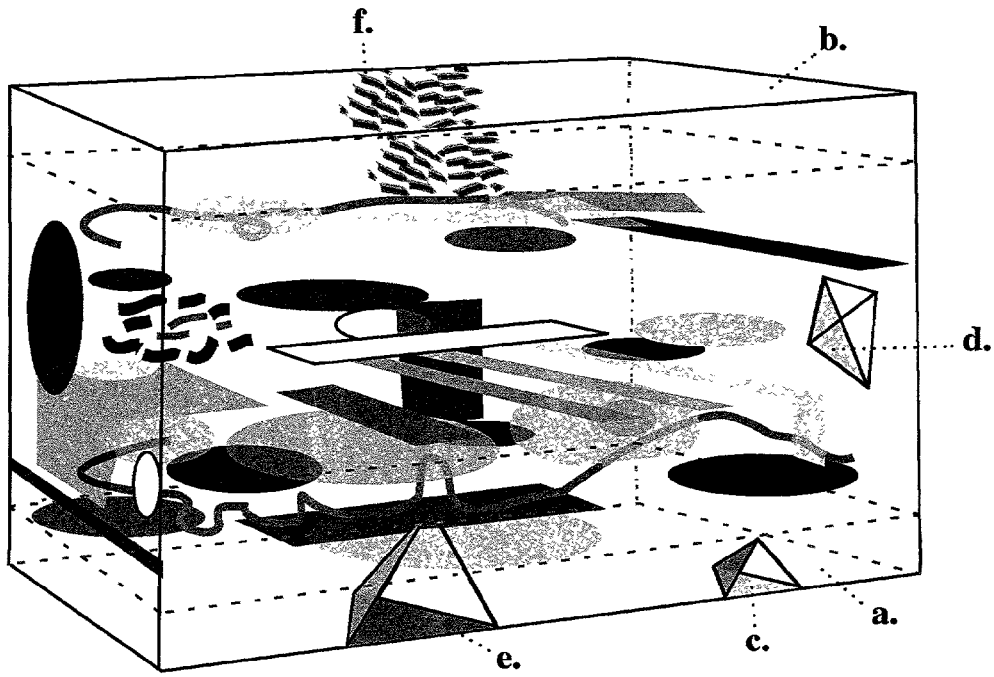
XIII.
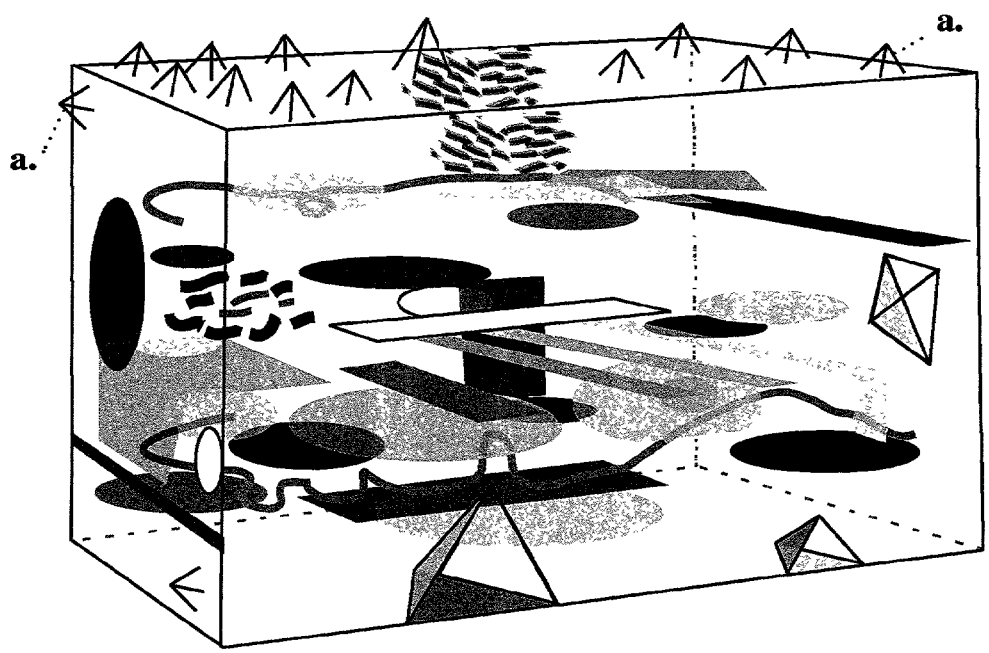

Fig. 64.
I.
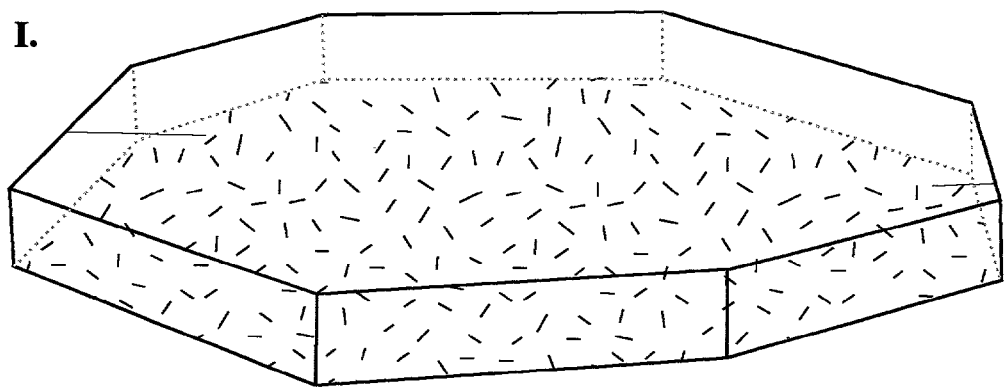
II.
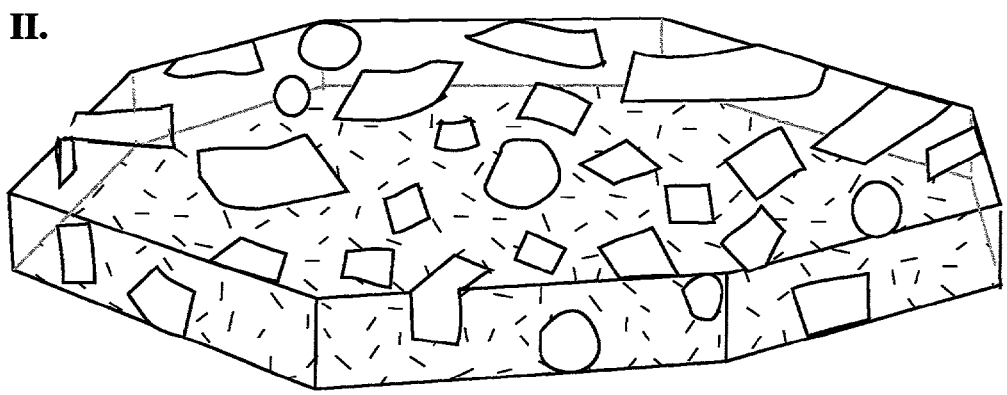
III.
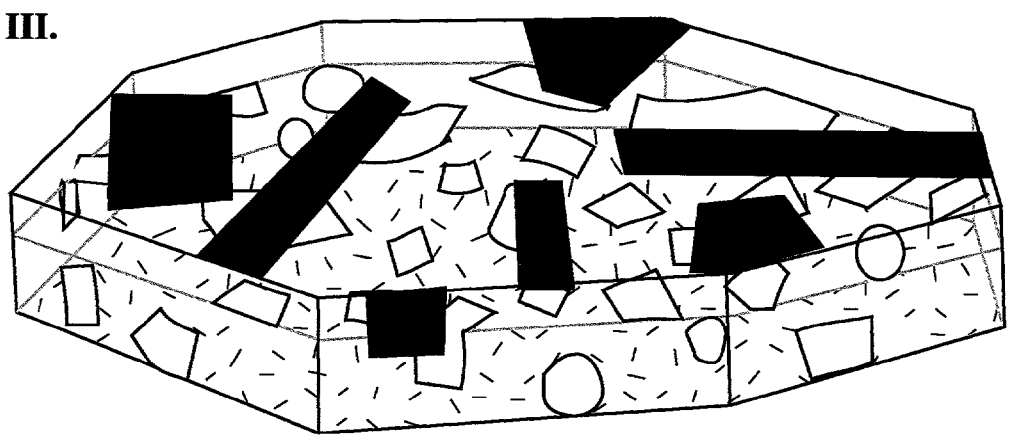

Fig. 64.
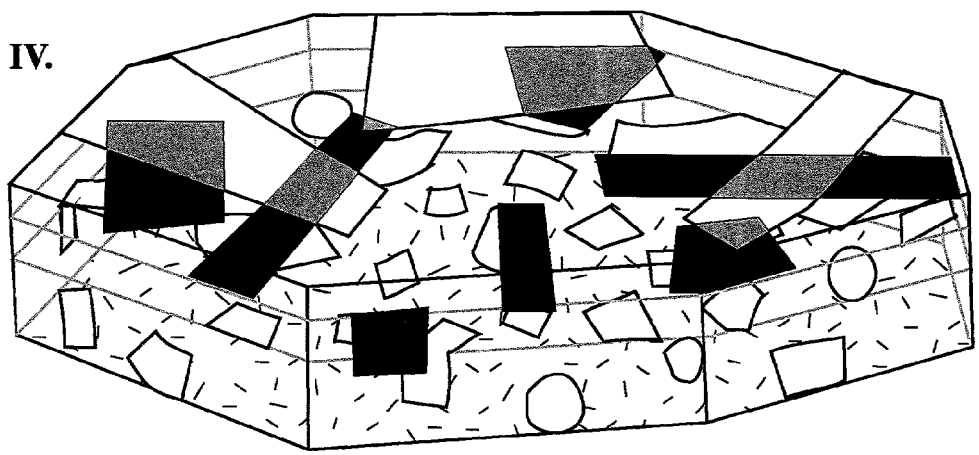
IV.
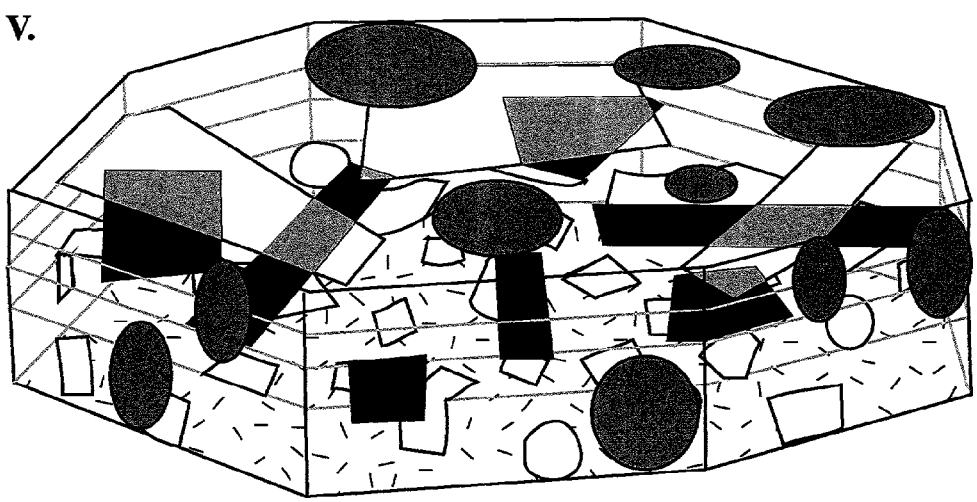
V.
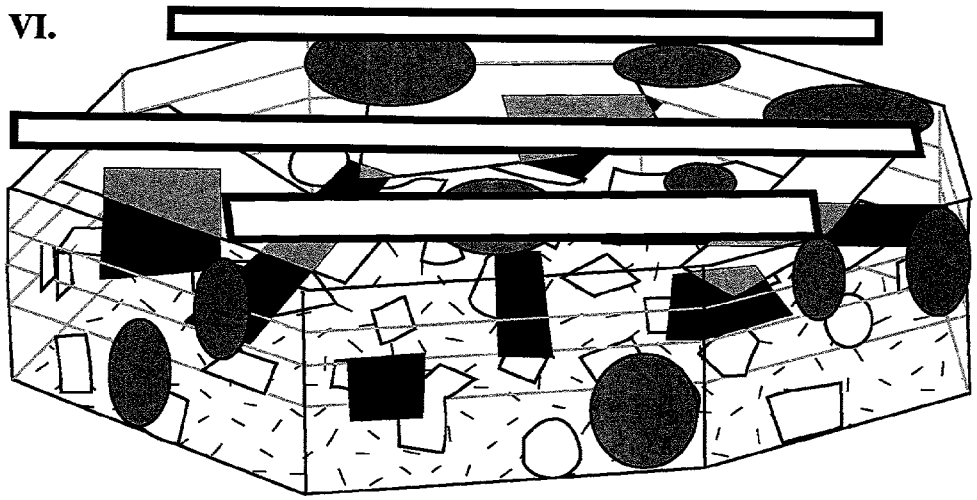
VI.

Fig. 67.
a.
b.
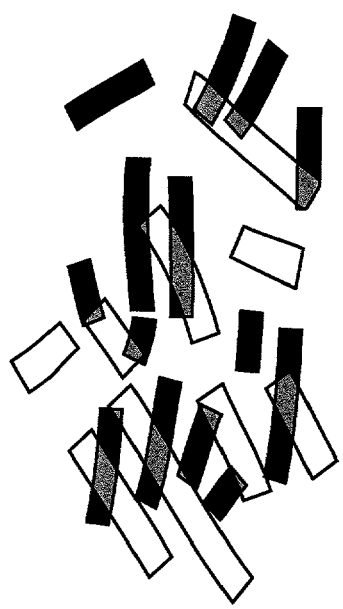
c.
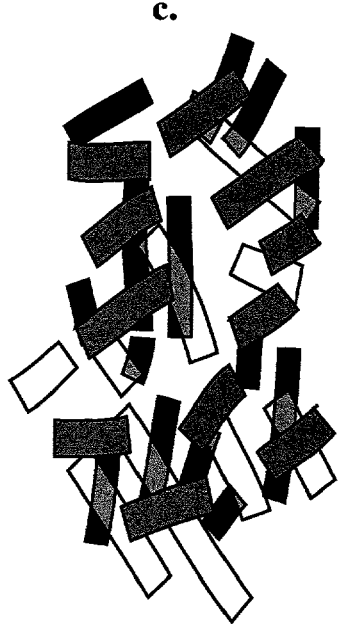
d.
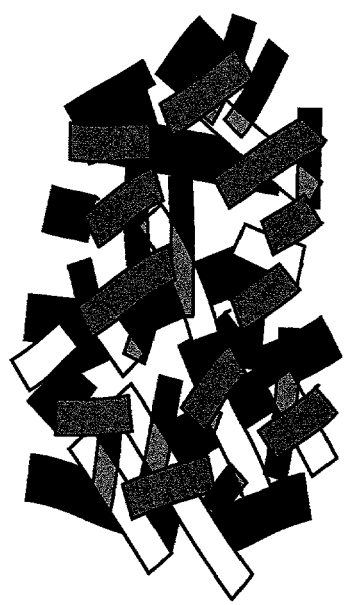
e.
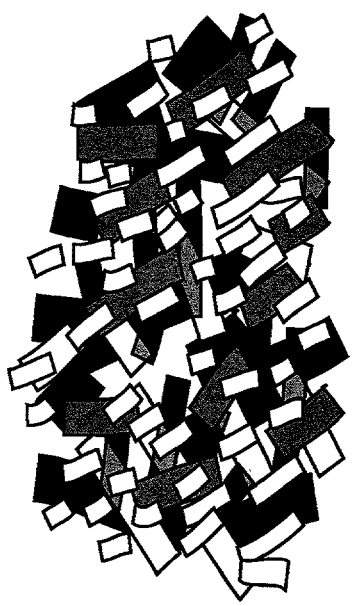

Fig. 67.
f.  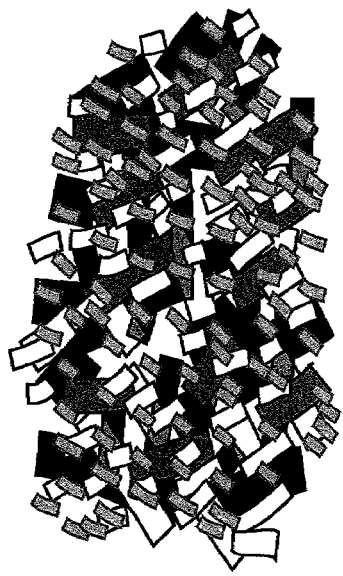
g.i.  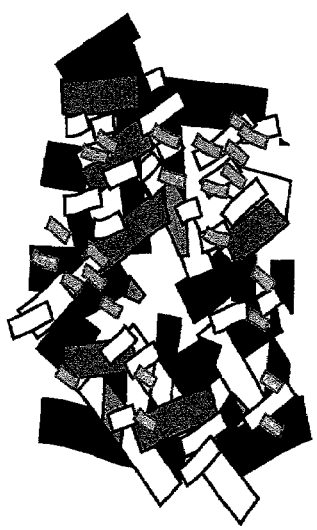
g.ii.  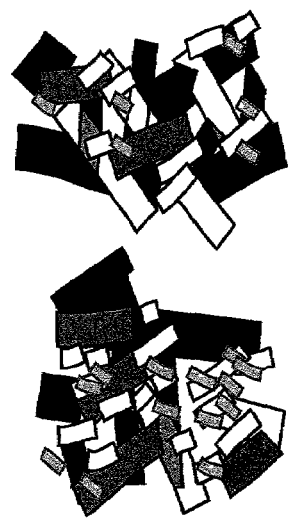
g.iii.  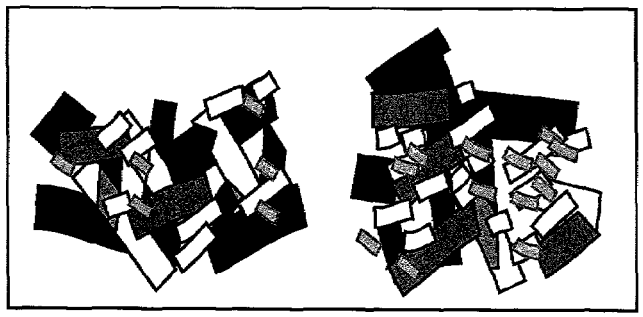
g.iv.  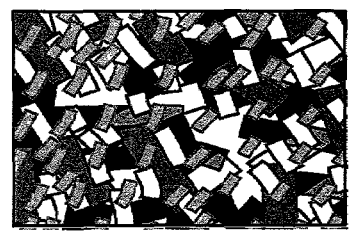

Fig. 68.
a.
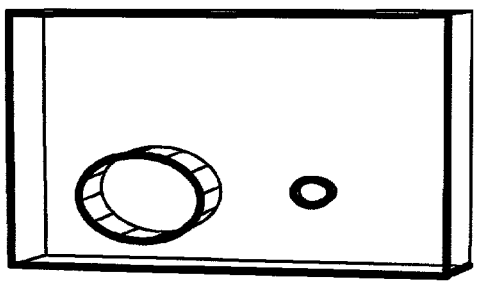
b.
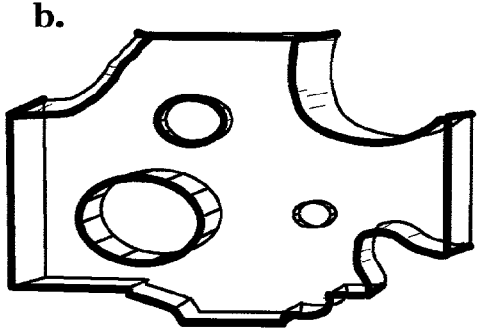
c.
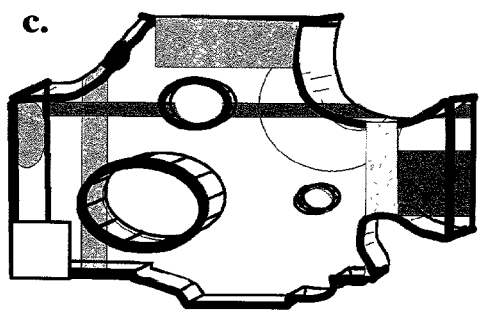
d.
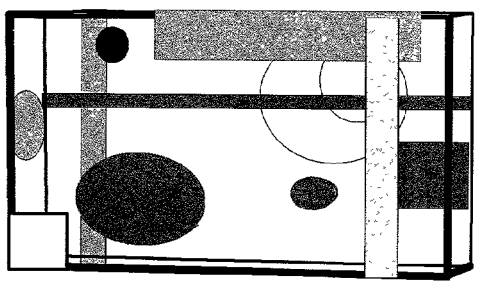
e.
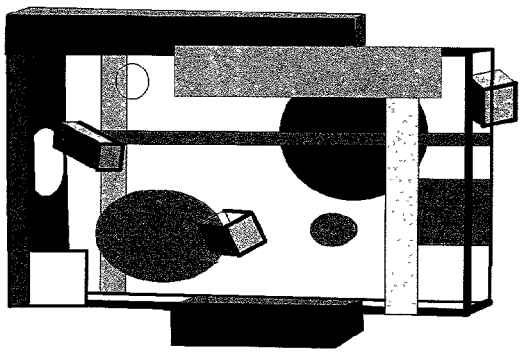
f.
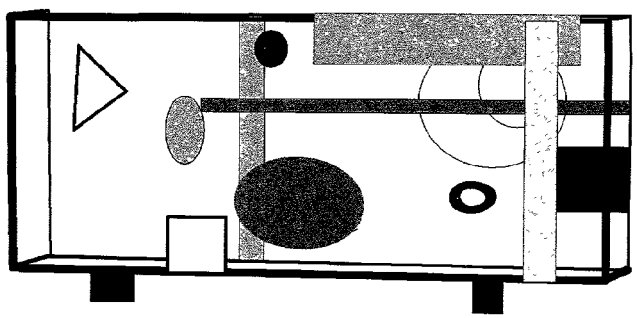

Fig. 69.
a.
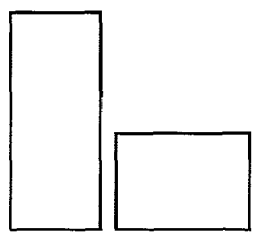
b.
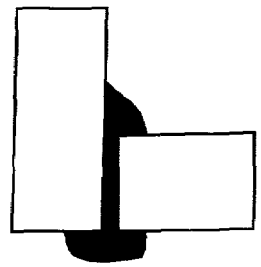
c.i.a
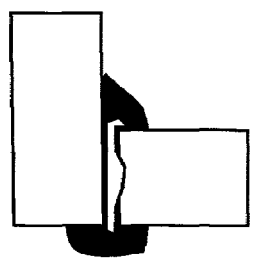
c.ii.a.
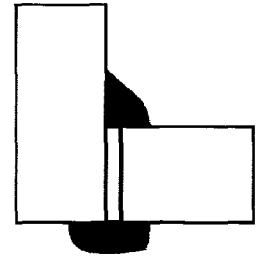
c.i.b.
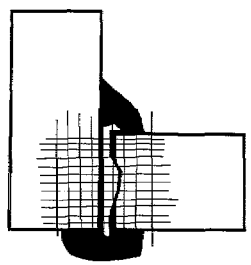
c.ii.b.
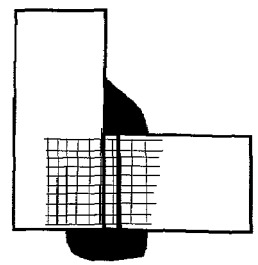
d.
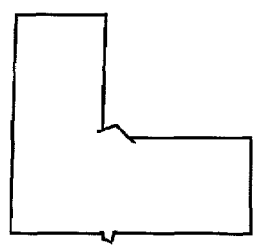
e.
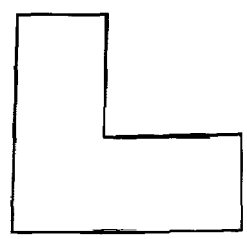

Fig. 70.
a.
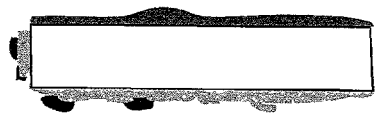
a.1.i.
a.1.ii
a.2.i.
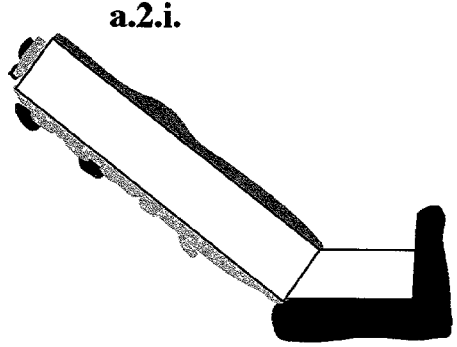
a.2.ii.
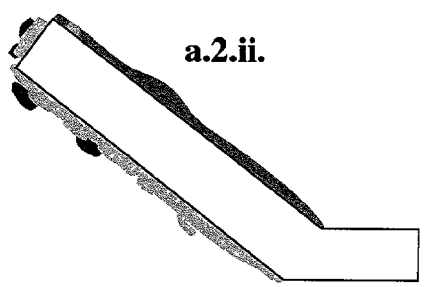
a.3.i.
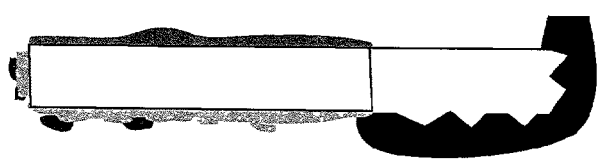
a.3.ii.

Fig. 71.
I.a.
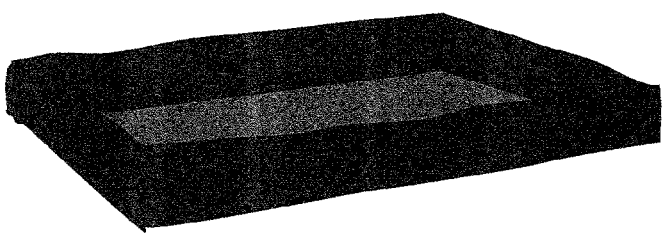
I.b.
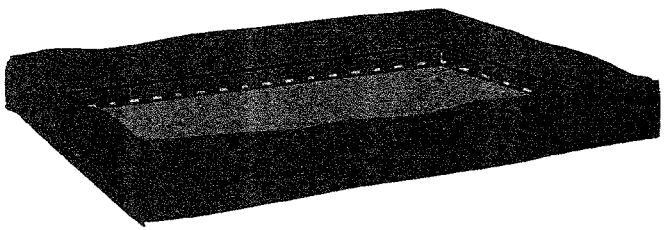
II.a.
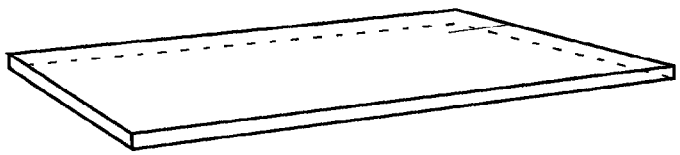
II.b.
II.c.
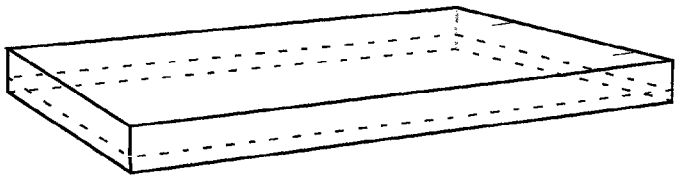
II.d.
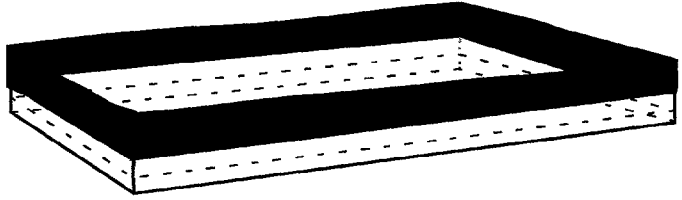
II.e.
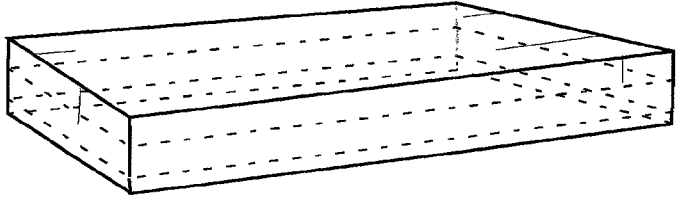

Fig. 71.
III.a.
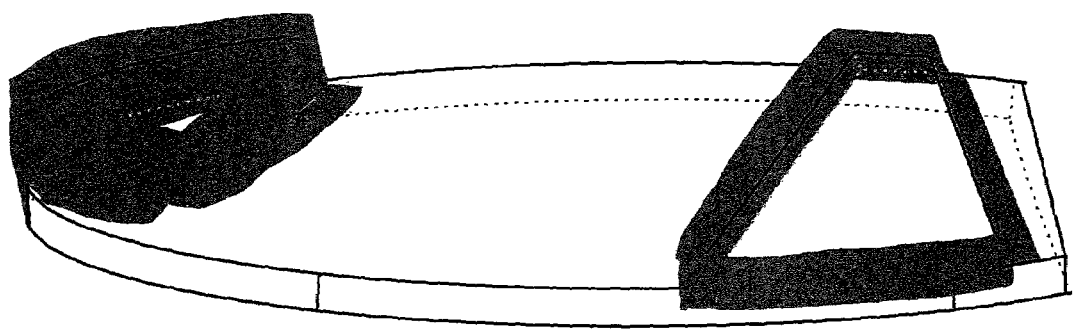
III.b.
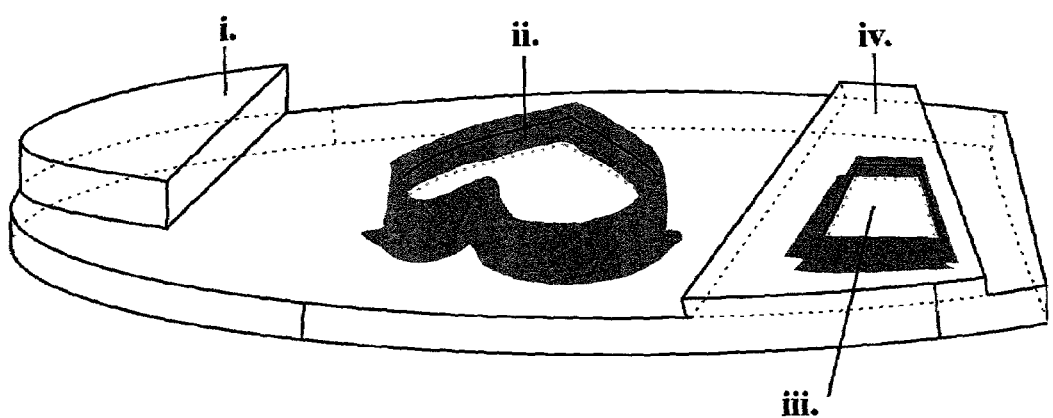
III.c.
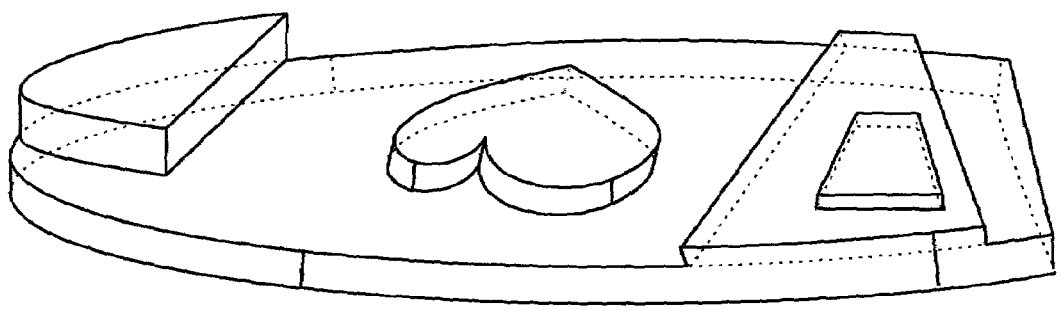

Fig. 76.
V.
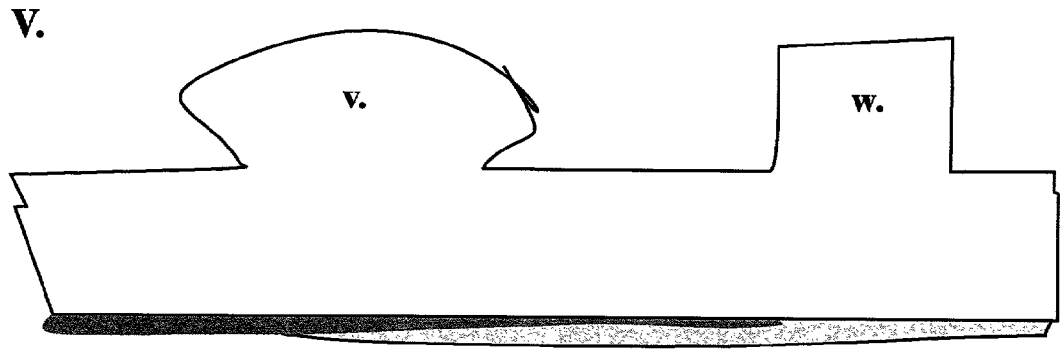
VI.
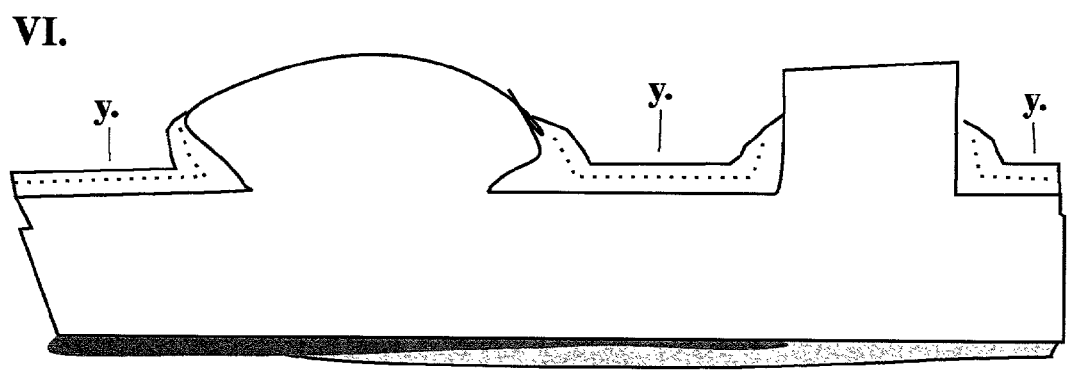
VII.
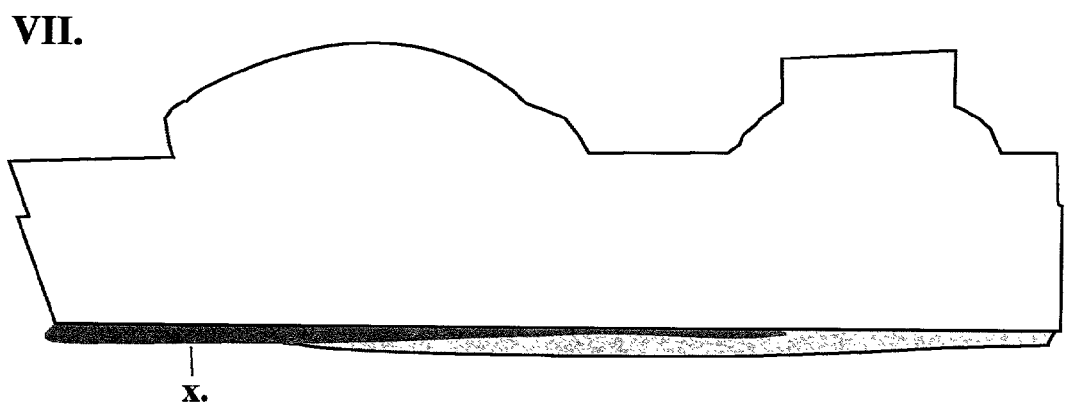

a.I.

b.

a.II.

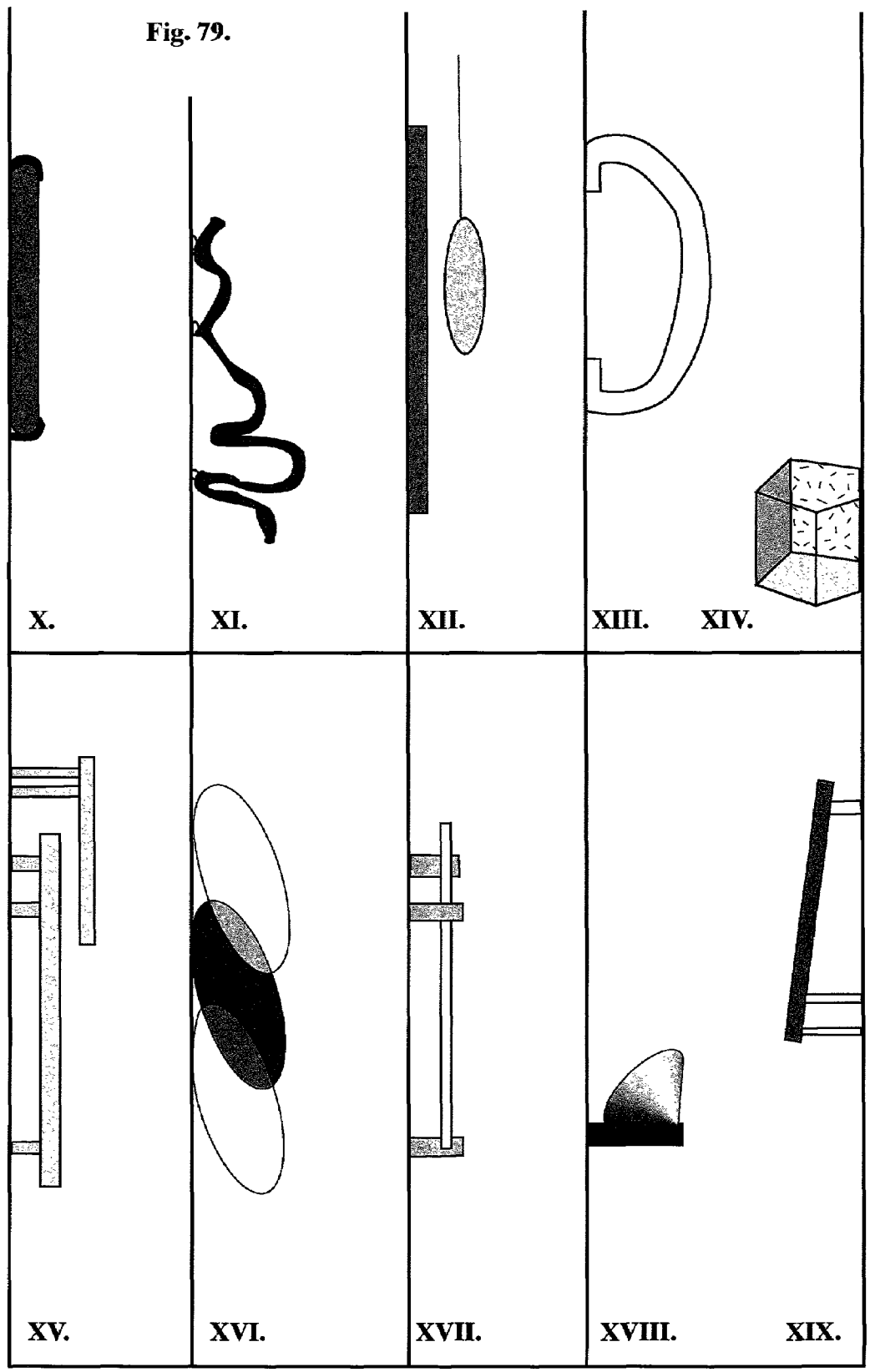

Fig. 80.
I.
II.
III.
IV.

Fig. 80.
V.
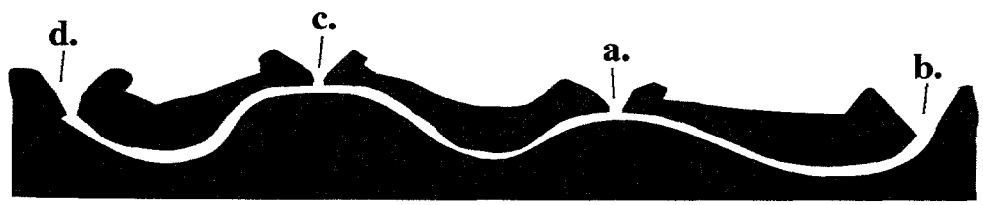
VI.
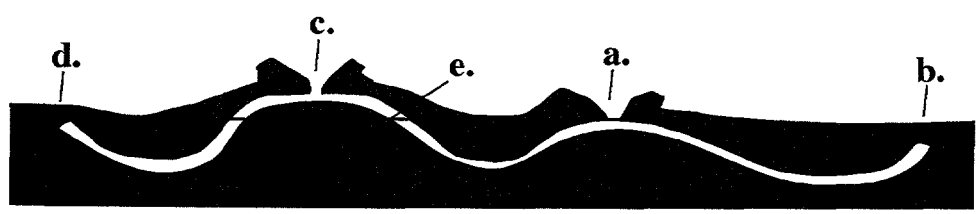
VII.
VIII.

Fig. 82.
I. II.
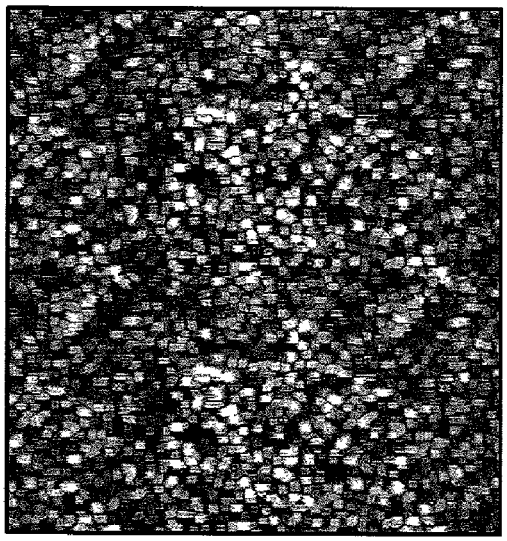 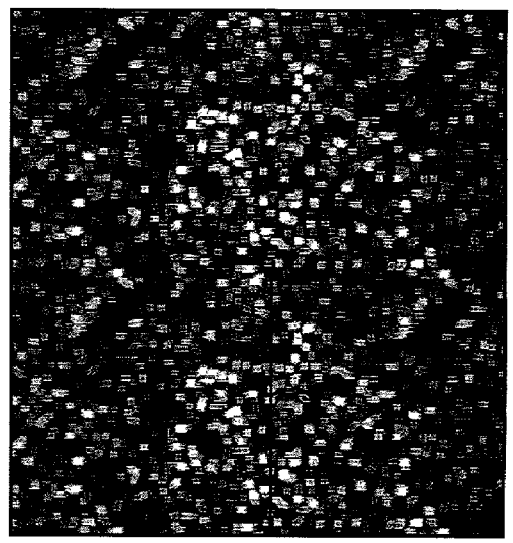

Fig. 83.
I.
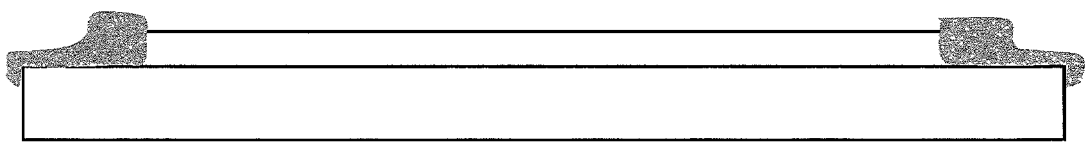
II.
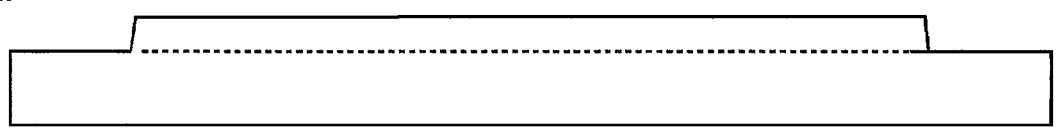
III.
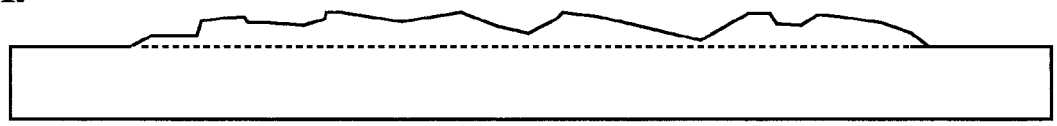
IV.
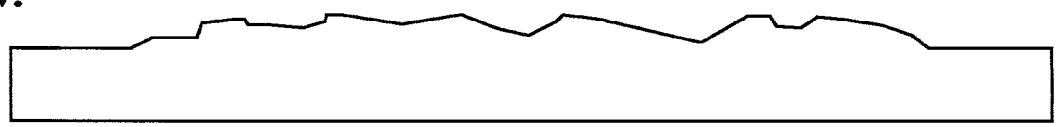
V.
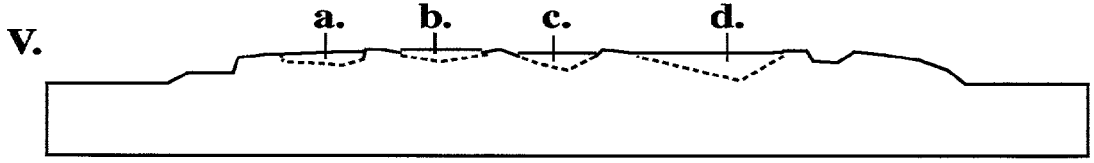
a.   b.   c.   d.
VI.

Fig. 84.
I.
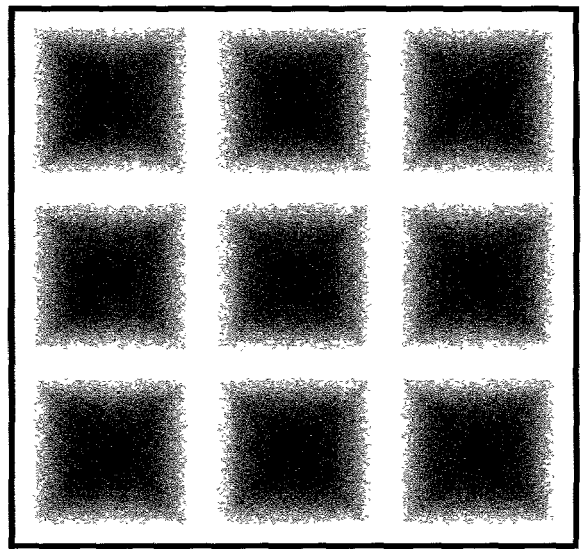
II.
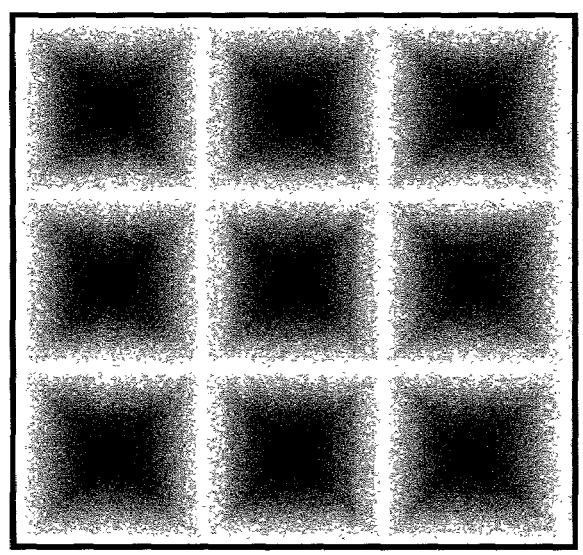
III.
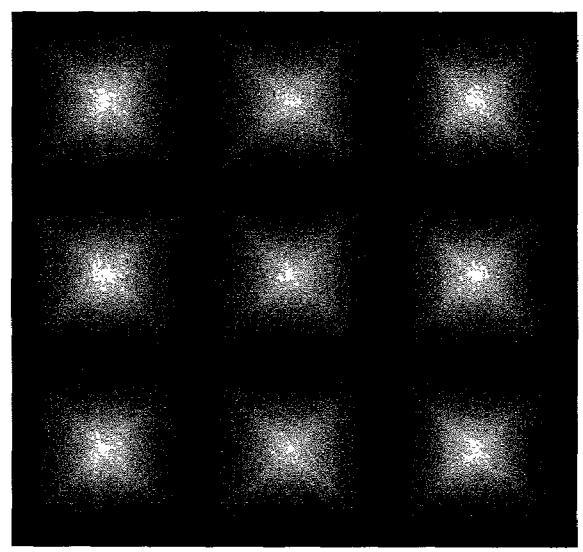

US 7,629,400 B2

IMAGE MAKING MEDIUM

CROSS-REFERENCE TO RELATED APPLICATIONS

This application is a continuation of application Ser. No. 10/012,259, filed Dec. 11, 2001, now abandoned, which is a continuation-in-part of PCT Application No. PCT/US00/16111, filed Jun. 12, 2000, now pending, which claims the benefit of Provisional Application No. 60/138,694, filed Jun. 11, 1999, the contents of each of which are expressly incorporated herein by reference thereto.

FIELD OF INVENTION

The present invention relates to a medium for making images, a process for making the medium, and methods for using the medium to make images. More specifically, the present invention relates to a medium-containing polymer that is useful for making images.

BACKGROUND OF THE INVENTION

The interaction of one or multiple media, materials, objects, devices, processes or combinations of these, with one another, with light, or both ("light-art interactions"), has been a focus of an enormous amount of work among those making images of art, design, and architecture thousands of years. Medium and process have been important in images throughout history. The present invention is part of the mainstream current of experimental art.

Throughout the 20th century, since the invention of Cubism c. 1910, the solid form of images has opened up to light and space. The images produced show a general opening up of solid form, new uses of light and space, including greater reliance on real light and real spatial depth (rather than illusions of these), and the use of spatial depth that is transparent or translucent. Examples of new art forms invented in this 20th century movement are: the collage, the construction, the Drawing in Space, welded sculpture, open sculpture, the assemblage, photography, holography, illuminated transparencies (like works of Light Box Art), Light Art, Light and Perceptual Art, Shaped Paintings, Installations, Computer Art, Video Art, and film. These images expanded what is today a deeply rooted, mainstream aesthetic continued by the present invention, hereinafter referred to as the aesthetic of light and space.

Yet, despite the 20th century explosion of exploration, experimentation and invention in images, despite the opening up of solid form in images, and despite the emergence and prevalence of the aesthetic of light and space and the "irresistible impulse to make things clear," prior to the present invention, image making and conventional images remained limited, problematic, and burdened by undesirable issues, e.g., often forcing choices between undesirable options. The roots of these limitations, problems, and undesirable issues have been at the very heart of the foundation of images, restrictions in the free use of their most basic constituent elements, their formal elements. Despite considerable work, few and often no desirable, direct solutions existed until the present invention. Prior to the present invention, the formal elements in conventional images, were not workable, reworkable, and controllable as desired.

Despite the prevalence of the aesthetic of light and space, conventional image making media and processes, and the variety of these images that existed remained significantly and undesirably limited and problematic. Image makers did not have satisfactory aesthetic control or creative freedom in the use of light and space with other formal elements in their images, such as transparency, translucency, and other forms of real light and real spatial depth, e.g., with and without color, with significant workability or reworkability, or in ordinary workspaces. Developing these images often forced choices between the aesthetic desired and permanence, and the resultant images were often compromises. Though images have been made in see-through layers throughout history, there is no conventional medium that can form images with controllable, variable, transparent or translucent layers of spatial depth without compromising the permanence of the image formed. Prior to the present invention, a strong, transparent or translucent, 2D or 3D image could not be made with a full range of workability and control, e.g., no conventional medium can form stabile images with workable and controllable, transparent or translucent texture, embedding, or negative space. Moreover, the ability to alter images spontaneously, and the ability to see or know how changes to a developing image will take effect later were limited.

There are no conventional transparent or translucent forms made as canvasses or as image supports for 3D images. All conventional canvases are opaque. Very thin polymer films such as MYLAR®, acrylic in geometric forms (such as sheets, cubes and spheres), and glass forms have been used as image supports for painted and unpainted images. There are, however, no conventional, transparent or translucent image support canvasses or 3D forms made for bonding to a wide range of colorants and other image making materials (e.g., paints, pastels, inks, collage, and photographic emulsions). Conventional image supports have limited the use of optical effects, light effects, and subtractive processes in images. The ability to form an image using both additive and subtractive processes is limited by conventional image supports, e.g., Shaped Paintings are limited, as is reworking and removal of conventional applications like paints. There are also limitations in freeing many kinds of conventional images (such as paintings, drawings, and prints) from staged presentations and illusionism. The present invention overcomes these limitations and problems.

Prior to the present invention, the use of polymers in images was very limited and problematic. Image makers never used and controlled polymer for interactions with light. They had limited or little control or versatility in the use of real transparency, real translucency, light, color, space, layering, texture, form, permanence, or processes in using polymers to make images. They never explored the variety of effects different polymers can create in images, the workability, reworkability, and controllability of polymers, or the solutions polymers can provide to the longstanding limitations in image making and in images.

SUMMARY OF THE INVENTION

The invention relates to a fine-art, image-making support medium for creation of an aesthetic image that is a work or object for display. This support medium includes at least one polymer in an amount sufficient to provide or enable the image to have at least one aesthetic element. In different advantageous embodiments, (A) the fine-art, image-making support medium is an image support stabilizer, (B) the at least one polymer is a synthetic absorbent polymer or a conductive polymer, or (C) the at least one polymer is a transparent polymer or a synthetic translucent polymer and a property of this transparent or translucent polymer is enhanced to facilitate the creation or preservation of the image by at least one fine-art stabilizer.

The polymer typically has a property which is enhanced to facilitate the creation or preservation of the image by any one of a number of different stabilizers or combinations thereof. Such stabilizers might include at least one stabilizer selected from the group of: an ultraviolet light stabilizer, an ultraviolet light absorber, a fiber, a fiberglass surfacing veil, an antioxidant or a hindered amine light stabilizer. Also, the stabilizer may be a surface preparation stabilizer, an image-support stabilizer, a separating layer stabilizer, an image support, an ingredient which modifies the absorbency of the polymer; a dopant which treats the polymer to make it conductive or more conductive; a battery or an electrode to supply or carry energy to the polymer; or an ingredient which enables the formation or fortification of a bond between the polymer and at least one superimposed medium or material. Furthermore, the polymer may have a property which is enhanced to facilitate the creation or preservation of the image by at least one fine-art stabilizer which: (a) has a refractive index substantially the same as that of the polymer, (b) is invisible to the unaided human eye in its use in the image, or (c) contributes to the image aesthetically. The stabilizer can be used to in an amount or design sufficient to protect the at least one polymer against (a) discoloration over time that is visible in the image, (b) changes to its form or surface over time that are visible in the image or (c) changes that reduce its strength, its stability or its permanence.

If desired, the support medium may include two or more layers or parts made of different polymers which are superimposed or connected, wherein at least one of these polymer layers or parts provides support to the medium, and at least one different layer or part provides or enables the image to have at least one element selected from the group consisting of an aesthetic element, transparency, translucency, an ability to emit visible light, an ability to bond to at least one superimposed application, or an ability to be further developed by cutting, carving or incising.

The invention also relates to a method for preparing this fine-art, image-making support medium. The method includes forming a polymerization reaction mixture comprising at least one polymerizable monomer in an amount sufficient to provide or enable the image to have at least one aesthetic element, and processing the polymerization reaction mixture into a 2- or 3-dimensional shape.

BRIEF DESCRIPTION OF THE DRAWINGS

The invention will be better understood in relation to the attached drawings illustrating preferred embodiments, wherein:

FIG. 1 shows alternative of methods for making inventive images;

FIG. 2 shows two separate inventive images, each viewed from two sides in three stages;

FIG. 3 shows a 2D or 3D inventive image made of one continuous linear, open form;

FIG. 4 shows cut-outs which form one or more inventive images;

FIG. 5 shows examples of ways a realistic illusion of a sky can be depicted in inventive images;

FIG. 7 shows examples of strengthening layers or parts in inventive images;

FIG. 8 shows two cross sectional diagrammatic examples of the layering of inventive images;

FIG. 9 shows side and cross section views of polymer rods or bars used to make inventive images;

FIG. 10 shows a cross section or side view of an inventive image with multiple different layers;

FIG. 11 shows a cross section or side view of an inventive image with layers of different thicknesses;

FIG. 12 shows a cross section or side view of an inventive image made of multiple layers;

FIG. 14 shows inventive images which may function as design or architecture;

FIG. 15 shows texture on inventive images which may be made of connected parts;

FIG. 17 shows an inventive image with multiple layers and an embedded image support;

FIG. 18 shows two inventive images made with internal air pockets and parts shaped as prisms;

FIG. 19 shows a cross section or side view of an inventive image with two different layers;

FIG. 20 shows an inventive image with its image support completely encased by another layer;

FIG. 21 shows texture and/or a ground on an inventive image in cross section or side view;

FIG. 22 shows cross section or side views of inventive images with multiple different layers;

FIG. 23 shows a cross section or side view of an inventive image with both thick and thin layers;

FIG. 33 shows texture on a layered inventive image in a cross section or side view;

FIG. 34 shows texture on an inventive image in a cross section or side view;

FIG. 35 shows texture on an inventive image in a cross section or side view;

FIG. 36 shows inventive images with negative space between their layers;

FIG. 37 shows a multi-layered inventive image with inlays, embedding, and other effects;

FIG. 39 shows a multi-layered inventive image with inlays, embedding, and other effects;

FIG. 41 shows three inventive images with joined parallel planar layers and internal air pockets;

FIG. 42 shows some uses of light sources as parts of inventive images;

FIG. 43 shows graduated coloration in and/or on layered inventive images;

FIG. 46 shows the use of an American Indian style pattern on and/or in an inventive image;

FIG. 47 shows an inventive image with layers of different compositions and sizes;

FIG. 53 shows inventive images with many layers embedded;

FIG. 54 shows a cross section or side view of two stages in making a multi-layered inventive image;

FIG. 55 shows a cross section or side view of two stages in making a multi-layered inventive image;

FIG. 64 shows an inventive image formed of multiple layers with coloration;

FIG. 67 shows workability in making inventive images without an initial image support;

FIG. 68 shows the workability of the inventive medium in making images;

FIG. 69 shows the joining of two separate parts in making an inventive image;

FIG. 70 shows ways to form polymer on an inventive image using a temporary mold;

FIG. 71 shows the process of forming polymer in a mold, and on an inventive image;

FIG. 80 shows examples of the formation of a polymer image using open and enclosed molds;

FIG. 82 shows an inventive image with varied coloration, in which light is a crucial element;

FIG. 83 shows the carving of a newly formed layer of cPRM on an inventive image;

FIG. 84 shows either one inventive image in three stages or three separate inventive images, all with varied coloration, in which light is a crucial element;

DETAILED DESCRIPTION OF THE INVENTION

Figure 6:
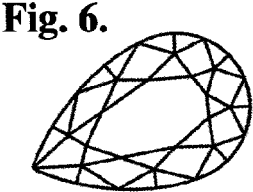
FIG. 6 shows a 2D or 3D inventive image which could be formed in different ways.

The present invention provides a medium for a work in progress or an image of art or design that can be formed, reworked, and controlled as desired. The inventive medium, a polymeric composition, is prepared by polymerizing one or more monomers to form at least one polymer in an amount sufficient to provide or enable the image to have at least one aesthetic element. Preferably, the inventive medium comprises a polymeric material with one or more of these properties: (a) transparency and/or translucency, (b) other desired optical properties, (c) strength, stability, and/or permanence, (d) it is conductive, (e) it enables the further processing desired, (f) it provides or enables the image to have another aesthetic or structural element, or (g) a combination of these.

As used herein, the term "or" refers to items in the alternative, as well as both items. Thus "or" should be interpreted as "and/or" if "and/or" is not explicitly used. The term "about," as used herein, should generally be understood to refer to both numbers in a range of numerals. Moreover, all numerical ranges herein should be understood to include each whole integer within the range.

Optical properties include light properties, a particular refractive index, and/or light transmittance. Strength, stability, and/or permanence in an inventive image may, for example, involve making it with a cross-linked polymer (like polyester), with a stabilizer that prevents or decreases the chances of undesirable change in the image over time, and/or in other ways described herein. Conductivity indicates electrical activity or the capacity thereof, conducting ions or the capacity thereof, or emitting light or the capacity to do so. Further processing may include additive processes, subtractive processes, or other ways of developing images, such as for example, bonding to superimposed applications, enabling effective carving, or rearranging image parts.

As the term is used herein, an "image" is a work of art or design intended for visual observation. An image can be a work in progress or it can be complete. An image may be realistic, symbolic, abstract, narrative and/or utilitarian. Examples of images are paintings, sculptures, collages, constructions, installations, Computer Art, Video Art, Light Art, Light and Perceptual Art, stage sets, architectural design, furniture design, fashion design, graphic design, crafts, jewelry design, product design, interior design, costume design, an edition of ten partitions dividing a room with a jungle printed in and on them, an edition of five tables bearing geometric drawing in graphite and pastel, and an edition of a hundred windows with real organic forms (such as flowers) embedded in them and colorful depictions of similar organic forms painted on them. In general, the term "images" refers to the group of all images, however, the context may further define the group as appropriate.

As used herein, "design" refers to images of utilitarian art which are for visual observation, but which are not decoration. Unlike decoration, design inventive images are an end in and of themselves. That is, they do not function as part of something else. They do not merely embellish, ornament, enhance, or beautify something else. As used herein, the term "design" is synonymous with applied art, but it does not include decoration.

As used herein, the term "PRM" refers to the universe of polymerization reaction mixtures useful for making the inventive medium, or to one or more specific polymerization reaction mixtures. The term "cPRM" refers to all PRM that are catalyzed and to one or multiple catalyzed PRM.

As used herein, the term "conventional images" refers to images that involve light-art interactions of a kind made prior to the present invention. The term "conventional =images" may be further defined by the context.

As used herein, the term "conventional practices" refers to processes used at any time to make conventional images. Examples of conventional practices include materials, media, objects, devices, interactions, processes, equipment, tools, facilities, products, concepts, and techniques that were heretofore known or used for making conventional images. For instance, chiaroscuro is a conventional practice, as are the brush and the paint used to create it and the canvas onto which it is applied.

As used herein, the term "two dimensional" ("2D") articles are substantially planar. The maximum thickness of a 2D article is preferably less than about one inch.

As used herein, an article that is "two dimensional planar" has substantially no perceivable depth. For example, a 2D planar image might be thin and flat, like an ordinary sheet of paper.

As used herein, the term "three dimensional" ("3D") articles are at least about one inch in thickness.

As used herein, the term "bond" refers to mechanical bonds, chemical bonds, loose bonds, or combinations of these. The term, "loose bond" refers to bonds that are easily separated, i.e., things that are positioned so closely together that they do not fall apart.

The term "image support" refers to an element in an inventive image that is a main element or the principal element in its shape or form, and that sometimes includes all or almost all of its shape or form. In some instances, an image support is an image's principal structural element, and in some instances it is an image's entire structure. Image supports are not finished images, image makers make them into finished images. An image support may underlie an image, be within an image, or reside behind an image. An image may be made on an image support. Image supports exist in various forms. They are comparable to a canvas or a sheet of paper in conventional painting, drawing, printmaking, collage and photography. An image support is comparable to an armature, a skeletal form, or a framework (which may be an internal and/or external element of the final image) in conventional sculpture. An image support may be made of one or more parts that may or may not be physically connected. Often making an image begins by making or getting the initial image support. Further processing is done on and/or to the initial image support. Alternatively, image supports may be added to images that are already begun. Separate parts of a single image may be joined to a common image support, or reworking an image might involve adding an image support to it.

The formal elements of art used by art and design professionals are a group of basic aesthetic components, a subset of which constitutes all images. The formal elements generally are:

Medium, Material, and Combinations Thereof: Each medium or material has inherent limitations that affect its workability, reworkability, and controllability, as well as the creative freedom it offers image makers. Some materials and media require or can be used with special facilities, tools, equipment, supplies, products, etc. There are also issues regarding how each material or medium holds up over time in its specific use in an image.

Process of Creation: The process of creation used to make images refers to both the ways the medium and materials must, or can, be used and how the image maker handles the process of image making.

Light: real and illusionary light; visible and non-visible light; light sources; light effects (e.g., matte, glossy); transparency, or translucency; shadows; the absence of light; also any media, materials, or devices used to give an image its light properties.

Space: real and illusionary space such as spatial depth, transparency, translucency, perspective, receding space, negative space, airiness, and lack of spatial depth (flatness).

Form: height, width, depth, weight, shape, and form in 2D and 3D.

Compositional Arrangement: arrangement of parts into a whole. The parts in a compositional arrangement do not all have to be tangible (e.g., light, a drawn line, or a painted form). Each part in a Compositional Arrangement does not have to be physically connected to the rest of the image.

Structure: the form, material source, and nature of an image's stability or lack thereof, physically (e.g., strength and permanence) and visually (e.g., the stability of its formal elements' balance).

Color: hue, value, and intensity; lack of color; and use or application of color.

Time: the sense of time and the actual time that may be apparent in an image, such as an image with elements (such as color, form, subject matter, etc.) that vary or change over time.

Function: visual observation and often for additional functions, e.g., utilitarian functions such as functioning as a table. Function may also involve the method and the manner in which an image is able to serve its function.

Movement: real physical movement and visual movement.

Subject Matter: that which is literally, objectively portrayed in an image and the general way it is shown.

Content: the broader, more conceptual idea or ideas presented or alluded to by an image, beyond its literal and objective aspects and subject matter.

Meaning: the relevance of an image in the larger context of the world.

In images, such as inventive images, the formal elements are very interrelated, e.g., they overlap significantly. For example, altering one formal element, usually affects one or more other formal elements in the same image. All aspects of formal elements are formal elements. They might be uses, manifestations, or effects of one or more formal elements, or they might be consequences of not using one or more formal elements. For example, the use of texture on an image affects its spatial depth, its light and shadow, its color, its transparency or translucency, its subject matter, its content, its meaning, or its function.

The meaning of the term "medium" as used herein depends upon the context and includes the conventional uses of this term in the relevant art. In the context of the inventive medium, the term medium refers to the material, the technical means, or both used to make images. For example, in this context, the means used for artistic expression, such as acrylic paint and oil paint on canvas or paper, pencil on paper, glass, photography, cast or fabricated metal, wood carving, and silkscreen, are conventional media.

Light emitting polymer ("LEP") devices, are a kind of light emitting diode ("LED"). They are also called polymer light emitting diodes (PLED, pLED, or polyLED), organic light emitting diodes (OLED, oLED, poly-OLED, Poly-OLED), and organic electroluminescent (EL).

Variables in Image Makers Control ("VIMC"), are factors in the formation of polymers that image makers can select, control, and use as desired in embodiments. Examples of VIMC are choices pertaining to the formation of polymer with different cPRM, molds, environments, and specifications. The VIMC can be effectively and advantageously used as desired and to the extent desired, during and after the process of forming a polymer inventive image in order to control, or to try to control innumerable aspects of it. Use of the VIMC in forming polymers affords image makers greater creative freedom and aesthetic control over the polymer formed. Specific examples of VIMC are the specific active ingredients in a cPRM used to form a medium such as the choice of monomers; the timing of superimposed layers of cPRM or their thickness; the use of one or more stabilizers (for instance, their concentration or proportion and other specifications like the use, quantity, and type of fiber or the lack thereof, the use of viscosity modifiers, etc.); the process used to create polymers (e.g., tiered layers, altering gelled cPRM, use of conventional injection or extrusion processes, etc.); the viscosity of an application of cPRM; the use of a temporary barrier such as temporary clay mold walls; the mold's specifications; use of release agents; the air temperature, humidity, and air currents around the cPRM. Not all VIMC are specifically described herein; there are further variables in mold making and in the display and mounting of inventive images, variables in conventional practices of forming polymer, as well as variables in specific cPRM ingredients known or available to those of ordinary skill in the art.

As used herein, a "bonding agent" refers to any material, medium, device, or combination of these, that forms, assists, or fortifies a mechanical bond, a chemical bond, or a loose bond in inventive images. For example, a bonding agent bonds inventive image parts, applications, layers, attachments, surfaces, or components. Examples are bonding substances, media and materials (such as glues, acrylic emulsions, paste, and cPRM); C-clamps, screws, nails, bolts, chains, hinges, hooks, tape, string, wire, sodder, light, heat, and the like. Bonding substances are a subset of bonding agents.

"Bonding spots" are areas on the surface of an inventive image, left or made, to form, assist, or fortify a chemical bond, a mechanical bond, or a loose bond in that inventive image, such as a bond connecting two or more parts. Bonding spots may be underlayers or a surface preparation stabilizer.

"Colorant" or "coloration" as used herein refers to anything that is a source of color, or color from any source. Color refers to hue, intensity, value, or a combination of these. Examples of colorants and coloration for inventive images are pigments, dyes, color from light, pixels, particles (such as blades of grass, rocks, gems, stones, particles of glass, metal, paper, sand, coffee, reflective particles); elements that are collaged, attached, embedded, or inlaid (such as string, shells, paper clips or a conventional image like a photo, a cut-out, or a drawing on paper), marks (such as pastel, charcoal or pencil marks, marks that are text), printing, painting, conventional and unconventional image making materials and media.

"Fat over lean" refers to the conventional technique of layering materials or media in order of increasing elasticity used for centuries in conventional paintings so that they are as permanent as possible. Images such as conventional paintings expand and contract in normal environments. For example, conventional image supports such as canvases, paper, and wood expand and contract with changes in temperature and humidity. Fat ingredients in oil paints (e.g., linseed oil or stand oil) make them more elastic. Turpentine is an example of a lean ingredient, it evaporates leaving a thinned layer of oil paint behind. In order to be as permanent as possible, layers of oil paints should always be applied fat over lean so that they are most likely to withstand expansion and contraction without changing, without cracking, crazing, or flaking. As superimposed layers of oil paint expand and contract, a fat layer will expand and contract to a greater extent than a lean layer.

The principal of fat over lean, the application of layers in increasing order of elasticity, also governs the layering of other materials or media, though in these circumstances this principal is not always conventionally called fat over lean, it is referred to as fat over lean herein. For example, this principal governs the layering of oil paints with other materials or media, such as water based media. But this principal does not govern the layering of acrylics over acrylics, nor is it applicable to the layering of paints comprised of the inventive medium.

While the principal of superimposing layers with increasing elasticity is known, it is often difficult to follow. Therefore, despite widespread concern for permanence, and despite widespread use of layering applications that should follow the principal of fat over lean for permanence, image makers generally either do not exert the effort required to follow this principal for permanence, or they do not know if they have followed this principal.

As an example, fat over lean is hard to follow because image makers frequently do not know their paints' fat and lean ingredients (added by the manufacturers), their percentages, or their quality (such as their permanence, purity, and refinement). Pigments and dyes differ in the amount of oil they absorb, and they originate from different sources. In addition, paint manufacturers often mix other additives into their paints such as additional oils, driers, waxes, and fillers, that can significantly affect the paint's fat content and its permanence.

In addition, those image makers who do conscientiously try to follow the principal of layering applications with increased elasticity may encounter further problems. To follow this principal and account for its lack of accuracy, image makers often add an increased amount of one or more fat ingredients (like linseed oil or stand oil) into each superimposed paint layer. Though this seems like a logical solution, using too much fat in a layer is another cause of impermanence. For example, excess oil can cause oil paintings to wrinkle, to discolor, to remain soft and fragile, and to become increasingly transparent over time. Conservators have found that thinner paintings, leaner paintings, and paintings with fewer layers tend to be the most permanent. Thus, even though oil paints can be permanently layered according to fat over lean, the quantity of layers of oil paint which can be permanently superimposed is limited because when the outer layers become too fat, the risk of impermanence returns presenting a new problem.

As used herein, the term "limited edition" refers to an inventive image that is unique as well as to an inventive image that is reproduced, but not for the mass market. For example, a thousand, five hundred, three hundred or fewer copies in a limited edition of an image might be prepared during the first 75 years of its life. Limitations on the size of limited editions for fine art inventive images are entirely at the discretion of their image maker. However it is preferred that during their first 75 years of existence, limited editions of fine art inventive images are made with about 3000 or fewer copies, it is further preferred that they are made with about 2000 or fewer copies, it is even more preferred that such limited editions are made with about 1000 or fewer copies, it is more desirable that such limited editions are made with about 700 or fewer copies, it is most desirable that such limited editions are made with about 500 or fewer copies, and it is most preferred that such limited editions are made with about 400 or fewer copies. However when the use of a particular mold is required to make such inventive images of fine art in limited editions, and said mold is destroyed after it is used to make such a limited edition, it is preferred that these limited editions have about 5000 or fewer copies, it is more preferred that they have about 4000 or fewer copies, it is more desirable that they have about 3000 or fewer copies, and it is most preferred that they have about 1500 or fewer copies.

For fine arts images of the present invention which function for visual observation but which also serve one or more utilitarian functions (e.g., as a table, a window, a wall), it is preferred that during their first 75 years of existence, limited editions are made with about 2500 or fewer copies, it is further preferred that such limited editions are made with about 1800 or fewer copies, it is even more preferred that such limited editions are made with about 1000 or fewer copies, it is more desirable that such limited editions are made with about 500 or fewer copies, and it is most preferred that such limited editions are made with about 380 or fewer copies. However when the use of a particular mold is required for making inventive images of fine art with both visual and utilitarian functions in such limited editions, and said mold is destroyed after it is used to make such a limited edition, it is preferred that these limited editions have about 4000 or fewer copies, it is further preferred that they have about 3500 or fewer copies, it is more desirable that they have about 2500 or fewer copies, and it is most preferred that they have about 1500 or fewer copies.

It is preferred that during its first 75 years of existence, a limited edition design image of the present invention has about 1500 or fewer copies, it is further preferred that such a limited edition design image has about 1000 or fewer copies, it is more desirable that such a limited edition design image has about 700 or fewer copies, it is most desirable that such a limited edition design image has about 500 or fewer copies, and it is most preferred that such a limited edition image of design has about 380 or fewer copies. However when the use of a particular mold is required for making design images of the present invention in such limited editions, and said mold is destroyed after it is used to make such a limited edition, it is preferred that these limited editions have about 3000 or fewer copies, it is more preferred that they have about 2500 or fewer copies, it is more desirable that they have about 2000 or fewer copies, and it is most preferred that they have about 1500 or fewer copies. It is preferred that during its first 75 years of existence, a limited edition architectural image of the present invention be made with about 4 or fewer copies, it is more preferable such a limited edition have no more than about two inventive images, and it is most preferable that such a limited edition only have one image. However when the use of a particular mold is required for making architectural images of the present invention in such limited editions, and said mold is destroyed after it is used to make such a limited edition, it is preferred that these limited editions have about 8 or fewer copies, it is more preferred that they have about 6 or fewer copies, it is more desirable that they have about 4 or fewer copies, and it is most preferred that they have about 2 or fewer copies.

"Mark", "marks", or "marking" refers to the application of coloration to an image.

As used herein, the term "objecthood" is the quality or state being perceived as an object like other objects in the real world that are not images. Those images that are perceived as other objects are perceived are said to have objecthood. Many images do not have objecthood because they are perceived differently than other objects in the real world. For example traditional rectilinear paintings on canvas are not perceived as other objects are perceived; viewers are conditioned to perceive them as artistic statements, ignoring the real 3D depth of the stretchers, thus they are not evaluated on the same terms as other objects are.

"Permanence in art and design" as used herein refers to the stability of an image over time in an environment which has normal changes, not extreme ones. It is the acceptable, repairable, restorable, and natural aging of an image of art or design that does not affect its meaning or its integrity, and often is considered part of its beauty and its meaning. Permanent image making ingredients and processes, and permanent images are both those that change so slowly that their changes are not detectable to the human eye, and those which change in ways that do not affect their integrity or their meaning.

"Principle of Whole Development and Unity" as herein refers to a conventional image making concept whereby images are considered strongest when they are formed in a process in which all of their formal elements are developed in concert or united. This principle refers to image making with the ability to make an image in such a process, whether this ability is fully exercised or not. Developing an image in concert means that the interrelationships between all of its formal elements, and the relationship between each of its formal elements and the image as a whole, can be fully considered, worked, reworked, controlled, and interwoven, to the extent desired and in the manner desired, throughout that image's entire development. Thus, the image can be strengthened as desired by unifying it as desired. In comparison to image making according to the Principle of Whole Development and Unity, completing part of an image significantly before another part may risk forming an image which is not as strong and not as unified as it might have been. As an illustration, when painting a conventional portrait, finishing the face first, before the background or the figure's body are considered or developed at all can result in an image which is not as strong or as unified as a portrait in which the face, the background, and the figure's body are all considered more or less in terms of one another.

Developing all aspects of an image in concert as desired, and integrating it into as unified of a whole form as desired only means that image makers have the ability to develop and integrate images as desired. It means that the development and integration of the image is the result of the image maker's free consideration and choices, rather than the result of an image maker trying to do his or her best within, despite, or trying to dodge limitations, problems and undesirable issues which might have altered his or her vision for the image. Not developing aspects of an image can be as much of an expression the image maker's vision in the specific image formed, as the aspects of that image that are developed and integrated.

As used herein, "reworking" refers to changing an image after it has been formed or completed.

"Seepage" refers to cPRM that leaks or runs past the area or the barriers provided for it to polymerize within, as well as the hardened polymer this cPRM forms.

As used herein, the term "SSI" refers to those small surface irregularities which are expressly made for or used for forming, assisting, or fortifying mechanical bonds in inventive images. SSI may partially or entirely, continuously or discontinuously cover one or more of the surfaces in contact in forming or fortifying a mechanical bond in an image. Examples of SSI are those small surface abrasions, fine textures, surfaces with small irregularities, undercut surfaces, porous surfaces, small surface perforations, other such surfaces, and combinations of these, that form, assist, or fortify a mechanical bond. Surface irregularities on inventive images that are medium sized and large (such as abrasions, textures, perforations, undercuts, etc.), are referred to herein as large surface irregularities. Small surface irregularities on inventive images that are not for the purpose of a mechanical bond, are not SSI, even though they may be identical or similar to SSI, they might even be different areas of a continuously abraded image that also has SSI on it. Small surface irregularities that are not SSI are referred to herein as small surface irregularities. SSI are only those small surface irregularities that can easily be filled in by one or a few superimposed applications, or those small surface irregularities that can easily be removed by processes of removing matter from inventive images. Small surface irregularities might, for example, be on an inventive image for aesthetic or utilitarian purposes, such as texture, perforations, indentations, scratches, undercuts, incised marks, carving, sandblasting, beadblasting, embossing.

The term "stabilizer" as used herein, refers to any object, compound, component, or action that imparts chemical, mechanical, or dimensional stability to an item, either directly or indirectly, through initiation of one or a series of events or intermediate steps, in the formation of an image. Stabilizers include processing aids, as well as materials that reduce or eliminate changes to a polymer image after it has been formed. Moreover, an inventive image may have more than one stabilizer, which may be similar or different. Often a single stabilizer affects more than one property in cPRM or in the polymer. Typically, the stabilizer includes less than about 40% by volume of the total volume an image.

One class of stabilizers that are particularly useful in the present invention are color stabilizers, such as those that reduce or eliminate discoloration of polymers. Examples are ultra violet light stabilizers, ultra violet light absorbers, and hindered amine light stabilizers (HALS).

Other useful stabilizers are ingredients added to cPRM i) to cause surfaces of the cPRM exposed to air during the polymerization reaction to form smooth surfaces; or ii) to promote the complete curing of the cPRM. When added to cPRM, wax or mixtures containing wax (such as SILMAR®'s A-111, mixtures of monomers and wax, encaustic paints, other conventional painting media with wax ingredients, and mixtures of wax and a solvent) are examples of stabilizers that can fulfill both of these functions. Compositions superimposed upon incompletely cured polymer surfaces that further cure or fully cure them are stabilizers. Methyl ethyl ketone peroxide (MEKP) can function as such a stabilizer.

Still further useful stabilizers include layers and parts that strengthen, reinforce, support, or enhance the support of an inventive image, such as layers and parts that enhance an image's strength, its stability, its form, or its structure, e.g., so that the image can be set up, installed or displayed for viewing. These layers or parts are on or in the polymer in an inventive image. Though some of these stabilizers are non polymeric, it is preferable that many stabilizers in this class be polymeric. Also, it is often desirable that inventive images with these strengthening stabilizers have one or more additional, different stabilizers, such as a stabilizer that preserves the color stability of the polymer or a processing aid stabilizer, depending on the specifications of individual inventive images. Examples of these strengthening stabilizers follow.

(a) Fiber, such as fiberglass like surfacing veil fiberglass, and fabric fibers. It is preferred that transparent or translucent conventional fabric (such as shims) that, to the unaided human eye does not have an open weave, that is superimposed by transparent or translucent cPRM that becomes discolored (e.g., yellow or amber discoloration of a polymer caused by exposure to ultra violet light that appears within 3 years of the polymer's formation) is not used.

(b) The new unique means of installation and display described herein are in this class of stabilizers, such as the new rigid mount system, the new wire mount system, and the new combination rigid and wire mount system described herein;

(c) Other members of this class of stabilizers are types of 2D and 3D image supports used on or in a polymer in inventive images. It is often preferable that these stabilizers be polymeric. Among the many variations of these stabilizers are some of the examples which follow on this list;

(d) rigid layers or parts on or in the polymer that strengthen the polymer;

(e) layers including a strong polymer such as a cross linked polymer on or in a polymer in an inventive image that is less strong, the use of which makes the image stronger, more stabile, function more effectively, or more permanent;

(f) layers or parts on or in the polymer, that are or that function as backings, frames, stretchers, crossbars, reinforcing ribs or struts, lead lines (e.g., as in glass works), mats, and frameworks used to reinforce and strengthen conventional images;

(g) a layer or part (such as a substrate, an internal layer, or an external layer) that provides or enhances the support of a polymer part or layer which in its use in an inventive image, is weak or not strong, fragile, flexible, delicate, brittle, gelatinous or somewhat gelatinous, or at risk to change over time in form, structure or surface, such as a substrate supporting a conductive polymer or an absorbent polymer in an inventive image, or a rigid part that enhances the structure of flexible polymer in an inventive image;

(h) more than one of these examples (a)-(g) used on or in a single inventive image;

(i) a strengthening stabilizer with a form that is a combination of two or more of the forms described in examples (a)-(g) used in and/or on an inventive image.

Other types of stabilizers that are useful in the present invention include moisture scavengers; antioxidants (such as 2,6-di-tert-butyl-4-methylphenol as well as CYANOX® antioxidants by Cytec Industries Inc.; WESTON® and ULTRANOX® antioxidants by General Electric Company; and IRGANOX® LC Blends by Ciba Geigy); materials that remove bubbles from and/or defoam cPRM (such as BYK®-A 555 by Byk Chemie); antiozonants (such as Santoflex 1350PD by Flexsys America LP); leveling agents (such as wax or mixtures containing wax, as well as leveling agents marketed by Byk Chemie); optical brighteners and other compositions that absorb ultraviolet light and fluoresce in the visible blue spectrum (such as UVITEX® OB by Ciba Geigy); cPRM viscosity modifiers and associative thickeners (such as AEROSIL® by Degussa Corp.); and polymerization regulators for example, inhibitors (such as free radical inhibitors).

Other stabilizers protect polymer inventive images or parts thereof against changes in physical properties, or enhance physical or mechanical properties, dimensional stability, or heat resistance of polymer inventive images. Examples are stabilizers that enhance the physical or mechanical properties or the dimensional stability of absorbent polymers, such as ingredients used in absorbent polymers and in cPRM forming absorbent polymers that make them less gelatinous, stronger, or more solid. Other examples are stabilizers for use in inventive images that protect polymers or parts thereof (such as their surfaces) against delamination, peeling, chalking (e.g., pigment washes or rubs off), other reduced adhesion of the primer or top coat, cracking, checking, the loss of coating integrity, loss of surface gloss, loss of surface distinctness, loss of visual depth, or other surface degradation (such as HALS by Ciba-Geigy). There are stabilizers that affect mar resistance, surface slip, or surface flow (such as products by Byk Chemie and by Tego Chemie). There are impact modifier stabilizers (such as METABLEN® products by Elf Atochem); stabilizers that are plasticizers or that maintain or enhance polymer flexibility (such as dibutyl phthalate); and stabilizers that maintain or enhance the hardness of polymers or parts thereof. There are stabilizers that inhibit or protect against organic corrosion in polymers or deactivate metal (such as IRGACOR® by Ciba Geigy). There are thermal and heat stabilizers both for processing polymers and for protecting formed polymers (such as THERMOLITE® by Elf Atochem North America Inc., in Philadelphia, Pa.). There are stabilizers used in cPRM to control shrinkage as it cures (such as milled fibers). An ingredient added to polymerization reaction mixture or to a polymer to modify the polymer's absorbency is also a stabilizer.

The formation of some polymers typically requires certain stabilizers. For example, specific stabilizers are typically required for the formation of conductive polymers such as those conductive polymers that emit light. Both the process of doping or treating a polymer so that it becomes conductive or more conductive, and the dopant or agent used in such processes are stabilizers. For example, a polymer might be doped so that electrons are removed such as through oxidation (e.g., with chlorine, bromine, or iodine vapor) or so that electrons are introduced such as through reductive doping (e.g., with an alkali metal). Energy conducted by a conductive polymer is a stabilizer in any form, as is the form or device that can supply or carry that energy. Used with a conductive polymer in an inventive image, electrical current, solar power or another form of energy, a battery, and wires that carry energy to a conductive polymer are stabilizers. Moreover, spin casting processes and printing processes (such as ink jet printing) used to apply conductive polymers to image supports, other inventive image surfaces, or parts thereof, are also stabilizers. Stabilizers aid in processing polymers using conventional practices, e.g., affecting melt flow, lubricating, overcoming notch sensitivity (such as BLENDEX® Modifier Resins by General Electric Company and IRGANOX® HP products by Ciba Geigy).

In some embodiments, PRM is radiation cured, for instance, by the use of ultraviolet light or nearby blue light, or by electron beam (EB). Radiation that initiates or aids polymerization is a stabilizer. Thus, for example, visible light is a stabilizer with the photoinitiator camphoriquinone.

One or more ingredients that enable the formation or fortification of the bond between the polymer inventive image and at least one superimposed application or colorant are stabilizers. When mixed into cPRM typically in amounts of about 0.4% to 40% by volume of the total volume of the cPRM, conventional paints, sizes, primers, binders used in conventional image making media and materials, conventional media for painting, absorbent polymers, cPRM or PRM that forms absorbent polymers, and wax and compositions containing wax, can be stabilizers if they enable the formation or fortification of the bond between the polymer and one or more superimpositions made upon it. Examples of such stabilizers are conventional oil and acrylic paints and painting media.

The use of opposing charges can also enable the formation or fortification of a bond. Thus, the use of a negatively or a positively charged monomer stabilizer in a neutral cPRM can enable the formation or fortification of a bond between the polymer formed and an oppositely charged superimposed application, such as a paint, an ink, or another colorant. Such negatively or positively charged monomer stabilizers are preferably used in a neutral cPRM at about 0.4% to 40% (by volume), preferably at about 0.5% to 10%, and more preferably at about 0.5% to 6%. Adhesion promoters such as products made to promote the adhesion of a polymer to a substrate, may also be used as stabilizers in inventive images, such as adhesion resins by Creanova Inc.

Other stabilizers are ingredients added to applications made on polymer inventive images, typically in amounts from about 0.4% to 40%, by volume, but more preferably in amounts from about 0.4% to 25%, by volume of the application's total volume, (i) to cause or enhance the bond between that application and the polymer inventive image; or (ii) to further cure or fully cure the polymer inventive image onto which it is applied. Examples of such stabilizers are cPRM, solvents appropriate for the linear polymer surfaces they are superimposed upon, MEKP, photoinitiators, and other catalysts. Such stabilizers might be mixed into applications, for instance into a conventional image making material or medium (such as a conventional paint, a painting medium or paper pulp); into an unconventional image making material or medium; or into a glue or adhesive.

Surface preparation stabilizers are preferred stabilizers. A single inventive image may have one or more surface preparation stabilizers. The formula, y–about 40=about 0.786x, is a preferred linear relationship between "x", the approximate percentage of polymer in the inventive image's surface preparation stabilizers (by volume), and "y", the approximate maximum percentage of surface preparation stabilizer in the inventive image's total volume. Thus, for example, if there is no polymer in the surface preparation stabilizer in an inventive image, this stabilizer includes less than about 40% of the inventive image's total volume. If an inventive image's surface preparation stabilizer is made of about 35% or more polymer, it includes less than about 67.5% of the inventive image's total volume. If an inventive image's surface preparation stabilizer is made of about 70% or more polymer, it includes less than about 95% of the inventive image's total volume.

One kind of surface preparation stabilizer is a composition on the surface of an inventive image or part thereof that (i) causes or enhances bonding to one or more superimpositions;

or (ii) functions as an underlayer for further processing by additive or subtractive processes (e.g., as a primer, as underpainting, as underdrawing, as a ground, or as an imprimatura). In completed inventive images, surface preparation stabilizers are at least in part superimposed by one or more compositions that are different from the surfaces they superimpose or different from the polymer beneath the surfaces they superimpose. In addition, or alternately, in completed inventive images, surface preparation stabilizers are at least partially carved, incised, or both. Such surface preparation stabilizers are typically made using polymers that may be carved or incised effectively, e.g., they used on image surfaces that cannot be carved or incised as effectively. Surface preparation stabilizers might contribute to inventive images aesthetically or structurally prior to further processing them.

Surface preparation stabilizers and the surfaces or image supports they are used upon may or may not be made or entirely made of polymers of the present invention. Surface preparation stabilizers may be continuous or discontinuous on part or all of one or more inventive image surfaces. For example, a surface preparation stabilizer on a polymer inventive image might be an imprimatura made of a composition that is not a conventional paint, serving as an intermediary enabling a superimposed conventional paint to bond to that polymer that might not have bonded or bonded as strongly to that polymer had it been applied directly onto its surface. The same surface preparation stabilizer or a different one might enable an inventive image to have a carved or incised drawing, pattern, or texture. Depending on their use in an inventive image, one or more conventional image making materials, media, or both may serve as a surface preparation stabilizer, such as conventional paints, binders, primers, etc. A mixed polymer may be a surface preparation stabilizer. Bonding spots and Separating Layers can be surface preparation stabilizers. Separating Layers may have surface preparation stabilizers on them.

Another kind of surface preparation stabilizer is SSI on a polymer inventive image surface. Whether they are continuous or discontinuous on a polymer surface, SSI are a surface preparation stabilizer, provided they are partially or entirely, yet directly superimposed by: (i) a conventional image making medium (such as paint, ink, pencil, pastel, chalk, pen, crayon, a photographic emulsion, printing, another marker); (ii) a colorant with an unconventional vehicle (such as a paint made with cPRM as its binder); (iii) a conventional or an unconventional underlayer (such as underdrawing, underpainting, a primer, an imprimatura or a ground); or (iv) a combination of these. Thus, for example, SSI superimposed by media or materials for the sole purpose of bonding are not stabilizers, and SSI superimposed by protective coatings, fixatives, or sealers are not stabilizers.

Image support stabilizers are both a class of stabilizers and a type of image support. Inage support stabilizers are either made to bond to at least one superimposition (such as a paint or ink). Or image support stabilizers are comprised of a polymer composition which by its formulation or design, works well with one or more subtractive processes (such as cutting, carving, or incising). For example, polymers made for subtractive processes involving the use of tools that would be ineffective on linear polymer surfaces would typically be made of crosslinked polymer formulations (e.g., tools that heat up as they are used so that their bits or blades get clogged by the linear polymer). Image supports made of greater than about 85% (by volume) polymethyl methacrylate or methyl methacrylate, which are exact, even geometric shapes or forms (like conventional preformed acrylic sheets, rods, cubes, or spheres) and which are preferably transparent or translucent, are typically not image support stabilizers, unless for example, they have surface preparation stabilizers on them made of a different composition (preferably polymeric) in which case they might be image support stabilizers. Also, conventional polymer image supports in the form of sheets and films that are preferably transparent or translucent, are typically not image support stabilizers, (e.g., acetate, MYLAR® and vinyl have all been made into images by cutting), unless for example, they have surface preparation stabilizers on them made of a different composition (preferably polymeric) in which case they might be image support stabilizers.

One kind of image support stabilizer includes at least one polymer that is a transparent polymer or a synthetic translucent polymer. Typically, the volume of these image support stabilizers has a percentage of transparent or synthetic translucent polymer that is at least about 51%, preferably at least about 55%, more preferably, at least about 65%, still more preferably at least about 75%, and most preferably at least about 85%, in different embodiments. Another kind of image support stabilizer includes at least one polymer that is a synthetic absorbent polymer or a conductive polymer. Yet another kind of image support stabilizer includes a surface preparation stabilizer superimposed on at least a substantial portion of at least one surface of an image support.

Separating layer stabilizers are another kind of image support stabilizer. These are substantially planar polymer layers that are at least partially transparent or translucent. The two, planar, opposite sides of a separating layer stabilizer are made to separate superimposed applications, other colorants, carving, incising, or other marking. Thus, for example, separating layer stabilizers enable applications, other colorants, carving, incising, or other marking to be added to inventive images in unlimited layers, without having to be created directly on one another. Separating layer stabilizers may contain non polymeric ingredients, or other stabilizers. The compositions of applications or other colorants separated by a separating layer stabilizer must be different from that of the stabilizer, though they may be the same as one another. It is preferable that applications separated by a separating layer stabilizer be bonded to it. Conventional polymer image supports are typically not separating layer stabilizers without an additional stabilizer or additional polymer of the present invention (e.g., sheets and films of polyester, MYLAR®, acetate, and acrylic). As an example, in forming an inventive image, one or more separating layer stabilizers are used to separate layers of paint and incising. This separating layer stabilizer might, for example, be electrically active or comprised of a conductive polymer such as a polymer LED.

Image support stabilizers that are not separating layer stabilizers are typically the principal element in their inventive image's shape or form, and they typically remain so in the completed image. Of the completed inventive image's total volume, image support stabilizers typically comprise about 51% to 100%, preferably about 55% to 100%, more preferably about 65% to 100%, still more preferably about 70% to 100%, and most preferably about 75% to 100%, in different embodiments. Image support stabilizers which are not separating layer stabilizers are often part of their image's structure also. Among examples are image support stabilizers made using rigid polymers, and image support stabilizers made using flexible polymer, that may for example, be bonded to one or more other polymeric or non polymeric elements that provide structural support. An image support stabilizer may therefore be an inventive image's principal structural element, its entire structure, or almost its entire structure. In another example, flexible image support stabilizers can rely on another image part or on their method of installation or display for structural support to any degree, (e.g., a flexible image support might be draped over another image part or over a pedestal).

Image support stabilizers made to bond to at least one superimposition are typically, at least partially superimposed by at least one bonding composition that is different from their composition. Image support stabilizers made for further processing using a subtractive process are typically further processed as such. Image support stabilizers may be made of one or more polymers. If desired, image support stabilizers may have one or more other stabilizers as ingredients (e.g., they may have one or more fiber stabilizers, UV light stabilizers, doped conductive polymers, electrodes for conductive polymers, or surface preparation stabilizers). As an example, an inventive image support stabilizer might be a 2D or 3D transparent or translucent polymer form that bonds to a superimposed conventional paint, or that can be effectively incised or carved using a hand held tool. Typically, image support stabilizers that are not separating layer stabilizers do not have their function as the image's principal shape or form changed as they are processed.

It is preferable for image support stabilizers to be made with a percentage of one or more conventional polymer image supports or other conventional polymer image making media (e.g., conventional acrylic paints, gels, or sheets, or a conventional polymer film like acetate, MYLAR® or Denril made by Borden and Riley Paper Co. Inc. in Hollis N.Y.), which is up to about 60%, preferably up to about 55%, more preferably up to about 50%, still more preferably up to about 45%, still more preferably up to about 40%, still more preferably up to about 35%, still more preferably up to about 30%, and most preferably up to about 25%. Moreover, it is often desirable for image support stabilizers to be made without conventional polymer image supports or without other conventional polymer image making media with the exception of conventional polymer paints like acrylic paints. If the polymer in an image support stabilizer is comprised of a percentage (by volume) of one or more conventional polymer image making media that is preferably greater than the amounts listed above, then (a), (b) and/or (c) are typically preferable: (a) at least one stabilizer that is not an image support stabilizer (such as a fiber stabilizer, a color stabilizer like a UV light stabilizer, a doped conductive polymer, electrodes for a conductive polymer, or a defoamer stabilizer), is preferably added to the conventional polymer as part of the image support stabilizer; (b) the inventive image preferably has at least one other stabilizer that does not include conventional polymer image making media (in addition to this image support stabilizer), and/or (c) the image support stabilizer preferably also contains polymer of the present invention or the conventional polymer medium is not included in the calculation of the total polymer in the image support stabilizer.

In addition, it is generally preferable for an image support stabilizer to contain at least one stabilizer that is not an image support if the percentage (by volume) of one or more preformed conventional polymeric materials with exact, even geometric shapes or forms (like conventional polymer sheets, films, rods, bars, cubes, bowls, or spheres) used in the image support stabilizer is greater than about 65%, preferably greater than about 50%, more preferably greater than about 30%, still more preferably greater than about 18%, and most preferably greater than about 8%.

Underlayers, such as underpainting, underdrawing, grounds, imprimatura, primers and sizes, are one or more beginning or preparatory layers applied on an image surface with the intention that they will be partially or entirely superimposed (e.g., by painting), though they may remain visible or partially visible and contribute to its aesthetic. Both conventional underlayers and new and unique underlayers are used on inventive images. For example, surface preparation stabilizers, and separating layers (stabilizers) can be underlayers.

"Value" refers to the degree of lightness or darkness (or shadow) of a color. A color can have a high intensity and a dark value, or a low intensity and a light value.

"Vehicle" as used herein, refers to all liquid and all semi liquid (e.g., gel) contents of a paint, such as its binders, and its additives, but excluding all pigments and all dyes. Pigments and dyes are commonly dispersed or dissolved in a vehicle.

"What you see is what you get" ("WYSIWYG") refers to image making processes wherein work that is being done on an image is visible as it is being done, as it will be visible once it is complete. Processes, formats, materials, or media that are not WYSIWYG are those that will change visually, between the time of their use and the time when they are completed, e.g., when they set, dry, harden, cool, cure, are superimposed.

Inventive images are works in progress and images of art and design and include:

a) Images that are recognizable as one or more known forms of art or design, such as realistic, photorealist, abstract, geometric abstraction, surrealist, expressionist, minimalist, graffiti art, still life, figurative, portrait, landscape, modernist, folk art, primitive art, kitsch, shaped painting, installation, construction, painting, sculpture, mobile, print, photography, drawing, collage, assemblage, graphic art, architecture, furniture design, jewelry design, interior design, fashion design, product design, craft, set design, costume design, or a combination thereof.

b) Images that are recognized as art or design by a curator with proven expertise in contemporary art at an American museum of art which is accredited by the American Association of Museums or by an art scholar or an art critic with proven expertise in contemporary art.

c) Images that are original art or design.

d) Images that are interpretations, statements, expressions, or combinations of these.

e) Images that have an aesthetic that is at least minimally apparent.

f) Images that function as one or more known forms of art or design.

g) Images that are recognizable as creations by a specific individual, such as images recognizable as creations made in a specific circumstance or condition which are not ordinary circumstances or conditions.

h) Images made in limited editions, e.g., in an edition of one, preferably during their first 75 years of existence, in an edition of less than about 1500, more preferably less than about 500.

A typical process of the present invention involves the preparation of a 2D or 3D image by (i) preparing a mold or image support; (ii) preparing a PRM of one or more materials capable of forming a polymer, with other ingredients if desired; (iii) adding at least one catalyst to the PRM before or after it is put on the mold or image support; (iv) before or after the previous step or the step which follows, optionally adding at least one stabilizer to the PRM, to the cPRM (liquid or gelled), or to the polymer; (v) putting the PRM or the cPRM on at least one part of a mold or image support, made of polymer, wood, paper, stone, ceramic, metal, fabric, or glass. The inventive image making medium typically provides a shape or a form to the image.

Desirably, at least a part of an inventive image is transparent or translucent. It is typically desired that inventive images are permanent. For example, it is preferred that coloration of inventive images does not substantially change undesirably over time. For instance, over time changes such as a yellow or amber color develop on some polymers. To the extent that such changes or their effects are visible and undesirable, these polymers are not desirable for use in inventive images. It is generally desirable to use one or more stabilizers to enhance the permanence of inventive images.

After its initial polymerization, the polymer formed might for example, be the complete inventive image. Alternately, the polymer might be a work in progress that can be further developed or controlled to the extent as desired. Whether the inventive image is further processed and how it is further processed is at the sole discretion of its image maker. The inventive image can be processed in innumerable ways as desired. For instance, the polymer work in progress can be further processed repeatedly, in a myriad of ways, in any sequence, and over any period of time (continuously or otherwise). For example, its formal elements (such as its form, structure, coloration, light and spatial depth), can be reworked as desired and to the extent desired. It is likely that reworking any one of its formal elements will have at least a minimal effect on at least one of its other formal elements, such as just changing its form, might affect its structure, its color, its use of light, its function, its subject matter, its meaning, etc.

Typically, the amount of polymer in the total volume of an inventive image is at least about 5%, preferably at least about 10%, more preferably at least about 25%, still more preferably at least about 35%, and most preferably at least about 45%, in different embodiments.

Polymer of the present invention typically provides or enables an inventive image to have at least one aesthetic element. As such, polymer of the present invention is either a part of the inventive image or comprises the entire inventive image. Polymer of the present invention is not typically just a very thin, continuous, uniform, clear, colorless coating, covering, sealer, fixative, or varnish on an image that would be aesthetically complete without it. When the only polymer in an inventive image is a transparent or translucent external layer having a stabilizer that is not an image support stabilizer, and the external polymer layer has (a) and (b), described below, its typical thickness is at least about 0.2 cm, preferably at least about 0.3 cm, more preferably at least about 0.45 cm, still more preferably at least about 0.6 cm, still more preferably at least about 0.8 cm, and most preferably at least about 1.0 cm. (a) At least about 35% of the volume of the shape or form of the external polymer layer covers the image continuously, preferably at least about 50%, more preferably at least about 65%, still more preferably at least about 85%, and most preferably at least about 95%, in different embodiments. (b) At least about 60% of the volume of the external polymer layer has coloration or a lack of coloration that is uniform, but preferably at least about 75%, and more preferably it is at least about 80%.

In another embodiment of the present invention, the only polymer in an inventive image is a discontinuous transparent or translucent external polymer layer with a stabilizer, that is not an image support stabilizer. For example, such a discontinuous external layer of polymer might be carved, incised, embossed, embedded, inlaid, made of discontinuous applications (such as broken color or linear applications), colored discontinuously, or comprised of attachments, such as LEDs. Such an external polymer layer may be of any thickness or may vary in its thickness, e.g., its design may require that it be at least a certain thickness. If such a discontinuous external polymer layer is made with at least one conventional polymer image making medium and a stabilizer, and the percentage (by volume) of conventional polymer image making media in the external polymer layer is typically greater than about 25%, preferably greater than about 35%, more preferably greater than about 50%, and most preferably greater than about 65%, (c), and/or (d) are often preferable: (c) at least about 30% of the discontinuous external polymer layer is at least about 0.5 cm thick and preferably at least about 0.8 cm thick; and/or (d) it is often preferable for the inventive image to contain polymer of the present invention in another location or for the conventional polymer image making medium in this external layer not to be included in the total calculation of polymer in the inventive image.

In some embodiments, in which inventive images are made with an internal layer of polymer that is not an image support stabilizer, comprised of at least one conventional polymer image making medium and a stabilizer, and the percentage (by volume) of conventional polymer image making media in the internal polymer layer is typically greater than about 35%, preferably greater than about 50% and more preferably greater than about 60%, it is desirable that such inventive images have polymer of the present invention in another location (e.g., in another layer or in another part that may or may not be physically connected), or that the conventional polymer image making media are not included in the calculation of the image's total polymer. This preference is less desirable if: (e) the internal polymer layer's thickness is greater than about 0.15 cm, or preferably greater than about 0.2 cm, or more preferably greater than about 0.26 cm; and/or (i) the volume of the internal polymer layer's shape or form is typically at least about 40% discontinuous, preferably at least about 50% discontinuous, more preferably at least about 60% discontinuous, and most preferably at least about 70% discontinuous; and/or (g) there is inconsistent, non-uniform coloration or lack of coloration in at least about 70%, preferably at least about 80%, and more preferably at least about 90% of the total volume of the internal polymer layer.

In general, formal elements of an inventive image, can be used, or the choice made not to use them, more freely, more completely; with more workability, reworkability and control; and more in the manner desired, than in making most kinds of conventional images.

The following description of preferred embodiments of the present invention is generally arranged into sections, however, just as the formal elements are interrelated, these sections overlap. For instance, an embodiment in the "Process of Creation" section might also be an example of a process for developing and controlling an image's spatial depth, light and color. The use of one formal element in an inventive image can affect or even determine one or more of its other formal elements. Often, the workability, reworkability and controllability, offered by the artistic medium of the present invention enables image makers to use and to control the effects that work done to one formal element of an inventive image has on one or more of its other formal elements, to a far greater extent than is possible in conventional images.

Previously unknown to image makers and others, the inventive medium and inventive images offer new unique direct solutions to known limitations, problems and undesirable issues in conventional image making and images which are rooted at the heart of the formal elements, the most fundamental building blocks of images. Thus, in many examples, goals which have been sought but which could not be achieved in conventional images, can now be realized in inventive images. The new unique solutions offered by the present invention can expand image making and images profoundly. These are 24 examples. 1. While many kinds of conventional images are typically not fully workable, reworkable and controllable, inventive images typically can be. 2. While conventional practices do not always permit the free use of the Principle of Whole Development and Unity, the inventive medium typically does. Thus for example, the structure, the form, the use of light and the surface(s) of an inventive image can typically be considered, formed and unified as desired. 3. Whereas image makers often have to conform their thinking processes, their creative processes, their ideas, and their visions to a variety of limitations, problems and undesirable issues in order to make conventional images as desired, the image making processes of the present invention offer significant freedom from such restrictions. Typically, with the present invention: a) the thinking processes and the creative processes of image makers do not have to conform to such limitations at all or to such a great extent; b) image makers can develop their processes, their ideas and their visions spontaneously or as spontaneously as desired, e.g., as inventive images are formed, c) image makers can realize their ideas and their visions in inventive images, and d) image makers can often have greater control over the meaning of their images. 4. Whereas making and reworking the forms, shapes and structures of conventional images are often limited, problematic and burdened by undesirable issues, the present invention offers freedom from such. For example, using the present invention, the forms, shapes and structures of images can typically be formed as desired, within an enormous array of possibilities, using a wide variety of processes, (such as making images in layers, in parts, in one stage, in multiple stages over any period of time, combinations of these, etc). As another example, the present invention overcomes prior limitations in creating and affecting an image's form, shape and structure such as limitations in size, scale and dimensions; weight; balance; use of negative space; Compositional Arrangement; proportion; ingredients; physical attachments; and the like. 5. While desirable, conventional see-through images have been limited. The present invention enables a vast range of see-through images to be made with unprecedented creative freedom. 6. The present invention expands the use of coloration in images, e.g., the workability, reworkability and controllability of coloration in images; and the use of coloration with real spatial depth and real light in images. 7. The present invention expands the use of light in images. Inventive images can even use light in new unique ways, a number of which can not be done in conventional images and a number of which are desirable, important and valuable new effects in images, e.g., the present invention offers new uses of real light, of light and color, and of light and spatial depth in images. 8. Layering can typically be done in inventive images as desired, with the workability, reworkability, controllability, strength and permanence desired. Layering can even be done in inventive images as never before, e.g., the number of layers used to form an inventive image can be substantially unlimited. Layering in the inventive images can also form new and unique effects. 9. In contrast to the limitations, problems and undesirable issues inherent in using attachments (such as attached parts and inlays) in many kinds of conventional images, typically attachments are readily added to inventive images as desired, with workability, reworkability and controllability, for a myriad of different effects. 10. Whereas the use of real variable spatial depth in many kinds of conventional images is limited, problematic and burdened by undesirable issues, the inventive medium typically provides real variable spatial depth which is workable, reworkable and controllable as desired, and which offers a myriad of aesthetic options, many of which are not available in conventional images. 11. Inventive images can typically be made with strength and/or permanence not possible in comparable conventional images, which can be formed, controlled, maintained and changed as desired, using a variety of means, methods and manners, during or after an inventive image's initial formation.

12. The present invention expands the use of air pockets and embedding in images as well as the ability to form objects and devices within images. 13. The inventive medium can successfully produce images that have a vast range of special qualities and effects, many of which are new and unique, and some of which have never been possible in images before. Furthermore, special qualities and effects can typically be formed, reworked and controlled as desired in inventive images. Examples are special qualities and effects in inventive images involving the use of space, color, the perception of light, weight, balance, reality and illusion, movement, time, etc. 14. The inventive medium being typically workable, reworkable and controllable as desired, permits a wide range of experimentation, a substantial portion of which has never been done before. 15. While inventive images often need not be sealed, fixed, coated, covered or protected, they can be, as desired. 16. Whereas some uses of some of the formal elements available, desired or needed to form conventional images (e.g., some uses of real light, real transparency, real translucency, and real spatial depth), impose limiting, problematic, and undesirable specifications on the method, the manner and the means of their presentation, set-up, installation, display, and/or exhibition, the inventive medium offers ways to overcome such limitations which can result in new and unique images. For example, because inventive images can use real light in new ways, they no longer have to be lit according to conventional practices (though they can be), and because inventive images (such as 2D images like paintings, prints, and drawings) can be made with new shapes, forms, structures and/or a new sense of objecthood, they no longer have to be presented, set-up, or displayed according to conventional practices. 17. Inventive images can be made which function in ways which comparable conventional images cannot be made to successfully function. 18. Though inventive images can use reality and illusion as these have been used in the past, in addition or instead, inventive images can use these formal elements in ways that are new and unique. For example, inventive images can use real formal elements (such as real light and real space), to produce new and unique illusions. Inventive images can be produced without relying on illusions, or without illusions. 19. Inventive images can often have the quality of otherness (even inventive images which look conservative). This is a desired, useful quality that is limited using conventional practices. 20. The inventive medium expands the use of objecthood in images substantially. The use of objecthood in inventive images can even give them new and unique qualities. 21. The inventive medium opens up possibilities for new unique images within known art forms, expanding art forms in ways which could not be comparably done heretofore. 22. While the use of formal elements to form conventional images is often problematic, the inventive medium offers new and unique, direct solutions. The inventive medium expands the use of the formal elements, e.g., 3D inventive image paintings can be made using color with real light and real spatial depth that have no illusions. 23. The inventive medium permits the image maker to dematerialize volume in images in new and unique ways and in ways that go beyond that which is possible in conventional images. 24. Inventive images can typically be made as easy to care for as desired. Conservation work can typically be done on inventive images (on both their polymer parts and non polymeric parts they may have).

The following are examples of general ways formal elements can be used in inventive images. (a) They can be used the same way as have been used in conventional images. The resulting inventive images may be like conventional images or they may differ to any extent. For example, light can be depicted illusionistically in inventive images. (b) Inventive images can use formal elements in a way that are similar to, but not the same as, in conventional images. For example, light can be depicted illusionistically in inventive images using layers of polymer. (c) Inventive images can use formal elements in new ways that resemble conventional images. For example, a polymer image support can be painted on its reverse side for viewing through its unpainted front, clear and colorless side and thus function as a reverse painting on glass. But this inventive image can be stronger, and more permanent than comparable conventional images, and it can have a wider range of optical properties such as light properties if desired. (d) The formal elements can be used in inventive images, in ways that are similar to, or that relate to, conventional uses, but which are also new and unique. For example, conventional techniques and processes, can be used in combination with unique effects of the present invention. (e) The formal elements can be used anew in inventive images to create unique, novel effects. For example, an inventive image painting can be made using paint with light from its see-through polymer form, that may have light effects within its colored or colorless layers from one or more prisms, electroluminescent lamps (EL Lamps), LEDs, conductive polymers, photochromic layers, photographic transparencies, or reflective ingredients none of which are comparably possible using conventional practices. (f) The formal elements can be used in a single inventive image in a combination of these ways.

Inventive images can, if desired, have one or more other ingredients and processes in addition to a polymer of the present invention and its process or processes, such as conventional practices. Examples are, materials, media, objects, devices, processes, and their combinations other than polymers of the present invention, such as: (1) ingredients used to make conventional images, (2) other art forms in inventive images like a traditional painting, print, drawing, photograph, or found object, (3) particles, items and other colorants, textural ingredients, other such materials, (4) devices which enable inventive images to physically move, (5) materials or devices for light and light effects and the use of conventional science to make light effects or to enable the image to give off light; (6) ordinary and custom hardware (e.g., to set up, install or mount images), and/or (7) practices used in construction, architecture, chemistry, electronics, physics, printing, or engineering. These and other non polymeric ingredients and conventional practices may or may not have the same characteristics as they have in their conventional uses. For example, their aesthetic properties and possibilities, their workability, reworkability, and controllability and their permanence, may or may not be the same or similar to those in their conventional uses. Often their aesthetic possibilities expand when they are used with the present invention, along with their workability, reworkability, controllability, and permanence. For instance, traditional oil painting can be layered as never before in inventive images. In inventive images, however, other known, and conventional ingredients and processes may or may not have the same or even a similar aesthetic; or the same or even a similar level of workability, reworkability, and controllability; the same or similar limitations, problems and undesirable issues; the same or a similar level of strength and permanence; and other qualities which are the same or similar to those in their regular and conventional uses. For example, frequently it is the use of other ingredients with polymers of the present invention that enables inventive images to be unique and important, such as electrical ingredients, colorants, stabilizers, etc. As a specific example, the ability to form inventive images or parts thereof in layers which can be unlimited, enables many conventional practices (such as conventional paint applications) to be used in ways that are more workable, more reworkable, more controllable, freer, more versatile, easier, stronger, and more permanent than their conventional uses. Nevertheless, the characteristics of ingredients and processes other than those of the inventive medium, and the use of conventional practices with the present invention are often dependent on the specifications of each use in specific inventive images.

One or more polymers can be used as, or to form an inventive image. One or more polymers and one or more other subjects (such as other materials, media, objects, or devices) can be used in any proportion to form an inventive image. For example, an inventive image can be almost entirely made of polymer, with a very small percentage of other ingredients. It can be made of roughly half polymer, and roughly half other ingredients. It can be made with a very small percentage of polymer and a very large percentage of other ingredients. For example, one or more of layers shown in FIG. 11 might be completely made or principally made of polymer, while the rest of the layers may be made of polymer or non polymeric ingredients. Any of the layers in FIG. 11 might be a layer of a conventional paint or other conventional image making medium, and any of the other layers might be electrically active, e.g., polymer LED(s). In FIG. 20, the internal layer shown might be an image support made of polymer and the external layer might be non polymeric, or vice versa.

The inventive medium enables 2D and 3D inventive images to be made in any shape, form, or structure desired, using any methods, means, and manners desired, and in any size or scale desired, (ranging from very tiny to monumental in size). The inventive medium can create forms that are as precise, as delicate, and as intricate as desired, even on a very small scale. As the drawings show, inventive images can be made of one or multiple, 2D or 3D, parts or layers as desired, even in conventional forms of art and design (such as paintings and drawings where this can be problematic). Inventive images (or parts of them), may or may not be flat, continuous, or regular in shape or form (such variations are often difficult to achieve in conventional images). For example, inventive images may have protrusions; texture; undulations, curves, indentations, a concave or convex form, embossing, embedding, inlays, or attachments; layers superimposing them partially or entirely; negative space, or irregularities in form, shape, structure, or surface, etc.

A number of the illustrations (the Figures) focus on specific formal elements in inventive images. As the Figures, by necessity, were made using conventional drawing practices, such practices often hide aspects of the present invention not being illustrated. For example, it is essential to the practice of the present invention that image makers may use coloration without limitations. Yet, the use of coloration in the Figures is limited for the purposes of clarity and the Figures are rendered in black, white and shades of gray, thus they do not show the use of coloration in inventive images. For instance, for the purposes of clarity in the illustrations, variation in the coloration of a number of the inventive images shown in the Figures is minimal in order to allow their shapes and parts to be seen easily (otherwise, a single inventive image part might appear to be made of multiple parts, etc.). As another example, areas in these illustrations of inventive images which are colored darkly, might be colored lightly and they might be transparent, translucent, and/or opaque in actual inventive images. In order to create the illusion of seeing through inventive images with real spatial depth which are transparent, translucent or not consistently opaque, on the 2D planar paper of this patent which is consistently white paper, some of the Figs. illustrate inventive images using lines (e.g., black or grey, dotted and/or solid lines) in places where the inventive image depicted has no lines. As another example, for the purpose of effective illustrations, many inventive images and parts thereof are drawn with black outlines (e.g., black outlines around layers in the inventive images) even though few if any of these lines would typically exist on these or other such inventive images. And often in the Figs., dotted or gray lines are used to show changes (typically previous changes) to an inventive image. In addition, in actual inventive images, a number of the bonding spots illustrated clearly herein would not be visible to the human eye as bonding spots within actual inventive images, (e.g., because they are camouflaged to appear continuous with the aesthetic of the inventive image, for example, by their color and/or dimensions).

As another example of how the limitations inherent in the use of conventional drawing practices are insufficient to fully represent inventive images, many Figs. are rendered using a range of shapes and forms chosen for clarity and to effectively create the illusion of spatial depth and see through form on 2D planar opaque paper. For instance, for clarity and to effectively create illusionary spatial depth and illusionary transparency, the shapes and forms used in many of the Figs. are generally simple ones, e.g., geometrics like cubes and rectangles. In contrast, real inventive images do not have any such limitations of shapes and forms. Furthermore, many Figs. present parts of inventive images (e.g., areas, layers, separate parts, etc.) as more or less consistent, e.g., so they are not mistaken as being made of multiple smaller parts and so each part is clearly distinguishable from adjacent parts. For example, typically, in the Figs., the layers of an inventive image are rendered in colors that are even, or that generally appear evenly dispersed. But, the consistency of the inventive images shown in Figs. is a simplification for the purposes of effective illustration, it is not a requirement or limitation in the use of the present invention. Indeed, the use of coloration in inventive images can, for example, be as uneven and inconsistent as it is in conventional images.

As a more specific example, where a Fig. might show three superimposed layers of an inventive image from any vantage or angle, the lowest layer may be rendered in a consistent medium grey, the middle layer might be the white color of the paper, and the uppermost layer might be rendered in a consistent dark grey. Though in the Fig. each of these three superimposed layers look continuous, their consistency and the use of colors on adjacent layers which are easy to distinguish from one another is a simplified generalization for the purposes of effective illustration, and not a limitation of the present invention. Because each of these three layers can be interpreted in multiple ways, this Fig. effectively illustrates the many variations in layering inventive images. For example, one, two and/or three of the layers in this Fig. might be partially or entirely, continuously or inconsistently comprised of: a). one or more constituent sub-layers each comprised of one or more mediums, materials or both; b). one or more different colorants that are transparent, translucent, opaque or a combination of these; c). one or more layers of one or more cPRMs or polymers; d). conventional drawing, painting (e.g., watercolors, acrylics, oils, tempera, alkyd, encaustic, gouache, a combination of these, etc.), printing, writing or a combination of these; e). paint made using cPRM as the binder; i). marks which do not consistently or continuously cover the surface (such as paint strokes, broken color marks, line drawing, writing, text, printing, etc.); g). multiple pieces, multiple parts or multiple applications (with or without open spaces between them), e.g., collaged pieces, superimposed applications of one or more substances like paints, found objects (if these multiple pieces, parts or applications overlap, the thickness of the layer they form cumulatively may be irregular, and if they are transparent and/or translucent and they overlap, the layer they form cumulatively would be inconsistently transparent and/or translucent, and inconsistently colored; also, if any of the superimposed layers in a Fig. are transparent, its consistency and its coloration might depend on what is beneath it, for example, an inconsistent layer can become more consistent when a transparent consistent layer is superimposed over it, and a transparent layer may be consistent until an inconsistent layer is placed beneath it); h). one or more superimposed photographic transparencies; i). one or more electrically active layers, e.g., polymer LED (s); j). one or more other art forms superimposed on the inventive image (e.g., a photograph, a collage, a cut out, a print, a work of design, a drawing, a drawing in space, etc.); k). one or more other attachments; l). a combination of these (e.g., a layer made of a photograph with two layers of paint on it).

Most of the Figs. herein illustrate multiple aspects of the present invention. Inventive images shown in Figs. have multiple interpretations.

As another example, all of the Figs. herein illustrate inventive images which can be made in any size desired, e.g., they can be very small (such as, the size of jewelry or miniature paintings), or they can be monumental in size (such as large public works of art or design). In addition, illustrations of cross sectional views of inventive images may show either a cross section view of a portion of an inventive image, or they may show a cross section through an entire inventive image, e.g., a cross sectional illustration showing layering herein might show either layering on an inventive image surface or layering throughout an entire inventive image. A number of the Figures herein can be interpreted as both cross section and side views of inventive images. Though the inventive images shown in the Figures in views that are typically cross sectional, might be interpreted as having a designated front side and back side (e.g., with their upper side being their front side), unless specifically indicated herein, they do not.

Though the sizes and shapes of inventive images are unlimited, it is notable that the length to width proportions of many of the inventive images illustrated herein are not typical examples of the length (or height) to width (or depth) proportions of many kinds of art forms, whether they are made using the present invention or conventional practices. For example, if many of the illustrations herein (particularly the cross sections and side views of layered inventive images) are interpreted as representing whole paintings, drawings, prints, photographs or other generally planar art forms (rather than interpreted as part of these art forms), these inventive images would not be in proportions which are typical of any of these art forms. But the proportions of the inventive images illustrated herein were often created for the purpose of effective illustration. For example, thicker layers are easier to see, though they make the inventive image illustrated thicker in proportion to its length (or height) such atypical proportions are preferred since the purpose is to show features (like layering) and such atypical proportions are unavoidable due to the limitation of the standard size paper this patent is on. The proportions of an inventive image (e.g., in one of these planar art forms, for instance a painting) might be made the same as or like the proportions of typical conventional images in the same art form. For example, while some or all of the layers of a cross section of an inventive image are visible in the illustrations herein, the thickness of each of these layers in an actual inventive image might be difficult or impossible to see with the unaided human eye, though its other two dimensions might be clearly visible, they might be measured in feet.

The illustrations in the Figures can be interpreted as showing different variations of the present invention, and they are not to scale. As further examples, the inventive images shown in these Figures might be 2D: 1-8, 10-46, 47, 48-86. Note that many of these are illustrations of inventive images in cross section views in which their layers would each have to be very thin for the image to be less than 1" thick. However, many conventional images are made with thin layers as such (e.g., many old master paintings such as those by Rembrandt). Also, forthcoming text describes many kinds of layers for use in inventive images which are desirable in inventive images as thin layers, e.g., electrically active layers such as polymer LED(s), as well as coatings and other colorants. Some of these 2D images might for example, be or resemble conventional art forms, e.g., paintings or cut-outs. If many of the images in the Figures were 2D and thus less than about an inch thick, and they were in conventional art forms such as painting or drawings or prints, it is likely that their other two dimensions would be substantially larger than illustrated in proportion to their thickness as illustrated, so that they would have proportions typical of conventional art forms. The inventive images shown in all of the Figures might be 3D. The images shown in FIG. 38 could be any size. Thus an aspect of the versatility of the inventive medium is illustrated.

The inventive images shown in the Figs. show examples of images made according to the present invention at various stages of their development. Each inventive image illustrated in these Figs. may be complete at any stage in its development as a discretionary decision by its image maker or image makers. Alternately, inventive images such as all of those shown in all of the Figures, can typically be further processed at the discretion of their image maker or image makers, e.g., from any side or from more than one side, even from all of their sides.

Inventive images and their parts may be partially or completely solid, hollow or open in form, e.g., using a polymer in hollow or solid volumetric forms, rods, bars, and strips. Inventive images can have negative space within their positive forms, between their parts, or both, e.g., negative cutouts, perforations, or holes formed when medium is cast, carved, or cut in gelled cPRM or in polymer. This opens novel possibilities for image making and for images, such as inventive images made in conventional art forms that are completely or partially hollow, e.g., drawings, paintings, prints, collage, decollage, images with writing, graphic art, photography, tiles, partitions, windows, doors, table tops, walls, or images which are a combination of these. For example, the use of one or more air pockets, negative spaces, or both, in inventive images made in art forms which conventionally, are generally continuous and solid, can yield effects which are new and unique. For example, their hollow forms can contain something such as air, water, rose petals, a piece of silver, a lens, a prism, a mirror, a piece of crystal, or anything else inside. In addition or instead, these hollow spaces might produce one or more light effects, such as an air pocket that might form a prism or a lens, or light sources, such as LED(s), that may be inside. Hollow and solid forms can be used in inventive images to make them stabile (i.e., bottom heavy), to balance their weight, to enable images to move or to be moved as desired (e.g., for kinetic images, to enable images to float, or to make images easy to transport), so that an image can hold, carry, or contain something inside of it (such as water that must flow through an image that is a fountain), or to make inventive images function more effectively in other ways. Moreover, the formation, workability, and uses of solid and hollow forms in inventive images offer many more options than can be obtained from comparable transparent or translucent conventional images, e.g., the medium of the present invention can be significantly more workable, reworkable, and controllable than glass or crystal and it can be stronger than conventional acrylics, glass, or crystal. As another example, in the inventive images in FIGS. 41.I, II. and III., negative spaces and polymer planes enable layers of coloration to be superimposed without contacting one another.

Hollow and negative space within inventive images might, for example, give an image spatial depth, light, air or volume, and layers can be superimposed without being in direct contact with one another which may be useful, for example, (1) to superimpose layers of incompatible applications (such as when it is desirable to superimpose incompatible paints such as oil paints layered lean over fat, or acrylic paints over oil paints), (2) to superimpose applications which will or may not be as strong or permanent as desired, if they are in direct contact with one another, (3) to make applications that either can not be applied or which do not apply as well as desired on particular surfaces (e.g., pencil will not apply as desired over paint, pastel will not apply as desired over an application that is extremely smooth), (4) to enhance the inventive image's spatial depth, volume, or light, (5) for other light and aesthetic effects. As further examples, 2D and 3D inventive images or parts thereof comprised of one or more rods, bars, or strips that may be polymeric or non polymeric, are shown in FIGS. 3-4, 6, 9 (side or cross section views), 27, 34, 49.I.-VI., 50.I.-III., 57, 61, 62.I.-IV., 65.*a.* and *b.,* 79.XI and 79.XIII. Even polymer rods, bars, and strips might be partially or entirely electrically active forms in inventive images.

By its variations and by its ability to be worked, reworked, and controlled as desired, the use of the inventive medium to make images' shapes, forms, and structures in some embodiments offers solutions to limitations and problems in conventional image making and conventional images, as well as the opportunity to use shape, form, and structure in images of the size and scale desired, in ways which are not possible in conventional images.

If desired, one or more parts or layers in an inventive image may be partially, principally, or completely comprised of one or more ingredients other than the inventive medium, e.g., light sources and other elements to give it light effects (such as light bulbs, LEDs, EL Lamps, reflective materials, iridescent materials, prisms, etc.); found objects; conventional image supports; conventional paints; conventional materials for making photographs; or conventional images in an inventive image. Further examples are commercially available. For example, tin cans, cardboard, metal or metallic foil, newspaper, rubber, devices (like flashlights, projectors, monitors, calculators, sensors, electrical wiring, solar panels, microphones, speakers, computers or computer parts, and controls), etc. As another example, mounts and frames for inventive images can be made using conventional practices. Attachments, parts or both which are not principally made of polymer of the present invention or are completely non polymeric can be added to inventive images, affecting or even creating their forms or structures to varying extents.

Polymers of the present invention can be formed with very accurate impressions of their molds, even if those molds are very detailed. Polymers can also be formed with less accurate impressions of their molds, to any degree desired. For example, using conventional practices, molds can be taken off of real things (e.g., a mold of a bottle, a shoe, a leaf, a person, a pineapple). In one embodiment, a 2D polymer is made in a mold.

It may be left as is, if it is the desired finished inventive image or if it will be further developed at a later time, even years or decades later. Alternately, the inventive image can be further processed as desired. One method is to apply one or more colorants to one or more of its exposed surfaces. In addition, or alternately, one or more layers of one or more different PRMs or polymers can be added, e.g., a conductive polymer or a polymer with desired aesthetic or structural properties. This image can be finished, or it can be further processed. One way to further process it is to superimpose a layer of cPRM, which is the same or different from the image's initial layer, over part or all of one or more of the image's surfaces after which this inventive image may be finished. Alternately, this image can be further processed, as desired. For example, any number of additional layers can be added, or the image can be further processed using subtractive processes. The finished image may be 2D or 3D. Such an image might, for example, be a painting, a sculpture, or an image of design. For instance, it might be a rigid or partially flexible, permanent, self-supporting colored 2D or 3D image that does not require any added means of support or installation that is not considered an aesthetic part of the image. Such an image may have color visible which is at different depths within its form.

In another embodiment, an inventive image is made wherein one or more forms of light (such as light from conductive polymer or other lights), and one or more pigments or dyes are combined by (i) preparing a polymeric composition (which will be an image support), desirably made using one or more monomers, at least one of which can form a transparent or translucent polymer (in one or more layers); (ii) applying one or more colorants to one or more portions or to all of the image support; and (iii) exposing the colored work in progress to one or more forms of light or energy, to complete the image. The light can be visible light; light capable of inducing fluorescence, phosphorescence, or iridescence in the image. The energy can be energy that causes light to be emitted. Examples are ordinary tungsten, halogen, fluorescent, or neon lighting; sun light; light from fire (such as candle light); reflected light (such as light reflected onto the image off of a white wall); x-radiation, solar power, or electricity. One or more of the colorants applied on this image might by cured by radiation such as a colorant cured by UV light from the sun or from an electric light.

Whether they are stabilizers or not, image supports used to make inventive images may include one or more ingredients which are polymeric or non polymeric. Image supports may be 2D or 3D, their shapes and forms may be of any description, and they may be made in any process desired. Image supports may or may not have one or multiple dimensions or any dimensions which remain the same after they are further processed or finished, e.g., maintaining the same length or width after further processing. For example, an image support might be an inventive image's underlying support (e.g., supporting the development of the rest of the image in a manner which resembles the way that conventional images are supported on canvases, paper, wood, bases, underlying frameworks), for instance, to make inventive images that function as paintings, drawings, collages, icons, prints, books, sculptures, photography, windows, or walls. Alternatively, an image support might be an inventive image's internal support (e.g., similar to an armature, internal skeleton, or internal framework on a conventional image), for instance, to make inventive images that are sculpture, installations, paintings, or architecture. As another example, an image support might support an inventive image externally, either without underlying it or only partially underlying it, and it may be visible or partially visible. Such an image support might be the wire or other structure for an inventive image that is a mobile, a sculpture, an installation, a construction, or a painting.

Figure 66:
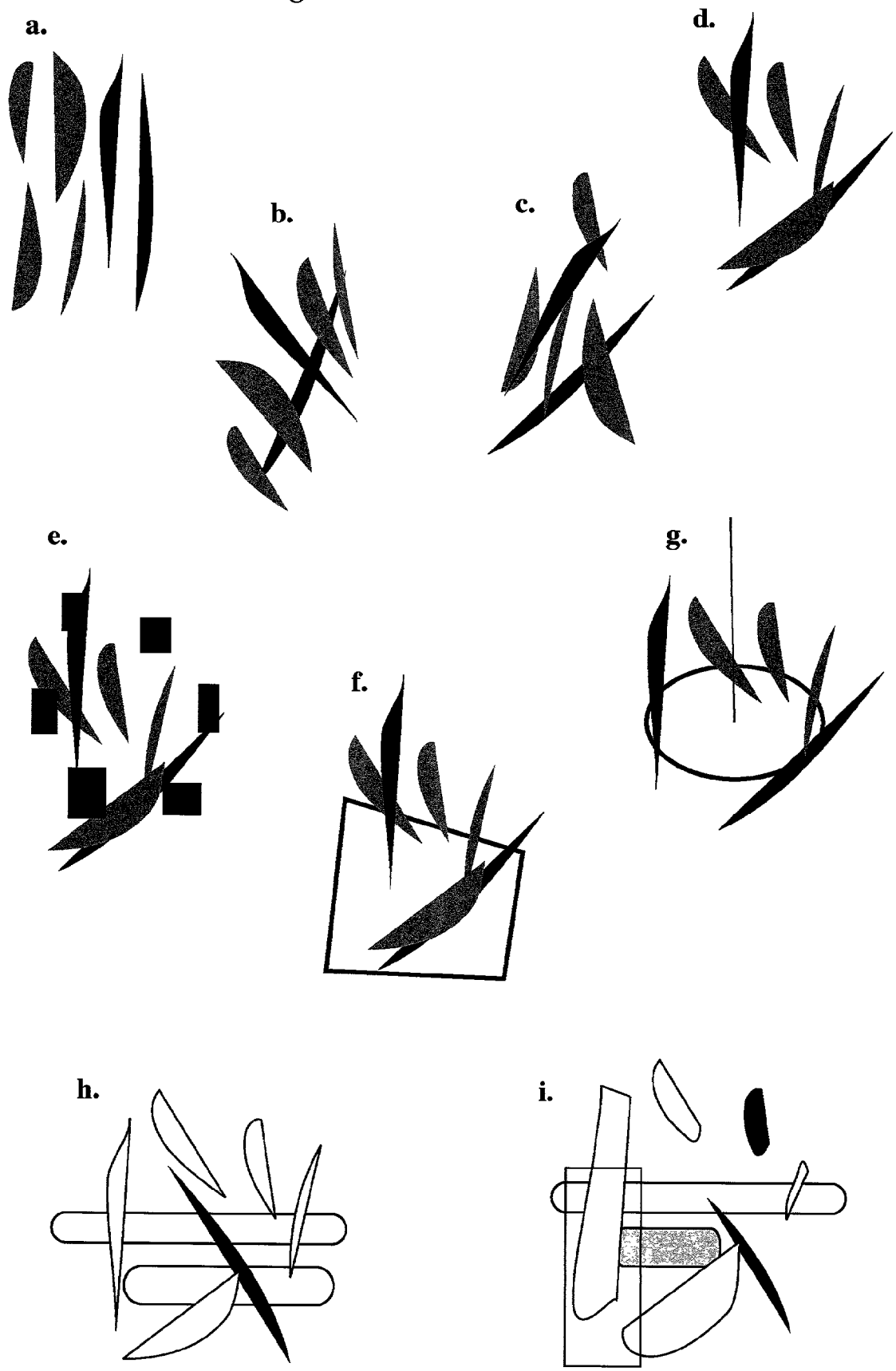
FIG. 66 shows workability in making inventive images without an initial image support.

Inventive images can be made with or without image supports that may or may not be image support stabilizers, initial image supports (meaning the image begins by further processing them), or both. In an example, 2D or 3D inventive images are made by using cPRM on one or more 2D or 3D initial image supports made of compositions that have no polymer in them, or made of polymeric compositions. In some embodiments, inventive images are made on multiple initial image supports, at least one of which is made of polymer, and at least one of which is made or principally made without any polymer. In other embodiments, inventive images are made without initial image supports, as shown in FIGS. 66 and 67.

An image support may be further processed as desired, using any of a myriad of variations such as those described herein. Examples of variations possible in forming or further processing image supports to make inventive images are embedding, air pockets, embossing, negative cut-outs, changing perimeter shapes or edges, changing surfaces (e.g., texture, inlay), thickening them, thinning them; carving, incising, painting, drawing, printing, or writing on them; adding attachments, photography, collage, light sources or other light or optical effects. Inventive images shown in the following Figures may be 2D or 3D image supports or they may be images made by further processing 2D or 3D image supports: 1.*c.*, 1.*d*.1., 1.*d*.2, 2, 4-13, 15-61, 62.I.-VIII., 62.X., 63-64, 68, 70-73, 76-79, 83-86. The formation of 2D or 3D image supports is shown in FIGS. 69, 70-72, 74-75, 80, 81, 83.I.-II. In some embodiments, inventive images are made on single 2D or 3D substantially planar initial image supports, some of which function in forming inventive images like canvas or paper function in making conventional images. Some of these image supports are made of polymer (with or without other ingredients), some are image support stabilizers, or they have at least one other stabilizer. Such initial image supports can resemble conventional image supports to the extent desired, e.g., even by using wooden stretchers on their backsides, or by embedding or attaching paper or canvas to them. Such polymer initial image supports can differ from conventional image supports in a myriad of ways, such as aesthetic variations or further processing comparably impossible with conventional image supports. These initial image supports might be further processed into inventive images that are any art form desired.

In some embodiments, inventive images are made on multiple 2D or 3D, substantially planar polymer initial image supports, one or more of which may be stabilizers or contain at least one stabilizer. In one example, an inventive image is made of multiple separate components each of which is formed on its own initial image support. As the initial image supports of the inventive images in this embodiment are further processed, two or more might be connected; they might remain physically separate; or two or more might be connected while one or more remain physically separate from the rest of the image. These inventive images might, for example, be drawings, murals, diptychs, triptychs, books, graphic art, windows, partitions, furniture, a sculpture, installation, or an environment.

In a preferred embodiment, inventive image supports are made using polymer, with or without other ingredients. They may or may not be stabilizers. These image supports have noticeable irregularities or imperfections in their shapes or forms. For example, they look handmade, whether or not they are, e.g., they have irregularities like those commonly seen in handmade papers and in papers with deckled edges (papers with deckled edges can look handmade when they are not). In comparison to the shapes and forms in which conventional polymer is commonly available commercially, (e.g., in smooth even sheets, and rods, cubes, pyramids and spheres with exact forms, etc.), the image supports in this embodiment are not even, perfect, exact, smooth, or they do not have other such regular or machine made appearances. Though they might be symmetrical, geometric, or machine made, image supports of this embodiment have clearly visible irregularities or imperfections in shape or form. Another example is a 3D rectangular image support with undulations or irregular bumps (not a perfect even texture). Image supports of this embodiment might be used as initial image supports. Image supports of this embodiment might be further processed as desired, e.g., as paintings. It is often desirable to further process image supports of this embodiment such that they remain the major part of the shapes or forms of their inventive images once they are completed, e.g., initial image supports of this embodiment might make up most or all of the forms of the images once they are completed.

In other embodiments, inventive images are made without initial image supports. For instance, the shape or form develops as the inventive image is made. For example, these inventive images are made without the use of underlying, internal, external, or other initial image supports. They are, for example, inventive image paintings, drawings, and collages made without a canvas like or paper like support, and inventive image sculptures made without armatures. These inventive images can be made in many ways, such as using conventional methods. For example, such an inventive image can be made of one or more polymer components that are complete once they come out of their mold, they are not further processed. Such inventive images can be made by arranging parts, which remain separate or are connected, without any single part or any set of parts serving as an initial image support. Inventive images made without initial image supports might be made in superimposed layers, none of which serves as an initial image support, e.g., these images might be made in multiple layers, some or all of which superimpose one another to some extent, partially or entirely, and these superimposed layers may or may not be physically connected to one another. Because polymers of the present invention can be made as strong and as permanent as desired, layered inventive images made without an initial image support, can be made strong and permanent enough to give inventive images the desired structure and the desired aesthetic. Inventive images made without initial image supports can typically be worked according to the Principle of Whole Development and Unity to the extent desired, for instance, in a WYSIWYG manner, whether it is preplanned, spontaneously developed, or both, e.g., they may be paintings, shaped paintings, sculptures, walls, etc., with or without negative space within their forms, etc.

In an example, all of the parts of an inventive image are connected to a single common part, e.g., an image support (which may or may not be a stabilizer), for instance, all of the parts are connected to a 2D or 3D polymer, to a piece of fiber, to a block of wood, to a sheet of metal, to a 2D or 3D mesh form, to a framework or lattice, to a common mount, frame or base, etc. For instance, an inventive image made of multiple parts one or more of which serves as an image support made of one or more parts, connecting all of the rest of that image's parts. In a second example, a fiber stabilizer is used as one part of a two part image support. On this fiber image support, a polymer part, a paper part, and a plaster part are formed. A wire mesh is used as the other part of this same image support. In a third example, ten translucent and opaque paper parts are formed on cheese cloth image support, and painted with colored cPRM. In a fourth example, multiple planar polymer parts of any shape or form, are made separately and used as an image support, to form a painting of the present invention.

Inventive images or image supports can be rigid, flexible, or they may have both rigid and flexible areas, parts, or layers. In some embodiments, inventive images are made sufficiently strong, rigid, or flexible, or they are made with other such specifications so that they can endure their function and their set up, installation, or other display practices as desired. The rigidity, flexibility, and strength of inventive images enables them to be new and unique. Examples are transparent and translucent inventive images, such as those in forms conventionally made in glass, architectural images, kinetic images, images that have to take impact, shock, that have to be transported, stored, or endure other wear.

In some embodiments, inventive images are made with rigid polymer, as strong and as permanent as desired. Inventive images, their effects, useful properties and the processes for making them, can frequently be attributed to or enhanced by the rigidity of polymers. For example, rigid polymer can facilitate superimposed applications or layers (e.g., of cPRM; weak or fragile polymers, bonding substances; conventional image making materials, non polymeric applications, etc.). It can provide support or additional support, enhance the strength, the permanence, the aesthetic properties, and sometimes the function(s) of inventive images. Rigid polymers may enhance properties of superimposed applications and layers such as (1) materials and media that tend to flake, chip, tear, or dust off of their conventional surfaces (such as layered gouache, pastel, charcoal; brittle applications and layers like some polymers and paints, and paints with high pigment content and little or weak binder); (2) applications and layers adversely effected or risking adverse effects from expansion and contraction (e.g., materials and media that must be layered in order of their rates of expansion and contraction for permanence, brittle materials and media, conventional applications on canvas or paper, and wet applications that cause or risk causing paper to buckle); (3) materials and media that are soft, fragile, weak, brittle, gelatinous, and the like, such as encaustic paint, conductive polymers, and absorbent polymers; (4) applications and tools that damage or risk damaging surfaces, such as wet applications on paper, applications that fray or tear the fibers of paper, and tools that make undesirable and often irreversible indents on conventional surfaces (like hard pencils which indent paper); (5) applications that weigh too heavily upon conventional supports such as collaged materials and found objects; (6) materials and media that conventionally require, use, or benefit from the sturdy support of a rigid surface, such as fresco, images made in relief, conductive polymers; (7) reworked applications that damage or risk damaging conventional surfaces; and (8) combinations of these. As an illustration, the uses of conventional image-making materials and media on polymer surfaces of inventive images that are limited, due to the flexibility of their conventional surfaces (like paper and fabric both of which are generally given added structural support, though they still remain flexible), can yield new and unique qualities and effects in polymers in inventive images because its flexibility can be controlled as desired, e.g., in aesthetically desirable ways. Rigid polymers can also enhance or enable the use of subtractive processes.

The strength and rigidity of inventive images enables their aesthetic and their structure to be as integrated and unified as desired, developed, and reworked in concert to the extent desired. Thus, often decisions regarding structure that have to be made in conventional images (such as use of visible reinforcement) can be ignored, delayed, or made for other reasons (such as aesthetic reasons), completely or to a greater extent in forming inventive images. Elements conventional images need for structural support may not and often do not have to be present for structural support in inventive images, though they can be used if desired. Inventive images in conventional art forms which conventionally require these added elements, do not require them at all or to as great extent as conventional images, e.g., they are aesthetic options. For example, inventive images in conventional art forms can be made without conventional stretchers, initial image supports, backings, mats, frames, stands, bases, internal structural supports (like armatures or skeletal supports), various external structural braces or other external supports; supports beneath them; cross bars, ribs or struts of various kinds. Thus the strength and rigidity of inventive images can effect their other formal elements. Among other special qualities and effects the strength and rigidity of polymer can create or contribute to inventive images are a sense of being light, precarious, airy, threatening, floating, ethereal, a sense of defying the laws of gravity and nature, or a sense of objecthood. The strength and rigidity of inventive images overcomes prior limitations in conventional images, such as paintings, shaped paintings, stained glass and other glass images, drawings, prints, photographs, and other conventional images on paper.

The forms and the structures of inventive images can be as integrated and as unified as desired, they can even be completely unified. For instance, the polymer of an inventive image can give it both its form and its structure and even its method of display. The strength and rigidity of a polymer enables inventive images to be as self supporting as desired, (e.g., freestanding) with or without the use of additional structural supports. In some embodiments, inventive images are made that are self supporting, or even completely self supporting. Thus, for example, inventive images can be new unique paintings, shaped paintings, drawings, prints, photographs, books, and other forms of graphic art; they can be new unique forms of images conventionally made in glass such as windows, new unique light emitting forms, and new unique kinds of architecture. Among the notable examples of these are self supporting inventive images made without any initial image support, inventive images made of multiple layers or inventive images made in conventionally planar or 2D art forms. The strength and rigidity of inventive images enables the integration and unification of their aesthetic, their structure, their method of installation or display, their function for visual observation, and often other functions to the extent desired. For example, such novel inventive images can be large, rigid, permanent paintings, the visible forms of which are their structures, thus, these images do not require any additional or hidden structural support. For example, such an image might have painting, printing, or drawing at real varying depths within it as well as on its external surfaces.

Figure 44:
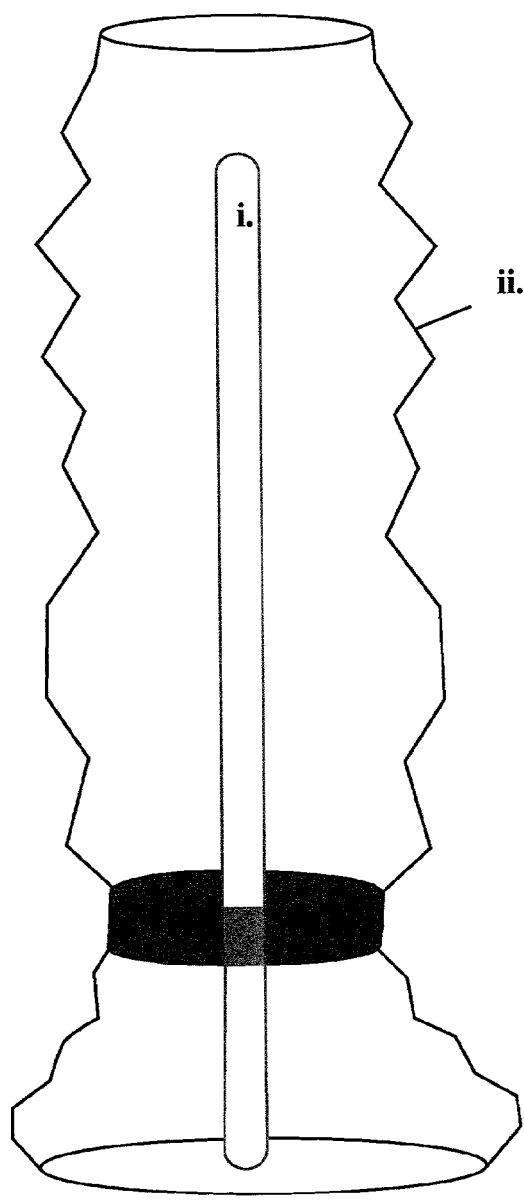
FIG. 44 shows an inventive image which may emit light.

As another illustration, the inventive image shown in FIG. 44 has a hollow, transparent or translucent outer form (marked ii), which might be partially or entirely made of a polymer that is rigid enough so that it supports itself securely. This inventive image may be like an "Akari" lamp by Noguchi, but without the need for any added structural supports (in "Akari" lamps such supports are both structural and aesthetic elements). Also unlike the Akari lamps, the light bulb in the center of this inventive image's form is optional (the vertical, tube shaped light bulb marked i. in the center of the image's hollow form). For if this inventive image is made with one or more conductive polymers, it can emit light without the bulb. For example, the hollow form of this inventive image might be made in multiple layers, at least one of which is rigid providing structural support, and at least one of which is conductive. This hollow form might, for instance, be made of one or more conductive polymers layered on a rigid polymer substrate (with or without additional layers). The hollow, transparent or translucent form of the inventive image shown in FIG. 44, can comprise its form, its structure, it aesthetic, its function, its method of display or installation, as well as other formal elements.

An inventive image can be made with a structure that is strong enough or rigid enough to be able to be mounted from a single point (e.g., from the wall or ceiling), to be able to be held securely at a distance out from the wall it is mounted on, to be able to balance supported by one or more parts which appear insufficient or unstable, or to be able to be held from a moving mount or structure. One inventive image, 45 inches in diameter, made with a crosslinked polymer that has one fine layer of invisible fiber stabilizer positioned medial within its 1.5 inch width, is hung from the ceiling using a single wire secured through the 1.5 inch width of its center. The resulting inventive image has the special effects of appearing to float, appearing light, as well as spontaneous movement, a twirling, set off by normal indoor air currents or by viewers with no special accommodations made to the space in which it is displayed to cause or affect this movement.

Strength and rigidity in inventive images can be used in many other ways too. In an embodiment, one or more parts or areas of an inventive image are sufficiently rigid, sufficiently strong or both, to support, one or more other parts or areas of it as desired.

In some inventive images and parts thereof, it is preferable to fix flexible polymer onto a backing, mount, brace, stretcher, or another such structural support, for example, a flexible polymer secured over a curved metal form, a board, or over a conventional stretcher. (Refer to strengthening stabilizers described herein.) As an example, a transparent polyvinyl chloride inventive image is made, painted as desired with transparent, translucent, and opaque coloration (such as inks and paints made using oil soluble dyes), and finally draped on the wall. In another example, three small painting surfaces are made with a clear transparent silicone elastomer, irregularly colored, with embedding. They are mounted on support structures and hung on the wall or from the ceiling. In a further example, one or more flexible polymer parts in a kinetic inventive image might move.

Unlike many conventional images, inventive images can be as strong and as permanent as desired, and these properties can be formed, reworked, and controlled using any methods, means, and manners desired, such as when forming a polymer or anytime afterwards, often without affecting its aesthetic undesirably. The strength or permanence of inventive images may or may not be consistent. It is generally preferred that inventive images be strong and permanent, to the extent that there is no conflict with a more desirable preference for a specific inventive image. It is generally preferable for everything physically connected to inventive images to be bonded to them. Methods for controlling and enhancing the strength or permanence of inventive images are described herein. If, for example, two superimposed polymers do not bond together, or if they do not bond together as well as desired, bonding methods described herein or conventional bonding methods might be used. All desirable methods, means, and manners for achieving the level of strength and permanence desired in inventive images can be used. It is generally preferable that reworking and cleaning inventive images not decrease their strength or permanence, and that such practices depend on specifications of and undesirable changes to individual images.

Polymer in an inventive image may be strengthened further, made rigid or more rigid, or its permanence enhanced by thickening it or reinforcing it. This might, for example, be done with a fiber stabilizer, with a stronger polymer (such as one that is rigid or crosslinked); with a non polymeric material (such as metal, or wood). (Refer to other descriptions herein such as strengthening stabilizers.) In some embodiments, strengthening elements are physically bonded to inventive images, such as a strengthening element that is an image support, a mount, a frame, embedding, an attachment, or an inlay. Some strengthening elements which are physically bonded to polymers are stabilizers. Further examples are image support stabilizers, fiber, wire mesh, and other metal mesh, netting, macrame and other knotted forms (e.g., made of wire or string), forms made of linked chains (e.g., metal or plastic), other open weave forms that are not fibers or that are combinations of fiber and other materials (such as woven straw, string, wire, grasses, strands of rubber or leather, ribbons, stems, or strips of bark).

Any and all ingredients used in or on inventive images can affect their strength and permanence, as can processes used to make inventive images. Some polymers are stronger than others (e.g., crosslinked polymers and certain polymers are stronger for particular uses, etc.), some are more resistant to particular elements, and some polymers are more permanent than others. Manufacturers of polymer forming materials generally provide useful information about the properties and conventional uses of their products.

In various embodiments, inventive images are designed with two or more different polymers that are at least partially superimposed or connected. One or more of these polymers might be in layers, parts, or applications in or on the image (e.g., on the other, different polymer or polymers). The compositions of these polymers may or may not also contain non polymeric ingredients. At least one of these superimposed or connected polymers in the images of these embodiments provides or enables the image to have at least one aesthetic element, such as emitted light, other light effects, video effects, coloration, optical effects, transparency, translucency, the ability to bond to at least one superimposed medium (such as a colorant like paint or ink), or the ability to be developed by subtractive processes. In addition, at least one different polymer in the polymeric compositions of these embodiments, provides support to the polymeric composition. Thus, for example, a polymer which is desirable for use in an inventive image for aesthetic purposes, but which is weak or less strong or permanent than desired, is strengthened or made more permanent, and often is made more functional in the image desired too. Such designs using different polymers are often desirable in the use of absorbent polymers, conductive polymers, flexible polymers, and other polymers that are aesthetically desirable but might be weak.

In some embodiments, inventive images are made that are less strong or less permanent than they might be, as an aesthetic choice, to facilitate the process of creation desired, or to enable the image to function best for its purpose or for one of its purposes.

When using more than one kind of material or medium in an inventive image, and these different ingredients are not on physically separate parts of the image, it is desirable to be mindful of differences in the parameters of their expansion, such as differences in their coefficients of thermal expansion and differences in comparable parameters of any other kind of expansion (like expansion due to absorption of moisture such as humidity absorbed by a hydrophilic plastic or by paper in an image). When differences in the parameters (coefficients) of expansion of different inventive image ingredients are significant or great, it is desirable to ensure that these differences do not risk or cause undesirable effects to the resultant inventive image (such as a decrease in its strength, actual cracking, or bending or the risk of loss of strength). It is preferable that all measures taken for this purpose be tailored to the precise specifications of each inventive image, e.g., ingredients can be substituted, or the image can be designed to avoid or decrease the likelihood of such undesirable effects.

As a further illustration, if the difference between the parameters (coefficients) of expansion of different ingredients within an inventive image are significant or great, and if the area of contact between them is significant or great, it is generally desirable to make changes which reduce or eliminate these differences and their potential undesirable effects, such as by the following example methods. (1) Alter the size of the area of contact between the ingredients so that it is insignificant or minor. For instance, subdivide one or more of the ingredients so that areas of contact are discontinuous, and spaced as far apart as possible. (2) In the area of contact between the ingredients, interpose one or more materials, media, objects, devices or combinations of these, that are elastic enough or that flow freely enough to absorb the differences in their expansion and contraction. (3) In the area of contact between the ingredients, interpose one or more other materials, media, objects, devices or combinations of these which have intermediary parameters/coefficients of expansion to form a transition from the ingredients with the different parameters/coefficients of expansion. (4) Use a combination of these solutions. These solutions will not work in all circumstances in all inventive images, or they will not be equally desirable. For example, (2) and (3) are not generally desirable with 3D embeddments. With large 3D embeddments, it is generally preferable to match or approximately match the coefficients of thermal expansion and other expansion of different individual inventive image ingredients.

Thus, it is often desirable to be aware of such significant differences in coefficients of thermal expansion when embedding; inlaying; when adding layers, when connecting or adding parts and other attachments; when adding other coloration; and when installing mounts and frames.

For example, it is desirable to be mindful of significant differences in the coefficients of thermal expansion between inlays on inventive images and their host surfaces when the inlays are large and completely or continuously bonded to their host surfaces. It is also generally preferable to be mindful of significant differences in the coefficients of thermal expansion between the fiber and the image part to which it is bonded such as when using layers of fiber, dense fiber, tightly woven fiber (e.g., glass cloth), areas of chopped fiber. Also, some polymers expand and contract significantly, while others do not. For example, hydrophilic and absorbent polymers expand and contract at different rates as they absorb substances (like water or paint) and as these substances go out of them. Thus, when using an absorbent polymer (e.g., part or layer, such as a surface preparation stabilizer), it is most desirable that its expansion and contraction not alter its bond to any different compositions on the image undesirably. As another example, mixed polymers (such as stabilizers) are often desirable for use in between different polymers in an inventive image when they have coefficients/parameters of expansion that are significantly or greatly different.

In another example, a polymer is painted with a paint whose vehicle is a bonding cPRM with a compatible coefficient of thermal expansion. Then, before applying a continuous material with a significantly different coefficient of thermal expansion over 90% of this painted polymer, one or a combination of the following three methods may be used to effectively reduce or eliminate the risk to this image's strength and permanence. (1) The initial continuous material is replaced by one with a coefficient of thermal expansion which is as close as possible to that of the polymer. (2) The initial continuous material is cut into smaller pieces and then applied to the painted polymer, e.g., as a discontinuous non polymeric Separating Layer, for instance made of metal. (3) One or more intermediary layers are applied to the painted polymer arranged so that their coefficients of thermal expansion provide a progressive transition between that of the painted polymer and that of the continuous material. Then, the continuous material is applied onto the intermediary layer or layers on the painted polymer.

Regardless of the method of their incorporation, it is preferable for each non polymeric ingredient in contact with cPRM, to be able to withstand the cPRM, the polymerization process (such as its heat), and its inclusion in or on the polymer and in or on the inventive image over time without undesirable consequences to it, to the inventive image, or both. This condition is often preferred for many inlaid, embedded, and attached non polymeric ingredients. If this preferred condition is not met, it may be desirable to create it by making and test samples.

One preferred method useful in many embodiments is to change non polymeric ingredients in a way that protects them from the risk of undesirable consequences resulting from their innate inability (or the risk of this inability), to withstand the cPRM, the polymerization process, to have and maintain the aesthetic desired in the formed inventive image, or to remain permanently as desired in the inventive image over time. For example, many non polymeric ingredients can be sealed or coated with a protecting agent (by spraying), prior to their inclusion in or on inventive images. It may be preferable to seal such ingredients with one or more stabilizers or with substances which contain one or more stabilizers, such as sealants or coatings. For example, a UV light stabilizer can be added into an acrylic medium, a varnish, or in both, to seal small pieces of paper before they are mixed into cPRM, and coating might be applied on organic materials before they contact cPRM. Non polymeric inventive image ingredients might reinforce it in an aesthetically acceptable or desirable way, to withstand inclusion in or on the polymer without undesirable consequences. For instance, small paper forms which will be stirred into a cPRM may be reinforced beforehand by thickening each of them with additional paper pulp, cardboard, wood, thin metal, fiber stabilizer, or a coat of paint. Fiber can be used to reinforce inlaid, embedded, connected, or attached non polymeric ingredients. For example, delicate red rose petals could be sprayed with a transparent, colorless polyurethane varnish to protect their color and form before they are added into cPRM. In addition or instead, one or more stabilizers might be used as sealants. It may be preferable to use one or more stabilizers in one or multiple of the aforementioned sealants or coatings used on non polymeric ingredients prior to their inclusion in inventive image. A paper form may be sealed with an acrylic medium that contains an UV light stabilizer, prior to being inlaid in a polymer inventive image, whereas without this protection, this paper may turn yellow or brown with exposure to UV light, and, it may also be undesirably deformed or damaged by moisture.

Absorbency

In some embodiments, polymer in inventive images can be: absorbent, not absorbent, hydrophobic, hydrophilic, or a combination thereof. These are collectively referred to as "absorbency level" or "absorbent level." One preferred method of forming such polymers is by using particular active ingredients in cPRM and/or one or more particular stabilizers in cPRM, on polymer, or a combination of these (e.g., a fiber stabilizer). In addition or instead, such polymers can be formed using other ingredients in and/or on polymer, such as absorbent papers, paper pulp, colorants and strands of various kinds. Examples of desirable uses of polymer that is hydrophobic, hydrophilic, absorbent, and/or not absorbent are: (1) as a final coat on inventive images, e.g., non absorbent surfaces desired for permanence; (2) as surface preparation stabilizers (so that paint might soak into an absorbent polymer); (3) for forming image supports (such as absorbent image support stabilizers); and (4) for visual effects on inventive images (e.g., with superimposed coloration); or combinations thereof. Among examples of mediums or colorants which might be desirable to superimpose onto absorbent polymer in forming an inventive image are: paints, dyes, inks, primers, binders, or photographic emulsions.

Because the absorbent level quality of the polymer in inventive images can differ from conventional practices, conventional practices which use these qualities (e.g., materials, media and techniques) and effects used in conventional images dependent on these qualities (e.g., effects of painting, drawing and printing on absorbent paper, canvas, or other fabric) can be used with the inventive medium for effects and images that are new and unique. For example, unlike conventional images, all effects using the absorbency level of the invention may typically be transparent, translucent, and/or opaque; colored and/or colorless; combined with one or more other additive and/or subtractive processes (such as incising, carving and/or inlaying); used with a myriad of other aesthetic variations (such as light effects); worked, reworked and controlled; and be as strong and permanent as desired. In contrast, many such options are not possible in conventional image making, particularly using paper or fabric image supports. The following are more specific examples of the absorbency feature of the invention.

Using hydrophilic and/or absorbent polymers, inventive images can be made with new effects of real light, color, real transparency and real spatial depth, e.g., effects of stained, bleeding and poured color. In preferred embodiments, a synthetic absorbent polymer inventive image surface is superimposed by one or more mediums that might for example be paint(s), dye(s), ink(s), primer(s), binder(s) and/or photographic emulsion(s), e.g., which may bond to the absorbent polymer. In preferred embodiments, an inventive image is made using at least one synthetic absorbent polymer capable of absorbing more than, for example, about 20% of its weight in water. In preferred embodiments, an inventive image is made using a synthetic absorbent polymer that is capable of being penetrated by an oil soluble dye. The absorbent polymer(s) in such inventive images might, for example, be polyvinyl chloride or polystyrene. Inventive images made in these embodiments might be further developed, for example, with one or more applications of which might be mixture(s) containing oil soluble dye(s) and solvent(s), or which might be oil soluble superimposed medium(s), e.g., paint(s), dye(s), ink (s), primer(s), binder(s), or photographic emulsions. Absorbent polymer formed in inventive images in these embodiments might be plasticized with a stabilizer to accelerate penetration of the oil soluble dye thereinto.

In an illustration, an inventive image is made using an absorbent polymer such as 2-hydroxyethyl methacrylate (HEMA), mono-glycerol methacrylate, and/or another polymer which either has the same or a greater number of oxygens than glycerol. For instance, using such an absorbent polymer, an initial image support stabilizer is made which is then superimposed by conventional paints and/or inks which absorb into it to varying extents forming a 2D or 3D inventive image painting which may be viewed from one or multiple sides, as desired. In an example, such an absorbent polymer is used (e.g., with a colorant mixed into it) as a surface preparation stabilizer on an inventive image and then superimposed by colorant(s) which absorb into it to form an inventive image. This might be the completed image desired, but if not it might be further processed, such as by incising drawing into it, and then optionally filling in some of this incised drawing with cPRM, such as cPRM that is a colorant (e.g., paint with a cPRM binder which may perhaps be cured by a radiation stabilizer), and/or this image may by superimposed by other coloration on one or more of its sides, e.g., coloration which absorbs into the newly formed polymer.

In preferred embodiments, an ingredient that modifies the absorbency of polymer is added to polymerization reaction mixture or to a polymer. This ingredient is a stabilizer.

In a preferred example, in embodiments, an inventive image is made of a mixed polymer or a copolymer comprised of at least one absorbent polymer and at least one polymer that is not absorbent. Thus for example, the absorbent polymer ingredient(s) might provide the image with aesthetic qualities (e.g., enabling desired further processing such as superimposed applications), while the non absorbent polymer ingredient(s) might provide the image with desired physical, structural and/or dimensional properties such as stability, strength and/or permanence.

In preferred embodiments an inventive image is formed by placing a PRM or cPRM capable of forming an absorbent polymer on a support surface where it polymerizes. The support surface may be a mold, or it may be wood, paper, stone, ceramic, metal, fabric, polymer and/or glass. In embodiments, an absorbent polymer or a cPRM containing at least one polymer that is absorbent, is superimposed on an image support comprised of a different polymeric formulation which provides support to the image, enhancing the structure, stability, strength and/or permanence of the superimposed absorbent polymer layer. In preferred embodiments, an image support (e.g., stabilizer) is made with a first, non-absorbent polymer layer bonded to a layer of a second, absorbent polymer, e.g. made with a synthetic absorbent polymer. In these embodiments, the second polymer may for example, be made with polymer(s) having hydroxyl, amide, amine, ester, or ether functional groups, or, the second polymer might, for example, be made with alkyl acrylate(s), alkyl alkacrylate(s), and/or functionalized derivative(s) thereof. The second polymer might, for example, be made with 2-hydroxyethyl methacrylate (HEMA), it might be made with 2-(Acetoacetoxy) ethyl methacrylate, and/or it might contain no more than, for example, about 4% (by volume) HEMA. The first, non-absorbent polymer layer might, for example, have about 10% (by volume) of absorbent polymer.

When added into or on cPRM or into or on polymer in an inventive image to form or fortify the bond between the polymer and one or more superimposed applications and/or colorants upon it, one or more absorbent polymers, and cPRM or PRM which forms absorbent polymer, are preferred stabilizers.

Inventive images can have effects which rely on the absorbency of polymer being less than or different than that of comparable conventional images, as well as effects which rely on the lack of absorbency of polymer. Examples are effects made by using conventional applications on polymer inventive image surfaces, which are conventionally used on absorbent surfaces, like canvas or paper. For example, among these are inventive images and effects made by working, reworking and controlling applications from bleeding, staining, running and absorbing into inventive images undesirably. Such an effect can be seen in the use of color on the inventive image support illustrated in FIG. 5 VI. which may have an absorbent surface. Also, inventive images and effects can be made in processes in which applications are reworked, e.g., intentionally removed, erased, smudged, rubbed, blotted, etc. (Often working and reworking the surfaces of conventional images is limited and problematic, for instance it tends to fray, tear, or break these surfaces undesirably, e.g., paper or fabric surfaces). Unlike many conventional image supports, many kinds of polymer surfaces of the invention can undergo working and reworking without being undesirably changed in an irreversible manner. The polymers of the invention are not typically fibrous, interwoven, or made of macroscopic strands like many conventional images, though such elements can be used in inventive images e.g., fibers, paper and strands of all kinds can be used as part of inventive images, for example, on and/or in their surfaces.

Each of the following examples may be used in inventive images as monomers, polymers, and/or stabilizers. Among the sources where examples of these products can be purchased is Polysciences Inc. in Warrington, Pa. Each of these examples is preceded by a numerical rating on a scale from 1 to 10, in which 1 is highly hydrophobic e.g., fluorocarbons; 5 is intermediate hydrophobicity/hydrophilicity e.g., poly (ethyl acrylate); 8 is hydrophilic e.g., HEMA; and 10 is highly hydrophilic e.g., starch, poly(acrylamide/acrylic acid) graft, acid sodium salt, (a polymer which will absorb as much as 500 times its weight).

| RATING | POLYMERS AND MONOMERS |
|---|---|
| 2 | Polyethylene, chlorinated, 25% Cl; decyl acrylates and alkacrylates |
| 3 | Poly(vinylidene chloride/acrylonitrile); Poly(4-vinylpyridine/divinylbenzene); N-(Phthalimidomethyl)acrylamide |
| 4 | Glycidyl butyl ether |
| 6 | 2-(Acetoacetoxy)ethyl methacrylate; Poly(N-vinylpyrrolidone/vinyl acetate); Glycidyl acrylates and alkacrylates; Poly(ethylene/vinyl alcohol) |
| 7 | 4-Hydroxybutyl methacrylate; 2-(2-Ethoxyethoxy)ethyl acrylate; Diethylene glycol diacrylate; Diethylene glycol dimethacrylate; Diethylene glycol divinyl ether; Poly(4-vinylpyridine/divinylbenzene) acid salt; Poly(ethylene glycol) monomethyl ether monomethacrylate; Poly(vinyl methyl ether/mono-iso-propyl maleate); Poly(ethylene glycol) diacrylate; Poly(ethylene glycol) dimethacrylate; Vinyl 4-hydroxybutyl ether; 1,1,1-Trimethylolpropane monoallyl ether; Poly(vinyl methyl ether/monobutyl maleate); Triethylene glycol dimethacrylate; Triethylene glycol monomethyl ether monomethacrylate; Polyacrylamides; Polyalkylacrylamides; Poly(vinyl methyl ether/monoethyl maleate) |
| 8 | Poly(2-hydroxypropyl methacrylate); Poly(2-hydroxyethyl methacrylate/methacrylic acid); 2-Hydroxyethyl acrylate; |

-continued

| RATING | POLYMERS AND MONOMERS |
|---|---|
| | N-(2-Hydroxypropyl)methacrylamide; Acrylamide; Poly(ethylene glycol) monomethacrylate; Poly(ethylene glycol)monomethacrylate monomethyl ether; Poly(2-Hydroxyethyl methacrylate) (HEMA) and other methacrylate ester polymers; Bisacrylamidoacetic acid; Hydroxypropyl methacrylate; N-Vinyl-2-pyrrolidone; Poly(2-hydroxypropyl acrylate) |
| 9 | Glycerol acrylates and alkacrylates; 2-Sulfoethyl methacrylate; Poly(styrenesulfonic acid/maleic acid), sodium salt; N-Acryloyltris(hydroxymethyl)methylamine |
| 10 | 2-Methacryloxyethyl glucoside |

It is generally desirable to crosslink hydrophilic monomers when their absorbent qualities will be used in inventive images, particularly if they are highly absorbent. Any of the highly hydrophilic monomers, (e.g., ranked about 8 or greater), might be made into a useful water-absorbing material with the proper crosslinking monomer or monomers. For example, ethylene glycol dimethacrylate is conventionally used as a crosslinker for HEMA. Additional examples of crosslinking monomers (e.g., recommended for ophthalmic uses) are: Hexamethylene diacrylamide; Hexamethylene dimethacrylate; and Poly(ethylene glycol)(200) diacrylate.

In one embodiment, the absorbency of a polymer is modified by the addition of a stabilizer and/or an ingredient into the cPRM used to form it. For example, one or more oil absorbing monomers and/or one or more crosslinking monomers can be added into a cPRM, which will form a hydrophilic polymer to reduce its hydrophilicity. For instance, ethylene glycol dimethacrylate may be added into a cPRM forming HEMA, (e.g., preferably from about 0.5% to 20% and more preferably from about 2% to 15%), to reduce the absorbency and the swelling of the resultant polymer. In a different illustration, dibutyl phthalate is added into a cPRM forming polystyrene preferably from about 5% to 10% to enable the polystyrene formed to absorb oil faster.

Conductive Polymers and Related Subjects

In various embodiments, conductive polymers and monomer precursors may be used in inventive images. They may, for example, enable or create desired aesthetic and/or utilitarian effects in inventive images. In making inventive images, both the process of doping or treating polymer so that it becomes conductive or more conductive, and the dopant or agent used in such processes, are stabilizers. For example, a polymer might be doped so that electrons are removed such as through oxidation (e.g., with chlorine, bromine or iodine vapor, or halogen doping) or so that electrons are introduced such as through reductive doping (e.g., an alkali metal). It is often preferable to use conductive polymer in inventive images in layers with one or more non-conductive layers which may or may not be comprised or entirely comprised of polymer. Often layers of conductive polymers in an inventive image are thin or extremely thin, e.g., enabling them to be very light weight. Thin, for example, can refer to less than about 1 mm, preferably less than about 0.2 mm. In one preferred embodiment, the thinness can be only about 0.01 to 0.1 mm. An inventive image may be partially or entirely made of conductive polymer, but often inventive images made with conductive polymer are partially non-conductive, e.g., non conductive layers and/or portions. Conductive polymer and/or cPRM capable of forming conductive polymer may be used in inventive images. Conductive polymers are, for example, desirable in making inventive images for their ability to conduct electricity, such as for their ability to emit visible light, e.g. using conventional practices to set up and install the image for such purposes. Electroactive conductive polymer can be desirable in inventive images. In selecting and in forming a conductive polymer for use in an inventive image, the level of electrical conductivity can be precisely controlled over a wide range. If desired, a particular conductive polymer can also be blended with one or more other polymers to produce the desired medium for use in an inventive image. Conjugated polymer systems can show electroluminescence. As illustrations, an inventive image made with conductive polymer capable of emitting light is installed so that it gives off light. An inventive image may be made with a polymer light emitting diode (LED) using conductive polymer, or a polymer LED might be an inventive image. A polymer LED inventive image or part thereof might, for example, be made with precursors to homopolymer and copolymer polyphenylene vinylenes (PPVs), such as polymer LEDs made by Cambridge Display Technology of Cambridge, UK.

Light emitting polymer (also called LEP) devices, are a kind of light emitting diode. They are also called polymer light-emitting diode (PLED, pLED or polyLED), organic light emitting diode (OLED, oLED, poly OLED, Poly OLED), and organic electroluminescent (EL).

On an image support or other inventive image surface, conductive polymer might be used for marking, as a colorant, and/or as a coating, which may be electroactive, e.g., which may illuminate if desired. Conductive polymer might be used in and/or on inventive images, for example in the forms of PRM or cPRM inks, paints, colorants, coatings, dots and/or pixels which may be electrically active, e.g., which may illuminate in one or more colors or create other effects in images. These might, for example, be painted or drawn on, and/or they might be applied by an ink jet printing process. A simple coating process can be used to apply conductive polymer (such as a light emitting polymer) to a surface. Conductive polymer might for example, be applied onto an image support (e.g. stabilizer) in a manner which provides the image with a desired aesthetic which may be as simple or as complex as desired, for example, adding a pattern, a design, drawn or painted shapes, alphanumeric shapes (which may or may not be legible), and/or pixels to the image, e.g., using one or more painting and/or printing processes. In various embodiments, conductive polymer layers can be applied by painting and printing application processes, spin coating processes, as well as other processes on an image support or other inventive image surface. Conductive polymer, such as that applied on an image surface by painting and/or printing, might, for example, be connected to at least one electrical power source.

Conductive polymer might also be used in inventive images for batteries and/or solar cells, e.g., solar calls made of polyvinyl alcohol (PVA) and polyacetylene such as in films of the copolymer as those patented as Lumeloid, Alvin M. Marks inventor. Conductive polymer might be used give an inventive image the element of sound or to contribute to its element of sound, e.g., recording sound, responding to sound (such as voice command, footsteps, or music), and/or emitting sound of any kind. Conductive polymer might also be used in inventive images for transistors, capacitors, coatings, photovoltaics, photodiodes, photoconductors, photorefractive devices and sensors, conductive adhesives, conductive coatings, circuits, as inks, paints and/or other colorants, computer memory and hard disks, sensors, for similar uses and for other uses. For example, a polymer solid state laser could be used in an inventive image, feeding energy to it with a conductive polymer "wire" or conduit. In a further example, electricity could be generated in an inventive image from a conductive polymer photovoltaic device that is hidden or that receives an invisible light, or both. Although conductive polymer can be used to reduce static on photographic film and computer screens which are part of inventive images, it is preferable that conductive polymer used for such purpose in an inventive image is not considered part of that image's polymer of the present invention and thus it is preferable that conductive polymer used for such purpose is not included in any calculation of that image's total amount of inventive polymer.

Inventive images made with conductive polymer can be in any shape, form or size desired. Conductive polymer in inventive images (e.g., as a LED) can be formed as desired. It can for example, be in any or all 2D or 3D, non planar or planar forms, as desired, such as in the form of sheets, as films, as fiber of various types such as fabrics (e.g. for use as a canvas); as rods, strips or bar shapes; in volumetric forms (which might be hollow and/or solid), in other forms, and/or in a combination of forms. Conductive polymer in inventive images and inventive images made with conductive polymer, (e.g., images that emit light from conductive polymer) may be transparent, translucent and/or opaque, as desired. Moreover, they might be flexible and/or rigid (e.g., a self supporting image that is partially or completely rigid, or an image that can be rolled up, draped, folded, or flexed). For example, a polymer LED inventive image or part thereof might be on an image support made of polymer, film, metal, foil, glass and/or any other non polymeric material. A polymer LED inventive image, or portion thereof, is preferably transparent, translucent, or partially opaque. An image support (e.g., stabilizer) for such a polymer LED might be transparent, translucent, and/or opaque, it might also have other marking or coloration, other light effects, negative spaces, incising, and/or other aesthetic effects. The polymer LED might for example contribute to the aesthetic of the image, e.g., providing a design, a drawing, light effects such as reflectivity, other light effects described herein, etc. For instance, polymer LED devices might be on commercially available ITO (indium tin oxide) coated PET (polyethylene-terephthalate), and if desired, subsequently encapsulated with a transparent or translucent, rigid and/or flexible barrier on one, two or more sides, e.g., to protect against the ingress of moisture, water and oxygen.

Conductive polymer (e.g., a polymer LED) might be: (a) an underlayer in or on an inventive image, (b) within an inventive image, (c) on one or more of its external undersides and/or front external sides; (d) attached to, connected to, inlaid in and/or embedded in an inventive image, and/or (e) a part of an inventive image which is physically separate from the rest of the image. Conductive polymer enables one or more sides, surfaces and/or internal areas of an image, or all of an image, to be electrically active and/or light emitting in one or multiple emission colors, as desired. Inventive images made with conductive polymer (such as inventive images with polymer LEDs, or other electrically active polymer), might for example, be paintings, drawings, sculptures, constructions, shaped paintings, collages, prints, drawings in space, cutouts, Light Art, Computer Art, Light and Perceptual Art, Video Art, art with film, an Installation, an image that serves as a wall or as an image on a wall, a table, a bench, a window, a tray, a bowl, a floor, graphic design, clothing or fashion design, book design, another kind of design or architecture, a combination of these, etc.

Conductive polymers are one of many ways of creating light emitting image supports (e.g., stabilizers), and inventive images according to the invention, which can, if desired, be further processed (e.g., using additive and/or subtractive processes such as those described herein). Light emitted from an inventive image and light hitting an inventive image can be modified in a many ways, e.g., using coloration, marking, attachments, filters, lenses, subtractive processes, etc.

In various embodiments, conductive polymer can be used to make inventive images using spin casting, and/or printing processes (e.g., ink jet printing processes, lithography, photolithography, soft lithography, high resolution optical lithography, silk screen, block printing, etchings, monotypes, etc). Such processes are stabilizers. In other embodiments, conductive polymer is used in inventive images in melt and/or in solution processing techniques, by blade coating, and/or by evaporation of low molecular weight dyes. For example, polymer (100 nm) might be added onto an image support by spin coating of a solution. As other examples, conductive polymer might be used in inventive images with processes such as: blow molding, calendering, fiber spinning, compression molding, extrusion, coating processes, spraying processes, solution spinning processes (e.g., fibers), casting processes, coating processes, painting, drawing, writing, rolling processes, and/or gel processes.

In embodiments, conductive polymer is used in inventive images in blends. For example, a conductive polymer such as one based on polyaniline (like those made by Panipol Ltd of Porvoo, Finland), might be blended with one or more other polymers, such as polyethylene, polypropylene, polystyrene, PVC, poly (methylmethacrylate), phenolformaldehyde, epoxies, melamineformaldehyde resins, thermoplastic elastomers, etc.

It is important to note that the use of conductive polymers in making inventive images is not restricted in any way by the limitations which typically exist in the conventional use of conductive polymers for other purposes. Therefore, inventive images can be made using conventional or non-conventional practices for using conductive polymer such as those described herein. As an example, conductive polymers are conventionally used in extremely thin layers, even layers, homogeneous layers, typically on image supports that are rectilinear, geometric, smooth, and/or even. Conductive polymers can be used in these ways in inventive images, as desired. Since conductive polymers have no limitations when used in making inventive images, they can be used in a variety of other ways, including unevenly, irregularly, discontinuously, in any thickness desired, in layers that are heterogeneous, in any number of layers with or without other ingredients, or in a combination of these ways, on image supports and/or on other image surfaces of any description, that comprise one or more internal and/or external parts of an inventive image or that comprise all of it, with or without other aesthetic effects or further processing, such as any described herein or known to those of ordinary skill in the art.

In various embodiments, one or more electrodes, parts, layers, batteries and/or other devices (stabilizers) can be added to an inventive image for its use and/or supply of energy to a conductive polymer, e.g., enabling its conductive polymer to emit visible light. As an example, an inventive image is made with one or more layers of conductive polymer (e.g., thin layers) between two electrodes which are stabilizers (e.g., additional layers, preferably thin). It is preferable for each of these layers to be transparent or translucent, however it is often preferable for one of the electrodes to be opaque, e.g., a reflective cathode. For example, one electrode may be indium tin oxide (ITO) and the other might be calcium (Ca), which might be evaporated on in a thin layer. Between these electrodes there might be one or more conductive polymers, (e.g., in layers), such as poly-fluorene and/or poly(ethylenedioxythiophene) (PEDOT). Such inventive image compositions may or may not be formed and/or superimposed on an image support (e.g., stabilizer) made of polymer and/or non polymeric ingredients, e.g., a polymer (such as polyester or heat stabilized polyester), glass or paper image support. This inventive image composition might for instance, be a layer of conductive polymer in between an anode and a cathode (e.g. metal or metallic), for example, in a composition made of at least three superimposed layers, or perhaps even on a fourth substrate layer. When voltage is applied, such as by the use of wires and a battery (stabilizers), positive charge carriers move into the anode (a stabilizer) and negative charge carriers move into the cathode (a stabilizer). Both positive and negative charge carriers migrate into the conductive polymer. They approach each other, combine, and generate an excited state (e.g., neutral), which decays and generates visible light. This might for example, occur many times a second. For example, on each cm of such a layered light emitting polymer composition running at standard brightness, this may happen about 1,000,000,000,000,000 ($10^{15}$) times a second. The specific rate is not critical, and will depend on various factors including the type of material, such that the rate can be altered by one of ordinary skill in the art through routine experimentation. It is preferable to encapsulate polymer LEDs or parts thereof against the ingress of water and oxygen, e.g., using glass and/or polymer, such as epoxy.

In other embodiments, a polymer light emitting device can be made using two superimposed layers of conductive polymer between its anode and cathode. Such a device might, for example, have an anode (e.g., ITO) on a glass or polymer image support, or other inventive image surface. Then it might have two conductive polymer layers (preferably thin or extremely thin). One could be a polymer hole conducting layer, e.g., polyethylene dioxythiophene polystyrene sulphonate (PEDT/PSS) made by Bayer AG of Pittsburgh, Pa. and Krefeld, Germany, for instance, deposited from aqueous solution to form a thin film. The second conductive polymer layer is a conjugated polymer emissive layer (EL), (e.g., such as polyarylene systems, or a polyfluorene), for example, deposited from an organic solution. Then the LED might have a cathode system, e.g., deposited by physical vapor deposition, which might include a low work function metal, for instance, capped with aluminum. It is preferable to then encapsulate the device to inhibit or prevent the inward migration of oxygen, water, or both.

Conductive polymer, such as in the form of polymer LEDs, can be made to emit light in any color or in multiple colors, the brightness of which can be very low, very high or anywhere in between (e.g., as bright as a television screen or brighter), with only a small power source (such as a battery or current from an outlet), and if desired, at a low operating voltage (e.g., about 2 to 6 volts). Such a polymer LED may be an unfinished or a finished inventive image. It may, for example, be superimposed by additional layers of cPRM, polymer or colorants, it may have other light effects, etc., as desired.

Among the valuable properties in the use of conductive polymer to produce light in inventive images (such as in the form of polymer LEDs), are the relatively low power required compared to conventional electrical components such as neon, and the lack of significant heat produced by the emission of light, even over long periods of time. Less power is required than other light sources which might be and have been used in images, which can lead to longer life of the light source. The power source can be any suitable source, but is preferably DC power. In addition or instead, this may facilitate hiding a power source (such as a battery or solar cell) and/or associated materials (such as wires or conduits) from view, and/or facilitate working the visibility of the power source and/or associated materials into the design or aesthetic composition, if desired. The reduced heat output of the light source is typically highly desirable for the stability and permanence of many inventive images, such as images which have conventional image making mediums and materials (e.g., oil paints, colorants containing wax, egg tempera, cellulose paper, photographic mediums, etc.), which can change undesirably with exposure to heat such as that produced by conventional light sources such as bulbs.

In one example, a polymer light emitting device is formed in an inventive image by surrounding a semi-conductive polymer asymmetrically with a hole-injecting electrode (e.g., ITO) on one side, and on the other side, a low work function, electron injecting metal contact (such as aluminum, magnesium or calcium). Radiative charge carrier recombination in the polymer results in the emission of light as electrons from one side and holes from the other recombine. As another illustration, a transparent or translucent polymer or glass image support (e.g., stabilizer, perhaps made of polyethyleneterephthalate also known as PET), might be superimposed by a transparent indium tin oxide (ITO) electrode. Using a spin coating process, a thin film of a semiconducting polymer is superimposed onto the ITO from a solution. Then, the second electrode is deposited onto the polymer using a vacuum evaporation of a metal (e.g., calcium), sputtering, or the like, or a combination thereof.

In another example, a layer of poly(dioxyethylene thienylene) doped with polystyrene sulphonic acid or polyaniline-chloride is used between a layer of indium-tin oxide and an emissive polymer layer. Another example shows the use of two different conductive polymers, (e.g., in superimposed layers), between the two electrodes in forming a polymer LED inventive image. One of these conductive polymers might, for example, be a conductive polymer precursor (e.g., heat-converted into its final form before deposition of the next layer), and the other might be the light emissive conductive polymer. For instance, a conducting polymer layer might be used between the emissive PPV and the ITO in a polymer LED image.

In a further example, a light emitting polymer (LEP) device used in an inventive image is made using an anode, such as ITO, preferably on a polymer image support (though it could be on a glass image support). This is superimposed by two layers of polymer, which are preferably thin or very thin. One is a polymer hole conducting layer, such as a film of polyethylene dioxythiophene polystyrene sulphonate (PEDT/PSS) (made by Bayer AG of Pittsburgh, Pa. and Germany), and deposited from an aqueous solution. The other is a conjugated polymer emissive layer. Then a cathode (or cathode system) is deposited, comprised of a low work function metal, typically capped with aluminum. Then, the device is preferably encapsulated. Another, more specific example of a polymer LED, which can be used in inventive images has ITO as the contact anode on a polymer or glass image support. Then, the hole injecting material is poly(3,4-ethylene dioxythiophene)/poly (styrenesulphonate) (PEDOT:PSS) (from Bayer AG). The light emitting polymer layer can be polyfluorene, polyarylene or polyphenylenevinylene. The device has a low work function cathode material, such as Ca, and it is encapsulated with a lid.

Another example is a polymer LED made with a low work function stable alloy of aluminum as the cathode material, a high PL efficiency PPV precursor and an ITO protector layer. A further illustration provides a thin layer of a conducting polymer deposited (e.g., spin or blade coated) between ITO and PPV copolymer. This central layer of conducting polymer might be polyethylene dioxythiophene/polystyrene sulphonate (PEDT/PSS). The cathode might be a sputtered low work function Al alloy.

In a further illustration, an inventive image has a polymer light emitting device made of one or more spin-cast, extruded and/or printed layers of polymer, on an image surface made of polymer or glass pre-treated with a transparent electrode material patterned (before the polymer is superimposed) to help define the device configuration. The other electrode can be deposited by vacuum metallization and patterned, and the device is sealed in a hermetic package. One or both of these electrodes might, for example, be in linear patterns.

The chemical structure of a polymer and its conductivity can be controlled, engineered, or designed to be appropriate for different aesthetic, utilitarian and other purposes in inventive images, e.g., by altering the polymer's molecular chains. For instance, the chemical structure of a light emitting polymer can be engineered to produce any or all emission colors. This light might be emitted from one or multiple parts, sides and/or surfaces of a single inventive image. As another example, using a solvent to alter the molecular chains of a polymer can change its conductivity, e.g., chloroform decreases conductivity, and m-Cresol increases conductivity, in varying polymers.

In inventive images, light emitted by any portion of the conductive polymer or by all of it, can be any color desired, i.e., one or more colors and/or colorless. Inventive images made with conductive polymers can have full color light emission, if desired, which can be extremely useful in making images, e.g., full color passive and active matrix display, such as created using direct patterning techniques. Moreover, the light emitted can change over time in any way desired. For example, over time, some or all of the light emitted by any portion of the conductive polymer (e.g., even a portion as small as a pixel), or by all of it can change (e.g., in brightness, in color, in direction, it can go on and off, or a combination of these, as desired). Conductive polymer offers fast response, or switching time, on and off. All of these elements can, if desired, be used to contribute to the inventive image's aesthetic, and/or if desired for other purposes, e.g., to give the image an interactive or utilitarian element. Such an inventive image might for example, have a computer as part of it or it might function like a computer screen. Thus, it might have a screen, a computer chip, a viewer input device to control the image (such as a drawing device, trackball, a button, a mouse, voice command, or switch), an optional audio component (e.g., producing sound and/or responding to sound such as to the viewer), or a combination thereof. The inventive image might also present a moving image (e.g., realistic and/or abstract), such as a film or video image or image part, which might be controlled and/or altered by a viewer controlled input device. Viewed from any angle or from multiple angles, the same light, color or image projected by a polymer LED can be seen. In comparison to liquid crystal displays, polymer LEDs do not have to be viewed straight on for the light, color and/or image they display to be seen, and they do not have to be backlit. Polymer LEDs offer high brightness at a wide viewing angle. Organic LEDs are compatible with standard silicon driving circuitry, which may be used as desired in inventive images.

Conductive polymer can be applied onto an image support very thinly (or in any other thickness desired), in layers, in designs, drawings, patterns and/or compositions which can be as controlled and as precise as desired, even if they are complex, intricate, and/or light emitting (e.g., light intensity is proportional to current). For instance, conductive polymer can be applied onto an image support or other image surface in pixels, e.g., using an ink jet printing process. For example, each pixel may be comprised of multiple sub-pixels (e.g., in layers), each of which might for example, be capable of emitting one color, e.g., three sub-pixels, one can emit red, one can emit green, and one can emit blue light. Using conductive polymers, any pixel shape or size is possible and very high resolution can be achieved. Moreover, light emitted by a conductive polymer can have any level of brightness or contrast, even very high brightness and contrast, and switch at any desired speed. Note that although typically pixels are extremely small, in inventive images they may be any size, e.g., from extremely small to large. Pixels may or may not be visibly apparent in actual inventive images.

Like other polymers of the present invention, conductive polymers can be applied to an image support or other inventive image surface using one or more painting and/or printing processes. Ink jet processes are among those preferred for making inventive images of conductive polymers, both charge conducting and emissive polymer layers, and for other polymers. Examples are ink jet practices specially developed for handling conductive polymers, e.g., by Seiko Epson and Cambridge Display Technologies, or by Philips Research of Eindhoven, The Netherlands. Such processes can be used according to the invention to apply conductive polymer in one or multiple layers, on part or all of any size image support, or one or more other inventive image surfaces. Ink jet printing conductive polymer can be done with the level of precision and resolution desired, it can even be done with great precision and a high resolution, e.g., using LEP inks based on poly(dialkylfluorene) derivatives chosen for high luminescent efficiency in blue, green and red.

Specific examples of the use conductive polymers in inventive images will become more sophisticated as the technology is further developed for utilitarian applications in products which are not images, e.g., such as for phone displays, internet appliance displays, utilitarian computer monitors having higher resolution and more sophisticated pixels, instrument panels, clocks, television screens, privacy glass, "smart" windows, batteries, solar panels, cameras, sensors, transparent coatings, fibers such as fabrics, transistors, capacitors, photovoltaics, conductive adhesives, computer memory and hard disks, circuits, photodiodes, lasers, and the like.

In an illustration, a 2.5 inch full color, 16 gray level active matrix display can be made (e.g., with materials from Cambridge Display Technology) that has 200×150 pixels each comprising 9 sub-pixels, 3 per color. Such a display might offer 16 gray levels per color, based on low temperature, polysilicon active matrix technology, using a digital drive scheme, and temporal and spatial dither. Its structure may, for example, have a common cathode efficiently injecting electrons into the lowest unoccupied molecular orbital of the three polymer emitters (i.e., like a conduction band in inorganic semiconductors).

In another example, the source-drain and gate electrodes might be comprised of a water-based ink made of one or more conducting polymers, such as poly(3,4-ethylenedioxythiophene) doped with polystyrene sulfonic acid (PEDOT/PSS, Baytron P from Bayer, Krefeld, Germany). In yet a further example, the active semiconducting polymer might be poly(9,9-dioctylfluorene-co-bithiophene) (F8T2), for example, used in a xylene solution which might be applied by spin coating. Photolithographic processes may also be used to pattern layers of polymer LEDs, such as those processes used by Philips. A further illustration provides the formation of a dot matrix screen made from a thin film of light emitting polymer on a glass or polymer image support, coated with a transparent ITO electrode, with an aluminum electrode evaporated on top of the polymer. Such a design might have the electrodes patterned in orthogonal rows and columns. When current is applied, the area at the intersection of these lines emits light.

In the use of ink jet processes with PRM, cPRM, and/or polymers, a number of variables can be used and/or controlled as desired, e.g., for aesthetic effects as well as practical ones. Different ink jet processes, different PRM, cPRM, polymer, and/or image surfaces might be desired for different purposes. For example, among these variables are the ingredients used in a polymer ink (e.g., the viscosity of the PRM, cPRM or polymer, how it dries, if it bleeds or beads up, etc.), the effect of any ingredients in the ink on the ink jet printer itself (e.g., a solvent dissolving the print head), the ability of the print head to deposit the ink in the manner desired (e.g., for both aesthetic and practical purposes, such as to inhibit ink clogging of the print head nozzle, and in a way so that the print head deposits the ink as desired), the interaction between the ink deposited and the image surface it is deposited upon, and the like. Ink jet processes for conventional polymer LED displays, which typically strive for qualities like precision, control, high resolution, and perfect registration, can be used as desired in making inventive image. The use of ink jet processes for making inventive images, however, does not have the same kinds of limitations, and one of ordinary skill in the art can envision a wide array of applications in accord with the invention herein.

Conductive polymers or polymer LEDs may be formed into inventive images and/or onto inventive images or image supports that are even, regular, flat, planar, rectilinear, geometric, and/or exact, but they are not restricted to such kinds of forms. Conductive polymers and polymer LEDs are formable using a variety of processes in any way, shape or form desired, on inventive images or image supports and/or into inventive images of all descriptions, such as those that are irregularly shaped, uneven, non planar, not flat, discontinuous, in shapes or forms which are not rectilinear and/or non-geometric. Conductive polymer and/or a polymer LED might be used (e.g., disposed) on an image support that is carved, incised, embossed, textured, undulating, angled, rigid, flexible, foldable, discontinuous, or a combination of these, as desired.

It is generally preferred that conductive polymer used in inventive images be stable and permanent, or as stable and as permanent as possible. Thus, it is often preferable that conductive polymer parts, layers, LEDs, other such devices, power sources for any of these, and associated materials are capable of being reworked, replaced, repaired and/or restored if they change over time in an undesirable manner (e.g., if their ability to function decreases or if they stop functioning), and/or if the technology advances in a way which is more desirable for the specific inventive image.

Inventive images made with conductive polymers (e.g., made with any of these devices, made electrically active, and/or made with any of these qualities) can of course be further processed, e.g., painted, incised, developed with additional parts, and/or layers, etc. Such devices and effects might also be added to inventive images which already are developed to any extent, e.g., a polymer LED added to an image support stabilizer that already has light effects such as those described herein, painting, carving, multiple layers, and/or non polymeric parts. Light emitted from an inventive image can be modified in many ways, e.g., using coloration, attachments, filters, lenses, subtractive processes, etc.

Typically, conductive polymers exhibit at least partially conjugated polymer backbones. However, any polymer that is capable of conducting electricity or ions along at least a portion of its backbone can be considered a conductive polymer. Examples of conductive polymers that may be useful in the invention, or in polymer-based (or composite) LEDs or other light emitting devices, include, but are not limited to, poly(p-phenylene)s, poly(fluorene)s, poly(fluorenylene-ethylene)s, poly(phenylene-amine)s, poly(phenylene-imine)s, polyanilines, polypyrroles, polythiophenes, poly(phenylene sulfide)s, poly(phenylene vinylidene)s, polyacetylenes, and derivatives, mixtures, copolymers, or isomers thereof. In one embodiment, derivatives of polythiophene can include, but are not limited to, poly(hexylthiophene), poly(octylthiophene), poly(methylthiophene), poly(dodecylthiophene), etc. In another embodiment, derivatives of polyacetylene can include, but are not limited to, poly[bis(benzylthio)acetylene], poly[bis(ethylthio)acetylene], poly[bis(methylthio)acetylene], etc. In yet another embodiment, derivatives of poly(phenylene vinylidene)s include, but are not limited to, poly(dialkoxy-1,4-phenylenevinylene)s. In still another embodiment, derivatives of poly(fluorene)s include, but are not limited to, poly(dialkylfluorene)s, e.g., poly(9,9-dimethylfluorene).

Such exemplary conductive polymers can be made by a number of different polymerization techniques, e.g., ring-opening metasthesis polymerization (ROMP), bulk polymerization, addition polymerization, free-radical polymerization, condensation polymerization, solution polymerization, emulsion polymerization, latex polymerization, or any other suitable method for polymerizing monomers to form a conductive polymer, and may be catalyzed, if desired. Some conductive polymers are commercially available, e.g., through Aldrich Chemical Company, of Milwaukee, Wis.; Polysciences, Inc., of Pennsylvania, or other suitable polymer supplier(s). In addition, conductive polymers according to the invention may include polymers containing, or polymerized entirely from, non-conductive monomers; indeed, the conductive polymer may be formed by mixing and/or copolymerizing monomers that form conductive polymers with monomers that do not form conductive polymers to form a conductive copolymer or conductive polymer blend.

In addition to, or combination with, these polymers and/or blends, dopants, dyes, and/or complementary materials may be desirable. Examples of dopants include, but are not limited to, metal ions, e.g., Pt(II), Ir(III), etc.; non-metal ions; organic protic acids, e.g., phosphoric or sulfonic acids, such as p-toluenesulfonic acid, and mixtures thereof; and combinations thereof. Examples of dyes include, but are not limited to, low molecular weight and/or branched molecules, e.g., oligomeric polyphenylenevinylenes and/or polythiophenes, such as polythiophene octopus and spiro-6-PP, which are commercially available, e.g., from Covion Organic Semiconductors GmbH of Frankfurt, Germany. Charge transport materials and/or photo-sensitizers may also be added in an amount sufficient to improve the conductivity or light emissivity of the conductive polymers or light emitting materials. Examples of such charge transport materials and photo-sensitizers include, but are not limited to, oxadiazoles, e.g., 2-(4-biphenyl)-5-functionalized-1,3,4-oxadiazoles, such as 2-(4-biphenyl)-5-phenyl-1,3,4-oxadiazole and 2-(4-biphenyl)-5-(4-tert-butylphenyl)-1,3,4-oxadiazole; tetrathiafulvalene; protic and aprotic arylamines, e.g., di- and tri-arylamines, such as 3-methyl-diphenylamine, di-p-tolylamine, tri-p-tolylamine, tris[4-(diethylamino)-phenyl]amine, N,N'-bis(3-methylphenyl)-N,N'diphenylbenzidine, and N,N'-di-[(1-naphthalenyl)-N,N'-diphenyl]-(1,1'-biphenyl)-4,4'-diamine, and hydrazones, such as 4-(dimethylamino)benzaldehyde diphenylhydrazone, 9-ethyl-3-carbazolecarboxaldehyde-N-methyl-N-phenylhydrazone, 4-(diethylamino)benzaldehyde diphenylhydrazone, 4-(diphenylamino)benzaldehyde diphenylhydrazone, 9-ethyl-3-carbazolecarboxaldehyde diphenylhydrazone, 4-[2-[5-[4-(diethylamino)phenyl]-4,5-dihydro-1-phenyl-1H-pyrazol-3-yl]-ethenyl]-N,N-diethylaniline, and 4-(dibenzylamino)benzaldehyde diphenylhydrazone; polymers containing phenyl moieties in their side groups, e.g., poly(vinylcarbazole)s, such as poly(9-vinylcarbazole), poly (vinylnaphthalene)s, such as poly(1-vinylnaphthalene), poly (styrene sulfonate)s, such as poly(p-styrene sulfonate) and poly(styrene-co-styrene sulfonate) copolymers, and mixtures thereof; and combinations thereof. In addition, carbon nanotubes and/or fullerenes may be added in an amount sufficient to improve the conductive or emissive properties of the materials.

Examples of conductive polymers for use in inventive images from Aldrich Chemical Company of Milwaukee, Wis. are: 1) Polythiophenes, such as Poly(3-hexylthiophene), regioregular; Poly(3-octylthiophene), regioregular; 3-Methylthiophene; and 3-hexylthiophene 2) Poly(1,4-phenylene sulfide) 3) Polyacetylene precursors—these might, for example, be used because Polyacetylene is an electroactive polymer with large, third-order, non linear optical activity and high conductivity. It may be formed by polymerization of phenyl vinyl sulfoxide and the subsequent elimination of benzenesulfenic acid. Polyacetylene may be prepared by a ring opening metathesis polymerization (ROMP) of cyclooctatetraene. Examples of polyacetylene precursors which might be used are Phenyl vinyl sulfoxide, and 1,3,5,7-cyclooctatetraene. 4) Poly(phenylene vinylene) Precursor-p-Xylylenebis(tetrahydrothiophenium chloride).

Further examples of conductive polymers and related inventive image ingredients (e.g., for use with light sources and/or as part of light sources in inventive images) offered by Aldrich follow and are described herein.

Polybutenes, monoepoxide, Epoxy-functional macromonomer. Terminal epoxy group, e.g., for incorporating hydrophobic character. It may, for example, contribute impact and water resistance and low temperature flexibility. For example, it is conventionally used as a modifier for coatings and adhesives, unsaturated polyesters, electrical compounds and foams.

3-Dodecylthiophene, conducting polymer precursor; 3-Hexylthiophene, conducting polymer precursor; 2,5-Dibromo-3-decylthiophene; and Poly(phenylene sulfide); might be used to make inventive images.

Poly(3,3,4,4-biphenyltetracarboxylic dianhydride-co-1,4-phenylenediamine), amic acid (solution), (e.g., solution in 1-methyl-2-pyrrolidinone). This may for example be used because it is a high purity material with controlled metallic content. It can form insoluble polyimide upon heating. Polyimide might, for example, be used for its good thermal, mechanical and electrical properties.

DAB-Am-4, Polypropylenimine tetraamine Dendrimer, Generation 1.0 Synonyms: [N,N,N,N-tetrakis(3-aminopropyl)-1,4-butanediamine], Soluble in water and methanol. For example, it is conventionally used for coatings, adhesives, plastic stabilizers, catalysts, conductive films, and surfactants.

Polysulfone, e.g., offers electrical properties that are maintained over a wide temperature and frequency range, high impact resistance, and high resistance to radiation degradation. For example, these are among it is conventional uses: microwave cookware, appliance covers, surgical tools, automotive electrical components, and printed circuit boards.

Polyphenylsulfone, a transparent thermoplastic engineering resin, e.g., can offer outstanding color, transparency and impact strength to 200° C., as well as the best overall chemical resistance of the commercial polysulfones. For example, these are among its conventional uses: medical devices requiring sterilization and electrical connectors and switches.

Poly[bis(benzylthio)acetylene], Poly[bis(methylthio) acetylene], and Poly[bis(ethylthio)acetylene] might be used to make inventive images, e.g., each form a highly stable, highly conducting material when irradiated with laser light in thin layers.

Examples of conductive polymers offered by Polysciences Inc. are: Poly(3-methylthiophene), Poly(3-octylthiophene), and Polypyrrole. Elf Atochem North America Inc. in Philadelphia, Pa. offers a series of translucent polymers they call "technical polymers" which can be used to make images. Examples are Kynar®, Kynar 500® and Kynar Flex® PVDF polyvinylidene fluoride, e.g., the homopolymer of 1,1-difluoroethene; Rilsan® PA Polyamide resins (e.g., may be rigid, flexible, conductive, semi-flexible).

General Electric (GE) of Pittsfield, Mass. offers Valox® Polybutylene Terephthalate Insulating Film, e.g., it offers excellent electrical properties, and ease of fabrication. GE's Valox® PTX™ Polyester Film, e.g., it offers excellent electrical properties and it offers excellent chemical resistance and high tensile strength, available with one or two sides pretreated for better adhesion to ink. Valox® PTX™, e.g., is heat stabilized for lower thermal shrinkage. GE's Ultem® Polyetherimide Film, e.g., it offers high temperature resistance, low moisture absorption and excellent electrical properties. Ultem® 1000 is thermoformable and might, for example, be heat sealed to a wide variety of metals and thermoplastics. Also, GE's Lexan® XL10 polycarbonate sheet might be used to make inventive images, e.g., it might be further processed into curved forms, it is thermoformable, cold-formable (for example, to tight radii), it is virtually unbreakable, with UV resistant coating on one of its sides; it is backed by a 10 year warranty against yellowing, loss of light transmission and breakage; and it also provides high insulation values.

Poly(chlorotrifluoroethylene) offered by Aldrich Chemical Co. might, for example, be used because it is a high performance crystalline engineering thermoplastic; with chemical resistance, near-zero moisture absorption, low creep, high optical transparency, high electrical insulating capacity, non-flammable and low coefficient of thermal expansion. For example, among its conventional uses are for packaging films, and electroluminescent display panels.

Poly(trimellitic anhydride chloride-co-4,4-methylenedianiline) Contains N-methylpyrrolidone, offered by Aldrich Chemical Co. For example, among its conventional uses are for: conformal coatings, passivation agent, insulating varnish, LCD alignments, and corrosion resistant coatings.

Such exemplary conductive polymers, polymer light emitting devices, and dopants, dyes or complementary materials therefor, for inventive images can be obtained commercially, e.g., from: Covion Organic Semiconductors GmbH of Frankfurt, Germany; Philips Components (Philips Electronics, Philips Research) of Eindhoven, The Netherlands; Cambridge Display Technology in Cambridge, United Kingdom; UNIAX Corporation (owned by DuPont) in Santa Barbara, Calif.; Eastman Kodak of Rochester, N.Y.; eMagin Corporation of Hopewell Junction, New York; Three-Five Systems of Tempe, Arizona; RiTEK Display Technology Company and RiTdisplay Corporation both of Taiwan; Alien Technology™ of Morgan Hill, California; Semiconductor Energy Laboratory (SEL) of Japan; Zipperling Kessler and Company of Ammersbek, Germany and Buffalo N.Y.; Delta Electronics Inc. of Taiwan, R.O.C.; Hewlett-Packard Company of Palo Alto, Calif.; Seiko-Epson of Japan, Cambridge UK, and California; Sumitomo Chemical Company of Japan; Pioneer Electronic Corporation of Tokyo, Japan; Dow Chemical Company of Midland Michigan; Osram Opto Semiconductors GmbH and Co. (Osram OS) of San Jose, Calif.; Toshiba of Japan; Tokki Corporation of Japan; Microemissive Display Ltd. of Edinburgh, UK; Panipol of Porvoo, Finland; Bayer AG of Pittsburgh, Pa. and Germany; Hoechst AG in Frankfurt, Germany; Aldrich Chemical Company of Milwaukee, Wis.; Polysciences Inc. of Warrington, Pa.; General Electric of Pittsfield, Mass., and Elf Atochem North America Inc. of Philadelphia, Pa.

The following are further examples of conductive polymers, polymer light emitting devices and related ingredients and processes which might be used in inventive images.

Baytron products by Bayer are useful in inventive images. Baytron P might for example, be poly(3,4-ethylenedioxythiophene)/poly(styrenesulfonate) or PEDT/PSS also known as PEDOT/PSS, e.g., supplied as an aqueous dispersion. Bayer has it available in a variety of coating formulations designed for use on specific substrates, e.g., PVC, polycarbonate, glass, polypropylene and polyethylene. If desired, these coating formulations may be applied by conventional methods, such as by brushing, spin coating, printing processes, spraying, and roller coating techniques. Bayer offers Baytron TP AI 4061, e.g., Aqueous poly(styrenesulfonic acid) or PSS; as well as Baytron TP AI 4062, e.g., Aryl Polyglycol Ether. Bayer also offers the monomer and the catalyst, they are Baytron M (the monomer) and Baytron C (the catalyst or oxidant). For example, Baytron M is (100% 3,4-ethylenedioxythiophene) or EDT, and Baytron C is 50% by weight iron (III) toluenesulfonate in butanol. For example, Baytron M and C are typically mixed at a ratio of 6:1, the mixture might be diluted with solvents, and adhesive(s) and/or binder(s) might be added to it (e.g., polyvinyl acetate or epoxy silanes). Bayer provides literature on the use of these products.

Covion and UNIAX make polymer LEDs which, for example, might be 6000 pixel passive matrix addressed devices. UNIAX has an OLED display, e.g., of 25,000 pixels. Covion and SEL have made a high resolution active matrix driven OLED which can be used and/or adapted for use in inventive images. The peripheral circuits may for example, be driven by integrated polysilicon thin film transistors and the contrast ratio of the panel may for example, be greater than 100. The device might, for instance, have a peripheral circuit integrated BGA panel comprising 640×480 pixels with a white color OLED driven by high speed polysilicon thin film transistors with a digital gray scale. SEL's voltage applied time control may enable smooth gray scales to be created by controlling the OLED light emitting time. All this is useful in certain inventive images.

Ormecon Chemie's electronic grade polyaniline (PAni or PANI) conductive polymer which is the core of a family of ORMECON™ products (Zipperling Kessler and Company) can be used to make inventive images, for example in electronic thin film devices, and organic and polymeric LEDs, such as products by Covion made with PANI used in inventive images. For example, the electronic grade of polyaniline, (e.g. a water-based dispersion that has controllable conductivity and fine colloidal particle size) is useful for making OLEDs for inventive images.

DuPont Displays is offers a wide variety of compact, light-weight Poly-OLED devices. These examples and/or devices like them might be used in inventive images. For example, DuPont's products offer Active and Passive Matrix, such as the 96×64 Tetrus™ and 160×160 Millennia™ monochrome displays, and full QVGA, Active Matrix and Color Poly-OLED displays.

Though these specific products are small in size, such devices could be used in multiples in inventive images and/or one or more similar LEDs could be made of a different size for inventive images. DuPont's LEDs all have low power consumption and do not require a backlight.

Tetrus™ Poly-OLED is another example which DuPont offers for use in cell phones, pagers, consumer electronics and automotive applications. For example, it is a thin (2 mm thickness), light-weight (7.2 gram weight), efficient Passive Matrix (PM) drive Poly-OLED device; approximately 1½" square; with a 96×64 pixel matrix that can provide up to 5 lines of bright, high contrast text, simple graphics, symbols and animated icons, on thin-format glass substrate; and row and column driver solutions can drive the matrix.

In embodiments, the "smart" backplanes might be used for polymer LED devices comprised of silicon integrated circuits for the direct driving of pixels rather than using amorphous silicon thin film transistors on glass which are conventionally used in liquid crystal display technology.

In a further example, DuPont's The Millennia™ Poly-OLED Display Module is designed for higher density and information content applications including PDA's, PPCs, GPS, automotive and other mobile devices. For example, Millennia™ is a higher pixel count monochrome Poly-OLED display, light weight, and thin (3 mm thick); with a 160×160 pixel efficient passive Matrix (PM) drive on thin-format glass substrate that allows multiple icons and text, detailed maps, and basic graphic images; a new row and column driver solutions will drive the entire 160×160 matrix; and the substrate size is about 62.52 mm×61.15 mm (approximately 2½" square).

DuPont's QVGA Poly-OLED passive matrix (PM) display for example, offers a full 320×240 (QVGA) pixel matrix with monochrome display, on thin-format glass substrate is made for use in high end PDA's, PPCs, other large format handhelds, advanced GPS systems and other devices that require detailed image and text display in a compact and power conservative format. The higher resolution of this device may be compatible with a wide range of images, including maps, multiple lines of text and/or icons, yet it is for example, only 3 mm thick. The ultra fast switching speed of OLED might allow full motion video and other fast moving images to be displayed without distortions or artifacts. Its substrate size is, for example, 62.52 mm×61.15 mm (approximately 2½" square).

DuPont's Active Matrix Poly OLED Display Module is an example offered for PDAs, PPCs, smart phones, GPS systems, web enabled portable devices, for mobile and portable Video entertainment and computing applications, and other high resolution displays. It may for example, have these specficiations. It may may have an Active Matrix of 320×240 pixels, a QVGA (320×240) pixel matrix in a thin, lightweight format, a thin-format glass substrate. It may allow the display of full motion video images, high-resolution graphics and dozens of lines of text. The active matrix design may simplifie system design, and offers custom driver IC. DuPont's core OLED technology may offer inventive images full 640×480 (VGA), 4-Bit Grey scale display format, LTPS TFT back plane and fast, Video capable switching.

DuPont's full color Poly-OLED display module is offered for consumer electronics, cell phones and other 3G devices. For example, it may be an efficient, compact passive matrix display with a 96×64 pixel 1½" display on thin-format glass substrate that may provide a basic information display in a distinctive multi color format. Custom driver may be available to achieve bright, distinctive color displays for enhanced functionality. DuPont will soon be offering larger versions of display, for color in PDAs, PPCs and other handheld and automotive applications.

Polymer LEDs offered by The Dow Chemical Company of Midland, Mich. and by Delta Optoelectronics Taiwan R.O.C. may be used in inventive images. Examples are their pLED displays based on Dow's polyfluorene chemistry, e.g., a two layer film, thinner than a human hair which emits light when exposed to electricity. Illumination Polymer Technologies Inc. of Illinois and Nevada (a Goeken Group Company) offers polymer LEDs which can be used in inventive images, such as PolyBrite™ which can be extruded into various shapes and forms and can be molded for specific inventive images.

The full color 96× (64×3) passive matrix display (e.g., with 16 gray levels) described in the article cited below "Color Patterning with Ink Jet Printing for Passive Matrix Light Emitting Polymer Displays" by E. I Haskal, M. Buechel, et. al. or a similar display may be used in inventive images. Dot matrix displays by Cambridge Display Technology can be used in inventive images, such as their 60×16 dot matrix display. Polymer LEDs with more sophisticated, and/or variable color displays may also be used in inventive images.

Organic EL full color display by Pioneer may be used in inventive images, such as their display with 320×RGB×240 dot pixels, 0.33 pixel pitch, emitting 260,000 colors (64 tones/each color).

PolyLED matrix displays such as that by Philips, e.g., with 87 rows, 80 columns and 256 gray levels may be used in inventive images. Lucent Technologies Inc.'s Bells Labs in Murray Hill, N.J. is offering printable conductive polymer semiconductor circuits that can be used in inventive images. In embodiments, Back Layer™ technology by Luxell Technologies Inc. of Mississauga, ON is used with conductive polymer in inventive images.

Conventional practices, such as those in the fields of polymer science, engineering, electronics, materials science, and physics might be used to make inventive images with reference to the detailed description herein. Conventional practices described in various publications may be used to make inventive images, such as chemical formulations and methods, according to the invention described herein. For example, suitable conductive polymer materials include one or more of those described in the following references known to those of ordinary skill in the art, including: Secret Behind High Efficiency of Light Emitting Polymers, at <http://www.cdtltd.co.uk>; H. Sirringhaus et al., "High Resolution Ink-jet Printing of All-Polymer Transistor Circuits," Science 290: pp 2123-26 (2000); G. Schopf et al., "Polythiophenes—Electrically Conductive Polymers," *Advances in Polymer Science*, Vol. 129 (December 1996) Springer Verlag; *Handbook of Organic Conductive Molecules and Polymers: Charge-Transfer Salts Fullerenes and Photoconductors*, H. S. Nalwa (Ed.), John Wiley & Son Ltd. (March 1997); *Electronic Processes in Organic Crystals and Polymers*, 2nd Ed., M. Pope and C. E. Swenberg, Oxford University Press, New York, N.Y., 1999; K. Heeks et al., "High Performance Light Emitting Polymers For Colour Displays," Published on the web at <http://www.cdtltd.co.uk>; E. I. Haskal et al., "Color Patterning with Ink Jet Printing for Passive-Matrix Light Emitting Polymer Displays," Published on the web at <http://www.cdtltd.co.uk>; S. Cina, "Recent Developments at Cambridge Display Technology,"Published on the web at <http://www.cdtltd.co.uk>; S K Heeks., "Light Emitting Polymers For Full Colour Display Applications", published on the web at <http://www.cdtltd.co.uk>; P. May, "High Performance Precursor Light Emitting Polymers," published on the web at <http://www.cdtltd.co.uk>; N. Yu et al., "Technology-Polymer-LEDs," Covion Organic Semiconductors GmbH, published on the web at <http://www.covion.com> Nov. 20, 2001; D. Braun et al., "Electroluminescence from Light-Emitting Diodes Fabricated from Conducting Polymers," *Thin Solid Films* 216(96) (1992); C. H. Lee et al., "Sensitization of the Photoconductivity of Conducting Polymers by C60: Photoinduced Electron Transfer," Phys. Rev. B 48 (20); 15425 (1993); C. Zhang et al., "Improved Efficiency in Green Polymer Light-Emitting Diodes with Air-Stable Electrodes," *J. of Electronic Mat'ls*, 23(5);453 (1994); C. Halvorson et al., "Optical Computing by Use of Photorefractive Polymers," *Opt. Let.* 20;76 (1995); Q. Pei, et al., "Polymer Light-Emitting Electrochemical Cells," *Science* 269;1086 (1995); F. Hide et al., "Luminescent Polymers Promise Novel Lasers," *Laser Focus World* 33;151 (1997); F. Hide et al., "Conjugated Polymers as Solid-State Laser Materials: Conjugated Polymers as Solid-State Laser Materials," *Synth. Met.* 91;35 (1997); A. J. Heeger, "Light Emission from Semiconducting Polymers: Light-Emitting Diodes, Light-emitting Electrochemical Cells, Lasers, and White Light for the Future," *Sol. State Comm.* 107(11);673 (1998).

In various embodiments, conductive polymer is used to create or enable one or more aesthetic elements in inventive images. For example, this conductive polymer may emit visible light, it may affect light transmission or the direction thereof, image color, movement, mobility, sound, form, structure, one or more other formal elements, or a combination of these. Such conductive polymer may, for example, be a transparent coating or layer on or in an inventive image.

In some embodiments, inventive images can be interactive. Conductive polymer may be used to create this interactivity, and/or it may be created by another means. Such inventive images might have computers, camera, control devices, microphones, recording devices, movable parts, changing light effects, changing colors, changing forms, projections, video, film, devices that play sound, printers, sensors, and the like, as desired.

In various embodiments, one or more formal elements of an inventive image or part(s) thereof is varied or changed, using energy such as electricity, heat, light, and/or magnetism. After the image is finished, this variance or change of one or more of an image's formal elements may or may not continue and/or be visible, e.g., the finished image may have changing or variable formal elements. Such effects might be created using conductive polymer, and/or one or more other mediums, materials and/or devices in inventive images. For example, exposure to electricity or voltage might cause or enable aesthetic and/or functional elements of an inventive image or part thereof to change or vary, such as its transparency, its translucency; other aspects of the manner in which it relates to light (e.g., the direction of its light or its reflectivity); the hue, the value, and/or the intensity of its color; its use of film, video and/or sound; any other interactive devices or features it may have, other formal elements and/or combinations of these. In another example, an image or a part thereof varies according to changes in the temperature around it, e.g., due to the use of crystal violet lactone, for example in a PRM and/or in a colorant that is in and/or on an image. Inventive images of these embodiments might be exposed to energy in any way desired, e.g., continuously or for controlled and/or uncontrolled time periods. The variance or change in the image might be controlled directly and/or indirectly or in any other manner. For example, it may be controlled by a switch or other device, with or without human initiation, such as a timer, a computer, a camera, or a sensor (e.g., responding to:

a viewer's presence, sound, light, change in the environment, or a combination thereof). Such variance or change might be controlled by a viewer speaking, or pressing or touching part of the image, such as a button or a sensor. As an illustration, such variance or change might even be controlled from a distance, and/or regularly, e.g., an image's formal elements changed via wireless communication (or broadcast) and/or changed daily, weekly or monthly. Such effects can be desirable to use or control visible spatial depth and other formal elements in images of the invention. Such effects can also constitute or enhance interactivity in an inventive image. In other examples, an inventive image's form is changed using electricity, which may enable an inventive image or part thereof to be mobile. Electricity might run one or more devices in an inventive image, such as a camera, a printer, a screen, a display, a projector, a monitor, a computer, a fan, a light source, a recorder; a radio, a machine or player that emits sound (e.g. music), or the like.

In embodiments, a colorant, paint or ink is used in and/or on inventive images that can be varied and/or changed, as desired, using energy such as electricity. The change or variance in these images can be done in any manner and at any rate desired, e.g., changing part or all of an image very slowly, very fast or at any rate in between. Thus, for example, moving images, full motion images, video and film images can be made in various embodiments. (Refer to the prior descriptions of the fast response or switching time conductive polymers offer for use in inventive images, as well as their full range of emission colors, etc.).

In some embodiments, the colorant, paint or ink used in and/or on inventive images that can be varied and/or changed, as desired, using energy (such as electricity) is made using tiny microcapsules of transparent or translucent fluid (e.g., microcapsules of a polymer, each of which may be about the diameter of a human hair). In the inventive image, each microcapsule might be capable of functioning like a pixel. These microcapsules are placed between electrodes, at least one of which is at least partially transparent or translucent. Within each of these microcapsules there are suspended particles (e.g., pigment) of one or more colors, e.g., white and black; or white and red, blue, green and/or yellow. Each suspended particle either has a negative charge or a positive charge. A microcapsule might contain particles with a positive charge and/or particles with a negative charge, e.g., it is often preferable for a microcapsule to contain both. Suspended particles can move within their microcapsules, e.g., moving to the side of the microcapsule that is against one of the electrodes. So, when one electrode is negatively charged, it draws the positively charged particles to the part of the microcapsule that is against that electrode. If that negatively charged electrode is transparent or translucent, the color of the positively charged particles drawn to it, is visible at that spot on the inventive image. Likewise, when one electrode is positively charged, it draws negatively charged particles to the part of the microcapsule that is against that electrode. If that positively charged electrode is transparent or translucent, the color of the negatively charged particles drawn to it is visible at that spot on the inventive image. Thus, if a microcapsule that contains both positively and negatively charged particles is in between a negatively charged electrode and a positively charged electrode, the particles will position themselves in opposite areas of the microcapsule, against the oppositely charged electrodes. Thus, to the extent that one or both electrodes are transparent or translucent and to the extent that any other part of the inventive image which is against each electrode is transparent or translucent, the microcapsule with show a color on one or both sides of the image.

As an illustration, microcapsule A is right next to microcapsule B, both between electrodes on a polymeric or non polymeric inventive image support. Both microcapsules contain the same particles in two colors. They have black particles, which are negatively charged, and either blue or white particles, which are positively charged. The electrodes over and under microcapsules A and B do not have the same charge. The transparent electrode is negatively charged over microcapsule A and positively charged over microcapsule B. The electrode beneath microcapsule A is positively charged while the electrode beneath microcapsule B is negatively charged. Though the electrodes above the microcapsules are transparent or translucent, the electrodes beneath the microcapsules which are on an opaque image support cannot be seen through. Thus, the color of the particles inside the two microcapsules is visible only through the side of the image with the transparent or translucent electrode. The color of the particles drawn to the electrode on the image support side of these two microcapsules is at least substantially hidden from view. Thus, because of the different charges above and below the two microcapsules, the color of the two microcapsules on the image is different. One microcapsule appears black and the other appears either white or blue. If the electrical charges in the electrodes are all reversed, the colors seen will reverse positions—the black microcapsule will appear either white or blue, and the microcapsule that is either white or blue will appear black.

An inventive image might have any number of microcapsules, in and/or on it, e.g., hundreds, thousands, millions, or many millions of microcapsules, as desired. By the arrangement of microcapsules, the choice of suspended particles within them, and controlling and varying the charge on the electrodes, the colors that are visible at different spots or pixels on the inventive image can be created, varied and changed, thereby creating, varying and changing aesthetic elements like lines, forms, and colors, in the image or part thereof.

Such an electronic image typically requires only a low level of electricity, (e.g., perhaps about 2 to 6 Volts), which has advantages such as those described above for polymer LEDs. To form such an electronic image, circuitry might be applied onto an image support using conventional practices, e.g., circuitry applied onto a polymer image support. If desired, this circuitry can be controlled by an external and/or internal driver. Microcapsules containing colored particles as described above might be suspended in a liquid carrier medium, e.g., in PRM, cPRM or polymer. The medium can be applied using any method desired, e.g., by printing processes such as screen printing or ink jet printing, and/or by painting. The medium may therefore be applied in any pattern, design or drawing desired, e.g., for aesthetic or functional purposes. Such practices are used by E Ink Corporation of Cambridge, Mass. for written documents, such as electronic books and newspapers. Such electronic inventive images or parts thereof may be further processed, as desired, e.g., with added coloration, layers of polymer, light effects, etc.

In various embodiments, electrochromic mirrors, coatings, and/or effects are used on or in inventive images. For example, such a mirror, coating or effect changes its surface and/or its use of light (for example darkening it) in response to an electrical charge, e.g., when a sensor detects the presence of bright light, the image darkens. Examples are electrochromic mirrors made by Gentex Corporation of Zeeland, Mich. Conductive polymers might be used in such inventive images. In some embodiments, inventive images or parts thereof function as electrochromic windows, "intelligent" windows, "smart" windows, and/or it enables them have these kinds of effects, whether or not these images function as transparent windows or not. Such images can vary, control, block, and/or reduce the amount of light, the color of the light and/or other properties of the light that can pass through them. Such effects may be created in inventive images using conductive polymers. Also, in certain embodiments, "switchable" mirrors, the effects of switchable mirrors and/or similar effects are used to make inventive images or parts thereof. For example, switchable mirrors, or the effects of them, can be used in inventive images, such as the switchable mirrors made by Philips Research in Eindhoven, The Netherlands. Inventive images of these embodiments might be made with conductive polymers. Examples of switchable mirrors can change from a reflective to a transparent state and back when voltage is applied and turned off. It is possible to modify this effect and create variations of it as desired in inventive images, e.g., for aesthetic purposes. In switchable mirror inventive images or parts thereof, made using the same technology as Philips or made with technology that is similar or related, a rare-earth metal is induced by exposure to hydrogen, to convert to its ionic hydride. The hydrogen can be transported into a transparent hydrogen storage electrode when energy (e.g., voltage) is applied and back when it is switched off. If desired, such features can be part of a system or a "smart" system of inventive images e.g., a system in which one or more aesthetic elements and/or functions of an image are controlled, varied, and/or changed over time. For example, such features can be part of a smart system that varies or effects the properties of light that pass through the image or part thereof, e.g., varying or effecting the amount of light, the path of light beams, the color of light, and/or its other properties in the inventive image.

The inventive images herein are not limited by the restraints which conventionally determine the designs of items made using the conventional practices described in the paragraphs above and in other conventional practices, because inventive images need not serve the same utilitarian functions. This leads to a wide array of aesthetic possibilities. For example, a mirror, a window or an effect like that in a conventional mirror or window, which is part of an inventive image, need not be smooth, even, consistent, or planar, and need not have the same light properties as a conventional mirror or window, e.g., it may have distortions, any other irregularities desired, as well as further processing such a superimposed layers. In making inventive images, conventional practices such as those described in the paragraph above, can be used in any manner desired. Various conventional chemicals, processes, and the like can be used to make the inventive images of the invention, as will be readily determined by those of ordinary skill in the art.

In certain embodiments, suspended particle devices are used in inventive images, e.g., in between layers. In these devices, the random positioning of particles suspended in a material, liquid or film inventive image layer and/or part inhibits or prevents light from passing through until an electrical charge causes these suspended particles to align or position differently, thereby modifying the amount of light passing through the inventive image layer and/or part, which has increased or decreased transparency or translucency than before the electrical charge. The use of such suspended particles might create a filter in an inventive image that changes over time, (e.g., quickly), as desired, e.g., controlled by a switch, a timer device, a viewer-controlled device, or the like. Mirrors or mirrored surfaces in inventive images might also have layers or parts with these kinds of suspended particles. The suspended particles in such layers and parts of inventive images might for example be liquid crystal, including liquid crystal dispersed (e.g., droplets) in a layer or matrix of polymer (which is preferably transparent or translucent, and typically thin, e.g., a conductive polymer), in an inventive image, sandwiched between two conductive layers and/or electrodes (which are preferably transparent or translucent and typically thin also, e.g., layers of ITO). Moreover, the entire layered form might then be superimposed on one or both sides by a polymer (like polyester) and/or by glass. Such technology is currently used in cars, windows and privacy glass.

As an alternate example, the polymer layer or film with the dispersed liquid crystals might be sandwiched between layers of polyvinyl butyral (PVB), then, if desired, glass might be superimposed on one or both sides. Alternately or additively, glass coated with PVB might be superimposed on one or both sides of the polymer layer or film with the dispersed liquid crystals. For instance, a conductive layer comprised of polymer with suspended particles such as dispersed liquid crystals, is sandwiched in between electrodes (e.g., ITO). Then, this is preferably sealed or encapsulated to inhibit or prevent the ingress of water, oxygen, or both. For example, it might be superimposed by polyester on one or both sides. In addition, or instead, PVB and/or glass are superimposed, e.g., as separate layers.

In other embodiments, a liquid crystal display, optionally illuminated, is used in an inventive image. Typically, electronic practices (e.g., electricity and electronic processes) are used in inventive images with liquid crystals.

In certain embodiments, polymer in an inventive image serves as insulation for one or more other parts thereof, e.g., it is insulation for a conductive polymer in the same inventive image.

As examples, the inventive images shown in FIGS. 2, 5.X., 14.IV., 44 (preferably made without the vertical, tube shaped, light bulb shown in the center of the drawn form labeled i.), 82, and 84 may be electrically active, and/or they might be changed or varied by the use of energy such as electricity, solar power or heat. Any of the images in these illustrations might have coloration of one or more kinds on and/or in them, e.g., paint, light, collaged materials, and/or embedding. For example, these images might be made with; (a) a colorant (e.g., a paint, cPRM, ink and/or light) that can be varied or changed using energy (such as electricity or heat), e.g., as described above, (b) pixels of light and/or of color, in any size, e.g., as described above, (though typically pixels are extremely small, in inventive images they may be any size, e.g., from extremely small to large), examples of such pixels which may be any size are illustrated in the images shown FIGS. 5.X. and 82 (even though in actual inventive images such pixels may or may not be as visibly apparent as they are in these illustrations), (c) one or more conductive polymers, (e.g., as described above), (d) one or more polymer LEDs, (e) an electrically active layer or application of microcapsules (such as those described above), (i) a layer with liquid crystals which changes with electricity (e.g., as described above), (g) a sensor and/or other device that is responsive to a form of energy, (h) one or more electrochromic mirrors, effects, or layers; smart window effects or layers; and/or switchable mirror effects or layers, (e.g., as described above), (i) another kind of electrically active layer, application, part, or image support, (e.g., as described above), (j) a combination thereof. Any or all such images might be further processed, as desired, e.g., using additive and/or subtractive processes, and might, for example, have one or more formal elements changing over time with the use of energy such as with electricity. For instance, their color, light, transparency, and/or translucency might change over time in a manner that is as controlled as desired, and this change may or may not require human interaction, initiation, or any aesthetically undesirable, visible parts (like electrical wires or cords, or an undesirably visible device providing energy and/or light).

The images shown in progressive stages FIGS. 2, 82, and 84 might, for example, show light, color, transparency and/or translucency changing over time shown in different stages. The progressive stages of the images illustrated in FIGS. 2.I and 2.II, (labeled as stages a, b, and c, in both), show that such a change in light and/or color can also change other formal elements, because the subject matter, compositional arrangements, lines and forms of these two images changes as the stages a, b, and c progress. FIGS. 2.I. and II. each show three progressive stages of these images from both sides, (the sides are labeled side 1 and 2, thus, e.g., FIG. 2.I. is shown in stage a from both sides as image a.1. and a.2. and so on). FIG. 82 shows an inventive image in two progressive stages marked I. and II., and FIG. 84 shows an inventive image in three progressive stages marked I., II. and III. The images shown in FIGS. 2.I., 2.II., 82, and 84 may progress through the changes shown in the stages illustrated at any rate of speed desired, and they do not have to progress from stage to stage in a patterned order or in a consistent pace, e.g., they may change randomly. The gradations shown in the image in FIG. 14.IV. might be light, color, transparency and/or translucency changing in gradations over time.

Each inventive image shown in FIGS. 2., 84 and 84, like other inventive images shown and/or described herein, can be declared complete at any stage in its development as a discretionary decision by its image maker or image makers. The inventive images shown in FIGS. 2, 5.X., 14.IV., 44., 82 and 84 can be further processed at the discretion of their image maker or image makers (e.g., using additive and/or subtractive processes), like other inventive images shown and/or described herein. These inventive images, as with others illustrated in herein, may have multiple and/or different interpretations.

Further Processes of Creation—Workability—Adding and Subtracting Matter

The medium of the present invention typically offers full and free workability, reworkability and controllability which does not diminish during or after formation of the image. Processes for working with the medium typically can be reworked and controlled, e.g., reversed or changed. This creative freedom and aesthetic control can be a substantial advantage which many conventional practices do not offer.

Additive and/or subtractive processes can typically be used to make and/or rework inventive images, one or more times, at one or more stages in the image's formation or anytime thereafter, as desired. In various embodiments, more cPRM, polymer and/or one or more other ingredients are added to an inventive image, (e.g., to its polymer). In various embodiments, cPRM, polymer and/or one or more other ingredients are subtracted from an inventive image, e.g., by cutting, sanding, sandblasting, other abrading processes, carving, engraving, cutting, chiseling, incising, and/or by breaking it, using any of a wide variety of tools, and/or by hand. The addition and/or subtraction of polymer and/or other ingredients typically offers unprecedented workability, reworkability and controllability in making inventive images and it can create and/or affect one or more formal elements of an image. Those of ordinary skill in the art will be able to envision many other suitable additive and/or subtractive processes for use in working the medium of the invention.

Additive and subtractive processes might be used on one or more selected areas and/or on one or more entire surfaces or sides of an inventive image, as desired. It is often desirable to develop polymer inventive images or parts thereof (e.g., image supports) in layers or layered applications. One or more layers of polymer can be added to and/or removed from entire image surfaces or sides, or one or more selected areas of them. A myriad of ingredients which are not made or not principally made of polymer inventive medium can be added to an image e.g., applied, attached, embedded, inlaid, painted, printed, drawn or written on image, using new or conventional practices. These are merely a few examples of ways that polymer can be added to an image: (i) cPRM can be placed in contact with an image, or with part thereof, e.g., by putting the image in a mold, and/or by building a mold on the image (e.g., with oil formulated clay walls), and/or without using a mold; (ii) polymer can be bonded to a polymer image, e.g., using a bonding agent such as a bonding substance, for instance, by using the same or a different cPRM to bond it to the polymer image, and/or by forming a mechanical bond with the image (e.g., by using SSI and a bonding substance like cPRM, by using hardware); (iii) more cPRM and/or polymer can be added to a polymer image in other ways, or using multiple methods.

In forming an inventive image, any amount of polymer desired can typically be added to and/or subtracted from the image or part thereof, as desired, at any time or at multiple times during and after its initial formation, e.g., in layers, applications, and/or in parts. Removal can be accomplished even if a long time (e.g., ten years or more), has passed. When two contiguous polymers are different, however, it is typically preferable that they bond. For example, at least one of them might be a mixed polymer, and they might share a common monomer and the catalyst appropriate for polymerizing it, which would enable them to bond to one another, or for example, two contiguous polymers may bond chemically and/or mechanically. Generally, when forming or reworking an image or part thereof (e.g., when connecting image parts, layering, making other applications and other bonds, etc.), it is preferred that its surface area or areas of contact be clean, e.g., free of any undesirable matter such as dirt and oil, particularly if that matter will weaken a bond being formed or be undesirably visible. It is also preferred that any polymer, and any other materials, media, objects, and/or devices other than polymer added, attached, or connected to an image be clean on the area, or areas of contact. This preference is for both structural and aesthetic purposes. Some examples of exceptions to this general preference are those images or part thereof in which the structural and/or the aesthetic effects of not cleaning the polymer and/or other surfaces which will be in contact with the polymer are desired, despite the possible undesirable risks and effects.

The basic addition and subtraction of polymer to and from polymer in inventive images offers profound changes, for example, enabling new images and new effects in images as well as important solutions to prior limitations. For example, part of all of one or more applications on an inventive image may be reformed or removed, e.g. even if these applications have already dried, cured, set or hardened, and even if these are conventional applications such as layers of paints, ink, collage, photography, etc. A 2D inventive image can be made into a 3D inventive image, and this same 3D inventive image or a different 3D inventive image can be made into a 2D inventive image. A layer, application or part applied on an inventive image which is not exactly as desired, can be reformed as desired or removed. Then, as an example, the area of the inventive image where the layer, application or part once was can be reworked, e.g., so that there is no evidence of reworking, or so that a new layer, application or part can then be added, as desired. Thus, conventional paint applications on an inventive image, such as those that are not applied as desired or those that have changed undesirably (e.g., discoloring or damaged), can be removed and reapplied. Cracks in an image can be repaired, broken parts can be fixed, etc. Adding and subtracting matter to and from inventive images can also expand the use of transparent and translucent spatial depth in images, with or without coloration, e.g., in painting and drawing. Uses and effects of spatial depth in transparent and translucent painting, printing and drawing which were impermanent, impossible, and inconceivable in conventional images, are now open to exploration using the present invention. The use of additive and/or subtractive processes of the present invention enables the formation of images that are not possible or problematic using conventional practices, such as oil painting.

Figure 65:
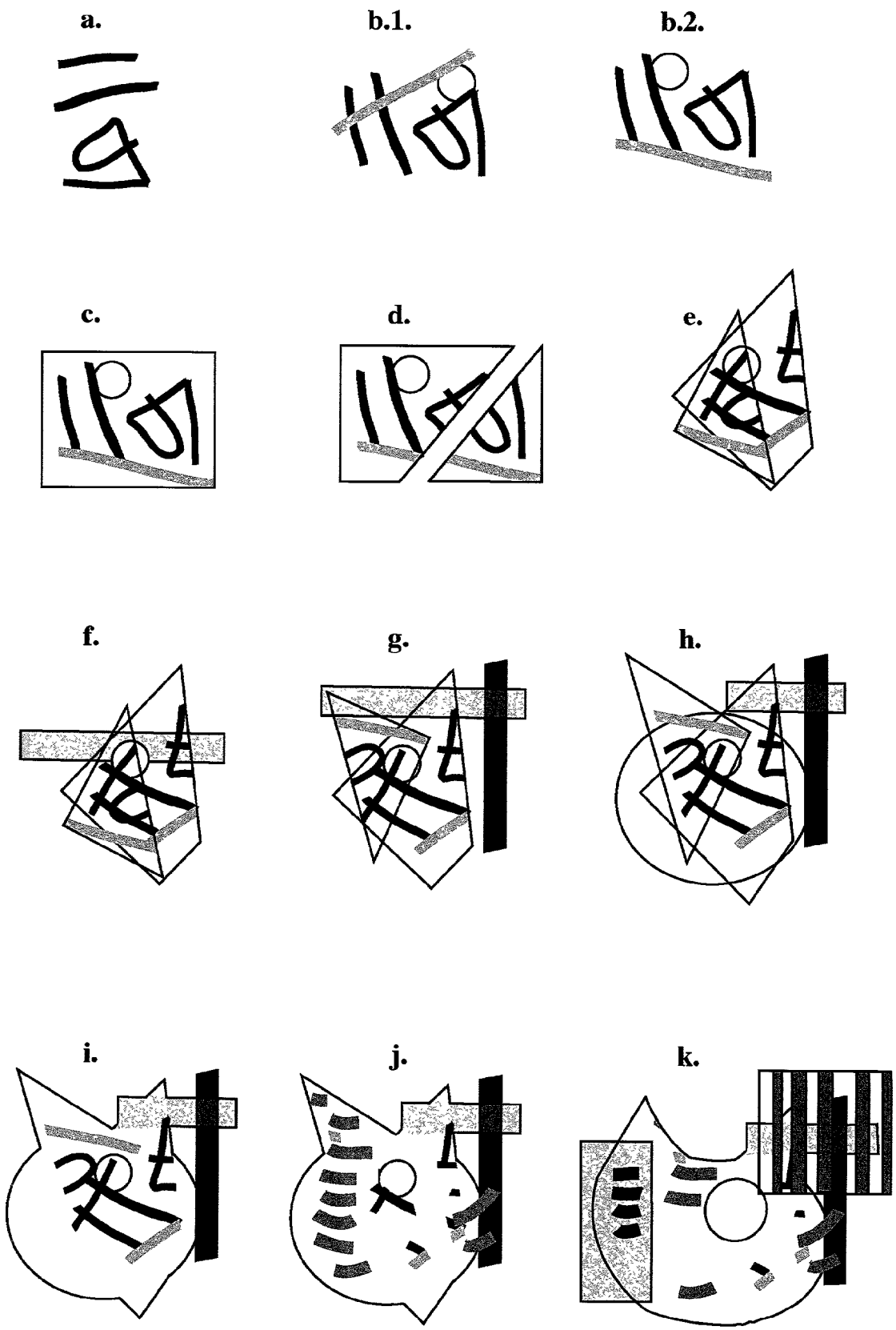
FIG. 65 shows workability in making inventive images without an initial image support.

In painting and/or sculpting on a polymer image support (e.g., a stabilizer), an image maker deciding that this polymer image support is too small, too large or not the right shape, form or structure for his idea, can typically modify these elements as desired using additive and/or subtractive processes, spontaneously if desired, so that the image realizes the idea, e.g., without compromising the image's surface or permanence. In comparison, conventional practices often limit or prevent the ability to make such changes. The inventive medium typically enables a sculptor to modify the size or shape of the image spontaneously as it is developed. Again, this is not possible using many conventional practices, particularly when working with transparent or translucent images such as glass. FIG. 65. shows an example of the extent to which formal elements like structure, form and surface, can be freely changed, even many times through an inventive image's development, as this Fig. illustrates twelve stages in the development of one image, which might be done spontaneously and may be reversed as desired. As another example, inventive images might be partially or entirely formed in a subtractive process of removing matter from its mass. Moreover, the workability, reworkability and control available in the use of the inventive medium typically enables an inventive image of one art form to be made into another different art form as desired, e.g., an inventive image sculpture can be made into a painting, a table, a wall or a window, etc.

In another embodiment, a crack or hole in an inventive image can be filled, using any method, means, and manner desired. Such processes are typically workable, reworkable and controllable. A preferred means of filling some kinds of polymer cracks or holes is to first construct a mold around them as desired (e.g., with oil formulated clay walls), and fill it as desired with cPRM. When the cPRM hardens, the mold can be removed. Fiber, various polymers, or other materials can be used to reinforce filled cracks or holes as desired. It is preferred that cracks too small to be filled with cPRM, such as hairline cracks, be expanded enough so that they can be reworked or repaired as desired (e.g., sand, carve, drill, them wider, or combinations of these). As discussed herein, fiber can be used to reinforce filled cracks, holes, and other areas of inventive images where greater strength and permanence are desired.

Processes for adding and/or removing polymer from inventive images can be done in a carefully controlled, precise, deliberate manner, with a high level of craftsmanship and skill, such as to form a detailed texture, a precise incised or highly realistic drawing or design, or to incise easily legible text on a polymer. Processes for adding and/or removing polymer can be carried out in a rough manner or in a manner in which little control is exercised, unskilled control is exercised, no intentional or conscious control is exercised, e.g., with a low level of craftsmanship and skill. In addition or alternately, polymer addition and/or removal can be done in any manner between these two extremes. For instance, undesirable cPRM or polymer can be removed as desired, e.g., with cutting and sanding tools. Among the preferred methods of reversing polymer removal in an inventive image are adding cPRM and/or connecting one or more pre-formed polymers, as desired. In addition, polymer can be added or removed during the gelation stage, typically as soon as it has gelled firmly enough to carry out the process(es) desired. It is frequently preferable to cut and carve the polymer medium during its gelation, e.g., as in FIG. 83, described below. It is generally preferable to wait, however, until after gelation is over and the polymer is hardened or formed to sand, chisel, and/or abrade it by other processes.

In a further embodiment, applications of one or more materials, media, objects, devices, processes, and/or interactions, other than polymer are at least partially removed or reversed from a polymer inventive image. Throughout processes of removing matter from a polymer, one or more new aesthetic elements might be added to it, intentionally or unintentionally. Such added aesthetic elements are generally as workable, reworkable and controllable (e.g., as reversible) as their own composition permits. For example, sgraffito or a similar technique can be used to scratch, cut, incise, carve engrave, or sand a drawing into coloration (e.g., paint) on a polymer. Because the process of removing matter from the medium can be controlled as desired, each new aesthetic element formed by removing matter can be formed in a controlled manner, in an uncontrolled manner (e.g., randomly), and/or it can be formed in a manner between these two (e.g., with moderate control).

To rework and control inventive images, a variety of processes (such as additive and subtractive processes) can be used, with a variety of tools, and/or without tools e.g. by hand, using fingers, sandblasting, beadblasting, saws, drills, "Dremel" tools (made by Emerson Electric in Racine, Wis.), Paascche "AEC Eraser Set" (a hand held tool that projects abrasive material such as aluminum oxide; Paasche is in Harwood Heights, Ill.), agents such as water; solvents (such as turpentine, acetone and mineral spirits); paint removers; cleaners (such as those made for cleaning hands, dishes, those made for industrial cleaning); and combinations of these.

Processes of removing matter from a polymer can, for example, be used in some embodiments to rework and control applications and effects as desired, e.g., removing paint, collage, ink and/or other coloration. In one example, when applied on polymer medium of the invention, coloration such as conventional image making mediums (like paints e.g., watercolors) typically become as workable, reworkable and controllable as desired (e.g., reversible and repairable). In addition, on polymer medium of the invention, coloration can have real light hitting it, and reflecting into and back out of it from one or multiple sides of the image (e.g., the front, the back and the sides). This light can be from a variety of sources, the polymer medium may also have other light effects and/or it can emit light (e.g., refer to examples provided herein). Moreover, the polymer medium can have coloration in any thickness or shape, with or without real variable layers of spatial depth. These features are typically not available with many comparable conventional images. Many inventive images offer greater workability, reworkability, controllability and variety of effects than conventional practices. Among examples are inventive image paintings made using conventional paints and conventional painting processes (with or without the additional use of other paints and painting techniques, e.g., using cPRM as a colorant or paint).

Paper and other conventional materials can still be used in inventive images if desired, (attached to, inlaid or embedded). For instance, a painting on polymer that is transparent and/or, translucent can be displayed in front of a white surface (such as a wall, or a white material like metal, paper, wood or polymer) which would serve some of the same functions as conventional image supports (like paper or canvas) and/or which could be used as an underlayer in the inventive image (e.g., the white reflects light back through the transparent paint to the viewer).

On polymer of the present invention, conventional image making mediums (like watercolors) can typically be as workable, reworkable and controllable as desired, even in unlimited superimposed layers. In an example, applications such as coloration and marks (including transparent and translucent painting applications of conventional paints and other conventional practices) can be applied onto polymer inventive image surfaces (such as those which are absorbent), as desired, with much fewer irreversible undesirable issues or consequences than are typically encountered using conventional practices. Moreover, such applications, coloration and marks are typically as workable, reworkable and controllable as desired. In an illustration, a wash using any conventional paint (e.g., acrylics, gouache, tempera, oils) applied onto paper will absorb into that paper, usually quickly and sometimes before the entire area of the paper which is getting the wash application has been painted. Here are some typical consequences, which may or may not be desirable, all of which can be avoided using the inventive medium. (1) The wash may bleed uncontrollably, e.g., bleeding into other colors. (2) The wash may color the paper unevenly, which may or may not be desired, e.g., its perimeter may be darker than its internal area, or different ingredients in the paint wash may absorb into the paper differently leaving visible signs. (3) The paper may buckle (expand) where the wash is applied, and stay this way once it dries. (4) The wet areas of the paper may be too fragile to further process as desired, before they dry, and/or after they dry. For example, drawing in pencil on wet paper or on paper that has been worked with previous applications may fray or tear its fibers or indent it. (5) The wash may not be reworkable (particularly its shape), and if it is reworkable, its reworkability is likely to be limited, problematic or both, e.g., the only way to rework it may be to cover it up, for example, with an opaque application, and it is likely that the wash will not be removable at all, not even to lighten it by removing some of its coloration. The inventive medium and polymer inventive image supports (such as stabilizers), typically enable these limitations and problems to be controlled as desired, or avoided completely, opening up new possibilities for image making and images.

Attempts to rework images using the invention, particularly when erasing, may have fewer or no visible damage on the surfaces of these images. For example, ordinary applications of conventional drawing materials (e.g., pencil, pastel or charcoal) often get into the fibers of the paper so that these applications cannot be reworked as desired (e.g., erased), and often attempts to do so leave irreversible visible undesirable marks on the image. Also, during conventional processes of drawing on paper, the natural oil in a normal image maker's hands (and sometimes arms too) might make irreversible, undesirable visible marks on the paper which cannot be removed, or this normal oil gets into the drawing application (e.g., into the graphite, the pastel or the charcoal) limiting or preventing the ability to rework that area as desired (e.g., erase). In comparison, marks made using conventional practices on polymer inventive image surfaces, such as marks made using conventional image making materials and media as well as oil marks, can typically be reworked as desired (e.g., erased).

Processes for the removal of matter from polymer inventive images can create or affect other formal elements. In the following two examples, a very dark, translucent, phthalo green paint which evenly covers the entire polymer surface is partially removed. Example 1, the green color is partially removed, evenly over the entire painted surface by sanding, sandblasting, and/or beadblasting. Once it is partially removed, the green paint is no longer just translucent, it is transparent, with an altered hue, value and intensity. Thereafter, this medium can be further processed as desired, e.g., more paint can be added onto it, for instance a yellow wash might be applied over part of it using conventional practices. Example 2, the polymer inventive image's green paint is partially removed in a deliberately controlled uneven manner to simultaneously add both a geometric design and a drawing of three apples onto this image. The paint removal which creates the geometric design is done by first sandblasting the polymer with selected parts of its green surface masked so that they are not changed by the sandblasting at all. The only parts of the polymer image's surface not covered with this protective mask are those areas exposed through its negative cut-outs. Thus, these are the only areas which the subsequent sandblasting hits and abrades. Then, the mask and its adhesive are removed from the polymer and the green medium surface has its paint selectively removed on 25% of its surface in the desired geometric shapes which are higher in intensity and lighter in value than the color on the rest of this polymer surface, and they have become transparent while the rest of this image's surface has remained translucent. Then, for example, a hand held Dremel tool and a variety its small sanding and cutting bits might be used to incise a large drawing depicting three apples over said image's surface. Some of the incised lines of this drawing might then be sanded and carved further so that they have different widths and depths. As a result, of its variations, the incised lines of this apple drawing have multiple colors.

As further examples, all of the inventive images described herein and shown in the Figures can be reworked as desired, e.g., changing one or more of their formal elements.

Compositional Arrangement

The compositional arrangement of inventive images are unlimited and typically workable, reworkable and controllable as desired. Using the present invention, a compositional arrangement can be made, and then if desired, it tyically can be further worked, reworked and controlled as desired, repeatedly if desired, over any period of time, e.g., typically in a WYSIWYG process, in a sight unseen process, in a pre-planned process, in a spontaneous process, or in a process that combines these. The compositional arrangement which can be formed using just cPRM and one color are infinite. The use of compositional arrangement can bring real light and real spatial depth into images as never before, and affect other formal elements typically without lessening the inventive image's strength, its permanence, or its other desired elements undesirably.

When considering compositional arrangements, one or more parts of images can be rearranged, adjusted, or modified; painted, carved, cut or enlarged; removed or minimized; developed, integrated, and unified with other parts, with other formal elements, and in their relationships to the image as a whole. By making images in parts, their compositional arrangements, forms, and structures can be made as desired in a myriad of variations, using real space, in addition to or instead of other forms of space. The ability to create in parts using the inventive medium image offers freedom, aesthetic possibilities and control, which was heretofore limited or non existent. The Figs. show a variety of examples of inventive images made in different compositional arrangements, many of which are images made in multiple parts such as the images shown in FIGS. 65-67 and 79.

In some embodiments, images can be made using multiple solid and/or hollow volumetric forms. In some embodiments, images can be made of multiple planes, multiple rods, and/or multiple volumetric forms. In embodiments, an image, or part thereof, made of multiple parts, has two or more layered parts, with any specifications desired. For instance, two or more layered parts may form a compositional arrangement by being physically connected to one another, contiguous, with one or more parts physically separate from the rest, and/or with some or all of the parts connected to a common element such as a common mount, base, stand, or support or structure (e.g., the wall, the ground, a mantle, a beam, the ceiling, the floor). In some embodiments in which parts of inventive images are layered, inventive images are made with one or more parts visible through one or more of its other parts. For example, the part which is visible through the polymer of an image might be its mount, another polymer component, and/or a non polymeric part such as one or more neon lights, LEDs, wooden shapes, metal parts, a painting on a stretched canvas, a drawing on paper, a drawing on another polymer part, other light sources, a photograph, a mirror or a combination of these. Two or more of the layered parts may be physically connected to one another or contiguous, with one or more other physically separate, layered parts. Layered parts in inventive images might be alike or different (e.g., made with various aesthetic variations, for example, they might be colored in any way; they might be transparent, translucent, partially opaque, or opaque; their forms might be flat, textured, hollow, solid, flexible, rigid, or curved; they might have embedded objects, inlaid objects, air bubbles, or negative cut-out spaces within them; or they might have combinations of these and any other variations desired). An inventive image might also be comprised of two or more layered polymer components, none physically connected together.

Figure 79:
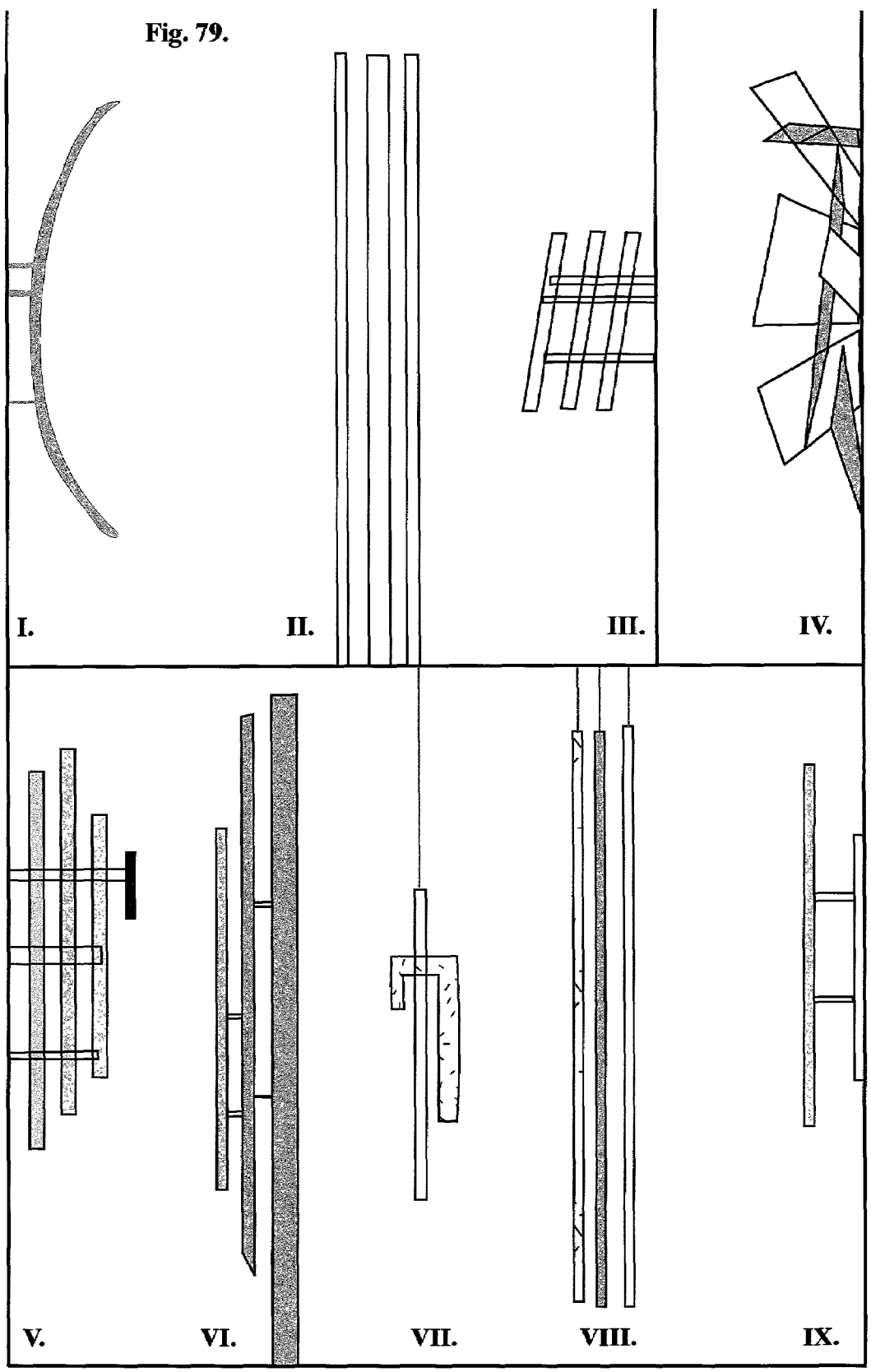
FIG. 79 shows examples of ways a variety of inventive images are displayed.
Figure 79:
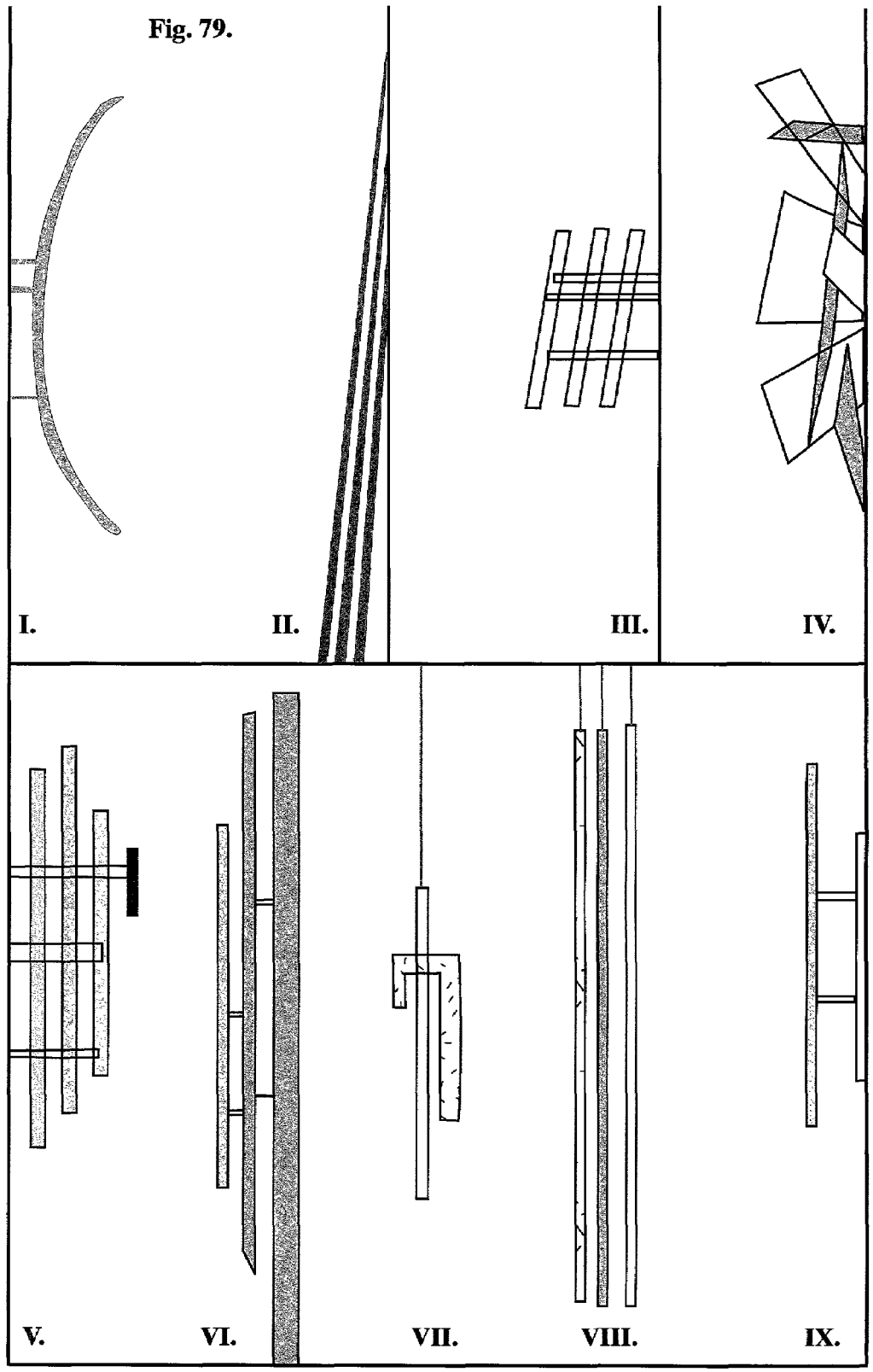

In one example, the inventive image in FIG. 79.VIII. might be comprised of three polymer components or image supports (e.g., stabilizers), each measuring roughly 24"×35"×0.75". The supports might be hung from the ceiling, parallel, about a half an inch to an inch apart from one another, using two barely visible, strong, wires or cords on each polymer component. The six external surfaces of these three hanging polymer components might all have coloration, e.g., painting using mostly transparent colors and a few opaque colors, and/or coloration from light. Line drawing might also be done on them. As a result, viewers would perceive these three separate polymer components simultaneously as a single unified whole composition. If such an image is mounted near a white wall, the light reflected off of the wall will enhance the transparency and the light effects of the image's three layers, as well as its color and other formal elements.

Further Creation Processes

Inventive images can be formed in any process or processes desired, as will be readily understood by those of ordinary skill in the art. In an example, inventive images or part thereof are made which are positive cut-outs, but these can be rigid, flexible or both; transparent, and/or translucent; they can have internal designs and coloration; they can emit light or have light effects; texture, etc. See FIG. 4. For instance, (a) polymer can be cut into the desired shape to make a cut-out, (b) a cut-out can be cast in polymer, (c) a cut-out can be made by connecting multiple parts, (d) a cut-out can be made by partially or completely covering, backing or encasing one or more forms with cPRM and/or with polymer (such as covering, backing or encasing materials, devices, found objects, or image supports, e.g., paper forms or forms made of the inventive medium), and/or (e) a cut-out is formed by hand (with or without tools) using a malleable polymer, or (f) a combination thereof.

In various embodiments, inventive images are made in a process which is completely or partially spontaneous. In certain embodiments, 2D and 3D inventive images can be made in a process which is controlled as desired, ranging from complete control (e.g., even preplanned) to no control, or no conscious or intentional control (e.g., chance and accidents are used). Thus, 2D and 3D inventive images can typically be made with any degree of precision and craftsmanship, detail, intricacy and delicacy desired, ranging all the way from one extreme to the other.

Inventive images can be made by one or by multiple image makers who may or may not be working collaboratively. In an example, the first image maker(s) or the first group of image makers might make various 2D and 3D polymer forms that are transparent, translucent and/or opaque; flexible and rigid; and regularly and irregularly shaped, such as boxes, planes, rods cubes, blocks, forms with multiples of these, and forms with combinations of these elements. Each of these images can have one or more of the following five variations. Variation (1) One or more of its polymer surfaces are prepared to bond to superimposed applications made by one or more other image makers after being transferred (e.g., these polymers have surface preparation stabilizers). Thus, these polymers may be used as image supports e.g., stabilizers. The first image maker or makers might make the image colorless or colored, with light effects or other further processing. Applications superimposed by the second image maker(s) might be made using conventional practices and/or new practices such as those herein. For instance, some or all of an image's surfaces might be prepared to bond to: collaged elements, wax based applications, oil based applications, water based applications, other conventional applications (e.g., graphite, pastel, charcoal, silverpoint, fresco, sgraffito, gold leaf), multiple different kinds of applications, different areas of its surfaces might be specially prepared in different ways for bonding to different kinds of applications, surfaces might be prepared for making particular effects (e.g., painting, drawing or light effects, or for carving, or incising), or surfaces might be prepared for a combination of these.

Variation (2) The polymer has a visible light effect added or formed by the first image maker or makers. For instance, it has a light effect which cannot comparably be made in a strong, permanent conventional image, e.g., an iridescence, fluorescence, reflectivity, a dichroic effect, a photochromic effect, a lens, and/or a light source such as EL Lamp(s) or LED(s). Variation (3) The polymer has been marked as an image might be marked when it is being formed, e.g., internally, externally or both. For example, the image has some painting, drawing, printing, carving, photography, and/or collage, on it, in it or both. It might have an underlayer (e.g., a surface preparation stabilizer), a sketch, contour drawing, some broken color applications, and/or printed graphics, on it and/or within it. When an image is only marked with words (e.g., written or printed), it is preferred that it also have one or more of the other four variations on this list. Variation (4) It has been shaped as an image might be shaped at the beginning of its formation. For example, it is recognizable as a known 2D or 3D art form such as a cut-out, a drawing in space, a canvas; a construction made of multiple parts which physically connect to one another and to a wall (but which might be disassembled for transport; a planar polymer, e.g., with colored items, carving, negative cut-outs and/or painting, within it, externally, or both); it is a light emitting image like a screen which might be interactive; or it is recognizable as image in another way, e.g., as the 3D form of a horse, as the 2D form of a leaf, or as an image support for sculpture by a known artist. In a further example, the image is a polymer form which has clearly been developed to such an extent that it could and might be considered a finished image. Variation (5) A frame, a backing, a support, a base and/or a mount has been added to the polymer image which will enable it to function as a particular recognizable form of fine art, such as wires, rods, a base, or a rod. Or, mount parts for a rigid planar image painting are made which will install it securely onto a wall holding its transparent polymer plane securely the distance desired out from the wall. Among these mount parts there might be a metal plate which goes on the wall behind the image, making its installation more stable, while also offering the second image maker the option of further processing this plate as a second layer of this painting, e.g., visible through its outer polymer layer as perhaps an underlayer of color.

These images can then be further processed, reworked or both, by their second or further image maker(s). This might transform them into different art forms and/or change their function. For instance, an image made as fine art might have an additional function, e.g., an interactive function, functioning as a wall or as a window, or an image window might be made into an image sculpture by its second image maker.

In some embodiments in which inventive images are made by more than one image maker, PRM may be prepared and transferred to others for further processing. For instance, PRM is transferred to a second image maker with image making instructions, with a mold, with added light effects, LED(s) or other sources of light, with other added coloration, with one or more stabilizers, and/or with an image support which may be a stabilizer.

One of the most desirable features of the present invention is the ability to make images as desired and then rework them as desired. Such working processes are desirable because they typically enable image makers to explore possibilities with their ideas while minimizing or avoiding such risks as possibly having to start again, recreate the creative effort, or lose time or money, without diminishing or eliminating aesthetic options (e.g., its light), without the loss of the image's strength or permanence, and without other undesirable effects. If desired, image makers can explore to find their vision, find and form the image that expresses their vision, and try variations of their images without knowing if they will work (e.g., structurally, aesthetically, functionally).

In some embodiments, polymers are made according to the Principle of Whole Development and Unity to the extent desired and/or in the manner desired, largely possible because the inventive medium typically offers image makers workability, reworkability, controllability and creative freedom as desired, without lessening the achievement of other goals desired in them. For example, the ability to use various forms of light and light effects in a polymer or an image does not typically alter the ability to form that polymer medium or images with the level of strength and permanence desired. The invention typically permits the real spatial depth of inventive images to be workable, reworkable and controllable as desired, e.g., permitting and even expanding the use of texture, attachments, inlays, embedding, multiple transparent and/or translucent layers, nonrectilinear perimeter shapes, and/or negative cut-out spaces within paintings.

In various embodiments, polymer of the present invention and/or cPRM can be malleable and/or formable by hand. Preferably, these inventive mediums are transparent or translucent. For example, a malleable or formable polymer or cPRM might be pressed, pulled, stretched, squeezed, rolled or otherwise manipulated, so its form is augmented, redesigned, cut, ripped, etc.

The processes of creation which typically can all be used as desired to form inventive images, are among the most highly preferred by image makers today, largely because the present invention typically offers: (a) workability, reworkability and controllability as desired (ranging anywhere from little or none, to free and full); (b) WYSIWYG processes; (c) the present invention is very versatile and can incorporate all kinds of non polymeric ingredients, processes, and/or interactions; (d) the inventive medium typically offers image making according to the Principle of Whole Development and Unity to the extent desired and in the manner desired; and (e) the inventive medium can make images with an enormous range of visual results.

The inventive medium typically enables negative space, spatial depth, transparency, translucency, layers, parts, color, light, form, structure, the method of display or installation, size, proportions, and other formal elements to be used in the formation and reworking of images according to the Principle of Whole Development and Unity to the extent desired and in the manner desired. Neither the general nor the specific structures or forms of inventive images have to be fixed when their formation is begun, they may be developed as these images are developed and they may be changed at any time. The method of display or installation can typically be unified with the rest of the image as desired. Images can typically be worked, reworked, controlled and viewed from all sides, as desired, e.g., layers, parts or both can be moved, flipped over, rearranged, connected and unconnected, reshaped, textured, cut, parts discarded, and/or parts or layers removed, as an inventive image is formed or thereafter. The use of transparent color can typically be developed along with the other formal elements of an inventive image, such as its shapes, size, texture, form and structure. The surfaces and negative space of inventive images can typically be as fully integrated with their structures as desired. These formal elements can typically be developed in concert if desired. The use of real light in inventive images can be as important as their use of form. Negative space, positive form, color, and light can typically be developed simultaneously in inventive images. As another example, images in conventional art forms (such as paintings and sculpture) are made using the present invention which are integrated with their means of support, set up, and/or installation, e.g., they are integrated with their base, backing, mounts; electrical cords and other electric parts; mechanical parts, light source(s) (such as conductive polymer ones), real spatial depth, etc. An abstract inventive image sculpture, might be made of multiple polymer parts using color in real space with real light.

FIG. 2 shows how the formation of inventive images using both additive and subtractive processes can afford image makers expanded use of formal elements to create a wide range of new possibilities. Two images are illustrated in FIG. 2, marked 2.I and 2.II. Both images were begun on a planar, transparent or translucent, initial image support (e.g., a stabilizer). Both images will be further developed, with conventional applications of conventional painting and drawing media and materials (e.g., watercolors, oil paints, acrylics, tempera, encaustic, gouache, pencil, pastel, conte crayon, charcoal, etc.), and if desired, with light effects also, such as reflective applications, electrically active layers, LEDs, etc. These image supports will be used in a manner similar to conventional paper or canvas image supports using conventional practices, but there are significant differences between the development of these images and conventional practices.

Each of the two images in FIG. 2 is shown in three progressive stages of development, marked a, b, and c, and both images, 2.I. and 2.II. are simultaneously developed from opposite sides, marked side 1 and side 2 in each of the three stages. Stage a shows that some applications of coloration and shapes are made on opposite sides of both images, as shown in a.1 and a.2 in FIGS. 2.I. and 2.II. The second stage of development, stage b in FIGS. 2.I and 2.II, shows applications and removals of coloration and shapes from two sides of each image, as shown in b.1 and b.2 of FIGS. 2.I and 2.II. Added coloration has been removed, lightened and darkened. New cPRM might be used to fill in and level surfaces as needed, e.g., due to removal of paint. Thus, there may not be any undesirably visible evidence of the removal of matter from these images. The compositional arrangement, the color and the use of light in both images has changed significantly. Developing these images from multiple sides, using both additive and subtractive processes is a WYSIWYG process, which enables changes to parts of these images to be viewed in relation to other parts and to the image as a whole. Even though it can be difficult to remove coloration or to completely remove it in a controlled manner from many conventional images (e.g., to lighten them), and even though it is frequently difficult or problematic to rework coloration on conventional images as desired, all of these kinds of processes are easily done using conventional image making media and materials on polymer(s) according to the invention. The WYSIWYG mode can allow spontaneity and it can enable work to be done according to the Principle of Whole Development and Unity, as desired. It also facilitates experimentation and risk-taking that might not be feasible using conventional practices (such as conventional support media), because using conventional practices such changes are often neither workable nor reversible as they are using the present invention. The image maker can continue to use both subtractive and additive processes, as desired in further processing these images in FIG. 2 as desired. FIGS. 2I and II each show a third stage of image development, stage c, with both sides of these images presented in c.1 and c.2. This third version of these images may or may not be final. If desired, either image could be further worked so that part or all of it returns to the way it was in the previous stage b. and/or further processed in another way.

The process of creating these images according to the invention advantageously permits working with transparency and translucency, light and color, and even provides a new way of using conventional image making practices. For instance, such inventive images might be made using applications of coloration which are all transparent, and as they develop, these images can be darkened and lightened, repeatedly, as desired, typically without limitations, problems or undesirable issues, even using conventional applications of conventional image making media like oil paints and watercolors.

In another illustration of the use of the inventive medium, once a number of polymer shapes are formed, an image maker can bond them to one another connecting two parts at a time using a bonding cPRM or any other suitable bonding substance, e.g., an adhesive, optionally reinforcing these joints with fiber, such as by using oil formulated clay. When the image maker prefers to connect the parts at a variety of angles, the sides of the polymer parts may have to be sanded down or cut down to different angles so that the area of contact between the parts being joined is sufficient to make their connection as strong and as permanent as desired. These polymer parts may be made sufficiently rigid and sufficiently strong to be stable as a 3D volumetric form. This can be a large inventive image with perhaps more than a hundred polymer parts, and optionally other parts. Working according to the Principle of Whole Development and Unity, the image maker can typically determine the inventive image's formal elements, such as its structure, its form, its coloration, its use of light and space, and the specifications of its parts as he connects the desired parts. Thus, the next part he may need might be made, or he might make it, e.g., make it from scratch or by reworking a part he already has, such as by adding texture or another layer to it, by carving into it, altering its perimeter, its shape or its form, or the next part he might use may be made of a composition other than polymer of the present invention. The polymer parts used in this example are generally inexpensive and easily made.

For example, the image maker may: (a) begin forming the inventive image sculpture without any formulated concept (e.g., begin knowing only that multiple parts with colored transparent and translucent shapes that suggest a curving movement are desired); or begin with a basic concept of what this inventive image sculpture will be like; or begin this with a partially or fully developed concept of the inventive image sculpture. (b) make these polymer parts in all of the variations of shapes, sizes, light, color and other formal elements that might be used for the inventive image sculpture, even if they are ultimately unnecessary. (c) try variations of color, space, shapes, light, form, drawing, layers, painting, photography, other formal elements, and variations in the polymerization process (e.g., using VIMC) in making these polymer parts, even if these are not visualized in advance and even if there is no conception of how they will work together or if they will work as part of this inventive image sculpture, since the inventive image can be reworked or undesirable results removed. (d) assemble the polymer parts knowing they can be reworked and their compositional arrangement rearranged as desired (e.g., repositioning them, taking them apart or even discarding them and starting over); thus an image maker can try compositional arrangements, shapes, forms, arrangements of color, even if they may not work as part of this sculpture. (e) make new molds or use other processes for forming polymer parts of the present invention, e.g., injection molding, extrusion molding, blow molding, etc. (f) add one or more non polymeric ingredients to this inventive image if desired, e.g., as additional parts, as bonding agents, or both. (g) develop the method, means and manner of displaying or installing this inventive image sculpture as its other formal elements are determined. (h) change the original concept for this inventive image sculpture as desired, at any time or at multiple times during its formation and after its formation.

Work on this inventive image may continue until the desired sculpture is formed. The formation of inventive images in this manner may be considered (e.g. painting), in real space with real light. Thus, the invention typically provides a spontaneous, workable, reworkable, controllable, WYSIWYG image making process, using color in real space with real light, real transparency and real translucency, which can be done according to the Principle of Whole Development and Unity to the extent desired and in the manner desired.

The workability of the inventive medium is also shown in FIG. 68. The inventive image in FIG. 68.a is a single, rigid, planar rectangular polymer image support that may or may not be a stabilizer, which is at least partially transparent or translucent. Each of its two negative spaces might have been formed by a mold as the polymer was cast, or might have been cut or carved in it during gelation or after polymer formation (e.g., preplanned or spontaneously made). The image in FIG.

68.*a*. may be the finished image, but if it is not, it can be further processed. The first example of a way that the image in FIG. 68.*a*. could be further processed is by the use of one or more additive processes, filling in one or both of its negative spaces, partially or entirely with new polymer or with some other medium or material, e.g., paper, canvas, glass, etc. If these two holes are completely filled in with new polymer that matches the polymer with which it is made, this image could become a single continuous polymer plane (which it might have been in a previous stage if for example, it was not cast with its two negative spaces in it). Alternately, partially filling in either or both of these two holes could bring a new desired variation to this image, e.g., texture, color, a second level such as an inset piece, a curve, perforations, a new material or medium, a different light effect, etc.

As a second example, the image in FIG. 68.*a* can be further processed by using subtractive processes, for example, by cutting a third hole through it, and cutting its rectangular perimeter into the irregular shape as in FIG. 68.*b*. Though the image maker could just cast this image in the form in FIG. 68.*b*, his ideas might develop during the image making process. The image in FIG. 68.*b* could then be the finished image desired, e.g., a sculpture or a shaped painting. If it is not the finished image desired, it can be further processed as desired. For example, one way that it might be further processed is by adding polymer to it so that it reverts back into the image in FIG. 68.*a*. Another example of a way this image might be further developed is with added coloration as in FIG. 68.*c*. (alternately this image could have been cast with the coloration shown in FIG. 68.*c*.). As another example, the negative spaces in either FIG. 68.*a* or *b* could be filled in to give the polymer form a continuous rectangular image. Then, this image could be colored as in FIG. 68.*d*. Alternately, the image in FIG. 68.*d* might have originally begun as a continuous rectangular polymer plane formed with internal and/or external coloration. The inventive image in FIG. 68.*d* may be the finished image desired, but if it is not it may be further processed.

After forming the polymeric inventive image with coloration in FIG. 68.*d*, the image maker can spontaneously add more polymer onto this image to extend it. As one example, a border or frame may be added of polymer and/or another medium, e.g., added, modified or removed as desired. In another example, the resultant image may be the one in FIG. 68.*e* in which the width, the length and the height of the image in FIG. 68.*d* are all extended. Or, the resultant image may be the one shown in FIG. 68.*f* in which the image in FIG. 68.*d* is extended both horizontally and vertically. Notice that on both of these reworked inventive images, the polymer added to its lower side which extends each of them vertically provides a method of displaying the image. Before or as this image is colored, texture might be added to it which could be modified or removed as desired. The ability to added polymer to this image spontaneously enables this inventive image to be formed as desired—working out the shapes of its coloration, its form, and the method of its display simultaneously, so as to judge these formal elements of the inventive image in concert, in a WYSIWYG format. Thus, because the formal elements of this image were workable, reworkable and controllable throughout the process of creating an image, the surface of this image, and its use of compositional arrangement and color, could be made and worked as desired, in concert with its structure, its perimeter shape, its use of space, etc. The formal elements of this image might be created and developed according to the image maker's vision, while minimizing or avoiding many conventional media limitations, particularly if the image is transparent.

FIGS. 68.*e*. and *f*. show two ways that the inventive image in FIG. 68.*d* might be further processed, with attachments and/or other changes. FIG. 68.*e*. shows the addition of five attachments onto the inventive image in FIG. 68.*d*., two on its front surface, one on its right side, one on its upper edge, and one on its underside which serves as a base for the entire image—its method of display. The inventive image in FIG. 68.*f*. is a way the image in FIG. 68.*d* might be further processed, by adding two attachments to its underside which serve as legs, as a method of display. One or more of the attachments made in FIG. 68 might, e.g., be bonded to this inventive image using screws and/or a bonding substance, like cPRM or a glue. Either the inventive image in FIG. 68.*e* or the inventive image in FIG. 68.*f* might be the finished image desired, but if not, it may be further processed as desired. For instance, one or more attachments might be removed.

FIGS. 65 and 66 each show an inventive image begun without any initial image support, which is further processed in ways that involved rearranging their compositional arrangement and changing their art form. At any of the 12 stages in FIG. 65, and at any of the 9 stages in FIG. 66, each of the inventive images illustrated could be completed and all further processing ceased. These illustrations show how the workability and reworkability of the inventive medium can give image makers unprecedented freedom and control in forming images, to the extent that they can freely work with formal elements such as transparency, spatial depth, light, compositional arrangement, shape, form, color, structure, method of display, and even change the image from one art form to another, as well as combinations thereof.

The inventive image in FIG. 65.*a* begins as three separate parts in a compositional arrangement, e.g., three polymer rods, flat pieces of polymer, or non polymeric ingredients. For example, these three parts might be hung as a mobile; two of its upper parts might hang and its third part might stand on the floor or ground forming a sculpture; these three parts might be mounted on the wall as a wall piece; or they might be displayed on a pedestal as sculpture. FIGS. 65.*b*.1 and 65.*b*.2 are two ways that 65.1.*a* might be further developed by rearranging its parts and connecting them into two different compositional arrangements having the same two add elements, one a circular part (e.g., which may be a rod or a plane), and the other linear part (e.g., which may be flat or cylindrical). In FIG. 65.*b*.1, these two added parts connect all three separate parts of this image together into one form, while in FIG. 65.*b*.2, they connect with only two of the three initial parts of this inventive image. Thus, this inventive image is comprised of a compositional arrangement of two separate parts. As another example, the inventive image in FIG. 65.*b*.2, which is made of two separate parts, can be superimposed by or on a new planar part that connects them as in FIG. 65.*c*. This new planar form closes the once open form of this inventive image, thereby enabling it to function as a different art form if desired, e.g., it can now function as a painting, as a window, as a table top, as a door, etc. Alternately, this new part might be a frame or a rod giving the form of 65.*b*.2 a rectangular perimeter, e.g., mimicking a traditional painting. If desired, the inventive image shown in 65.*c* can be made into the inventive image shown in 65.*b*.2 by removing its new part. FIG. 65.*d* shows the inventive image in 65.*c* cut irregularly on a diagonal into two uneven parts. Thus, this inventive image can no longer be used in same functions as used in the previous stage of 65.*c*. If desired, the inventive image shown in 65.*d* can be reconnected so that it becomes the image shown in 65.*c*. Alternately, for example, the inventive image shown in 65.*d*. may be used as a shaped painting, put on a stand as a sculpture, or installed as a uniquely shaped skylight. In 65.e, the inventive image of 65.d is formed into a new compositional arrangement to take advantage of its transparent forms. However, if desired, the inventive image shown in 65.e can be reformed back into the form it had in 65.d. Instead, FIG. 65.f shows a new part added to this inventive image as a layer behind its two existing layers to develop this inventive image's transparency.

FIG. 65.g. shows that another new part might be added to this inventive image and its transparency developed in a different compositional arrangement. The inventive image of 65.g can be made into that of 65.f if desired. FIG. 65.h shows this inventive image reorganized into yet another compositional arrangement, with a new part added, a circular plane layered underneath two of its forms. The forms of the layers of this inventive image have also been changed by both additive and subtractive processes, enlarging two of the layers and reducing the size of its upper rectangular part. FIG. 65.i shows that the layers of the inventive image seen in 65.h are altered so they are no longer perceived to be separate layers, though they may still be. This illustration does not show that this inventive image's coloration remains at different levels of real spatial depth in the image.

In 65.j, coloration and texture can be added to the inventive image and coloration removed from it. This inventive image is further processed one last time with dramatic changes in its form. Its central circular form, which was only coloration in 65.j, is enlarged and cut out in 65.k. Cuts into this image also alter its perimeter. The form of this inventive image is further changed by the addition of two new parts as layers—the rectangle shown in gray on the left side of the image is a layer added to this image's underside, and the striped form on the image's upper right is a layer added over it (e.g., which might be an open form made of parallel rods and a frame). It should be understood that for each of FIGS. 65.a to 65.k, if the image is not as desired it can be further processed or reformed to the previous state, e.g., 65.k can be reformed to 65.j.

Because the compositional arrangement of the inventive images in both FIGS. 65. and 66. can be changed continually, tacking might be used to secure their parts. Like the inventive image show in FIG. 65, the inventive image shown in 66 is not made with an image support. Like other inventive images, it can be reworked at any time to any previous stage without limitations. The image of the invention in FIG. 66.a begins as six separate parts. This inventive image is reorganized into different compositional arrangements in FIGS. 66.b-d. In FIG. 66.e, six new parts are added to the inventive image in FIG. 66.d. which are removed in 66.f and replaced by a different new part, a rectangle, which might be either an open or a closed form, e.g., a frame, a rod, or a plane. This new rectangle is the common part connecting all of the other parts of this inventive image. The compositional arrangement of this inventive image is reorganized in 66.g, its rectangular part is replaced by an oval part which also may be either an open or a closed form, and this image is given the means by which it can be hung for display. This means for hanging this inventive image is later removed as shown in 66.h. FIG. 66.h also shows other dramatic changes that might be made to this inventive image. Its coloration, compositional arrangement, and oval part might each be changed, and two new lozenge shaped parts might be added which are light sources or which have light sources on or behind them. Therefore, these lozenge shaped parts illuminate this inventive image with real light. FIG. 66.i shows this image further processed with one of its lozenge forms illuminated with different coloration, a new transparent rectangular part added as a layer over part of this image, and the forms and coloration of the initial six part of this image altered using further processes.

The Work Area, Tools, Molds, etc.

Any suitable tools may be employed in preparing inventive images or performing processes to make the same. For example, one or more hypodermic syringes can be used as a volumetric measuring devices to make inventive images, e.g., for exactly measuring small quantities of catalyst. For example, glass hypodermic syringes and long spinal needles are often most preferred. If desired, this can be used to control the polymerization process as desired, e.g., to control polymerization heat. Also, images can be made in any suitable indoor and/or outdoor location, preferably using material-appropriate safety precautions. For example inventive images or part thereof can be partially or completely made in an unequipped place, in a "clean room", in a ventilation box or in a vacuum. Any suitable mold, or plurality thereof, can be used to make polymers and inventive images, or any part of thereof. A single polymer, or a single inventive image can be made using one mold or multiple molds, as desired. For example, both open and enclosed molds may be used to make inventive images, as well as partially open molds. Molds are often formed directly on inventive images, e.g., to add polymer to them, such as an additional polymer layer or part on a polymeric or a non polymeric inventive image surface. When using a mold to make polymer, it is often preferred that the mold be coated with a suitable mold release agent, such as a petroleum jelly, or a release specifically made for the kind of mold or surface being used. In many embodiments, it is preferable to subdivide the mold or other surface on which polymer is formed. In some embodiments, inventive images are begun on one or multiple molds. In general, it is preferable to select the ingredients in the cPRM so that its polymerization heat does not affect its mold or other surface undesirably, e.g., other surfaces such as a polymer, or a part of an inventive image made of one or more other materials, media, objects, devices, processes, interactions, or their combinations. If the mold or other surface is altered during polymerization, the polymer formed can also be affected.

Examples of preferred molds and mold materials include articles originally made for a different use, such as a wax lined paper cup, an elastomer doormat, or a piece of plastic sheeting, or melamine (e.g., Formica®, made by Formica Corp. of Cincinnati, Ohio); oil-formulated clay perimeter walls made on a melamine surface; elastomer (such as silicone rubber); plastic (such as polypropylene or melamine); clay (such as water and oil based formulations); wax; wood; plaster; or combinations of these. If a mold needs further support it can be reinforced.

It is preferred that the design and use of partially closed molds adequately permits the escape of air, vapors, gases and significant heat from the cPRM or other ingredients therein. It is also preferred that molds are sufficiently strong, well-sealed and durable for their use in making images, and the interior mold space is clean.

Often cPRM materials do not polymerize well or fully due to their exposure to air, or more specifically to oxygen. Thus, it is often preferable to form them in a mold in which their exposure to air and oxygen is reduced or eliminated. cPRMs might be formed in a closed mold. Or they might be formed in an open mold, which has its upper side which is exposed to air, closed with a cover or "roof" that preferably leaves little or no air pocket between it and the polymerizing cPRM. Acrylates and methacrylates do not typically polymerize well exposed to air, so they are also preferably formed in a closed mold, in a partially closed mold, or in an open mold that is completely closed with a cover or "roof." Such a roof might be made of a film like Saran Wrap®. The "roof" might be sealed with the perimeter of the previously open mold (e.g., using oil-formulated clay). Such a roof might rest directly on the upper surface of the polymerizing cPRM, or there might be an air pocket between it and the upper surface of the polymerizing cPRM, e.g., refer to FIG. 74. For instance, such molds might be necessary when polymerizing a HEMA, such as 2-Hydroxyethyl methacrylate.

In an embodiment, one or more parts of an inventive image and/or of a mold for it might be partially or entirely made of clay. The workability, reworkability and controllability, available to image makers during the process of forming polymer can often be significantly enhanced by using oil- or water-based clay formulation(s), e.g., oil-formulated clay is most preferred. For example, clay can affect and help control both the polymer formation process and the resulting polymer. Clay is preferable for reworking most if not all kinds of molds and other surfaces, and it can create results and effects which are often very difficult or impossible to create without clay. Oil-formulated clay can be used and reused with the present invention multiple times, and it generally releases from polymer quite cleanly if removed during its gelation stage, preferably after the gelled cPRM can maintain its own form without the clay. In many embodiments, temporary clay walls are desirable for forming, reworking and controlling molds as desired, e.g., for altering the geometry of a mold such as its perimeter shape, or its undulation; and for repairing molds such as quickly plugging a hole or bracing a mold leaking cPRM without interrupting of the image making process. Temporary clay walls also enable PRM or polymer and/or one or more other ingredients to be added onto inventive images and parts thereof. For instance, temporary clay walls are preferred for additions made on polymer and parts thereof, during or after they have gelled sufficiently (e.g., for adding PRM, polymer or mounts onto a polymer); temporary clay walls are preferred for use in connecting two or more polymer parts together; for connecting polymer to one or more other materials, media, objects, devices, processes, and/or interactions; for filling in spaces, cracks, scratches, indents, textures, engraved or incised lines or areas such as drawings and holes in polymer; they can be preferred for formation of raised or embossed designs, drawings and text on inventive images, and for other uses. In some embodiments, oil-formulated clay can be softened or stiffened as desired to facilitate and to expand its use and reuse, e.g., to form different stickiness clays. This might be done by mixing or kneading ingredients into the clay such as a dry clay or powder (e.g., talcum or pumice), petroleum jelly, or any oil lighter than the oil already in the clay. In this process, the clay might also be heated or mixed or kneaded in a machine like a blender or food processor. Polymerization and Image Making Polymers of the present invention may have linear chains, and/or may be crosslinked. Materials used in forming polymer of the present invention typically include one or more polymerizable monomers, and one or more initiators or catalysts which are appropriate for polymerizing the specific monomer or monomers, preferably mixed together. For example, a cPRM for the present invention might be comprised of only one monomer and its initiator or catalyst. However, multiple monomers (preferably mixed), pre-polymers, polymers, multiple initiators and/or catalysts (preferably mixed), or combinations of these can be used to form polymer, as desired. Should any of the monomers require a specific catalyst, it is preferable to add that catalyst into the mixture. In forming many inventive images, the monomer, or at least one of the monomers, used is capable of forming polymer that is preferably transparent or translucent, has desired optical properties (such as a particular refractive index and/or light transmittance), has other desirable aesthetic properties, is strong in a manner which enables the image to be permanent, can be further processed as desired, or a combination of these. In particular, preferred monomers include esters, urethane-forming components, acrylics, ethylene-forming monomers, monomers that form conductive or absorbent polymers, or any other suitable monomer. Preferably, the PRM forms polymer with desired aesthetic properties or so that it enables desired aesthetic properties in the image.

As an example, monomers which are capable of forming crosslinked polymers are frequently preferred because they are more solvent resistant, and more thermally and mechanically stable. For example, a polyester which contains at least about 25 mol % of a monomeric residue able to crosslink, co-polymerize, or both is a preferred material. More preferred are polyesters where the monomeric residue includes styrene or other monomers. Among other examples of preferred polymers for making inventive images are other polyesters, polycarbonates, polystyrenes, polyacrylics, absorbent polymers and conductive polymers. Preferably, the monomer used will enhance the image's linkage to or bond with a superimposed element, layer, application and/or part. Often, it is not the monomer alone which accomplishes the desired linkage or bond, e.g., a surface preparation stabilizer is formed. One of the preferred monomers for use in forming polymer is Silmar® Polyester Resin S-40 which is also known as SIL95BA-40, made by Silmar®, a division of Interplastics Corporation in Covington, Ky. and Vadnais Heights, Mn. (formerly a division of SOHIO Chemical Company in Covington, Ky.). As a further example, in a preferred embodiment, at least about 50% (by volume) of the polymer used to form inventive images is an acrylic polymer or a polycarbonate.

Polyaliphatics can be used to contain most monomers temporarily, e.g., polybutylene, polyethylene, and polypropylene can be used to contain monomer while an image maker is making an inventive image. Glass can often be used to contain monomer long-term.

Typically, in embodiments, the catalyst or catalysts are chosen to be properly active with the monomer or monomers used, as will be readily known to those of ordinary skill in the polymer art. For example, with polyester forming monomers, methyl ethyl ketone peroxide (MEKP) is a preferred catalyst. For example, Cadox® M-50 MEKP made by AKZO Chemicals in Arnhem, The Netherlands is a preferred catalyst for use with Silmar® S-40 polyester resin. Cadox® M-50 may for example, be 30-35% methyl ethyl ketone peroxides (MEKP); 0-5% hydrogen peroxide; 55-60% Dimethyl phthalate (DMP); which might for example be methyl ethyl ketone peroxide in a solution with 9% by weight active oxygen. The catalyst or the combination of catalysts can contribute a necessary structure in the linkage of monomer molecules to form the polymer. The catalyst or catalysts can be used in any proportion desired with respect to the monomer(s) used in a cPRM. They do not have to be used in a lesser quantity than the monomer(s), though they often are, e.g., it may be necessary to use the catalyst(s) in a quantity equal to the amount of the monomer(s) used.

In some embodiments, PRM is at least partially cured by radiation, including UV light or electron beam (EB). This radiation is a stabilizer, in that it which may ultimately induce crosslinking. As an illustration, conventional practices for radiation curing PRM might be used to make polymer of the present invention. For example, the catalyst used in PRM might be a photoinitiator (e.g., free radical or cationic), activating the polymerization with an UV light (e.g., emitted by an arc light such as a medium pressure mercury lamp or a high pressure xenon lamp, or emitted by a laser light). Refer to the description in a 1997 brochure ISO 9001 by Ciba Geigy Special Chemicals, 540 White Plains Road, P.O. Box 2005, Tarrytown, N.Y. As another example, the catalyst used in PRM might be a dye photosensitizer which activates the polymerization with visible light. Careful selection of specific catalysts for radiation curing (e.g., photoinitiators and/or dye photosensitizers) and the proportions of their use with specific monomers and with any other ingredients added into the cPRM, and careful selection of the particular radiation curing stabilizers used and the specifications of their use are desirable in order to insure that the polymer forms as desired, while minimizing or avoiding undesirable effects, e.g., to ensure that the polymer has desired properties (such as adhesion) and lacks undesirable optical or structural effects (such as discoloration for instance yellowing, or undesirable surface wrinkling). Thus, in selecting ingredients for radiation curing polymer, it is desirable to consult product manufacturers and/or their literature. Radiation curing is often preferable because of the rapid speed of polymerization. As an illustration, after applying PRM or cPRM to a mold or image surface, radiation curing can harden it so rapidly that the PRM or cPRM does not have time to move or run out of the position in which it is applied. Thus, radiation curing is often preferred for applications of PRM or cPRM on molds, image surfaces and parts of these which are vertical, or which have undulations, curves, or angles, and/or for maintaining the precision, control, care, delicacy, detail, and/or exactitude of an application of PRM or cPRM on a mold or image surface, e.g., to make sure that a linear application of cPRM (such as a painted or printed lines) hardens exactly as applied. Colorants used on inventive images, such as on image supports, may be radiation cured, e.g., a colorant made with PRM or cPRM, for example with a photoinitiator in it. Brief exposure of certain cPRM to UV light for the purposes of polymerization is not believed to be sufficient to cause such undesirable effects in polymer, e.g., amber discoloration.

Ingredients in various cPRM formulations can differ, which can affect the polymer in many ways. Ingredients in cPRM include VIMC. Of particular concern is the choice of active ingredients in cPRM, its monomer or monomers, and its catalyst or catalysts. The characteristics of different monomers and different catalysts can differ, their polymerization processes can differ, and the polymers they form can differ. As a result, in using different active ingredients, it is often preferable that the process or processes used differ. The choice of specific products as active ingredients in a cPRM; the variability of their use; their polymerization process and factors which affect it (such as the environment); and other such variables are VIMC which can be used to control and affect, or to try to control and affect, the formal elements in the resultant polymer, e.g., its form, its structure, its color, etc. It is preferable that the specific active ingredients, the specific process or processes of creation used to make specific polymer, as well as the use of specific stabilizers be selected according to one another and according to a variety of other considerations, such as: (a) the polymer's use, function, size, form, structure, thickness and weight; (b) whether or not the polymer will have attachments, embedding, or multiple parts, and the ingredients desirable for these, e.g., the use of one or more materials, media, objects, devices, processes, and/or interactions, other than polymer in the inventive image; (c) the preferred methods, means and manner of installing, displaying, and/or exhibiting the inventive image formed (such as mounts, and the use of conventional practices for adding light sources to images such as in making conductive polymers emit light); (d) the environment(s) to which that inventive image may be exposed; (e) the strength and permanence the polymer and its inventive image needs; (f) the handling and transporting of that inventive image (e.g., frequency); (g) aesthetic qualities and other properties desired for the polymer and its inventive image (such as transparency, translucency, light, refractive index, luminous transmittance, haze value, inherent coloration e.g., yellowness index (or YI), light reflectivity, opacity, coloration, if embedding or inlay will be done, if anything will be formed in the polymer, whether the polymer will shrink as it forms and the extent of that shrinkage; if the polymer is hydrophilic, absorbent or hydrophobic; the flexibility or rigidity of the polymer, etc.); (h) anything the polymer or its inventive image needs to support; (i) the most preferred process(es) for making the polymer, (j) the mold(s), etc.

As an example, two different transparent monomers using the same kind of catalyst and having similar polymerization processes might be capable of forming polymers that are quite different. For example, one of these monomers which is less viscous than another can form polymer that is more mechanically stable that the other monomer, e.g., this may occur without cracking or the resultant polymer being weak or fragile. As another example, the selection and use of active ingredients in cPRM can directly affect the accuracy of the impression a polymer takes of its mold, e.g., some polymers shrink significantly as they form.

One or more stabilizers can be used as desired in inventive images, e.g., in and/or on polymer. The choice of one or more stabilizers used in inventive images, and the specifications of their use, can affect and control the specific inventive image formed as desired. Thus, stabilizers can be VIMC. The use of specific stabilizers in inventive images varies, depending on the needs and desires for each inventive image. For example, use of one or more monomers, polymers or a combination of these, as stabilizers in or on cPRM is contemplated.

In preferred embodiments, polymer in an inventive image is made with desired properties (e.g., aesthetic, structural, light and/or optical qualities, and form, strength, rigidity and/or flexibility). A surface preparation stabilizer may be formed on the polymer surface, or a portion thereof, as a bonding agent, particularly when it will otherwise not bond well with a colorant, such as paint. The surface preparation stabilizer serves as both a bonding substance and an underlayer to the applications superimposed upon it (e.g., it is functioning as a primer, a ground, an imprimatura, or underpainting). Use of such a surface preparation stabilizer upon a polymer might for instance, enable that polymer to be an initial image support for further processing. As Example A, one preferred surface preparation stabilizer is a mixture of: (i) the composition which will be superimposed upon the completed surface preparation stabilizer, a bonding composition, or both (e.g., one or more conventional image making media, such as a transparent colorless paint like acrylic paint, a primer, a size, and/or another conventional painting medium); and (ii) one or more ingredients which bonds to the specific polymer surface that the surface preparation stabilizer will be superimposed upon (e.g., the cPRM used to make the polymer, a bonding cPRM, one or more ingredients of one or both of these cPRMs, and/or another bonding substance). In Example B, another preferred surface preparation stabilizer is formed on a polymer surface either by: (i) altering the polymer surface in a manner which will create or fortify a bond with the composition which will subsequently be superimposed (e.g., chemically altering the polymer surface, making SSI and/or bonding spots upon it); or (ii) by altering the polymer surface and superimposing a composition upon it (e.g., such as the mixture in Example A, or a conventional image making media composition). Processes and compositions preferred for use in forming surface preparation stabilizers vary according to the specific polymer they are used upon, and/or they vary according to the specific composition(s) that will be subsequently superimposed upon them, as will be readily determined by one of ordinary skill in the art.

In different embodiments, a polymer surface is formed in one or more layers on a non polymeric surface, e.g., on an image support such as metal. For example, this might be done for bonding purposes, and/or as an underlayer to enable one or more desired superimpositions. If a non polymeric surface does not enable a desired superimposition to be made on it, a surface preparation stabilizer can be made on it which will bond to it and the superimposition(s). Thus, a polymer that may contain a stabilizer (e.g., for preventing corrosion of a metal) can be applied on a non polymeric inventive image part. In other examples, a polymer surface is formed on wood, paper and/or fiber stabilizer. Forms such as these polymer-covered non polymeric materials may be image supports, which may or may not be stabilizers. In other embodiments, an absorbent polymer surface is formed on an inventive image or part thereof which may or may not include polymer. This absorbent polymer may be a surface preparation stabilizer for superimposed coloration that absorbs into it, creating desired visual effects. Or, this absorbent polymer may be a substrate for a surface preparation stabilizer formed on it which is an application (e.g., a colorless primer) which absorbs into it to the extent and manner desired to control the level of absorbance of a subsequent superimposition (e.g., a paint) into the absorbent polymer (e.g., creating a special effect of color, or preventing the paint from absorbing into the polymer).

In preferred embodiments, ingredients used in cPRM and/or polymer are chosen for their optical properties, polymer is chosen for its optical properties, and/or one or more stabilizers are chosen for an inventive image for their optical properties. The examples of inventive image ingredients provided herein have a range of refractive indexes. For example, it might be desirable to make polymer in inventive images using monomers and catalysts which form polymers typically used to make optical media such as compact discs, and lenses. As another example, one or more ingredients used in cPRM might be chosen for their refractive indexes, percentage of light transmission, the percentage of haze they allow, and/or their coloration such as their yellowness index (YI) in the resultant polymer.

As one example, in preferred embodiments, one or more monomers and catalysts are chosen because the polymer their mixture forms is considered water clear, e.g., a water clear polyester monomer and the appropriate catalyst. As another example, in preferred embodiments, the ingredients in cPRM are chosen because of the coloration of the resultant polymer. For instance some transparent and translucent polymers form with a slight hue (e.g., of yellow or pink) even though no coloration has been added to them or despite the coloration added to them. Some transparent resins are rated with a (YI), which is a comparison against a clear or water clear standard. For instance, the YI of polycarbonate resins is generally about 0.5 to 2, which is slightly less yellow than most other commercially available transparent polymers that typically have YI values of 1 to 3. In an example, in a preferred embodiment, inventive images are made using at least one polymer having a yellowness index no greater than about 3.0. Polymerization processes, excessive heat, and/or ingredients in the cPRM (such as an inhibitor stabilizer or ingredients which are not polymerized or degraded e.g., regrind material) can induce or augment a slight yellow or straw color in polymer. Some manufacturers like Dow Plastics often add a slight blue tint (e.g., a heat-stable blue dye) to mask some or all of this yellowness, a practice that may be desirable in making inventive images. Dow, like other manufacturers, makes and sells transparent resins with and without this added blue tint, or "mask." Similarly, a slight red tint might be added into cPRM to correct a green tint. For example, the addition of such a blue tint, red tint or both might be desirable to correct a yellow tint, a green tint or both in polymer in inventive images caused by the monomer inhibitor in the cPRM.

When a high level of optical clarity is desired in polymer, it may be desirable to consider the way that polymers and monomers used in inventive images are produced to ensure optical quality. For instance, some manufacturers use clean room conditions; some employ dedicated storage silos, extruders and processes; some employ superior filtering methods to remove impurities; some wash finished pellets of resin with ultra pure water; some employ extensive quality control checks; and some manufacturers, like General Electric (Pittsfield, MA) in the production of their Lexan® OQ (Optical Quality) polycarbonate resin, use a combination of these practices.

In preferred embodiments, a monomer and a catalyst used in a cPRM might be chosen principally for the refractive index of the resultant polymer. According to the manufacturers of their active ingredients, some polymers of the present invention have a refractive index that is similar to, the same as, or even higher than that of some kinds of glass. Ordinary glass, called crown glass, has a refractive index of 1.51-1.54, and flint glass, which is heavily leaded crystal, has a refractive index of 1.9. As examples, the refractive index of epoxy resin is about 1.58, for polytrifluorochloro ethylene it is about 1.43, for polyvinylchloride it is about 1.54, for polyvinylchloride plasticized it is about 1.5 to 1.55, for methylmethacrylate it is about 1.48 to 1.5, for polypropylene it is about 1.49, for polystyrene it is about 1.59 to 1.6, for polytetrafluoro ethylene it is about 1.3 to 1.4, for polycarbonate it is about 1.6, for polysulfone it is about 1.633; for polyethylene it is about 1.5 to 1.54, for cellulose acetate it is about 1.46 to 1.5, for cellulose acetate butyrate it is about 1.46 to 1.49, and for urea formaldehyde it is about 1.54 to 1.56.

As examples, in a preferred embodiment, inventive images are made using at least one polymer having a refractive index of at least about 1.4. In a preferred embodiment, inventive images are made using at least one polymer having a refractive index of at least about 1.5. In a preferred embodiment, inventive images are made using at least one polymer having a refractive index of at least about 1.55. In another preferred embodiment, inventive images are made using at least one polymer having a refractive index of at least about 1.56.

In preferred embodiments, a monomer and a catalyst used in a cPRM might be chosen principally for the luminous transmittance, the haze value or both of these criteria in the resultant polymer. Dow Chemical reports that glass typically has a luminous transmittance of 92% and a haze value of about 0 to 0.17%. Typically, PMMA has about 92% and cellulose acetate has about 89% luminous transmittance. The typical haze value of polycarbonate resins is approximately about 0.5 to 2%; polystyrene is about 0.1 to 3%; styrene acrylonitrile is about 0.6 to 3%; polymethylmethacrylate is about 1 to 3%; and cellulose acetate is about 0.5 to 5%. As further examples, in a preferred embodiment, inventive images are made using at least one polymer having a light transmittance of at least about 88%, a haze value no greater than about 3%, or both.

Further examples of suitable optical quality ingredients are as follows. These products by Dow Plastics of Dow Chemical Company in Midland, Mich. are examples: Calibreg polycarbonate resins; the 1000 series of Calibreg polycarbonate resins (which are offered by Dow for use in optical products); Tyril® SAN styrene-acrylonitrile copolymers; Styron® polystyrene resin; and Isoplast® polyurethane resins which are preferably clear. Grades of Lexan® polycarbonate by General Electric are examples, as are the Plexiglas® V Series of acrylic resins by Elf Atochem North America Inc. in Philadelphia, Pa. offers (some of which are used for optics and camera lenses), e.g., Plexiglas® V825, V052, and VM. In further examples, Badische Aniline Soda Ash Fabrik, also known as BASF Corporation of Mount Olive, N.J. offers Ultrason® E Polyethersulfone (PES); Ultrason® S Polysulfone (PSU); Luran® styrene/acrylonitrile copolymer (SAN); and Styrolux® styrene/butadiene block copolymer (S/B/S). Bayer Corporation of Pittsburgh, Pa. offers products which are examples such as: grades of Makrolon® polycarbonate resin that are preferably not opaque; Lustran® ABS 226 resin (acrylonitrile butadiene styrene); Lustran® SAN (styrene acrylonitrile) 31 resin; Lustran® SAN 29 resin; Lustran® SAN Sparkle resin; and Apec® high-heat polycarbonate resins. Pittsburgh Plate Glass (PPG) in Pittsburgh, Pa. offers CR39® (a monomer commonly used to make eyeglass lenses), which can be used for polymers of the invention. For example, CR39® is 100% diallyl diglycol carbonate also known as allyl diglycol carbonate monomer; diethlyene glycol bis (allyl carbonate); 9-oxo-2,5,8,10-tetraoxatridec-12-enoic acid, 2-propenyl ester; carbonic acid, oxydiethylene diallyl ester. It might be polymerized to produce crosslinked homopolymer or copolymer systems. Polymerization may preferably be initiated with diisopropyl peroxydicarbonate. Although benzoyl peroxide is also suitable and less hazardous, it can result in increased yellowness. Copolymer formulations of CR39® might be produced as desired, e.g., for special spectral transmission characteristics, impact resistance, increased heat distortion, etc. For example, copolymers of CR39® monomer containing vinyl acetate, methyl methacrylate, or a combination of these, can be thermoformed. CR39® might also be useful as a bifunctional chemical intermediate, because the double bonds may undergo reactions characteristic of allylic molecules.

It should be understood that all of the measurements and values herein are approximate and the invention can include a variety of optical quality materials having different values.

The optical clarity of polymer in inventive images can be affected as desired by catalyst selection (such as MEKP, photoinitiators, free radical initiators, and coinitiators such as amine photochemical coinitiators); by image making processes (and the tools and materials they involve), and/or by stabilizers. One or more other ingredients can be used in PRM to affect the optical clarity of the resultant polymer, e.g., coloration, texturing ingredients, etc. Other factors can also affect the optical clarity of inventive images, e.g., light sources, bonding substances and agents, conventional image making materials (like paper, paints, canvas, linseed oil, glue, metal, found objects, collaged elements, etc.); image making processes, compositional arrangement, and/or the method and manner and specifications of its installation or display. For example, heat can affect optical properties of the resultant polymer, e.g., exotherm, external heat upon cPRM such as heat from a hot lamp, or both.

Ingredients in cPRM and/or polymers might be chosen for the lack of optical clarity they offer an inventive image to any degree, such as poor or very poor optical clarity e.g., for aesthetic and/or structural purposes. For example, active cPRM ingredients and polymers might be used in inventive images for their low refractive index, low percentage of light transmission, high rate of haze, inherent coloration (e.g., their high level of yellowness), for other aesthetic properties, for other desirable properties (e.g., tensile strength, impact strength, flexibility, properties which enable them to be made in the form or process desired such as their viscosity, etc.), or for a combination of these. One or more of the active ingredients used to make polymer in inventive images can be opaque, e.g., one or more monomers, and/or polymers are opaque.

An inventive image might be made which needs to have some structural strength, e.g., using a crosslinked polymer like polyester. However, optical and/or other aesthetic properties only available in or enabled by a different polymer are desired too, e.g., an absorbent polymer, a conductive polymer, a linear polymer, and/or a structurally weak polymer. Therefore, the polymer form of this inventive image might be made in one of the following ways using (A) one or more polymers chosen both for strength and structural properties, and for their ability to provide or enable aesthetic properties, and (B) one or more polymers chosen for their ability to provide or enable aesthetic properties. The polymer form of this inventive image might be made with: Design 1—a minimal skeletal structure or image support comprised of A), and the rest of it is made using B); Design 2—a minimal skeletal structure or image support comprised A) and B) in layers, in a mixture and/or a copolymer of A) and B), with the rest of the polymer form made of B); Design 3—a significant portion or all of the polymer form of this inventive image (e.g., an image support) is made of A) and B) in layers, in a mixture and/or a copolymer of A) and B), with any remaining part of the polymer form of this inventive image is made of B).

As another example, an inventive image can use an optical grade polymer, such as a lens-grade polymer (e.g., polycarbonate). The polymer might even be formed in a lens shape, thereby functioning as a lens in the inventive image. Polymer in an inventive image might be chosen for its desirable optical properties and this polymer might serve as an image support (e.g., an initial image support and/or an image support stabilizer) for further processing.

In other embodiments, conventional practices for coating, adding films or other layers to polymer and/or glass, may be used to affect polymer in inventive images. The use of such layers in or on a polymer in an inventive image might need one or more stabilizers added to it, e.g., a UV light stabilizer. However, while in conventional applications such layers are applied according to conventional requirements (e.g., their utilitarian functions which dictate their thickness, evenness, the number of layered coats or films, such as for making products for use over eyes, etc.), the use of these conventional practices in making inventive images has no such limitations. Among examples of these layers are those conventionally used in the optical industry, including for windows, mirrors, lenses, and glass. Examples are: anti-reflective coatings, anti-glare coatings, mirror-effect coatings, anti-scratch coatings, dichroic and iridescent layers, layers that color or tint, polarizing layers, filtering layers, layers that absorb, block or otherwise stabilize against UV light; electrically active layers; conductive polymer layers, layers made to alter sound transmission; layers that modify, absorb or block the light passing through in other ways, etc. Unlike their conventional uses, such layers might for example, be part of an inventive image with any aesthetic variations, e.g., such coatings and films on inventive images might be irregular, non-uniform, inconsistent, partial layers, they may contain other ingredients such as texture, and/or be further processed such as with superimposition of a surface preparation stabilizer, bonding spots, additional cPRM, other layers coloration, applications, and/or parts, etc. In an example, a surface of a polymer inventive image can be coated with a conventional mirror coating or dichroic coating, then superimposed, for example, by cPRM or polymer. This polymer surface might be further developed, such as by conventional painting. In another example, a coating or a film conventionally used on polymer in the optical industry can be used as a surface preparation stabilizer, serving as an underlayer for superimposed layers of paint, light effects, light sources from conductive polymer, etc.

In some embodiments, conventional practices can be used to make polymer of the present invention change in color (e.g., in hue, value, and/or intensity) according to the light that hits it. Such practices might add one or more stabilizers to an inventive image, e.g., a UV light stabilizer. Non polymeric parts of inventive images (e.g., glass parts) may also have such effects. However, while such effects of color may be used in inventive images according to the requirements of their conventional uses, their use has no limit in making inventive images. Polymer in an inventive image might become progressively gray as the intensity of the light striking it increases, or it might noticeably change color throughout the day as the natural outdoor light varies. Conventional practices used to make a variety of photochromic effects in polymer (e.g., in polymer lenses), may be used to make polymer in inventive images. For example, conventional practices used to make Transitions® Lenses by Transitions Optical Inc. of Pinellas Park, Fla. may be used to make polymer in inventive images. Transitions® Lenses might contain photochromic molecules (typically millions of them) which may be called indolino spironaphthoxazines, and they might contain other types of photochromic molecules, according to Transitions Optical. Conventionally, the photochromic chemical(s) may typically be disposed on the pre-formed polymer lens using Transitions Optical's patented process. Typically, in its conventional applications, it may then be superimposed by a hardcoat for scratch resistance. A polymer made according to these embodiments with properties which enable it to change appearance with different light exposure might function as a surface preparation stabilizer, e.g., as an underlayer for painting. In the use of photochromic effects, it may be desirable to add ingredients to inhibit or counteract "fatigue," (e.g., the reduction of photochromic effect over time). Other conventional practices might be used to make polymer produce changes in response to light in inventive images.

In other embodiments, formal element(s) in an inventive image can be changed with the activation of a device or mechanism, such as a sensor or a switch by human initiation or another means. For example, the color, light and/or form changes according to changes in light, e.g., from day to night.

In another embodiment, one or more fillers can be added into cPRM and/or polymer in any proportion desired (e.g., for aesthetic, functional, structural, and/or financial reasons), such as to aid in processing polymer. However, if significant percentages of fillers are added into cPRM, the resultant polymer may not be as strong or as permanent as desired, e.g., based on altered structure and/or the function of the inventive image. It is preferred that any undesired filler effects be minimized to avoid affecting the resultant inventive image. Examples of preferred fillers include: glass, plastic or ceramic beads or bubbles (e.g., by 3M Company or by Flex-O-Lite Inc. of Fenton, Mo.), flakes or other particles; silica; sand; calcium carbonate; cellulose fillers such as alpha cellulose; various fibers, such as chopped or milled fibers; boron nitride; calcium sulfate; powdered forms of clay; chalk; talc; marble dust; quartz powder; flock; mica; mineral filler; nickel filler; shell flour fillers; silicon carbide; stainless steel fiber or powder; wood flour; microfibres (very fine wood or cellulose pulp); various silicas such as Aerosil® and Sipemat® (made by Degussa Corp. in Ridgefield Park, N.J.), Wacker HDK® N20 (made by Wacker Silicones Corporation in Adrian, Mich.), and the like, and combinations of these. Fillers may or may not be stabilizers. For example, fillers used in PRM to affect processing or to modify the speed of polymerization are stabilizers. As another example, fillers affecting the absorbency of the polymer formed (e.g., paper pulp) might form a surface preparation stabilizer on the polymer formed if the resultant polymer surface is then superimposed in a manner which uses this absorbency (e.g., if the polymer surface is superimposed by a paint that it absorbs). Fillers used in images for aesthetic or financial purposes are not typically stabilizers.

Other suitable fillers for use in the invention include those available from Kremer Pigments Inc., Dr. Georg F. Kremer of New York, N.Y., such as: chalk from Chamgagne, France and Bologna, Italy; Whiting natural calcium carbonate; Gilder's Gesso, soft, calcium carbonate-sulfate; Chalk from Bologna Light, PW25, more volume than # 5810, calcium sulfate; Sarti Chalk, natural greyish chalk, soft, smooth extender; Sarti Chalk, natural yellowish chalk; Kaolin, China Clay, PW19, aluminium, silicate natural clay, smooth gesso; Terra Alba, natural gypsum; Anhydride Plaster, burnt to avoid setting: "dead-burnt gypsum"; Alabaster Plaster, for "Gesso Sottile"; Scagliola, fastsetting Italian plaster; Marble Dust Italian Extra White calcium carbonate; Marble Dust Extra Fine; Marble Dust Medium, slight tooth; Marble Dust Coarse, for added tooth; Marble Dust Very Coarse, for gritty applications; Quartz Powder USA, approx. 7.5 micro; Blanc Fixe, PW21, barium sulfate filler; Aluminium Hydrate; Verona White, marble dust from Italy, e.g., for texture applications, Ivory white, MG-sandy texture (0.7-1.2 mm), G-gritty texture (1.8-2.5 mm), S-gravel (2.5-4.0 mm), also available: Mori Yellow, Prugna Brown-Pink, Alp Green, Coral Pink, Black, Carrara Marble Dust, very white, slight tooth; Glass Beads, including those of 0.5 mm diam., 0.5 to 1 mm diam., 150 to 210 μm, 0 to 50 μm, Scotchlight, very light, high volume filler; and combinations thereof.

cPRM viscosity can significantly effect image making and the resultant polymer and image. In some embodiments, one or more active ingredients in cPRM can be chosen to for their effect on the final cPRM viscosity. For example, when multiple catalysts are used for a particular monomer, at least one catalyst can be chosen to provide a desired viscosity when the cPRM is formed, or for how quickly it will harden the polymer (e.g., controlling the amount of time the cPRM will remain at a particular viscosity before hardening). The proportion of catalyst used in the PRM can be determined by the viscosity which results once mixed into the PRM. Thermoplastics used in PRM might be selected for their rate of melt flow. In one embodiment, monomers, polymers and/or fillers can be used as stabilizers to modify the cPRM viscosity. Examples of stabilizers which might be added into cPRM to modify its viscosity (e.g., to thicken it) include: flocculent silica powder, fumed silicas e.g., Aerosil®, precipitated silicas such as Sipemat®; microscopic hollow spheres such as phenolic, glass, or plastic microspheres; glass or plastic beads or bubbles; cotton flocks; chopped fiber, or microfibres (very fine wood or cellulose pulp), milled fiber (e.g., powder or floccular), sand, chalk, marble dust, quartz powder, talc, other ingredients listed herein (such as other fillers and particles), colorants (like pigments, color pastes), and combinations of these. In one embodiment, associative thickeners are stabilizers in cPRM, e.g., urethane-containing polymers available from Aldrich Chemical. VIMC might also be used to modify or control the viscosity of cPRM as desired, e.g., ambient heat can accelerate polymerization using MEKP, and radiation curing using a photoinitiator can harden cPRM with sufficient rapidity to minimize or avoid cPRM dispersing from the desired location on the mold or image surface. cPRMs differ, as do the effects of various additive ingredients. For example, viscosity-altering ingredients for cPRM also might change the resultant polymer qualities, e.g., affecting transparency and/or translucency, color, strength and/or permanence, or a combination of these.

The viscosity of the cPRM or one or more of the monomers can often cause problems, even if VIMC are used. For example, on polymerizing, cPRM can change from a low viscosity, runny state to a gel so rapidly that there is little time to reorient it as desired in the mold or on the image surface, and control of where it forms into polymer can be lost (e.g., the brush carries the cPRM in lumps). After polymerization, there may only be a brief interval during which the cPRM can be spread in a controlled and effective manner (e.g., with a brush or other tool) for the effect desired (e.g., for a smooth surface). Thus, it is often desirable to choose the ingredients to provide a sufficient viscosity for the image making process and for the image being formed. However, it is preferable that ingredients and processes used to modify cPRM viscosity do not compromise or sacrifice other qualities desired in that polymer.

With low viscosity cPRMs, the difficulty of forming a polymer with consistently even thickness generally increases as the undulations or angles of the mold (e.g., particularly an open mold rather than enclosed) or other surface (e.g., a polymer surface) increase in height and steepness. Thus, particularly with open molds and other open casting surfaces, the flatter the mold or other surface, the easier it is to form polymer evenly on it when using lower viscosity cPRMs. In this embodiment, it is preferable to form polymer on molds or other surfaces which have undulations and or angles that are as low, as few in number, and as far apart as possible. However, when cPRM is forming polymer on molds which are not very flat or which are not flat at all (such as deep molds, molds with significant undulations, or molds with both specifications), it might be desirable to modify the cPRM viscosity and/or to alter the mold (e.g., to use a enclosed mold). Regardless of the mold, subsequent superimposed layers of cPRMs that change from a low viscosity, runny state to a gel rapidly sometimes become less problematic. For example, a previous polymer application or layer can help to hold a newly applied, low viscosity cPRM in place, reducing its tendency to run out of the places where polymerization is preferred. For instance, this is often the case when applying cPRM under, over and within fiber layer(s).

Problems with cPRM being too viscous can also occur. For example, one or more monomers can be used in the cPRM to modify its viscosity (e.g., either as stabilizers or as active ingredients in the cPRM); one or more catalysts can be used in the cPRM which have specifications and which are used in percentages that either do not contribute to the viscosity problem or which preferably ameliorate the problem; VIMC can be used; and/or stabilizers can be used (such as fillers). Such solutions are preferred, provided they will not have any unacceptable effects on the inventive image formed.

In many embodiments, external polymer surface(s) that are exposed to air during polymerization do not fully cure. Such surfaces may even remain slightly sticky, emit a detectable odor (e.g., that odor is the further evaporation of solvent), or have an undesirably textured surface (e.g., pebbly surfaces instead of smooth). Incompletely cured polymer surfaces can be inhibited or prevented using a variety of methods. For example, polymer can be formed with a cPRM which polymerizes to the extent desired or using any one of numerous methods which inhibit or prevent evaporation of the cPRM. in one such method, polymer is formed in an enclosed mold. The use of one or more stabilizers in cPRM can also help control curing of the polymer, e.g., stabilizers such as Byk®-S 740 and Byk®-S 750 (made by Byk Chemie in Wallingford, Conn.), Silmar® A-111, Silmar® S-250, and Silmar® S-250a.

One preferable way to determine if a crosslinked polymer surface and some non-crosslinked polymers that are not soluble in acetone (e.g., polyethylene, polypropylene) has fully cured, is to test the stickiness with an appropriate solvent, e.g., acetone. Another less preferable test (particularly for hydrophobic polymers), is to observe the polymer surface in question for white spots after water, preferably distilled water, evaporates off of it.

Incompletely cured polymer surfaces on inventive images can be left as they are, if desired, or they can be further processed (e.g., painted). However, if the external surface of a polymer does not fully cure, it may be desirable to cure it more fully or completely using various methods, including removal of uncured external surface material of the polymer to reveal fully cured, or more fully cured, polymer underneath, e.g., by dissolving, sanding and/or sandblasting it off. Once its uncured external surface is removed and any removal solvent has evaporated, the remaining polymer should no longer emit a detectable odor, or its odor will be weaker. If any further processing is desired, it can be done. For instance, the SSI on the polymer's surface might be used to bond and/or to fortify the bond of a superimposition onto it, including use of: (a) the same cPRM, or a similar or a different cPRM which may or may not be able to chemically bond to it; (b) non polymeric superimpositions (e.g., attachments, parts, layers, sealers, coatings which may not bond to this surface without its SSI); (c) a colorant (e.g., with a conventional vehicle, with an unconventional vehicle or both), in which case the SSI serves as a surface preparation stabilizer; (d) by an underlayer, in which case the SSI can serve as a surface preparation stabilizer; (e) the SSI might be used as bonding spots; or (f) a combination of these.

In a second example, incompletely cured polymer surface portions need not be removed, as they can be partially or entirely overlaid by one or more superimpositions. Superimpositions can: (a) further or completely cure the polymer in situ, in which case it is a stabilizer; (b) at least partially cover over the polymer with a surface that is at least as fully cured; (c) serve another aesthetic and/or functional purpose, for instance to provide texture, to level the image's surface, or to enable desired reworking (e.g., as a surface preparation stabilizer enabling incising and/or carving to be done without clogging a bit or sander and/or forming or strengthening a bond between the polymer surface and one or more subsequent superimpositions, such as applications of new layers, parts, or components); (d) be a bonding substance for one or more further superimpositions (e.g., applications, parts, attachments, etc.); or (e) a combination of these. For example, a new layer might be superimposed on an incompletely cured polymer surface which will copolymerize with it in a strong chemical bond, co-mingle with it in a good bond, or loosely bond with it. If the superimposed application is a different polymer (e.g., polyacrylate on top of polyester) it might form an irregular mechanical bond, or a loose bond with its incompletely cured polymer underlayer, and/or a chemical bond with it. Superimpositions used on incompletely cured polymer surfaces can produce useful and desirable aesthetic effects and they may or may not be stabilizers.

Further Description of Monomers, Polymers, Catalysts, and Stabilizers

Polymer in inventive images may be made of mixtures of one or more monomers and/or polymers (also called blends). Any suitable polymer can be used in forming inventive images according to the invention, including mixtures and copolymers, as well as derivatives of any materials described herein. Examples of categories of monomers and polymers for use in inventive images include, but are not limited to, (a) monomer functionality, (b) monomer-to-monomer linkages, (c) polymer properties, and (d) polymer synthesis methods. The materials within each class include: (a) functional groups such as acids, acid salts, acid chlorides, amines, amides, anhydrides, hydroxyls, phenolics, imines, imides, organometallic, oxiranes, halogens, isocyanates, urethanes, ureas, ethers, esters, nitriles, mercaptans, aldehydes, hydrazides, sulfides, nitro groups, nitroso groups, alkynes, alkenes, aryl groups, substituted aryl groups, methylolamides, or mixtures thereof; (b) traditional carbon-carbon bonded polymers, polyamides, polyimides, polyurethanes, polyureas, polyallophanates, polybiurets, polyesters, polyethers, polyolefins, polydienes, polyalkynes, polydiynes, polyaryl polymers, polysiloxanes, polyphosphazenes, polysilanes, polypohsphonates, polypeptides, combinations thereof, mixtures thereof, or copolymers thereof; (c) hydrophilic, hydrophobic, oleophilic, oleophobic, water-soluble, fat-soluble, photoactive, conductive, crystalline, semi-crystalline, liquid crystalline, glassy, brittle, biodegradable, bioresorbable, thermoplastic, elastomeric, thermosetting, thermotropic, thixotropic, rheopectic, or combinations thereof; and (d) step growth, addition, condensation, free-radical, anionic, cationic, emulsion, suspension, latex, self-polymerizable, solution, or interfacial polymers, or mixtures thereof. Polymers useful in the present invention may be homopolymers or random, alternating, statistical, block, graft, comb, star, or mixed copolymers of two or more monomers, such that the architecture of the polymer is linear, branched, dendritic, multi-arm star, networked, cross linked, combinations thereof, or any other polymer architecture known to one of ordinary skill in the art. In some embodiments, the polymer can be in pellet or powder form (e.g., molding compounds). Monomers and polymers may be also used as stabilizers in inventive images. The following are further examples of products which might be used for the preparation and formulation of polymer in inventive images.

Among preferred examples are: Poly(methyl methacrylate); Other Methacrylate Ester Polymers, such as poly(butyl methacrylate); Polystyrene; Poly(ethylene terephthalate) (PET or ethylene terephthalate); PETG Poly(ethylene terephthalate glycol); poly(ethylene glycol terephthalate); PETE (polyethylene terephthalate ester); Other Polyesters; Poly(butylene terephthalate); Nylons; poly(tetrafluoroethylene) (Teflon); Polyolefins (PE, PP); Cellulose ethers; Poly (vinyl chloride); diallyl carbonate; and methyl methacrylate, and combinations thereof.

These are examples of products that might be used to make inventive images, e.g., available from Aldrich Chemical Company.

1). Monofunctional acrylates, such as: butyl acrylate; tert-butyl acrylate; ethyl acrylate; 2-ethylhexyl acrylate; isobornyl acrylate; and methyl acrylate all of which are preferred, as well as: 2,2,3,3-tetrafluoropropyl acrylate; 1,1,1,3,3,3-hexafluoroisopropyl acrylate; dicaprolactone 2-(acryloyloxy)ethyl ester; 4-hydroxybutyl acrylate; 2 (dimethylamino) ethyl acrylate; methyl 2-acetamidoacrylate; trimethyl 2-phosphonoacrylate; hydroxypropyl acrylate; ethylene glycol dicyclopentenyl ether acrylate; [2-(acryloyloxy)ethyl]-trimethylammonium methyl sulfate; 2-acetamidoacrylic acid; hexyl acrylate; 2-bromoacrylic acid; 2-cyanoethyl acrylate; butyl 2-cyanoacrylate; and the like.

2). Polyfunctional acrylates, such as: ethylene diacrylate; tetraethylene glycol diacrylate; 1,6-hexanediol diacrylate; and polybutadiene, acrylate terminated, all of which are preferred, as well as: 2-ethyl-2-(hydroxymethyl)-1,3-propanediol triacrylate; tripropylene glycol diacrylate; trimethylolpropane triacrylate; and the like.

3). Monofunctional methacrylates, such as: allyl methacrylate (preferred); ethyl 2-(trimethylsilylmethyl)acrylate; 2-(bromomethyl)acrylic acid; 2,2,3,4,4,4-hexafluorobutyl methacrylate; butyl methacrylate (preferred); 1,1,1,3,3,3-hexafluoroisopropyl methacrylate; 2-ethoxyethyl methacrylate (preferred); 2,2,2-trifluoroethyl methacrylate; ethyl methacrylate (preferred); 2-ethylhexyl methacrylate; isobornyl methacrylate; 2-(methacryloyloxy)ethyl acetoacetate; isobutyl methacrylate (preferred); caprolactone 2-(methacryloyloxy)ethyl ester; itaconic acid; 2-(trimethylsilyloxy)ethyl methacrylate; itaconyl chloride (preferred); 3-(trimethoxysilyl)propyl methacrylate; lauryl methacrylate; methyl 2-(bromomethyl)acrylate (preferred); methyl methacrylate (preferred); 2-(trifluoromethyl)acrylic acid (preferred); 2,2,3,3-tetrafluoropropyl methacrylate; [2-(methacryloyloxy)ethyl]trimethylammonium chloride; [2-(methacryloyloxy)ethyl]trimethylammonium methyl sulfate; and the like.

4). Polyfunctional methacrylates, such as: 2-ethyl-2-(hydroxymethyl)-1,3-propanediol trimethacrylate; 1,4-butanediol dimethacrylate; neopentyl glycol dimethacrylate; trimethylolpropane trimethacrylate; and the like.

5). Acrylamide, methacrylamide and derivatives thereof, such as: N-[tris(hydroxymethyl)methyl]acrylamide; diacetone acrylamide; Methyl 2-acrylamido-2-methoxyacetate; N,N-dimethylacrylamide; N,N'-(1,2-dihydroxyethylene)bisacrylamide; N,N'-methylenebisacrylamide; 2-acrylamidoglycolic acid monohydrate; 2-acrylamido-2-methyl-1-propanesulfonic acid; N-(hydroxymethyl)acrylamide; (3-(methacryloylamino)propyl)trimethylammonium chloride; Poly(melamine-co-formaldehyde) acrylated; N-(tris(hydroxymethyl)methyl)acrylamide (preferred); and the like.

6). Acrylonitrile and methacrylonitrile, such as: acrylonitrile; 1-cyanovinyl acetate; methacrylonitrile; 2-chloroacrylonitrile; and the like.

7). Difunctional, saturated carboxylic acids, such as: 2,4-dimethylglutaric acid; 1,3-acetonedicarboxylic acid (preferred); 1,3-adamantanediacetic acid; adipic acid (preferred); alizarin complexone dihydrate; azelaic acid (preferred); 3-aminoadipic acid; benzylmalonic acid; N-benzyliminodiacetic acid; bromosuccinic acid; bis(carboxymethyl)trithiocarbonate; butyhnalonic acid; N-benzyloxycarbonyl-glutamic acid; N-carbobenzyloxy-aspartic acid; 3-chlorododecanedioic acid; chlorosuccinic acid; citramalic acid; citramalic acid, disodium salt; 1,1-cyclohexanediacetic acid; dibenzoyl-tartaric acid monohydrate; cyclohexylsuccinic acid; 1,10-decanedicarboxylic acid; diethylmalonic acid; meso-2,3-dibromosuccinic acid; diglycolic acid; 2,5-dihydroxy-1,4-benzenediacetic acid; meso-2,3-dimercaptosuccinic acid; 2,2-dimethylglutaric acid; 3,3-dimethylglutaric acid; dimethylmalonic acid; 2,2-dimethylsuccinic acid; 2,3-dimethylsuccinic acid; dipivaloyl-tartaric acid; 3,3'-dithiodipropionic acid; Di-p-toluoyl-tartaric acid monohydrate; docosanedioic acid; 3-hydroxy-3-methylglutaric acid;

1,12-dodecanedicarboxylic acid (preferred); N,N'-ethylenebis(2-(2-hydroxyphenyl)glycine); ethylmalonic acid; 2-ethyl-2-methylsuccinic acid; glutaric acid (preferred); hexadecanedioic acid preferred); hexafluoroglutaric acid; 2-isopropylmalic acid; 2-ketoglutaric acid; ketomalonic acid monohydrate; 4-ketopimelic acid; ketomalonic acid monohydrate, disodium salt; malic acid; malonic acid; mercaptosuccinic acid; 3-methyladipic acid; 2-methylglutaric acid; 3-methylglutaric acid; methylmalonic acid; methylsuccinic acid; N-(4-nitrobenzoyl)-glutamic acid hemihydrate; oxalacetic acid; oxalic acid; 2-oxoadipic acid; 3-oxoadipic acid; 5-oxoazelaic acid; perfluoroadipic acid hydrate; 1,2-phenylenediacetic acid; 1,3-phenylenediacetic acid; 1,4-phenylenediacetic acid; 1,2-phenylenedioxydiacetic acid; 1,4-phenylenedipropionic acid; 3-phenylglutaric acid; phenylmalonic acid; phenylsuccinic acid; pimelic acid; N-phthaloyl-glutamic acid; sebacic acid (preferred); suberic acid (preferred); succinic acid (preferred); sulfosuccinic acid; tartaric acid; tartaric acid, dipotassium salt hydrate; tetracosanedioic acid; tetrafluorosuccinic acid; 3,3-tetramethyleneglutaric acid; 2,2,5,5-tetramethylhexanedioic acid; thiodiglycolic acid; 3,3'-thiodipropionic acid; undecanedioic acid; 1,11-undecanedicarboxylic acid; and the like.

8). Polyfunctional, saturated carboxylic acids, such as: isocitric acid, trisodium salt hydrate; beta-methyl tricarballylic acid; nitromethanetrispropionic acid; 1,2,3,4-butanetetracarboxylic acid; tricarballylic acid; 2-(carboxymethylthio)succinic acid; citric acid; trans-1,2-diaminocyclohexane-N,N,N',N'-tetraacetic acid monohydrate; 2,2',2'',2'''-(1,2-ethanediylidenetetrakis(thio))tetrakisacetic acid; 2,2'-(ethylenedioxy)dianline-N,N,N',N'-tetraacetic acid; and the like.

9). Di- and Polyfunctional, unsaturated carboxylic acids, such as: acetylenedicarboxylic acid (preferred); 4,4'-azobis(4-eyanovaleric acid) (main conventional use is as an initiator) (preferred); maleic acid (preferred); trans-traumatic acid; aconitic acid; citraconic acid; dibromomaleic acid; dihydroxyfumaric acid hydrate; fumaric acid; fumaric acid, disodium salt; trans-glutaconic acid; trans-beta-hydromuconic acid; itaconic acid; 3-thiophenemalonic acid; mesaconic acid; 1,4-phenylenediacrylic acid; trans,trans-muconic acid; 5-norbomene-endo-2,3-dicarboxylic acid; and the like.

10). Difunctional, saturated, cyclic, carboxylic acids, such as: 1,3-adamantanedicarboxylic acid; 1,4-cyclohexanedicarboxylic acid (preferred); camphoric acid (preferred); trans-1,2-cyclohexanedicarboxylic acid (preferred); 1,3-cyclohexanedicarboxylic acid (preferred); trans-1,2-cyclopentanedicarboxylic acid; and the like.

11). Polyfunctional, saturated, cyclic, carboxylic acids, such as: Kemp's triacid; 1,3,5-cyclohexanetricarboxylic acid (preferred); 1,2,3,4,5,6-cyclohexanehexacarboxylic acid monohydrate; 1,4,8,11-tetraazacyclotetradecane-1,4,8,11-tetraacetic acid tetrahydrochloride tetrahydrate; (1 alpha, 3alpha,5beta)-1,3,5-trimethyl-1,3,5-cyclohexanetricarboxylic acid; and the like.

12). Difunctional, aromatic carboxylic acids, such as: phthalic acid (preferred); terephthalic acid (preferred); 4-chlorophthalic acid, monosodium salt; 5-aminoisophthalic acid; 3-aminophthalic acid; 2-aminoterephthalic acid; 4,4'-biphenyldicarboxylic acid; 4-bromoisophthalic acid; 2-bromoterephthalic acid; 5-tert-butylisophthalic acid; chrome azurol S; 2,7-di-tert-butyl-9,9-dimethyl-4,5-xanthenedicarboxylic acid; diphenic acid; 2,5-dihydroxyterephthalic acid; 2,2'-dithiosalicylic acid; 5,5'-dithiobis(2-nitrobenzoic acid); 3-fluorophthalic acid; 4-hydroxyisophthalic acid; 5-hydroxyisophthalic acid; 2,2'-iminodibenzoic acid; 5-(((1-hydroxy-2-naphthyl)carbonyl)octadecylamino)isophthalic acid; isophthalic acid; 4-methylphthalic acid; 1,4-naphthalenedicarboxylic acid; 2,3-naphthalenedicarboxylic acid; 2,6-naphthalenedicarboxylic acid (preferred); 4,5-dichlorophthalic acid; 5-nitroisophthalic acid; 3-nitrophthalic acid; 4-nitrophthalic acid; nitroterephthalic acid; 5-octadecyloxyisophthalic acid; 4,4'-oxybis(benzoic acid); pamoic acid; 4-sulfophthalic acid; tetrafluorophthalic acid; tetrafluoroisophthalic acid; tetrafluoroterephthalic acid; and the like.

13). Polyfunctional aromatic carboxylic acids, such as: 1,3,5-benzenetricarboxylic acid; mellitic acid; 1,4,5,8-naphthalenetetracarboxylic acid hydrate; aurintricarboxylic acid; 1,2,4,5-benzenetetracarboxylic acid; 1,2,4-benzenetricarboxylic acid; 1,2,3-benzenetricarboxylic acid hydrate; 5-(4-carboxy-2-((1,3-dioxo-3-(4-((1-oxooctadecyl)-amino)phenyl)propyl)amino)phenoxy)isophthalic acid; and the like.

14). Difunctional, heterocyclic carboxylic acids, such as: 2,6-dimethyl-3,5-pyridinedicarboxylic acid; 2,2'-bipyridine-4,4'-dicarboxylic acid; isocitric lactone; 6-methyl-2,3-pyridinedicarboxylic acid; 2,3-pyrazinedicarboxylic acid; 2,3-pyridinedicarboxylic acid; 2,4-pyridinedicarboxylic acid monohydrate; 2,5-pyridinedicarboxylic acid; 2,6-pyridinedicarboxylic acid (preferred); 3,4-pyridinedicarboxylic acid; 3,5-pyridinedicarboxylic acid; 6,6'-thiodinicotinic acid; 1,1'-ethylenebis(5-oxo-3-pyrrolidine-carboxylic acid); and the like.

15). Difunctional, saturated alcohols, such as: threo-2-amino-1-(4-nitrophenyl)-1,3-propanediol; Benzopinacole; poly(tetrahydrofuran); batyl alcohol; 2-amino-2-ethyl-1,3-propanediol; 1,2-benzenedimethanol; 2-amino-1-phenyl-1,3-propanediol; 1,3-benzenedimethanol; 2,3-O-benzylidenethreitol; 2-benzyloxy-1,3-propanediol; 3-(N-benzyl-N-methylamino)-1,2-propanediol; 2,2'-biphenyldimethanol; 2,2-bis(bromomethyl)-1,3-propanediol; 1,3-butanediol; N,N-bis(2-hydroxyethyl)-p-toluenesulfonamide; 3-bromo-1,2-propanediol; 1,4-butanediol (preferred); 2,3-butanediol; N-(3-chlorophenyl)-2,2'-iminodiethanol; 1,2-decanediol (preferred); 1,2-cyclohexanedimethanol; N,N-bis(2-hydroxyethyl)isonicotinamide; N,N'-bis(2-hydroxyethyl)ethylenediamine; 1,4-dibenzyloxy-2,3-butanediol; 1,4-dibromo-2,3-butanediol; dibutyl tartrate; 2,3-dibromo-1,4-butanediol; diethylene glycol (preferred); 1,2-dicyclohexyl-1,2-ethanediol; diethanolamine; diethyl bis(hydroxymethyl)malonate; diethyl tartrate; 3,3-dimethyl-1,2-butanediol; diisopropanolamine; 3-diisopropylamino-1,2-propanediol; diisopropyl tartrate; 1,1-diphenyl-1,2-propanediol; dimethyl tartrate; 1,3-dioxane-5,5-dimethanol; 3-dipropylamino-1,2-propanediol; dipropylene glycol; 3,6-dithia-1,8-octanediol; 2,4-dimethyl-2,4-pentanediol; 3-ethoxy-1,2-propanediol; ethylene glycol (preferred); 3-ethylthio-1,2-propanediol; glyceraldehyde; glycerol 2-phosphate, disodium salt hydrate; hexaethylene glycol (preferred); 3-fluoro-1,2-propanediol; 1,6-hexanediol (preferred); 3-(4-methoxyphenoxy)-1,2-propanediol; hydrobenzoin (preferred); hydroquinone bis(2-hydroxyethyl)ether; 2-hydroxyethyl disulfide; 2,3-o-isopropylidene-threitol; mephenesin; ketomalonic acid monohydrate; 2-methyl-2,4-pentanediol; 3-methoxy-1,2-propanediol; 2-methyl-1,3-propanediol; 3-methylthio-1,2-propanediol; 3-morpholino-1,2-propanediol; 1-(2-nitrophenyl)-1,2-ethanediol; pentaethylene glycol; 5-nitro-m-xylene-alpha,alpha'-diol; 1,2-pentanediol; pentanediol; 3-phenoxy-1,2-propanediol; N-phenyldiethanolamine (preferred); 1-phenyl-1, 2-ethanediol; 2-phenyl-1,2-propanediol; pinacol; 2,2'-(1,2-phenylenedioxy)diethanol; 1,2-propanediol (preferred); 3-pyrrolidino-1,2-propanediol; serinol; tetraethylene glycol; tartaric acid; 1,2-tetradecanediol; 1,14-tetradecanediol; triethylene glycol; N,N,N',N'-tetramethyl-L-tartaramide; thiomicamine; 2,2'-(4-tolylimino)diethanol; 2,2,4-trimethyl-1,3-pentanediol; 4,4'-trimethylenebis(1-piperidineethanol); 1,1,2-triphenyl-1,2-ethanediol; 2,3,5,6-tetrachloro-m-xylene-alpha,alpha'-diol; 3-piperidino-1,2-propanediol; poly(caprolactone) diol; poly(ethylene glycol); poly(propylene glycol); poly(propylene glycol)ethylene oxide capped; poly(tetrahydrofuran); 2,3-di-2-pyridyl-2,3-butanediol; 2,3-di-3-pyridyl-2,3-butanediol; 1,4-cyclohexanedimethanol; 2,3,5,6-tetramethyl-p-xylene-alpha,alpha'-diol; alpha,alpha,alpha',alpha'-tetramethyl-1,3-benzenedimethanol; alpha,alpha,alpha',alpha'-tetramethyl-1,4-benzenedimethanol; alpha,alpha,alpha',alpha'-tetrakis(trifluoromethyl)-1,3-benzenedimethanol; alpha,alpha,alpha',alpha'-tetrakis(trifluoromethyl)-1,4-benzenedimethanol hydrate; 4-(2,3-dihydroxypropyl) 2-isononylsuccinate, potassium salt; trans-alpha,alpha'-(2,2-dimethyl-1,3-dioxolane-4,5-diyl)-bis(diphenylmethanol); 3-((1,1-dimethyl-1-hydroxyethyl)amino)-2-hydroxy-1-propanesulfonic acid; and the like.

16). Polyfunctional, saturated alcohols, such as: 1-(4-nitrophenyl)glycerol; poly(caprolactone)triol; pentaerythritol (preferred); poly(propylene glycol) triol (preferred); tricine; poly(propylene glycol) triol, ethylene oxide capped; TAPS; ribulose hydrate; N,N,N',N'-tetrakis(2-hydroxypropyl)ethylene-diamine; TES; 1-(N,N-bis(2-hydroxyethyl)amino)-2-propanol; bis-homotris; 1,3-bis(tris(hydroxymethyl)methylamino)propane; 1,2,4-butanetriol; 2-(bromomethyl)-2-(hydroxymethyl)-1,3-propanediol; Glycerol (preferred); 2-ethyl-2-(hydroxymethyl)-1,3-propanediol; erythrulose hydrate; 1,2,3,-heptanetriol; 2-(hydroxymethyl)-1,3-propanediol; nitromethanetrispropanol; pentrol; pantothenol; threitol; triisopropanolamine; 1,3,5-tris(2-hydroxyethyl)cyanuric acid; 1,1,1-tris(hydroxymethyl)ethane; tris(hydroxymethyl)nitromethane; 3-(bis(2-hydroxyethyl)amino)-2-hydroxy-1-propanesulfonic acid; 3,7,11,15-tetramethyl-1,2,3-hexadecanetriol; and the like.

17). Difunctional, unsaturated alcohols, such as: 2-butene-1,4-diol (preferred); 1,4-bis(2-hydroxyethoxy)-2-butyne; 3-cyclohexene-1,1-dimethanol; trans-2,3-dibromo-2-butene-1,4-diol; N,N'-diallyltartardiamide; N,N'-(1,2-dihydroxyethylene)bisacrylamide; 3-allyloxy-1,2-propanediol; 2,7-dimethyl-3,5-octadiyne-2,7-diol; 2,5-dimethyl-3-hexyne-2,5-diol; 3,6-dimethyl-4-octyne-3,6-diol; dihydroxyfumaric acid hydrate; 1,5-hexadiene-3,4-diol; 5-hexene-1,2-diol; 2-methylene-1,3-propanediol; 5-norbomene-2,2-dimethanol; trans, trans-2,6-dimethyl-2,6-octadiene-1,8-diol; poly(butadiene)diol (preferred); 3-hexyne-2,5-diol; 7-octene-1,2-diol; (2-endo,3-exo)bicyclo(2,2,2)oct-5-ene-2,3-dimethanol; 2,4,7,9-tetramethyl-5-decyne-4,7-diol; 4-(2,3-dihydroxypropyl) 2-(2-methylene-4,4-dimethylpentyl)succinate, potassium salt; and the like.

18). Difunctional, saturated cyclic alcohols, such as: pinanediol; 1,3-cyclohexanediol (preferred); 1,2-cyclohexanediol; 1,4-cyclohexanediol (preferred); trans-1,2-cyclohexanediol (preferred); 1,2-cyclooctanediol (preferred); trans-1,2-cyclooctanediol; 1,4-cyclooctanediol; 1,2-cyclopentanediol; 2,2-dihydroxy-1H-benz(f)indene-1,3(2H)-dione; trans-1,2-cyclopentaediol; 2,2-dihydroxy-5-methoxy-1,3-indandione; p-methane-3,8-diol; exo-2,3-norbomanediol; and the like.

19). Polyfunctional, saturated cyclic alcohols, such as, 1,3,5-cyclohexanetriol dihydrate (preferred); and the like.

20). Difunctional, unsaturated cyclic alcohols, such as: croconic acid, disodium salt; trans-p-menth-6-ene-2,8-diol (preferred); 3,5-cyclohexadiene-1,2-diol; tetramethyl 2,6-dihydroxybicyclo(3.3.1)nona-2,6-diene-1,3,5,7-tetracarboxylate; and the like.

21). Difunctional, aromatic alcohols, such as: Alizarin; tiron; 4-aminoresorcinol hydrochloride; anthraflavic acid; 2,2-bis(4-hydroxy-3-methylphenyl)propane; 3,4-dihydroxybenzylamine hydrobromide; chrysophanic acid; N,N'-bis(2-hydroxy-alpha-phenylbenzylidene)ethylenediamine; 2,2'-biphenol; 3,6-dihydroxynaphthalene-2,7-disulfonic acid, disodium salt; esculetin; 3-(3,4-dihydroxyphenyl)-2-methylalanine sesquihydrate; resorcinol (preferred); 2,2',3,3',5,5',6,6'-octafluoro-4,4'-biphenol monohydrate; olivetol; 4,4-bis(4-hydroxyphenyl)valeric acid; 4-bromoresorcinol; 4-bromo-3,5-dihydroxybenzoic acid; tert-butylhydroquinone; 5-bromo-2,4-dihydroxybenzoic acid monohydrate; 1,1'-bi-2-naphthol; 2-chloro-3',4'-dihydroxyacetophenone; chlorohydroquinone; 2-(2-chlorophenyl)hydroquinone hydrate; 4-chlororesorcinol; 2,5-di-tert-butylhydroquinone; 5,8-dichloro-1,4-dihydroxyanthraquinone; 3,5-di-tert-butylcatechol; 6,7-dichloro-1,4-dihydroxyanthraquinone; calmagite; 2,3-dichloro-5,8-dihydroxy-1,4-naphthoquinone; 4,6-dichlororesorcinol; bis(2-hydroxyphenyl)methane (preferred); bis(4-hydroxyphenyl)methane; diethyl 2,5-dihydroxyterephthalate; 2,3-dicyanohydroquinone; 2,3-dihydro-9,10-dihydroxy-1,4-anthracenedione; 2',4'-dihydroxyacetophenone; 2',5'-dihydroxyacetophenone; 2',6'-dihydroxyacetophenone; 3',5'-dihydroxyacetophenone; 2,2'-dihydroxyazobenzene; 1,3-dihydroxy-9-acridinecarboxylic acid; 1,8-dihydroxyanthraquinone; 2,3-dihydroxybenzaldehyde; 2,4-dihydroxybenzaldehyde; 2,5-dihydroxybenzaldehyde; 3,4-dihydroxybenzaldehyde; 2,5-dihydroxy-1,4-benzenediacetic acid; 3,5-dihydroxybenzaldehyde; 2,3-dihydroxybenzoic acid; 2,4-dihydroxybenzoic acid; 2,5-dihydroxybenzoic acid; 2,6-dihydroxybenzoic acid; 3,4-dihydroxybenzoic acid; 3,5-dihydroxybenzoic acid; 2,5-dihydroxy-1,4-benzoquinone; 2,4-dihydroxybenzophenone; 3,4-dihydroxycinnamic acid; 1,2-dihydroxynaphthalene; 2,2'-dihydroxy-4,4'-dimethoxybenzophenone; 1,6-dihydroxynaphthalene; 3,4-dihydroxyhydrocinnamic acid; 2,6-dihydroxynaphthalene; 2,2'dihydroxy-4-methoxybenzophenone; phenylhydroquinone (preferred); 7,8-dihydroxy-6-methoxycoumarin; orcinol monohydrate; 2',4'-dihydroxy-3'-methylacetophenone; quinizarin; 3,5-dihydroxy-4-methylbenzoic acid hemihydrate; nuclear fast red; 2',4'-dihydroxy-3'-methylbutyrophenone; 2-nitroresorcinol; 2',4'-dihydroxy-3'-methylpropiophenone; 1,4-dihydroxy-2-naphthoic acid; 3,5-dihydroxy-2-naphthoic acid; 3,7-dihydroxy-2-naphthoic acid; 5,8-dihydroxy-1,4-naphthoquinone; 2,5-dihydroxyphenylacetic acid; 3,4-dihydroxyphenylacetic acid; 2',4'-dihydroxypropiophenone; 2',5'-dihydoroxypropiophenone; 2,5-dihydroxyterephthalic acid; 3,5-diisopropylcatechol; 2,3-dimethylhydroquinone; 2,3-dimethylquinizarin; 2,5-dimethylresorcinol; 2,4-dinitro-1,8-naphthalenediol; dopa (3,4-dihydroxyphenylalanine); 4-dodecylresorcinol; ethyl 3,5-dibromo-2,4-dihydroxy-6-methylbenzoate; ethyl 3,4-dihydroxybenzoate; ethyl 2,4-dihydroxy-6-methylbenzoate; 4-ethylresorcinol; ethyl 3,4-dihydroxyhydrocinnamate; 3-fluorocatechol; N,N'-ethylenebis(2-(2-hydroxyphenyl)glycine); glyoxal bis(2-hydroxyanil); 3,3'-(ethylenedioxy)diphenol (preferred); 4-hexylresorcinol (preferred); 2,2'-ethylidenebis(4,6-di-tert-butylphenol); hydroquinone; 4,4'(hexafluoroisopropylidene)diphenol; 4-hexanoylresorcinol;

hydroquinonesulfonic acid, potassium salt; 4,4'-isopropylidenediphenol; 4,4'-isopropylidenebis(2,6-dibromophenol); 3-methoxycatechol; 4,4'-isopropylidenebis(2,6-dichlorophenol); methoxyhydroquinone; methyl 2,6-dihydroxy-4-methylbenzoate; 5-methoxyresorcinol; 2,2'-methylenebis(4-chlorophenol); 3-methylcatechol (preferred); 4,4'-methylenebis (2,6-di-tert-butylphenol) (preferred); methyl 2,4-dihydroxybenzoate; methyl 3,5-dihydroxybenzoate; 2-methylresorcinol; 4-nitrocatechol; 4-(4-nitrophenylazo)resorcinol rhodizonic acid dipotassium salt; 4-(2-pyridylazo) resorcinol; 4,4'-sulfonylbis(2,6-dimethylphenol); 4,4'-sulfonyldiphenol; tetrachlorocatechol monohydate; tetrabromocatechol; 1,2,3,4-tetrafluoro-5,8-dihydroxyanthraquinone; tetrafluorohydroquinone; 2,4,6-tribromoresorcinol; 4,4'-thiodiphenol; 7,7'-ureylenebis(4-hydroxy-2-naphthalenesulfonic acid); trimethylhydroquinone; and the like.

22). Polyfunctional, aromatic alcohols, such as: 1,1,1-tris(4-hydroxyphenyl)ethane; apigenin; baicalein monohydrate; 1,2,4-benzenetriol (preferred); 4-tert-butylcalix(4)arene; 4-tert-butylcalix(6)arene (preferred); 4-tert-butylcalix(8) arene; catechin hydrate; 4,6-dinitropyrogallol; dithranol; ellagic acid dihydrate; quercetin dihydrate; gallic acid; lauryl gallate; methyl 3,4,5-trihydroxybenzoate; 4-nitropyrogallol hemihydrate; octyl gallate; phloroglucinol dihydrate; propyl gallate; tetrahydropapaveroline hydrobromide; tetrahydroxy-1,4-quinone hydrate; 2',3',4'-trihydroxyacetophenone; 2,3,4-trihydroxybenzaldehyde; 2,4,6-trihydroxybenzaldehyde; 3,4,5-trihydroxybenzaldehyde; 2,3,4-trihydroxybenzoic acid; 2,3,4-trihydroxybenzophenone; 2,4,4'-trihydroxybenzophenone; 3-(2,4,5-trihydroxyphenyl)-alanine; 2',4',6'-trihydroxyacetophenone monohydrate; purpurin; 3,3,3',3'-tetramethyl-1,1'-spirobisindane-5,5',6,6'-tetrol;pyrogallol (preferred); 2,4,6-trihydroxybenzoic acid monohydrate; emodin; 1,8,15,22, tetramethyl(1,4)metacyclophan-3,5,10, 12,17,19,24,26-octol; and the like.

23). Difunctional, heterocyclic alcohols, such as: 6-amino-2, 4-dihydroxy-5-nitrosopyrimidine; 2-amino-4,6-dihydroxypyrimidine; 1,4-anhydro-threitol; 4-amino-2,6-dihydroxypyrimidine; 2,2'-bipyridine-3,3'-diol (preferred); 2-cyanoamino-4,6-dihydroxypyrimidine; 5-chloro-2,3-pyridinediol; 5,6-diamino-2,4-dihydroxypyrimidine sulfate; isomannide; 2,6-dihydroxy-4-methyl-3-pyridinecarbonitrile; 4,7-dihydroxy-1,10-phenanthroline; 2,4-dihydroxypyrimidine-5-carboxylic acid hydrate; 1,4-dioxane-2,3-diol (preferred); erythronic gamma-lactone; glycolaldehyde dimer, crystalline; Isosorbide; 1,5-isoquinolinediol; 1,3,5-O-methylidyne-myo-inositol; 2,4-quinolinediol; 1,5,9,13,17, 21-hexathiacyclotetracosane-3,11,19-triol; 1,5,9,13-tetrathiacyclohexadecane-3,11-diol; and the like.

24). Polyfunctional heterocyclic acids, such as: 3,5-pyrazoledicarboxylic acid monohydrate (preferred); pyridoxine; 1,2,3-triazole-4,5-dicarboxylic acid; 4,5-imidazoledicarboxylic acid (preferred); and the like.

25). Difunctional, saturated, primary amines, such as: 1,4-bis (3-aminopropyl)piperazine; N,N'-bis(2-aminoethyl)-1,3-propanediamine; cystamine dihydrochloride (preferred); N,N'-bis(3-aminopropyl)ethylenediamine; 2,6-diaminopimelic acid; 2,2-dimethyl-1,3-propanediamine (preferred); 4,9-dioxa-1,12-dodecanediamine; 1,2-diphenylethylenediamine; ethylenediamine (preferred); 2,2'-(ethylenedioxy)bis(ethylamine); 1,6-hexanediamine (preferred); 3,3'-iminobispropylamine; lysine; 2-methylomithine hydrochloride monohydrate; 2-methyl-1,5-pentanediamine; pentaethylenehexamine; spermidine trihydrochloride; 1,4,7,11-tetraazaundecane tetrahydrochloride; spermine tetrahydrochloride; tetraethylenepentamine pentahydrochloride; triethylenetetramine hydrate; 4,7,10-trioxa-1,13-tridecanediamine; p-xylylenediamine; bis(hexamethylene)triamine; 1,12-diaminododecane; 1,9-diaminononane; 1,5-diaminopentane; 1,8-diaminooctane (preferred); 1,3-diaminopentane; 1,2-diaminopropane; 1,3-diaminopropane; 1,3-cyclohexanebis(methylamine); cystine; 1,3-diaminoacetone dihydrochloride monohydrate; 1,4-diaminobutane (preferred); 2,4-diaminobutyric acid hydrochloride; 1,10-diaminodecane; N,N'-bis(3-aminopropyl)-1,3-propanediamine; 1,7-diaminoheptane; and the like.

26). Polyfunctional, saturated, primary amines, such as tris (2-aminoethyl)amine (preferred); and the like.

27). Difunctional, saturated, cyclic, primary amines, such as: trans-1,4-diaminocyclohexane (preferred); 1,2-diaminocyclohexane (preferred); 1,8-diamino-p-methane; 4,4'-methylenebis(cyclohexylamine) (preferred); 4,4'-methylenebis(2-methylcyclohexylamine); and the like.

28). Difunctional, aromatic, primary amines, such as: 3,5-diarninobenzylalcohol dihydrochloride; 2-aminophenyl disulfide; 4-aminophenyl disulfide; 3-aminophenyl sulfone; 4-aminophenyl sulfone; 1,1'-binaphthyl-2,2'-diamine; 2,5-bis(4-aminophenyl)-1,3,4-oxadiazole; 2-chloro-1,4-phenylenediamine sulfate; 4-chloro-1,2-phenylenediamine; 3,6-diaminoacridine hydrochloride; chrysoidin; 1,2-diaminoanthraquinone; 4-aminophenyl ether; 1,5-diaminoanthraquinone; 2,5-diaminobenzenesulfonic acid; 3,4-diaminobenzoic acid; 1,4-diaminoanthraquinone; 3,5-diaminobenzoic acid; 3,4-diaminobenzophenone; 4,4'-diaminobenzophenone; 4,4'-diaminodiphenylamine sulfate; 2,7-diaminofluorene; 3,7-diamino-2-methoxyfluorene; 1,8-diaminonaphthalene; 2,3-diaminonaphthalene; 2,6-diamino-4-nitrotoluene; 4,4'-diaminooctafluorobiphenyl; 9,10-diaminophenanthrene; 2,3-diaminophenol; 2,4-diaminophenol dihydrochloride; 3,8-diamino-6-phenylphenanthridine; 4,4'-diaminostilbene dihydrochloride; 2,3-diaminotoluene; 2,4-diaminotoluene; 2,5-diaminotoluene sulfate; 2,5-dichloro-1,4-phenylenediamine; 4,5-dichloro-1,2-phenylenediamine; 3,3'-dimethoxybenzidine (preferred); 3,3'-dimethylnaphthidine; 2,5-dimethyl-1,4-phenylenediamine; 4,5-dimethyl-1,2-phenylenediamine; 2,2'-dithiobis(1-naphthylamine); 2,2'-ethylenedianiline diphosphate; 4,4'-ethylenedianiline (preferred); 4,4'-ethylenedi-m-toluidine (preferred); 4,4'-(hexafluoroisopropylidene)dianiline; Fat Brown RR; 4-methoxy-1,3-phenylenediamine sulfate hydate; 2,6-diaminotoluene; 4,4'-methylenebis(2,6-diethylanine); 4,4'-methylenebis (2,6-dimethylaniline); thionin perchlorate; 4,4'-methylenebis (3-nitroaniline); 3,3'-methylenedianiline; 4,4'-methylenebis (2,6-diisopropylaniline); 4,4'-methylenediailine; 2,3,5,6-tetramethyl-1,4-phenylenediamine; 3,3',5,5'-tetramethylbenzidine; o-tolidine dihydrochloride; 2-nitro-1, 4-phenylenediamine; 2,4,6-trimethyl-1,3-phenylenediamine; 3-nitro-1,2-phenylenediamine; 5,5'-(hexafluoroisopropylidene)di-o-toluidine; 4-nitro-1,2-phenylenediamine; 4-methoxy-1,2-phenylenediamine dihydrochloride; 1,2-phenylenediamine; 4''',4'''-(hexafluoroisopropylidene)bis(4-phenoxyaniline); 1,3-phenylenediamine; 3,5-dibromo-1,2-phenylenediamine monohydrochloride; 1,4-phenylenediamine (preferred); 4-(2-hydroxyethylthio)-1,3-phenylenediamine dihydrochloride; and the like.

29). Polyfunctional, aromatic, primary amines, such as: 1,2,4,5-benzenetetramine tetrahydrochloride; pararosaniline base; Bismark Brown Y; 3,3'-diaminobenzidine (preferred); and the like.

30). Difunctional, heterocyclic, primary amines, such as: 6-chloro-3,5-diamino-2-pyrazinecarbonitrile; 5,6-diamino-1,3-dimethyluracil hydrate; 6-chloro-3,5-diamino-2-pyrazinecarboxamide; 3,4-diamino-5-hydroxypyrazole sulfate; 2,6-diamino-4-chloropyrimidine 1-oxide; 2,4-diamino-6-hydroxypyrimidine; 5,6-diamino-2,4-dihydroxypyrimidine sulfate; 4,5-diamino-6-hydroxypyrimidine; 2,4-diamino-6,7-diisopropylpteridine phosphate; 4,5-diaminopyrimidine; 4,5-diamino-2,6-dimercaptopyrimidine; 2,4-diaminopyrimidine; 4,5-diamino-6-hydroxy-2-mercaptopyrimidine; 3,5-diamino-1,2,4-triazole (preferred); 2,4-diamino-6-hydroxymethylpteridine; trimethoprim naphthoate; 2,4-diamino-6-mercaptopyrimidine hemisulfate; 2,3-diaminopyridine; 2,4-diamino-5-phenylthiazole monohydrobromide; 2,6-diaminopurine; and the like.

31). Polyfunctional, heterocyclic, primary amines, such as: triamterene; 3,5,7-triamino-s-triazolo(4,3-a)-s-triazine (preferred); melamine (preferred); 2,4,6-triaminopyrimidine; 4,5,6-triaminopyrimidine sulfate; and the like.

32). Difunctional, saturated, secondary amines, such as: N,N'-bis(3-aminopropyl)ethylenediamine; N,N'-bis(2-aminoethyl)-1,3-propanediamine (preferred); N,N'-dimethyl-1,3-propanediamine (preferred); N,N'-bis(2-hydroxyethyl)ethylenediamine (preferred); N,N'-dimethyl-1,6-hexanediamine; 1,3-bis(tris(hydroxymethyl)methylamino)propane; N,N'-diisopropylethylenediamine; N,N'-diisopropyl-1,3-propanediamine; N,N'-dimethylethylenediamine; N,N'-ethylenebis(2-(2-hydroxyphenyl)glycine); spermine tetrahydrochloride; 1,4,7,11-tetraazaundecane tetrahydrochloride; triethylenetetramine hydrate; N,N'-bis(3-aminopropyl)-1,3-propane-diamine; and the like.

33). Polyfunctional, saturated, secondary amines, such as: N,N',N''-tribenzyltris(2-aminoethyl)amine; tetraethylenepentamine pentahydrochloride (preferred); pentaethylenehexamine (preferred); and the like.

34). Difunctional, unsaturated, secondary amines, such as: N,N'-diethyl-2-butene-1,4-diamine (preferred); and the like.

35). Di and Polyfunctional, aromatic, secondary amines, such as: Solvent Blue 59; 1,2-dianilinoethane (preferred); N,N'-diphenylbenzidine (preferred); N,N'-diphenyl-1,4-phenylenediamine; Disperse Blue 14; Oil Blue N; Solvent Blue 35; and the like.

36). Difunctional heterocyclic secondary amines, such as: 1,4,8,11-tetraazacyclotetradecane-5,7-dione; 1,4,10,13-tetraoxa-7,16-diazacyclooctadecane (preferred); 1,4,10-trioxa-7,13-diazacyclopentadecane; and the like.

37). Polyfunctional, heterocyclic secondary amines, such as: 1,4,8,12-tetraazacyclopentadecane; 1,4,8,11-tetraazacyclotetradecane (preferred); 1,5,9-triazacyclododecane; 1,4,7-triazacyclononane; 1,5,9-triazacyclotridecane; N,N'-bis(2,2,6,6-tetramethyl-4-piperidinyl)-1,6-hexanediamine; cyclen; and the like.

38). Difunctional saturated tertiary amines, such as: 1,6-diaminohexane-N,N,N',N'-tetraacetic acid; ethylenebis(oxyethylenenitrilo)tetraacetic acid; tert-butoxybis(dimethylamino)methane; 3,3'-iminobis(N,N-dimethylpropylamine); N,N,N',N'-tetraethyl-1,3-propanediamine; N,N,N',N'-tetramethyl-1,3-butanediamine (preferred); N,N,N',N'-tetramethyl-1,4-butanediamine; N,N,N',N'-tetramethyldiaminomethane; N,N,N',N'-tetramethyl-1,6-hexanediamine; 1,3-diamino-2-hydroxypropane-N,N,N',N'-tetraacetic acid; dichloro(N,N,N',N'-tetramethylethylenediamine)-zinc; 2-((2-dimethylamino)ethyl)methylamino)ethanol; N,N'-bis(2-carboxyethyl)-N,N'-ethylenediglycine trihydrate; N,N,N',N'-tetrakis(2-hydroxypropyl)ethylenediamine; ethylenediaminetetraacetic acid, dipotassium salt dihydrate; trans-1,2-diaminocyclohexane-N,N,N',N'-tetraacetic acid monohydrate (preferred); and the like.

39). Polyfunctional saturated tertiary amines, such as: 1,1,4,7,10,10-hexamethyltriethylenetetramine; diethylenetriaminepentaacetic acid; N,N,N',N',N''-pentamethyldiethylenetriamine (preferred); pentrol; 2,4,6-tris(dimethylaminomethyl)phenol; triethylenetetraminehexaacetic acid; and the like.

40). Di and Polyfunctional, unsaturated tertiary amines, such as: N,N,N',N'-tetramethyl-2-butene-1,4-diamine (preferred); tetrakis(dimethylamino)ethylene; and the like.

41). Difunctional, aromatic tertiary amines, such as: crystal violet; N,N,N',N'-tetramethyl-1,4-phenylenediamine (preferred); N,N,N',N'-tetramethylbenzidine; 4,4'-vinylidenebis(N,N-dimethylaniline); malachite green carbinol base; 4,4'-bis(diethylamino)benzophenone; acridine orange base; trans,trans-bis(4-(dimethylamino)benzylidene)-acetone; 2,2'-(ethylenedioxy)dianiline-N,N,N',N'-tetraacetic acid; ethyl violet; tetraethyl 1,2-bis(2-amino-5-me-phenoxy)ethane-N,N,N',N'-tetraacetate; and the like.

42). Polyfunctional, aromatic tertiary amines, such as: dimethyl(4-(1,7,7-tris(4-dimethylaminophenyl)-2,4,6-heptatrienylidene)-2,5-cyclohexadien-1-ylidene)-ammonium perchlorate; dimethyl(4-1,5,5-tris(4-dimethylaminophenyl)-2,4-pentadienylidene)-2,5-cyclohexadienylidene)-ammonium perchlorate; Leuco Crystal Violet (preferred); and the like.

43). Difunctional, heterocyclic tertiary amines, such as: 4,4'-trimethylenebis(1-piperidineethanol); diethylenetriaminepentaacetic dianhydride (preferred); 4-(2-(dimethylamino)ethyl)morpholine; 1,3-dimorpholino-2-nitropropane; ethylenediaminetetraacetic dianhydride; 5,6-benzo-hexaoxa-1,10-diazabicyclo(8,8,8)hexacosane; 1-(3-chlorophenyl)-4-(3-chloropropyl)piperazine monohydrochloride; 4-(dimethylamino)-1,2,2,6,6-pentamethyl-piperidine; 4,7,13,16,21,24-hexaoxa-1,10-diazabicyclo(8,8,8)hexacosane; 4,7,13,16,21-pentaoxa-1,10-diazabicyclo(8,8,5)tricosane; 4,7,13,18-tetraoxa-1,10-diazabicyclo(8,5,5) eicosane; 4,4'-trimethylenebis(1-piperidinepropionitrile); and the like.

44). Polyfunctional, heterocyclic tertiary amines, such as: 1,4,7-trimethyl-1,4,7-triazacyclononane; hexamethylenetetramine (preferred); 1,3,5-trimethylhexahydro-1,3,5-triazine; 1,5,9-trimethyl-1,5,9-triazacyclododecane; 1,4,8,11-tetramethyl-1,4,8,11-tetraazacyclotetradecane; 1,4,7,10,13,16-hexamethyl-1,4,7,10,13,16-hexaazacyclooctadecane; 1,4,8,11-tetraazacyclotetradecane-1,4,8,11-tetraacetic acid tetrahydrochloride tetrahydrate; and the like.

45). Difunctional, saturated quarternary amines, such as: decamethonium bromide; decamethonium iodide; hexamethonium bromide hydrate (preferred); suberyldicholine diiodide; and the like.

46). Polyfunctional, saturated quarternary amines, such as: Gallamine triethiodide (preferred); and the like.

47). Difunctional, heterocyclic quartemary amines, such as: 1,1'-dioctadecyl-4,4'-bipyridinum dibromide; ethyl viologen dibromide (preferred); 1,1'-dioctadecyl-4,4'-bipyridinum diperchlorate; ethyl viologen diperchlorate; and the like.

48). Monofunctional, saturated anhydrides, such as:3-(tert-butyldimethylsilyloxy)glutaric anhydride; S-acetylmercaptosuccinic anhydride; diacetyl-1-tartaric anhydride; 2,2-dimethylglutaric anhydride; 3,3-dimethylglutaric anhydride; 2,2-dimethylsuccinic anhydride; 3-ethyl-3-methylglutaric anhydride; hexafluoroglutaric anhydride; glutaric anhydride; 3-methylglutaric anhydride; methylsuccinic anhydride (preferred); 3-oxabicyclo(3.1.0)hexane-2,4-dione; 2,5-oxazolidinedione; 3,3-tetramethyleneglutaric anhydride; N-phthaloyl-glutamic anhydride; 2-phenylglutaric anhydride; 1,2-cyclohexanedicarboxylic anhydride; cantharidin (preferred); 3,5-diacetyl tetrahydropyran-2,4,6-trione; diglycolic anhydride; 2-(triphenylphosphoranylidene)succinic anhydride; succinic anhydride (preferred); hexahydro-4-methylphthalic anhydride; and the like.

49). Monofunctional, unsaturated anhydrides, such as: endo-bicyclo(2,2,2)oct-5-ene-2,3-dicarboxylic anhydride; 1-cyclopentene-1,2-dicarboxylic anhydride; 2,3-dimethylmaleic anhydride; 2,3-diphenylmaleic anhydride; 2-(dodecen-1-yl) succinic anhydride; exo-3,6-epoxy-1,2,3,6-tetrahydrophthalic anhydride; maleic anhydride (preferred); methyl-5-norbomene-2,3-dicarboxylic anhydride; citraconic anhydride (preferred); 5-norbomene-endo-2,3-dicarboxylic anhydride (preferred); aconitic anhydride; 1,2,3,6-tetrahydrophthalic anhydride; bromomaleic anhydride; 3,4,5,6-tetrahydrophthalic anhydride; dichloromaleic anhydride; 1,4,5,6,7,7-hexachloro-5-norbomene-2,3-dicarboxylic anhydride; and the like.

50). Polyfunctional anhydrides, such as: bicyclo(2.2.2)oct-7-ene-2,3,5,6-tetracarboxylic dianhydride; diethylenetriaminepentaacetic dianhydride; ethylenediaminetetraacetic dianhydride (preferred); 1,2,3,4-cyclobutanetetracarboxylic dianhydride; and the like.

51). Mixed amine types (e.g. primary and secondary), such as: N,N'-bis(3-aminopropyl)ethylenediamine; N,N'-bis(2-aminoethyl)-1,3-propanediamine; 1,4,7,11-tetraazaundecane tetrahydrochloride; N,N'-bis(3-aminopropyl)-1,3-propane-diamine; tetraethylenepentamine pentahydrochloride; pentaethylenehexamine; 1,6-diaminohexane-N,N,N',N'-tetraacetic acid; ethylenebis(oxyethylenenitrilo)tetraacetic acid; 1,3-diamino-2-hydroxypropane-N,N,N',N'-tetraacetic acid; N,N'-bis(2-carboxyethyl)-N,N'-ethylenediglycine trihydrate; trans-1,2-diaminocyclohexane-N,N,N',N'-tetraacetic acid monohydrate; diethylenetriaminepentaacetic acid; dimethyl(4-(1,7,7-tris(4-dimethylaminophenyl)-2,4,6-heptatrienylidene)-2,5-cyclohexadien-1-ylidene)-ammonium perchlorate; dimethyl(4-1,5,5-tris(4-dimethylaminophenyl)-2,4-pentadienylidene)-2,5-cyclohexadienylidene)-ammonium perchlorate; diethylenetriaminepentaacetic dianhydride; and the like.

52). Monofunctional aromatic anhydrides, such as: 4-amino-1,8-naphthalic anhydride; 1,2,4-benzenetricarboxylic anhydride; 4-bromo-1,8-naphthalic anhydride; 5-chloroisatoic anhydride; 4-chloro-1,8-naphthalic anhydride; 3,6-dichlorophthalic anhydride; 4,5-dichlorophthalic anhydride; 3,6-difluorophthalic anhydride; diphenic anhydride (preferred); homophthalic anhydride; isatoic anhydride; N-methylisatoic anhydride; 4-methylphthalic anhydride; 1,8-naphthalic anhydride; 3-nitro-1,8-naphthalic anhydride; 4-nitro-1,8-naphthalic anhydride; 3-nitrophthalic anhydride; 4-nitrophthalic anhydride; phthalic anhydride (preferred); 2,3-pyridinedicarboxylic anhydride (preferred); 3,4-pyridinedicarboxylic anhydride; tetrabromophthalic anhydride; tetrachlorophthalic anhydride; tetrafluorophthalic anhydride; trimellitic anhydride chloride; 4-sulfo-1,8-naphthalic anhydride, potassium salt; and the like.

53). Polyfunctional aromatic anhydrides, such as: 4,4'-(hexafluoroisopropylidene)diphthalic anhydride; 1,4,5,8-naphthalenetetracarboxylic dianhydride (preferred); 3,4,9,10-perylenetetracarboxylic dianhydride; 1,2,4,5-benzenetetracarboxylic dianhydride; 3,3',4,4'-benzophenonetetracarboxylic dianhydride; and the like.

54). Monofunctional epoxides, such as: 3-propyloxiranemethanol; allyl glycidyl ether; 2(benzyloxymethyl)oxirane; butadiene monoxide; 3-(4-bromophenyl)glycidol; butyl glycidyl ether (preferred); 4-tert-butylphenyl glycidyl ether; tert-butyl glycidyl ether; 4-tert-butylphenyl 2,3-epoxypropyl ether; caryophyllene oxide; 4-chlorophenyl glycidyl ether; trans-4-chlorostilbene oxide; 4-chlorophenyl 2,3-epoxypropyl ether; cyclododecane epoxide; cyclohexene oxide; cyclooctene oxide; 2,4'-dichlorostilbene oxide; cyclopentene oxide; dieldrin; epibromohydrin; 3,3-dimethylglycidyl 4-nitrobenzoate; epichlorohydrin; trans-2,3-epoxybutane; epifluorohydrin; 1,2-epoxybutane; 1,2-epoxydecane (preferred); 1,2-epoxyhexadecane; 1,2-epoxydodecane; 1,2-epoxyhexane (preferred); 1,2-epoxy-5-hexene; 1,2-epoxy-3-phenoxypropane; exo-2,3-epoxynorbomane; (2,3-epoxypropyl)benzene; 1,2-epoxyoctadecane; 2,3-epoxypropyl 4-methoxyphenyl ether; 1,2-epoxyoctane; 3,4-epoxytetrahydrothiophene-1,1-dioxide; 1,2-epoxy-7-octene; N-(2,3-epoxypropyl)phthalimide; 1,2-epoxytetradecane; 3-glycidoxypropyltrimethoxysilane; ethylene oxide; glycidyl 2-methylphenyl ether; furfuryl glycidyl ether; 2-ethylhexyl glycidyl ether; glycidyl 4-nitrobenzoate; 2-methyl-3-phenylglycidol; glycidol (preferred); glycidyl 3-nitrobenzenesulfonate; hexafluoropropylene oxide; 1-methoxy-2-methylpropylene oxide; glycidyl isopropyl ether; 2-methylglycidyl 4-nitrobenzoate; glycidyl tosylate; 4-glycidyloxy-2-indolecarbonitrile; 2-methylglycidol; limonene oxide; 2-methyl-2-vinyloxirane; 3-(4-nitrophenyl)glycidol; 3-phenylglycidol; 1-phenylpropylene oxide; propylene oxide (preferred); Benzyl glycidyl ether; Stilbene oxide; 2-Biphenylyl glycidyl ether; tetracyanoethylene oxide; Glycidyl 4-methoxyphenyl ether; glycidyl butyrate; glycidyl trimethylammonium chloride; alpha-pinene oxide; methyl trans-3-(4-methoxyphenyl) glycidate; styrene oxide; 3-methylglycidyl 4-nitrobenzoate; 4-[2,3-epoxyhexyloxy]phenyl 4-(decyloxy)-benzoate; 7,8-epoxy-2-methyloctadecane, synthetic; ethyl-3-phenylglycidate; 4-glycidyloxy-2-indolecarboxamide; and the like.

55). Polyfunctional epoxides, such as: 3,4-Epoxycyclohexylmethyl 3,4-epoxycyclohexanecarboxylate; 1,3-butadiene diepoxide; Poly(bisphenol A-co-epichlorohydrin) (preferred); 1,2,7,8-Diepoxyoctane; Tris(2,3-epoxypropyl)isocyanurate; 1,2,5,6-Diepoxycyclooctane; 1,4-Butanediol diglycidyl ether; Bis(3,4-epoxycyclohexylmethyl)adipate; ethylene glycol diglycidyl ether; Poly(propylene glycol) diglycidyl ether (preferred); Poly[(o-cresyl glycidyl ether)-co-formaldehyde]; Poly[(phenyl glycidyl ether)-co-formaldehyde]; Polybutadiene epoxy/hydroxy functionalized; and the like.

56). Isocyanates, such as: 1-chloromethyl-2,4-diisocyanatobenzene; trans-1,4-cyclohexylene diisocyanate; 4,4'-methylenebis(phenyl isocyanate); poly(methylene(polyphenyl isocyanate)) (preferred); 1,4-diisocyanatobutane; 1,12-diisocyanatododecane; 1,6-diisocyanatohexane (preferred);

1,5-diisocyanato-2-methylpentane; isophorone diisocyanate; 1,3-phenylene diisocyanate; 4,4'-methylenebis(cyclohexyl isocyanate); tolylene-2,4-diisocyanate (preferred); 4,4'-methylenebis(2,6-diethylphenyl isocyanate); tolylene 2,6-diisocyanate; and the like.

57). Dialkoxy silanes, such as: diethoxysilane; chloromethyl (diisopropoxy)methylsilane; diethoxydimethylsilane (preferred); 3-(diethoxymethylsilyl)propylamine; diethoxymethylvinylsilane (preferred); dimethoxymethyloctylsilane; dimethoxydimethylsilane; dimethoxymethylphenylsilane; and the like.

58). Polyalkoxy silanes, such as: 3-(trimethoxysilyl)propyl methacrylate (preferred); 3-Aminopropyltrimethoxysilane (preferred); Polydimethysiloxane (preferred); allyl triethoxysilane; tris(2-methoxyethoxy)vinylsilane; chloromethyltriethoxysilane; 3-glycidoxypropyltrimethoxysilane (preferred); isobutyl trimethoxysilane; (3-mercaptopropyl) trimethoxysilane; methyltriacetoxysilane; methyltriethoxysilane; methyltrimethoxysilane; octadecyl trimethoxysilane; octyltrimethoxysilane; phenyl triethoxysilane; silicon(IV) acetate; tetrabutyl orthosilicate; tetraethyl orthosilicate; tetramethyl-D12 orthosilicate; tetramethyl orthosilicate; tetrapropyl orthosilicate; triethoxysilane; 4-(triethoxysilyl)butyronitrile; 3-(triethoxysilyl)propionitrile; 3-(triethoxysilyl)propyl thiocyanate; triethoxyvinylsilane; trimethoxypropylsilane (preferred); trimethoxysilane; N-(3-(trimethoxysilyl)propyl)ethylenediamine; (3-(triethoxysilyl)propyl)trimethylammonium chloride; and the like.

59). Dihalide silanes, such as: 1,3-dichloro-1,1,3,3-tetraisopropyldisiloxane; 1,2-bis(chlorodimethylsilyl)ethane; chloromethyldichloromethylsilane; Di-tert-butyldichlorosilane; dichloro(3-chloropropyl)methylsilane; Dichlorodiethylsilane (preferred); dichlorodimethylsilane; Dichlorodiphenylsilane; dichloromethyloctylsilane; Dichloromethylphenylsilane; dichloromethylsilane; Dichloromethylvinylsilane; 1,7-dichlorooctamethyltetrasiloxane; Dichlorosilane; diiodosilane; and the like.

60). Polyhalide silanes, such as: trichlorovinylsilane; allyl trichlorosilane; benzyltrichlorosilane; butyltrichlorosilane; cyclohexyl trichlorosilane; tert-butyl trichlorosilane; (chloromethyl)trichlorosilane; dodecyl trichlorosilane; ethyl trichlorosilane; hexachlorodisilane; hexachlorodisiloxane; methyltrichlorosilane (preferred); octadecyl trichlorosilane; octyl trichlorosilane; pentyl trichlorosilane; phenyl trichlorosilane; 1,1,2,2-tetrachloro-1,2-dimethyldisilane; silicon (IV) chloride; silicon(IV) bromide; trichlorosilane; 4-(trichlorosilyl)butyronitrile; (3-heptafluoroisopropoxy) propyl)trichlorosilane; and the like.

61). Monovinyl and -ethynyl silanes, such as: (3-trimethylsilyl-2-propynyl)triphenylphosphonium bromide; bis(trimethylsilyl)acetylene; 3-bromo-1-(trimethylsilyl)-1-propyne; (1-bromovinyl)trimethylsilane; (2-bromovinyl)trimethylsilane; chlorodimethylvinylsilane; (1-methoxyvinyl)trimethylsilane; dichloromethylvinylsilane; phenyl 2-(trimethylsilyl)ethynyl sulfone; diethoxymethylvinylsilane (preferred); 1-phenyl-2-(trimethylsilyl)acetylene; dimethylethoxyvinylsilane; ethyl 3-(trimethylsilyl)propynoate; trichlorovinylsilane; methyl-2-(trimethylsilyl)-2-heptenoate; triethoxyvinylsilane; (triethylsilyl)acetylene; triethylvinylsilane; (triphenylsilyl)acetylene; (triisopropylsilyl)acetylene; 1-(triisopropylsilyl)-1-propyne; (trimethylsilyl)acetylene; trans-3-(trimethylsilyl)allyl alcohol; 1-trimethylsilyl-1-hexyne; 1-trimethylsilyl-3,3-dimethyl-1-butyne; 1-(trimethylsilyl)-1-propyne; 3-trimethylsilyl-2-propyn-1-ol; triphenylvinylsilane; tris(2-methoxyethoxy)vinylsilane; vinyltrimethylsilane (preferred); 1-(trimethylsilyl)-1-pentyne; lithium (trimethylsilyl)acetylide; (1-methoxy-2-(trimethylsilyl)vinyloxy)trimethylsilane; and the like.

62). Silanes—monoallyl, -vinyl ether and related compounds, such as: allylchloromethyldimethylsilane; allyloxytrimethylsilane; 1,2 bis(trimethylsilyloxy)cyclobutene; allyltrichlorosilane; bis(trimethylsilyl)acetylenedicarboxylate; allyl triethoxysilane; 2-chloromethyl-3-trimethylsilyl-1-propene; allyltriisopropylsilane; 6-(tert-butyldimethylsilyloxy)-3,4-dihydro-2H-pyran; allyl trimethylsilane; (3-chloroallyl) trimethylsilane; allyltriphenylsilane (preferred); (2,2-dimethyl-1-methylenepropoxy)trimethylsilane; propargyltrimethylsilane; 1-phenyl-1-(trimethylsilyloxy) ethylene; (2-bromoallyl)trimethylsilane; 3,4-dihydro-6-(trimethylsilyloxy)-2H-pyran; 1-cyclohexenyloxytrimethylsilane; 1-cyclopropyl-1-(trimethylsilyloxy)ethylene; (1-hydroxyallyl)trimethylsilane; ethyl 2-(trimethylsilylmethyl)acrylate (preferred); 1-(trimethylsilyloxy)cyclopentene; 2-((trimethylsilyl)methyl)-2-propen-1-ylacetate; propargyloxytrimethylsilane; methyl trimethylsilyl dimethylketene acetal; trimethyl(3-methyl-2-butenyl)silane; 2-((trimethylsilyl)methyl)-2-propen-1-ol; 2-(trimethylsilyloxy)propene; tris(trimethylsilyloxy)ethylene; 4-(trimethylsilyloxy)-3-penten-2-one; methyl 3-(trimethylsilyloxy)crotonate; 4-(tert-butyldimethylsilyloxy)-3-penten-2-one; and the like.

63). Polyunsaturated silanes, such as: bis(trimethylsilyl)cyclopentadiene; 5-(trimethylsilyl)-1,3-cyclopentadiene; 2,3,5,5-tetrakis(trimethylsilyl)-1,3-cyclopentadiene; 1,3-divinyltetramethyldisiloxane; 2,5,5-tris(trimethylsilyl)-1,3-cyclopentadiene; 1,4-bis(trimethylsilyl)-1,3-butadiyne; 2,4,6,8-tetramethyl-2,4,6,8-tetravinylcyclotetrasiloxane; 3-(triethylsilyloxy)-1,4-pentadiene; (1-cyclohexen-1-ylethynyl)trimethylsilane; tetravinylsilane; 1-(triethylsilyloxy)-1,3-butadiene; diallyldimethylsilane (preferred); 1-(trimethylsilyloxy)-1,3-butadiene; 2,3-bis(trimethylsilyloxy)-1,3-butadiene; 1,3-divinyl-1,1,3,3-tetramethyldisilazane; trans-1-methoxy-3-(trimethylsilyloxy)-1,3-butadiene; and the like.

64). Other silanes, such as: 1,1'-ethylenebis(N,N,1,1-tetramethylsilanamine); dichlorosilane; bis(dimethylamino)dimethylsilane; diphenylsilane; octamethylcyclotetrasiloxane; diphenylsilanediol (preferred); hexamethylcyclotrisiloxane (preferred); phenylsilane; octaphenylcyclotetrasiloxane; silane; 1,1,3,3-tetramethyldisilazane; and the like.

65). Ring substituted styrenes, such as: 3,5-bis(trifluoromethyl)styrene; 2-bromostyrene; 3-bromostyrene; 4-bromostyrene; 4-tert-butylstyrene; 2,6-dichlorostyrene; styrene; styrene-D8; 2,6-difluorostyrene; 3,4-dimethoxystyrene; 2,4-dimethylstyrene; divinylbenzene (preferred); 2,5-dimethylstyrene; dimethylstyrene; 2-fluorostyrene; 4-ethoxystyrene; 3-fluorostyrene; 4-fluorostyrene; 3-methylstyrene; 3(4)-methylstyrene; 4-methylstyrene (preferred); 3-nitrostyrene; 4-nitrostyrene; 2,3,4,5,6-pentafluorostyrene; 4-styrenesulfonic acid, sodium salt; 2-(trifluoromethyl)styrene; 3-(trifluoromethyl)styrene; 4-(trifluoromethyl)styrene; 2,4,6-trimethylstyrene; 4-vinylbenzoic acid; 4-vinylanisole; vinylbenzyl chloride; and the like.

66). Alpha substituted styrenes, such as: (2-(4-nitrophenyl) allyl)trimethylammonium iodide; alpha-bromostyrene; 1,3-diisopropenylbenzene; alpha,2-dimethylstyrene; 1-phenyl-1-(trimethylsilyloxy)ethylene; 2-isopropenylaniline; 3-isopropenyl-alpha,alpha-dimethylbenzyl isocyanate; alpha-methylstyrene (preferred); and the like.

67). Fluoropolymers (e.g., homo- and co-fluoropolymers), such as: Polytetrafluoroethylene (PTFE) (preferred); Poly (chlorotrifluoroethylene) (preferred); Poly(vinylidene fluoride) (preferred); Poly(ethylene-co-tetrafluoroethyene) (PETFE) (preferred); Poly(ethylene-alt-chlorotrifluoroethylene) (preferred); Poly(vinylidene fluoride-co-hexafluoropropylene)polymers; Poly(perfluoropropylene oxide-b-perfluoroformaldehyde); Poly(tetrafluoroethylene-co-tetrafluoroethylene perfluoropropyl ether); Poly (fluoromethylidyne); Nafion® (by E.I.du Pont de Nemours) perfluorinated ion exchange powder; and the like.

Further products for use in inventive images which are examples in the categories 1-67 above are provided in the Aldrich catalogues cited in forthcoming text herein.

Further examples of products preferred for use in inventive images follow. polyester; polystyrene; polyester-styrene; styrene-butadiene; styrene-acrylonitrile (SAN); Polycarbonate; Polysulfone (PSU); Benzene, ethenyl-homopolymer (Polystyrene) or Benzene, vinyl-homopolymer (Polystyrene); polyurethane; polypropylene; polyethylene; polytrifluorochloro ethylene; polyester acrylate; acrylic which is poly (methyl methacrylate); acid copolymer ethylene; styrene methylmethacrylate; styrene/butadiene/polymer; Styrene/acrylonitrile copolymer; styrene acrylonitrile; poly(butylene terephthalate); urea formaldehyde; phenol formaldehyde; cellulose acetate butyrate; cellulose acetate propionate; cellulose acetate; poly(vinyl butyral) (PVB); polytetrafluoro ethylene; polyamide copolymer; poly(vinyl chloride) (PVC); polyvinylchloride plasticized; Polyethersulfone (PES); acrylonitrile butadiene styrene (ABS); Bisphenol A Polycarbonate; styrene/butadiene block copolymer; Methyl methacrylate; polymethylmethacrylate with poly methyl acrylate; epoxy; polyamide copolymer; Butylene/Poly (Alkylene ether) phthalate; silicone rubber; ionomer resins; ethylene copolymers with polar groups; polyoxymethylene homopolymer; Poly(methyl methacrylate); styrene-butadiene-styrene (SBS); ethylene-vinyl acetate (EVA) copolymer resins; 4-Acetoxystyrene; (S-B); (SEB); Acetyl tributyl citrate (plasticizer); Poly(methacrylic acid); Poly(bisphenol A carbonate); ethylene/methacrylic acid copolymers; Poly(1,4-cyclohexylene carbonate); polyetherimide; (styrene-butadiene)$_n$ or (styrene-isoprene)$_n$; styrene-ethylene/propylene (SEP); styrene-ethylene/butylene-styrene (SEBS); styrene-isoprene-styrene (SIS); Methyl Methacrylate/Acrylonitrile/Butadiene/Styrene Polymer (MABS); Methacrylate/Acrylonitrile/Butadiene/Styrene Polymer (MABS); and diallyl diglycol carbonate, {also known as allyl diglycol carbonate monomer; diethlyene glycol bis (allyl carbonate); 9-oxo-2,5, 8,10-tetraoxatridec 12-anoic acid, 2-propenyl ester; carbonic acid, oxydiethylene diallyl ester}. (Refer to CR-39 previously described). Allyl dicarbonate (ADC) monomers (such as those offered by Akzo Nobel in Louisville Kentucky are commonly used to make eye glass lenses) are preferred for making inventive images. Also, p-Phenylene-containing polymers are preferred for making inventive images.

Among examples of monomers for use in PRM are those which fall into these categories: monomers with acid-functional groups (acid-functional monomers) such as carboxylic acids, sulfonic acids, and phosphoric acids (and phosphonic acids); monomers with amine-functional groups (amine-functional monomers) such as those with primary, secondary, tertiary, or quaternary groups; halogen-containing monomers such as those that are fluorinated, chlorinated, brominated and/or iodinated; crosslinking monomers and crosslinking and postcrosslinking agents; hydrophilic monomers; hydrophobic monomers; reactive monomers such as a beta-ketoester, an aldehyde, a carboxylic acid anhydride, an activated ester, a carboxylic acid chloride, a carboxylic hydrazide, a phenol, an oxirane, a hydroxyl, an organometallic compound, a Mercaptan, an isocyanate, a sulfide, a nitro, a carboxylic acid, a methylolamide, and a 1-alkyne; photo-active monomers and (meth)acrylamide monomers. Other examples of monomers available for use in inventive images are acrylics, alcohols, epoxides, silicones, styrenes, and anhydrides.

Among examples of polymers for use in inventive images are those which fall into these catagories: acid-functional polymers (and their salts) such as carboxylic acids, sulfonic acids, phosphoric acids, and phosphonic acids; amine-functional polymers; halogen-containing polymers; phenol-functional polymers; reactive polymers such as aldehyde and ketone functional polymers, carboxylic acid anhydride-functional polymers, carboxylic acid chloride-functional polymers, oxirane-functional polymers, hydroxyl functional polymers, hydrazide-functional polymers, nitrile-functional polymers; water soluble polymers; photo active polymers; conductive polymers; biodegradable polymers; liquid crystal polymers; block copolymers and natural polymers. Other examples of polymers available for use in inventive images are acrylic polymers, amine and imide polymers, diene polymers, ester polymers, fluorocarbon polymers, olefin polymers, p-phenylene-containing polymers, phenol/melamine/urea copolymers, functionalized polymers, polypeptides, silicone polymers, styrene and related polymers, surfactants, urethane polymers; vinyl acetate, vinyl alcohol and related polymers; vinyl chloride and related polymers; and vinyl ether, vinyl ketone and related polymers.

These examples of preferred monomers, polymers and stabilizers for use in making inventive images are from the catalogue of Polysciences Inc. of Warrington, Pa.: 1H,1H-Pentadecafluorooctyl methacrylate; 1H,1H,2H,2H-Heptadecafluorodecyl acrylate; 1H,1H,2H,2H-Heptadecafluorodecyl methacrylate; 1H,1H,7H-Dodecafluoroheptyl methacrylate; 1H,1H-Heptafluorobutyl acrylate; Hexafluoro-iso-propyl acrylate; Hexafluoro-iso-propyl methacrylate; 1H,1H,5H-Octafluoropentyl acrylate; 1H,1H,5H-Octafluoropentyl methacrylate; 1H,1H,3H-Hexafluorobutyl acrylate; 1H,1H, 3H-Hexafluorobutyl methacrylate; 1H,1H,3H-Tetrafluoropropyl acrylate; 1H,1H,3H-Tetrafluoropropyl methacrylate; 2,2,2-Trifluoroethyl acrylate; 2,2,2-Trifluoroethyl methacrylate; Pentafluorophenyl acrylate; Pentafluorophenyl methacrylate; 2-Phenoxyethyl acrylate (e.g., a UV absorbing monomer); 2-Phenoxyethyl methacrylate (e.g., a UV absorbing monomer); Phenyl acrylate (e.g., a UV absorbing monomer); 2-Phenylethyl acrylate (e.g., a UV absorbing monomer); 2-Phenylethyl methacrylate (e.g., a UV absorbing monomer); Benzyl acrylate; 4-Chloro-alpha-methylstyrene; 4-Chlorophenyl acrylate; Benzyl methacrylate; Phenyl methacrylate (e.g., a UV absorbing monomer); N-Benzylmethacrylamide; 2,4,6-Tribromophenyl acrylate; Pentachlorophenyl acrylate; 3-Chlorostyrene; 4-Chlorostyrene; 2-Chlorostyrene; Pentabromophenyl acrylate; Pentabromophenyl methacrylate; Acrylic acid; Glycerol triglycidyl ether; 4-(2-Acryloxyethoxy)-2-hydroxybenzophenone; 3-Allyl-4-hydroxyacetophenone; 1,4-Benzenedimethanol; Glycerol trimethacrylate; Glycerol tris(acryloxypropyl) ether; 3-Glycidoxypropyltrimethoxysilane; Glycidyl cinnamate; Glycidyl nonylphenyl ether; Glycolide; Glycol methacrylate; 2-(2'-Methacryloxy-5'-methylphenyl)benzotriazole (e.g., a UV absorbing monomer); 1H,1H-Pentadecafluorooctyl acrylate; Pentaerythritol tetraacrylate; Pentaerythritol triacrylate; 4-Phenoxystyrene (e.g., a UV absorbing monomer); N-Phenylacrylamide (e.g., a UV absorbing monomer); N,N-Dimethyl-4-toluidine (e.g., an accelerator for peroxide catalyzed polymerization); Poly(ethylene glycol); Poly(ethylene/acrylic acid) e.g., 92:8 (modified polyethylene resin with improved adhesion); Poly(ethylene/acrylic acid); Poly(ethylene glycol terephthalate); Poly(ethylene/vinyl acetate); Poly(ethyl methacrylate); Poly(methyl methacrylate/n-butyl methacrylate); Poly(alpha-methylstyrene/methylstyrene); Poly(3-methylthiophene); Poly(3-octylthiophene); Polypyrrole; Poly(vinyl chloride/vinyl acetate/maleic acid) e.g., 86:13:1 [Poly (vinyl chloride) with improved adhesion to substrates]; Poly(1-vinylnaphthalene) (e.g., a UV absorbing polymer); Vinyl phenylacetate (e.g., a UV absorbing vinyl ester); Monomethacrylate; Poly(dimethylsiloxane); Pentachlorophenyl methacrylate (e.g., recommended for ophthalmic use); Perfluoroalkyl esters; Permethylsiloxanol esters, e.g., Huls'; 3-Acryloxypropylmethylbis (trimethylsiloxy) silane; 3-Methacryloxypropyltris(trimethylsiloxy)silane; Glycerol monoacrylate (e.g., a hydrophilic monomer); 3-Methacryloxypropylpentamethyldisiloxane; Glycerol monomethacrylate (e.g., a hydrophilic monomer); and combinations thereof.

Further preferred examples of monomers which might, for instance, be used for their hydrophilicity offered by Polysciences (e.g., recommended for ophthalmic use) are: N-(2-hydroxypropyl methacrylamide; Hydroxypropyl methacrylate; N-Vinylpyrrolidone; and the like. Additional preferred examples of monomers which might, for instance, be used for their UV absorbtion offered by Polysciences (e.g. recommended for ophthalmic uses) are: 4-Methacryloxy-2-hydroxybenzophenone; N-vinylcarbazole; 2-Naphthyl methacrylate; 1,3-Bis(4-benzoyl-3-hydroxyphenoxy)-2-propyl acrylate; 9-Vinylanthracene; 2-Acryloxyethyl-4-benzoylbenzyldimethylammonium chloride; and the like.

Additional preferred examples of monomers which might, for instance, be used for inventive images their feature of being neutral hydrophobic monomers, offered by Polysciences (e.g., recommended for ophthalmic uses) are: Butyl methacrylate, Diallyl phthalate, Octyl methacrylate, and the like. Additional preferred examples of monomers which might, for instance, be used for their feature of being ionic monomers, offered by Polysciences are: N-(3-Aminopropyl) methacrylamide; 2-(Dimethylamino)ethyl methacrylate; methacrylic acid and the like. Additional preferred monomers offered from Polysciences (e.g., recommended for ophthalmic uses) are: 1H,1H-Heptafluorobutyl (meth)acrylate; and 1H,1H,4H-Hexafluorobutyl (meth)acrylate.

These examples of monomers and polymers which might be used in making inventive images are offered by Acros Organics of Fairlawn, N.J. Ethyl methacrylate, Synonym: Ethyl 2-methyl-2-propenoate; Linear formula $H_2C=C(CH_3)CO_2C_2H_5$; Methyl methacrylate (preferred) Synonym MMA Diakon; 2-Methyl Acrylic Acid, Methyl Ester; Monocite Methlacrylate Monomer. Linear formula $H_2C=C(CH_3)CO_2CH_3$; 2-Acetoacetoxyethyl methacrylate Synonym: Ethyl 2-((2-methyl-1-oxo-2-propenyl)oxy)-3-oxobutanoate AAEM Linear formula $CH_3C(O)CH_2C(O)OCH_2CH_2OC(O)C(CH_3)=CH_2$; and Polysulfone resin (preferred).

These examples of monomers, polymers and stabilizers which might be used in making inventive images are offered by Aldrich. Poly(tetrafluoroethylene oxide-co-difluoromethylene oxide) alpha,omega-diol, ethoxylated; Poly[4,5-difluoro-2,2-bis(trifluoromethyl)-1,3-dioxole-co-tetrafluoroethylene]; Poly(hexafluoropropylene oxide-co-difluoromethylene oxide) alcohol, ethoxylated; Poly (hexafluoropropylene oxide-co-difluoromethylene oxide) alcohol, ethoxylated phosphate; Poly(hexafluoropropylene oxide-co-difluoromethylene oxide) monoamidosilane; Poly (sodium 4-styrenesulfonate); 2-(Sulfoxy)ethyl methacrylate, ammonium salt; Poly(diallyldimethylammonium chloride); Poly(acrylic acid); Poly(allylamine); Poly(maleic acid-co-olefin), sodium salt; Vinyltrimethoxysilane, Dow Corning product; ZONYL FSO-100 fluorosurfactant (DuPont product); Poly(dimethylsiloxane-co-methylhydrosiloxane); N,N-Dimethyltrimethylsilylamine, Synonyms: [(dimethylamino) trimethylsilane, N-(trimethylsilyl)dimethylamine]; Poly (dimethylsiloxane), hydride terminated (preferred); Poly (dimethylsiloxane-co-methylhydrosiloxane), hydride terminated; Poly(dimethylsiloxane), hydroxy terminated; Poly(dimethylsiloxane), methoxy terminated; MERPOL® LFH surfactant (DuPont product); Poly(acrylic acid, sodium salt); Polystyrene-block-poly(ethylene-ran-butylene)-block-polystyrene, sulfonated; Poly(dimethylsiloxane) monomethacrylate; Polyethylenimine, 80% ethoxylated (preferred); Trimethylsilyl methacrylate; ALKANOL® 189-S surfactant ®Reg. trademark of E.I. Du Pont de Nemours & Co., Inc.; 1-(Trimethylsilyl)-1-propyne; Poly(methyl vinyl ether-alt-maleic acid monoethyl ester); Poly(acrylic acid-co-maleic acid); Allylchlorodimethylsilane; Poly(dimethylamine-co-epichlorohydrin); Poly(dimethylsiloxane-co-methylphenylsiloxane), 510® Dow Corning; Tri(propylene glycol) propyl ether; Bisphenol A ethoxylate sulfate, ammonium salt; Chloromethyl octyl ether; Poly(diallyldimethylammonium chloride) (preferred); 3-Acetyl-1-propanol, Synonym: (5-hydroxy-2-pentanone); Poly(dimethylamine-co-epichlorohydrin-co-ethylenediamine); Oxazoline, polymer-supported; Poly(propylene glycol) methyl ether acrylate; Polyacrylamide (preferred); Neopentyl glycol methyl ether propoxylate acrylate; Polyoxyethylene(80) sorbitan monolaurate; Poly(ethylene glycol) butyl ether; Di(propylene glycol) allyl ether methacrylate; Poly(ethylene glycol) dimethyl ether; Poly[dimethylsiloxane-co-methyl(3-hydroxypropyl)siloxane]-graft-tetrakis(1,2-butylene glycol) Synonyms: (tetrabutoxypropyl trisiloxane); Neopentyl glycol propoxylate; O-(2-Aminopropyl)-O'-(2-methoxyethyl) polypropylene glycol; Poly(ethylene glycol) ethyl ether methacrylate; Vinylcyclohexane; Poly-aspartic acid, sodium salt; Poly(propylene glycol); Poly(propylene glycol) bis(2-aminopropyl ether); Poly(propylene glycol) monobutyl ether; Poly(propylene glycol) methacrylate; Ethylene glycol bis(propylene glycol-b-ethylene glycol) ether; Poly(ethylene glycol-co-propylene glycol) monobutyl ether; Glycolic acid ethoxylate lauryl ether Synonym: (Laureth-4 carboxylic acid); Poly(propylene glycol) bis(2-aminopropyl ether); Brij® 30 Synonyms: [polyoxyethylene(4) lauryl ether] trademark of ICI Americas, Inc.; Poly(propylene glycol) bis(2-aminopropyl ether); Glycerol tris[poly(propylene glycol), amine terminated] ether; Poly(propylene oxide), bis (dimethoxymethylsilyl) terminated (preferred); Poly(1,2-butylene glycol) monobutyl ether; 2-Hydroxyethyl methacrylate (preferred); Glycolic acid ethoxylate lauryl ether Synonyms: (Laureth-11 carboxylic acid); Poly(ethylene oxide); Neopentyl glycol ethoxylate; Poly(1,2-butylene glycol); Poly(ethylene glycol) bis(carboxymethyl) ether; Ethylenediamine tetrakis(ethoxylate-block-propoxylate) tetrol; Poly(ethylene glycol) methyl ether; Poly[dimethylsiloxane-co-methyl(3-hydroxypropyl)siloxane]-graft-poly(ethylene glycol) methyl ether; Neopentyl glycol ethoxylate diacrylate; 2-(Methacryloyloxy)ethyl acetoacetate (e.g., can be used to promote adhesion to metal surfaces); Poly[dimethylsiloxane-co-methyl(3-hydroxypropyl)siloxane]-graft-poly(ethylene glycol) methyl ether; Poly(propylene glycol) diglycidyl ether; Poly(ethylene glycol-co-propylene glycol) monobutyl ether; Allyl alcohol 1,2-butoxylate-block-ethoxylate, ammonium sulfate end-capped; Poly(2-carboxyethyl) acrylate; Tetra(ethylene glycol); Poly(propylene glycol)-block-poly(ethylene glycol)-block-poly(propylene glycol); Poly(4-methyl- 1-pentene) (preferred); Poly(ethylene glycol) methacrylate; 4-Vinyl-1-cyclohexene; Poly(ethylene glycol); Poly(ethylene glycol) dimethyl ether; Trimethylolpropane tris[poly(propylene glycol), amine terminated] ether; Trimethylolpropane propoxylate triacrylate; Poly(ethylene glycol-co-propylene glycol) monobutyl ether; N-(Butoxymethyl)acrylamide; alpha-(Trifluoromethyl)styrene; Glycerol ethoxylate-co-propoxylate triol; Pentaerythritol propoxylate; Glycerol propoxylate; Polytetrahydrofuran, Synonyms: [alpha-hydro-omega-hydroxypoly(oxy-1,4-butanediyl)]; Polycarbodiimide; Glycerol propoxylate triacrylate; Polyoxyethylene(12) tridecyl ether; Poly(propylene glycol)-block-poly(ethylene glycol)-block-poly(propylene glycol); Poly(ethylene glycol) 2,4,6-tris(1-phenylethyl)phenyl ether methacrylate; Trimethylolpropane propoxylate triacrylate; Trimethylolpropane ethoxylate methyl ether diacrylate; Poly(ethylene glycol) tetrahydrofurfuryl ether; Poly(propylene glycol)-block-poly(ethylene glycol)-block-poly(propylene glycol) bis(2-aminopropyl ether); Poly(4-methyl-1-pentene); Trimethylolpropane propoxylate; Polytetrahydrofuran bis(3-aminopropyl) terminated; Polybutenes, monoepoxide; Pentaerythritol propoxylate; Polyoxyethylene(18) tridecyl ether; Poly(tert-butyl methacrylate); 2,4,7,9-Tetramethyl-5-decyne-4,7-diol ethoxylate; Poly(dimethylsiloxane-co-diphenylsiloxane), divinyl terminated; TERATHANE® 650 polyether glycol Synonyms: (polytetrahydrofuran) Reg. trademark of E.I. du Pont de Nemours & Co., Inc.; Polytetrahydrofuran bis(3-aminopropyl) terminated; Poly(ethylene glycol-co-propylene glycol); Poly(neopentyl glycol adipate); Poly(butyl acrylate) (preferred); Poly(polytetrahydrofuran carbonate) diol, Dihydroxy functional linear polyether polycarbonate; Poly(vinyl acetate), precursor for poly(vinyl alcohol) (preferred); Poly(propylene glycol)-block-poly(ethylene glycol)-block-poly(propylene glycol) bis(2-aminopropyl ether); Poly(ethylene glycol) dimethacrylate; Poly(ethylene glycol) methacrylate; Poly(ethylene glycol) diacrylate (e.g., can aid chemical resistance, flexibility, adhesion, low shrinkage, abrasion resistance and impact strength); 2,4,7,9-Tetramethyl-5-decyne-4,7-diol ethoxylate; Poly(1,6-hexanediol/neopentyl glycol-alt-adipic acid); Allyl alcohol 1,2-butoxylate-block-ethoxylate; N,N-Diisopropylmethylphosphonamidic chloride Synonyms: [chloro(diisopropylamino)methoxyphosphine, methyl N,N-diisopropylchlorophosphoramidite]; Poly(melamine-co-formaldehyde), isobutylated; Poly(ethyl acrylate); 1-Acetoxy-1,3-butadiene Synonyms: (1,3-butadienyl acetate); Polyurethane diol; Trimethylolpropane ethoxylate triacrylate; 2,4,7,9-Tetramethyl-5-decyne-4,7-diol ethoxylate; Poly(1,4-butanediol/neopentyl glycol-alt-adipic acid); Poly[trimethylolpropane/di(propylene glycol)-alt-adipic acid/phthalic anhydride], polyol; Polyoxyethylene sorbitan tetraoleate; Poly[di(ethylene glycol) adipate]; Trimethylolpropane ethoxylate triacrylate; Poly(2-methyl-1,3-propylene glutarate), hydroxy terminated; Polyoxyethylene sorbitol hexaoleate; Trimethylolpropane ethoxylate; Glycerol ethoxylate; Poly(1-decene); Poly[1,6-hexanediol/neopentyl glycol/di(ethylene glycol)-alt-adipic acid] diol; Poly(ethylene glycol) 4-nonylphenyl 3-sulfopropyl ether, potassium salt; Poly(3-methyl-1,5-pentanediol adipate); Sorbitan monolaurate Synonyms: (Span® 20); Triton® X-114, e.g., reduced Synonyms: [polyoxyethylene(8) tert-octylcyclohexyl ether] ®Union Carbide Chemical & Plastics Technology Corp.; Pentaerythritol ethoxylate; Cellulose acetate butyrate (preferred); Poly[4,4-(hexafluoroisopropylidene)diphthalic anhydride-co-4,4-oxydianiline], amic acid; Pentaerythritol propoxylate/ethoxylate; Polycaprolactone triol; Polystyrene, methacrylate terminated; Vinyl sulfone Synonym: (divinyl sulfone); Poly(ethylene-ran-butylene) mono-ol; Poly[di(ethylene glycol) adipate]; Poly(ethylene-co-1,2-butylene)diol; Poly(isobutyl methacrylate) (preferred); Poly[di(ethylene glycol)/glycerol-alt-adipic acid], polyol; Poly(dimethylsiloxane-co-diphenylsiloxane), divinyl terminated; Dimer acid, hydrogenated; Ethyl vinyl sulfide; Poly[di(ethylene glycol)/trimethylolpropane-alt-adipic acid], polyol; Poly(1,4-butanediol), isophorone diisocyanate terminated; Trimethylolpropane ethoxylate; Poly[di(ethylene glycol)/glycerol-alt-adipic acid], polyol; 1,3,4,6-Tetrakis(butoxymethyl)glycoluril; Polyester-block-polyether alpha,omega-diol; Poly(dimer acid-co-ethylene glycol), hydrogenated; Triethanolamine ethoxylate; 2-Dodecenylsuccinic acid propoxylate; Pentaerythritol ethoxylate; Poly(hexyl methacrylate); Poly(butyl methacrylate); Poly(isobutylene-co-isoprene); Poly(urea-co-formaldehyde), methylated; Poly(ethyl methacrylate); Poly(vinyl butyral-co-vinyl alcohol-co-vinyl acetate); 3-Dodecylthiophene; Triton® X-100, e.g., Synonyms: [polyoxyethylene(10) tert-octylphenyl ether] ®Union Carbide Chemical & Plastics Technology Corp.; Poly(propylene glycol) 4-nonylphenyl ether acrylate; Polybutenes; N-Vinylformamide; Poly(melamine-co-formaldehyde), butylated; Poly(ethylene glycol) 4-nonylphenyl 3-sulfopropyl ether, potassium salt; Poly(methyl acrylate); Diglycidyl 1,2,3,6-tetrahydrophthalate; Igepal® CO-520, e.g., Synonyms: [polyoxyethylene(5) nonylphenyl ether] ®Registered trademark of GAF Corp.; Bisphenol A ethoxylate; 3-Hexylthiophene (preferred); (Hydroxymethyl)melamine, methylated/isobutylated/carboxylated; Poly(3,3,4,4-biphenyltetracarboxylic dianhydride-co-1,4-phenylenediamine), amic acid (preferred); Poly(ethylene glycol) 4-nonylphenyl ether acrylate; Poly(vinyl methyl ketone); Poly(isophorone diisocyanate); Poly(hexamethylene diisocyanate); Polybutadiene; 1-(2-Aminoethyl)piperazine; Tetravinyltin; Poly(melamine-co-formaldehyde), acrylated; Poly(melamine-co-formaldehyde), methylated/butylated; Poly(hexamethylene diisocyanate); Polypropylenimine tetraamine Dendrimer (Synonyms: [N,N,N,N-tetrakis(3-aminopropyl)-1,4-butanediamine]); Poly(ethylene glycol) phenyl ether acrylate; Poly[1,4-phenylene diisocyanate-co-poly(1,4-butanediol)] diisocyanate; Polyisobutylene; Polybutenes; Poly(melamine-co-formaldehyde), acrylated; Poly(1,4-butanediol) bis(4-aminobenzoate); Poly(ethylene glycol) phenyl ether acrylate; Poly(hexamethylene diisocyanate); Poly(pyromellitic dianhydride-co-4,4-oxydianiline), amic acid (solution); Poly(cyclohexyl methacrylate); Poly(melamine-co-formaldehyde), methylated; Poly(ethylene-co-methacrylic acid), sodium salt; Poly(ethylene glycol) phenyl ether acrylate; Polybutadiene, epoxy/hydroxy functionalized; Polybutadiene, hydroxyl functionalized; Polyacrylonitrile; Poly(acrylonitrile-co-butadiene-co-acrylic acid), dicarboxy terminated, glycidyl methacrylate Diester; DAB-Am-16, Polypropylenimine hexadecaamine Dendrimer; Polybutadiene, hydroxyl functionalized; Polybutadiene, dicarboxy terminated; Poly(acrylonitrile-co-butadiene-co-acrylic acid), dicarboxy terminated; Poly(3,3,4,4-benzophenonetetracarboxylic dianhydride-co-4,4-oxydianiline/1,3-phenylenediamine), amic acid; Poly(acrylonitrile-co-butadiene), amine terminated; Poly(1,4-butanediol), tolylene 2,4-diisocyanate terminated; Poly(acrylonitrile-co-butadiene), amine terminated; Poly(melamine-co-formaldehyde), methylated; Poly[di(ethylene glycol) phthalate] diol; Polyisoprene; Poly(melamine-co-formaldehyde), partially methylated; Polybutadiene; Bisphenol A propoxylate/ethoxylate; Polyethylenimine preferred) (e.g., conventionally used as an adhesion promoter, lamination primer, fixative agent, flocculant, cationic dispersant, stability enhancer, surface activator, chelating agent and scavenger for aldehydes and oxides); Poly(trimellitic anhydride chloride-alt-benzidine) (for example, might be used in inventive images for its adhesion to a range of substrates); 2,5-Dibromo-3-dodecylthiophene; Poly[di(ethylene glycol) phthalate] diol, (preferred), e.g., conventionally used to improve polyester hydrolytic stability and promotes bonding to various plastics and metals; Bisphenol A ethoxylate dimethacrylate; Bisphenol A ethoxylate diacrylate; Poly(methylstyrene-co-indene), hydrogenated; Poly [glycidyl 3-(pentadecadienyl)phenyl ether-co-formaldehyde]; 4-Acetoxystyrene Synonyms: (4-ethenylphenol acetate); 2,5-Dibromo-3-decylthiophene; Bisphenol A ethoxylate; Bisphenol A propoxylate; N-(1-Phenylethyl)maleimide; 2,5-Dibromo-3-hexylthiophene; (Hydroxymethyl)benzoguanamine, methylated/ethylated; Nylon 6/10 (preferred) e.g., synonyms: [poly(hexamethylene sebacamide)]; Poly(benzyl methacrylate) (preferred); Poly(styrene-co-butadiene-co-methyl methacrylate) e.g., in conventional uses, easy to mold, high clarity, impact resistant, and not affected by gamma irradiation; Poly(Bisphenol A-co-epichlorohydrin), glycidyl end-capped; Poly(styrene-co-maleic anhydride); Poly(Bisphenol A carbonate) (preferred) (e.g., can offer glass-like transparency, outstanding impact strength, excellent dimensional stability and good electrical and thermal resistance properties, but tends to craze under strain and aging; conventionally used for automotive lenses, ophthalmic lenses, compact discs, bottles and films); Poly [(phenyl glycidyl ether)-co-formaldehyde] (e.g., conventional uses: adhesives, structural and electrical laminates and coatings, and castings—high temperature); Polystyrene (preferred); Polyvinyltoluene; Poly(4-vinylphenol) Synonyms: [poly(4-hydroxystyrene)] e.g., conventionally used to promote adhesion; its derivatives are used as antioxidants and flame retardants in plastics; also used in polymer blends to modify surface characteristics and Improve impact resistance; Poly(alpha-methylstyrene); Poly[(phenyl isocyanate)-co-formaldehyde)]; Polysulfone (preferred); Poly(trimellitic anhydride chloride-co-4,4-methylenedianiline); Polyphenylsulfone (preferred); Poly(methyl methacrylate) isotactic; Poly(methyl methacrylate-co-ethyl acrylate); Poly(acrylamide-co-acrylic acid); Poly(acrylic acid), potassium salt (might for example, be used in inventive images for its superabsorbent feature); Poly(acrylic acid), sodium salt (might for example, be used in inventive images for its superabsorbent feature); Poly(acrylic acid), sodium salt-graft-poly(ethylene oxide) (might for example, be used in inventive images for superabsorbent feature); Poly(acrylic acid-co-acrylamide), potassium salt (e.g., can absorb many times it weight in aqueous fluids); Poly(chlorotrifluoroethylene) (preferred); Polyethylene (preferred); D.E.R.(R) 332 Synonyms: [Epoxy-Resin] (preferred); Poly(ethylene-co-vinyl acetate); Polypropylene (preferred); Poly[Bisphenol A carbonate-co-4,4'-(3,3,5-trimethylcyclohexylidene)diphenol carbonate]; Poly[bis(benzylthio)acetylene] (preferred); Poly[bis(methylthio)acetylene] (preferred); Poly[bis(ethylthio)acetylene] (preferred); Poly(Bisphenol A-co-4-nitrophthalic anhydride-co-1,3-phenylenediamine); Poly(carbonate urethane), [copolymer of poly(1,6-hexyl-1,2-ethyl carbonate) diol, 4,4'-methylenebis(phenyl isocyanate) and 1,4-butanediol]; Poly (4-ethylstyrene-co-divinylbenzene); Poly(phenylene sulfide); Nylon 6/6 (preferred); Ethyl 2-cyano-3,3-diphenylacrylate; 2-(2H-Benzotriazol-2-yl)-4,6-di-tert-phentyl-phenol; 4-Nitrosophenol, sodium salt; Poly[4,4-methylenebis (phenyl isocyanate)-alt-1,4-butanediol/poly(ethylene glycol)-co-propylene glycol/polycaprolactone]; Poly(ethylene-co-1-butene); Polyethylene-graft-maleic anhydride (grafted with maleic anhydride to add hydrophilicity, e.g., can provide high gloss retention, scuff-resistance and heat sealability); Polypropylene-graft-maleic anhydride (grafted with maleic anhydride for hydrophilic characteristics, e.g., conventionally used to impart slip resistance, coupling stabilizer for filled polypropylene and polymer alloys, pigment dispersant and processing aid for plastics, such as ABS.); Poly(ethylene-co-carbon monoxide); Poly(dimethylsiloxane)-graft-polyacrylates; tert-Butyl peracetate (preferred); Poly(methyl vinyl ether-alt-maleic acid monobutyl ester); 2,5-Bis(tert-butylperoxy)-2,5-dimethylhexane; Allyl alcohol propoxylate; Poly(ethylene glycol)-block-poly(propylene glycol)-block-poly(ethylene glycol); Poly[dimethylsiloxane-co-methyl(3-hydroxypropyl)siloxane]-graft-poly(ethylene/propylene glycol); Glycerol propoxylate triglycidyl ether; Ethylenediamine tetrakis(propoxylate-block-ethoxylate) tetrol; Triisodecyl phosphite; Tris(tridecyl) phosphite; Trimethylolethane triglycidyl ether; Diisodecyl phenyl phosphite; 2-Dodecyl-N-(2,2,6,6-tetramethyl-4-piperidinyl)succinimide; 2-Dodecyl-N-(1,2,2,6,6-pentamethyl-4-piperidinyl)succinimide; N-(1-Acetyl-2,2,6,6-tetramethyl-4-piperidinyl)-2-dodecylsuccinimide; 4,4-Isopropylidenebis(diisodecyl phenyl phosphite); 2-Ethylhexyl salicylate; triethanolamine salicylate; Glycidyl 4-nonylphenyl ether; Poly(acrylonitrile-co-butadiene), dicarboxy terminated; Polybutadiene-block-polyisoprene; Polyisoprene-graft-maleic acid monomethyl ester; Polyisoprene-graft-maleic anhydride; Isooctyl diphenyl phosphite; Tris(nonylphenyl) phosphite; Poly(methylstyrene-co-indene), hydrogenated; Poly(dipropylene glycol) phenyl phosphite; Menthyl anthranilate; 2-Ethylhexyl trans-4-methoxycinnamate; 2-Ethylhexyl 2-cyano-3,3-diphenylacrylate; and combinations of these.

Silmar® offers numerous other resins which like WS-40 (SIL95BA-40), are desirable and preferred for use in the medium of the present invention. In all of the following examples A. refers to the example of the percentage of unsaturated polyester base resin in the Silmar product, and B. refers to the example of the percentage of styrene in the Silmar product. WS-40 (SIL95BA-40) and WS-41 also known as SIL95BA-41 are both Clear Casting Resins, e.g., with 62-64% of A. and 36-38% of B. Four other Clear Casting Resins differ: 805 also known as SIL95BA-805, e.g., made with 61-63% of A. and 37-39% of B; 1214, also known as SIL95DA-1214, e.g., with 69-71% of A. and 28-30% of B; SIL95BA-1371, e.g., with 62-64% of A. and 36-38% of B.; and SIL95BE-981, e.g., with 67-69% of A. and 31-33% of B. Silmar's 249a also known as SIL65BQ-249a; 250 also known as SIL65BQ-250; and 250a also known as SIL65BQ-250a are for example, all Ortho Laminating Resins, e.g., made with 63-64% of A. and 36-37% of B. SIL65BQ-249 is for example, also known as the Ortho Laminating Resin 249, e.g., with 62-64% of A. and 36-37% of B. Another is SIL65BE-929, for example, the Ortho Laminating Resin, e.g., with 59-62% of A. and 37-40% of B. These three may be examples of Flexible Resins, SIL17DA-384, e.g., with 70-72% of A. and 28-30% of B.; SIL17BA-628, e.g., with 67-69% of A. and 31-33% of B.; and SIL17DA-712, e.g., with 72-74% of A. and 26-28% of B. Two examples may be Figurine Casting Resins, SIL05BB-1140, e.g., with 66-69% of A. and 30-33% of B., and SIL05DA-1085, e.g., with 69-71% of A. and 29-31% of B. The Onyx Resin, 793c also known as SIL92BA-793c is for example, made with 67-69% of A. and 31-33% of B. Two Corrosion, ISO Resins, 610 also known as SIL75AA-610, and 611 also known as SIL75CA-611 are, for example, both made with 49-51% of A. and 49-51% of B. SIL17DB-900 is a final example.

Polymer in inventive images can be made of compositions of styrene monomer which is for example, Styrene Monomer (Ethenyl Benzene), e.g., with polyester resins such as: polyester resin/2,5-Furandione, polymer with 1,3-isobenzofurandione and 1,2-propanediol; and such as polyester resin/2,5-Furandione, polymer with 1,3-isobenzofurandione, 2,2'-oxybis[ethanol] and 1,2-propanediol.

MRC Polymers of Chicago Ill. offers many products which can be used in inventive images. Examples are their Naxell™polycarbonate resins, in the product series: PC100, PC110, PC 120, PC23MS, PC 230, PC 300, PC 429, PC 169, and PC 909 which may for example, be typically made of 65-99% Bisphenol-A Polycarbonate, less than 30% fiberglass, less than 15% proprietary modifier, less than 10% proprietary ignition resistant stabilizers, and less than 5% colorants.

Shell Oil Company in Houston, Tex. offers products which can be used in inventive images such as these examples. Shell offers epoxy such as Epon® resin 828. Epon® (R) resin 828 is for example, Bisphenol A/Epichlorohydrin based epoxy resin, e.g., which might contain diglycidyl ether 2 ppm, and phenyl glycidyl ether 6 ppm. Epon® resin 828 can be cured with a variety of catalysts, e.g., depending on the properties desired in the polymer formed and the processing methods desired. Examples of such catalysts are Methyl tetrahydrophthalic Anhdride (MTHPA), Diethlaminopropylamine, Dimethylamino propylamine, and Epi-cure® curing agents from Shell. A specific example is Shell's Epi-cure® 3274 aliphatic amine curing agent, e.g., a mixture of polyoxyalkleneamine and nonylphenol.

Shell's Kraton® polymers may also be used in inventive images, e.g., as a principal component in making polymer or as a stabilizer in polymer in inventive images. For example, Kraton® polymers are special elastomers, with high strength and low viscosity, which do not require vulcanization, and which are highly entendable with colorants and stabilizers such as fillers, etc. As a stabilizer, Kraton® polymers might for example alter viscosity or shrinkage in processing; they may enhance impact toughness, flexibility, or elasticity; they may alter the look or the feel of polymer; or they may enhance polymer in a combination of these ways. Among examples of the Kraton® polymers are Poly(styrene-b-butadiene-b-styrene) (styrene-butadiene-styrene or SBS); styrene-isoprene-styrene (SIS), styrene-ethylene/butylene-styrene (SEBS), (styrene-butadiene)n or (styrene-isoprene)n, (S-B), styrene-ethylene/propylene (SEP) and (SEB). For example, Kraton® (R) D1401 may be clear and rigid, and it might be used alone or in blends with polystyrene (e.g., general purpose). Kraton® (R) D1401 may for example be a thermoplastic rubber, styrene-butadiene copolymer, e.g., made of less than 99% styrene-butadiene copolymer; 0-1% copolymer; and less than 2% antioxidant/stabilizer. Kraton® (R) G2705 is for example, transparent thermoplastic rubber, styrene-ethylene/butylene-styrene block copolymer, e.g., made of a mixture of less than 50% styrene-ethylene/butylene-styrene block copolymer; less than 50% mineral oil; less than 15% polypropylene; less than 1% antioxidant/stabilizers; less than 1% titanium dioxide; and less than 1% calcium stearate. Kraton® (R) D 2104 is for example, translucent thermoplastic rubber, styrene-butadiene-styrene block copolymer, e.g., made of the mixture of less than 65% styrene-butadiene-styrene block copolymer; less than 40% mineral oil; less than 1% zinc stearate; less than 1% antioxidant/stabilizers; less than 1% magnesium carbonate; and less than 1% hydrated amorphous silica. Kraton® (R) D2109 is for example, a white thermoplastic rubber, styrene-butadiene-styrene block copolymer, e.g. made of a mixture of less than 55% styrene-butadiene-styrene block copolymer; less than 30% mineral oil; less than 10% EVA copolymer; less than 10% polystyrene; less than 5% titanium dioxide; less than 1% hydrated amorphous silica; and less than 1% antioxidant/stabilizers.

Shell's Traytuf™ Ultra-Clear resins are for example, high strength, high purity specially modified polyester resins for use in forming polymer of the present invention which can be clear, e.g., Traytuf™ resins may be extruded or thermoformed using conventional practices, for instance, into inventive images or into polymer image support stabilizers which may then be superimposed. Traytuf™ XP 8387 Ultra-Clear Polyester Resin is for example, a Theologically enhanced polyethylene terephthalate resin for use in making inventive images. Traytuf™ 7357 Polyester Resin is for example, a TPA-based polyethylene terephthalate resin for use in making inventive images. Shell's Cleartuf® Aqua™ is for example, polyethylene terephthalate (PET) copolymer resin also for use in forming polymer of the present invention which can be clear. Shell's Cleartuf 8016 and Shell's Cleartuf 8416 are for example, both TPA-based polyethylene terephthalate copolymer resin for use in making inventive images.

Reichhold Chemicals Inc. of Research Triangle Park, N.C., and of Durham, N.C. offer many products which can be used in inventive images. Examples are their Polylite® resins which are orthophthalic resins, such as these. Polylite® 32032-00, is for example, acrylic modified and it cures water clear, e.g., one version of it is made of 75% polyester resin, 30% styrene monomer and 10% methyl methacrylate, while another version of Polylite® 32032-00 is made of 31-35% styrene monomer/ethenyl benzene, 60-64% polyester resin/ 2,5-Furandione, polymer with 1,3-isobenzofurandione and 1,2-propanediol; and 3-7% methyl methacrylate/methyl 2-methyl-2-propenoate. As an example, Reichhold recommends Polylite® 32032-00 be catalyzed with Superox® 46709 MEKP (Superox® catalysts are from Reichhold), e.g., ⅛" thick castings catalyzed at 1.25%, cured overnight at room temperature then post-cured for 2 hours at 250° F. Reichhold's Polylite® (R) 33327-00, is for example, 57% polyester resin; 44% styrene monomer; and 1.0% alpha-methylstyrene.

According to Reichhold, Polylite® 32030-00, 32030-05, and 32030-10 are for example, stabilized for UV light such that they resist yellowing; they have low viscosities, low shrinkage, outstanding air release, and they cure water clear. Both Polylite® 32030-00 and 32030-10 for example, have 67% polyester resin and 35% styrene monomer, and Reichhold recommends they be catalyzed with Superox® MEKP, e.g., 1.25%, then post-cured for 2 hours at 250° F. Polylite® 33336-00, is for example a series of polyester resins such as Polylite® (R) 33336-03, e.g., thixotropic, they have low viscosities, they cure quickly, they resist sagging on vertical surfaces, and they accept up to 50% fillers. Reichhold recommends for example, that they be catalyzed with MEKP, e.g., 1.0% by weight or 1.7% by volume Lupersol® DDM-9 per 100 gins resin; 1.25% Superox® 46709 per 100 gms resin; 1.7% by volume Cadox® L-50 per 100 gms resin; 2.0% by volume Norox® MEKP-9H per 100 gms resin; 0.37% by volume Norox® MEKP-900 per 100 gms resin; or 1% by weight HiPoint-90 per 100 gms. Polylite® (R) 33336-03 is for example, 60% polyester resin; and 43% styrene monomer. Polylite® 32773-00 is for example, a polyester resin containing wax (a stabilizer), which may be cured with MEKP, e.g. it is made of 63-67% polyester resin which is polyester resin/ 2,5-Furandione, polymer with 1,3-isobenzofurandione, 2,2'-oxybis[ethanol] and 1,2-propanediol; and 33-37% styrene monomer which is Styrene Monomer (Ethenyl Benzene). The use of this resin in cPRM is not restricted to surfacing uses.

Polylite® (R) 32737-00, for example, is stabilized for ultraviolet light such that its yellowing is minimal, it may contain a surfacing agent, it can have a low viscosity, it can have a long gel time, and it can cure tack free, rigid and water clear, e.g., it may be made of 58-65% polyester resin which is polyester resin/2,5-Furandione, polymer with 1,3-isobenzofurandione and 1,2-propanediol; with 36-43% styrene monomer which is Styrene Monomer/Ethenyl Benzene. Polylite® (R) 32737-00 can for example, be catalyzed with MEKP.

Reichhold's Superox® MEKP catalysts can be used to make inventive images, e.g., with Reichhold monomers. For example, three Superox® products are made with these ingredients: 1). Dimethyl Phthalate; 2). Methyl Ethyl Ketone Peroxide/2-Butanone, Peroxide; 3). Dipropylene Glycol/Oxybis-Propanol; 4). Hydrogen Peroxide; 5). Methyl Ethyl Ketone; 6). water; and 7). Aliphatic Ester.

Luran® 358 N, e.g., has a higher melt volume rate and a lower viscosity than Luran®368 R, BASF considers Luran® 358 N an easy flow grade. BASF's Luran® 358 N may for example, have greater than 99% styrene-acrylonitrile polymer. Luran® 358 N and Luran® 368 R can both be special ordered from BASF with a HALS ultraviolet light stabilizer. BASF offers Ultrason® E Polyethersulfone (PES), an example of which is Ultrason® E 2010, e.g., made of 100% polyethersulfone and 0.2% 2-pyrrolidinone, 1-methyl. BASF offers Ultrason® S Polysulfone (PSU) an example of which is Ultrason® S 2010 polycondensate resin, e.g., 100% polysulfone resin and 0.2% 2-pyrrolidinone, 1-methyl. BASF offers Styrolux® styrene/butadiene block copolymer (S/BIS), an example of which is Styrolux®684D Q188, e.g., which may have greater than 97% benzene, ethenyl-, polymer and less than 2.0% white mineral oil, petrol. Also from BASF, Polystyrol®, exmples of

| | May for example, have contents of ingredients referenced above in percentages below | | | | | | |
|---|---|---|---|---|---|---|---|
| Superox® | 1). | 2). | 3). | 4). | 5). | 6). | 7). |
| (R) 46702-00 | 50% | 32.9-34.1% | 0% | 0.4%-0.6% | 1-2% | 1% | 13% |
| (R) 46709-00 | 47% | 30-31.5% | 5% | 1.8-2.1% | 1-2% | 1.6% | 12.5% |
| (R) 46710-00 | 41% | 26-28% | 8% | 3.8-4.5% | 1-2% | 3.8% | 14.6% |

BASF Corporation offers products which can be used to make inventive images. For example, BASF offers Acrylic Acid, Glacial HM-Grade, synonym: 2-Propenoic acid; Vinyl formic acid, e.g., prepared in a proportion of 99.5% with 180.0-200.0 p of Hydroquinone Monomethyl Ether (inhibitor). BASF offers Acrylic Acid, Butyl Ester, synonym: Butyl 2-Propenoate; 2-Propenoic Acid, Butyl Ester, e.g., this may be 99.5% Butyl Acrylate with approximately 15.0 p Hydroquinone Monomethyl Ether (inhibitor). BASF offers Acrylic Acid, 2-Ethylhexyl Ester; synonym: 2-Propenoic Acid, 2-Ethyl-hexyl Ester; Monomer 1, e.g., this may be 99.5% 2-Ethylhexyl Acrylate with approximately 15 p. Hydroquinone Monomethyl Ether (inhibitor). BASF offers Acrylic Acid, Ethyl Ester; synonym: Ethyl 2-Propenoate; 2-Propenoic Acid, Ethyl Ester, e.g., this may be 99.5% Ethyl Acrylate with approximately 15 p. Hydroquinone Monomethyl Ether (inhibitor). BASF offers Acrylic Acid, Methyl Ester; Synonym: 2-Propenoic Acid, Methyl Ester; Methyl-2-propenoate, e.g., this may be 99.5% Methyl Acrylate, with 10.0-20.0 p Hydroquinone Monomethyl Ether (inhibitor), and with less than 0.1% 2-Propenoic Acid. BASF also offers Isobutyl Ester of Acrylic Acid; synonym: Isobutyl Propenoate; 2-Propenoic Acid, 2-Isobutyl Ester, e.g., this may be 99.0% Isobutyl Acrylate with approximately 15.0 p Hydroquinone Monomethyl Ether (inhibitor). The stabilizer content which may be in these BASF products might vary, e.g., depending on climatic conditions.

BASF's Terlux®, for example, Methyl Methacrylate/Acrylonitrile/Butadiene/Styrene Polymer (MABS) may be used to make inventive images. Examples are Terlux® 2802 TR and Terlux® 2812 TR which both may be Methyl Methacrylate/Acrylonitrile/Styrene/Butadiene Polymer. Terlux® 2802 TR Q161, e.g., is methyl methacrylate modified acrylonitrile, butadiene styrene resin. Terlux® 2802 TR, e.g., has a lower melt volume rate and a higher viscosity than Terlux® 2812 TR, BASF considers Terlux® 2812 TR a high flow or easy flow grade. Also from BASF, Luran® such as Luran® 358 N and Luran®368 R might be used to make inventive images, e.g., both are Styrene/Acrylonitrile Copolymer.

which may be considered to be for general purposes, e.g., made of polystyrene and others of which are considered to be for high impact, for example, made of styrene/butadiene/polymer. An example is Polystyrol® 145DWW, e.g., made of less than 96% polystyrene, and less than 4.0% white mineral oil. BASF also offers High Heat Crystal Polystyrene such as 158L KG2, e.g., which is polystyrene. And BASF offers a Rubber Modified Polystyrene such as 525K KG2, e.g., which may be made of greater than 95% styrene polymer with 1,3-butadiene polymer; less than 5.0% white mineral oil, and 0.1% zinc compounds.

Alpha/Owens-Corning (AOC), Ontario Canada offers products which can be used to make inventive images such as numerous monomers. For example, F31-2125 polyester resin by AOC, is for instance, is a fully promoted orthophthalic polyester resin for clear casting, e.g., with 30-35% by weight Styrene. AOC's Firepel™ K299FR-19M is for example, polyester resin, e.g., a promoted, non-thixotropic, amber colored, Bisphenol-A based polyester resin with significant fire retardant and corrosion resistant properties, which for example, may have 40-60% by weight Styrene. AOC's F11-4152/F11-4153 Polyester resins are for example, filly promoted, thixotropic, translucent, orthophthalic general purpose polyester resins, e.g., with 40-60% by weight Styrene. F11-4152 is the air drying version of F11-4153 which is non air drying. AOC's Vibrin® E-010-TB/TC Vinyl Ester Resins are for example, bisphenol-A epoxy-based vinyl ester resins, e.g., dissolved in styrene, and resistant to corrosion, chemicals and heat. Vibrin® E-010-TB/TC are for example, thixotropic versions of Vibrin® E-010-01. AOC's E-010TC may for example, have 0.1-1% by weight Cobalt 2-Ethylhexanoate and 30-35% by weight Styrene. AOC's Vibrin® E704-BI polyester resin is for example a rigid, corrosion resistant isophthalic based unsaturated polyester resin with the wet out, cure and handling characteristics of general purpose resins, e.g., it may have 0.1-1% by weight Cobalt 2-Ethylhexanoate and 40-60% by weight Styrene. AOC's F11-2000/F11-2001 are for example polyester resins that are fully promoted thixotropic, general purpose orthophthalic resins.

F11-2001 is the non air drying version of F11-2000 which is air drying. F11-2000, may for example, have 0.1-1% by weight Cobalt 2-Ethylhexanoate and 40-60% by weight Styrene.

Phillips Chemical Company of Houston, Tex. offers products which can be used to make inventive images. For example, polymer for inventive images can be made using various grades of Phillips' K-Resin®, e.g., styrene-butadiene copolymers. There might for example, be stabilizers in their K-Resins® (e.g., to stabilize the polymer to heat, antioxidents, etc.) In addition, a number of K-Resins® (such as KR03 and KR05) might contain microcrystalline wax (which is a stabilizer), which may act as an antiblock and provide processing benifits and effects described herein. In addition, Creanova Inc. (a Hüls Group Company soon to be with Degussa) of Somerset, N.J. offers monomers and polymers for use in inventive images such as polyurethane, polybutadiene, Dynapol® (e.g., saturated polyester resins), etc. Condea Servo of Piscataway, N.J. offers a range of products for use in inventive images too.

McWhorter Technologies Inc. of Carpentersville, Ill. offers a wide range of products for use in inventive images. Examples are Carboxyl Terminated Polyesters (such as Albester products which are with epoxy resins), Hydroxyl Terminated Polyesters (such as Albester products), Polymeric Isocyanate Curing Agents (such as Alcure products), Carboxyl Polyester Resins, Exterior Durable Carboxyl Terminated Polyesters (such as Albester products), Hydroxyl Polyester Resins, and Curing Agents for Hydroxyl Functional Polyester Resins (such as Alcure products). Other examples are High Solids Resins—Alkyds such as those which are Short oil, chain-stopped, medium oil, and long oil like Duramac® products; High Solids Resins—modified Alkyds such as silicone (like Rezimac®) and copolymers (like Macopol® HS); High Solids Resins—Epoxy Esters (like other Rezimac® products); High Solids Resins—Polyesters (like Polymac® products); High Solids Resins—Oil Modified Polyurethanes (like Carbamac®); High Solids Resins—Solution Acrylics (like Acrylamac® products); High Solids Resins—Long Oil Modifiers (like some Duramac® products); and High Solids Resins—Melamine (like Aminomac®). More examples are Water Reducible Resins such as Alkyds (like some Duramac®WR products); Chain-stopped (like some Duramac® WR products); modified alkyds like Silicone (e.g., Rezimac® WR and copolymers (e.g., Macopol® WR); epoxy esters (e.g., some Rezimac® WR products); polyesters (like Polymac® WR); Solution Acrylics like Acrylamac® WR; stain vehicles like some Rezimac®WR products; and waterborne dispersions like Polymac® DP and Duramac® DP. Still more examples are Latex Polymers like Aquamac® products (e.g., acrylics, styrene acrylics, and vinyl acrylics). Some conventional resins that are examples are alkyds that are short oil, chain-stopped, medium oil, long oil, thixotropic alkyds, flat alkyds, traffic alkyds and modified alkyds (copolymers and silicone), such as Duramac®, Rezimac® and Macopol® products. Other conventional resins that are examples are epoxy esters (like Rezimac® products), oil modified polyurethanes (like Carbamac® products), polyesters like (Polymac® products), solution acrylics (like Acrylamac® products), urea (like Aminomac®), and Melamine (like Aminomac®).

Elf Atochem North America Inc. in Philadelphia, Pa. offers Plexiglas® which can be used to make inventive images. For example, their Plexiglas® V Series is a group of transparent translucent poly methyl methacrylate resins with varing degrees of melt flow and heat resistance and other properties, e.g., that are not affected by alkalis, hydrocarbons, non-oxidizing acids, saltwater, photographic, or battery solutions. Examples of Plexiglas® V Series, may for instance have 99.3% (by weight) P(EA/MMA), and less than 0.7% (by weight) methyl methacrylate. These are further non limiting examples. Plexiglas® V052, e.g., may have a high molecular weight, for example, for injection molding; it may be slightly less heat resistant and slightly stiffer flowing than V825 acrylic; and it may have superior mold release. Plexiglas® V052-UVA5A, e.g., may be a high molecular weight resin with additional UV light absorption properties. Plexiglas® V045, e.g., may be equilalent to Plexiglas® V052 but less lubricant, also used for extrusion. Plexiglas® V920, may for example be used for general purpose, e.g., injection molding. Plexiglas® V920-UVT, for example, ultraviolet transmitting resin, e.g., for injection molding. Plexiglas® V825, e.g., offers excellent heat resistance. Plexiglas® V825 HID, e.g., offers excellent heat resistance with outstanding resistance to UV light. Plexiglas® V826, e.g., offers excellent heat resistance with superior chemical resistance. Plexiglas® VM, e.g., offers medium heat resistance and easy flow. Plexiglas® VH, e.g., offers medium heat resistance and excellent flow. Plexiglas® VS, e.g., offers medium flow and lowest heat resistance grade, for example, for injection molding. Plexiglas® VS-UVT, e.g. may be an ultraviolet transmitting resin, for example, for injection molding. Plexiglas® VLD, e.g., may be an ultra-clean colorless resin, for example, used in optical applications. Also, Plexiglas® V 920-100 might be used.

Further examples are Plexiglas® Impact Modified Resins such as these examples. Plexiglas® DR, Plexiglas® MI-7, and Plexiglas® HFI Series resins, which for example, offer 7 to 10 times the impact resistance than regular acrylics. Plexiglas® DR, for example, is a high impact acrylic resin, e.g., for injection molding. Plexiglas® MI-7, e.g., is a medium impact acrylic resin. Plexiglas® HFI Series resins, e.g. have superior flow and mold release properties. Plexiglas® HFI-10, e.g., may have a high impact acrylic resin with improved injection molding characteristics. Plexiglas® HFI-7, e.g., is a medium impact acrylic resin with improved injection molding characteristics. As addtional examples: Plexiglas® SG-7 and SG-10 resins, e.g., gamma radiation resistant grades in the impact modified series with improved injection molding characteristics specially designed to minimize discoloration that accompanies gamma radiation sterilization. Plexiglas® SG-7, e.g., is a high impact acrylic resin, and Plexiglas® SG-10, e.g., is a medium impact acrylic resin.

Elf Atochem North America Inc. also offers a series of translucent polymers they call "technical polymers" which can be used to make inventive images. Examples of these are Kynar®, Kynar 500® and Kynar Flex® PVDF, e.g., polyvinylidene fluoride, the homopolymer of 1,1-difluoroethene; Rilsan® PA, e.g., Polyamide resins (for example, rigid, flexible, conductive, semi-flexible); Pebox®, e.g., Polyether Block Amides (PEBA); Orgalloy®; and Platamid®. Elf Atochem North America Inc. also offers a series of polymers they call "functional polymers" which can be used to make inventive images, e.g., for use as surface preparation stabilizers. These are examples: 1). Lotryl®, e.g., EBA and EMA copolymers, copolymers ethylene-acrylic ester; 2). Orevac® PP, e.g., grafted polypropylene (this is a range of modified polypropylenes which for example, when molten have excellent adhesive properties to various substrates and are designed to bond dissimilar materials in coextrusion applications); 3). Orevac®, e.g., EVA terpolymers is for example a range of ethylene-vinyl acetate copolymers modified by the adjunction of polar groups which when molten have excellent adhesive properties to various substrates; 4). Orevac®, e.g., PE grafted polyethylene (for example, modified polyethylenes which when molten have excellent adhesive properties to polar substrates, for instance, conventionally used as a tie-layer for multi layer products made of polyethylene and polyamide or ethylene-vinyl alcohol copolymer); 5). Lotader®, e.g., ethylene-acrylic ester-maleic anhydride terpolymers; and 6). Evatane®, e.g., high content EVA copolymers.

Polychem Corporation of Cranston, R.I. offers a number of resins which can be used to make inventive images. Examples are their resins for open mold casting. Examples of these are: polyester resins which they call "Jewel Cast Polyester" such as 458-C, e.g., a clear polyester resin; 457-C, e.g., a lower viscosity version of 458-C; and 477-C, e.g. a flexible version of 458-C for forming polyester which has some flex. They recommend these polyester resins be catalyzed with MEKP. These polyester resins and others which they offer may for example, contain 50-75% unsaturated polyester resin and 25-50% styrene. Their epoxy resin, 501 Epoxy Resin is for example, a low viscosity resin with two components which are mixed together, e.g., at a ratio of 2 parts resin to one part hardener. Polychem recommends the hardener, RT91 for use with 501 Epoxy. Preferred among the 501 Epoxy resins are the 501 C (e.g., clear), and the 501 regular (e.g., transparent yellow or amber color). For example, Epoxy 501-C is for instance made of 100% reaction products of epichlorohydrin and bisphenol A. And a number of the hardeners such as RT91 are for example, made of polyoxyproplylenediamine and nonyl phenol. Polychem recommends passing a hair drier over curing polymerization reaction mixtures such as their Epoxy 501 to aid in the release of trapped air bubbles.

Rio Grande of Albuquerque, N.M. offers Durenamel™ and Colores™ which can be used in inventive images, e.g., to simulate the look of gems and/or enameling. Both of these are for example, epoxy resin, a hardener and various pigments which are mixed together and conventionally used for inlays, ornamentation that has the look of enameling or gems, etc., e.g., in jewelry. Durenamel™ requires heat to fully polymerize, e.g. bake at less than 150° F. in a conventional oven and/or heat with a torch.

General Electric Company offers products that can be used in inventive images such as these examples. GE's Lexan® polycarbonate resins are preferred for use in inventive images. Examples of Lexan® contain Poly(bisphenol-A carbonate), e.g., in quantities in the high 90 percentage rates. Examples of GE's Cycolac® (SAN) copolymer resins, e.g., contain styrene-acrylonitrile polymer; and less than 0.1% acrylonitrile. GE's Ultem® PEI resins are for example, amorphous thermoplastic polyetherimide resins which might be used in inventive images.

Among GE's "Structured Products" are the following examples of polymer films and sheets. GE offers Lexan® polycarbonate films in a wide variety of surface textures and finishes (such as grades of gloss and matte finishes), e.g., for further processing such as for embossing, insert-mold decoration, high precision die cutting, hot stamping, flexography, adhesive bonding, screen printing, and other printing processes. For instance, there are uncoated Lexan® Films, and Lexang Graphic films. These are further examples. Lexan® 8040 film, e.g., has superior stiffness, it is highly durable with significant dimensional stability, and it is easily die cut. Lexan® 8030 film, e.g., is UV stabilized. GE offers Lexan® HP (High Performance) Coated Films, e.g., hard coated for toughness such as Lexan® HPW films, which for example, have UV resistance, chemical and abrasion resistance. GE's Lexan® FR Flame Retardant Insulating Films, e.g., have low moisture absorption, excellent dielectric strength and high dimensional stability. Lexan® FR 60, e.g., is clear, and Lexan® FR 700-701, e.g., is opaque black. GE's Valox® Polybutylene Terephthalate Insulating Film, e.g., has excellent electrical properties, and ease of fabrication. GE's Valox® PTX™ Polyester Film, e.g., has excellent electrical properties, and it offers excellent chemical resistance and high tensile strength, available with one or two sides pretreated for better adhesion to ink. Valox® PTX™, e.g., is heat stabilized for lower thermal shrinkage. GE's Ultem® Polyetherimide Film, e.g. has high temperature resistance, low moisture absorption and excellent electrical properties. Ultem® 1000, e.g., is thermoformable and can be heat sealed to a wide variety of metals and thermoplastics.

GE's Lexang polycarbonate sheets are made clear and in colors, in a wide selection of grades and gauges, many with coatings. They are conventionally used for glazing, windows, and skylights etc. These are examples. GE's Lexan® 9034, e.g., uncoated polycarbonate sheet is a standard grade for high impact resistance. GE's Lexan® MR10, e.g., polycarbonate sheet has Margard® II UV and abrasion resistant coating with UV absorbers on both of its sides (for example, conventionally used for vertical glazing). Thus GE specifies that it can not be cold formed (conventionally), stating that it is meant for flat applications only. Paint, adhesives and other materials (such as graffiti) will not adhere to its surfaces without further processing. It for example, offers improved resistance to weathering, and forced entry protection and is backed by a 10 year warranty against yellowing, abrasion resistance, loss of light transmission, breakage and coating failure. GE's Lexan® XL10 polycarbonate Sheet, e.g., is made to be further processed into curved forms; it is thermoformable, cold-formable (e.g., to tight radii), virtually unbreakable, with UV resistant coating on one of its sides; it is backed by a 10 year warranty against yellowing, loss of light transmission and breakage; and it also provides high insulation values. GE's Lexan® Lexigard® Laminates, e.g., are bullet resistant and resistant to other impact (for example, conventionally used for security), it absorbs impact so that it does not shatter, and also resists UV light, and abrasion. GE's Lexan® NU-VIEW® Laminate, e.g., is scratch and abrasion resistant laminate which can simply be peeled off of a substrate it is protecting, for example, for use on Lexan® MR10 sheet and Lexigard® laminates. GE's Lexan® Thermoclear® polycarbonate Sheet, e.g., is multi-walled and translucent (for example, conventionally used for thermal glazing), it can be cold-formed or thermoformed; and it provides resistance to weather extremes, high impact strength, superior energy efficiency, and UV resistance.

E.I. DuPont DeNemours and Company of Wilmington, Del. offers products which might be used to make inventive images. For example, Surlyn® is a line of ionomer resins by DuPont an example of which is 99% ethylene/methacrylic acid copolymers, partial sodium or zinc salt, and less than 5% zinc compounds (some copolymers). Nucrel® is a line of resins by DuPont, an example of which is 91% acid copolymer ethylene and 9% methacrylic acid. Hytrel® by DuPont is a line of flexible polyester elastomers, an example of which is over 90% Butylene/Poly (Alkylene ether) phthalate. Delrin® acetal resin by DuPont may have, for example, more than 97% polyoxymethylene homopolymer; less than 3% stabilizer; and less than 0.005% formaldehyde. Zytel® resins by DuPont have for example, more than 83% polyamide copolymer, less than 16% non regulated proprietary toughener, and less than 1% non regulated lubricants, stabilizers and colorants. Crastin® thermoplastic polyester resins by DuPont, for example, have 99-100% polybutylene terephthalate; and less than 2% lubricants, antioxidants, pigments. Elvax® by DuPont is a line of ethylene-vinyl acetate (EVA) copolymer resins, e.g., ranging in percentages of vinyl acetate from 9% to 40%, their transparency increases with greater percentages of vinyl acetate, and these thermoplastics are inherently flexible, resilient and tough. Elvax® resins can be used alone or as a stabilizer to alter the properties of other monomers and polymers. Elvax® resins might be colored, filled, foamed and/or cross-linked (e.g., with peroxide cross-linking agents such as dicumyl peroxide). For example, a number of Elvax® grades such as Elvax® 250 have more than 99.7% ethylene-vinyl acetate copolymer and 0-0.3% vinyl acetate. And for example, a number of Elvax® grades such as Elvax®D 565 have more than 99.7% ethylene-vinyl acetate copolymer; less than 0.1% vinyl acetate; and 0-0.5% processing aids. DuPont's 20 Series are specialty polyethylene resins, e.g., with low density, ideally suited for injection blow-molded bottles, injection molded closures and extruded tubing.

DuPont also offers polymer films for use in inventive images. Examples are DuPont's Mylar® polyester films, e.g., which have clarity, easy machinability, strength, high and low temperature resistance, and printability. For example, they come plain or metallized, heat shrinkable and/or coated for barrier, printing or sealing. DuPont's Melinex® polyester films have for example, excellent printability, and they stay strong over a wide range of temperature, humidity and processing conditions. DuPont's Clysar® polyolefin shrink films are for example, tough and thin. DuPont's Sclairfilm® polyolefin films are for example, conventionally used for laminating and/or in multilayer structures. For example, they offer clarity, toughness and durability; excellent heat-seal, hot-tack strength, resistance to pinholing and stress-flex. DuPont's Dartek® nylon films are for example, tough and clear and they thermoform at lower temperatures; provide a good barrier to oxygen; and are resistant to oils, grease and moisture.

Bayer Corporation of Pittsburgh, Pa. offers products which can be used to make inventive images such as these examples. Bayer offers Lustran® ABS 226 resin (acrylonitrile butadiene styrene), an example of which has the Chemical Name: Methyl Methacrylate/Acrylonitrile/Butadiene/Styrene polymer, e.g., it may have below 0.25% residual styrene monomer; below 0.01% residual acrylonitrile monomer; and below 0.4% residual methyl methacrylate. Bayer's Lustran® SAN 31, Lustran® SAN 29 and Lustran® SAN Sparkle resins are all styrene acrylonitrile copolymer, e.g., all three may have greater than 1.0% styrene acrylonitrile copolymer, below 0.25% residual styrene monomer and below 0.01% residual acrylonitrile monomer. Bayer's Makrolong polycarbonate resin, examples of which are Chemical Name: Bisphenol A Polycarbonate, e.g., made with percentages of Bisphenol A Polycarbonate, ranging greater than 95-99%; and with percentages of Methylene Chloride ranging less than 3 ppm.

Bayer's Apec® high heat polycarbonate resins may be used to make inventive images, examples follow. Bayer offers Apec®, for example, Chemical Name: modified Bisphenol A Polycarbonate, e.g., may have greater than 95% modified Bisphenol A Polycarbonate made using a trade secret registered in New Jersey as NJTSRN (31765300002)-8831P; an as needed percentage of Bisphenol A Polycarbonate made using a trade secret registered in New Jersey as NJTSRN (31765300002)-8136P; less than 1% carbon black; and less than 3 ppm Methylene Chloride. Bayer offers Apec® modified Bisphenol A Polycarbonate made as the previous Apec®, but for example, with the added ingredient of an as needed percentage of Bisphenol A Polycarbonate. Bayer offers Apec®, which for example, is a modified Polycarbonate, e.g., with greater than 95% of a trade secret ingredient registered in New Jersey as NJTSRN (31765300002)-8831P; an as needed percentage of Bisphenol A Polycarbonate; and less than 5 ppm Methylene Chloride. Bayer offers Apec®, for example, Chemical Name: Bisphenol A Polycarbonate, e.g., that has greater than 90% of a trade secret ingrediant registered in New Jersey as NJTSRN (31765300002)-8831P; and less than 3 ppm Methylene Chloride. Bayer offers Apec®, for example, modified Polycarbonate, e.g., that has a maximum of 80% Bisphenol A Polycarbonate; a minimum of 20% modified Bisphenol A Polycarbonate NJTSRN (31765300002)-8831P; and less than 3 ppm Methylene Chloride. Bayer also offers Apec® modified Polycarbonate, e.g., that has a minimum of 70% modified Bisphenol A Polycarbonate NJTSRN (31765300002)-8831P; and less than 5 ppm Methylene Chloride.

ICI Acrylics Inc. of Cordova Tennessee offers acrylic resins with Poly Methyl Methacrylate (PMMA). Among their products are Lucite® Acritherm® HS acrylic polymers, e.g., principally made of PMMA and proprietory ingrediant. And Lucite® SuperTuf ST Series acrylic, Elvacite® acrylic and Diakon®), e.g., which are all principally made of PMMA. ICI Acrylics also offers a variety of acrylic sheets which may be used in inventive images under the names Lucite® and Perspex®, which according to their technical staff, are all for example, made with 90% or a greater amount of PMMA made from the monomer methyl methacrylate or (MMA). These acrylic products all come in a variety of grades which can give inventive images different properties. For example, Lucite® acrylic resins are polymers or copolymers of methyl methacrylate or other acrylic monomers. The PMMA in ICI's acrylic products might for example be copolymerized with ethyl acrylate (EA); Butyl acrylate (nBA); or methyl acrylate (MA). Mixtures of these ingredients in different proportions (e.g., along with stabilizers such as a chain terminator; heat stabilizers; toners; ultra violet light stabilizers, ultra violet light absorbers; etc.) for example, give ICI's acrylics different properties which are useful in making inventive images, such as optical qualities, and strength. As examples, grades of Perspex® acrylic are available in transparent, translucent and opaque colors; grades are available which can withstand medium and high heat; special ultraviolet light absorbing and ultraviolet light transmitting grades are available; grades are available with different processing capabilities e.g., melt flow rates; different grades differ in impact strength, etc. For instance, examples of Perspex® might be made of greater than 99% poly(methyl methacrylate/ethyl acrylate). Other examples of Perspex® might be made of 100% impact modified methacrylate polymer blend. Lucite® 6751 acrylic resin is for example, made of poly (methyl methacrylate). Grades of Lucite® SuperTuf are for example, made so that they have enhanced impact strength and increased heat properties. Grades of Lucite® Acritherm® HS for example, have enhanced weatherability. There ae also grades of Lucite® acrylic bead resins.

Among polymer sheets offered by Elf Atochem are Implex®, Tuffak® polycarbonate sheet, Plexiglas® (R) G acrylic sheet, Plexiglas® (R) MC acrylic sheet. For instance, Implex® (R) impact acrylic sheet, e.g., may be made of 99.5% minimum P(EA/MMA); acrylic copolymer (no percentage available); and 0.5% maximum methyl methacrylate. Tuffak® (R) plastic sheet, e.g., may be made of 100% Bisphenol-A polycarbonate polymer. Plexiglas® (R) G acrylic sheet, e.g., may be made of a minimun of 98.5% P(MMA) and a maximum of 1.5% methyl methacrylate. Plexiglas® (R) MC acrylic sheet, e.g., may be made of a minimum of 99.5% P(EA/MMA), and less than 0.5% of methyl methacrylate.

Cyro Industries of Rockaway, N.J. offers a variety of polymer sheets which can be used to make inventive images, such as these examples. Cyrolite® is for example, an acrylic multipolymer, e.g., made of a mixture of 0-4% titanium dioxide;

0-2% barium sulfate; 0-2% 2,6-(Di-t-butyl)-p-cresol. Cyrolon® is for example, continuously manufactured polycarbonate sheet, e.g., recommended for applications requiring its high impact resistance and high service temperature, but it also provides protection against weathering. Solar energy control transparent colored Cyrolon® sheets might reduce glare and solar energy transmittance. Cyrolon® AR polycarbonate sheets, e.g., have an abrasion and mar resistance coating on one or both sides. Screen printing may for example be done on Cyrolon® ZX and on the uncoated side of Cyrolon® AR1. HP™ multipolymer sheets for example, contain acrylic polymer and are continuously manufactured.

Cyro offers many kinds of Acrylite® polymethylmethacrylate sheets, such as these examples. Acrylite® GP sheet, e.g., a cell-cast acrylic sheet available in various sizes and thicknesses, colorless as well as in transparent, translucent and opaque colors. Acrylite® OP-1 acrylic sheet, e.g., is similar to Acrylite® GP, but it transmits more UV light. Acrylite® OP-2 acrylic sheet, e.g., can filter out 98% of UV light (more specifically, for example, Acrylite® OP-2 acrylic sheet may filter out 100% of the UV wavelengths below 390 nm, and 98% between 390 and 400 nm), and examples of its conventional uses are for framing, exhibition and display purposes, as well as for conventional windows and skylights. Acrylite® OP-4 acrylic sheet, e.g., may transmit 70% or more of the available UV light in the 340 nm range. Acrylite® GP P-95 acrylic sheet, e.g. may have a matte finish. Acrylite® GP fluorescent acrylic sheet is available in many colors and in various grades, such as these. Acrylite® GP F and Acrylite® GP FL, e.g. are recommended for indoor use but Acrylite® GP FL has longer fluorescence, greater thermoformability, and uniform coloration on sheet surfaces and edges. Acrylite® GP FLW, e.g., is cell cast, it is weatherable so recommended for outdoors. Acrylite® 237, e.g., is a break resistant transparent acrylic sheet made for noise control on highways. Acrylite® BRT and BRT GAR, e.g., are colorless and transparent acrylic sheets that are UL rated Level 1 bullet resistant glazing material. Acrylite® AR and GAR acrylic sheets, e.g., have an abrasion and chemical resistant coating on one or two sides, for example, Acrylite® AR has the 3M 906 abrasion resistant coating under license from 3M Company. Additionally, Acrylite® AR OP-3 and GAR OP-2 sheets, e.g., provide UV light protection, and Acrylite® AR-P99 sheet, e.g., minimizes glare. Acrylite® 249, e.g., is a cross linked acrylic sheet which is considered aerospace grade so it is certified to meet or exceed Military Specification MIL-P-8184E as a Type 1, Class 2 material, a specification which certifies its optical quality, and its superior craze resistance, heat resistance and water absorption. Acrylite® GMS acrylic sheet, e.g., is aerospace grade certified to meet or exceed Military Specification MIL-P-5425, "Plastic Acrylic Sheet Heat Resistant." Acrylite® ALLUSION acrylic sheets, e.g., come in a variety of lace patterns. Acrylite® FF, e.g., is continuously manufactured acrylic sheet, with the same transparency, light weight, weather resistance and rigidity as Acrylite® GP, but at a more economical price. Acrylite® FF, e.g., is available in different thicknesses, colorless as well as in transparent and opaque colors, some in high gloss too. Acrylite® FF P-99 acrylic sheet, e.g., has a matte or non glare finish that can be painted or silkscreened and is conventionally used for picture-framing and display windows. Acrylite® OP-3 and OP-3 P99 acrylic sheets, e.g., were developed for picture framing and they offer UV light filtering, light weight, and fabrication ease. Acrylite® OP-3 P99, e.g., has a matte or non glare finish. Acrylite® OP-3, e.g., is formulated with UV light absorbers so that, for example, it may absorb more than 98% UV radiation below 400 nm. Acrylite® FFV acrylic sheet, e.g., has a medium grain texture and is conventionally used for outdoor patio furniture. Acrylite® FFX acrylic sheet, e.g. has a decorative stippled texture and is conventionally used to make cutting boards and chair mats. Acrylite® FF OPTICAL GRADE acrylic sheet, e.g., has a high level of optical purity, low biofringe, and exact dimensional specifications, and examples of its uses are for optical data storage, lenses, mirrors, and light management applications.

Cyro also offers a wide range of polymers in pellet or powder form called molding compounds for use in inventive images, such as these examples. Cyrolite® compound, e.g., is an MMA/styrene/ethyl acrylate terpolymer with an added impact modifier. For example, Cyrolite® G-20 is characterized by extra toughness, high rigidity, and good environmental stress craze resistance. Cyrolite® G-20 HIFLO®, e.g., has these same qualities, with less environmental stress craze resistance, but with excellent processing characteristics. Cyrolite® GS-90, e.g., also has excellent processing characteristics. For instance grades of Cyrolite® are conventionally used for molded applications. XT® polymer compound, e.g., is an MMA/styrene/acrylonitrile terpolymer with an added impact modifier, with slightly better chemical resistance than Cyrolite®. Neither Cyrolite® nor XT® are typically weatherable. Grades of XT® polymer such as XT® polymer 250, 255, 375 and X800RG, e.g., have good to extra toughness, high to maximum rigidity, and excellent environmental stress craze resistance. Acrylite® polymers are for example, a wide range of grades of acrylic molding compounds, e.g., made of polymethyl-methacrylate or PMMA (some of which are resistant to UVA and UVT to varying degrees). They are available colorless and in a wide range of transparent, translucent and opaque colors. For example, Acrylite® "S" compounds offer maximum service temperature stability, for instance Acrylite® S-10 and S-11 also offer increased toughness and minimum cycle time. Acrylite® H-15 and H-12 compound grades, e.g., offer improved flow properties for Class 3 (Grade 8) materials, these compounds are appropriate for injection molding and extrusion applications. Among the conventional uses of Acrylite® H-15 are for automotive lenses, and sheets and lighting panels. Among the conventional uses of Acrylite® H-12 are for automotive and optical lenses. Acrylite® M-30 and L-40 compounds, e.g., are improved flow grades offering easier molding and extrusion with minimal loss in heat resistance. Grades of Acrylite Plus®, e.g., are impact modified, weatherable, acrylic based compounds, conventionally used for molding and extrusion, which offer consistent processing characteristics, excellent weatherability (some grades have UVA resistance) and excellent blending characteristics (for example, blended with grades of Acrylite® for desired qualities in processing and in the resultant polymer). Different grades of Acrylite Plus®, e.g., have differing balances of impact resistance and melt flow. Acrylite Plus® may be colorless or colored in a wide range of transparent, translucent and opaque colors. For instance, among the conventional uses of Acrylite Plus® H-16 and H-17 M are for automotive lenses and glazing. Among the conventional uses of Acrylite Plus® H-17 D and H-17 P are for molded applications, and Acrylite Plus® H-17H is for medical devices. Cyrex® are for example, opaque acrylic-polycarbonate alloys. For example, Cyrex®200-8000 alloy may have better processability, colorability and impact strength than Cyrex® 200-8005 alloy which may have superior toughness, alcohol/lipid resistance and GAMMA radiation resistance.

Plaskolite Inc in Columbus, Ohio offers polymer in pellets and sheet form for use in inventive images. Examples are their Optix® acrylic pellets, and polymer sheets under the names;

Optix®, Duraplex™, and Fabback®. For instance, Optix® acrylic (PMMA) resins offer excellent weatherability and come in a variety of grades, such as grades for particular types of conventional processing (like injection molding and extrusion grades, and an unlubricated grade), as well as UV absorbing and UV transmitting grades. Plaskolite also offers Optix® acrylic (PMMA) colorless crystal clear sheet, e.g., which can offer superior thermoforming, bending and flame polishing; some impact resistance; and it is also weather resistant and non yellowing. Duraplex™ impact modified acrylic (PMMA) sheet, is for example, 10 times as strong as regular acrylic, e.g., used for cars, signs, displays and skylights. This is available in a wide range of forming temperatures and short forming cycles, and in examples with various blends of impact modified materials. Roll stock of acrylic (PMMA) and roll stock of Duraplex™ impact modified acrylic (PMMA) are available, e.g., in general purpose, medium and high impact grades, in various thicknesses. Optix® Greene Edge acrylic (PMMA) sheet, Temper Elite™ looks for example, like glass. Optix® Colored acrylic (PMMA) sheet, e.g., has outstanding durability and weatherability and is conventionally used for purposes such as skylights and displays. This impact modified colored sheet may for example, be an alternative to polycarbonate. Optix® Patterned Acrylic (PMMA) and polystyrene (PS) sheet, e.g., is non yellowing and weather resistant, with anti-sag characteristics. Optix® acrylic (PMMA) abrasion resistant coated sheet, e.g., is available in acrylic or polycarbonate mirror; in clear and colors; scratch, abrasion or stain and solvent resistant. Plaskolite also offers Optix® acrylic (PMMA) security formed mirrors. Their Fabback® acrylic (PMMA) mirrored sheet is offered in various colors, and with a variety of substrates, such as PETG and polycarbonate. They also offer polystyrene (PS) sheet in clear and non-glare (anti-reflex) pattern. This is for example, available with a UV additive to filter out damaging wavelengths.

Ciba Geigy Corporation of Tarrytown, N.Y. offers products which can be used to make inventive images, such their epoxide liquid resin, Araldite GY 6010, e.g., made of Phenol, 4,4'-(1-methylethylidene)bis-, polymer with (chloromethyl) oxirane, common name Bisphenol A Diglycidyl ether polymer. Ciba Geigy offers a wide range of expoy hardeners (e.g., modified aliphatic amines, cycloaliphatic amines, aromatic amines, polyamides, and anhydrides) which along with any other ingredients desired (such as matting agents and accelerators), can be used to make polymer with different properties in inventive images.

The Dow Chemical Company of Midland, Mich. makes products which can be used in inventive images such as Calibre® (polycarbonates), Styron® (polystyrene), Isoplast® polyurethane and Tyril® SAN styrene-acrylonitrile copolymers. For instance, Calibre® (R) 301 polycarbonate resin FC660051 with product code 14164 may for example be comprised of 97-99% polycarbonate; 1-3.0% cadmium coumpounds; and 1-3.0% selenium counpounds. Styron®478 Natural Polystyrene with product code 10127, e.g., is comprised of 94-99% styrene-butadiene copolymer and a maximum of 5% mineral oil. Styron® 613 clear polystyrene with product code 17055, e.g., is comprised of 100% polystyrene. Tyril® 100 crystone (product code 43943), and Tyril® 990 (product code 10894), e.g., are both crystone styrene acrylonitrile resins comprised of 99-100% styrene-acrylonitrile copolymer, and 0-1% epoxidized soybean oil. Dow's Isoplast® 301 polyurethane, e.g., is made of more than 98% polyurethane from methylene diphenyl diisocyanate, 1,6-hexanediol, cyclohexanedimethanol and polytetramethylene glycol; and less than 2% stabilizers.

Ashland Chemical Company of Dublin, Ohio offers the unsaturated polyester casting resin, MR 11109, e.g., 62-67% (by weight) polyester resin and 35% (by weight) styrene. This resin can for example, be used in polymerization reaction mixtures to make transparent polymer with a light color. Ashland suggests this resin be catalyzed with about 1.25% Lupersol® DDM-9 MEKP (made by Elf Atochem). Huntsman Corporation of Chesapeake, Va. offers polystyrene Crystal products which can be used to make inventive images. Examples are, Huntsman's general purpose polystyrene (Crystal Polystyrene) #20, 50, 201, 202, 203JR, 207, 213, 817, 879, 1101, C2193B, G2, G18, G200, P8051, R5, R100, R130, R300, R700, T-50, T-738, T-745, T-817, e.g., made of 94-100% by weight polystyrene; 0-6% by weight Mineral oil and less than 1% by weight external and internal lubricants. Resinall Corp. in Severn, N.C. makes monomers for use in making polymer in inventive images.

Union Carbide Corporation of Danbury, Conn. offers monomers and polymers for use in inventive images. An example is polyethylene. For instance, Union Carbide's DFDA-7042 NT 7 Unipol (R), e.g., a low-density polyethylene resin modified with antioxidant. This product may for example be made with the base resin, 1-Butene, polymer with ethene. Neste Oy of Hamina, Finland and their division, Neste Resins North America Corporation in Eugene, Oreg. make resins which can be used to make inventive images. Examples are their MF resins which are melamine-formaldehyde.

Ingredients that are capable of conductivity, such as the examples provided herein, are preferred for use in inventive images.

The following products may be used to make inventive images. Any of these or others herein that are capable of conducting ions may be used for this feature in inventive images: acid copolymer ethylene (preferred); ethylene/methacrylic acid copolymers (preferred); Acrylic acid; Poly(sodium 4-styrenesulfonate) (preferred); 2-(Sulfooxy)ethyl methacrylate, ammonium salt (preferred); Poly(diallyldimethylammonium chloride) (preferred); Poly(allylamine) (preferred); Poly(maleic acid-co-olefin), sodium salt (preferred); Poly(acrylic acid) (preferred); Poly(acrylic acid, sodium salt) (preferred); Poly(acrylic acid), sodium salt (preferred); Polystyrene-block-poly(ethylene-ran-butylene)-block-polystyrene, sulfonated (preferred); Poly(acrylic acid-co-maleic acid) (preferred); Poly-DL-aspartic acid, sodium salt (preferred); Poly(propylene glycol) bis(2-aminopropyl ether); Poly(1,4-butanediol/neopentyl glycol-alt-adipic acid); Poly(ethylene glycol) 4-nonylphenyl 3-sulfopropyl ether, potassium salt; Poly(3,3,4,4-biphenyltetracarboxylic dianhydride-co-1,4-phenylenediamine), amic acid (preferred); Poly(4-vinylphenol) Synonyms: [poly(4-hydroxystyrene)] (preferred); Poly(acrylamide-co-acrylic acid) (preferred); Poly(acrylic acid), potassium salt (preferred); Poly (acrylic acid), sodium salt-graft-poly(ethylene oxide) (preferred); and Poly(acrylic acid-co-acrylamide), potassium salt (absorbs many times it weight in aqueous fluids) (preferred); and the like, as well as: [2-(acryloyloxy)ethyl]-trimethylammonium methyl sulfate; [2-(methacryloyloxy)ethyl] trimethylammonium chloride; [2-(methacryloyloxy)ethyl] trimethylammonium methyl sulfate; 2-acrylamido-2-methyl-1-propanesulfonic acid; (3-(methacryloylamino)propyl) trimethylammonium chloride; beta-methyl tricarballylic acid; tricarballylic acid; endo-bicyclo(2,2,2)oct-5-ene-2,3-dicarboxylic anhydride; 1-cyclopentene-1,2-dicarboxylic anhydride; 2,3-dimethylmaleic anhydride; 2,3-diphenylmaleic anhydride; 2-dodecen-1-ylsuccinic anhydride; exo-3,6-expoxy-1,2,3,6-tetrahydrophthalic anhydride; maleic anhydride; methyl-5-norbomene-2,3-dicarboxylic anhydride; citraconic anhydride; 5-norbornene-endo-2,3-dicarboxylic anhydride; aconitic anhydride; 1,2,3,6-tetrahydrophthalic anhydride; bromomaleic anhydride; 3,4,5,6-tetrahydrophthalic anhydride; dichloromaleic anhydride; 1,4,5,6,7,7-hexachloro-5-norbomene-2,3-dicarboxylic anhydride; and the like.

The following are further examples of polymeric reactive reagents, catalysts and stabilizers from Aldrich Chemical, insoluble crosslinked microparticles which can serve as adsorbents, catalysts, and solid phase supports, and which can promote oxidation, reduction, addition and substitution reactions. Their insolubility enables them to be easily removed from the polymerization reaction mixture if desired. Examples of such products for absorption/inclusion are as follows: poly(styrene-co-divinylbenzene), amine functionalized; poly(styrene-co-divinylbenzene); poly(4-ethylstyrene-co-divinylbenzene); poly(styrene-co-divinylbenzene); molecular sieves, organophilic (ABSCENTS® 3000 by UOP); Poly[(dibenzo-18-crown-6)-co-formaldehyde]; β-Cyclodextrin/epichlorohydrin copolymer; Amberlite® XAD-7 nonionic polymeric adsorbent (Amberlite® by Rohm and Haas Co.); Amberlite® XAD-4 nonionic polymeric adsorbent; Amberlite® XAD-2 nonionic polymeric adsorbent; Boric acid gel; and the like.

Photoinitiators might be used to form polymer in inventive images. One or more photoinitiators might be used in a single PRM, e.g., with or without the addition of one or more light stabilizers (such as ultraviolet light stabilizers or hindered amine light stabilizers). For instance, photoinitiators might be free radical or cationic; liquid or solid; and clear, pigmented or white. Examples of photoinitiator classes are Acetophenone, Benzil/Benzoin; Benzophenone; Cationic; Thioxanthone; and others. Photoinitiators can also fall into these catogories: Benzoin ethers; Benzophenones; Thioxanthones; Ketals; Hydroxy acetophenones; Phosphine oxide; Titanocenes; Morpholino-substituted acetophenones and Bapo. As an illustration, photoinitiators in powder form might be dissolved in a small amount of monomer and then added into the rest of the PRM, whereas liquid photoinitiators might be added directly into the entire quantity of PRM. Among examples of photoinitiators are: benzoin and benzoin ethers (preferred) (among the earliest patented photoinitiators, e.g., U.S. Pat. Nos. 2,367,661; 2,367,670; 2,413,973; 2,480,749; 2,647,080); Benzophenone (BP) and related compounds with amine are preferred (e.g., offered by Velsicol Chemical Corporation of Rosemont, Ill.); Benzoin isopropyl ether; para-tert-Butyl trichloroacetophenone; α-Hydroxyacetophenone; 2-Hydroxy-2-methylphenyl-1-propanone (HMPP); hydroxycyclohexyl phenyl ketone (HCPK) (preferred); Dialkoxyacetophenones; 2,2-diethoxyacetophenone (DEAP); α-Amino acetophenones; Isopropylthioxanthone (ITX); Chlorinated acetophenone derivatives; benzoyl peroxide (preferred); acylphosphine oxides and related compounds; dimethylethanolamine (DMEA) (preferred); dialkylaminoalkylbenzoates; isopropylthioxanthone (ITX); chlorothioxanthone (CTX); Thioxanthone (TX); Camphoriquinone (preferred); Bisimidazole; aryldiazonium salts; arylsulfonium and aryliodonium salts; diaryliodonium salt; triarylsulfonium salt; photosensitizers such as anthracene, perylene, phenothiazine, xanthone and thioxanthone; Ferrocenium salts; phenylphosphonium Benzophenone salts; benzophenone phosphonium salts; pyrene; anthracene; titanocene complexes; Aryl tert-Butyl Peresters; derivatives of tert-butyl peresters; bis(pentafluorophenyl) titanocene; perfluorinated diphenyl titanocene compounds; Benzil dimethyl ketal (BDMK); acetophenone diethyl ketal (ADEK); 2-hydroxy-2-methyl phenylpropanone (HMPP); 2-methyl-1-[4-(methylthio)phenyl]-2-morpholino propanone-1 (MMMP); 2-benzyl-2-N,N-dimethylamino-1-(4-morpholinophenyl) butanone (BDMB); diphenyl 2,4,6-trimethyl benzoylphosphine oxide (TPO); bisacylphosphine oxides [e.g., as disclosed in U.S. Pat. No. 4,737,593 (1985), European Patent 0,184,095 (1985)]; Michler's ketone (MK), 4,4'-N,N-dimethylamino benzophenone or (4,4'-bis-(N,N-dimethylamino)benzophenone); metal halides, alkyl metal halides, carbocation salts, protonic acids, and halogens; p,p-bis [(triphenylphosphono)methyl] benzophenone salt; 2-methyl-1-[4-(methylthio)phenyl]-2-morpholinopropanone (MMMP); 2-benzyl-2-N,N-dimethylamino-1-(4-morpholinophenyl)butanone (BDMB); 2,4,6-trimethylbenzoyldiphenyl phosphine oxide (TPO); water soluble alkylphenone photoinitiators; diisopropyl peroxydicarbonate; and water soluble photoinitiators, e.g. water compatibility of photoinitiators may be accomplished by introducing ammonium or sulfonate functional groups onto the molocules, such derivatives have been made with thioxanthone, benzophenone, and benzil compounds. Thiosulfate derivatives of acetophenone are a class of water soluble photoinitiators.

Other examples of catalysts for use in images are amine photochemical coinitiators (e.g., amine and copolymerizable amine); crosslinking (curing) agents for epoxides (e.g., aliphatic amine, aromatic amine, anhydride, catalyst and miscellaneous); free radical initiators (e.g., azo, inorganic, organic peroxide); inorganic and organometallic photoinitiators; and organic photoinitiators (e.g., acetophenone, benzil/benzoin, benzophenone, cationic, thioxanthone, miscellaneous).

Additional examples of photo-catalysts, as well as stabilizers which might be used to make polymer in inventive images are as follows from the catologue of Polysciences Inc. Benzoin iso-propyl ether; 4'4-Bis(dimethylamino)benzophenone; Dibutyltin dilaurate; Dicumyl peroxide; 2,2-Diethoxy-2-phenylacetophenone; N,N-Dimethylaminoethanol (DMAE); Nonenylsuccinic anhydride; n-Octenylsuccinic anhydride; 2-Hydroxy-2-methyl-1-phenyl-1-propanone; Nadic methyl anhydride; 4-(2-Hydroxyethoxy)phenyl 2-hydroxy-2-propyl ketone; 2-Methyl-1-[4-(methylthio)phenyl]-2-(4-morpholinyl)propan-1-one; N,N-Bis(2-hydroxyethyl)-4-toluidine (preferred) (accelerator or promoter); Triarylsulfonium hexafluoroantimonate; Triarylsulfonium hexafluorophosphate (preferred); Inhibitor Removal Column; and the like.

Dye photosensitizers may be used as catalysts in forming inventive images. Examples are acridinium, coumarin, cyanine, thiazine, and xanthene, such as these by Aldrich: 4,5-Benzo-5'-methyl-3,3'-Bis(3-sulfoprop)thiamonomethine cyanine OH,(C2H5)3NSALT; chromoxane cyanine R; eriochrome cyanine R, for complexometry; 1,1'-diethyl-2,4'-cyanine iodide; 1,1'-diethyl-4,4'-cyanine iodide; 1,1'-diethyl-2, 2'-cyanine iodide; SULPHON CYANINE BLACK 4 B; sulfon cyanine black BA Extra conc.; sulphon cyanine black BR; aceko cyanine 3 RN New; aceko brilliant cyanine GR; aceko cyanine 3 R Extra; ahcoquinone cyanine green GN; aceko cyanine 5 R Extra; ahcoquinone cyanine green G; acid cyanine blue; ahcoquinone brilliant cyanine green 5 GX; erio cyanine blue; N-Methyl-9-(P-Chlorophenoxycarbonyl)Acridiniun Iodide; cyanine B; 14-Methyl-7-Phenyl-Dibenzo (c,h) acridinium Perchlorate; 2,7-diamino-xanthen-9-one; 2-(3,6-bis-(diethylamino)-9H-xanthen-9-yl)benzoic acid sulfate; 2-bromo-9-xanthenone; 3,6-bis-(2-dimethylamino-ethoxy)-xanthen-one; bis(9-xanthenyl)dimetylsilane; 1,3-bis-(9H-xanthen-9-yl)-urea; N,N'-bis-(9H-xanthen-9-yl)-isophthalamide; tert-butyl 9-xanthenyl ketone; cyclohexanecarboxylic acid (9H-xanthen-9-yl)-amide; 3,6-dihydroxy-xanthen-9-one; 2-(diethylamino)-ethyl 9-xanthenecarboxylate; 3-(3,6-dihydroxy-9H-xanthen-9-yl)-hexachloro-5-norbornene-2-carboxylic acid; 2-(3,6-dihydroxy-9H-xanthen-9-yl)-3,4,5,6-tetrabromobenzoic acid; 2-(3,6-dihydroxy-9H-xanthen-9-yl)-3,4,5,6-tetrachlorobenzoic acid; 9,9-diphenylxanthene; 9,9-diphenyl-4-(triphenylsilyl)xanthene; HOECHST 2495; furan-2-carboxylic acid (9H-xanthen-9-yl)-amide; 4-nitrofluorescein; 3-methoxy-N-(9H-xanthen-9-yl)-benzamide; RCL S12,626-8; 9-(2-(N-methylcarbamoyl)benzyl)xanthen-9-ol; RCL S4,135-2; RCL S4,137-9; xanthene-9-thione; 2',4',5',7'-tetrakis-(acetoxymercuri)-fluorescein; 9H-xanthene-9-carboxylic acid (nitro-(nitro-(xanthen-ylcarbamoyl)-BZ)-PH)-amide; N-(9H-xanthen-9-yl)-acetamide; xanthen-9-ylidene-hydrazine; 2-(9H-xanthen-9-yl)-indan-1,3-dione; 2-(9H-xanthen-9-yl)-malonic acid; (9H-xanthen-9-yloxy)-acetic acid; (9H-xanthen-9-ylsulfanyl)-acetic acid; 7-acetamido-3,4-benzocoumarin; 6-acetamidocoumarin; 7-acetoxy-6-allyl-4,8 dimethylcoumarin;7-acetoxy-3-(benzamido) coumarin; 3-acetyl-6-bromocoumarin; 3-acetyl-7-diethylamino-chromen-2-one; 8-acetyl-7-hydroxy-4-methyl-chromen-2-one; 4-aminocoumarin; benzoic acid 4-methyl-2-oxo-2H-chromen-7-yl ester; benzo[c]chromen-6-one; (12,12')bi(naphtho(2,3-c)chromenyl)-6,6'-Dione; 3-benzamido-8-methoxycoumarin; (12,12')Bi(naphtho(2,3-c)chromenyl)-6,6'-Dione; acetic acid HO-tetramethyl-(oxo-2H-chromen-yloxy)-decahydro-naphthalen-YL ester; 1-allyl-4-hydroxy-3-methoxy-7,8,9,10-tetra hydro-benzo(c)chromen-6-one; 4-benzyloxy-3-methoxy-7,8,9,10-tetrahydro-benzo(c)cbromen-6-one; 9-(2-BR-ET)-8-trifluoromethyl-oxa-3A-AZA-benzo(de)anthracen-10-one, hydrobromide; 9-Bromo-8-isopropyl-2,3,5,6-tetrahydro-1H,4H-11-oxa-3A-aza-benzo(d,e)anthracen-10-one; 9-Bromo-8-methyl-2,3,5,6-tetrahydro-1H,4H-11-oxa-3A-aza-benzo (de)anthracen-10-one; N,N'-(2-bromo-6-methyl-phenylene) bis(4-methylcoumarin-7-yl carbamate), isomers; 9-chloromethyl-8-methyl-2,3,5,6-4H-1H,4H-11-oxa-3A-aza-benzo(d,e)anthracen-10-one; 2-bromo-benzoic acid; 6-bromo-3-(3-(4-bromo-phenyl)-acryloyl)-chromen-2-one; 6-amino-chromen-2-one; 6-bromo-3-(2,3-dichlorophenyl-carbamoyl)-coumarin; 7-allyloxy-4,8-dimethylcoumarin; 6-bromo-3-(2,5-dichlorophenylcarbamoyl)-coumarin; 3-(2-bromoethyl)coumarin; 6-bromo-3-(3-(2-methoxy-phenyl)-acryloyl)-chromen-2-one; 7-allyloxy-4-methyl-chromen-2-one; 6-bromo-3-(furan-2-yl-acryloyl)-chromen-2-one; 3-bromo-6-nitrocoumarin; 6-bromo-3-(morpholine-4-carbonyl)-chromen-2-one; 4-chloromethyl-6-methylcoumarin; 6-bromo-3-(3-(3-nitro-phenyl)-acryloyl)-chromen-2-one; 5-bromo-2-((2-oxo-2H-chromene-3-carbonyl)-amino-benzoic acid; 7-(butoxycarbonylmethoxy)-3-(2-diethylaminoethyl)-4-methylcoumarin; 3-chlorocoumarin; butyric acid 4-methyl-2-oxo-2H-chromen-7-yl ester; 4-coumarinyl N-(3-acetylphenyl)carbamate; 3-(2-chlorobenzylideneamino)-6H-dibenzo(B,D)pyran-6-one; 7-(2,2-diethoxy-ethoxy)-chromen-2-one; 4-coumarinyl N-(4-fluoro-3-nitrophenyl) carbamate; 4-cyano-7-diethylamino-3-(methoxycarbonylacetyl)coumarin; 7-diethylamino-3-hydroxymethyl-4-methyl-chromen-2-one; 7-diethylamino-3-(1-methyl-1H-benzoimidazol-2-yl)-chromen-2-one; 7-diethylamino-3-(1-methyl-1H-benzoimidazol-2-yl)-chromen-2-one; 7-diethylamino-2-oxo-2H-chromene-3-carboxylic acid ethyl ester; 3,4-dihydroxy-7,8,9,10tetrahydro-benzo(c)chromen-6-one; 3,4-dimethoxy-1-oxiranylmethyl-7,8,9,10-tetrahydro-benzo(c)chromen-6-one; 7,8-dihydroxy-chromen-2-one; 5,7-dihydroxy-4-methylcoumarin monohydrate; 4,6-dimethylcoumarin; 3,4-dimethoxy-7,8,9,10-tetrahydrobenzo(c)chromen-6-one;

7-(dimethylamino)-3,4-benzocoumarin; 4,8-dimethyl-7-hydroxycoumarin; 3-(2,4-dinitro-phenyl)-6-nitrochromen-2-one; 2-(1,3-dioxoisoindol-2-yL)-3-PH-propionic acid 4-me-2-oxo-2H-chromen-7-yl ester; 3-ethoxycarbonyl-2-(3-oxo-3H-benzo(f)chromen-2-yL)-chromenylium, perchlorate; 4-hydroxy-3-phenylcoumarin; ethyl 4-hydroxy-8-methyl-coumarin-3-carboxylate; 7-hydroxy-4-phenylcoumarin; 3-(1-(4-ethylphenyl)ethyl)-4-hydroxycoumarin; 4-fluoro-benzoic acid; furan-2-carboxylic acid 4-methyl-2-oxo-2H-chromen-7-yL este; 7-HO-6-(3,4,5-trihydroxy-6-hydroxymethyl-tetrahydropyran-2-yloxy)-chromen-2-one; 8-HO-6-(3,4,5-trihydroxy-6-hydroxymethyl-tetrahydropyran-2-yloxy)-chromen-2-one; 4-hydroxy-3-methoxy-7,8,9,10-tetrahydrobenzo(c)chromen-6-one; 4-hydroxy-6-methylcoumarin; 7-hydroxy-4-methyl-2H-naphtho(1,2-b) pyran-2-one; 6-hydroxy-3,4-benzocoumarin; 7-hydroxy-3,4-benzocoumarin; 3,3'-(5-indanylmethylene)bis(4-hydroxycoumarin); 3-Methyl-but-2-enoic acid; 3,3'-(4-isopropylbenzylidene)bis(4-hydroxycoumarin); 1-(9-ACO-2-oxo-2H-furo(2,3-h)chromen-8-yL)-1-ME-ET ESTER; ME-BUT-2-enoic acid dimethyl-(ME-BUT-ENOYL OXY)-oxo-pyrano(2,3-f) chromen-YL ester; 4-methoxy-benzoic acid 4-methyl-2-oxo-2H-chromen-7-yL ester; 6-methoxy-2-(3-oxo-3H-benzo(f)chromen-2-yL)-chromenylium, perchlorate; 6-methoxy-2-oxo-2H-chromene-3-carboxylic acid (4-bromo-benzylidene)-hydrazide; 3-(1-methyl-1H-benzoimidazol-2-yL)-chromen-2-one; 3-(1-methyl-1H-benzoimidazol-2-yL)-chromen-2-one; 3-methyl-chromen-2-one; 4-methyl-7-coumarinyln-(3-acetylphenyl)carbamate; 4-methyl-7-coumarinyl N-(3-chloro-4-fluoro phenyl)carbamate; 4-methyl-7-coumarinyl N-(4-chloro-2-methoxyphenyl)carbamate; 4-methyl-7-coumarinyl N-(4-chloro-2-nitrophenyl)carbamate; 4-methyl-7-coumarinyl N-(2,5-dimethoxyphenyl)carbamate; 4-methyl-7-coumarinyl N-(2-methyl-5-nitrophenyl)carbamate; 4-methyldaphnetin; 6-methyl-8H-1,3-dioxolo(4,5-h)(1)benzopyran; methyl 5-hydroxy-4-methylcoumarin-6-carboxylate; 4-methyl-2-oxo-2H-1-benzopyran-7-yL N-(4-fluoro-3-nitrophenyl)carbamate; 8-methyl-2,3,5,6-tetrahydro-1H,4H-11-oxa-3A-aza-benzo(d,e)anthracen-10-one; naphthalene-1-carboxylic acid N'-(3-oxo-benzo(f)chromene-2-carbonyl)-hydrazide; 6-nitrocoumarin; (2-nitro-phenyl)-acetic acid 2-oxo-2H-chromen-3-yL ester; 3-oxo-3H-(2,3')bi(benzo(f)chromenyl)-4'-ylium, perchlorate; 4-((2-oxo-2H-chromene-3-carbonyl)-amino)-benzoic acid; 2-oxo-2H-chromene-3-carboxylic acid (4-bromo-benzylidene)-hydrazide; 2-oxo-2H-chromene-3-carboxylic acid(2-CL-7-methyl-quinolin-3-ylmethylene)-hydrazide; 2-oxo-2H-chromene-3-carboxylic acid(3,4-dimethoxy-benzylidene)-hydrazide; 2-oxo-2H-chromene-3-carboxylic acid hydrazide; 2-oxo-2H-chromene-3-carboxylic acid(2-hydroxy-benzylidene)-hydrazide; (2-oxo-2H-chromen-7-yloxy)-acetaldehyde; 10-oxo-2,3,5,6-4H-1H,4H,10H-11-oxa-3A-aza-benzo(d,e)anthracene-9-carbaldehyde; 10-oxo-1H,4H,10H-11-oxa-3A-aza-benzo(d,e)anthracene-9-carboxylic acid methyl ester; oxo-(10-oxo-oxa-3A-aza-benzo(d,e)anthracen-9-yL)-acetic acid ethyl ester; 9-oxo-1,2,4,5-tetrahydro-3H-10-oxo-2a-azaaceanthrylene-8-carboxylic acid; 2-phenyl-benzo(f)chromen-3-one; 6-(2,2,2-trifluoroacetamido)-3,4-benzocoumarin; 3,3',3'',3'''-(1,4-phenylenedimethylidyne)tetrakis(4-hydroxycoumarin); 3-PH-2-(toluene-4-sulfonylamino)-propionic acid 4-ME-2-oxo-2H-chromen-7-yl ester; propionic acid 4-methyl-2-oxo-2H-chromen-7-yL ester; 2,3,5,6-tetrahydro-1H,4H-11-oxa-3A-aza-benzo(d,e)anthracen-10-one; 4,5,7,8-tetramethyl-5,6,7,8-tetrahydro-1-oxa-8-aza-anthracen-2-one; 3,3'-(3,4,5-trimethoxybenzylidene)bis(4-hydroxycoumarin); 9-(2,5,5-trimethyl-cyclohex-1- enyhnethoxy)-furo(3,2-G)chromen-7-one; 6-(2,5,5-trimethyl-cyclohex-1-enylmethyl)-chromen-2-one; 2,2'-Bis(5,6-Dihydro-4H-1,3-Thiazine) Dihydrochloride; 2-(4-Chloro-Benzenesulfonyl)-3,6-Dihydro-2H-(1,2)Thiazine 1-Oxide; Thiazine Red R; 5,6-Dihydro-4H-(1,3)thiazine-2-THIOL; 4,5-Dimethyl-2-(2-Nitro-Benzenesulfonyl)-3,6-Dihydro-2H-(1,2)Thiazine 1-Oxide; 6-Methyl-5,6-Dihydro-4H-(1,3)Thiazine-2-Thiol; 4-Methyl-3-Phenyl-4H-Benzo(1,4)Thiazine-2-Carboxylic Acid; Tetrahydro-3-Methyl-2H-1,3-Thiazine-4-Carboxylic Acid Monohydrate; and the like.

These are further examples of catalysts offered by Aldrich: 2-Butanone peroxide Synonyms: (methyl ethyl ketone peroxide); 2,2,4-trimethyl-1,3-pentanediol diisobutyrate; 2,4-Pentanedione peroxide; Thioxanthen-9-one photoinitiator; Methyl benzoylformate Synonyms: (methyl phenylglyoxylate) photoinitiator; Diphenyl(2,4,6-trimethylbenzoyl)phosphine oxide/2-hydroxy-2-methylpropiophenone, e.g., 50/50 blend; Benzophenone/1-hydroxycyclohexyl phenyl ketone, e.g., 50/50 blend; 4-tert-Butyl-2,6-dimethylacetophenone; -(Benzene)tricarbonylchromium; 1,1-Bis(tert-butylperoxy) cyclohexane; 1-Chloro-4-propoxy-9H-thioxanthen-9-one; 1,1-Bis(tert-butylperoxy)-3,3,5-trimethylcyclohexane; Ethyl 4-dimethylaminobenzoate; 2,2-Bis(tert-butylperoxy)butane; 2,4-Diethyl-9H-thioxanthen-9-one; (Cumene)cyclopentadienyliron(II) hexafluorophosphate photoinitiator; 2,2'-Azobisisobutyronitrile (preferred); 1,1'-Azobis(cyclohexanecarbonitrile) (preferred); 4,4'-Azobis(4-cyanovaleric acid) (preferred); and the like as well as combinations of these.

Among examples of preferred accelerators are: NNN'N' Tetramethylethylene diamine; NN di methyl aniline; NN Bis Hydroxyethyl Toluene and the like.

As noted herein, photoinitiators might be used to form polymer in inventive images, optionally including light stabilizers, such as hindered amine light stabilizers ("HALS") or UV light stabilizers. Photoinitiators can be free radical or cationic; liquid or solid; and clear, pigmented or white. A photoinitiator might for example, be in an application superimposed on an inventive image (e.g., on an image support), such as in a paint, an ink, a colorant made with PRM, or another colorant, which might for example be painted, drawn or printed thereon. After the application, it might be cured or partially cured using a radiation stabilizer, such as UV light.

These are more examples of photoinitiators available from Aldrich: Acetophenone; Anisoin; Thioxanthen-9-one; Anthraquinone; Benzene chromium tricarbonyl; Benzil; Benzoin; Benzoin ethyl ether; Benzoin methyl ether (preferred); Benzophenone (preferred); Benzoin isobutyl ether; 4,4'-Bis(diethylamino)benzophenone; 4-Benzoylbiphenyl; 4,4'-Bis(dimethylamino)benzophenone; Camphorquinone (preferred); 2-Chlorothioxanthen-9-one; Dibenzosuberenone; 4,4'-Dihydroxybenzophenone; 4,4'-Dimethylbenzil; 2,2-Dimethoxy-2-phenylacetophenone; 2,4-Dimethylbenzophenone; 4-(Dimethylamino)benzophenone; 3,4-Dimethylbenzophenone; 2,5-Dimethylbenzophenone; 4'-Ethoxyacetophenone; 2-Ethylanthraquinone; Ferrocene; 3'-Hydroxyacetophenone; 4'-Hydroxyacetophenone; 3-Hyroxybenzophenone; 4-Hyroxybenzophenone; 1-Hydroxycyclohexyl phenyl ketone; 2-Hydroxy-2-methylpropiophenone; 2-Methylbenzophenone; 3-Methylbenzophenone; Methyl benzoylformate; Phenanthrenequinone; 4'-Phenoxyacetophenone; Anthraquinone-2-sulfoic acid, sodium salt monohydrate; Benzophenone/1-Hydroxycyclohexyl phenyl ketone, e.g., 50/50 blend; 3,3',4,4'-Benzophenonetetracarboxylic dianhydride; 2-Benzyl-2-(dimethylamino)-4'-morpholinobutyrophenone; (Cumene)cyclopentadienyliron (II) hexafluorophosphate; 2-Methyl-4'-(methylthio)-2-morpholino-propiophenone; Diphenyl(2,4,6-trimethylbenzoyl) phosphine oxide/2-hydroxy-2-methylpropiophenone, e.g., 50/50 blend; Triarylsulfonium hexafluoroantimonate salts; Triarylsulfonium hexafluorophosphate salts; and the like, and combinations of these.

Photoinitiators are offered by Ciba Geigy, such as these examples. Irgacure® 184, e.g., 1-Hydroxycyclohexyl phenyl ketone; Irgacure® 261, e.g., ($\downarrow^5$-2,4-Cyclopentadien-1-yl) ($\eta^6$-isopropylbenzene)-iron(II) hexafluorophosphate; or ($\eta^5$-2,4-Cyclopentadien-1-yl)[(1,2,3,4,5,6-$\eta$)-(1-methyl ethyl) benzene]-iron(+)-hexafluorophosphate(−1); Irgacure® 369, e.g., 2-Benzyl-2-dimethylamino-1-(4-morpholinophenyl)-butan-1-one; or 2-benzyl-2-N,N-dimethylamino-1-(4-morpholinophenyl)-1-butanone (DBMP); Irgacure®500, e.g., Mixture of benzophenone and 1-hydroxy cyclohexyl phenyl ketone (for example, at a ratio of 1:1 by weight); Irgacure® 651, e.g., 2,2-Dimethoxy-2-phenylacetophenone, or 2,2-Dimethoxy-2-phenyl acetophenone (BDK); Irgacure® 784, e.g., Perfluorinated diphenyl titanocene; or Bis($\eta^5$-2,4-cyclopentadien-1-yl)-bis-[2,6-difluoro-3-(1H-pyrrol-1-yl)phenyl] titanium; Irgacure® 819, e.g., Bis(2,4,6-trimethylbenzoyl)-phenylphosphineoxide; Irgacure® 907, e.g., 2-Methyl-1-(4-[methylthio]phenyl)-2-(4-morpholinyl)-1-propanone, or 2-methyl-1-[4-(methylthio)phenyl]-2-morpholino propan-1-one (MMMP); Irgacure® 1700, e.g., mixture of 25% Bis(2,6-dimethoxybenzoyl) 2,4,4-trimethyl pentylphosphineoxide and 75% 2-Hydroxy-2-methyl-1-phenyl-propan-1-one (Darocur®1173); or a mixture of 25% bis (2,6-dimethoxybenzoyl)-2,4-,4-trimethylpentyl phosphine oxide and 75% 2-hydroxy-2-methyl-1-phenyl-propan-1-one (HMPP); Irgacureg 1800, e.g., mixture of 25% Bis(2,6-dimethoxybenzoyl) 2,4,4-trimethyl-pentylphosphineoxide and 75% 1-Hydroxy-cyclohexyl-phenyl-ketone (Irgacure® 184); Irgacure® 1850, e.g., mixture of 50% Bis(2,6-dimethoxybenzoyl) 2,4,4-trimethyl-pentylphosphineoxide and 50% 1-Hydroxy-cyclohexyl-phenyl-ketone (Irgacure® 184); Irgacure®2959, e.g., 4-(2-hydroxyethoxy)phenyl-(2-hydroxy-2-methylpropyl) ketone; Darocur® 1173, e.g., 2-Hydroxy-2-methyl-1-phenyl propan-1-one; or 2-hydroxy-2-methyl-1-phenyl-propan-1-one (HMPP); Darocur®2959, e.g., 4-(2-Hydroxyethoxy) phenyl-2-hydroxy-2-propyl ketone; Darocur® 4043, e.g., blend of ketones and amines; Darocur® 4265, e.g., blend of aromatic ketones or a 50/50 blend of 2,4,6-trimethylbenzoyl-diphenylphosphine oxide (TPO) and 2-hydroxy-2-methyl-1-phenyl-propan-1-one (HMPP); and combinations of these.

Examples of photoinitiators offered by other companies follow. Lucirin TPO, e.g., is made of 2,4,6-Trimethylbenzoyldiphenyl-phosphine oxide from BASF. Vicure 10, e.g., made of Isobutyl benzoin ether from Akzo. Cyracure UVI-6974, e.g., made of mixed triphenyl sulfonium salts from Union Carbide. Cyracure UVI-6990, e.g., is mixed triphenyl sulfonium salts from Union Carbide. DEAP, e.g., made of 2,2-Diethoxyacetophenone from First Chemical, of Pascagoula, Miss. FX-512, e.g., made of Triphenyl sulfonium hexafluorophosphate from 3M Co., of New York, N.Y. Michler's ethyl ketone, e.g., made of 4,4'-Bisdiethylamino benzo-phenone ethyl ketone from RIT Chemical of Pleasantville, New York. Michler's ketone, e.g., made of 4,4'-Bisdimethylamino benzophenone from RIT Chemical Photocure 81, e.g., is a mixture of benzophenone and 4-methylbenzophenone from Henkel Corp., of Ambler, PA. EDAB, e.g., made of ethyl d,1-camphorquinone, and d,1-camphorquinone from Hampford Research Inc. in Stratford, Conn. Camphorquinone (preferred), e.g., made of d,1-Camphorquinone from Epolin Inc., Newark, N.J. Photoinitiators are offered by Biddle-Sawyer, of New York, N.Y., such as these examples: Quantacure BMS, e.g., [4-(4-Methylphenylthio)phenyl] phenylmethanone 4-benzoyl-4'-methyldiphenyl sulfide; Quantacure DMB, e.g., is 2-(Dimethylamino)ethylbenzoate; Quantacure EPD, e.g., is ethyl-4-(dimethylamino)benzoate; and Quantacure ITX, e.g., is a mixture of 2-isopropyl thioxanthone and 4-isopropyl thioxanthone.

Photoinitiators by Lambson Ltd of West Yorkshire England via Aceto Corp, of New Hyde Park, N.Y., and Lake Success, N.Y. might be used to make inventive images, such as these examples. Speedcure BMDS, e.g., 1). [4-(4-methylphenylthio)phenyl] phenyl methanone 2). 4-benzoyl-4'-methyl-diphenyl sulfide. Speedcure EDB, e.g., is Ethyl4-(dimethylamino)benzoate. Speedcure ITX, e.g., is a mixture of 2-isopropylthioxanthone and 4-isopropylthioxanthone.

The following catalysts and polymerization regulators are also from Aceto Corp.: Ethyl Michler's Ketone; Photocure 196, e.g., (4-Methylbenzophenone); Photocure 51, e.g. 2,2 Dimethoxy-1,2-diphenyl ethanone (Benzil dimethylketal); Photocure 55, e.g., Methyl o-Benzoyl Benzoate; Speedcure DETX, e.g., 2,4 Diethylthioxanthone; Speedcure CTX, e.g., (2-Chlorothioxanthone); Speedcure BEDB, e.g., n-Butoxyethyl 4-(Dimethylamino)Benzoate; Azobisisobutyronitrile; p-Benzoquinone; 3,3'-Diamino Diphenyl Sulfone; 4,4'-Diamino Diphenyl Sulfone; Dibutyl Tin Oxide; N,N-Diethyl Aniline; N,N-Dimethyl Aniline; N,N-Dimethyl-p-Toluidine; Hydroquinone bis (2-hydroxyethyl) ether [HQEE]; 1,4-Naphthoquinone; Persulfates (Ammonium, Sodium, Potassium); Sodium Formaldehyde Sulfoxylate; 2,4-Pentanedione (Acetyl Acetone); Stannous Octoate; bis-(tert-Butyl Peroxy) Diisopropyl Benzene; Sodium Hydrosulfite; Tetraethyl Thiuram Disulfide (TETD); Tertiary Butyl Hydroquinone; Tetramethyl Thiuram Monosulfide (TMTM); Dioctyl Tin Oxide; and the like.

These are examples of other catalysts which can be used to make images. Elf Atochem North America Inc. offers these examples. Lupersol® DDM-9, for example, is Methyl Ethyl Ketone Peroxides typically 34%; for example, with 2,2,4-Trimethyl-1,3-pentane-diol diisobutyrate typically 58%; Hexylene glycol typically 6%; Methyl ethyl ketone typically 1%; water typically 0.7%; and Hydrogen Peroxide typically 0.7%. Luperox®DEC (Decanox-F), e.g., is Decanoyl Peroxide. Luperox® LP (Alperox-F), e.g., is Lauroyl Peroxide. Luperox® SAP (Succinic Acid Peroxide), e.g., is Succinic Acid Peroxide. Benzoyl Peroxide is used in many kinds of Luperox: Luperox® A98 (Lucidol-98), e.g., 98% granular solid; Luperox® A75 (Lucidol-75), e.g., 75% granular wet solid; Luperox® AFR40 (Luperco® AFR-400), e.g., 40% pourable paste; Luperox® ANS55 (Luperco® ANS), e.g., 55% paste with plasticizer; Luperox® ANS55P (Luperco-ANS-P), e.g., 55% paste with plasticizer; Luperox® ATC50 (Luperco® ATC), e.g., 50% paste with Tricresyl Phosphate; and Luperox® ACP35 (Luperco® ACP), e.g., 35% powder blend with inorganic phosphates. Examples of Lupersol® are made of a mixture of Peroxides and Hydroperoxides, such as Lupersol®DDM-9, Lupersol®DDM-30; Lupersol® DHD-9; Lupersol®DSW-9; and Lupersol® DeltaX-9. Lupersol®224, e.g., is made with 2,4-Pentanedione Peroxide. Lupersol® 221, e.g., is made with Di(n-Propyl) Peroxydicarbonate. Lupersol®225-M60, e.g., is made with Di(sec-Butyl) Peroxydicarbonate, for example, 60% solution in OMS. Lupersol®223-M75, e.g., is made with Di(2-ethylhexyl) Peroxydicarbonate, for example, 75% solution in OMS.

Elf Atochem's Luperox® 610M50 (Lupersol®610M50), e.g., is 1,1-Dimethyl-3-hydroxybutyl Peroxyneodecanoate, for example, 50% solution in OMS. Luperox® 188M75 (Lupersol188M75), e.g., is α-Cumyl Peroxyneodecanoate, for example, 75% solution in OMS. Luperox® 688M50 (Lupersol®688M50), e.g., is 1,1-Dimethyl-3-hydroxy-butyl Peroxyneoheptanoate, for example, 50% solution in OMS. Luperox® 288M75 (Lupersol®288M75), e.g., is -Cumyl Peroxyneoheptanoate, for example, 75% solution in OMS. Luperox® 546M75 (Lupersol®546M75), e.g., is t-Amyl Peroxyneodecanoate, for example, 75% solution in OMS. Luperox® 10M75 (Lupersol10M75), e.g., is t-Butyl Peroxyneodecanoate, for example, 75% solution in OMS. Luperox® 554M75 (Lupersol®554M75), e.g., is t-Amyl Peroxypivalate for example, 75% solution in OMS. Luperox® 11M75 (Lupersol®11), e.g., is t-Butyl Peroxypivalate, for example, 75% solution in OMS. Luperox® 256 (Lupersol®256), e.g., is 2,5-Dimethyl 2,5-di (2-ethylhexanoyl peroxy) hexane, for example, 90% liquid. Luperox®575 (Lupersol®575) and Luperox® 575M75 (Lupersol®575M75) are, e.g., t-Amyl Peroxy-2-ethyl-hexanoate (for example, the former may be 95% liquid and the latter may be 75% solution in O.M.S). Luperox® 26 (formerly called t-Butyl Peroctoate), e.g., is t-Butyl Peroxy-2-ethylhexanoate, for example, 97% solution. As another example, Elf Atochem also identifies Luperox® 26 as t-butyl peroctoate. Luperox® 26M50 (Lupersol®PMS), e.g., is also t-Butyl Peroxy-2-ethylhexanoate, for example, 50% solution. Luperox® 26P50 (Lupersol®PDO), e.g., is also t-Butyl Peroxy-2-ethylhexanoate, for example, 50% solution in dioctyl-phthalate. Luperox® 7M75 (Lupersol®70), e.g. is t-Butyl Peroxyacetate, for example, 75% solution in OMS. Luperox®80M75 (Lupersol 80), e.g., is t-Butyl Peroxyisobutyrate. Luperox® 7M50 (Lupersol®75-M), e.g., is t-Butyl Peroxyacetate, for example, 50% solution in OMS. Luperox® 555M60 (Lupersol®555M60), e.g., is t-Amyl Peroxyacetate, for example, 60% solution in OMS. Luperox® P (formerly t-Butyl Perbenzoate), e.g., is t-Butyl Perbenzoate for example, 98% liquid. Luperox® TAP (t-Amyl Perbenzoate), e.g., is t-Amyl Perbenzoate for example, 95% liquid. Lupersox 665M50 (Lupersol 665-M50), e.g., is 1,1-Dimethyl-3-hydroxybutyl Peroxy-2-ethylhexanoate.

Luperox® TAEC, e.g., is 00-t-Amyl-0 (2-ethylhexyl) monoperoxycarbonate. Luperox® KDB (Lupersol®KDB), e.g., is Di-t-Butyl Diperoxyphthalate, for example, 40% solution in dibutyl phthalate. Luperox® TBIC-M75 (Lupersol®TBIC-M75), e.g., is 00-t-Butyl O-isopropyl Monoperoxycarbonate, for example, 75% solution in OMS. Luperox® 118, e.g., is 2,5-Dimethyl-2,5-di (benzoylperoxy) hexane, for example, cystalline solid 92.5%. Luperox® TBEC (Lupersol®TBEC), e.g., is 00-t-Butyl 1-(2-ethylhexyl) Monoperoxycarbonate. All of these Elf Atochem catalysts are for example, made with Dicumyl Peroxide: Luperox® 500R, e.g., is 99%; Peroximon® DCSC, e.g., is 98%; Peroximon® DC 40P, Luperco® 500-40C, Peroximon® DC40KE, Luperco(500-40KE, Peroximon® DC40KEP, and Peroximon® DC40 MG are, e.g., all 40% solid on inert filler. Luperox® HP-DCKEP, e.g., is 38% solid on inert filler with Scorch additive.

These Elf Atochem catalysts are for example, made with 2,5-Dimethyl-2,5-di-(t-Butylperoxy) hexane. Luperox® 101 (Lupersol®101), e.g., is 91-93% liquid. Luperox® 101XL45 (Luperco® 101-XL), e.g., is 45% solid on inert filler. Luperox® HP101XLP, e.g., is 42% on calcium carbonate +Scorch Resistant Additive. Luperox® 101PP10, e.g., is 10% dispersion on polypropylene carrier. These Elf Atochem catalysts are for example, made with α-α'-bis (t-Butylperoxy) diisopropyl-benzene: Peroximon® FMSC, e.g., is 97% flakes; Peroximon® F40KEP and Peroximon® F40MG, e.g., are both 40% on inert filler; and Luperox® HP FKEP, e.g., is 32% on inert filler with Scorch Additive. Luperox® D1 or Luperox® Di, e.g., is Di-t-Butyl Peroxide for example, 98.5% liquid. Luperox® DTA, e.g., is Di-t-Amyl Peroxide, for example, 96% liquid. The chemical 2,5-Dimethyl-2,5-di-(t-Butylperoxy) hexyne-3 is for example used in both Luperox® 130 (Lupersol®130) (e.g., 90-95% liquid), and in Luperox® 130XL45 (Luperco® 130-XL) (e.g., 45% solid on inert filler). Luperox® CU90, e.g., is Cumene Hydroperoxide, for example, 88% liquid. The chemical t-Butyl Hydroperoxide is for example, used in both Luperox® TBH70, e.g., 70% liquid with 18% di-t-, $H_2O$, alcohol, and in Luperox® TBH70X, e.g., 70% liquid with 30% water. Elf Atochem's t-Amyl Hydroperoxide, e.g., is 85% liquid, 15% t-amyl alcohol & water. Luperox 802 (Lupersol 802), e.g., is α-α'-bis (t-Butylperoxy) diisopropylbenzene.

Elf Atochem uses the chemical 1,1-Di-(t-Butylperoxy)-3,3,5-trimethyl-cyclohexane in catalysts such as these examples. Luperox® 231 (Lupersol®231), e.g., is 92%. Luperox® 231XL40 (Luperco® 231-XL), e.g., is 40% solution on inert filler. Luperox® 231 P75 (Lupersol 231-P75), e.g., is 75% solution in dibutyl phthalate. Luperox® HP 231 KEP, e.g., is 30% solid on inert filler with Scorch Additive. Luperox® 331P80 (Lupersol®331-80B, e.g., is 1,1-Di(t-Butylperoxy)-cyclohexane, for example, 80% solution in Butylbenzyl Phthalate. Luperox® 331M80 (Lupersol 331-80M), e.g., is 1,1-Di-(t-Butylperoxy) cyclohexane. The chemical 1,1-Di-(t-Amylperoxy)-cyclohexane, is for example, used in both Luperox® 531P80 (Lupersol®531-80B), e.g., 80% liquid in Butyl Benzyl Phthalate, and in Luperox® 531M80 (Lupersol®531-80M), e.g., 80% liquid in OMS. Luperox® 233M75 (Lupersol®233-M75), e.g., is Ethyl-3,3-Di (t-Butylperoxy)-butyrate, for example, 75% solution in OMS. Luperox® 533M75 (Lupersol®533-M75) is for example, Ethyl 3,3-Di-(t-Amylperoxy)-butyrate, e.g., 75% solution in OMS. Azodiisobutyronitrile is for example, used in both Elf Atochem's AZDN and AZDN-B, e.g., which also has silica.

Elf Atochem's Fascat® esterification catalysts may also be used to make polymer in images. All of the products in the Fascat® 2000 series are for example, stannous tins, and those in the Fascat® 4000 series are, for example stable organotins. There is also the Fascat®9000 series. For example, Fascat® 9100, 9102 and 9201 are all useful for unsaturated polyesters.

Akzo Nobel Chemicals Inc. in Dobbs Ferry, N.Y. makes many catalysts for use in making polymer for making images, such as these examples: Cadox® D-50 Methyl ethyl ketone peroxide (MEKP), e.g., solution in plasticizer, for example 8.9-9% active oxygen; Cadox® L-50 MEKP, e.g., 9% active oxygen, also available in diluted form as Cadox L-30; Cadox® L-50a MEKP, e.g., solution in plasticizer, for example, 8.9% active oxygen; Cadox® M-50 MEKP, e.g., 9% active oxygen, also available in diluted form as Cadox M-30; Cadox® M-50a MEKP, e.g., solution in plasticizer, for example, 8.9% active oxygen; Cadox D-50, L-50a and M50a are, e.g., all 30-35% MEKP; 0.001-3.0% Hydrogen peroxide; 60-70% 2,2,4-Trimethylpentanediol-1,3-diisobutyrate; and 0.001-2.0% water; Trigonox® 40, e.g., 2,4-Pentanedione peroxide, for example, 4% active oxygen, fire resistant; Trigonox® 40K, e.g., Ketone peroxide/peroxyester mixture, for example, 3.5% active oxygen; Trigonox® 61, e.g., Ketone peroxide mixture, for example, 7.7% active oxygen; Trigonox® 63, e.g., Ketone peroxide mixture, for example, 6.5% active oxygen; Trigonox® 239A, e.g., Cumyl hydroperoxide solution, for example, 4.6% active oxygen; Trigonox® K-80, e.g., Cumyl hydroperoxide solution, for example, 8.5% active oxygen; Cadet® BPO-75W, e.g., 75% Dibenzoyl peroxide, for example, with 25% water (for instance, 75% BPO in water), and for example, 4.6% active oxygen; Cadox® BFF-50, e.g., 50% BPO on solid carrier as a dry powder, for example, 3.3% active oxygen; 50% Dibenzoyl peroxide with 50% dicyclohexyl phthalate; Cadox® BTW-55, e.g., 55% Non-separating BPO paste in plasticizer, for example, 3.6% active oxygen (also available in 50% paste as Cadox BTW-50); Cadox® 40E, e.g., 40% Non-separating BPO dispersion in plasticizer, for example, 2.6% active oxygen; Cadox® 40ES, e.g., 40% Non-separating BPO dispersion in plasticizer, for example, 2.6% active oxygen, thixotropic; Trigonox® 22, e.g., 1,1-(di-tert-butylperoxy)cyclohexane (can combine with Cadet® BPO-75W); Trigonox® F, e.g., tert-butyl peroxyacetate (can combine with Cadet® BPO-75W); Trigonox® C, e.g., 98% tert-butyl peroxybenzoate, for example, 8% active oxygen (can combine with CadetBPO-75W); Trigonox® BPIC, e.g., tert-butylperoxyisopropyl carbonate (can combine with Cadet® BPO-75W); Trigonox® 21, e.g., 97% tert-Butyl peroxy-2-ethylhexanoate, for example, 7.2% active oxygen; Trigonox® 21-OP50, e.g., same as Trigonox 21 but 50% in plasticizer, for example, 3.7% active oxygen; Trigonox® 42S, e.g., 97% tert-Butyl peroxy-3,5,5-trimethylhexanoate, for example, 5.9% active oxygen; Trigonox® 97-C75, e.g., 75% tert-Butyl peroxy-2-methylbenzoate for example, in hydrocarbon solvent, for instance, 5.8% active oxygen; Trigonox® 121, e.g. 95% tert-Amyl peroxy-2-ethylhexanoate, for example, 6.6% active oxygen; Trigonox® 121-BB75, e.g., 75% Trigonox 121 in plasticizer, for example, 5.2% active oxygen; Trigonox® 141, e.g., 90% 2,5-Dimethyl-2,5-di-(2-ethyl-hexanoylperoxy) hexane, for example, 6.7% active oxygen; Trigonox® BPIC, e.g., 75% tert-Butylperoxy isoproyl carbonate for instance, in hydrocarbon solvent, for example, 6.8% active oxygen; Trigonox® 29-B75, e.g., 75% 1,1-Di-(tert-butylperoxy)-3,3,5-trimethylcyclohexane for insance, in plasticizer, for example, 7.9% active oxygen; Trigonox® 22-BB80, e.g., 80% 1,1-Di-(tert-butyl peroxy)cyclohexane, for instance, in plasticizer, for example, 9.8% active oxygen; Trigonox® KSM, e.g., Peroxyester/peroxyketal mixture, for example, 6.1% active oxygen; Trigonox® 161, e.g., Peroxyester/peroxyketal mixture, for example, 6.7% active oxygen; Perkadox®16, e.g., 95% Di-(4-tert-butylcyclohexyl) peroxydicarbonate, for example, 3.8% active oxygen; Trigonox® 117, e.g., 98% tert-Butylperoxy 2-ethylhexyl carbonate, for example, 6.4% active oxygen; Trigonox® 127, e.g., 95% tert-Amyl peroxybenzoate, for example, 7.2% active oxygen; Trigonox® D-C50, e.g., 50% 2,2-Di-tert-butylperoxybutane for example, in hydrocarbon solvent, for instance, 6.8% active oxygen;

Also, Aldrich Chemical Co. offers 2,5-Bis(tert-butylperoxy)-2,5-dimethyl-hexane.

Amounts herein are by weight percent unless otherwise indicated herein; unless otherwise indicated in publication(s) or printed literature from the company offering the chemical or product; or unless otherwise known as the practice or as the conventional practice for the use of the chemical or product.

An enormous variety of ingredients, agents and other conventional practices may be used to form inventive images according to the invention, as will be readily understood by those of ordinary skill in the art, including those listed in publications cited herein (e.g., books, catalogues, articles and CD-Roms). Mixtures of the chemicals cited in these publications, as well as co-polymers thereof, and derivatives thereof can be used, as well as any available conventional practices. In particular, any suitable products listed in "Aldrich Polymer Products," Aldrich Chemical Company, Milwaukee, Wis., printed and available to the public before Jun. 1, 1999, or available from Aldrich are included. Various other materials are available from Aldrich for use in accordance with the invention, including those cited in "Aldrich Polymer Products, UV Absorption Spectra of the Most Commonly Used Radical and Cationic Photoinitiators," 1996; "Aldrich, Radiation Curing Chemicals, Epoxy Monomers, Acrylic Monomers, Photoinitiators" printed and available before Jun. 1, 1999; "Aldrich Polymer Products CD-Catalog and Reference Guide," 2000, from Sigma-Aldrich Co.; as well as the materials listed in and/or available from the following articles and companies: "Polymers and Monomers Catalog 1998-2000" Polysciences, Inc., Warrington, Pa.; "Introduction to Polymers and Resins, Second Edition" by Frederick H. Walker, published by Federation of Societies for Coatings Technology in Blue Bell, Pa., Oct. 1999; "Adhesion Aspects of Polymeric Coatings," an article by Jamil A. Baghdachi of BASF Corp., Southfield, Mich., published by Federation of Societies for Coatings Technology, Dec. 1996; "Painting of Plastics" an article by Rose Ann Ryntz of Ford Motor Company Detroit, Mich., 1994.

In one embodiment, manufactured polymer shapes and forms can be used as components in inventive images. Examples of these include pre-made polymer sheets, films, pellets (used as forms), rods, cubes, bars, blocks, spheres, bowls, etc, which are typically mass produced and widely sold, such as one or more sheets of acrylic, vinyl, polyvinyl chloride, acetate, polycarbonate, polyester, polystyrene, polyethylene, polypropylene, nylon, and/or another polymer (e.g., as an image support, Separating Layer, external layer, internally as an image part, etc.). There are many kinds of polymer films and sheets made for and/or conventionally used for image making that can be used in inventive images, e.g., papers sold for graphics, drafting, drawing, painting and/or transferring images. Most of these are transparent and/or translucent. Examples are films and sheets made by Borden and Riley Paper Co., Inc. in Hollis, N.Y., such as Denril and Laser Denril, acetate, and polyester, as well as polymer papers for computer printers. Conventional image making media and/or materials which are polymers or monomers (such as acrylic paints) can also be used to make inventive images, as noted herein. Polymers and/or monomers in emulsion form can also be used, including acrylic emulsions conventionally made and sold for making images. (These emulsions typically shrink, often significantly, as they dry or harden.) However, when one or more of any of these conventional polymer ingredients are used in an inventive image, a stabilizer is preferably added. Moreover, it is preferable that such inventive images also contain polymer of the present invention and/or that their conventional polymeric medium (s) and/or material(s) are not included in the calculation of the total polymer in these inventive images.

Further examples of ingredients which can be used to make inventive images are mentioned throughout this patent. Though many examples of ingredients for use in inventive images described herein are named as they are made by a specific manufacturer, these same ingredients can be used in inventive images regardless of who makes them. Additional examples of ingredients for use in inventive images are ingredients which are chemically similar to those listed herein, e.g., monomers, polymers, stabilizers, fillers, colorants, paints, binders, etc. which are chemically similar to the examples listed herein may be used to make inventive images, such as compositions which are the same as those mentioned herein but with one or more additional ingredients. In addition, generic forms of ingredients for use in inventive images named herein (such as generic forms of monomers, polymers, stabilizers, fillers, colorants, paints, binders, etc.) may be used in inventive images. In their use in inventive images, ingredients are never limited by the uses and/or processes described by their manufacturer or defined by conventional practices. For example, monomers and polymers can be used as stabilizers in inventive images, some stabilizers can be used as monomers or polymers in inventive images, and monomers, polymers, and stabilizers specified herein with one or multiple examples of their use in inventive images, may be used in inventive images for one or multiple other purposes.

Further Description of Fine Art Stabilizers

A broad range of stabilizers and mixtures of stabilizers are useful and desirable in the creation and preservation of inventive images. It is preferable that all stabilizers used in inventive images are either invisible to the unaided human eye (e.g., they have no observable effect on an inventive image's color, fluorescence, transparency, and/or translucency, in daylight, incandescent light, halogen light, fluorescent light, UV light, etc.), or it is preferred that the visibility of one or more stabilizers as part of inventive images is desirable, (e.g., aesthetically desirable). A stabilizer might for example add to an image's color, texture, form, structure, light, strength, permanence, function, etc.

In many preferred embodiments it is desirable to use one or more stabilizers in inventive images or in part(s) thereof (e.g., in parts which will or may discolor, such as in polymer), which is designed by its manufacturer to affect discoloration which can otherwise occur by inhibiting it, absorbing it, blocking it, and/or otherwise stabilizing it and/or its cause. For example, it is preferred that such stabilizers protect inventive images against undesirable effects that can be caused by UV light (e.g., discoloration). In a polymer, a stabilizer or stabilizers such as this may also inhibit, absorb, block, or stabilize 1) the discoloration of the polymer; 2) the discoloration of non polymeric inventive image ingredients; and/or 3) the cause of such discoloration (e.g., UV light). For example, the use of such a stabilizer in polymer in an inventive image might prevent the discoloration of non polymeric materials used under over, and/or in that polymer (e.g., embedded, attached and inlaid materials; pigments, paints, and other coloration, which may, for example, discolor, change in form or surface, etc.).

For example, Tinuvin® 328 by Ciba-Geigy is one preferred stabilizer which can inhibit, absorb, block and/or counter undesirable effects on polymer caused by UV light (e.g., discoloration). While Tinuvin® 328 may be a light yellow powder, Ciba-Geigy offers Tinuvin® 328 FF, which may be in light yellow free flowing granules which can be used in the inventive medium, though the powder is generally preferred. The preferred concentration of such a stabilizer (e.g., in grams per milliliter of monomer, monomers, or PRM) typically depends on the UV absorption spectrum and the absorbance of the chemical itself; it depends on the chemical's stability in its use and the permanence desired for the inventive image; and it depends on the desirability of any aesthetic effect the chemical has on the inventive image. (For example, at the concentration recommended, a chemical may not only absorb the UV light, it may also absorb some of the near blue, which in daylight, may make the polymer appear to have a slight yellow color that may be less apparent in incandescent light. This depends upon the where in the image's Compositional Arrangement the stabilizer is used, the method of the image's display, etc.) More examples of these preferred stabilizers are provided below.

Manufacturers of stabilizers change their products. This can affect their recommendations, the recommendations of others, and the preferences of image makers for the use of a specific product. For example, over the past ten years, Ciba-Geigy has changed Tinuvin® 328. Currently Ciba Geigy recommends that from 0.2%-0.7% of Tinuvin® 328 be used throughout a polymer, and from 2%-3% of Tinuvin® 328 be used as an external layer or coating layer on polymer.

In another preferred embodiment, one or more stabilizers are used in inventive images which protect against changes in coloration such as changes in color intensity, value, hue, or other changes in coloration (e.g., fading of pigments and dyes, yellow or amber discoloration, etc.). For example, to protect coloration in inventive images or parts thereof against changes, one or more stabilizers which protect against changes caused by UV light might be used (e.g., those listed herein by Ciba-Geigy), other stabilizers might be used such as Hindered Amine Light Stabilizers (or HALS by Ciba-Geigy), or a combination of these might be used. Examples of these preferred stabilizers are provided below.

In many preferred embodiments, fiber (such as a fabric, fiberglass or other examples provided herein), is used as a stabilizer in and/or on polymer of the present invention. (Refer to further descriptions of fiber herein.) In an embodiment, fiber is used on polymer for the bond its weave provides to one or more superimposed applications, e.g. as a surface preparation stabilizer or a part of a surface preparation stabilizer, for instance, if its SSI enable bonding of a paint and/or it may chemically enable a superimposed application to bond to an image. Fiber is a preferred stabilizer in the preferred class of strengthening stabilizers (among which are also various kinds of image supports, specially designed mounts, and layers which reinforce polymer in inventive images). Examples of strengthening stabilizers are described throughout this patent.

In some embodiments, one or more stabilizers are used in inventive images or part thereof as surface applications which are not superimposed, e.g., as sealers or coatings. These might for example, be stabilizers used independently, or they might be stabilizers used in mixtures with one or more other ingredients (such as cPRM, conventional media or both), and/or fiber.

In some embodiments, one or more stabilizers are used in and/or on polymer which absorb UV light and with the absorbed energy, they fluoresce in the range of visible light. The color light added to the inventive image depends on: a) the specific chemical or chemicals used, b) use in the inventive image, and c) the UV light striking the polymer made according these embodiments. By choosing the appropriate chemical or mixture of chemicals as the stabilizer or stabilizers, the resultant fluorescence may be blue, yellow, or red; orange, purple or green; or other colors. Visibility of the fluorescence made in these embodiments may require additional UV light striking the inventive image. (Stabilizers in this group may also be used on and/or in non polymeric inventive image ingredients.).

In one embodiment, one or more stabilizers are used in and/or on polymer from a group of chemicals called optical "brighteners", and/or one or more stabilizers are used in and/or on polymer which absorb UV energy and fluoresce in the visible spectrum. Typically, this optical effect is visible with ordinary room lighting. Uvitex® OB offered by Ciba-Geigy is one example. For example, Uvitex® OB may be 2,5-thiophenediylbis(5-tert-butyl-1,3 benzoxazole); and Uvitex® OB may also be 2,2'-(2,5-thiophenediyl) bis [5-tert-butylbenzoxazole]. A visual effect, which can be made with Uvitex® OB and other chemicals in this group, is a brightening in the blue end of the visible spectrum as an inventive image with one or more of these stabilizers is viewed in light. For example, if Uvitex® OB were dispersed throughout a polymer, blue light might originate at every depth of that polymer, e.g., possibly creating an opalescent or slightly opalescent effect. (If desired, Uvitex® OB and other chemicals in this group may be used as desired on and/or in non polymeric inventive image ingredients.).

These are more examples of optical brighteners for use in inventive images. Tinopal® SPF, also by Ciba-Geigy is for example, a water soluble fluorescent whitener with applications similar to those of Unitex® OB. For example, Tinopal® SPF may be 4,4'-bis-2-diethylamino-4-(2,5 disulphophenylamino)-s triazinyl-6-amino-stilbene-2,2'-disulphonic acid, sodium salt; and the Chemical Name for Tinopal® SPF may also be 2,2'-[1,2-Ethenediyl bis [(3-sulfo-4,1-phenylene) imino-[6-(diethylamino)-1,3,5-triazine-4,2 diyl]imino]] bis-1,4-benzenedisulfonic acid, hexasodium salt. Uvitex® 2B (Tinopal® CBS-X), e.g., [2,2-(2,5-thiophenediyl)bis-(5-tert-butylbenzoxazole)], may also be used in inventive images. Aceto Corporation offers an optical brightener called Eutex OB which may for example be 2,2'-(2,5-Thiophenediyl)bis (5-t-butyl benzoxazole). Eastman Chemical Co. of Kingsport, Tenn. offers Eastobrite OB-1 Optical Brightener, e.g. 2,2'-(1,2-Ethenediyldi-4,1-phenylene)bisbenzoxazole, $C_{28}H_{18}N_2O_2$. Eastman Chemical also offers Eastobrite OB-3 Optical Brightener, e.g., $C_{28}H_{18}N_2O_2$, 2,2'-(1,2-Ethenediyldi-4,1-phenylene)bisbenzoxazole plus brightener enhancer.

In an embodiment, one or more preferred stabilizers are added to a cPRM for one or more of these effects: 1) so that the surfaces of the cPRM polymerizing exposed to air, (rather than against a mold or other surface), harden or form as smooth polymer surfaces (as opposed to, for example, irregular or pebbly surfaces); and/or 2) so that the cPRM fully cures or so that it cures more fully. These stabilizers often reduce or prevent the odor of monomers (such as styrene). For example, such a stabilizer might be one or more waxes, and/or it might be a mixture containing one or more waxes (such as a mixture of one or more monomers and one or more waxes; a mixture of one or more waxes which can be mixed into the specific cPRM being used; or a conventional wax painting medium). Wax in the cPRM rises to the surface (an effect that is sometimes called a bloom or blooming effect). This can cause the polymer to harden or form smoothly (as opposed to irregular or pebbly surfaces), it can enable the polymer to cure more fully or to fully cure, and it can prevent the evaporation of monomers. If desired, once the polymer hardens or forms, its wax surface can be further processed as desired, e.g., it can be partially or completely removed, revealing the fully cured or more fully cured polymer underneath, for instance, by abrasive processes (such as sanding or sandblasting), by washing with chemicals (such as isopropyl or methyl alcohol); and/or by surface oxidation (such as by corona discharge, plasma generation or flame treating); etc. Without wax in the cPRM, the polymer might not have cured as fully; it might not be as smooth; and/or it might emit undesirable fumes. In addition to or instead of wax removal, some or all of an inventive image's surface wax can be buffed, polished, and/or superimposed.

One example of such a stabilizer containing wax which might be used in cPRM to form polymer in this embodiment is Silmar®'s A-111. Methods for its use can be used and adapted for the use of similar stabilizers in PRM. Silmar® recommends that A-111 be added to PRM or cPRM at about 1 to 2% w/v, to form smooth external polymer surfaces. Prior to using Silmar®'s A-111, it is preferable to shake it up and to warm it (e.g., in hot water) so that it will be thoroughly mixed when it is used. The ingredients in Silmar®'s A-111 (particularly wax), tend to separate, and Silmar®'s A-111 will not work without all of its ingredients. Also, because the Silmar®'s A-111 in PRM is likely to trap air bubbles when it is mixed, brushed or poured, it is often desirable to stir mixtures containing Silmar®'s A-111 and other wax ingredients in a manner which produces the aesthetic desired, e.g., stir slowly to avoid introducing bubbles. According to Silmar®, the wax in their A-111 allows surfaces of the polymer in which it is used to fully cure or to cure more fully even though they are exposed to air rather than against a mold or other surface. The wax in Silmar®'s A-111 can also level the polymer's surfaces so that they form smoothly. (Without Silmar®'s A-111, external polymer surfaces exposed to air rather than a mold or other surface, may harden irregularly or pebbly.) Though the wax in Silmar®'s A-111 may make polymer containing it appear cloudy, if desired, it can be buffed or polished to a clear, or a clear and glossy surface. With the addition of Silmar®'s A-111, the polymer fully cures or cures more fully, thus it may no longer emit fumes or its emission of fumes may be notably reduced. Silmar®'s A-111 is, for example, made of 94 to 96% Styrene. Other examples of stabilizers for use in cPRM in this embodiment are Silmar®'s S-250, Silmar®'s S-250a, Byk®-S 740 and Byk®-S 750 (both by Byk Chemie), and conventional artists wax media.

Wax stabilizers in cPRM (e.g., added directly in cPRM and/or added in cPRM as part of a mixed composition) can prevent or weaken the bond of the cPRM and/or the polymer formed to many kinds superpositions (e.g., superimposed cPRM, paints, glues, other media, etc.). If desired, Silmar®'s A-111 and other such stabilizers can be used for such purposes in inventive images. However, in embodiments, neither Silmar®'s A-111, nor any other wax, any other stabilizer, any other ingredient or any other process used in inventive images are restricted in their use. For instance, if desired, an aesthetic or a structure can be created in an inventive image involving superimposed applications which are not bonded or not completely bonded to polymer surfaces, in which case Silmar®'s A-111 or other such stabilizers might be used to prevent select areas of a polymer surface from bonding to a superimposed application, typically of cPRM or paint. Or, for example, Silmar®'s A-111 or other such stabilizers might be used for aesthetic purposes, such as for lining the interior surfaces of air pockets within polymers inventive image forms. The use of wax and ingredients containing wax as stabilizers in cPRM can also enable desired bonding in inventive images, e.g., as surface preparation stabilizers, for instance, for bonding conventional media containing wax to the polymer image such as encaustics; oil paints with wax ingredients; etc.

As another illustration, Byk®-S 740 and Byk®-S 750 both of which contain wax, might be used as stabilizers as desired in cPRM to prevent monomer evaporation without loss of interlaminar adhesion, and to produce a fully cured or a more fully cured polymer which will not emit fumes. Because both Byk®-S 740 and Byk®-S 750 leave the polymer surface with sites that will adhere to the same cPRM and to anything else that bonds to that cPRM, such further applications can be made as desired. Furthermore, because both Byk®-S 740 and Byk®-S 750 also leave the polymer surface with wax sites, the resultant polymer surface can function for bonding purposes (e.g., as a surface preparation stabilizer) bonding or loosely bonding subsequent superpositions to its wax sites as desired (such as encaustic paints; oil paints with wax ingredients; and/or many kinds of colored pencils and pastels which are wax based or which contain wax). As another illustration of this embodiment, Byk®-S 706 might be used in cPRM as desired to produce a polymer with a level surface. For example, Byk®-S 706 might be used in a thin, coating layer of cPRM. If desired, Byk®-S 706, might be used in a polymer along with either Byk®-S 750 or Byk®-S 740.

Byk®-S 750 may for example be a "Combination of waxes with polar components," e.g., "use: Duroplast additive." Byk®-S 750 might for instance be made with petroleum distillates and alkylphenol, ethoxylated. Byk®-S 740 might for example be a "Dispersion of hydroxypolyesters and paraffin wax in aliphatic hydrocarbons," e.g., "use: Duroplast additive." Byk®-S 740 might for example have 40% by weight Alkane and 10% by weight Paraffin waxes (petroleum), clay treated; and as Byk Chemie also published, Byk®-S 740 may for example have 40% by weight Alkane and 10% by weight Paraffin waxes. Byk®-S 706 may for example be "polyacrylate" e.g., "use: Duroplast additive." It might also deaerate gel coats. Byk®-S706 may for example have 45% by weight Naphtha-light aromatic; 4% by weight 2,6-Dimethyl-4 heptanone; and 2% by weight 4,6-Dimethyl-2-heptanone. As Byk Chemie also printed, Byk®-S 706 might also for example be made with 44% by weight Naphtha-light aromatic; 3% by weight 2,6-Dimethyl-4-heptanone; and 1% by weight 4,6-Dimethyl-2-heptanone.

The effects of trapped air in polymer may or may not be desired in inventive images. In an embodiment, one or more stabilizers are added into cPRM to release air bubbles, to defoam it or both. For example, in polymer, air bubbles, foam or both might be visible; they might be too small or too subtle to be identified, or they might be too small to be noticeable at all. For instance, in polymer, air bubbles may be evident as a lack of clarity, transparency or translucency; they may affect coloration (e.g., making the color inconsistant), they may affect the polymer surface (e.g., leaving craters, pinholes or other irregularities), they may have other undesirable aesthetic effects or a combination of these. For example, Tego Chemie Service USA, a division of Goldschmidt Chemical Corporation offers products which release air bubbles in polymer for use as stabilizers such as Tego® Airex, e.g., Airex 900, 910, 912 and 931. Tego Chemie Service USA also offers defoamers for use as stabilizers such as Tego® Foamex 825, 1488, 8020 and K3.

As further examples, Byk Chemie offers defoamers and products for air release for use in inventive images, such as these: Byk®-A 555 might be used in PRM as desired. If desired, Byk®-A 555 might be used in a polymer that also has Byk®-S 706, Byk®-S 750, Byk®-S 740 or combinations of these. According to literature and verbal information from Byk Chemie, Byk®-A 555 may for example, be a "Combination of foam destroying polymers, silicone free" e.g., "use: Duroplast additive;" Byk®-A 555 may for example have 62% by weight Naphtha-light aromatic; Byk®-A500 may for example, be a combination of foam-destroying polymers, silicone free, e.g., for air release; Byk®-A501 may for example, be a combination of foam-destroying polymers, silicone free, e.g., for air release; Byk®-A515 may for example, be a combination of foam-destroying polymers, silicone free, e.g., for air release, highly surface active, for instance, for use in thixotropic PRM and for wetting fiber; Byk®-051, 052 & 053 may for example, be solutions of foam-destroying polymers, silicone free, e.g., made for organic systems; Byk®-065 and 066 may for example, be solutions of foam-destroying polysiloxanes, e.g., made for organic systems; Byk®-070 may for example, be a solution of foam-destroying polymers and polysiloxanes, e.g., made for organic systems; Byk®-070 may for example, have 56% Xylene, 8% n-Butyl acetate, 13% 1-Methoxy-2-propanol acetate, 14% Ethylbenzene, and 0.3% 2-Methoxy-1-propanol acetate (impurity). (Percentages are by weight); Byk®-075 may for example, be a solution of an aralkyl-modified methylalkylpolysiloxane e.g., made for solvent based systems; Byk®-077 may for example, be a solution of a methylalkylpolysiloxane e.g., made for organic systems for improving mar resistance and surface leveling, prevents foam and bubble formation; Byk®-080 may for example, be a non-aqueous emulsion of a polysiloxane copolymer, e.g., made as a defoamer for polar organic systems, highly transparent; Byk®-085 may for example, be a solution of a modified polysiloxane copolymer e.g., made as a defoamer which improves surface slip and leveling; Byk®-088 may for example, be a solution of foam-destroying polymers and polysiloxanes e.g., for solvent-based and solvent-free systems; Byk®-141 may for example, be a mixture of foam-destroying polymers and polysiloxanes e.g., made as a defoamer for solvent based coatings; and the like, as well as combinations thereof.

Stabilizers which are leveling agents (and which might also be defoamers) are used in making polymer inventive images. These are further examples offered by Byk Chemie. BYK®-325 may for example, be a solution of a polyether modified methylalkylpolysiloxane (e.g., also can affect surface slip and mar resistance); BYK®-331 may for example, be a polyether modified dimethylpolysiloxane copolymer (e.g., also can increase surface slip and improves substrate wetting); BYK®-354 may for example, be a solution of a polyacrylate (e.g., it also can improve surface flow, reduce cratering, and have degassing and defoaming effects); BYK®-358 may for example, be a solution of an acrylic copolymer (e.g., also can reduce cratering and fisheyes); BYK®-361 may for example, be an acrylic copolymer (e.g., also can resist crater formation); BYK®-363P may for example, be an acrylic copolymer adsorbed on silicon dioxide; BYK®-360P may for example, be polyacrylate adsorbed on silicon dioxide (e.g., also can be used to reduce cratering); BYK®-Powder-Flow 3 may for example, be a mixture of a polyacrylate with a polysiloxane copolymer (e.g., can counteract cratering); Byketol®-HS may for example, be a mixture of high boiling point cycloaliphatics and esters (e.g., can counteract surface defects such as craters and pinholes); Byketol®-Spezial may for example, be a mixture of high boiling aromatics, ketones and esters in conjunction with a paint compatible silicone resin (e.g., can counteract surface defects such as pinholes, craters and blisters in air drying systems); Byketol®-OK may for example, be a mixture of high boiling aromatics, ketones and esters (e.g., can prevent surface defects such as craters, pinholing and blisters); Byketol®-WS may for example, be a combination of surface active oligomers and polymers (e.g., can prevent surface defects such as craters and pinholes); and the like, as well as combinations thereof.

Tego Chemie offers a number of products which can improve slip, scratch resistance, the prevention of craters, flow, leveling, and other surface control characteristics that can be used as stabilizers in inventive images, such as Tego® Glide, Tego® Flow and Tego® Rad. Byk Chemie in Wallingford, Conn. also makes a number of products for use as stabilizers with these functions. For example, these Byk Chemie products affect mar resistance, surface slip or both in polymer: BYK®-300, 301 and 306, e.g, solutions of polyether modified dimethylpolysiloxane copolymer; BYK®-302 and 307, e.g, polyether modified dimethylpolysiloxane copolymer; BYK®-310, e.g, a solution of a polyester modified polydimethylsiloxane and Byk Chemie also published that BYK®-310 is a polyester modified di-methyl-polysiloxane with structures patented by Byk Chemie U.S. Pat. No. 4,613,641 and European Patent 34 27 208; BYK®-320, e.g, a solution of a polyether modified methylalkylpolysiloxane copolymer; BYK®-321, e.g, a solution of a polyether modified dimethylpolysiloxane copolymer; BYK®-320 and 321, e.g, also have foam destroying properties; BYK®-322, e.g, is an Aralkyl modified methylalkylpolysiloxane; BYK®-330, 336, 341 and 344, e.g, solutions of a polyether modified dimethylpolysiloxane copolymer; BYK®-370, e.g, solution of a polyester modified hydroxy functional polydimethylsiloxane; BYK®-371, e.g, a solution of an acrylic functional polyester modified dimethylpolysiloxane; and the like.

In an embodiment, one or more stabilizers which affect mar resistance, surface slip, and surface flow are used in inventive images. In an embodiment, one or more stabilizers which protect inventive images against cracking, checking, the loss of coating integrity or a combination of these (e.g., caused by light exposure, heat exposure or both, which can lead to polymer chain scission or increased crosslinking) are used in inventive images. In an embodiment, one or more stabilizers which protect inventive images against other surface degradation such as loss of surface gloss, loss of surface distinctness, loss of visual depth, or a combination of these (e.g., caused by surface erosion, weathering, pitting or a combination of these), are used in inventive images. Examples are preferred stabilizers that protect against changes caused by UV light (such as those listed herein by Ciba-Geigy), and/or other stabilizers such as Ciba-Geigy's HALS. In another embodiment, one or more stabilizers which protect inventive images or parts thereof (such as their surfaces), against delamination, peeling, chalking (e.g., pigment washes or rubs off) and/or other reduced adhesion of the primer or top coat are used in inventive images. Ciba-Geigy's UV light stabilizers, HALS, and combinations of these are examples. These are preferred stabilizers.

In an embodiment, one or more stabilizers are used in cPRM to alter or control its polymerization process and/or as processing aid(s). The stabilizers in this embodiment are preferred. For example, a stabilizer might be added into cPRM to control its curing time, e.g., to slow it down or to accelerate it. Such a stabilizer might for example be useful as a viscosity modifier for cPRM, e.g., as described herein. For example, ingredients previously listed herein as fillers might be used to alter or control the polymerization process of cPRM, e.g., Barytes, talc, clay, cellulose, polymer beads or bubbles, calcium carbonate (natural or synthetic), etc. As two additional examples, 2-Acetylcyclopentanone, linear formula $CH_3COC_5H_7(=O)$ and molecular formula $C_7H_{10}O_2$ offered by Acros Organics of Fairlawn, N.J. might be used as a stabilizer in cPRMs made with polyester resins to control their curing time. And, N,N-Diethylacetoacetamide, synonyms: Acetoacetic acid diethylamide, 3-Oxobutyric acid diethylamide, or DEAA, linear formula $CH_3C(O)CH_2C(O)N(C_2H_5)_2$ and molecular formula $C_8H_{15}NO_2$ also offered by Acros Organics, might be used as a stabilizer in cPRM for a number of purposes. One use of this stabilizer is to accelerate the gelation of unsaturated polyester resins and acrylates together with metal naphthenates and peroxides. Other processing aids for polymers are stabilizers which can be used to make images such as products by Elf Atochem like Metablen® P which are for example, acrylic processing aids typically used for PVC, e.g. Metablen® P-550, 552, and 710 which is especially useful for its lubricating properties.

In embodiments, one or more stabilizers which maintain flexibility of inventive images or parts thereof are used in inventive images, e.g., Ciba-Geigy's HALS or monomers which make the resultant polymer more flexible. In some embodiments, one or more plasticizers are used as stabilizers in inventive images, e.g., among preferred examples are: phthalate esters, adipate esters, azelate esters, sebacate ester, trimellitate ester, Dibutyl Phthalate, Dioctyl Phthalate, Butyl Benzyl Phthalate, Diisooctyl phthalate; Bis(2-ethylhexyl) maleate; 2,2,4 Trimethyl-1,3-pentanediol dibenzoate; Triallyl trimellitate Synonyms: (triallyl 1,2,4-benzenetricarboxylate); and Poly(ethylene glycol) monolaurate. For example, polyvinylchloride can be plasticized. PMMA can be plasticised also, e.g., adding the plasticizer dibutyl phthalate to the Lucite® monomer can be useful in altering undesirable effects which can occur when forming polymer in contact with some metals. Vikoflex® epoxidized soybean oil by Elf Atochem such as 7170 is a plasticizer that can be used as a stabilizer in images.

In an embodiment, one or more stabilizers which maintain, enhance or maintain and enhance the hardness of inventive images or parts thereof (such as surfaces), are used in inventive images, e.g., Ciba-Geigy's UV light stabilizers, and/or HALS. In an embodiment, one or more stabilizers which inhibit and/or protect against organic corrosion in inventive images or parts thereof are used in inventive images e.g., to inhibit corrosion in images in which cPRM is applied over metal substrates or image supports, for instance, such a stabilizer might be added into cPRM applied over steel, copper, brass, or aluminum substrates. As another example, such stabilizers might be used in cPRM which contains metal particles (e.g., dispersed, embedded or inlaid), and such stabilizers might be used in cPRM which is attached to metal in inventive images, e.g., as it forms or thereafter. More specific examples of such stabilizers are Ciba-Geigy's Irgacor® 153, Irgacor® 252, and Irganox® MD 1024 (preferred stabilizers).

In an embodiment, one or more stabilizers are used in cPRM of the present invention to control shrinkage as it cures. For example, milled fibers might be added into cPRM to control shrinkage. These might be glass fibers in powder or floccular form with different sizings, filament diameters and bulk densities. Further examples are polymers and other ingredients added into a larger quantity of cPRM to control shrinkage of the image. For instance, Owens Corning of Toledo, Ohio offers many milled fibers, e.g., Milled fiber #731EC 1/32" e.g., with cationic sizing, #731ED 1/32" e.g., with cationic sizing, #731ED 1/16" e.g., with cationic sizing, #731ED 1/8" e.g., with cationic sizing, #737BC 1/64" e.g., with silane sizing, #737BD 1/16" e.g., with silane sizing, #739DC 1/32" e.g., with silane sizing, #739EC 1/32" e.g., with silane sizing, #739DD 1/32" e.g., with silane sizing, and #739DD 1/16" e.g., with silane sizing.

In some embodiments, one or more stabilizers used in forming polymer of the present invention are moisture scavengers, including these examples from Aldrich: 3-Ethyl-2-methyl-2-(3-methylbutyl)oxazolidine; 3-Butyl-2-(1-ethylpentyl)oxazolidine; 5-Ethyl-2,8-diisopropyl-1-aza-3,7-dioxabicyclo[3.3.0]octane; alpha,alpha,4,4-Tetramethyl-2-(1-methylethyl)-N-(2-methylpropylidene)-3-oxazolidineethanamine; Bis[2-[2-(1-methylethyl)-3-oxazolidinyl]ethyl] 1,6-hexanediylbiscarbamate; as well as combinations thereof.

In some embodiments, one or more stabilizers used in PRM for making inventive images are inhibitors, e.g., free radical inhibitors. Examples of inhibitors for use as stabilizers in inventive images include Hydroquinone Monomethyl Ether (MEHQ), Methyl Ethyl Hydroquinone, Phenothiazine (PTZ); Phenothiazine; Methylhydroquinone; 2,4,6-Trimethylphenol Synonyms: (mesitol); 10-Methylphenothiazine; 4-Nitrophenol, sodium salt; 2,6-Di-tert-butyl-4-ethylphenol; and 2-(Trifluoromethyl)phenothiazine all of which are preferred; as well as 2-tert-Butyl-4-ethylphenol; Tetrachloro-1,4-benzoquinone Synonyms: (p-chloranil); 4-Nitrosophenol, sodium salt; Methyl-1,4-benzoquinone Synonyms: (p-toluquinone); 1,4-Benzoquinone Synonyms: (quinone); and combinations thereof. Most or all of which are offered by Aldrich. Among additional inhitibors are Hydroquinone (HQ) (preferred) and Hydroquinone monomethyl ether (MEHQ, 4-methoxyphenol), e.g., offered by Polysciences.

Eastman Chemical Company offers products which can be used as stabilizers in inventive images, such as Eastman Inhibitor RMB (e.g., used as an UV inhibitor) (Resorcinol Monobenzoate) $C_{13}H_{10}O_3$; and Eastman Inhibitor Poly TDP2000 (e.g., used as an antioxident) (Thiodipropionate Polyester) $C_{18}H_{38}O(C_{13}H_{21}O_4S)n$.

In an embodiment, one or more stabilizers which protect inventive images or parts thereof (such as their surfaces), against other kinds of changes (e.g., loss) in physical properties are used in inventive images. Ciba-Geigy's HALS are examples of such stabilizers. Further examples are milled fibers such as those described herein by Owens Corning which enhance mechanical properties, dimensional stability and heat resistance in polymers of inventive images. Among other examples, are impact modifiers such as Metablen® products by Elf Atochem of Philadelphia, Pa. For instance, Metablen® C-201 and C-202 are for example, MBS (MMA-Butadiene-Styrene core-shell copolymers) impact modifiers which enhance the strength of the polymer formed. Metablen® C-201 may for instance, add a blue fluorescence to the polymer which may also be desirable, (C-202 does not have this effect). Metablen® E products are for example, MBS impact modifiers conventionally used, e.g., for polyesters, polycarbonate, copolyesters, blends and styrenics. As another example, the craze resistance of Lucite® can be improved by adding the cross-linking agent stabilizer glycol dimethacrylate into the monomer. General Electric offers a series of Blendex® modifier resins which can be used as stabilizers in polymer in inventive images. These Blendex® products are for example, ABS based modifier resins: Blendex® MPE 1000; 200; 1000F; ADG21; 131; 360; 336; 415; 338; and 28940. Blendex® 703 and 586ES, e.g., are Alpha Methyl Styrene Acrylonitrile based—AMSAN. Blendex®975, e.g., is Acrylate Styrene Acrylonitrile based ASA. Blendex® 570, 576 and 581, e.g., are SAN face cut pellets. Blendex® 562, 563, and 564, e.g., are SAN fine particle beads. Blendex® 590, e.g., is Methyl Methacrylate Styrene Acrylonitrile MMASAN. Blendex® 598, e.g., is polystyrene, and Blendex® 869, e.g., is Styrene Acrylonitrile. Blendex® HPP801, HPP802, HPP804, e.g., are polycarbonate powders. Blendex® HPP820, HPP822 and HPP823, e.g., are polyphenylene ether powders. Examples of the conventional uses of Blendex® products in forming polymer are for enhancing impact strength, hot strength, processability, chemical resistance, heat distortion, melt flow, etc. Conventional uses of Blendex® in various polymers are described in a booklet copyright 1998 by General Electric Company entitled "GE Speciality Chemicals, Blendex® Modifier Resins Products and Applications."

In making inventive images, Tone® Monomer EC epsilon-Caprolactone and products derived from epsilon-Caprolactone including Tone® Polyols, Tone® Polymers (e.g., poly epsilon-Caprolactone) and modified acrylic monomers (e.g., Tone®) M-100 Monomer Caprolactone Acrylate Monomer), all by Union Carbide Corporation of Danbury, Conn. may be used as monomers, as polymers and/or as stabilizers. For instance, as intermediates and modifiers these products may improve the physical properties of polymers, such as flexibility, impact resistance, durability, and solvent and water resistance.

In an embodiment, one or more adhesion promoters are used as stabilizers in inventive images, e.g., to promote the adhesion of a polymer to a substrate. These are examples called "Adhesion Resins" offered by Creanova Inc. of Somerset, N.J. (a Hüls group company, soon to be associated with Degussa Corp instead). Adhesion Resin LTH may for example be a hard polyester resin that improves initial and long term adhesion. Both Adhesion Resin LTS and Adhesion Resin 2220, e.g., may improve the adhesion and flexibility of solvent based coatings. The Adhesion Resin 1270 may for example be a carboxyl acid functional resin, e.g, supplied as a 70% by weight solution in sec.-butanol. Adhesion Resin EP 2325 may for example be compatible with many cPRMs. Adhesion Resin EP3350 may for example improve initial and long term adhesion of radiation curing systems. Adhesion promoters are also available at Aldrich Chemical such as these examples: vinyltrimethoxysilane; 3-aminopropyltriethoxysilane; 3-aminopropyltrimethoxysilane; (3-chloropropyl)triethoxysilane; (3-chloropropyl)trimethoxysilane; and the like.

Creanova Inc. also makes other products which might be used in inventive images such as Vastagon EP-P-100, e.g., a flexibilizing additive, and two speciality resins called Synthetic Resin CA and Synthetic Resin TC, e.g., which can enhance gloss, hardness and adhesion in polymer. Synthetic Resin CA is for example, a neutral unsaponifiable cyclohexanone-aldehyde resin with low color and excellent light stability. Synthetic Resin TC is for example, a ketone aldehyde resin with wide compatibility.

In an embodiment, one or more products made or sold for use as antiozonants are stabilizers (e.g., antioxidants) in inventive images, e.g., Santoflex 1350PD by Flexsys America LP (a preferred stabilizer). In a preferred embodiment, one or more antioxidants are used as stabilizers in inventive images, e.g., to prevent or control yellowing and other discoloration caused by heat. Examples of these stabilizers are provided herein, as in the following lists.

Further examples of stabilizers for use in inventive images includes one or more of:

(i) Alkylated monophenols such as 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2,6-dioctadecyl-4-methylphenol; 2,4,6-tricyclohexylphenol; 2,6-di-tert-butyl-4-methoxymethylphenol; nonylphenols which are linear or branched in the side chains such as 2,6-di-nonyl-4-methylphenol; 2,4-dimethyl-6-(1-methylundec-1-yl)phenol; 2,4-dimethyl-6-(1-methylheptadec-1-yl)phenol; 2,4-dimethyl-6-(1-methyltridec-1-yl)phenol; and mixtures thereof.

(ii) Alkylthiomethylphenols such as 2,4-dioctylthiomethyl-6-tert-butylphenol; 2,4-dioctylthiomethyl-6-methylphenol; 2,4-bis(octylthiomethyl)-6-ethylphenol; 2,6-bis (dodecylthiomethyl)-4-nonylphenol; and mixtures thereof.

(iii) Hydroquinones and alkylated hydroquinones such as 2,6-di-tert-butyl-4-methoxyphenol; 2,5-di-tert-butylhydroquinone; 2,5-di-tert-amylhydroquinone; 2,6-diphenyl-4-octadecyloxyphenol; 2,6-di-tert-butylhydroquinone; 2,5-di-tert-butyl-4-hydroxyanisole; 3,5-di-tert-butyl-4-hydroxyanisole; 3,5-di-tert-butyl-4-hydroxyphenyl stearate; bis(3,5-di-tert-butyl-4-hydroxyphenyl)adipate; and mixtures thereof.

(iv) Tocopherols such as alpha, beta, gamma, and delta-tocopherol and mixtures thereof (vitamin E).

(v) Hydroxylated thiodiphenyl ethers such as 2,2'-thiobis(6-tert-butyl-4-methylphenol); 2,2'-thiobis(4-octylphenol); 4,4'-thiobis(6-tert-butyl-3-methylphenol); 4,4'-thiobis(6-tert-butyl-2-methylphenol); 4,4'-thiobis(3,6-di-sec-amylphenol); 4,4'-bis(2,6-dimethyl-4-hydroxyphenyl)disulfide; and mixtures thereof.

(vi) Alkylidenebisphenols such as 2,2'-methylenebis(6-tert-butyl-4-methylphenol); 2,2'-methylenebis(6-tert-butyl-4-ethylphenol); 2,2'-methylenebis(4-methyl-6-cyclohexylphenol); 2,2'-methylenebis(6-nonyl-4-methylphenol); 2,2'-methylenebis(4,6-di-tert-butylphenol); 2,2'-ethylidenebis(4,6-di-tert-butylphenol); 2,2'-ethylidenebis(6-tert-butyl-4-isobutylphenol); 4,4'-methylenebis(2,6-di-tert-butylphenol); 4,4'-methylenebis(6-tert-butyl-2-methylphenol); 1,1-bis(5-tert-butyl-4-hydroxy-2-methylphenyl)butane; 2,6-bis(3-tert-butyl-5-methyl-2-hydroxylbenzyl)-4-methylphenol; 1,1,3-tris(5-tert-butyl-4-hydroxy-2-methylphenyl)butane; 1,1-bis (5-tert-butyl-4-hydroxy-2-methylphenyl)-3-n-dodecylmercaptobutane; ethylene glycol bis[3,3-bis(3'-tert-butyl-4'-hydroxyphenyl)butyrate], bis(3-tert-butyl-4-hydroxy-5-methylphenyl)dicyclopentadiene; bis[2-(3'-tert-butyl-2'-hydroxy-5'-methylbenzyl)-6-tert-butyl-4-methylphenyl]terephthalate; 1,1-bis(3,5-dimethyl-2-hydroxyphenyl)butane; 2,2-bis(3,5-di-tert-butyl-4-hydroxyphenyl)propane; 2,2-bis(5-tert-butyl-4-hydroxy-2-methylphenyl)-4-n-dodecylmercaptobutane; 1,1,5,5-tetra(5-tert-butyl-4-hydroxy-2-methylphenyl)pentane; and mixtures thereof.

(vii) O-,—and S-benzyl compounds such as 3,5,3',5'-tetra-tert-butyl-4,4'-dihydroxydibenzyl ether; octadecyl-4-hydroxy-3,5-dimethylbenzylmercaptoacetate; tridecyl-4-hydroxy-3,5-di-tert-butylbenzylmercaptoacetate; tris(3,5-di-tert-butyl-4-hydroxybenzyl)amine; bis(4-tert-butyl-3-hydroxy-2,6-dimethylbenzyl)dithioterephthalate; bis(3,5-di-tert-butyl-4-hydroxybenzyl)sulfide; isooctyl-3,5-di-tert-butyl-4-hydroxybenzylmercaptoacetate; and mixtures thereof.

(viii) Hydroxybenzylated malonates such as dioctadecyl 2,2-bis(3,5-di-tert-butyl-2-hydroxybenzyl)malonate; dioctadecyl 2-(3-tert-butyl-4-hydroxy-5-methylbenzyl)malonate; didodecyhnercaptoethyl 2,2-bis(3,5-di-tert-butyl-4-hydroxybenzyl)malonate; bis[4-(1,1,3,3-tetramethylbutyl)phenyl] 2,2-bis(3,5-di-tert-butyl-4-hydroxybenzyl) malonate; and mixtures thereof.

(ix) Aromatic hydroxybenzyl compounds such as 1,3,5-tris (3,5-di-tert-butyl-4-hydroxybenzyl)-2,4,6-trimethylbenzene; 1,4-bis(3,5-di-tert-butyl-4-hydroxybenzyl)-2,3,5,6-tetramethylbenzene; 2,4,6-tris(3,5-di-tert-butyl-4-hydroxybenzyl)phenol; and mixtures thereof.

(x) Triazine compounds such as 2,4-bis(octylmercapto-6-(3,5-di-tert-butyl-4-hydroxyanilino)-1,3,5-triazine; 2-octylmercapto-4,6-bis(3,5-di-tert-butyl-4-hydroxyanilino)-1,3,5-triazine; 2-octylmercapto-4,6-bis(3,5-di-tert-butyl-4-hydroxyphenoxy)-1,3,5-triazine; 2,4,6-tris(3,5-di-tert-butyl-4-hydroxyphenoxy)-1,3,5-triazine; 1,3,5-tris(3,5-di-tert-butyl-4-hydroxybenzyl)isocyanurate; 1,3,5-tris(4-tert-butyl-3-hydroxy-2,6-dimethylbenzyl)isocyanurate; 2,4,6-tris(3,5-di-tert-butyl-4-hydroxyphenylethyl)-1,3,5-triazine; 1,3,5-tris(3,5-di-tert-butyl-4-hydroxyphenylpropionyl)-hexahydro-1,3,5-triazine; 1,3,5-tris(3,5-dicyclohexyl-4-hydroxybenzyl)isocyanurate; and mixtures thereof.

(xi) Benzylphosphonates such as dimethyl 2,5-di-tert-butyl-4-hydroxybenzylphosphonate; diethyl 3,5-di-tert-butyl-4-hydroxybenzylphosphonate; dioctadecyl 3,5-di-tert-butyl-4-hydroxybenzylphosphonate; dioctadecyl 5-tert-butyl-4-hydroxy-3-methylbenzylphosphonate; the calcium salt of the monoethyl ester of 3,5-di-tert-butyl-4-hydroxybenzylphosphonic acid; and mixtures thereof.

(xii) Acylaminophenols such as 4-hydroxylauranilide; 4-hydroxystearanilide; octyl N-(3,5-di-tert-butyl-4-hydroxyphenyl)carbamate, and mixtures thereof.

(xiii) Esters of (3,5-di-tert-butyl-4-hydroxyphenyl)propionic acid with mono- or polyhydric alcohols such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane 4-hydroxymethyl-1-phospha-2,6,7-trioxabicyclo[2.2.2]octane, and mixtures thereof.

(xiv) Esters of (5-tert-butyl-4-hydroxy-3-methylphenyl)propionic acid with mono- or polyhydric alcohols such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane 4-hydroxymethyl-1-phospha-2,6,7-trioxabicyclo[2.2.2]octane, and mixtures thereof (xv) Esters of (3,5-dicyclohexyl-4-hydroxyphenyl)propionic acid with mono- or polyhydric alcohols such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)-oxamide, 3-thiaundecanol, 3-thiapentadecanol, trimethylhexanediol, trimethylolpropane 4-hydroxymethyl-1-phospha-2,6,7-trioxabicyclo[2.2.2]octane, and mixtures thereof.

(xvi) Esters of 3,5-di-tert-butyl-4-hydroxyphenylacetic acid with mono- or polyhydric alcohols such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane; and mixtures thereof.

(xvii) Amides of (3,5-di-tert-butyl-4-hydroxyphenyl)propionic acid such as N,N'-bis(3,5-di-tert-butyl-4-hydroxyphenylpropionyl)hexamethylenediamine; N,N'-bis(3,5-di-tert-butyl-4-hydroxyphenylpropionyl)trimethylenediamine; N,N'-bis(3,5-di-tert-butyl-4-hydroxyphenylpropionyl)hydrazine; and mixtures thereof.

(xviii) Ascorbic acid (Vitamin C).

(xix) Aminic antioxidants such as N,N'-diisopropyl-p-phenylenediamine; N,N'-di-sec-butyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N,N'-dicyclohexyl-p-phenylenediamine; N,N'-diphenyl-p-phenylenediamine; N,N'-bis(2-naphthyl)-p-phenylenediamine; N-isopropyl-N'-phenyl-p-phenylenediamine; N-(1,3-dimethylbutyl)-N'-phenyl-p-phenylenediamine; N-(1-methylheptyl)-N'-phenyl-p-phenylenediamine; N-cyclohexyl-N'-phenyl-p-phenylenediamine; 4-(p-toluenesulfonamoyl)diphenylamine; N,N'-dimethyl-N,N'-di-sec-butyl-p-phenylenediamine; diphenylamine; N-allyldiphenylamine; 4-isopropoxydiphenylamine; N-phenyl-1-naphthylamine; N-(4-tert-octylphenyl)-1-naphthylamine; N-phenyl-2-naphthylamine; octylated diphenylamine such as p,p'-di-tert-octyldiphenylamine; 4-n-butylaminophenol; 4-butyrylaminophenol; 4-nonanoylaminophenol; 4-dodecanoylaminophenol; 4-octadecanoylaminophenol; bis(4-methoxyphenyl)amine; 2,6-di-tert-butyl-4-dimethylaminomethylphenol; 2,4'-diaminophenylmethane; 4,4'-diaminodiphenylmethane; N,N,N',N'-tetramethyl-4,4'-diaminodiphenylmethane; 1,2-bis[(2-methylphenyl)amino]ethane; 1,2-bis(phenylamino)propane; (o-tolyl)biguanide; bis[4-(1',3'-dimethylbutyl)phenyl]amine; tert-octylated N-phenyl-1-naphthylamine; a mixture of mono- and dialkylated tert-butyl/tert-octyldiphenylamines, a mixture of mono- and dialkylated nonyldiphenylamines; a mixture of mono- and dialkylated dodecyldiphenylamines; a mixture of mono- and dialkylated isopropyl/isohexyldiphenylamines, a mixture of mono- and dialkylated tert-butyldiphenylamines; 2,3-dihydro-3,3-dimethyl-4H-1,4-benzothiazine; phenothiazine; a mixture of mono- and dialkylated tert-butyl/tert-octyl phenothiazines; a mixture of mono- and dialkylated tert-octylphenothiazines; N-allylphenothiazine; N,N,N',N'-tetraphenyl-1,4-diaminobut-2-ene; N,N-bis(2,2,6,6-tetramethylpiperid-4-yl)hexamethylenediamine; bis(2,2,6,6-tetramethylpiperid-4-yl)sebacate; 2,2,6,6-tetramethylpiperidin-4-one; 2,2,6,6-tetramethylpiperidin-4-ol; and mixtures thereof.

Other suitable antioxidants available from Aldrich include: 1,1,3-Tris(2-methyl-4-hydroxy-5-tert-butylphenyl)butane; 2,6-Di-tert-butyl-4-(dimethylaminomethyl)phenol; Pentaerythritol tetrakis(3,5-di-tert-butyl-4-hydroxyhydrocinnamate); Dioctadecyl 3,3-thiodipropionate; Tris(4-tert-butyl-3-hydroxy-2,6-dimethylbenzyl) isocyanurate; Tris(3,5-di-tert-butyl-4-hydroxybenzyl) isocyanurate; Octadecyl 3-(3,5-di-tert-butyl-4-bydroxyphenyl)propionate; 2,2-Methylenebis(6-tert-butyl-4-ethylphenol); 2-Heptanone oxime; 2,2-Methylenebis(6-tert-butyl-4-methylphenol); 1,3,5-Trimethyl-2,4,6-tris(3,5-di-tert-butyl-4-hydroxybenzyl)benzene; Ditetradecyl 3,3-thiodipropionate; Didodecyl 3,3-thiodipropionate; 2,2-Ethylidenebis(4,6-di-tert-butylphenyl) fluorophosphite; Tetrakis(2,4-di-tert-butylphenyl)-4,4-biphenyldiphosphonite; 3,9-Bis(2,4-dicumylphenoxy)-2,4,8,10-tetraoxa-3,9-diphosphaspiro[5.5]undecane; 2,5-Di-tert-butyl-4-methoxyphenol Synonyms: (2,5-di-tert-butyl-4-hydroxyanisole) (preferred), e.g., for use as an antioxidant, free radical inhibitor; 2,6-Di-tert-butyl-4-methylphenol Synonyms: (BHT, butylated hydroxytoluene, 2,6-di-tert-butyl-p-cresol) (preferred), e.g., for use as an anti-oxidant, free radical inhibitor; Ditridecyl 3,3-thiodipropionate; 5-Ethyl-1-aza-3,7-dioxabicyclo[3.3.0]octane; 1-Aza-3,7-dioxabicyclo[3.3.0]octane-5-methanol; 4-Methyl-2-pentanone oxime; and the like, and combinations of these.

Additional antioxidants from Cytec Industries Inc. in West Paterson, N.J. are: Cyanox®425, e.g., 2,2'-Methylenebis(4-ethyl-6-tert-butylphenol) (preferred), $C_{25}H_{36}O_2$; Cyanox 711, e.g., (Ditridecyl thiodipropionate),$C_{32}H_{62}O_4S$; Cyanox 1212, e.g., Mixed Lauryl-Stearyl thiodipropionate, C36H70O$_4$S; Cyanox® 1790, e.g., 1,3,5-Tris(4-tert-butyl-3-hydroxy-2,6-dimethyl benzyl)-hexahydro 1,3,5-triazine-2,4,6-trione (preferred), $C_{42}H_{57}N_3O_6$; Cyanox 2246, e.g., 2,2'-Methylenebis(4-methyl-6-tert-butylphenol) (preferred), $C_{23}H_{32}O_2$; Cyanox 2777, e.g., a 1:2 blend of Cyanox 1790 (see above) and phosphites with chemical name Tris (2,4-di-t-butylphenyl) phosphite; Cyanox STDP, e.g., (Distearyl thiodipropionate), $C_{42}H_{82}O_4S$; Cyanox LTDP, e.g., (Dilauryl thiodipropionate), $C_{30}H_{58}O_4S$; Cyanox 1741, e.g., (a high molecular weight hindered phenol) $C_{48}H_{69}N_3O_6$; and the like.

Aceto Corp. offers products for inventive images such as these antioxidants: 2,6-Ditertiary Butyl-4-Ethyl Phenol (BHEB) and 2,6-Ditertiary Butyl-p-Cresol (BHT).

Ultranox® and Weston® antioxidants from General Electric Company of Parkersburg, W.Va. and Morgantown, W.Va. may be used as stabilizers for inventive images, such as these examples: Ultranox 626, 626A, 627A, e.g., Bis (2,4-di-t-butylphenol) Pentaerythritol Diphosphite; Ultranox 641, e.g., 2,4,6 tri-t-butylphenyl 2 butyl 2 ethyl 1,3 propane diol phosphite; Ultranox 210, e.g., Tetrakis [methylene (3,5-di-tert-butyl-4-hydroxyhydrocinnamate)] methane; Ultranox 276, e.g., Octadecyl 3,5 di-tert-butyl-4-hydroxyhydrocinnamate (preferred); Ultranox 815A and 815P, e.g., 1:1 blends of Ultranox 626 and 210; Ultranox 817A and 817P, e.g., 2:1 blends of Ultranox 626 and 210; Ultranox 875A and 875P, e.g., 1:1 blends of Ultranox 626 and 276; Ultranox 877A and 877P, e.g., 2:1 blends of Ultranox 626 and 276; Ultranox 2714A and 2714P, e.g., 4:4:1 blends of Ultranox 626 and 210 antioxidants, and DHT-4A; and the like. Also, Weston 618F, e.g., Distearyl Pentaerythritol Diphosphite; Weston 619F, e.g., same as 618F but also contains not more than 1% by weight Triisopropanolamine; Weston DOPI, e.g., Diisooctyl Phosphite; Weston PTP, e.g., Heptakis (dipropyleneglycol) Triphosphite; Weston TDP, e.g., Triisodecyl Phosphite, $(C_{10}H_{21}O)_3P$; Weston TIOP, e.g., Triisooctyl Phosphite, $(C_8H_{17}O)_3P$; Weston TLP, e.g., Trilauryl Phosphite, $(C_{12}H_{25}O)_3P$; Weston 430, e.g. Tris (dipropyleneglycol) Phosphite; Weston 600, e.g., Diisodecyl Pentaerythritol Diphosphite; Weston DPP, e.g., Diphenyl Phosphite (preferred); Weston EGTPP, e.g. Epoxy Grade Triphenyl Phosphite may contains approximately 0.50% by weight Triisopropanolamine; Weston TPP, e.g., Triphenyl Phosphite, $(C_6H_5O)_3P$; Weston TNPP, e.g., Tris (Nonylphenyl) Phosphite; Weston 399, e.g., same as TNPP but with approx. 0.75% by weight Triisopropanolamine; Weston DHOP, e.g., Poly (dipropyleneglycol) Phenyl Phosphite; Weston DPDP, e.g., Diphenyl Isodecyl Phosphite, $(C_6H_5O)_2POC_{10}H_{21}$; Weston ODPP, e.g., Diphenyl Isooctyl Phosphite, $(C_6H_5O)_2POC_8H_{17}$; Weston PDDP, e.g., Phenyl Diisodecyl Phosphite, $(C_{10}H_{21}O)_2POC_6H_5$; Weston PNPG, e.g., Phenyl Neopentylene Glycol Phosphite; Weston THOP, e.g., Tetraphenyl Dipropyleneglycol Diphosphite, $(C_6H_5O)_2P-OC_3H_6C_3H_6O-P(OC_6H_5)_2$; Weston, e.g., 439 Poly 4,4' Isopropylidenediphenol $C_{12-15}$ Alcohol Phosphite; Weston 494, e.g., Diisooctyl Octylphenyl Phosphite; Weston TLTTP, e.g., Trilauryl Trithiophosphite, $[CH_3(CH_2)_{11}S]_3P$; and the like.

These are examples of stabilizers offered by Buckman Laboratories International Inc. in Memphis, Tenn. which can be used in inventive images. Busan® 11-M1, e.g., an UV light stabilizer, preservative, corrosion inhibitor, mold inhibitor, tannin stain blocking agent, flame retardant and white rust inhibitor. Busan® 11-M2, e.g., an UV light stabilizer, corrosion inhibitor, tannin stain blocking agent, and flame retardant. Both of these products may for example, be made with 90% Barium metaborate monohydrate (the ingredients of the remaining 10% is proprietary information). Among other products by Buckman which might be used in inventive images are their Butrol® inhibitors (e.g., for corrosion) and their Bubreak® defoamers.

Elf Atochem North America Inc. in Philadelphia, Pa. offers stabilizers which can be used in inventive images. Examples are Thermolite®, Stavinor® and Metablend® products. For example, Thermolite®390 are 395, e.g., both sulfur containing organotin heat stabilizers, for example, recommended for PVC. Also, Thermolite®890 is for example, a heat stabilizer which combines the heat stabilizing properties of both di-n-octyl tin and mono-n-octyl tin compounds.

Optima International in Denver, Colo. offers stabilized polymer coatings, most of which are clear, and all of which can be used in inventive images, however their use images is not limited at all, e.g., these products may be used for top coats, underlayers, other inner coats, image structure or a combination of these purposes. For example, Optima's Maxim XE™, e.g., is a stabilized, highly flexible HALS acrylic, which is colorless, non-yellowing and odorless, which contains UV light absorbers or UVLA that absorb UV radiation, dissipating it as harmless levels of heat within the acrylic. Maxim XE™ is for example, anti-fungal, and resistant to water, smog, abrasion, heat and humidity, e.g., Maxim XE™ is 35% acrylic to accommodate a high percentage of UVLAs and HALS. Optima's Ultra™ is their "100 year" polymer, e.g., it is highly flexible, UV/LS stain, colorless, odorless and antifungal.

Flexsys America LP in Akron, OH offers many antioxidant and antiozonant stabilizers for inventive images, including: Santonox TBMC for example, 4,4'-Thiobis(6-tert-butyl-m-cresol) (generic abbreviation: TBMC); sulfur bridged bisphenol, might be used as antioxidant for forestalling degradation caused by processing heat and UV light in outdoor aging, e.g., in polyethylene; Santowhite BBMC for example, is 4-4'-Butylidenebis(6-tert-butyl-m-cresol) generic abbreviation: BBMC, Alkyl Bridged Bisphenol, e.g., for thermoplastics such as ABS and polyolefins; Flectol TMQ, e.g., 2,2,4-Trimethyl-1,2-dihydroquinoline, polymerized, abbreviation: TMQ, Quinoline; Permanax ODPA, e.g., Octylated diphenylamine generic abbreviation: ODPA, Octylated Diphenyl Amine might be used for antioxident and antiflex cracking resistance in light colored and black compounds, effective in many compounds; Santoflex IPPD, e.g., N-Isopropyl-N'-phenyl-p-phenylenediamine Generic Abbreviation: IPPD; Santoflex 434PD, e.g., Blend of alkyl-aryl- and dialkyl paraphenylenediamines, or blend of alkyl-aryl- and dialkyl-p-phenylenediamines; Santoflex 6PPD, e.g., N-(1,3-Dimethylbutyl)-N'-phenyl-p-phenylenediamine Generic Abbreviation 6PPD, might be used for dynamic and intermittent ozone resistance, as a styrene butadiene rubber SBR stabilizer, as a monomer polymerization inhibitor which provides flexfatigue and oxidation resistance even at low concentrations; Santoflex 77PD, e.g., N,N'Bis(1,4-dimethylpentyl)-p-phenylenediamine, Generic Abbreviation: 77PD; Santoflex 1350PD, (a preferred stabilizer), e.g., blend of alkyl-aryl-p-phenylenediamines, might be used as an antioxidant, as an antiozonant/antiflex agent, as a polymerization inhibitor for monomers, and as a styrene butadiene rubber SBR stabilizer; and combinations thereof.

Further examples of UV-absorbers and light stabilizers for use as desired in inventive images are:

(i) 2-(2'-Hydroxyphenyl)benzotriazoles such as 2-(2'-hydroxy-5'-methylphenyl)-benzotriazole; 2-(3',5'-di-tert-butyl-2'-hydroxyphenyl)benzotriazole; 2-(5'-tert-butyl-2-hydroxyphenyl)benzotriazole; 2-(2'-hydroxy-5'-(1,1,3,3-tetramethylbutyl)phenyl)benzotriazole; 2-(3',5'-di-tert-butyl-2'-hydroxyphenyl)-5-chlorobenzotriazole; 2-(3'-tert-butyl-2'-hydroxy-5'-methylphenyl)-5-chloro-benzotriazole; 2-(3'-sec-butyl-5'-tert-butyl-2'-hydroxyphenyl)-benzotriazole; 2-(2'-hydroxy-4'-octoxyphenyl)benzotriazole; 2-(3',5'-di-tert-amyl-2'-hydroxphenyl)benzotriazole; a mixture of 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2- methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole and 2-(3'-tert-butyl-2'-hydroxy-5'-(2-isooctyloxycarbonylethyl)phenylbenzotriazole; 2,2-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]benzotriazole with polyethylene glycol 300; [R—CH$_2$CH—COO(CH$_2$)$_3$]$_2$—where R=3'-tert-butyl-4'-hydroxy-5'-2H-benzotriazol-2-ylphenyl; and mixtures thereof.

(ii) 2-Hydroxybenzophenones, for example the 4-hydroxy, 4-methoxy, 4-octoxy, 4-decyloxy, 4-dodecyloxy, 4-benzyloxy, 4,2',4'-trihydroxy 2'-hydroxy-4,4'-dimethoxy derivative; and mixtures thereof.

(iii) Esters of substituted and unsubstituted benzoic acids such as 4-tert-butyl-phenyl salicylate; phenyl salicylate; octylphenyl salicylate; dibenzoyl resorcinol; bis(4-tert-butylbenzoyl)resorcinol; benzoylresorcinol; 2,4-di-tert-butylphenyl 3,5-di-tert-butyl-4-hydroxybenzoate; hexadecyl 3,5-di-tert-butyl-4-hydroxybenzoate; octadecyl 3,5-di-tert-butyl-4-hydroxybenzoate; 2-methyl-4,6-di-tert-butylphenyl 3,5-di-tert-butyl-4-hydroxybenzoate; and mixtures thereof.

(iv) Acrylates such as ethyl cyanodiphenylacrylate; isooctyl cyanodiphenylacrylate; methyl carbomethoxycinnamate; methyl cyano-methyl-p-methoxycinnamate; butyl-cyano-methyl-p-methoxycinnamate; methyl-carbomethoxy-p-methoxycinnamate; N-(carbomethoxy-cyanovinyl)-2-methylindoline; and mixtures thereof.

(v) Nickel compounds such as nickel complexes of 2,2'-thio-bis-[4-(1,1,3,3-tetramethylbutyl)phenol], including the 1:1 or 1:2 complex, with or without additional ligands such as n-butylamine, triethanolamine or N-cyclohexyldiethanolamine; nickel dibutyldithiocarbamate; nickel salts of monoalkyl esters including the methyl or ethyl ester of 4-hydroxy-3,5-di-tert-butylbenzylphosphonic acid; nickel complexes of ketoximes including 2-hydroxy-4-methylphenyl undecyl ketoxime; nickel complexes of 1-phenyl-4-lauroyl-5-hydroxypyrazole, with or without additional ligands, and mixtures thereof.

(vi) Sterically hindered amines as well as the N derivatives thereof (e.g., N-alkyl, N-hydroxy, N-alkoxy and N-acyl), such as bis(2,2,6,6-tetramethylpiperidin-4-yl) sebacate; bis (2,2,6,6-tetramethylpiperidin-4-yl)succinate; bis(1,2,2,6,6-pentamethylpiperidin-4-yl)sebacate; bis(1-octyloxy-2,2,6,6-tetramethylpiperidin-4-yl)sebacate; bis(1,2,2,6,6-pentamethylpiperidin-4-yl) n-butyl 3,5-di-tert-butyl-4-hydroxybenzylmalonate; the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; the condensate of N,N'-bis(2,2,6,6-tetramethylpiperidin-4-yl)hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino) ethane; the condensate of 2-chloro-4,6-bis(4-n-butylamino-1,2,2,6,6-pentamethylpiperidyl)-1,3,5-triazine and 1,2-bis-(3-aminopropylamino)ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; the condensate of N,N'-bis(2,2,6,6-tetramethylpiperidin-4-yl)hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines or so-called PIP-T HALS, e.g., GOODRITE® 3034, 3150 and 3159 and similar materials disclosed in U.S. Pat. No. 5,071,981; photobondable HALS such as SANDUVOR® PR-31 and PR-32 (Clariant Corp.) and similar materials disclosed in GB-A-2269819; the reaction product of 7,7,9,9-tetramethyl-2-cycloundecyl-1-oxa-3,8-diaza-4-oxospiro[4.5]decane and epichlorohydrin; and mixtures thereof. See also generally U.S. Pat. No. 4,619,956, U.S. Pat. No. 5,106,891, GB-A-2269819, EP-A-0309400, EP-A-0309401, EP-A-0309402 and EP-A-0434608, which are incorporated herein by express reference thereto.

(vii) Oxamides such as 4,4'-dioctyloxyoxanilide; 2,2'-diethoxyoxanilide; 2,2'-dioctyloxy-5,5'-di-tert-butoxanilide; 2,2'-didodecyloxy-5,5'-di-tert-butyloxanilide; 2-ethoxy-2'-ethyloxanilide; N,N'-bis(3-dimethylaminopropyl)oxamide; 2-ethoxy-5-tert-butyl-2'-ethyloxanilide and its mixture with 2-ethoxy-2'-ethyl-5,4'-di-tert-butoxanilide; mixtures of o- and p-methoxy disubstituted oxanilides; and mixtures thereof.

(viii) 2-(2-Hydroxyphenyl)-1,3,5-triazines disclosed in the previously incorporated references, such as 2,4,6-tris(2-hydroxy-4-octyloxyphenyl)-1,3,5-triazine; 2-(2-hydroxy-4-n-octyloxyphenyl)-4,6-bis(2,4-dimethylphenyl)-1,3,5-triazine; 2-(2-hydroxy-4-(mixed iso-octyloxyphenyl)-4,6-bis(2,4-dimethylphenyl)-1,3,5-triazine; 2-(2,4-dihydroxyphenyl)-4,6-bis(2,4-dimethylphenyl)-1,3,5-triazine; 2,4-bis(2-hydroxy-4-propyloxyphenyl)-6-(2,4-dimethylphenyl)-1,3,5-triazine; 2-(2-hydroxy-4-octyloxyphenyl)-4,6-bis(4-methylphenyl)-1,3,5-triazine; 2-(2-hydroxy-4-dodecyloxyphenyl)-4,6-bis(2,4-dimethylphenyl)-1,3,5-triazine; 2-(2-hydroxy-4-tridecyloxyphenyl)-4,6-bis(2,4-dimethylphenyl)-1,3,5-triazine; 2-[2-hydroxy-4-(2-hydroxy-3-butyloxypropyloxy)phenyl]-4,6-bis(2,4-dimethylphenyl)-1,3,5-triazine; 2-[2-hydroxy-4-(2-hydroxy-3-octyloxypropyloxy)-phenyl]-4,6-bis(2,4-dimethylphenyl)-1,3,5-triazine; 2-[4-dodecyloxy/tridecyloxy-2-hydroxypropoxy)-2-hydroxyphenyl]-4,6-bis(2,4-dimethylphenyl)-1,3,5-triazine; 2-[2-hydroxy-4-(2-hydroxy-3-dodecyloxypropoxy)phenyl]-4,6-bis(2,4-dimethylphenyl)-1,3,5-triazine; 2-(2-hydroxy-4-hexyloxy)phenyl-4,6-diphenyl-1,3,5-triazine; 2-(2-hydroxy-4-methoxyphenyl)-4,6-diphenyl-1,3,5-triazine; 2,4,6-tris[2-hydroxy-4-(3-butoxy-2-hydroxypropoxy)phenyl]-1,3,5-triazine; 2-(2-hydroxyphenyl)-4-(4-methoxyphenyl)-6-phenyl-1,3,5-triazine; and mixtures thereof.

Additional examples of stabilizers for use as desired in inventive images:

(a) Metal deactivators such as N,N'-diphenyloxamide; N-salicylal-N'-salicyloyl hydrazine; N,N'-bis(salicyloyl)hydrazine; N,N'-bis(3,5-di-tert-butyl-4-hydroxyphenylpropionyl)hydrazine; 3-salicyloyl amino-1,2,4-triazole; bis(benzylidene) oxalyl dihydrazide; oxanilide; isophthaloyl dihydrazide; sebacoyl bisphenylhydrazide; N,N'-diacetyladipoyl dihydrazide; N,N'-bis(salicyloyl)oxalyl dihydrazide; N,N'-bis(salicyloyl)thiopropionyl dihydrazide; and mixtures thereof.

(b) Phosphites and phosphonites, such as triphenyl phosphite; diphenyl alkyl phosphites; phenyl dialkyl phosphites; tris(nonylphenyl) phosphite; trilauryl phosphite; trioctadecyl phosphite; distearyl pentaerythritol diphosphite; tris(2,4-di-tert-butylphenyl)phosphite; diisodecyl pentaerythritol diphosphite; bis(2,4,-di-tert-butylphenyl) pentaerythritol diphosphite; bis(2,6-di-tert-butyl-4-methylphenyl)pentaerythritol diphosphite; bis(isodecyloxy)pentaerythritol diphosphite; bis(2,4-di-tert-butyl-6-methylphenyl) pentaerythritol diphosphite; bis(2,4,6-tris(tert-butyl)phenyl) pentaerythritol diphosphite; tristearyl sorbitol triphosphite; tetrakis(2,4-di-tert-butylphenyl)-4,4'-biphenylene diphosphonite; 6-isooctyloxy-2,4,8,10-tetra-tert-butyl-12H-dibenzo[d,g]-1,3,2-dioxaphosphocin; 6-fluoro-2,4,8,10-tetra-tert-butyl-12-methyl-dibenzo[d,g]-1,3,2-dioxaphosphocin; bis(2,4-di-tert-butyl-6-methylphenyl) methylphosphite; bis(2,4-di-tert-butyl-6-methylphenyl) ethylphosphite; and mixtures thereof.

(c) Hydroxylamines such as N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecyl-hydroxylamine; N-heptadecyl-N-octadecylhydroxylamine; N,N-dialkylhydroxylamine derived from hydrogenated tallow fatty amines; and mixtures thereof (d) Nitrones such as N-benzyl-alpha-phenyl nitrone; N-ethyl-alpha-methyl nitrone; N-octyl-alpha-heptyl nitrone; N-lauryl-alpha-undecyl nitrone; N-tetradecyl-alpha-tridecyl nitrone; N-hexadecyl-alpha-pentadecyl nitrone; N-octadecyl-alpha-heptadecyl nitrone; N-hexadecyl-alpha-heptadecyl nitrone; N-octadecyl-alpha-pentadecyl nitrone; N-heptadecyl-alpha-heptadecyl nitrone; N-octadecyl-alpha-hexadecyl nitrone; nitrones derived from N,N-dialkylhydroxylamines prepared from hydrogenated tallow fatty amines; and mixtures thereof.

(e) Thiosynergists such as dilauryl thiodipropionate, distearyl thiodipropionate, and mixtures thereof.

(f) Peroxide scavengers such as esters of thiodipropionic acid, for example the lauryl, stearyl, myristyl or tridecyl esters; mercaptobenzimidazole or the zinc salt of 2-mercaptobenzimidazole; zinc dibutyldithiocarbamate; dioctadecyl disulfide; pentaerythritol tetrakis(dodecylmercapto)propionate; and mixtures thereof.

(g) Polyamide stabilizers such as copper salts in combination with iodides and/or phosphorus compounds; salts of divalent manganese; and mixtures thereof.

(h) Basic co-stabilizers such as melamine; polyvinylpyrrolidone; dicyandiamide; triallyl cyanurate; urea derivatives; hydrazine derivatives; amines; polyamides; polyurethanes; alkali metal salts and alkaline earth metal salts of higher fatty acids, for example calcium stearate, zinc stearate, magnesium behenate, magnesium stearate, sodium ricinoleate and potassium palmitate; antimony pyrocatecholate; tin pyrocatecholate; and mixtures thereof.

(i) Nucleating agents including inorganic substances such as talc and metal oxides (e.g., titanium oxide or magnesium oxide), phosphates, carbonates and sulfates of, preferably, alkaline earth metals, and mixtures thereof; organic compounds such as mono- or polycarboxylic acids and salts thereof, for example 4-tert-butylbenzoic acid, adipic acid, diphenylacetic acid, sodium succinate, sodium benzoate, and mixtures thereof; polymeric compounds such as ionic copolymers ("ionomers") and mixtures thereof; and mixtures thereof.

(j) Fillers and reinforcing agents such as calcium carbonate; silicates; glass fibers; asbestos; talc; kaolin; mica; barium sulfate; metal oxides and hydroxides; carbon black; graphite; wood flour and flours or fibers from other natural products; synthetic fibers; and mixtures thereof. Refer to further descriptions of fillers herein.

(k) Other additives such as plasticizers, lubricants, emulsifiers, pigments, Theological additives, catalysts, levelling assistants, optical brighteners, flameproofing agents, antistatic agents, blowing agents, and mixtures thereof.

(l) Benzofuranones and indolinones such as those disclosed in U.S. Pat. No. 4,325,863, U.S. Pat. No. 4,338,244, U.S. Pat. No. 5,175,312, U.S. Pat. No. 5,216,052, U.S. Pat. No. 5,252,643, DE-A-4316611, DE-A-4316622, DE-A-4316876, EP-A-0589839 and EP-A-0591102; 3-[4-(2-acetoxy-ethoxy)phenyl]-5,7-di-tert-butyl-benzofuran-2-one; 5,7-di-tert-butyl-3-[4-(2-stearoyloxyethoxy)-phenyl]benzofuran-2-one; 3,3'-bis[5,7-di-tert-butyl-3-(4-[2-hydroxyethoxy]phenyl) benzofuran-2-one]; 5,7-di-tert-butyl-3-(4-ethoxyphenyl) benzofuran-2-one; 3-(4-acetoxy-3,5-dimethylphenyl)-5,7-di-tert-butyl-benzofuran-2-one; 3-(3,5-dimethyl-4-pivaloyloxyphenyl)-5,7-di-tert-butyl-benzofuran-2-one; 5,7-di-tert-butyl-3-(3,4-dimethylphenyl)-3H-benzofuran-2-one; and mixtures thereof.

Suitable light absorbers and light stabilizers from Cytec Industries Inc. of West Paterson, N.J. include these Cyasorb® products: UV-9, e.g., 2-Hydroxy-4-methoxybenzophenone, $C_{14}H_{12}O_3$; UV-24, e.g., 2,2'-Dihydroxy-4-methoxybenzophenone, $C_{14}H_{12}O_4$; UV-531, e.g., 2-Hydroxy-4-n-octoxybenzophenone, $C_{21}H_{26}O_3$; UV-1164, e.g., 2-[4,6-Bis(2,4-dimethylphenyl)-1,3,5-triazin-2-yl]-5-(octyloxy) phenol (preferred), $C_{33}H_{39}N_3O_2$; UV-2126, e.g., Poly-4-(2-acryloxyethoxy)-2-Hydroxybenzophenone, $(C_{18}H_{16}O_5)n$; UV-2337, e.g., 2-(2'-Hydroxy-3',5'-di-t-amylphenyl) benzotriazole, $C_{22}H_{29}N_3O$; UV-5357, e.g., 2-(2'-Hydroxy-3',5'-di-t-butylphenyl)-5-chlorobenzotriazole, $C_{20}H_{24}N_3ClO$; UV-5365, e.g., 2-(2'-Hydroxy-5'-methylphenyl) benzotriazole (preferred), $C_{13}H_{11}N_3O$; UV-5411, e.g., 2-(2-Hydroxy-5-t-octylphenyl)-benzotriazole, $C_{20}H_{25}N_3O$; UV-1084, e.g., [2,2'-Thiobis (4-t-octylphenolato)]-n-butylamine Nickel(II), $C_{32}H_{51}O_2NNiS$; UV-2908, e.g., 3,5-di-t-Butyl-4-Hydroxybenzoic Acid, Hexadecyl Ester, $C_{31}H_{54}O_3$; UV-3346, e.g., Poly [(6-morpholino-s-triazine-2,4-diyl)[2,2,6,6-tetramethyl-4-piperidyl) imino]-hexamethylene [(2,2,6,6-tetramethyl-4-piperidyl) imino]], $(C_{31}H_{54}N_8O)n$; UV-3529, e.g., 1,6-Hexanediamine, N,N'-bis(2,2,6,6-tetramethyl-4-piperidinyl)-, Polymers with morpholine-2,4,6-trichloro-1,3,5-triazine, $(C_{33}H_{58}N_8O)n$; UV-3638, e.g., 2,2'-(1,4-Phenylene) bis[4H-3,1-benzoxazin-4-one], $C_{22}H_{12}N_2O_4$; UV-3581, e.g., $C_{25}H_{46}N_2O_2$; UV-500C, e.g., 20% non polymeric HALS in polypropylene, Mixture [110843-97-5/PP 009003-07 0];

UV-3853S, e.g., 50% non polymeric HALS in polyethylene, Mixture [167078-06-0/PE 009002-88-4]; and the like.

Further preferred examples of stabilizers for inventive images offered by Polysciences Inc. are monomers which might for example be used in inventive images for their UV absorbing feature, such as the examples previously listed, and the following UV absorbers: 2,4-Dihydroxybenzophenone; 2-Ethylhexyl 4-dimethylaminobenzoate; 2-Hydroxy-4-methoxybenzophenone; 2-Hydroxy-4-n-octoxybenzophenone; and the like.

These preferred UV absorbers offered by Aceto Corp. of Lake Success, N.Y. are further examples of stabilizers for use in inventive images: 2,4-DihydroxyBenzophenone; 2,2-Dihydroxy-4,4'-DimethoxyBenzophenone; 2-Hydroxy-4-Methoxy Benzophenone; 2-Hydroxy-4-Methoxy-5-SulfoBenzophenone; 2,2,4,4 TetrahydroxyBenzophenone; 2,3,4-TrihydroxyBenzophenone; (Eusorb 323) 2-(2'-Hydroxy-5'-tert-Octyl Phenyl)Benzotriazole; and combinations of these.

Examples of preferred stabilizers from BASF Corp., Ludwigshafen Germany follow: Uvinul® 5050H, e.g., an oligomeric HALS, (preferred) Sterically hindered amine, might be used as a UV light stabilizer; Uvinul® 4050H, e.g., monomeric hindered amine light stabilizer (HALS), (preferred) Sterically hindered amine monomer, might be used as a UV light stabilizer; Uvinul®4050 and 5050, e.g., light and heat stabilizers which might be used together; Uvinul® 4049H, e.g., a Hindered Amine, might be used as a UV light stabilizer, Sterically hindered amine; Uvinul® 2003AO, e.g. an antioxidant, Chemical Nature Tocopherol preparation with an organophosphorus compound; Uvinul® 3060, e.g., UV light stabilizer 2-Hydroxy-4-allyloxybenzophenone, $C_{16}H_{14}O_3$; Uvinul® 3035, e.g., UV light stabilizer Ethyl-2-cyano-3,3-diphenyl acrylate, $C_{16}H_{15}NO_2$; Uvinul® 3093, e.g., UV light stabilizer Mixture of tetrasubstituted Benzophenones. 2,2'4,4'-Tetrahydroxybenzophenone and 2,2'-Dihydroxy-4,4'-dimethoxybenzophenone $C_{13}H_{10}O_5$ to $C_{15}H_{14}O_5$ and the like.

Suitable BASF Corp Uvinul® UV light absorbers include: Uvinul® 3093, e.g., 2,2',4,4'-Tetrahydroxybenzophenone and 2,2'-Dihydroxy-4,4'-dimethoxybenzophenone; Uvinul® 3088, e.g., 2-ethylhexyl p-methoxycinnamate; Uvinul® 3050, e.g., 2,2',4,4'-Tetrahydroxybenzophenone, $CH_{13}H_{10}O_5$; Uvinul® 3049, e.g., 2,2'-Dihydroxy-4,4'-dimethoxybenzophenone, $C_{15}H_{14}O_5$; Uvinul® 3048, e.g., 2,2'-Dihydroxy-4,4'-dimethoxybenzophenone-5,5'-bis(sodium sulfonate), $C_{15}H_{11}Na_2O_{11}S_2$; Uvinul® 3040, e.g., 2-Hydroxy-4-methoxybenzophenone, $C_{14}H_{12}O_3$; Uvinul® 3039, e.g., 2-Ethylhexyl 2-cyano-3,3-diphenylacrylate, $C_{24}H_{27}NO_2$; Uvinul® 3008, e.g., 2-Hydroxy-4-octoxybenzophenone, $C_{21}H_{26}O_3$; Uvinul® 3000, e.g., 2,4-Dihydroxybenzophenone, $C_{13}H_{10}O_3$; Uvinul® P25;, e.g., Uvinul® ED8738, and the like.

Suitable UV light stabilizers and absorbers among the examples offered by Aldrich include: 3,9-Bis(octadecyloxy)-2,4,8,10-tetraoxa-3,9-diphosphaspiro[5.5]undecane (e.g., used as a color stabilizer and UV stabilizer); Tris(2,4-di-tert-butylphenyl) phosphite (e.g., used as a processing stabilizer and UV stabilizer); 8-DIONE; 2-Hydroxy-4-(octyloxy)benzophenone; Hexadecyl 3,5-di-tert-butyl-4-hydroxybenzoate; 2-Hydroxy-4-methoxybenzophenone; 5-Chloro-2-hydroxy-4-methylbenzophenone; 2,4-Dihydroxy-3-propylacetophenone; 2,2-Dihydroxy-4,4-dimethoxybenzophenone; 2,2-Dihydroxy-4-methoxybenzophenone Synonyms: (dioxybenzone); 3,5-Dichloro-2-hydroxyacetophenone; 2,4-Dihydroxybenzophenone; 5,5-Methylenebis(2-hydroxy-4-methoxybenzophenone) Synonyms: [bis(5-benzoyl-4-hydroxy-2-methoxyphenyl)methane]; Ethyl 2-cyano-3,3-diphenylacrylate; 5-Chloro-2-hydroxybenzophenone; 2-(2H-Benzotriazol-2-yl)-4-(1,1,3,3-tetramethylbutyl)phenol Synonyms: (octrizole); 2-(2H-Benzotriazol-2-yl)-4,6-di-tert-pentylphenol; Poly[N,N-bis(2,2,6,6-tetramethyl-4-piperidinyl)-1,6-hexanediamine-co-2,4-dichloro-6 morpholino-1,3,5-triazine]; 2-tert-Butyl-6-(5-chloro-2H-benzotriazol-2-yl)-4-methylphenol; 2,2-Methylenebis[6-(2H-benzotriazol-2-yl)-4-(1,1,3,3-tetramethylbutyl)phenol]; bae; 2,4-Di-tert-butyl-6-(5-chloro-2H-benzotriazol-2-yl)phenol; 4-Allyloxy-2-hydroxybenzophenone; 2-Phenyl-5-benzimidazolesulfonic acid, hydrate; Poly[2-(4-benzoyl-3-hydroxyphenoxy)ethyl acrylate]; Isooctyl diphenyl phosphite; Tris(nonylphenyl) phosphite; Menthyl anthranilate; 2-Ethylhexyl trans-4-methoxycinnamate; 2-Ethylhexyl 2-cyano-3,3-diphenylacrylate; and the like.

Another chemical formulation which can be used as a light stabilizer in inventive images is bis-2,2,6,6-tetramethyl-4-piperidyl sebacate.

Further specific examples and descriptions of preferred stabilizers offered by Ciba-Geigy which might be used in inventive images follow.

Tinuvin® 111, e.g., mixture of 1,3,5-Triazine-2,4,6-triamine, N,N'''-[1,2-ethanediylbis[N-[3-[4,6-bis-[butyl(1,2,2,6,6-pentamethyl-4-piperidinyl)amino]-1,3,5-triazin-2-yl] amino]propyl]-[N',N''-dibutyl-N',N''-bis (1,2,2,6,6-pentamethyl-4-piperidinyl)-and Dimethyl succinate polymer with 4 hydroxy-2,2,6,6,-tetramethyl-1-piperidineethanol; Tinuvin® 111 is a HALS stabilizer; Ciba-Geigy also published Tinuvin® 111 with the Chemical Name: mixture of N,N'''-[1,2-ethanediylbis[[[4.6-bis[butyl(1,2,2,6,6-pentamethyl-4-piperidinyl)amino]-1,3,5-triazine-2-yl]imino]-3,1 propanediyl]]-bis[N',N''-dibutyl-N',N''-bis (1,2,2,6,6-pentamethyl-4-piperidinyl) 1,3,5-Triazine-2,4,6-triamine,-and Dimethyl succinate polymer with 4-hydroxy-2,2,6,6,-tetramethyl-1-piperidineethanol; Ciba-Geigy also published Tinuvin® 111 with the Chemical Name: mixture of 1,3,5-Triazine-2,4,6-triamine,N,N'''-[1,2-ethanediylbis[[[4.6-bis [butyl (1,2,2,6,6-pentamethyl-4-piperidinyl)amino]-1,3,5-triazine-2-yl]imino]-3,1 propanediyl]]-bis[N',N''-dibutyl-N', N''-bis (1,2,2,6,6-pentamethyl-4-piperidinyl)-and Dimethyl succinate polymer with 4-hydroxy-2,2,6,6,-tetramethyl-1-piperidineethanol Tinuvin® 123, e.g., bis-(1-Octyloxy-2,2,6,6,tetramethyl-4-piperidinyl) sebacate; Tinuvin® 123 is a HALS stabilizer; Tinuvin® 123 may also be Bis (1-octyloxy-2,2,6,6-tetramethyl-4-piperidyl) sebacate; Tinuvin® 123 may also be Decanedioic acid, bis(2,2,6,6-tetramethyl-4-piperidinyl)ester, reaction products with 1,1-dimethylethyl-hydroperoxide and octane; Tinuvin® 123 may also be Decanedioic acid, bis(2,2,6,6-tetramethyl-4-piperidinyl)ester, reaction products with tert-butyl hydroperoxide and octane Tinuvin® 144, e.g., Bis (1,2,2,6,6-pentamethyl-4-piperidinyl)-2-butyl-2-(4-hydroxy-3,5-ditert.-butylbenzyl)propanedioate; Tinuvin® 144 is a HALS stabilizer and may also have the chemical name: bis(1,2,2,6,6-Pentamethyl-4-piperidinyl) (3,5-di-tert-butyl-4-hydroxybenzyl)butylpropanedioate; Formula $C_{42}H_{72}N_2O_5$ Tinuvin® 234, e.g., 2-(2H-Benzotriazol-2-yl)-4,6-bis(1-methyl-1-phenylethyl)phenol Tinuvin® 292, e.g., Chemical Name: the active substance is a mixture of: Bis(1,2,2,6,6-pentamethyl-4-piperidinyl)-sebacate and 1-(Methyl)-8-(1,2,2,6,6-pentamethyl-4-piperidinyl) sebacate; Tinuvin® 292 is a HALS stabilizer; Tinuvin® 292 may also be a mixture of bis(1,2,2,6,6-Pentamethyl-4-piperidinyl)-sebacate and Methyl 1,2,2,6,6-pentamethyl-4-piperidinyl sebacate; Tinuvin® 292 may also be Bis(1,2,2,6,6-pentamethyl-4-piperidinyl)sebacate Tinuvin® 326, e.g., 2-(5-Chloro-2H-benzotriazol-2-yl)-6-(1,1-dimethylethyl)-4-methylphenol Tinuvin® 327, e.g., CAS Name: Phenol, 2-(5-chloro-2H-benzotriazole-2-yl)-4,6-bis (1,1-dimethylethyl)-; Tinuvin® 327 may also be 2-(3',5'-di-tert-butyl-2'-hydroxyphenyl)-5-chlorobenzotriazole Tinuvin® 328 (preferred), e.g., 2-(2'-Hydroxy-3', 5'-Di-Tert-Amylphenyl) Benzotriazole; also according to Ciba-Geigy, Tinuvin® 328 may be 2-(2H-benzotriazol-2-yl)-4,6-ditert-pentylphenol; it may also be 2-(2H-Benzotriazol-2-yl)-4,6-bis(1,1-dimethylpropyl)phenol; it may also be Phenol, 2-(2H-benzotriazole-2-yl)-4,6-bis-(1,1-dimethyl propyl) phenol; also according to Ciba-Geigy, Tinuvin® 328 Chemical Name: 2-(2-Hydroxy-3,5-di-tert-amylphenyl)benzotriazole; Formula: $C_{22}H_{29}N_3O$; Tinuvin® 328 may also be 2-(3', 5'-bis(1,1 dimethylpropyl)-2'-hydroxyphenyl)-2H-benzotriazole Tinuvin® 384, e.g., Chemical Name: 95% Iso-octyl-3-(3-(2H-benzotriazol-2-yl)-5-tert. butyl-4-hydroxyphenyl propionate and 5% Xylene; Tinuvin® 384 may also be Benzenepropanoic acid, 3-(2H-benzotriazol-2-yl)-5-(1,1-dimethylethyl)-4-hydroxy-, C7-9-branched alkyl esters, Tinuvin® 384 MP, e.g., Chemical Name: 95% Iso-octyl-3-(3-(2H-benzotriazol-2-yl)-5-tert. butyl-4-hydroxyphenyl propionate and 5% Dowanol MP Tinuvin® 400, e.g., Chemical Name: 2-[4-[2-Hydroxy-3-tridecyl oxypropyl]oxy]-2-hydroxyphenyl]-4,6-bis (2,4-dimethylphenyl)-1,3,5-triazine and 2-[4-[2-Hydroxy-3-dodecyl oxypropyl] oxy]-2-hydroxyphenyl]-4,6-bis(2,4-dimethylphenyl)-1,3,5-triazine; Tinuvin® 400 may also be 1-methyl-2-propanol; 1,3-benzenediol, 4-[4,6-bis (2,4-dimethylphenyl)-1,3,5-triazin-2-yl]-, reaction products with [(dodecyloxy) methyl] oxirane and oxirane mono [(C10-16-alkoxy) methyl derivatives Tinuvin® 571, e.g., CAS Name: Phenol, 2-(2H-benzotriazole-2-yl)-4-methyl-6-dodecyl Tinuvin® 622, e.g., Dimethyl succinate polymer with 4-hydroxy-2,2,6,6,-tetramethyl-1-piperidineethanol; Tinuvin® 622 is also published as CAS Name: Butanedioic acid, polymer with 4-hydroxy-2,2,6,6,-tetramethyl-1-piperidine ethanol, and is a HALS stabilizer.

Tinuvin® 765, e.g., bis(1,2,2,6,6,-Pentamethyl-4-piperidinyl) sebacate (major component): Decanediodic acid, bis (1,2,2,6,6-pentamethyl-4-piperidinyl)ester Tinuvin® 770, e.g., bis(2,2,6,6-Tetramethyl-4-piperidinyl) sebacate; also Tinuvin® 770 CAS Name: Decanediodic acid, bis (2,2,6,6-tetramethyl-4-piperidinyl)ester; Tinuvin® 770 may also be bis(2,2,6,6-Tetramethyl-4-piperidyl) sebacate Tinuvin® 783, e.g., a mixture of poly [[6-[(1,1,3,3,-tetramethyl butyl) amino]-s-triazine-2,4-diyl][[(2,2,6,6-tetramethyl-4-piperidyl) imino] hexamethylene [(2,2,6,6,-tetramethyl-4-piperidyl) imino]] and dimethyl succinate polymer with 4 hydroxy-2,2,6,6-tetramethyl-1-piperidineethanol; also published with Chemical Name: Mixture of poly [[6-[(1, 1,3,3,-tetramethyl butyl) amino]-1,3,5-triazine-2,4-diyl][[(2, 2,6,6-tetramethyl-4-piperidyl) imino] hexamethylene [(2,2, 6,6,-tetramethyl-4-piperidyl) imino]] and dimethyl succinate polymer with 4 hydroxy-2,2,6,6-tetramethyl-1-piperidineethanol; Tinuvin® 783 is a HALS stabilizer.

Tinuvin® 791, e.g., Mixture of Poly[[$^6$-[(1,1,3,3,-tetramethyl-butyl) amino]-s-triazine-2,4-diyl][2,2,6,6-tetramethyl-4-piperidyl)imino]hexamethylene[(2,2,6,6-tetramethyl-4-piperidyl)imino]] and bis(2,2,6,6-tetramethyl-4-piperidinyl) sebacate; Tinuvin® 791 is a HALS stabilizer; also published with Chemical Name: Mixture of Poly [[6-[(1,1,3,3,-tetramethyl-butyl) amino]-1,3,5-triazine-2,4-diyl]][[(2,2,6,6-tetramethyl-4-piperidyl) imino] hexamethylene [(2,2,6,6,-tetramethyl-4-piperidyl) imino]] and Bis(2,2,6,6-tetramethyl-4-piperidinyl) sebacate Tinuvin® 900, e.g., 2-[2-Hydroxy-3,5-di(1,1-dimethylbenzyl)pheny]-2H-benzotriazole. For example, Ciba-Geigy recommends the use of Tinuvin® 900 in combination with a light stabilizer of the sterically hindered amine or amide class (HALS) such as Tinuvin® 144, Tinuvin® 292, or Tinuvin® 123, e.g., to protect coats against reduction in gloss, cracking, blistering, delamination, and changes in color. Though experimental trials are recommended by Ciba-Geigy which might be done in making inventive images, they also recommend, for example, a concentration of 1-2% Tinuvin® 900 plus 0.5%-2% Tinuvin® 144, Tinuvin® 292, or Tinuvin® 123. As further examples, Tinuvin® 900 may also be 2-(3', 5'-bis(1-Methyl-1-phenylethyl)-2'-hydroxyphenyl)benzotriazole, and Tinuvin® 900 may also be Phenol, 2-(2H-benzotriazol-2-yl)-4,6-bis-(1-methyl-1-phenylethyl)-Tinuvin® 928 (preferred), e.g., 2-[2-Hydroxy-3-dimethylbenzylphenyl-5-(1,1,3,3-tetramethylbutyl)]-2H-benzotriazole Tinuvin® 1130, e.g., a mixture of 50% Monoester, 38% Diester and 12% Polyethylene glycol 300, Chemical Name: Poly(oxy-1,2-ethanediyl), .alpha.-[3-[3-(2H-benzotriazol-2-yl)-5-(1,1-dimethylethyl)-4-hydroxyphenyl]-1-oxopropyl]-.omega.-[3-[3-(2H-benzotriazol-2-yl)-5-(1,1-dimethylethyl)-4-hydroxyphenyl]-1-oxopropoxy]-; Poly(oxy-1,2-ethanediyl), .alpha.-[3-[3-(2H-benzotriazol-2-yl)-5-(1,1-dimethylethyl)-4-hydroxyphenyl]-1-oxopropyl]-.omega.-hydroxy-; Polyethylene glycol Formula: $(C_2H_4O)_n$ $C_{38}H_{40}N_6O_5$; $(C_2H40)_n$ $C_{19}H_{21}N_3O_3$; Tinuvin® 1130 may also be Poly (oxy-1,2-ethanediyl),α-[3-[3-(2H-benzotriazol-2-yl)-5-(1,1-dimethylethyl)-4-hydroxyphenyl]-1-oxopropyl]-ω-hydroxy and Poly(oxy-1,2-ethanediyl), α-[3-[3-(2H-benzotriazol-2-yl)-5-(1,1-dimethylethyl)-4-hydroxyphenyl)-1-oxopropyl-ω-[3-[3-(2H-benzotriazol-2-yl)-5-(1,1-dimethylethyl)-4-hydroxyphenyl]-1-oxopropoxy]

Tinuvin® P (preferred), e.g., Phenol, 2-(2H-benzotriazole-2-yl)-4-methyl; Tinuvin® P may also be 2-(2H-Benzotriazol-2-yl)-4-methylphenol and also 2-(2'-Hydroxy-5'-methylphenyl)-benzotriazole Chimassorb™ 119,e.g., 1,3,5-Triazine-2,4,6-triamine,N,N'''-[1,2-ethanediylbis[[[4.6-bis[butyl(1,2,2,6,6-pentamethyl-4-piperidinyl)amino]-1,3,5-triazine-2-yl]imino]-3,1-propanediyl]]-bis[N'N''-dibutyl-N'N''-bis(1,2,2,6,6-pentamethyl-4-piperidinyl)-; Chimassorb™ 119 is a HALS stabilizer; Ciba-Geigy also published that Chimassorb 119 may be 1,3,5-Triazine-2,4,6-triamine, N,N'''-[1,2-ethanediylbis[N-[3-[4,6-bis-[butyl(1,2,2,6,6-pentamethyl-4-piperidinyl)amino]-1,3,5-triazin-2-yl] amino]propyl]-[N', N'''-dibutyl-N',N''-bis (1,2,2,6,6-pentamethyl-4-piperidinyl)-; Ciba-Geigy also published Chimassorb 119 Chemical Name: N,N'''-[1,2-ethanediylbis[[[4.6-bis[butyl(1, 2,2,6,6-pentamethyl-4-piperidinyl)amino]-1,3,5-triazin-2- yl]imino]-3,1 propanediyl]]-bis[N',N"-dibutyl-N',N"-bis(1,2,2,6,6-pentamethyl-4-piperidinyl)-1,3,5-Triazine-2,4,6-triamine Chimassorb™ 944, e.g., Poly [[6-[(1,1,3,3,-tetramethyl butyl) amino]-s-triazine-2,4-diyl][[(2,2,6,6-tetramethyl-4-piperidyl) imino] hexamethylene [(2,2,6,6,-tetramethyl-4-piperidyl) imino]]; Chimassorb™ 944 is a HALS stabilizer; Ciba-Geigy also published that Chimassorb™ 944 is Poly [[6-[(1,1,3,3,-tetramethyl butyl) amino]-s-triazine-2,4-diyl][(2,2,6,6-tetramethyl-4-piperidyl) imino] hexamethylene [(2,2,6,6-tetramethyl-4-piperidyl) imino]]; Ciba-Geigy also published Chimassorb 944 CAS Name: Poly-[[6-[(1,1,3,3-tetramethylbutyl)amino]-1,3,5-triazine-2,4-diyl]][2-(2,2,6,6-tetramethyl-4-piperidinyl)imino]-1,6-hexane-diyl [2,2,6,6-tetramethyl-4-piperidinyl)-imino]]; Ciba-Geigy also published Chimassorb 944 Chemical Name: Poly [[6-[(1,1,3,3,-tetramethyl butyl) amino]-1,3,5-triazine-2,4-diyl][[(2,2,6,6-tetramethyl-4-piperidyl) imino]-hexamethylene [(2,2,6,-tetramethyl-4-piperidyl) imino]]

Irgafos® 12, e.g., 2,2',2"-nitrilo triethyl-tris[3,3',5',5'-tetra-tert-butyl-1,1'-biphenyl-2,2'-diyl]phosphite; Irgafos® 12 CAS Name: 2-[[2,4,8,10-Tetrakis(1,1-dimethylethyl) dibenzo [d,f][1,3,2]dioxaphosphepin-6-yl]oxy]-NN-bis[2-[[2,4,8,10-tetrakis(1,1-dimethylethyl)dibenzo [d,f][1,3,2]dioxaphosphepin-6-yl]oxy]-ethyl]ethanamine; Empirical Formula $C_{90}H_{132}NO_9P_3$ Irgafos® 38, e.g., Bis[2,4-bis (1,1-dimethylethyl)-6-methylphenyl] ethyl ester, phosphorous acid.

Irgafos® 168, e.g., Tris(2,4-di-tert-butylphenyl)phosphite; Ciba-Geigy also published that Irgafos® 168 is Phenol, 2,4-bis(1,1-dimethylethyl)-, phosphite (3:1)

Irgafos® TNPP, e.g., Phenol, nonyl-, phosphite (3:1);

Benzophenone 1, e.g., $^2$-Hydroxy-4-n-octoxy-benzophenone

HALS 1, e.g., Poly(6-morpholino-s-triazine-2,4-diyl)[(2,2,6,6-tetramethyl-4-piperidyl) iminohexamethylene[(2,2,6,6-tetramethyl-4-piperidyl)imino]]

Nickel 1, e.g., 2,2'-Thiobis(4-tert-octylphenolato)-n-butylamine nickel

Irganox® 245, e.g., CAS Name: Benzenepropanoic acid,3-(1,1-dimethylethyl)-4-hydroxy-5-methyl-, 1,2-ethanediylbis(oxy-2,1-ethanediyl) ester Irganox® 565, e.g., CAS Name: Phenol, 4-[[4,6-bis(octylthio)-1,3,5-triazine-2-yl]amino]-2,6-bis (1,1-dimethylethyl)

Irganox® 1010, e.g., 2,2-bis[[3-[3,5-bis(1,1-Dimethylethyl)-4-hydroxyphenyl]-1-oxopropoxy]methyl]-1,3,-propanediyl 3,5-Bis(1,1-dimethylethyl)-4-hydroxybenzenepropanoate; also Irganox®1010 CAS Name: Tetrakis[methylene(3,5-di-tert-butylhydroxyhydrocinnamate)]methane; also Irganox®1010 CAS Name: Tetrakis[methylene(3,5-di-tert-butyl-4-hydroxy-hydrocinnamate)]methane; also Irganox®1010 Tetrakis[methylene(3,5-di-tert-butyl-4-hydroxyhydrocinnamate)]methane; also Irganox®1010 CAS Name: Benzenepropanoic acid, 3,5-bis(1,1-dimethylethyl)-4-hydroxy-,2,2-bis[[3-[3,5-bis(1,1-dimethylethyl)-4-hydroxy phenyl]-1-oxopropoxy]methyl]-1,3-propanediyl ester Irganox® 1035, e.g., Thiodiethylene bis(3,5-di-tert-butyl-4-hydroxyhydrocinnamate) CAS Name: Benzenepropanoic acid, 3,5-bis(1,1-dimethylethyl)-4-hydroxy-,thio di-2,1-ethanediyl ester Irganox® 1076, e.g., Octadecyl 3-(3',5'-di-tert-butyl-4'-hydroxyphenyl) propanoate; Irganox® 1076 CAS Name: Octadecyl 3,5-di-tert-butyl-4-hydroxyhydrocinnamate; also Irganox® 1076 CAS Name: Benzenepropanoic acid, 3,5-bis(1,1-dimethylethyl)-4-bydroxy-, octadecyl ester Irganox® 1098, e.g., CAS Name: Benzenepropanamid, N,N'-1,6-hexanediylbis[3,5-bis (1,1-dimethylethyl)-4-hydroxy Irganox® 1135, e.g., CAS Name: Benzenepropanoic acid, 3,5-bis(1,1-dimethylethyl)-4-hydroxy-, octyl ester Irganox® 1330, e.g., 1,3,5-Trimethyl-2,4,6-tris(3,5-di-tert-butyl-4-hydroxybenzyl)benzene Irganox® 1425 WL, e.g., Calcium bis[monoethyl(3,5-di-tert-butyl-4-hydroxybenzyl)phosphonate]

Irganox® 1520 D, e.g., CAS Name: Phenol, 2-methyl-4,6-bis[(octylthio)-methyl]

Irganox® 3052, e.g., CAS Name: 2-Propanoic acid, 2-(1,1-dimethylethyl)-6-[[3-(1,1-dimethylethyl)-2-hydroxy-5-methylphenyl] methyl]-4-methylphenyl ester Irganox® 3114, e.g., CAS Name: 1,3,5-Tris(3,5-di-tert-butyl-4-hydroxybenzyl)-1,3,5-triazine-2,4,6(1H,3H,5H)-trione; also Ciba-Geigy published Irganox® 3114 as 1,3,5-Tris (3,5-di-tert-butyl-4-hydroxybenzyl)-s-triazine-2,4,6(1H,3H,5H)-trione Irganox® PS 800, e.g., CAS Name: Propanoic acid,3,3'-thio bis-, didodecyl ester Irganox® PS 802, e.g., CAS Name: Propanoic acid, 3,3'-thio bis-, dioctadecyl ester Irganox® MD 1024, e.g., 1,2-Bis(3,5-di-tert-butyl-4-hydroxyhydrocinnamoyl)hydrazine; Irganox® MD 1024 may also be 2',3-bis[[3-[3,5-di-tert-butyl-4-hydroxyphenyl]propionyl]]propionohydrazide Irganox® B 215, e.g., a blend of Irganox® 1010 and Irgafos® 168 at a 1:2 ratio.

Irganox® B 225, e.g., a blend of Irganox® 1010 and Irgafos® 168 at a 1:1 ratio.

Irganox® B 311, e.g., a blend of Irganox® 1330 and Irgafos® 168 at a 1:1 ratio.

Irganox® B 313, e.g., a blend of Irganox® 1330 and Irgafos® 168 at a 1:2 ratio.

Irganox® B 501W, e.g., a blend of Irganox® 1425W and Irgafos® 168 at a 1:2 ratio; Ciba Geigy also published that Irganox® B501W is a blend of Irganox® 1425WL and Irgafos® 168 at a 1:1 ratio.

Irganox® B 561, e.g., a blend of Irganox® 1010 and Irgafos® 168 at a 1:4 ratio.

Irganox® B 900, e.g., a blend of Irganox® 1076 and Irgafos® 168 at a 1:4 ratio.

Irganox® B 921, e.g., a blend of Irganox® 1076 and Irgafos® 168 at a 1:8 ratio.

Irganox® B 1171, e.g., a blend of Irganox® 1098 and Irgafos® 168 at a 1:1 ratio.

Irganox® B 1411, e.g., a blend of Irganox® 3114 and Irgafos® 168 at a 1:1 ratio.

Irganox® B 1412, e.g., a blend of Irganox® 3114 and Irgafos® 168 at a 1:2 ratio; Irganox® B 1412 may also be a mixture of 1,3,5-tris(3,5-di-tert-butyl-4-hydroxybenzyl)-s-triazine-2,4,6-(1H, 3H, 5H)trione and Tris(2,4-di-tert-butylphenyl) phosphite Irgacor® 153, e.g., a mixture of 70% (2-Benzothiazol-2-ylthio)succinic acid di-(C12-C14 alkylammonium salt) and 30% Xylene, Irgacor® 153 is also C12-14-tert-Alkylamines, cmpds with (2-benzothiazolylthio)-butanedioic acid (2:1); Xylenes Irgacor® 252 FC, e.g., a mixture of 60% 1-(Benzothiazol-2-ylthio)succinic acid and 40% water; Irgacor® 252 FC may also be (2-Benzothiazolylthio) butanedioic acid, water Irgacor® 252 LD, e.g., Chemical Name: 1-(Benzothiazol-2-ylthio)succinic acid; Irgacor® 252 LD may also be (2-Benzothiazolylthio) butanedioic acid Irgacor® 1405, e.g., Chemical Name: N-Ethyhnorpholine cmpd with 3-(4-methylbenzoyl)propanoic acid (1:2)

Phosphite 1, e.g., Tetrakis (2,4-di-tert-butylphenyl)-4,4'-biphenylene diphosphonite Phosphite 2, e.g., Bis (2,4-di-tert-butylphenyl)-pentaerythritol diphosphite HP-136, e.g., CAS Name 5,7-di-t-butyl-3-(3,4 di-methylphenyl)-3H-benzofuran-2-one; Emperical Formula $C_{29}H_{30}O_2$ Irganox® HP 2215, e.g., a composition of 15% HP-136 and 85% Irganox® B 215 (2:1 Irgafos® 168: Irganox®1010)

Irganox® HP 2225, e.g., a composition of 15% HP-136 and 85% Irganox® B 225 (1:1 Irgafos® 168: Irganox®1010)

Irganox® HP 2921, e.g., a composition of 15% HP-136 and 85% Irganox® B 921 (2:1 Irgafos® 168: Irganox®1076)

Irganox® HP 2411, e.g., a composition of 15% HP-136 and 85% Irganox® B 1411 (1:1 Irgafos® 168: Irganox®3114)

Irganox® LC 20, e.g., a composition of 50% Irganox® 1010 and 50% Irgafos® 12

Irganox® LC 21, e.g., a composition of 33% Irganox® 1010 and 67% Irgafos® 12 or a composition made of these two products at a 1:2 ratio Irganox® LC 22, e.g., a composition of 67% Irganox® 1010 and 33% Irgafos® 12 or a composition made of these two products at a 2:1 ratio Irganox® LC 40, e.g., a composition of 50% Irganox® 3114 and 50% Irgafos® 12

Irganox® LC 90, e.g., a composition of 50% Irganox® 1076 and 50% Irgafos® 12

Irganox® LC 91, e.g., a composition of 20% Irganox® 1076 and 80% Irgafos® 12

Irganox® LC 92, e.g., a composition of 33% Irganox® 1076 and 67% Irgafos® 12 or a composition made of these two products at a ratio of 1:2

Irganox® LM 20, e.g., Irganox® 1010 and Irgafos® 38 at a 1:1 ratio. Irganox® LM 21, e.g., Irganox® 1010 and Irgafos® 38 at a 1:2 ratio. Irganox® LM 91, e.g. Irganox® 1076 and Irgafos® 38 at a 1:2 ratio. Hydroxylamine, e.g., Bis(hydrogenated tallow alkyl)amines, oxidized. Fiberstab™ Systems (FS Systems): are for example, tailored to meet specific product and processing requirements. FS 042, e.g., Bis(hydrogenated tallow alkyl)amines, oxidized. FS 110, e.g., has Hydroxylamine and Tinuvin® 622. FS 210, e.g., has Hydroxylamine and Chimassorb 119. FS 301, e.g., has Hydroxylamine and Irgafos® 168. FS 410, e.g., has Hydroxylamine and Chimassorb 944. As another example, Ciba-Geigy's has also published that FS Systems: FS 110, FS 210, FS 301, FS 410, may be combinations of a hindered amine or phosphite and a dialkylhydroxylamine (FS 042). Ciba Geigy's Irgarol 1051/1071 may be also used to make inventive images, e.g., Chemical Name: N-Cyclopropyl-N'-(1,1-dimethylethyl)-6-(methylthio)-1,3,5-triazine-2,4-diamine.

In many embodiments, one or more stabilizers are added into cPRM or its ingredients, such as a monomer. Such mixtures might for instance, have coloration and/or coloration might be added to them, e.g., pigment, particles, dyes, etc. Inventive image parts (e.g., layers, sections, components, etc.), may have the same or different amounts of one or multiple stabilizers, as desired or needed, each of which can be used consistently or inconsistently, and evenly or unevenly throughout an inventive image. One or more parts of an inventive image may not have any stabilizer. It is frequently preferable to add one or more stabilizers to the PRM forming the external surface layer or layers of a polymer, whether or not it contains any internal stabilizers. When making such external layers on polymer which do not have any internal stabilizers, or which do not have a significant amount of one or more internal stabilizers, it is sometimes desirable to add one or more stabilizers at a high proportion to the PRM forming the polymer's external surface layer or layers, e.g., this can be preferable when using one or more UV light stabilizers. As an alternate example, the external layers or outermost layers of a polymer can have different percentages of one or more stabilizers, e.g., highest on the outermost external layer and decreasing as the layers move inward. Such methods may also be desirable for use on non polymeric parts of inventive images.

When applicable, it is often preferable for one or more added stabilizers to be dissolved or dispersed in the material and/or medium used for the relevant part of the inventive image, e.g., in the monomer or PRM. Examples of exceptions to this general preference are when the material and/or medium (e.g., the PRM) already contains the desired stabilizer(s); when a stabilizer cannot be used in this way; and when impermanence and change are desirable in inventive image parts that do not contain the stabilizer(s) necessary to prevent them from changing over time (e.g., entropy can be desirable in fine art). It is often preferable that stabilizers added to PRM are added before being put on the mold or other surface (e.g., a polymer surface). It is generally preferred that undesirable lumps of stabilizer (e.g., dry powdered lumps of it or blobs of it as a thick paste) are broken apart and dispersed or dissolved in the medium and/or material in which it is used (e.g., in PRM), or even removed, along with any visible undesirable foreign matter. In the formation of an inventive image, the concentration of each stabilizer used in a material and/or medium (e.g., in a PRM) is typically limited by considerations such as: 1) the stabilizer itself in its use (e.g., function and physical properties of the chemical, the location and the process or processes of its use; its stability over time in its use, etc.); 2) the undesirability of any visible changes and effects (e.g., the undesirability of any yellow color caused by a stabilizer; any visible lumps of a stabilizer; changes and effects caused by the stabilizer over time; and its interaction with any other stabilizers used); etc. For example, the concentration of one stabilizer in a PRM, or in another material or medium might look undesirably high because it appears yellow 3" deep in a jar prior to its application, but applied in a thin layer on a polymer, this same concentration may appear colorless and transparent.

One preferred method for dissolving stabilizer in a material (such as in a monomer, in a mixture of monomers, in a PRM or a cPRM, into paints, painting media, binders, e.g., clear acrylics, oil based paints, wax based paints, etc; into other coloration; into coatings and varnishes; into plaster or paper pulp; into a glue or other bonding substance; into various other binders, etc.) is to first make a concentrated-stabilizer-mixture containing one or more stabilizers as desired (e.g., a separate concentrated-stabilizer-mixture can be made for each stabilizer as desired). One preferred method for making such concentrated-stabilizer-mixtures is based on those methods traditionally used to hand grind and mix one or more pigments with oil (and often other ingredients such as fillers) to form oil paint. In the present invention, such methods can be done by hand and/or by machine, as desired. For instance, a concentrated-stabilizer-mixture can be made by using all of the stabilizer(s), and mixed with only a small amount of the total quantity of the material or medium. After the concentrated-stabilizer-mixture is made, it will be blended into the rest of the total quantity of the intended substance as needed. The stabilizer(s) can be ground to any fineness, before and/or while it is mixed. It is preferable to "wet out" the stabilizer(s) as the concentrated-stabilizer-mixture is mixed and/or ground. A stabilizer which is not thoroughly wet out may be undesirably visible, e.g., as undissolved lumps or blobs. Other ingredients may be added into concentrated-stabilizer-mixtures as desired, e.g., coloration. It is preferable to make the concentrated-stabilizer-mixture in the form of a paste because pastes are often easier to mix, to "wet out," and to grind compared to liquids. But, it is usually easiest, most effective and thus preferable to add concentrated-stabilizer-mixtures into the larger quantity of the material, medium or other substance, diluted into a liquid form. Often when this total mixture is made, care must be taken to avoid undesired air bubbles by releasing them during mixing, whether the concentrated-stabilizer-mixture is added as a paste or as a liquid.

When the permanence of an inventive image is important, it is sometimes preferable and possible to change their non polymeric ingredients for increased strength and permanence. For example, it is sometimes preferable to add one or more stabilizers, to and/or on non polymeric inventive image ingredients (e.g., to paints, pigments and other conventional image making materials and mediums used with cPRM or with polymer in inventive images) even if they already contain one or more such compositions. For instance, a stabilizer might be added into a concentrated-coloration mixture, on paper or in paper pulp which comprises a part of an inventive image, into a glue or adhesive used to connect image parts together, and into a coating used on an inventive image. For example, a dispersant, a wetting agent, a UV light stabilizer, a leveling agent or another such composition might be mixed into pigments, paints, inks, glues, varnishes, sealers, fixatives, paper pulp, plaster, other conventional image making materials and mediums, and other applications used on or as part of an inventive image. Examples of such compositions are made by Ciba-Geigy; Byk Chemie; Tego Chemie of Goldschmidt Chemical Corporation in Hopewell, Va.; and Condea Servo LLC of Piscataway, N.J. Numerous additional examples of such compositions are cited herein.

Stabilizers can be used unevenly or inconsistently to provide desired effects in an inventive image or a part thereof, such as by mixing the stabilizer into some but not all of an image's cPRM. The inconsistent use of a stabilizer might effect the image's (a) structure and/or permanence (e.g., making some image areas stronger, thicker, or more stabile), (b) its aesthetic, (e.g., it may add an aesthetic element to the image such as an irregular pattern, design or drawing, and/or effect the image's color or light), (c) utilitarian function, and/or (d) display, set up, or installation. For example, a medium with no stabilizer can be added into a second quantity of the same medium which contains a dissolved stabilizer. Without mixing them together, or after only mixing them together very slightly, this combination is applied as desired, e.g., poured onto a mold, or painted onto an inventive image surface. For example, Silmar®'s A-111 might be the stabilizer used. The desired effect might be an inconsistent polymer surface having an irregular pattern determined partly by chance. Some areas of the polymer's surface may have varying amounts of wax, while other areas may have no wax. As a second illustration, a PRM which contains one or more dissolved stabilizers can be poured into or onto a separate quantity of one or more monomers containing no stabilizer, which monomers are then polymerized. In a third illustration, two paints are mixed together with a stabilizer and a third paint having no stabilizer. Using both the mixed paint and the third paint, a painting can be created on the surface of a polymer which covers it inconsistently and unevenly. In some areas of this painting, the two paints mixed together to varying extents in the process of their application. Paint covers over some areas of this painting completely, while other areas are unpainted leaving some of the polymer's bare surface visible. The painting may be in many thicknesses, e.g., it has washes, glazes, impasto, and forms of direct painting. In another example, the inconsistent stabilizer is a fiber.

One or more portions of an inventive image may be vulnerable to agents that modify or damage it undesirably. These portions can be shielded from the undesirable agent(s) by some other portion or component of the inventive image, which may have this capability due to the presence of one or more stabilizers. Thus, for example, the shielded portion or portions of the inventive image may require less or no stabilizer(s) pertinent to the particular undesirable agent or agents. For instance, this shielding effect may be possible due to the relative geometric positions of the shielding and the shielded parts of an inventive image, and by their orientation with respect to the source of the undesirable agent or agents. Examples of undesirable agents are: (1) UV light causing polymer yellowing. Since UV exposure can be directional, then after consideration of reflection, diffraction, etc., such a shielding inventive image part may not necessarily completely envelop the inventive image part it is protecting; (2) Oxygen which might cause discoloration or deterioration of a portion or a component of an inventive image. This agent is not directional. Shielding may be provided by a surrounding element of the inventive image which is impermeable to oxygen, such as one of many plastics. Other coatings might be effective should the post-evaporation material still be fluid closing evaporative pores before the polymerization becomes too viscous (e.g., a polyurathane paint whose solvent evaporates before the liquid mixture polymerizes); (3) Moisture, which should follow the pattern of oxygen, but is more polar than oxygen and typically less reactive, although it does hydrogen bond; (4) Noxious gases or any other diffusible gases which might harm an inventive image. A protective coating can be used if such protection is needed; (5) Substances used to clean or care for the inventive image, e.g., such substances which are solvents for use on polymer are preferably limited to those solvents which do not undesirably alter (for example, dissolve, distort or abrade) any polymer used on an inventive image surface; (6) Any other undesirable agent or agents, e.g., any other undesirable noxious agent. In an illustration, a layer of linear polymer containing a component which absorbs UV without decomposition or discoloration (thus stabilizes itself to UV) on the external surface of an a layer of linear polymer with UV light stabilizer in it on the external surfaces of an inventive image, could protect both the linear polymer and the deeper parts of the inventive image from undesirable effects which might have otherwise resulted from the inventive image's exposure to UV light.

Further Description of Polymerization and Image Making

It is generally preferred that active ingredients used to make polymer in inventive images, are used according to the recommendations and specifications of their respective manufacturers (e.g., available in their technical data or by contacting them), however there are exceptions, some of which are described herein. When active ingredients in a cPRM used to form polymer are not used according to the recommendations and specifications of their manufacturers, uncontrollable, irreversible, structural, or aesthetic risks, effects, problems or combinations of these are possible. Examples are: (a) weak polymer; (b) excessive polymerization heat (e.g., this can liquefy an oil formulated clay mold or temporary barriers subdividing a mold as well as release agents used on a mold; it can also cause cracks in polymer, discoloration, and other problems and risks); (c) distortion of the polymer (e.g., excessive shrinkage of the polymer, or the polymer curves more than its mold, the polymer may for instance, rise up from its mold); (d) cracking or crazing in the polymer; (e) a very slow polymerization; and/or (f) discoloration of the polymer; etc. Specific risks, effects and problems that might occur with the use of specific active ingredients in a specific cPRM used in a specific process, under specific conditions, vary, and this variance can be significant. These risks, effects and problems may or may not be desirable in specific inventive images. Typically when forming polymers using cPRM with more than one monomer, more than one catalyst or both, it is desirable to consider the recommendations and specifications of the manufacturers of all the specific products that are active ingredients. Of prime concern is the cross-compatibility of various monomers and their respective catalysts, and it can be desirable to consult the manufacturers of the specific products used as the active ingredients in cPRM, or an expert such as a polymer chemist.

For example, a manufacturer of one or more active ingredients of a cPRM used to form a polymer might recommend a maximum limit to the thickness of applications of cPRM that contain their products, or a specific range of proportions for mixing their products in cPRM. Some cPRM in applications thicker than the maximum recommended, -and some cPRM comprised of active ingredients in proportions other than those recommended, form polymers with unexpected uncontrollable or irreversible structural or aesthetic risks, effects, or problems. In a further example, manufacturers of one or more active ingredients used to form a polymer might recommend their products be processed using specific conventional practices, e.g., extrusion or injection processes.

In a preferred embodiment, VIMC such as: variability in the use of active ingredients in cPRM, variability in the polymerization process and the mold, image support or other surface, variability in the conditions under which a polymer is polymerized, or combinations of these, are used to form and control, or to try to form and control, desired or experimental effects in polymer inventive images. Some of the effects and some of the polymers formed in this way would be more difficult or impossible to form in other ways. For example, the selection of the specific products used as active ingredients in a cPRM and their proportions, and the process of creation used can often be used to control and affect the polymerization process and the resultant polymer. Further examples of variables that can often be used to affect and control the polymer formed are: the thickness of applications of cPRM; and the temperature, humidity and air movement (or current) surrounding cPRM, use of one or more stabilizers, etc. For instance, image makers might intentionally add one or more of the appropriate catalysts to a PRM at or close to the minimum proportion recommended by their manufacturers or by a scientist, in order to slow down the polymerization process or in order to reduce the polymerization heat. This might be desired, for example, to allow more time to make changes to the polymer during its gelation, such as to carefully carve the gelled polymer. Further, this might be desired: to avoid undesirable effects or risks caused by the heat of polymerization (such as undesirable effects to the mold); to avoid undesirable effects or risks to non polymeric ingredients (such as problems with attached, embedded, and inlaid materials), etc. As another example, by adding one or more of the appropriate catalysts to the PRM, at or near the maximum proportion recommended by their manufacturers or a polymer chemist, the polymerization process can be intentionally accelerated or the heat of polymerization can be intentionally increased. This might be desirable, for example, so that a thin layer of cPRM painted onto a surface that is not horizontal (e.g., a slope on an undulating surface), may better hold its shape during polymerization. As molds, active ingredients, cPRM, processes of creating inventive images, aesthetic preferences, and other variables differ in the formation of polymer that can affect polymerization, the risks, effects and problems that occur in making inventive images can differ too. Thus, it is preferable to tailor the process of forming polymer accordingly and to use the VIMC in order to produce polymer as desired each time.

Polymerization reactions can be strongly exothermic. It is generally preferable to carry out polymerization reactions for forming polymer in processes or in conditions wherein the heat released is dissipated. In addition, it is often preferred that the cPRM is neither heated, nor surrounded by cold. It is preferable to make the cPRM and allow it to polymerize at a temperature sufficiently low, so that if the polymerization reaction gives off significant heat, the reaction's rise in the temperature will not be great enough to affect the polymer formed or any other aspect of the inventive image undesirably, e.g., distorting or discoloring the polymer. In some exceptions to the aforementioned preferences, polymerization reactions might be carried out in processes or in conditions wherein the heat they release may not, or can not be effectively dissipated.

Many problems in forming desirable polymer are due to an excessive exotherm. Examples of common causes of an excessive exotherm are: (a) a cPRM that is too thick; (b) applying cPRM onto cPRM that is emitting heat, or applying it onto anything else that is hot, heated, emitting heat or carrying heat; (c) using too much catalyst in the PRM; and/or (d) heat in the cPRM's environment that overheats it. A polymer formed in a polymerization process that gets too hot may have an unintended, irreversible colored tint. During hot polymerizations, polymers can shrink away from their molds. Although this shrinkage can be slight and unnoticeable, it can also range to the opposite extreme so that it is dramatic, changing the resultant polymer's general shape and form so that it is noticeably different from the negative space of the mold in which it was formed (e.g., more extreme curves).

Heat from an applied layer of cPRM can accelerate the polymerization reaction of a superimposed layer of cPRM. Thus, when forming multiple superimposed layers of polymer, it is generally preferable to allow each layer formed to reach the gelation stage of its polymerization, preferably to such an extent that it has substantially released any noticeable excessive exothermic heat from its polymerization reaction, and preferably to such an extent that it is firm enough to maintain its own form as desired, before superimposing a subsequent layer of cPRM on it. In a preferred embodiment, thin layers of cPRM are partially or entirely superimposed, on a mold, image support, or other surface such as upon a polymer, e.g., by painting cPRM with an ordinary paint brush. As many layers as desired are superimposed to make polymer that is 2D or 3D. For instance, after the polymerization reaction of the first layer applied has substantially released any noticeable heat and this heat dissipates, and after this polymerizing layer has gelled firmly enough to maintain its own form as desired, a new layer of cPRM is applied preferably thinly, partially, or entirely over it. In another preferred embodiment, layers of cPRM are superimposed in varying thickness on a mold, image support, or other surface, e.g., in poured, drawn, printed, or painted applications. As many layers as desired are superimposed to make polymer that is 2D or 3D. For example, after any heat from the polymerization reaction of each applied layer is substantially released and dissipated, and after each superimposed layer gels firmly enough to maintain its own form, another layer of cPRM can be applied partially or entirely over it.

Often, inventive images are formed in layers or in parts with or without one or more non polymeric ingredients. In some of these embodiments, two or more layers or parts are made using two or more different polymers, e.g., that bring different properties to the image. For example, in one embodiment, a surface preparation stabilizer is used on the polymer that is comprised of a mixed polymer. This mixed polymer surface preparation stabilizer might then be superimposed by one or more polymers that bond to it, the composition or compositions of which are different from that of polymer beneath the surface preparation stabilizer. In addition or instead, this mixed polymer surface preparation stabilizer might then be superimposed by a bonding colorant. Such a mixed polymer surface preparation stabilizer might be comprised of two or more of the different polymers with which the stabilizer is in direct physical contact, or polymers that will bond to them. This embodiment might, for example, be preferable when it is desirable to strengthen the mechanical bond or the chemical bond between inventive image layers or parts which include different polymers. This embodiment might, for example, be preferable when strength or permanence are important in an inventive image made of multiple different polymers with significant differences in their coefficients of thermal expansion.

Often, prior to resuming work on premade polymer surfaces and often non polymeric surfaces as well, it is preferable to abrade their surfaces, even if it is already abraded, unless it was done recently (such as when premade polymers are further developed or reworked, and particularly when one or more materials, media, objects, devices, processes, interactions, or their combinations are superimposed, or connected to premade polymer surfaces). For example, abrading may be done for strength, permanence, or aesthetic reasons. For example, it is preferable to abrade old polymer surfaces prior to superimposing applications of one or more materials or media, such as cPRM or paints.

If desired in some embodiments, the thickness of a polymer or part thereof can typically be evened out or made as uneven as desired in numerous ways, at any time in the formation of an inventive image, e.g., by using polymer or non polymeric ingredients, additive or subtractive processes. In one embodiment, methods are used to make polymer surfaces that will not or may not cure evenly, smoothly, regularly or levelly, or as much so as desired, come out in such a way. Among these methods are examples which also effectively prevent incompletely cured polymer surfaces from forming, or that effectively rework incompletely cured polymer surfaces so that they become further or completely cured. For instance, a stabilizer can be added to cPRM to form a level layer of polymer that is well cured e.g., a stabilizer such as a wax or an ingredient containing wax like SILMAR®'s A-111, BYK®-S 740, or BYK®-S 750. Further methods of this embodiment use stabilizers in cPRM, such as BYK®-S 706, which form smooth, even and level surfaces as desired. In addition, methods of removing matter from a polymer surface can be used to make an uneven, irregular, or pebbly surface as even, as regular, and as level as desired (such as sanding, sandblasting, altering the polymer during its gelation), etc. An additional example includes superimposing polymer surface (s) so that they become as smooth, as even, and as level as desired, e.g., using new applications of cPRM, or non polymeric materials, media, attachments, parts, layers, etc., such as paints, sheets of metal, paper, or polymers, etc. There are also methods of altering a polymer during its gelation which can be used to smooth, even out or level its surface. For instance, placing something flat on a gelled polymer surface can level it, and removing a gelled polymer from its mold or other surface and placing it on something level or smooth is likely to level or smooth it, though the extent it changes depends on the particular specifications in each circumstance.

A preferred method for use in this embodiment to form polymer with smooth, even, level surfaces, is to prop a "roof" over the cPRM, leaving only a small closed air (or gaseous) space above its surface. The "roof" may be made of simple cardboard, aluminum (either a sheet or a foil), Saran Wrap (made by Dow Chemical Company, Dow Brands L.P., Indianapolis, Ind.), glass, wood, etc. The support of this "roof" is not limited to any particular structure, so long as the volume of the enclosed air space remains small. In addition, the better insulation that the "roof" provides to the cPRM, the more fully the polymer will cure, the hotter it will get and the faster its polymerization reaction will be. For example, cardboard and materials made to be used for insulation are preferable for making such a "roof". If desired, an image maker may allow this "roof" to actually contact the surface of the cPRM, e.g., sag into the cPRM, or the effects of the polymerization process might cause an application on the "roof" (such as a paint or ink), to drip into the cPRM, for example, for a desired aesthetic effect. As an illustration of this method, FIG. 74. shows cPRM, identified as b., on a mold, image support, or image surface identified as a., covered with a "roof" identified as c., which could for example be made of cardboard. This "roof" is shown held up from the upper surface of the cPRM by the mold's side edges, leaving a small air pocket between the "roof" and the polymerizing surface. The sides walls of this mold could be permanent parts of this mold or they could be temporary walls attached to a mold surface, an image support or image surface, e.g., temporary clay walls.

Experimentation can be done in the process of making inventive images. Because of the workability, reworkability, and controllability, versatility, WYSIWYG processes of creation, and freedom it offers image makers, the present invention provides opportunities for experimentation, that are generally greater, more free, and more likely to result in successful images of the present invention as desired, than the same or similar experiments carried out in conventional images could. Often prior to experimenting with the present invention, it is preferable to consult experts whose expertise pertains to the experiment which will be done; and it is often desirable to do tests, though there are significant exceptions to this preference.

In some embodiments, it is preferable to form an inventive image in a process or in processes that are different from the recommendations and specifications of the manufacturer or manufacturers of one or more of its ingredients or others with the appropriate expertise. The workability, reworkability, control, versatility, WYSIWYG processes, and freedom offered by the present invention, leaves the door for such image making wide open. For example, an extreme polymer undulation may be formed, if the catalyst or catalysts are used in their cPRM at a percentage higher than that which is recommended. Moreover, once the first layer of this hot cPRM gels, if it does not show any undesirable effects (such as undesirable crazing and cracking), it may be desirable to increase the heat around it (e.g., by placing one or more heat lamps over the polymerizing form), to try to get the polymer form a more extreme undulation.

In another embodiment, desired changes are made to a polymer during the gelation stage of its polymerization process, e.g., for structural, functional, or aesthetic purposes, etc. For instance, desired changes are made that could not be comparably made, or would have been significantly more difficult to make prior to, or after gelation. The methods for modifying polymer during gelation can vary greatly; as can the nature of the changes that can be made, and the magnitude of their effects. For example, a gelled polymer might be altered by changing its support; by adding or changing weight or surfaces resting on and against it; or by changing its position with respect to its support, e.g., by tilting it or by rotating it in its mold. More specifically, weights can be placed on gelled cPRM to make concave indentations on the polymer surface. A planar gelled application of cPRM can be taken out of its mold and flipped over onto a different surface, thus, for instance, the side of this polymer that was exposed to the open air, might form against a surface that will give it texture, and the resulting polymer could have two textured sides rather than only one. The mother mold (mold support) or part thereof can be removed from underneath a mold containing gelled cPRM. Consequently, the mold's form might sag, and the gelled cPRM might change accordingly, hardening in this new altered form. In another example, a gelled polymer is lifted up from its mold or off of it, while its mold or part thereof are altered or replaced. For instance, some of this mold's surface might be altered using additive or subtractive processes (e.g., changing its texture, design, undulations, perimeter shape, or edges). For instance, some of this mold's surface might be removed, or things might be positioned between this mold's surface and its mother mold, such as clay, wood, objects, etc. Then, the gelled cPRM which has been off of this mold surface, is put back upon it, in its original position, or in a different position (for instance, tilted, bent, curved, rotated or even flipped over) where the polymer may harden in a different form than it would have on its original mold. Texture, a design, a drawing, a negative cut out shape, a structural change, or a hole for another part to fit into are among the changes that might be made this way. Sticking things into and onto gelled polymer are ways of making attachments, inlays, connecting parts, adding coloration, and other elements to inventive images. In further embodiments, marks, a design, a drawing or part thereof, can be incised in the soft polymer surface of a part of an inventive image, that has not yet fully cured. In a second example, particles are stuck into a soft polymer surface on an inventive image or on part thereof, for the desired aesthetic effect they contribute. In another example, desirable marks, scratches and negative spaces might be made on and in, the uncured polymer inventive image surface when it is moved, transported, dropped, or slid.

In further embodiments, desired changes can be made in a formed polymer, after its gelation stage ends, but before its external surface has fully cured or hardened. Some of these changes could not be comparably made or would be more difficult to make when that polymer or that part of that polymer fully cures, or even before or during the polymer's gelation. The nature and the specifications of the changes in this embodiment can be of any description. They might be structural, aesthetic, or functional; intentional or accidental, etc. For example, a design, a drawing, or part thereof, can be incised in the soft polymer surface of a part of an image of the present invention, that has not yet fully cured. In a second example, particles are stuck into a soft polymer surface on an inventive image or on part thereof, for the desired aesthetic effect they contribute, e.g. a burnisher is used to press and rub dry iridescent mica pigment into a soft, uncured polymer surface that has been rubbed with the appropriate solvent so that it becomes more sticky.

In cross section or side views, FIG. 83 shows an inventive image or an image support that might be a stabilizer, with an added layer of cPRM that is reworked during its gelation. FIG. 83.I shows an application of cPRM made within temporary walls (e.g., clay walls shown in light gray) on the upper surface of a preformed polymer of the same color. FIG. 83.II shows that this new application of cPRM on top of the older polymer, has gelled firmly enough to maintain its form after its temporary mold walls are removed. FIG. 83.III shows carving that is done in this gelled cPRM before it hardens. FIG. 83.IV shows the hardened polymer inventive image with its carved upper surface (notice that because the newly formed application of polymer is the same color as the older polymer there is no seam between these two layers). This may be the completed inventive image, but if not, it can be further processed as desired. For instance, one or more of its parts (its older polymer, its newer polymer, or both) might be further carved, abraded or cut. For example, the texture of this inventive image's carved polymer might be reworked by filling in some of its negative spaces with more cPRM as shown in FIG. 83.V. The spaces in this inventive image's carved surface that are partially filled in with new cPRM are identified in the illustration as a.-d. FIG. 83.VI shows the resultant inventive image, with the spatial depth of its carved surface reduced. This may be the inventive image desired, but if not, it can be further processed as desired. For example, if the more deeply cut surface texture in FIG. 83.IV is preferred, this polymer inventive image (in FIG. 83.VI) can be reworked using one or more processes for removing matter from it (e.g., carving, cutting, sanding, etc.) so that it is returned to the way it was in FIG. 83.IV.

In some embodiments, inventive images or parts thereof are formed using one or more sprayed applications, e.g., applied on inventive images or parts thereof, on cPRM (such as gelled cPRM), or on a mold. For example, cPRMs, paints, inks, solutions, waxes such as wax media, oils such as linseed, solvents, or other liquids might be sprayed in one or more thick or thin applications on polymeric or non polymeric inventive image surfaces, or on molds. Examples of devices that might be used to make such sprayed applications are: pump sprays, air brushes (such as those conventionally used for image making) atomizers, or even spray cans that also contain a propellant that is a gas at room temperature (like a spray paint).

In some embodiments, paper that is covered with cPRM becomes more transparent or translucent. For example, applications of cPRM might be sprayed, painted or printed onto paper, in one or more layers. As another example, drawing or painting is done on a cotton paper initial image support using conventional practices, such as watercolors. Then 17 layers of a cPRM (e.g., acrylic or predominately acrylic) are applied onto this image, some of which might be colored and some or all of which might for example, be sprayed. If desired, some or all of these 17 layers of cPRM could be comprised of polymers made of different compositions, or some or all of these 17 layers could alternate with non polymeric layers. Once this is done, the inventive image may be finished, but if not, it is then further processed, e.g., a drawing incised in it, or more cPRM added.

Heat is used in some embodiments to form, process or rework one or more linear polymers in inventive images, e.g., using conventional practices for design and production of things that are non-images. Different linear polymers may require different degrees of heat to soften or to melt as desired. There are conventional practices for the design and production of products that are not images using heat with linear polymers, any or all of which can be used to make inventive images. Heated polymer is preferably allowed to cool and harden once the heat is no longer needed. These are examples. Linear polymer particles (e.g., in the form of pellets, beads or powder) might be heated and put into a mold or onto an inventive image surface. A sheet of a linear polymer (such as acrylic), might be processed with heat. It might be slumped into a mold underneath it in order to change its shape, or its surface may be altered while it is hot (e.g., one or more attachments may be made to it while it is hot, or it is incised). Once a linear polymer is softened with heat, it may be put into a mold. In another example, a hot blow gun or a hot hair drier might be used to bend a linear polymer rod to form an inventive image. Heat might be used to form or rework linear polymer in an inventive image or part thereof, using conventional practices. Also, linear polymer softened by heat, liquefied using heat, or both, may be put onto an inventive image surface, a mold, or both.

In a further illustration, the use of heat provides ways to add one or more ingredients to linear polymer inventive images or parts thereof. One or more ingredients might be mixed or slightly mixed into heated linear polymer, heterogeneously or homogeneously. A linear polymer surface might be heated, so that it will bond or bond more strongly, to one or more superimposed parts, attachments, particles, applications, or concentrated mixtures, to make bonding spots. One or more ingredients might be stuck onto a heated linear polymer inventive image surface, they might be attached to sticky heated SSI or attached to dry SSI made using heat. Such an embodiment might be used to add one or more stabilizers, coloration, light effects, fillers, or texture to an inventive image, e.g., adding pigment, particles of mica or glass, pieces of silver leaf or wire, cut-outs, a device, etc. Heat might be used to embed or inlay in linear polymer in an inventive image or part thereof or to make superimpositions or attachments to it (e.g., applications, attached parts, layers, collaged elements, etc). Heat might be used to add a stabilizer to an inventive image (e.g., to PLEXIGLAS® V920-100 made by Elf Atochem North America Inc), to a bond a fiber stabilizer to a linear polymer inventive image, or to coat or seal an inventive image.

Heat might also be used with one or more polymers to add a wide range of surface preparation stabilizers to inventive images, e.g., by making SSI or bonding spots or layers such as those made of linear polymers, mixed polymers, fiber, absorbent media and materials, etc. Heat can also be used to process a polymer inventive image or parts thereof in other ways. For instance, heat might be used to incise or carve a polymer inventive image surface, e.g., for sgraffito; texture, drawing, writing, or a relief; to alter the ability to see through the polymer, to alter the light that passes through the polymer; to make surface irregularities; to change the shape or form of the polymer; to change its color, for printmaking purposes such as for use as a printing plate, to inlay in the polymer, etc.

In some embodiments, one or more polymers in an inventive image or part thereof is formed or reworked using one or more appropriate solvents. For example, a linear polymer partially or entirely softened or dissolved by an appropriate solvent is useful in making inventive images, e.g., for making parts, layers, attachments, surface preparation stabilizers, entire inventive images, bonding substances, bonding spots, bonding surfaces (such as sticky surfaces), etc. Different solvents can affect different polymers differently; one solvent may have a stronger effect than another on a particular linear polymer.

Conventional practices for use of solvents with polymers are useful in these embodiments. For example, to form or rework an inventive image, or part thereof (such as its surface), a solution can be made in a desired viscosity, using a polymer and a solvent appropriate for that polymer. For example, polymer particles (e.g., in the form of pellets, beads or powder) might be partially or entirely dissolved or softened in a solvent appropriate for that polymer, and then put into a mold or onto an image surface. Such a mixture might also serve as a bonding substance in an inventive image, for instance in a continuous application or applied as bonding spots, e.g., to adhere one or more attachments, such as layers, applications, particles, parts, or collaged elements. In another example, softening the surface of a polymer with an appropriate solvent enables it to be altered, using one or more subtractive or additive processes. One or more ingredients (in the form of parts, attachments, particles, applications or layers) might be bonded to a linear polymer surface that has been softened or made sticky by an appropriate solvent, or which has SSI formed by softening the linear polymer surface with an appropriate solvent. In more specific examples, methylene chloride, or MEK, preferably doped with a polymer, might be used to bond polyacrylic image pieces of the present invention together. One or more solvents might be used with polymer to embed or inlay in an inventive image or part thereof. It is preferable to be attentive to the shrinkage when the solvent diffuses out of the polymer. One or more solvents might be used with polymer to add one or more stabilizers, coloration, light effects, or texture to an inventive image, e.g., to add pigment, particles of mica or glass, refractive inlays, pieces of silver leaf or wire, cut-outs, a device, etc. One or more solvents might be used with polymer to add a stabilizer. If desired and if applicable, in these embodiments, ingredients might be added to linear polymer using one or more appropriate solvents in concentrated-mixtures. One or more appropriate solvents might also be used with one or more linear polymers to add a wide range of surface preparation stabilizers to inventive images, e.g., by making SSI, bonding spots or layers. One or more appropriate solvents can also be used to further process linear polymer inventive images or parts thereof in other ways, e.g., to etch, incise or carve a linear polymer surfaces, such as for sgraffito, texture, relief, to draw, to write, to alter the ability to see through the linear polymer, to alter the path of the light that passes through the linear polymer, to form surface irregularities, to change the shape or form of the linear polymer, to change its color, for printmaking purposes such as for use as a printing plate, etc.

In a further illustration, a solution made by dissolving one or more linear polymers in an appropriate solvent, might be sprayed, painted, or printed onto an inventive image, a mold or both, as desired. If desired, such a solution might also contain other ingredients, such as a stabilizer, a matting agent (e.g., silica), or a dye. The solution might, for example, be sprayed in one or multiple layers, evenly or unevenly, e.g., making shapes, or lines of drawing on the inventive image, etc. If desired, sprayed applications of such solutions may be further processed as desired, e.g., using additive or subtractive processes for example, they may be superimposed by additional layers of the same linear polymer, perhaps applied using a different method (for instance, applied with a paint brush); they may be superimposed by one or more other applications, parts, or attachments made of one or more different compositions; they may be incised (such as for sgraffito, drawing, or writing), etc. Sprayed applications on polymer can be surface preparation stabilizers.

In some embodiments, one or more polymers are superimposed onto an inventive image surface made of a different composition, with or without additional ingredients in it, e.g., as a surface preparation stabilizer. For example, such a superimposition might be made on an inventive image using heat, using one or more solvents that are appropriate for that or each particular linear polymer, it might be done using a bonding agent (such as screws, string, wire, a bonding substance, etc.), it might be done using interlocking forms, gravity, or by other methods. As an illustration, poly-methylmethacrylate mixture is applied on an inventive image surface made of a different composition, e.g., in the form of a powder, flakes, pellets or pieces can be partially or fully dissolved in MEK. This mixture can then be applied on part or all of the inventive image surface made of a different composition as desired, e.g., it might be painted or poured onto an inventive image surface, such as onto a different polymer, cotton paper, or a fabric. But, if desired, before applying such a solution onto an inventive image surface, one or more additional ingredients can be added into it, e.g., one or more stabilizers, sources of coloration, or sources of light effects. In addition or instead, ingredients might be added into such a solution that will enable it to bond or to bond more strongly to the inventive image surface upon which it will be applied or to one or more superimpositions made upon it. As a more specific example, MEKP might be mixed into this mixture comprised of poly-methylmethacrylate and MEK. If desired, one or more other ingredients might be added, such as pigment, colored particles, reflective particles, an UV light stabilizer, or a matting agent (such as silica). The resultant mixture might then applied onto an incompletely cured polymer inventive image surface, e.g., the mixture might be applied onto a polyester surface left incompletely polymerized because of the evaporation of MEKP during its polymerization. This mixture might be applied using a paint brush, sprayed or both. If desired, heat can then be used to work or rework this application as desired, e.g., using a device that blows hot air on it, this application can be smoothed, incised, or both. In addition or instead, the bond between this image's incompletely cured surface and its superimposed polymer application might have been enabled or fortified by other means, for example: 1) by one or more ingredients (such as a stabilizer) added into the superimposed application or part thereof; or added on or in the incompletely cured image's surface or part thereof; and/or 2) by one or more other alterations of the incompletely cured image's surface or part thereof.

When seepage occurs in making inventive images, it often polymerizes between the polymer and its mold, bonding to the polymer as a raised, irregular, fragmented, second impression of the mold. In forming polymer, seepage can occur in a variety of different circumstances. For example, seepage can occur when pouring cPRM more than once onto the same surface, for instance in thickening a polymer or part thereof, and in the formation of a polymer tier layer on a polymer layer. Seepage can occur when adding cPRM onto any inventive image surface or part thereof which is not horizontal, (e.g., side edges). Seepage can occur if the mold leaks, if a clay wall is poorly sealed, if there is a hole or a crack in the polymer or other surface, or when adding more cPRM on polymer loose in its mold, e.g., a gelled or hardened polymer. Should a polymer have seepage, it can be accepted, limited, removed or a combination of these. Fully controlling seepage during polymerization without undesirably risking or altering the expected formation of the polymer inventive image is difficult, yet by using VIMC, seepage is often easy to limit. Methods and ingredients in cPRM that increase the viscosity of cPRM can also be used to reduce or try to eliminate seepage, such as with the use of stabilizers in cPRM that increase its viscosity such as viscous monomers, fumed silicas, and others. Another strategy using the VIMC is to restrict seepage time by catalyzing the PRM with a high percentage of catalyst (though catalyzing too hot can be risky). Making polymer without a release agent on the mold can result in less seepage, but it may also shorten the life of the mold, especially if it is done repeatedly. Other processes for forming, reworking and controlling inventive images might be used as desired for avoiding, limiting, correcting, altering, or removing seepage. Sometimes it is effective and desirable to pull, break, carve, chisel, sand, or cut seepage or one or more portions of seepage off of an inventive image. Processes used to form polymer can be used to control or affect the polymer formed, as desired, or to try to accomplish these goals. Examples are the use of differently designed molds (e.g., enclosed molds), the use of tiered processes of layering polymer, and using other VIMC.

In an embodiment, inventive images are made in tiered layers or tiered parts. Tiered methods are preferred for adding cPRM to surfaces that change in level such that a single layer of the cPRM may not entirely cover them without applying it thicker than desired in a certain part or parts of the application. For example, tiered processes might be preferred to form polymer on a surface with undulations or angles too great for a single layer of the cPRM to fully or evenly cover, e.g., cPRM would run off of the slopes or angled sides of such surfaces and harden in thick puddles in its valleys. Polymer can be formed in tiers on any mold, or other surface or on part thereof, e.g., on polymer or non polymeric inventive image surfaces. The capabilities of different monomers, catalysts, PRM and cPRM can differ (e.g., with one particular cPRM, undulations greater than about three inches over a 12" square surface would be too great to cover fully or evenly in a single layer of cPRM). Frequently, temporary walls or barriers are desirable for use in making polymer in tiered layers, oil formulated clay walls are preferred.

In an illustration of one of the preferred methods for forming a polymer in tiers, an image maker can: apply cPRM to the lowest levels of the surface first—its valleys, thickly enough to completely cover said surface's lowest valleys; use multiple layers if necessary to achieve the thickness, the strength and the permanence desired; and after polymer forms as desired on these lowest surface valleys, move upwards on the mold, image support or other surface, forming polymer in increasingly higher tiered layers, each of which slightly overlaps the polymer tier layer lower than it, creating an overlapping connecting seam as it polymerizes. It is preferable to use clay to wall off the boundaries of each overlapping tier layer formed, so that the new cPRM inside of it does not run down onto lower tiers. Thus the boundaries (e.g., clay walls), within which polymer tier layers are formed from the second level of tiered layers on up, contain both a part of the lower polymer tier (that will bond to the new polymer formed, joining the lower tier to the higher tiers), and a new area of the mold, image support or other surface that is higher than the level of the previous polymer tier. Tilting the mold, image support or other surface often enables polymer to form more evenly so that the resultant polymer will be as even in its thickness as possible. Polymer tier edges usually polymerize looking like steps down from the high to the low polymerized tier layers. If this aesthetic is desirable, leave these. Once a tiered polymer is made as desired, it can be the completed inventive image if desired. Or it can be further processed as desired. For example, if desired, a tiered inventive image can be thickened or painted as desired. Fiber can be added to it if desired, whether its surface remains staggered, or whether its tier edges are tapered to make its surface as continuous and as smooth as desired. Tapering tier edges so that they become continuous and smooth can make the applications (such as fiber; attachments; and connections to other parts) easier. It can also change the polymer's use of light and shadow, color, and other formal elements.

Seepage occurs frequently when forming polymer in tiers, e.g., because lower tiers that are curing or that have cured become or are loose in their molds as higher tiers form, for example, due to shrinkage of polymer as it cures. When a new polymer layer is formed on top of polymer that is loose in its mold, some of its cPRM can become seepage down between a lower polymer tier, and the mold.

In some embodiments, cPRM or polymer are used in a subordinate or supportive way, to assist or to fortify parts of inventive images made of other compositions. For example, polymer in these embodiments might provide support to a superimposed layer, part or application that is not strong or stabile enough to function well in its use in the image without additional support. Examples are strengthening stabilizers described herein. Also refer to FIG. 7, the description of which is forthcoming. The layer, part or application supported by the polymer in these embodiments might be desired in the inventive image for other reasons, e.g., for the image's aesthetic. For example the layer, part or application might have desirable optical qualities, light properties, coloration, or it might have the ability to be further processed effectively in a manner which is desired. In another example, non polymeric inventive image parts can be made with cPRM on them, within them (e.g., embedded within them perhaps in a hollow interior space, or mixed into them. Examples of reasons to add cPRM to non polymeric inventive image parts are: (a) for making bonds and fortifying bonds, e.g., to connect parts, layers, etc.; (b) to give them a desired aesthetic (such as: to make or smooth out a texture, to make attachments like collage; to give them coloration, a layer of transparency, a shape, a form, light, or light effects); (c) to form, enhance or reinforce their structure, their strength and their permanence (e.g., stiffening them or making them rigid, or sealing them for instance with a stabilizer); (d) to bond them to rest of the inventive image or to another part thereof,; and/or (e) to enable them to be further processed (e.g., with a coating of cPRM, a sheet of paper can be carved).

The formal elements can be used in conventional ways in inventive images as desired. Specifically, any conventional practice (such as a technique or implement) can be used with the present invention because the present invention is a medium for use for making images, a process for making said medium, and methods for using said medium to make inventive images, and because inventive images can be comprised of polymer, with or without other materials, mediums, objects, devices, processes, or interactions. For example, conventional practices used to form and rework conventional polymer products may be used as desired to form or rework inventive images or parts thereof, e.g., conventional methods of injection or extrusion molding, blow molding, spin casing, annealing, printing processes, laser cutting, (for instance, for cutting, welding, drilling, scribing and engraving), heat welding and sealing (for instance, heat or hot plate welding, bar sealing, hot-knife sealing, electromagnetic or induction welding, vibration welding, spin welding), polishing, ultrasonic assembly (for instance ultrasonic welding), solvent and adhesive bonding (such as cementing), snap and press fits, mechanical fastening, embossing, insert-mold decoration, die cutting (such as high precision), hot stamping, flexography, screen printing and other printing processes; conventional practices for forming, developing, working with, setting up and installing conductive polymers (for instance, so that they emit light), etc. Many companies that make monomers and polymers provide information (e.g. they offer publications) describing such conventional practices. For instance, Bayer Corporation offers a publication "Engineering Polymers, Joining Techniques, a Design Guide". Thus, ingredients used in cPRM (such as monomers and stabilizers) may for example, be selected for properties that facilitate the specific conventional practice used, (this is a conventional practice in the production of conventional polymer forms of all kinds). For instance, Elf Atochem North America Inc. in Philadelphia, Pa. (formerly Atohaas America Inc.), offers literature describing methods of injection molding and extrusion molding their PLEXIGLAS®. The Dow Chemical Company of Midland Michigan offers similar literature specifically detailing methods of processing their STYRON®, TYRIL® and CALIBRE®. The Bayer Corporation of Pittsburgh Pa. offers literature on methods and problems in processing their LUSTRAN®, MAKROLON® and other polymer products. Such conventional practices may for example, be used to make inventive images, even though they are not conventionally used for image making. For example, polymer parts of inventive images may be annealed to reduce stress in them. This annealing process might, for instance, be conventional oven annealing or this might be a process of infrared light annealing, such as the infrared light annealing process that is patented technology that can be licensed through Miles Inc, Miles is owned by Bayer Corporation. In other embodiments, conventional photoresists, solder masks, soldering processes, soldering materials, or a combination of these are used in making inventive images, e.g., using conventional practices such as those practices used to make circuit boards, such a conventional process might make a circuit board on an inventive image.

Further Description of Coloration, Bonds & Stabilizers

Many inventive images are colored and many are even made for their use of color, e.g., for their unique use of coloration with real light and real (rather than illusionary) spatial depth. The use coloration in inventive images expands prior limits in conventional images such as: a) the permanent use of transparent, translucent and see-through color; b) layering color; c) the use various specific conventional practices for coloration; d) the use of color with real variable spatial depth; e) the use of color with light, e.g., real light (such as color from polymer LED(s) and special effects of light); and f) the strength and permanence of color applications. The use of color in inventive images, particularly in polymer, is typically remarkably varied, versatile, workable, reworkable and controllable as desired. Further, it is often reversible, e.g., color can easily be sanded or sandblasted off, a colored section of a polymer can typically be removed (for instance, cut out), and an image area where color has been removed can typically be reworked and controlled as desired (for instance, coloration can be reapplied).

There are innumerable ways of using of color in inventive images, e.g., all kinds of coloration can be used in almost any method and manner within or on inventive images. Pigments, dyes and other coloration can be used as part of polymer in any form or in multiple forms, e.g., dry powders, liquids, pastes, materials, media, particles, objects, devices, other forms of coloration, and combinations of these. Examples of means by which coloration is part of an inventive image are, by embedding, attaching, or inlaying it in polymer; by painting, drawing, or printing, (e.g., with oil paints, acrylics and other water based media, enamel paints, wax based paints and crayons, inks, chalks, pastels, graphite, etc.); coloration that can be put in cPRM; by the addition of photographs and transparencies to polymeric or non polymeric image surfaces; or by the use of one or more non polymeric ingredients in inventive images, etc. Dyes and pigments used in inventive images are preferably compatible with the rest of the formulation that they are used in (e.g. compatible with the vehicle such as the PRM and other additives).

Coloration can be brought to an inventive image that is formless until it is applied, e.g., paints. Or, coloration can be brought to an inventive image in a defined form (though its defined shape or form might change as or after it is part of an inventive image), e.g., by the use of preformed polymer or by the use non polymeric ingredients, such as attached particles, organic forms, embedding, inlays, light sources (such as LEDs and bulbs), other attachments (such as devices, hardware etc.) and using photography.

As further examples of coloration for use in inventive images, coloration is made and sold specifically for use in PRM or cPRM, e.g., in paste mixtures, that can be used in inventive images as desired. For example, Ciba-Geigy offers many lines of coloration products that may be used in inventive images. For example, Ciba-Geigy's MICROLITH® pigment preparations may be high grade organic, classical organic, and inorganic pigments predispersed in a variety of resins, e.g., MICROLITH®-K may be a line of pigments predispersed in a vinyl copolymer resin. Though Ciba-Geigy targets this line of pigments for the vinyl, acrylic and aromatic polyurethane system of solvent based gravure printing inks, it is not limited in its use in inventive images. The carrier resin for MICROLITH®-K pigments may for example be readily soluble in monomeric plasticizers at elevated temperatures, ketones, esters and chlorinated hydrocarbons. Microlith®-A may for example be a line of pigments predispersed in ethyl cellulose carrier resin. Though Ciba-Geigy targets this line of pigments for gravure and flexographic printing ink, it is not limited in its use in inventive images. The carrier resin for MICROLITH®-A pigments may for example be readily soluble in alcohol, ester, ketone, glycol ether and aromatic hydrocarbon solvents. MICROLITH®-WA may for example be a line of pigments predispersed in alkaline water/alcohol soluble acrylic resin (specially developed for aqueous gravure and flexographic printing) with pigments that may be compatible with UV and ink jet printing inks. MICROLITH®-T may for example be a line of pigments predispersed in a modified rosin ester compatible with a wide range of polymers such as ethyl cellulose, polyethylene, PVC, PMMA, alkyd resins, waxes, and polyester, e.g., among compatible solvents are ketones, esters, aliphatic and aromatic hydrocarbons. Other coloration made by Ciba-Geigy for use in inventive images are these examples: MONASTRAL® Pigments, e.g., high performance quinacridone and solid solution pigments with excellent fastness to light, weather, heat, chemicals, and solvents; IRGAZIN® Pigments, e.g., high performance organic pigments with superior weather resistance; CROMOPHTAL® pigments, e.g., high performance organic pigments with very good fastness to light, heat, solvents, and chemicals; IRGACOLOR® pigments, e.g., high performance inorganic pigments of the Bismuth Vanadate type with very good resistance to heat, weather, and chemicals; IRGALITE® pigments, e.g., classical organic pigments; GRAPHITAN® pigment flakes, e.g., specially treated pigment flakes designed to give metallic-like effects in transparent mediums; ORASOL®, e.g., solvent soluble dyes that may be metal-complexed dyes soluble in organic solvents such as alcohol, ketones and esters, and insoluble in hydrocarbons; IRGASPERSE®-U, e.g., high purity liquid dyes that may be selected acid dye solutions with a wide range of solvent compatibility, (for example water); UNISPERSE®, e.g., aqueous paste dispersions that may have highly concentrated pigment pastes conventionally used for emulsion paints and printing inks, but that may be used in inventive images without limitations; and ORACET®, FILAMID® and FILESTER®, e.g., polymer soluble dyes (intended for the plastics industry). Bayer AG of Germany, the parent company of Mobay Corporation in Pittsburgh, Pa. also offers colors that can be used in inventive images such as LISA® color concentrates.

Cookson Pigments of Newark, N.J. offers a variety of pigments for paint, plastic and ink that might be used in inventive images. Morton Thiokol, Inc. of Chicago, Ill. offers a variety of colorants for use in inventive images such as their PEROX® and HYTHERM® Dyes. Coloration for use in inventive images is also made by Paul Uhlich and Co. in Hastings-on-Hudson N.Y.; Fezandie and Sperrle of Tricon Colors Incorporated in Elmwood Park, N.J.; Sun Chemical Company in Cincinnati Ohio; PMS Consolidated of Somerset N.J.; PDI, of ICI Americas in Edison N.J.; and Engelhard Corporation of Iselin N.J. Degussa in Germany offer colorants such as pigments for use in inventive images. Degussa is also located in Ridgefield Park, N.J. BASF offers colorants that can be used in inventive images such as pearlescent pigments made of mica flakes coated with metal oxides, e.g., Colibri are opaque metallic, and Chroma are interference pigments and Kremer Pigments Inc. of NY, N.Y. offers a wide array of pigments and dyes for use in inventive images. Kremer Pigments Inc. sells a wide array of pigments and other colorants from all over the world many of which are of high quality, with unique aesthetic qualities that are useful in inventive images, but Kremer does not give out the names of all of its suppliers who make these pigments. Iwa-Enogu in Japan offers colorants for use in inventive images sold at Kremer. Colorants such as pigments for use in inventive images are also offered by Gamblin Artists Colors Co. of Portland Oreg.; Winsor and Newton of London, England; Sennelier of Paris France; Old Holland Oil Colour Association of Driebergen, Holland; and Schmincke of Dusseldorf, Germany. As additional examples, products available that are made for antiquing, staining and pickling both wood and polymer surfaces can be colorants in inventive images, e.g., a product called, Wood'n Resin Gel Stains offered by DecoArt in Stanford, Ky.

Coloration can be used as desired, in or on an inventive image, or part thereof (e.g., its cPRM, its polymeric, or its non polymeric parts), at one or multiple times throughout the image's formation or afterwards, as desired. Thus, coloration (e.g., drawing, painting, or colored cPRM) can be embedded partially or entirely by superimposed cPRM; by a Separating Layer; by one or more other superimposed materials, media, objects, or devices. For example, if desired, a polymer can have coloration covering it partially or entirely as desired, e.g., painting or drawing internally, externally or both. This might be done, for instance, by using any one or multiple materials or media; or any one or multiple tools; or no tools. Coloration added to an inventive image may bond to it as desired, e.g., in a mechanical bond, a chemical bond, or a loose bond. For example, after forming a portion of a polymer, with or without one or more non polymeric ingredients (e.g., coloration), anything desired can be applied upon or to that polymer as desired (e.g., painting, drawing, writing, printing, collage, or coloration in other forms) entirely or partially over any or all of its surfaces, as these surfaces then exist, (e.g., the polymer surface might have a surface preparation stabilizer which bonds the layers together). Then, more cPRM, with or without coloration, or one or more other materials, media, objects, or devices, can be applied onto the initial image, partially or entirely covering any previous coloration and other applications and additions (e.g., the previous painting or drawing application). Then, more coloration can be added if desired and as desired, partially or entirely covering the surfaces of the new layer of polymer, e.g., another layer of painting or drawing can be superimposed. If desired, such alternating applications can be repeated as many or as few times as desired—a layer of cPRM alternating with a layer of coloration, e.g., painting or drawing. Using coloration in or on polymer to make inventive images can produce new and unique effects and images.

In preferred embodiments, the inventive medium has at least one synthetic polymer capable of bonding to at least one superimposed medium selected from the group of paints, dyes, inks, primers, binders and/or photographic emulsions. This medium may be used to make inventive images.

In preferred embodiments, an inventive image's coloration is altered by the use of one or more processes of removing polymer or other matter from it. In addition to conventional practices (e.g., removing materials with an eraser or a rag), matter can be removed from inventive images in unique ways, for a unique control over images, and for unique effects, e.g., by sanding and other abrading processes. For example, processes for removing polymer from a homogeneously colored, transparent red polymer inventive image, can turn this image pink, e.g., in selected areas that may form a drawing or a design, or pink all over. The removal of matter from a polymer or an inventive image can be used to lighten the hue, value, or intensity; to bring more real light into an inventive image; or to add shadows, soften color, add other variations to color, for other effects or purposes. Different processes of removing matter from polymer or from other parts of inventive images can be used as desired, for instance, to create different effects, e.g., sandblasting, carving, cutting, engraving, sgraffito, incising, drilling, and other processes, etc.

Marking on and in inventive images can be done using any means, methods, and manners desired. For example, on or within a single image surface, one or more marks might be made using one or more additive or subtractive processes, as desired. For example, all conventional and unconventional processes can be used to mark on and in inventive images, such as all painting, drawing and writing processes; carving, incising, sgraffito processes; processes of transferring matter to inventive images (e.g., printing, masking such as stencils, templates, tracing processes, stencils, graphite or carbon paper, cartoons); processes involving projections, other photographic processes, collage, inlays, attachments, temporary or permanent applications; resistance dying, e.g., using wax on selected parts of an image's surface and removing it after that surface has been selectively colored), etc. Also, all conventional tools, and equipment used for conventional marking can be used on inventive images as desired, e.g., pens, brushes, pencils, felt markers, chalk, pastels, charcoal, erasers, squirt bottles, printers, devices that spray or squirt coloration; tools for engraving, incising and cutting surfaces; sponges, rags, rollers; various kinds of printing plates, materials or devices, etc. Many conventional practices for marking on the inventive image surfaces can be done with greater and more variable use of formal elements as desired, such as, space (e.g., open space, real spatial depth, illusionary space, etc.), real light, real transparency, real translucency, layering, etc. The use of many conventional practices on and in inventive images can be done with a high level of workability, reworkability and controllability, which is often greater than their conventional uses.

In some embodiments, conventional paper is used in inventive images, e.g., paper pulp; a conventional image making paper; a rice paper, rag paper, or cotton paper; a hand made paper; a synthetic paper; a transparent, translucent or see through paper; or a paper that is a combination of these. Paper might give inventive images special effects, e.g., of light, texture, color, absorbance, and spatial depth. cPRM can strengthen paper, make it more transparent, more translucent, more rigid or enabling the paper to be processed in a manner that would not otherwise be possible (e.g., an incised image made of paper and polymer, or one with a 3D sculptural form, or a rigid form). 2D or 3D paper sheets or forms, made with or without cPRM, might be image supports (e.g., initial image supports or image support stabilizers) for inventive images that may be superimposed by cPRM (continuously or discontinuously), e.g., forming a layered image, or the cPRM might serve as coloration on the paper. Such image supports might be surfaces for conventional or unconventional painting printing, writing, photography, drawing, carving, engraving or collage. Conventional paper sheets or forms might be an underlayer or a surface preparation stabilizer on a polymer substrate, e.g., for superimposed coloration on one or multiple sides of the inventive image. Substances (such as paint) might bond to the inventive image due to the mechanical bond provided by a paper surface preparation stabilizer. It is often desirable to use a stabilizer in inventive images that will protect paper which is part of them from discoloration, e.g., due to UV light.

When the strength, or permanence of an inventive image are important, it is generally desirable for all of its ingredients to be of the highest level permanence, refinement and purity available, applicable and possible. This preference pertains to all parts of an inventive image. For example, materials and media of fine artists' quality or of professional grade are generally preferred rather than those of a lesser grade (such as grades for students or hobbyists that often have ingredients, e.g., fillers and other additives), that are significantly more likely to change over time than fine artists' quality or professional grade media and materials.

Pigments, dyes and other sources of coloration vary widely in their ability to dissolve or disperse in various substances, such as in materials, media, vehicles, binders, stabilizers, combinations of these, e.g., in cPRM, in a clear acrylic gel, an oil based substance, etc. In many embodiments it is preferred that one or more pigments, dyes, or other sources of coloration are fine or are made finer before they are added to an inventive image using methods that grind them by hand or by machine. For example, grinding methods are often preferred for dissolving or dispersing one or more sources of coloration and for making them finer at the same time (provided the specific coloration used can be made finer in the specific grinding process used). Pigments, dyes and other coloration also vary widely in their abilities to color—to affect hue, value, and intensity. For example, two pigments that look similar can color a material or a medium, such as a PRM, very differently. The control of a polymer's color can also be affected, often tremendously, by active ingredients in its cPRM. In order to control the color of a polymer when adding coloration to its PRM, it is often preferable to add the source of coloration (e.g., the pigment or dye) to it gradually.

In preferred embodiments for using coloration in an inventive image, coloration is added as desired into the monomer, the monomers, the PRM or the cPRM being used to form its polymer, or part thereof (e.g., layers or sections of the polymer). For example, many dyes that might be used for transparent colors in polymer inventive images are already soluble in one or more monomers. One preferred method is to, is to first make one or more concentrated-coloration-mixtures, each with one or multiple pigments, dyes, other forms of coloration, or combinations of these. Then, the concentrated-coloration-mixture or mixtures can be added as desired, into the total quantity of the monomer, the monomers, the PRM or the cPRM being used to form the polymer, or part thereof as desired. Also in some embodiments, such concentrated-coloration-mixtures might be used as desired to add coloration to non polymeric parts or areas of inventive images, e.g., into paints such as clear acrylics, oil based paints, wax based paints, etc; into coatings; into stabilizers; into plaster or paper pulp; into a glue or other bonding substance, etc. These concentrated-coloration-mixtures can be made using the same method as those made for polymer. One preferred method for making such concentrated-coloration-mixtures for inventive images is the same method described herein for making concentrated-stabilizer-mixtures, which is based on methods traditionally used to form oil paint.

In an embodiment, a desired aesthetic effect is created in an inventive image by using one or more sources of coloration unevenly, inconsistently or heterogeneously in a cPRM, or in polymer or even in non polymeric image parts.

In some embodiments, a unique paint made using coloration with cPRM as its binder can be used on and in inventive images as desired, for example, for painting, underpainting, drawing, printing, writing, or other kinds of marks on polymer and on non polymeric inventive image surfaces. Paint with cPRM as its binder might, for example, be radiation cured. For instance, it might contain a photoinitiator and it might be cured by UV light. (However it is preferred that any exposure to UV light does not change or weaken the inventive image undesirably, e.g., UV light can cause discoloration in many kinds of images, for instance in pigments, papers, etc.) If desired, paint made with cPRM as its binder might also give the inventive image texture or light effects, e.g., by its viscosity, its application, its ingredients, its conductivity, or a combination of these. This paint might for example be formed using one or more sources of coloration, dispersed or dissolved in cPRM. For instance, this paint might have one or more dyes, pigments, stabilizers, densely dispersed sand particles, dispersed crystal particles, matting agents, transparent particles, reflective particles, dispersed dry paper pulp, dispersed dichroic glass particles, dispersed particles of polymer; one or more other media, materials, particles, objects, or devices within it; or a combination of these as desired. Other additives might be put into this cPRM also if desired, e.g., for texture, for light effects, etc. Such a paint can be applied to inventive images using any methods, means and manners desired, e.g., using conventional practices for image making and for forming polymer things that are not images. Further applications of this paint can be reworked and controlled as desired, e.g., removed, carved or overlaid. Then if desired, these painted inventive image surfaces or part thereof, can become internal within them as desired, e.g., if these surface are superimposed with more cPRM, with another bonding substance or both. In another example, this paint is made with at least one conductive polymer.

Among the preferred binders for making a paint for use on a polymer inventive image are its cPRM, or a bonding cPRM. cPRM that can form conductive polymer are also preferred for use in paints and other colorants on and in inventive images. Conventional binders that bond with the polymer surface are also among the preferred binders for making a paint for use on it. Paints with vehicles or with ingredients in their vehicles that bond to the polymer inventive image surface are also preferred for use on it. Alternately, one or more of a polymer's monomers, or one or more bonding monomers might be used as a binder for a paint application on said polymer surface, e.g., if the paint application is then embedded within the inventive image by superimposed cPRM. Or, either the polymer's catalyst or a compatible catalyst might serve as the binder for a paint application used on it, e.g., for paint applications made on an incompletely cured polymer surface. If desired, stabilizers such as UV stabilizers, might be added into any of these paints. Among the ways that some of these paints might be made is by using a concentrated-coloration-mixture. If desired, such paints can also be used as desired, on non polymeric inventive image surfaces, e.g., on paper, canvas or wood. Often, coloration can begin to be added on a polymer surface, as soon as its cPRM gels firmly enough for the application to be made as desired. Coloration can be added to a polymer inventive image as desired, in or on its external or internal polymer surfaces, e.g., whether they are unabraded or abraded, incompletely or fully cured, gelled cPRM, etc.

In preferred embodiments, inventive images are made with one or more new unique underlayers or conventional underlayers that may be surface preparation stabilizers. Further, it is often preferable to add coloration to polymer inventive images or parts thereof, upon or as surface preparation stabilizers, particularly when these surface preparation stabilizers enhance bonding. Many kinds of surface preparation stabilizers provide polymer and nonpolymeric image surfaces with desirable bonds to conventional image making materials and media without undesirable consequences. As an important example, surface preparation stabilizers enable polymers to be used as image supports (e.g., stabilizers), for superimposed coloration and marking. In a preferred embodiment, conventional acrylic paint, acrylic painting medium, acrylic paint binder, or acrylic based primer (e.g., gesso or size) is superimposed upon polymer as a surface preparation stabilizer that is then superimposed by further painting, drawing, printing or other marking. For instance, this conventional acrylic might be colorless. It might for example, be used as an intermediary bonding agent or an underlayer. Many conventional acrylics will bond to polymers as desired, and if they do not bond or bond as well as desired, an ingredient can be added to enable the bonding desired.

In preferred embodiments, a polymer surface preparation stabilizer is made on an inventive image or part thereof which absorbs one or more superimposed different substances in a desired manner. The absorbency of a surface preparation stabilizer may be consistent, inconsistent, or both (in different areas) e.g., it is entirely absorbent or it has absorbent bonding spots. For example, a polymer surface preparation stabilizer absorbs one or more superimposed paints, inks, dyes, painting media, sizes, glues, or other substances to a desired extent, e.g., for aesthetic or bonding purposes. Thus, for example, such a polymer surface preparation stabilizer can be a surface for painting, drawing, printing, writing, collage, photographic processes, or other marking, e.g., on an image support that may itself be a stabilizer. As a specific example, a surface preparation stabilizer made in one of these embodiments, might be made using a cPRM made of one or multiple monomers, but which contains one or more absorbent polymer(s) such as 2-hydroxyethyl methacrylate (HEMA). HEMA or one more other absorbent polymers could be used in any percentage desired (e.g., at less than 10%, less than 5%, or at 25%, 30%, 51%, or 95% or higher), with or without one or more other monomers, fillers, or other additives (e.g., which affect absorbency), to form a surface preparation stabilizer on an inventive image or part thereof, which is as absorbent as desired. As further examples, an inventive image (e.g. an image support that may be a stabilizer) might be made of a cPRM with a desired level of strength, rigidity or optical properties (e.g., light transmission, light effects, etc), which is not absorbent, but which is covered with an absorbent surface preparation stabilizer, e.g., HEMA or a fine see through cotton or rice paper. Then this inventive image might be further processed with coloration. Absorbent polymer can give inventive images new and unique effects, e.g., effects of absorbed color and bleeding color. In one embodiment, part or all of the polymer in an inventive image (e.g., its surface) is made so that it is capable of absorbing water or oil. As an illustration, a polymer surface preparation stabilizer that can absorb water might be used on an inventive image (e.g., on an image support that may be a stabilizer) as a surface for painting, printing, drawing, or writing, in water based media such as inks and paints like acrylic paints, watercolors, tempera, etc.

In an embodiment, the application superimposed upon an absorbent polymer inventive image surface that may be a surface preparation stabilizer, functions as an underlayer (though it may or may not be a second surface preparation stabilizer) to prime or prepare it for further superimpositions as desired. For instance, such an underlayer might alter the image's degree of absorbency as desired (e.g., lessening it) in order to make one or more desired superimpositions. It might for example be an intermediary, like a primer or a size (e.g., transparent and colorless, perhaps, a conventional painting medium or size without coloration). It might be an imprimatura with transparent coloration; or it might be a layer of underpainting or underdrawing. Such an underlayer might for example, absorb into the polymer surface so that applications superimposed upon it will not, or so that applications superimposed upon it will not absorb into the surface to such a great extent. Such a primer might also be particularly useful when it is desirable to superimpose an absorbent polymer surface with a kind of substance that does not absorb into the polymer in the manner desired.

In another embodiment, inventive images or part thereof are made using polymer that can be penetrated by an oil soluble dye in a vehicle, e.g., in an appropriate solvent or in a mixture containing an appropriate solvent. In some polymers, such a dye may not only mark the surface, but can penetrate beneath the surfaces into the structures, and in doing so, may or may not take its vehicle or one or more ingredients in its vehicle into the polymer too. As an illustration, such a polymer might be used to make a surface preparation stabilizer on an inventive image (e.g., on an image support that might be a stabilizer), which is then superimposed by one or more oil soluble dyes in a vehicle (with or without added ingredients), e.g., in drawing or painting applications. As another illustration, such a polymer might serve as an image support (e.g., stabilizer). Among polymers, linear polymer are preferred for use in this embodiment, such as, polyvinyl chloride. Should the polymer be plasticised with a stabilizer, penetration of an oil soluble dye into it is accelerated. For example, such a plasticizer stabilizer might be in the polymer, in with the dye, or in with the vehicle containing the dye. Because the effects made by such dyes in contact with polymer generally differ from those effects made by dyes in contact with cPRM, the degree to which the polymer marked in this embodiment is cured when it is marked is a VIMC that can be used to achieve a desired effect, along with other factors (such as the compositions of the polymer, the dye, its vehicle, etc.). As a further illustration of this embodiment, a polymer such as a polyvinyl chloride might function as a surface preparation stabilizer on an inventive image or as an image support (e.g., stabilizer), for drawing using an oil based, ink marker (such as the permanent marker called "Sharpie" made by Sanford in Bellwood, Ill.); or for a painting done using a conventional paint or ink (e.g., a conventional oil paint, printing ink or drawing ink) made with an oil soluble dye. In a further example, the penetration of oil soluble dyes into polymer might be used to create effects of stained color, bleeding color, flowing color, and other such qualities and effects in inventive images.

In another example, the vehicle in such a surface preparation stabilizer might contain one or more ingredients that enable another different substance superimposed upon it to bond to the inventive image. For instance, the vehicle in such a surface preparation stabilizer might be linseed oil or it might contain linseed oil, thus a conventional oil based paint subsequently superimposed upon it would bond to it. In addition or alternately, the vehicle might contain particles that form SSI providing a mechanical bond with a superimposition. In a different example, the vehicle in the surface preparation stabilizer might be principally made of a solvent, but this vehicle might have a third ingredient which is the binder in a subsequently superimposed paint.

In addition to or instead of conventional underlayers, inventive images can have underlayers made of polymer of the present invention. Examples are polymer layers or image supports that serve as imprimatura, grounds, underpainting, underdrawing, or primers. A preferred method of making such underlayers is by adding one or more forms of coloration in cPRM (e.g., dispersed or dissolved) that forms transparent or translucent colored polymer to make an imprimatura, that forms opaquely colored polymer to make a ground, and that has any color desired to make underpainting or underdrawing. cPRM forming a colorless polymer layer or image support can serve as a primer on an inventive image, e.g., a surface preparation stabilizer. cPRM such as these kinds of mixtures, is placed either on a mold or on a polymeric or non polymeric inventive image surface, such as an image support. Such underlayers may or may not function as surface preparation stabilizers. Their polymer can be made of any composition, with or without other non polymeric ingredients. Their coloration may be even or uneven, and they might have texture or light effects. For example, particulate elements may be added, into these underlayers, to give the image light effects (e.g., iridescent, reflective and dichroic particles in their cPRM), and/or they might be made of conductive polymer such as that which is capable of emitting light. SSI on such underlayers that are superimposed may or may not comprise a surface preparation stabilizer. As an illustration, such an underlayer might be a colored polymer inventive image formed in a mold, or on a polymeric or non polymeric inventive image surface, e.g., on wood, glass, metal, fabric (even on a primed canvas), or paper (even if it is conventionally primed). These polymer underlayers may be made using one or multiple superimposed applications of cPRM. For example, such an imprimatura might be made of a layer of transparent red polymer formed on a layer of transparent yellow polymer formed on a layer of transparent pink polymer; or by forming each of these same three layers of polymer on a different surfaces of one or more inventive images, they could each be a separate imprimatura. Moreover, one, two or all three of these layers might be made of a conductive polymer. This underlayer might emit light, for example, it might be one or more LEDs, or it might show a video image. Thus for example, an image maker further developing such an inventive image, could be working with real light, or coloring, painting or altering real light as never before.

Whereas conventional underlayers like imprimatura and grounds are typically limited in their spatial depth, and their light effects, many kinds of underlayers made using the present invention, can have any amount of real spatial depth desired, and a broad array of light effects, for example, they can be made using conductive polymer, e.g., forming light emitting or electrically active layers such as imprimatura or grounds. Polymer underlayers can be any thickness desired, made in one or more layers that are the same or different. As an illustration, such an underlayer might be between 0.1 inch and 6 inches thick. It might have one or more dispersed or dissolved dyes or pigments; it might have dispersed sand, crystal particles, dry paper pulp, dichroic glass particles, polymer particles, iridescent, metallic or fluorescent or reflective particles, one or more other dispersed or dissolved media, materials, particles, objects, or devices within it; or a combination of these. Such underlayers might have identifiable elements within them (e.g., particles, objects, devices), etc. They can be rigid, flexible, in between these two extremes, absorbent or hydrophobic to any extent, or a combination of these. They might also be made with absorbent polymers, or conductive polymers, such as those that emit light e.g., LEDs. Furthermore, because polymer of the present invention can be strong, an underlayer made of the polymer can form or enhance inventive images structurally. An underlayer made using polymer might be an inventive image's entire thickness, almost its entire thickness, or any lesser percentage of its thickness, e.g., it might be an image support. For example, it might be the sole structural support for an inventive image that is either a painting (e.g., made with a conventional paint), or a drawing (e.g., made by incising or by adding matter.) Underlayers like imprimatura and grounds made using the present invention can be further processed on one or more sides, as desired, using any methods, means and manners desired, e.g., by painting, drawing, writing, printing, using processes for removing matter, or by photographic processes. For instance, a polymer underlayer might be further processed as it is forming (e.g., during its gelation), or after it has hardened, and it can be reworked as desired. Inventive images can have one or multiple underlayers of the same kind or of different kinds, on one or more of their sides, and any of these can be superimposed. Polymer underlayers of the present invention can be surface preparation stabilizers that might be further processed using additive or subtractive processes. For example, a single inventive image can have multiple imprimatura on different surfaces areas, e.g., one on its backside and one on its front side. Or, for example, if desired, a conventional imprimatura, a Clarifying Imprimatura, or both might be applied over the kind of unique polymer imprimatura described above.

In embodiments, underlayers made of conductive polymer comprise image supports or they are superimposed on, or in image supports (that may be stabilizers). Thus these underlayers might be electrically active, conductive of ions, or of another form of energy, e.g., they may emit light. Such underlayers made with conductive polymer may or may not be comprised of two or more layers, e.g., they may be comprised of multiple layers of conductive polymers, some of which emit different colors of light, or they might us energy in a different way for visible results in inventive images. If desired, inventive images of these embodiments may be further processed as desired, e.g., using additive or subtractive processes.

In some embodiments, polymer underlayers can be made on opaque inventive image surfaces as desired. For example, these might be made on opaque inventive image surfaces that are light reflective, e.g., on opaque metal, metallic colored, and white inventive image surfaces, etc., even with a LED such as one made using a conductive polymer. For instance, the inventive image developed in FIGS. 16.a.-c. might be a highly polished piece of metal encased in a polymer imprimaturs, e.g., part or all of which might be capable of emitting light. As another example, a polymer imprimatura or a conventional imprimatura can be formed on a polymer ground or on a conventional ground (any or all of which might be surface preparation stabilizers) on an inventive image.

New underlayers of the present invention can be used on inventive images in addition to or instead of conventional underlayers. Also, if desired, underlayers of any kind or of multiple kinds might be used over other underlayers, as desired (e.g., with the exception of Clarifying Imprimatura that preferably exist on surface of inventive images that are transparent, translucent or both). For example, an inventive image surface with a unique polymer imprimatura or ground made according to the description herein, serving as a surface preparation stabilizer might be superimposed by another second imprimatura (that may be conventional, or new and unique such as made using colored cPRM) that bonds to it chemically or mechanically.

Inventive images can be made in an unlimited variety of the forms and structures using all kinds of methods, means and manners (e.g., conventional practices as well as new methods). Besides holding an inventive image together, bonds can enhance their strength and permanence. One or more bonds can be formed in an inventive image as desired, using any method, means and manner desired, e.g., one or more mechanical bonds, chemical bonds, or loose bonds, for instance, to connect a layer, an application, a component, a section, a device, an object, or another attachment. Many materials, media, objects, devices, and their combinations are able to bond to inventive images as desired, e.g., measures do not need to be taken to strengthen these bonds. Such bonds can be fortified or assisted, or other bonds can be made. For instance, a material, medium, object or device, might be used to temporarily or permanently assist in bonding an attachment to an inventive image.

In many embodiments, one or more bonding agents are used to form, strengthen or assist a mechanical bond, a chemical bond, or a loose bond. Bonding agents of many kinds can be used on polymer or non polymeric parts of inventive images in any method, means and manner desired. For instance, a bonding agent might bond a paint application, an attachment or both, that may not be able to bond to a particular image surface, or that may not bond to it as well, without the bonding agent. In another example, a bonding agent, such as a bonding substance, can be used as an intermediary on one or more polymeric or non polymeric inventive images or inventive image surfaces to enable one or more subsequent superimpositions to bond to that image as desired, e.g., to enable one or more new applications, attachments or connected parts to bond to that image (such as a bonding agent used in, on or around one, two or more layers, attachments, areas, sections, surfaces, or components). For instance, the surface of a polymer or non polymeric inventive image part, which has a bonding substance applied partially or completely on it, is placed in direct contact with an inventive image part that bonds to that same bonding substance (e.g., adding a new component or attachment on the inventive image). Or, a bonding agent may be used to fortify a bond (such as a weak or loose bond) between two or more parts of an inventive image. One or more bonding agents upon a polymer inventive image surface may comprise a surface preparation stabilizer. Stabilizers, coloration (e.g., pigments and dyes), textural materials, fillers, and other ingredients can be added to bonding agents if desired, e.g., for purposes that are aesthetic, functional or structural. In many embodiments, it is preferable that a bonding agent be invisible to the human eye; its visibility is insignificant or not undesirable; it brings a desired aesthetic to an inventive image; or it enables the inventive image to have another desired effect, function or both. A bonding agent might be a desired underlayer (e.g., as a surface preparation stabilizer); it might be the final layer; or it might be used in order to rework the inventive image. The use of some bonding agents on inventive images enable new and unique images to be made.

In a more specific example, cPRM might be used as a bonding substance, to permanently connect parts to polymeric or non polymeric inventive image surfaces, as desired, e.g., to adhere fabric, paper, wood, string, a photograph, a cut-out, a found object, a print, a drawing, or a device, to an image. This cPRM bonding substance might be the same substance used to make one or more of the parts being bonded; or it may be compatible with it. Or, for example, a non polymeric bonding substance (such as a conventional painting material or medium or a conventional glue), might be used to bond one or more other materials, media, objects, or devices to an image. As a further example, mechanical bonds can be made between multiple parts of an inventive image, using one or more bonding agents, such as: wire, hinges, screws, nails, string, or substances (e.g., like paint, cPRM, etc.). For instance, a perforated steel mount can be attached to an inventive image using a bonding substance, such as a cPRM, or bonding agents such as screws and wire.

In a number of embodiments, one or more monomers, polymers, conventional cements, or other conventional glues are used as bonding substances in making inventive images. Solvent based cements are commonly used for bonding appropriate polymers. For example, in one method, parts are dipped and soaked in the cement until they soften. The softened parts are then held in contact until they join. Alternately the parts might be held together and cement introduced into the joint between them, e.g., using an eye dropper or syringe. In another example, some polymer can be dissolved in a solvent based cement to make a viscous polymer/solvent cement, that is applied (brushed on) on inventive image surfaces that are then held in contact until they are joined. In other embodiments, in forming inventive images using polymer parts (such as made of Bayer's LUSTRAN® SAN or MAKROLON® polycarbonate), joining can be done using an appropriate solvent or adhesive system, e.g., parts are softened by the appropriate solvent, and then held in contact until they are joined.

As further illustrations, inventive image parts made of Bayer's LUSTRAN® SAN can be bonded to one another, and inventive image parts made of Bayer's MAKROLON® polycarbonate can be bonded to one another using adhesive systems such as: two part epoxy (e.g., made by 3M Industrial Specialties of St. Paul Minn. or Loctite Corporation of Rocky Hill, Conn.); two part urethane (e.g., made by Ciba Geigy Corporation, Ashland Chemicals of Columbus Ohio., Lord Corporation of Erie Pa., Ciba Furane Products of Los Angeles Calif., or Morton International Inc. of Chicago Ill.); acrylic (e.g., made by Ciba Furane Products); Methacrylic (e.g., made by ITW Adhesives Systems of Danvers Mass.); UV cure (e.g., by Loctite Corporation, or by Dymax Corporation of Torrington Conn.); hot melt e.g., by Bostik of Middleton Mass., or Henkel Adhesives of LaGrange Ill.); vinyl (e.g., made by King Adhesive Corporation of St. Louis Mo.); or contact tape (e.g., made by 3M Industrial Specialties). LUSTRAN® SAN inventive image parts can also be bonded using cyanoacrylate (e.g., by Loctite Corporation or by Bostik) or LIQUID NAILS® by The Glidden Company of Cleveland Ohio. MAKROLON® polycarbonate inventive image parts can also be bonded using silicone e.g., by GE Silicones of Waterford N.Y.; Dimethyl Formamide (DMF Solvent, e.g., by Fisher Scientific of Pittsburgh Pa.); UV-Curable (Dymax's 181-M Adhesive or 190-M Adhesive); Cyanoacrylate (Loctite Corporation's Prism Cyanoacrylate P-454 Adhesive) or Solvent-Based Urethane (Bostik's 7133 Adhesive). Polymers that are made of the same or similar compositions as LUSTRAN® SAN and MAKROLON® polycarbonate (such as other SAN polymers and other polycarbonates) can also be bonded using the adhesives in these examples.

SSI, small surface irregularities and large surface irregularities may be used as desired on and in inventive images, e.g., they can be added and removed from surfaces; small surface irregularities may become SSI; and SSI may become small surface irregularities. In some embodiments, bonds in inventive images are made or strengthened using SSI. It is generally preferred that SSI are irregularly cut or undercut (even if they are shallow). For example, cuts made by contemporary sandblasting processes can look more undercut, more random and more irregular in size, shape, and direction under a microscope, than cuts made by contemporary beadblasting processes. Thus, currently sandblasting is preferred over beadblasting for forming SSI on appropriate inventive images by removing matter from them.

Further ways to create surface irregularities on inventive images include subtractive processes like sanding, cutting, carving, incising and using a Paasche "AEC Eraser Set" (described herein), as well as additive processes. For example, surface irregularities might be made by using particles as an ingredient in forming the image (e.g., in PRM). Or they might be made by adhering or applying particles to the PRM (e.g., gelled), to the polymer or to a non polymeric image surface, e.g., using a binder, medium, glue, cPRM or paint. Such particles might for example be glass, polymer, sand particles, pigment or other colorants, metal, fiber, etc. Surface irregularities might be formed on an inventive image using a conventional medium for preparing surfaces for pastels, or charcoal, or by adding a material with surface irregularities to the inventive image such as paper, bark, or painting and drawing with high percentages of solid or particulate ingredients, etc. Some surfaces such as that of a premade polymer, may be so well "cured" that it will not make a strong chemical bond with a fresh layer of the same cPRM, a different cPRM or another bonding application that would normally bond to it. It is preferred that such surfaces are abraded before the superimposition is applied. In addition, to forming a mechanical bond, this may also enable it to form a better chemical bond.

As illustrations, SSI on a part of an inventive image are filled by a cPRM, by glue, or another medium. They may serve as a surface preparation stabilizer because they are superimposed by paint or by drawing. SSI enable a sandblasted glass surface to mechanically bond to polymer in an inventive image using cPRM as an intermediary bonding substance.

As another illustration, subject A., a substance, is applied onto SSI on an inventive image, and superimposed by subject B. that bonds to it. Thus, subject B. is bonded to this inventive image, whether or not either subject A. or subject B. would be capable of bonding directly onto that surface of the inventive image without SSI. In this illustration, the SSI or subject A might be a surface preparation stabilizer. Subject B. might, for example be: paint, varnish, a drawing, wire, fiber, mesh, gold leaf, pieces of metal wood or clay, string, leaves, glass particles, photographs, paper, hardware, devices, etc. Subject A., might for example, be a new or a conventional underlayer.

In a further illustration, cPRM, transparent colorless acrylic paint, and another colored paint, are applied in a design on SSI on an inventive image surface. While the applications made on these SSI are wet other elements are stuck into them, e.g., photographs, metal loops, wood cut-outs, small colored particles of various shapes and sizes, and other elements some of which have artistic light effects. If this inventive image surface is polymer then some of its SSI comprise a surface preparation stabilizer. SSI enable inventive image surfaces to be used for strong permanent painting, drawing, collage, printing, writing, photography, or other conventional art and design applications. An inventive image might for example, be a planar polymer with SSI that serve as a surface preparation stabilizer on one or more of its sides, which is used as an image support (e.g., a stabilizer) for superimposed coloration, e.g., as painting, drawing, writing, printing, photography, combinations of these, etc. In some embodiments, SSI on polymer and non polymeric inventive image surfaces enable coloration to be made on them that could not be made as well, that could not be made as desired, or that could not be made at all, on these same inventive image surfaces, if they were smooth or without SSI. For example, fine SSI on a polymer inventive image surface serve as a surface preparation stabilizer, enabling drawing to be done on it as desired using pencils, charcoal, conte crayon, pastels, etc. Then, if desired, this drawing might, for instance, be superimposed by a layer of transparent colorless substance (e.g., a fixative, a sealer, a varnish, a cPRM, etc.), that seals the drawing and fills in the SSI on the polymer inventive image surface in the places that have no drawing.

It is generally preferred that changes made to an inventive image for forming, strengthening or assisting bonds, be: (A) invisible to the unaided human eye; aesthetically insignificant or not undesirably visible; or aesthetically desirable; and (B) reworkable or removable if they risk affecting the image undesirably.

In a number of embodiments, bonding substances are applied on inventive images, e.g., they are painted, for instance, with conventional paints. Then these images might be finished. However, if they are not, part or all of such applications, might be used as an underlayer for one or more superimposed bonding applications, that may or may not have bonded directly or strongly onto the surfaces beneath their underlayers. In some cases these underlayers are surface preparation stabilizers. As an illustration, some paint formulations (e.g., acrylics) bond to polymeric or non polymeric inventive image surfaces. For instance, acrylic painting is done directly on the polymer inventive image surface, to which it bonds. If this inventive image is not finished, this acrylic painting might, for example, be used as an underlayer, e.g., a surface preparation stabilizer. On some or all of this image's surface, the painted underlayer might or might not contribute to its aesthetic significantly. Part or all of the painted underlayer is superimposed by one or more further applications, e.g., applications of substances that may not have been able to bond or to bond as strongly and as permanently without this underlayer, such as oil paint. As more specific example, part or all of this painted application that is used as an underlayer might be superimposed by oil painting, though this oil painting would not have bonded as desired to the surface of this inventive image surface without its underlayer surface preparation stabilizer.

As another illustration, it might be desirable to paint a polymer inventive image surface with a substance that does not bond to it, without lessening its strength or permanence. To do this, a continuous or discontinuous surface preparation stabilizer is used on the polymer as an intermediary bonding agent upon which the desired paint is superimposed. This surface preparation stabilizer might, for example, be comprised of one or multiple layers, e.g., it might be a cPRM or a conventional material or medium like an acrylic. Further, such a surface preparation stabilizer might or might not affect the image aesthetically. Then, if desired, paint applied on this surface preparation stabilizer might also be partially or entirely superimposed by another different bonding substance, that may or may not have been able to bond to this image as desired, if it were applied directly on its initial polymer surface or on its surface preparation stabilizer. Thus, the paint application upon the surface preparation stabilizer might be functioning as a second surface preparation stabilizer.

In many embodiments, inventive images or parts thereof are made using polymer selected or formulated because it bonds to subsequently superimposed applications, attachments, or parts. These might for example be image support stabilizers. In another example, a polymer or non polymeric inventive image surface is formulated (e.g. with or without a surface preparation stabilizer) so that it bonds to a conventional image making material or medium subsequently superimposed, such as a paint or a drawing material. As an illustration, a polymer surface is formed that bonds to a vinyl paint, e.g., FLASHE® (made by Lefranc and Bourgeois of Le Mans, France). A transparent or translucent acrylic image support stabilizer has a surface preparation stabilizer that allows applications (such as painting and drawing mediums) that are not acrylic, to bond to it, e.g., oil paint or watercolors.

In some embodiments, one or more ingredients in a cPRM, enable the resultant polymer to bond to particular kinds of superimpositions. In an illustration, a mixed cPRM (e.g., surface preparation stabilizer) on a polymer surface is interposed between two or more parts of an inventive image, to bond them together (e.g., to connect layers, components, attachments or a combination of these to an image's surface). Such a mixed cPRM contains two or more different monomers and the catalysts appropriate for polymerizing them. In such a mixed cPRM, one or more of the monomers and the catalyst appropriate for polymerizing it might be the same as one or more of those used in each of the image parts being connected, or it might bond to one or more of those in the parts being connected. In an example, a mixed cPRM surface preparation stabilizer interposed between two different inventive image parts at least one of which is polymer, bonds to each of them, though otherwise they would not be able to bond or bond well to one another. If desired, the bond made between these two image parts might also be strengthened or temporarily assisted using another bonding agent. In further examples, a mixed cPRM is an underlayer (e.g., surface preparation stabilizer) on a polymeric or non polymeric inventive image surface. For instance, a mixed cPRM surface preparation stabilizer might be used on a smooth polymer inventive image surface to enable it to bond to a superimposed acrylic paint that might be further superimposed or developed in other ways if the image is not complete, This acrylic paint application might not have otherwise bonded directly onto the smooth polymer image surface. If this inventive image is not completed, its acrylic paint application might be partially or entirely superimposed e.g., by another layer of the same mixed cPRM that was used underneath, thereby making the acrylic paint application serve as a second surface preparation stabilizer. This inventive image might be complete, but if it is not, its mixed cPRM surface might be used to bond one or more additional applications, attachments or parts, or the image might be developed using subtractive processes. Mixed polymers such as this example are very useful on inventive images, e.g., Separating Layers and bonding spots.

In some embodiments, it is often desirable to use one or more linear polymers over the inventive image surface made of one or more different compositions, (e.g. as a continuous layer or in one or more areas, for instance, discontinuously such as bonding spots). A linear polymer on a polymer inventive image surface may or may not be a surface preparation stabilizer. For example, it is often desirable to use a linear polymer over a crosslinked polymer inventive surface. In another example, it is often desirable to use polyacrylic over or under inventive image surfaces made of one or more other compositions. Linear polymers might for example be added over inventive image surfaces made of one or more different compositions using methods described herein, e.g., by using SSI or by using surface preparation stabilizers for instance in between polymer inventive image surfaces and polyacrylic applications such as surface preparation stabilizers made by adding one or more ingredients (for example stabilizers) into PRM that enable or fortify bonding to superimposed polyacrylic. A linear polymer such as polyacrylic might for example be used over inventive image surfaces made of other compositions to enable them to be further processed in a desired manner, (e.g., with the strength, permanence, aesthetic qualities, and other desired qualities that would not have been possible otherwise). This superimposed polymer or the substrate it is superimposed upon might be a mixed polymer. For example, a layer of linear polymer (such as polyacrylic) on an inventive image surface made of one or more other compositions (e.g., a surface preparation stabilizer), might enable it to be further processed: 1) on a desirable and/or new kind of substrate or underlayer; 2) with one or more bonded attachments, parts, layers and/or collaged elements, e.g., polyacrylic attachments; 3) with one or more superimposed applications; and/or 4) with heat, with a solvent, or both, e.g., to make a desired design, for instance, by sgraffito. In a different illustration, a layer of linear polymer (such as polyacrylic) on an inventive image surface made of a different composition might be a Separating Layer, a Clarifying Imprimatura, or a layer of bonding spots, whether or not it is a surface preparation stabilizer. Linear polymer inventive image surfaces (e.g., polyacrylic surfaces) such as those formed in these examples, might for example, be superimposed by one or more bonding applications, such as painting, drawing, printing, writing, drawing, collage, photography, etc., e.g., made using conventional image making practices, such as conventional acrylic paints. Then if desired, the inventive image surface might be further processed using one or more subtractive or additive processes (e.g., adding new superimpositions).

In some embodiments, it is often preferable to superimpose an acrylic emulsion, a conventional acrylic paint, a conventional acrylic paint binder, or a composition containing one or more of these on an inventive image. Such an application may for example, be an underlayer a surface preparation stabilizer on an inventive image surface, e.g., which is superimposed by another acrylic paint that might not bond as desired to that image surface without the intermediary layer. For example, in some embodiments, it is often preferable to superimpose RHOPLEX® (such as RHOPLEX® WL-96, or RHOPLEX® WL-51), or media containing RHOPLEX® on inventive image surfaces such as those that are polyacrylic (with or without other ingredients added into the application or applications such as coloration, particles, stabilizers, matting agents, etc.). RHOPLEX® is made by Rohm and Haas of Philadelphia, Pa. These are some examples. In an application on an inventive image surface (e.g., on a polyacrylic image surface), RHOPLEX® WL-96, another kind of RHOPLEX®, and/or another acrylic paint or binder, might be: 1) the binder for a paint; 2) a surface preparation stabilizer; 3) an application with a stabilizer mixed in and/or stuck onto it, e.g., a UV light stabilizer and/or a fiber stabilizer; 4) added into another application, e.g., RHOPLEX® mixed into a conventional acrylic paints; or 5) bonding spots or a Separating Layer, either of which may be a surface preparation stabilizer. In addition or instead, applications of RHOPLEX® on inventive image surfaces might be further processed in other ways, e.g., using subtractive processes, or in a combination of these ways, as desired.

In some embodiments, it is desirable to use one or more crosslinked polymers over the inventive image surface made of one or more different compositions (e.g., as a continuous layer, or in one or more areas for instance, discontinuously such as bonding spots). On the image such a crosslinked polymer may or may not be a surface preparation stabilizer. In some embodiments, cPRM that forms a crosslinked polymer (such as polyester or a mixture of polymers containing polyester), is applied on a linear polymer inventive image surface, e.g., as a surface preparation stabilizer. Examples of methods for superimposing a crosslinked polymer on an inventive image surface made of a different composition, are by the use of SSI, large surface irregularities, a chemical bond, it encircles or encases its image support, or it is loosely bonded or not bonded (e.g., relying on gravity). In another example, the cPRM bonds to the linear polymer inventive image because it is used on multiple sides, e.g., encircling the image. A cross linked polymer can for example, enable further processing using subtractive processes more easily and more effectively than a linear polymer, e.g., the linear polymer will scratch easily and accidentally, and the heat generated by a number of tools for removing matter from a linear polymer melts and clogs the tool's bit, blade or abrading surface, or it might melt, reform and harden in an undesirable manner on the image itself (for example, filling in some of a negative space in a polymer right after it is created).

In an embodiment, a surface preparation stabilizer is formed on a linear polymer inventive image surface by making said surface sticky using a mixture of i) one or more solvents that are appropriate for that particular linear polymer, and ii) one or more of the catalyst(s) for cPRM or cPRMs subsequently superimposed. This might, for example, be done in reworking an inventive image surface, e.g., a polyacrylic surface. As an illustration, a surface preparation stabilizer is formed on a polyacrylic inventive image surface by making it sticky using an appropriate solvent, such as a MEK with a small percentage of the catalyst, MEKP mixed into it. Then, cPRM catalyzed with that same MEKP (e.g., cPRM that will form polyester), is applied on the sticky polyacrylic inventive image surface preparation stabilizer.

In some embodiments, in making or reworking an inventive image or part thereof, one or more ingredients (e.g., stabilizers) are added into cPRM so that it, or the polymer formed bond as desired to one or more subsequently superimposed applications, layers, or attachments, parts. One or more such mixtures might be used to make image support stabilizers, surface preparation stabilizers, separating layer (e.g., stabilizers), or underlayers. cPRM or polymer surfaces formed in these embodiments such as those that are stabilizers, might for example enable further processing such as painting, printing, writing, drawing, collage, photography, etc., as well as desired aesthetic effects, (e.g., new and unique ones) to be done on the inventive image surfaces that might not have otherwise bonded, or bonded as strongly or as permanently. Or as another example, the cPRM mixtures of these embodiments might be surface preparation stabilizers on polymer image supports (that may or may not be stabilizers) that are further processed, e.g., using conventional image making practices.

As an illustration, in an embodiment, one or more waxes, one or more stabilizers containing wax (such as SILMAR®'s A-111, SILMAR®'s S-250, SILMAR®'s S-250a, BYK®-S 740, and BYK®-S 750), one or more other compositions containing one or more waxes (such as painting media containing wax and encaustic paints), or a combination of these are used in cPRM as stabilizers, in forming part or all of an inventive image. Wax might for example be used in cPRM for a desired aesthetic effect (e.g., a matte effect or to lessen transparency or translucency), or for reasons previously described. In addition or instead, wax stabilizers in cPRM can enable bonding to subsequently superimposed applications. For instance, cPRM with wax dispersed in it in one of the forms described above, can be applied on one or more polymeric or non polymeric inventive image surfaces, on molds, or both. The resultant polymer inventive image surfaces may have wax sites that bond to superimposed applications of conventional image making materials and media such as oil paints, encaustic paints, oil pastels, various kinds of colored pencils, crayons, etc. (Wax is an additive commonly used in conventional oil paints, e.g., for a matte effect.) Such polymer inventive image surfaces can for example, be used for painting, printing, writing, drawing, collage, etc. As an illustration, a polymer initial image support (e.g. stabilizer) with such a surface preparation stabilizer, might be thin rigid and self supporting, without a stretcher, frame, mat or backing, it may be colorless and it may have special light effects. Upon its surface or surfaces, permanent oil painting is done.

In some embodiments, one or more waxes, one or more stabilizers containing wax (such a those described herein), one or more other compositions containing one or more waxes (such as painting media containing wax and encaustic paints), or a combination of these, might be used on inventive image surfaces, whether they are then superimposed or not. This might be done, for example, for a matte effect, to lessen transparency or translucency, for reasons previously described, as a sealant or coating, for bonding purposes, as an underlayer, or as a surface preparation stabilizer.

In a further embodiment, in the formation of an inventive image or part thereof, a particulate material is added into cPRM to form SSI on the resultant polymer surface enabling one or more superimposed applications to bond to it or bond to it more strongly. In some circumstances these SSI constitute a surface preparation stabilizer. Polymer formed in this embodiment may be an image support (e.g., stabilizer). For example, the SSI formed by particles added into cPRM enable a polymer inventive image surface to bond to a substance that functions like a glue, bonding one or more superimposed attachments, or parts to the image. In another example, an image surface of this embodiment is a surface preparation stabilizer that is drawn upon, painted, photography is formed on it, or printing is done on it, e.g., the SSI mechanically bond a photographic emulsion; paint applications; other marks made in charcoal, graphite, conte crayons, or pastels to it. Also refer to FIG. 21 that has a colored polymer underlayer made of polymer with textural particles inlaid in it, and superimposed applications made on two of its sides. This image is made on an image support that is a new imprimatura or ground, as well as a stabilizer.

In a preferred embodiment, an inventive image or part thereof, is formed by adding one or more conventional image making materials or media into a larger quantity of cPRM. When mixed into a larger quantity of cPRM at a percentage of about 0.4%-40% (by volume), conventional paints, sizes and primers; binders used in conventional image making media and materials; conventional media for painting; absorbent polymers; cPRM or PRM that forms absorbent polymers; wax, and compositions containing wax; and/or one or more ingredients that enable the formation or fortification of a bond between the polymer inventive image formed and at least one superimposed application or colorant are stabilizers, if that ingredient or those ingredients enable the formation or fortification of a bond between the polymer inventive image formed and at least one superimposed application or colorant. Examples of conventional ingredients that might be mixed into cPRM to form mixtures of this embodiment are: oil(s) used in conventional oil paints such as linseed oil, oil paint(s), wax(es) and medium(s) containing wax(es) (such as waxes used in oil paints and encaustic paints), acrylic paint(s), acrylic paint binder(s), acrylic painting medium(s), paper pulp, binder(s) conventionally used in paper, coloration such as pigment(s) and dye(s), or a combination of these. For an example of a way to add such ingredients into cPRM, refer to the method of making concentrated-coloration-mixtures herein. Mixtures made in this embodiment might be used to form inventive images or parts thereof. They might for example bring desired aesthetic qualities to inventive images, such as color, texture, or light qualities and effects (e.g., translucency, opacity, iridescence, a matte surface, effects enabled by the use of conductive polymer, etc.). They might be used to mark on inventive images, (e.g., to paint, draw, print, write, etc.). Mixtures made in this embodiment might be used on inventive image surfaces, upon one or more conventional image making materials, media or both, that bond to the conventional image making material or medium in the cPRM mixture of this embodiment. (For instance cPRM that has oil paint or linseed oil in it is applied over oil painting on an inventive image surface, or cPRM with an acrylic painting medium or acrylic paint in it is applied over acrylic paint or an acrylic painting medium on an inventive image). Mixtures made in this embodiment might be used on bonding polymer inventive image surfaces or on SSI on inventive images. As another example, whether or not their aesthetic contribution is significant, part or all of mixtures formed in this embodiment might be external surfaces, final coats or sealers on inventive images. For example, they might be applied over weak or fragile image surfaces, such as over applications that are conventionally sealed or fixed (e.g., pastel or charcoal drawing), or applications similar to these. Mixtures formed in this embodiment might be also applied over image surfaces that are not fully cured or hardened. Mixtures made in this embodiment might form image supports or parts thereof (e.g., stabilizers). In addition or instead, the mixtures made in this embodiment might be used for bonding or as underlayers, e.g., as surface preparation stabilizers. It is often preferred that once mixtures formed in this embodiment polymerize, their conventional image making ingredient or ingredients are bonded to them. Mixtures made in this embodiment might form or strengthen bonds in inventive images, for instance, where there might not be any other way, or any better way to do so, e.g., in between two image parts, in between an image and attachments, or in between an image and further applications.

These are some illustrations. Inventive image surfaces formed in this embodiment used to form polymer (e.g., on a mold, on an image support or on an inventive image) and/or used on polymeric and/or non polymeric inventive image surfaces might 1) bond to an oil painted part, to a piece of acrylic, to a variety of collaged elements, other attachments, or to a conventional image made of a compatible material or medium such as a cut out, a photo or a drawing; 2) bond to one or more superimposed applications, e.g., of conventional or unconventional image making materials and/or media (such as those that are the same as or compatible with the ingredient or ingredients mixed into the cPRM of this embodiment); 3) be underlayers, e.g., superimposed by conventional image making materials, mediums or both, (such as surface preparation stabilizers and/or separating layers, e.g., stabilizers); 4) be bonding spots or have bonding spots; 5) bond conductive polymer layers to one another, to one or more non conductive inventive image layers, and/or to one or more non polymeric inventive image layers; and/or 6) bond a means of display onto or into an image, such as mount parts or a backing.

As an illustration, an inventive image support (e.g., stabilizer) is made with a surface preparation stabilizer formed on one of its sides from mixing linseed oil (e.g. measured by volume between 0.6% and 30% thus it is a stabilizer) into a larger quantity of cPRM. Its reverse side is superimposed by a bonding application of cPRM that contains no linseed oil, its surface preparation stabilizer is superimposed by applications of oil paint, encaustic paint and oil pastel. In another illustration, an acrylic paint binder is mixed (e.g., measured by volume between 0.4% and 20% thus it is a stabilizer) into a larger quantity of cPRM. This mixture is applied on both polymer and non polymeric inventive image surfaces, e.g., it may be a surface preparation stabilizer. Once these applications harden, they are both superimposed by conventional applications that bond to them using conventional practices, e.g., acrylic paints, oil paints, encaustic and oil pastels are superimposed. In a different example, one or more ingredients are added into cPRM forming conductive polymer to enable a different composition to be superimposed upon it, or to enable it to bond to a substrate of a different composition.

An application is applied on an inventive image or in a mold to form an inventive image or part thereof comprised of one or more ingredients (e.g., stabilizers), mixed into a larger quantity of cPRM, e.g., at a percentage measured by volume between 0.4% and 40%, e.g., a stabilizer. Nine examples of the specifications of these ingredients are: 1.) one or more oils conventionally used in paint, e.g., "Linseed Oil" made by Lefranc and Bourgeois, stand oil, walnut oil, poppy seed oil, safflower oil, sunflower oil, clove oil, etc.; 2.) one or more oil paints, e.g., "Schevening Purple Brown" made by Old Holland Oil Colour Association of Driebergen, Holland, or "Alizarin Crimson" made by Lefranc and Bourgeois; 3.) one or more colored acrylic paints, e.g., "LIQUITEX®, Phthalocyanine Green" made by Binney and Smith Inc. of Easton, Pa.; 4.) one or more acrylic paint products (e.g., an acrylic binder, painting medium or primer) that either contain no pigment or dye, or that only have minimally visible coloration (e.g., iridescence, pearlescence or slight coloration), for example, a transparent or translucent medium, gel or primer such as those by Golden Artist Colors, Inc., like their "Self Leveling Clear Gel", "Soft Gel (Gloss)", "GAC-200", "GAC-500" or "GAC-700"; 5.) one or more alkyd media or alkyd paints, e.g., "LIQUIN®" alkyd medium and/or "Griffin™" Alkyd Colour both by Winsor and Newton of London, England; 6.) one or more conventional image making sizes, primers, media, and/or binders not specified in the previous 5 examples, e.g., hide glue, wax, media with wax ingredients such as encaustics and wax media made for oil paints, etc.; 7.) one or more sources of coloration such as pigments and/or dyes are added into the mixtures described in the previous examples 1-6.; 8.) one or more ingredients specified in each of two or more of the previous examples 1-7., e.g., both an oil paint and an acrylic paint are used; or both a linseed oil and an oil paint are used; 9.) one or more particulate ingredients (e.g., light effects) are mixed either into a larger quantity of cPRM, or into a mixture formed in one of the previous examples 1-8. and then into the larger quantity of cPRM, e.g., pumice; particles of glass, crystal, polymer, sand, stone, metal, paper, hard wax, rubber, fiber (stabilizer), organic materials (such as twigs, rice, petals, buds, thorns, and seeds), iridescent or fluorescent materials, etc. Note that some of the polymer formed by the mixture of one or more particulate ingredients into a larger quantity of cPRM will have SSI, and some will not have SSI.

The polymer formed in the 9 examples above might form an image support (e.g. a stabilizer, an initial image support, or a separating layer stabilizer), or, for example, a surface preparation stabilizer on an inventive image that may or may not be an image support, e.g., made using a cPRM that was either the same or compatible to the cPRM used to make the mixtures in the 9 examples, but without the special ingredients added in these examples. Alternately, mixtures formed in the 9 examples might be applied on a non polymeric inventive image surface, such as abraded metal, paper, wood or even on a surface that has oil on it (for instance conventional oil paint), e.g., this mixture can be applied on the surface of a conventional oil or acrylic painting, on a drawing or on a print. The ingredients added into cPRM to form the mixtures of the 9 examples may or may not contribute significantly or even noticeably to the aesthetic of the resultant polymer, and this polymer may or may not contribute significantly to the aesthetic of its inventive image. Polymer formed in the 9 examples may or may not be superimposed, e.g., by further applications or attachments. Depending on the cPRM used in these 9 examples, the ingredient or ingredients added into them and the amount in which they were added, the homogeneity of their mixture, the thickness, consistency and other specifications of this mixture's application on the inventive image or mold, and other VIMC, the resultant polymer might be transparent, translucent, opaque, textured, colorless, colored (e.g. a milky or off white color; ecru; slightly colored, hazy or cloudy; white), or a combination of these. On an inventive image, mixtures made in these 9 examples might, for example function as part of the image's structure, as painting, as an underpainting, as a bonding substance, drawing, writing, printing, a Separating Layer, bonding spots, an external surface layer (perhaps a sealer or coating), or a combination of these, as desired. As another example, surfaces formed of the mixtures made in these 9 examples might be used as for bonding or as underlayers for one or more superimposed applications, e.g., as surface preparation stabilizers. Applications superimposed on cPRM or polymer formed in these 9 examples might for example be: drawing, painting, writing, attachments, layers, parts, printing, photography, or collage. Such superimposed applications might for example be conventional materials or media that bond to the ingredient or ingredients that were added into the cPRM mixtures of these 9 examples. For instance, a polymer formed using oil paint or linseed oil mixed into a larger quantity of cPRM might be superimposed by oil painting, drawing in oil pastels, printing done with oil based colors, colors that contain oil, other compatible colors, or a combination of these. In another example the cPRM mixture might contain a conductive polymer, or it might be applied on a conductive polymer inventive image surface, or an image support made of polymer or other ingredients. Thus for example it might enable further processing on a polymer inventive image that is capable of emitting light or using energy in other ways, e.g., an OLED.

In another embodiment, cPRM is mixed at about 0.4% to 40%, preferably 0.5% to 25%, more preferably at about 0.5% to 8% (by volume) into a conventional image making material or medium for use in an inventive image. The cPRM used in such a mixture is serving as a stabilizer if the mixture is applied on a polymer inventive image surface to which its cPRM ingredient bonds, or if the mixture is applied onto a polymer surface that its cPRM ingredient further cures or fully cures. The conventional ingredients used in mixtures of this embodiment might for example, be: oil paints, colored acrylic paints, acrylic paint binders, acrylic painting media, watercolors, goauche, tempera, paper pulp, alkyd paints, encaustics, binders for conventional paints such as waxes and oils, conventional sizes and primers, or a combination of these. Mixtures formed in this embodiment might form inventive images, parts of inventive images, image supports or parts of image supports, e.g., part of an image support stabilizer. Mixtures made in this embodiment may or may not contribute significantly or even noticeably to the aesthetic of their inventive image, e.g., affecting color, texture, or light qualities and effects (such as translucency, opacity, a matte surface, a semi-matte surface, effects of visible light, etc.). Mixtures formed in this embodiment might be used to mark on inventive images, (e.g. to paint, draw, print, write, etc., for instance with polymer that can conduct electricity). Mixtures formed in this embodiment might be external surfaces or final coats on inventive images, that may even function as coatings or sealers, e.g., on weak or fragile image surfaces, or on image surfaces with conventional applications on them that are conventionally sealed or fixed (such as over pastel or charcoal drawing).

Mixtures of this embodiment might be used in inventive images for bonding purposes, or as underlayers, and some of these are surface preparation stabilizers. These are examples. Mixtures of this embodiment might be bonding substances used to connect one or more parts, attachments, or applications. For example, such a mixture might be used as a surface preparation stabilizer to bond two polymer parts together in such a way that the inventive image looks aesthetically continuous or discontinuous. In another example, forty pieces of cardboard might be bonded to one another using intermediary segments made of cPRM mixed into a larger quantity of paper pulp. In the same inventive image or in a different inventive image, surface preparation stabilizers made of cPRM mixed into a larger quantity of paper pulp might bond forty pieces of polymer together. Mixtures of this embodiment might be used on inventive image surfaces to bond them to superimposed applications e.g., as surface preparation stabilizers. As an illustration, a mixture made by adding cPRM into a larger quantity of oil paint, might be used to make a surface preparation stabilizer on a polymer inventive image surface that is an underlayer, that bonds to subsequently superimposed applications of oil paint (that do not contain any cPRM). In addition or instead, this same mixture of cPRM and oil paint might be applied over an application of oil paint on a polymeric or non polymeric inventive image surface, e.g., on a conventional oil painting that is part of an inventive image. While this application is wet, it might bond polymer attachments to the inventive image, and during gelation or afterwards, it might be superimposed by a layer of cPRM. In a third illustration, a mixture formed of cPRM mixed into a larger quantity of paper pulp might be spread on a polymer surface e.g., as a final layer or as a surface preparation stabilizer for subsequent conventional painting or drawing such as using watercolors, acrylics, tempera, pastel, pencil, etc. Or, this application of cPRM mixed into paper pulp might be superimposed by a conventional mixture of paper pulp (that contains no cPRM) that is either left as one of this inventive image's external surfaces, or superimposed by watercolor, acrylic or tempera painting. In a further illustration, cPRM is mixed into a larger quantity of an acrylic paint product (e.g., a painting medium or binder). The mixture is applied on both polymer and non polymeric inventive image surfaces as an underlayer for further applications made using conventional practices. Mixtures made of this embodiment are also useful for Separating Layers and for bonding spots. Mixtures of this embodiment can enable conventional image making materials or media to be further processed in a manner that can not be comparably done using conventional practices. For example, an inventive image surface made using a mixture of this embodiment of cPRM in paper pulp, in sand or in wax, can harden firmly enough to be incised or carved.

In some embodiments, a stabilizer is mixed into a larger quantity of a cPRM that contains one or more neutral monomers at about 0.4% to 40% by volume, preferably at about 0.5% to 10% by volume, and more preferably at about 0.5% to 6% by volume. This stabilizer is either a negatively charged monomer (such as an acid monomer) or a positively charged monomer. A catalyst appropriate for the charged monomer stabilizer might also be added to the cPRM. The use of such a negatively charged monomer stabilizer in a neutral cPRM typically increases the hydrophilicity of the polymer formed, and enables the formation or fortification of a bond between this polymer and a positively charged superimposed application, such as a positively charged paint, ink or other colorant (e.g., an application containing a polymer). Also, the use of a positively charged monomer stabilizer in a neutral cPRM typically enables the formation or fortification of a bond between the polymer formed and a negatively charged superimposed application, such as a negatively charged paint, ink or other colorant.

In an embodiment, an ingredient is mixed at about 0.4% to 40% by volume into one or more applications made on a linear polymer inventive image surface. This ingredient is :an appropriate solvent for that particular linear polymer. Such solvents mixed into applications of conventional image making materials and media in this embodiment are stabilizers. It is preferred that solvents with low volatility like di-butyl phthalate be added at no greater than 3% by volume. It is preferred that solvents with high volatility like acetone be added at no greater than 30% by volume, and it is preferred that solvents with less high volatility such as methyl ethyl ketone be added at no greater than 10% by volume. Some of the applications made in this embodiment are surface preparation stabilizers. Di-butyl phthalate is a preferred solvent for use as a stabilizer in this embodiment. For example, a small amount of di-butyl phthalate might be mixed into a larger quantity of a conventional paint or painting medium or paint binder, such as oil paint, acrylic paint, or an acrylic painting medium. Then this mixture is applied onto a polymer, e.g. as an underlayer or surface preparation stabilizer. As another example, acetone or methyl ethyl ketone is used as a stabilizer in this embodiment mixed into an application made on a polyacrylate inventive image surface. Applications superimposed on these surface preparation stabilizers and on other mixtures made in this embodiment might, for example, be made using the same substance in the application they superimpose, but without the added solvent. In one example, a solvent serving as a stabilizer is mixed into a conventional oil paint that has linseed oil as its binder, and the resultant mixture is applied on a linear polymer surface for which that solvent is appropriate. Then for instance, this oil paint, a surface preparation stabilizer, is superimposed by oil paint applications that do not have the solvent in them. In another example, an acrylic inventive image surface is painted with a conventional acrylic paint (e.g., a transparent acrylic gel that is colored or colorless) that has an appropriate polyacrylate solvent mixed into it, functioning as a stabilizer (e.g., acetone). If desired, this application can serve as an surface preparation stabilizer that is an underlayer for one or more superimposed acrylic or oil applications that do not have any acetone mixed into them.

In some embodiments, a composition made of two or more mixed components is applied on an inventive image as an intermediary for bonding purposes, because at least one of its component ingredients will bond to each of the elements that the composition serves as an intermediary between, e.g., between parts, layers, applications, attachments or combinations of these. For example, the mixed compositions in these embodiments might be layers (e.g., polymer or non polymeric Separating Layers), parts, underlayers, surface preparation stabilizers, mixed polymer stabilizers, or bonding spots. As an illustration, a mixed polymer used to bond two inventive image parts or layers together is comprised of a mixture of monomers and the catalyst appropriate for each, at least one monomer/catalyst pair of which is i) the same as the monomer/catalyst pair used in one or both of the two parts it connects; and/or ii) compatible with the monomer/catalyst pair in one or both of the two parts it connects. In another illustration, the mixtures in this embodiment might be made using conventional painting mediums. For example, a mixture of a vinyl paint or painting medium (such as FLASHE®) and a conventional acrylic paint might serve as a surface preparation stabilizer that is an underlayer on an acrylic inventive image surface that is superimposed by a vinyl paint such as FLASHE®, and perhaps acrylic paint too. Small irregular particles might be added into the mixture of this example forming a surface preparation stabilizer that will also mechanically bond to pastel applications.

The following are examples of conventional image making materials and media that may be used in inventive images or part thereof, according to embodiments, e.g., as stabilizers, as components in stabilizers (such as surface preparation stabilizers), in or as polymer of the present invention, in or as image supports, used in inventive images according to conventional practices, etc. Among examples of conventional paints are oil paints, water soluble oil paints, acrylic paints, vinyl paints, encaustic, gouache, watercolors, tempera, egg tempera, alkyd paints, casein, inks, etc., such as those paints made with the binders and media specified in the following list. Among examples of sizes, primers and binders used in conventional image making media, and among examples of conventional media for painting are linseed oil (in different forms such as thickened linseed oil, sun thickened linseed oil, stand linseed oil, raw linseed oil, cold pressed linseed oil, bleached linseed oil, and refined or purified linseed oil), walnut oil (e.g., refined or coldpressed), poppy seed oil or poppy oil (e.g., refined or sun thickened), safflower oil, sunflower oil (e.g., refined), clove oil (e.g., rectified), Lavender Oil or Spike Lavender Oil, other oil painting media, acrylic painting media, acrylic emulsions, vinyl painting media, alkyd media, gum arabic, wax (e.g., beeswax for instance refined, bleached and unbleached; carnauba wax for instance, natural or bleached; candellila wax, montan, paraffin, ceresin, wax media for painting, etc.), elemi resin or Gum Elemi, casein, tragacanth or gum tragacanth, amber (such as amber media), Damar, Venice Turpentine or Venetian Turpentine or Larch Turpentine, Canada balsam, Oregon balsam, Copaiba Balsam, methyl cellulose, starch (e.g., rice, wheat flour, cornstarch, arrowroot, etc.), egg or egg yolk, shellac (e.g., containing wax or wax free), dry curd cheese, sturgeon glue, fish glue, rabbit skin glue (e.g., considered to have high elasticity), hide glue, bone glue (e.g., considered to have very high adhesiveness and low elasticity), plate glue, gelatine, Mastic tears or Mastic, varnishes such as Mastic varnish and Copal varnish, rosin oil, Chios Tears, copal resin or Run copal lumps, Sandarac; Manila Copal; Congo Copal, hard, Gum Anime; Copal-X Powder; Myrrh; Olibanum Somalia, incense; Colophony; Burgundy Resin (e.g., partly refined and solidified pitch of the European pine); Dextrin; castor stand oil, lime medium such as pit lime (conventionally used for fresco painting e.g., lime made from marble that contains about 95% calcium oxide and less than 5% magnesium, that might be burnt with wood which might be slaked for at least five years; quicklime; or caustic lime), etc. In general, of the examples herein, crayons, painting and drawing sticks, pastels, and gesso are often among the least preferred for use as stabilizers, though they can be successfully used as stabilizers, and though they are often preferred for other uses in inventive images, e.g., for use according to conventional image making practices, such as for drawing. In addition to the examples listed above and below, many other kinds of pencils are useful in making inventive images (e.g., pencils). Some pencils can for example even be used as stabilizers or as part of stabilizers, e.g., due to their wax or other binder.

Rohm and Haas makes many conventional image making products that may be used in inventive images such as their acrylic emulsions for example, RHOPLEX®. One example is RHOPLEX® WL-96, e.g., comprised of 41-43% by weight acrylic/styrene copolymer, less than 0.1% by weight individual residual monomers, a maximum of 0.1% by weight aqua ammonia, and 57-59% by weight water. According to publications on conventional image making practices, and according to the technical staff at Textile Chemical Co., Inc. of Reading, Pa. (who represent, support and distribute RHOPLEX®), RHOPLEX® is among the most common binders in conventional acrylic paints used for making images. In addition, the technical staff representing RHOPLEX® at Textile Chemical stated that in general, the kind of RHOPLEX® that bonds best to polyacrylic surfaces is RHOPLEX® WL-96, and in general, RHOPLEX® WL-51 is the second best. (This is a generalization because other factors affect such bonds, e.g., other ingredients in the paint's vehicle, the paint's application, the specifications of the acrylic surface, etc.).

In some embodiments, one or more of polymer conventional image making media or materials such as those specified above (e.g., an acrylic paint or gel, or a vinyl paint) is used to make an inventive image. For example, a thin fine sheet of surfacing veil fiberglass is embedded in between layers of an acrylic gel medium or acrylic paint (e.g., made by Golden) in forming an inventive image.

In an embodiment, a catalyst serves as a stabilizer when it is mixed at about 0.4%-40%, preferably at about 0.4% to 25%, or more preferably at about 0.5%-2% (by volume) with another composition, such as one or more conventional image making materials or media. Often it is most preferable to use such a catalyst stabilizer at or near about 1.0% (by volume) in mixtures of this embodiment. All mixtures made of this embodiment are applied onto polymer inventive image surfaces to which their catalyst stabilizer ingredient bonds. For example, the catalyst stabilizer used in the mixture may be the same catalyst or a catalyst that is compatible with the catalyst used to form the polymer inventive image surface upon which the mixture of this embodiment is applied. Some of the applications made according to this embodiment are surface preparation stabilizers. For example, a catalyst is mixed into a conventional paint (e.g., an oil paint or an acrylic paint). This mixture is applied on a polymer inventive image surface that was formed using that same catalyst. Then if desired, some or all of this application might serve as a surface preparation stabilizer. For example, an application might be superimposed of the same kind of conventional paint that was used in the mixture of this embodiment, but without the added catalyst, (a paint that might not have bonded or bonded as strongly to the inventive image without the intermediary surface preparation stabilizer). In another example, mixtures made according to this embodiment are preferred for use on incompletely cured or "sticky" polymer inventive image surfaces.

Incompletely cured or "sticky" polymer surfaces formed in some embodiments, are useful and desirable for forming or strengthening bonds in inventive images, as well as for aesthetic purposes. In some embodiments, a somewhat volatile component of cPRM may intentionally or unintentionally be allowed to evaporate creating a less than fully polymerized "sticky" surface on an inventive image. "Sticky" polymer surfaces might also be formed as a result of other causes. If desired, part or all of such sticky polymer surfaces may remain or be removed, as previously described. However, if desired, part or all of such a sticky polymer image surface might be more fully cured or hardened, possibly fully cured or hardened, or its aesthetic can be changed. For example, in some embodiments, an application comprised of the chemical or chemicals that the sticky inventive image surface lacks (e.g., from evaporation or from being insufficiently added), or one or more comparable chemicals, sometimes mixed with one or more other ingredients if desired, is applied on the sticky image surface. This application is a stabilizer that bonds to the sticky polymer image surface (e.g., co-polymerizing or co-mingling with it), curing and hardening it more fully. If desired, this application may also change the inventive image's aesthetic, or enable further processing. The following are examples of applications of these embodiments. (1) Applications are made comprised of the chemical or chemicals that the sticky polymer inventive image surface lacks using a sufficient quantity of or more of that chemical, or using one or more comparable chemicals on the sticky polymer image surfaces or parts thereof, without additional ingredients. As an illustration, the catalyst used to make the sticky polymer surface and/or a comparable catalyst can be applied onto the sticky polymer surface. For example, a sticky polymer surface made of a polyester monomer and MEKP can be more fully cured and hardened with a superimposed application of MEKP as a stabilizer. (2) Applications of example (1) can have one or more additional ingredients mixed into them which change the aesthetic of the sticky polymer inventive image surfaces onto which they are applied. For example, coloration such as a pigment and/or a dye (e.g., in the form of a color concentrate or dispersed in a substance) might be mixed into them. As another illustration, applications of example 1) can be mixed with or into a colored paint, and then applied onto sticky inventive image surfaces or parts thereof. For example, such applications can be made of MEKP stabilizer mixed into an oil paint such as "Cadmium Yellow" made by Winsor and Newton, or "Mineral Violet #2 (manganese phosphate)" made by Lefranc and Bourgeois. Such applications can be made of MEKP stabilizer mixed into an acrylic paint, such as "LIQUITEX® Basics, Cadmium Yellow Medium Hue", "LIQUITEX®, Phthalocyanine Green" and "LIQUITEX® Iridescent Bronze" all of which are made by Binney and Smith; "FLASHE®, Manganese Blue (imit.)" made by Lefranc and Bourgeois; or "Fluid Acrylic, Turquois (Phthalo)" made by Golden Artists Colors, Inc. Such applications can be made of MEKP stabilizer mixed into an ink such as "Higgins Black" made by Faber-Castell Corp. of Newark, N.J. Such applications can be made of MEKP stabilizer mixed into watercolor paint such as "055 Winsor Green" made by Winsor and Newton. Such applications can be made of MEKP stabilizer mixed into gouache such as "510 Grey #4" made by Winsor and Newton, or "Terre Verte" made by Hobein Works Ltd. in Osaka and Tokyo Japan.

(3) Applications of example (1) can be mixed into one or more other conventional image making materials and/or media and then applied onto sticky inventive image surfaces or parts thereof. For example, such applications can be made of MEKP stabilizer mixed into linseed oil, such as that made by Lefranc and Bourgeois. Such applications can be made of MEKP stabilizer mixed into "WINTON® Painting Medium" made for oil painting by Winsor and Newton. Such applications can be made of MEKP stabilizer mixed into "LIQUITEX®, Kopal Painting Medium Light", "LIQUITEX®, All-Purpose Oil Painting Medium" or "LIQUITEX®, Rapid-Set Oil Painting Medium" that are all made by Binney and Smith for conventional oil and alkyd painting. Such applications can also be made of MEKP stabilizer mixed into an alkyd paint product that contains no pigment or dye, such as "Liquin" or "Wingel" made by Winsor and Newton. Such applications can be made of MEKP stabilizer mixed into an acrylic paint product that contains no pigment or dye such as "GAC-100", "GAC-200", "GAC-400", "GAC-500", "Self Leveling Clear Gel", "Soft Clear Gel", "Super Loaded Matte Medium", or "Glazing Medium" made by Golden Artist Colors, Inc. (4) Applications of example (1) can have one or more other stabilizers are mixed into them, e.g., a UV light stabilizer. (5) Applications of example (1) can be mixed with or into one or multiple, more volatile solvents, that evaporate more quickly once applied on sticky polymer inventive image surfaces, e.g., leaving these images with surfaces that are not only more filly cured and hardened, but which are also smoother. (6) Applications of example (1) can be ingredients in one or more cPRMs and/or they can be mixed into one or more cPRMs, and then applied on sticky polymer inventive image surfaces. Such a layer could, for example, change the image's aesthetic simply by giving it a layer of transparency, translucency or both. For example, the cPRM used might be the same one used to make the polymer surface, but slightly enriched with the appropriate ingredient (e.g., enriched with extra catalyst). (7) In addition to, or instead of adding the ingredients described in examples (2)-(6) above to applications of example (1), applications can be mixed with or into one or more other components and then applied on sticky inventive image surfaces. (8) Applications of example (1) can be made on SSI on sticky polymer inventive image surfaces. (9) Sticky polymer inventive image surfaces can be further processed using a combination of these methods. For example, two or more different applications can each be used on different surface areas of a sticky polymer inventive image, some, all or none of which may be applied on SSI. Or, both an acrylic paint binder and a pigment can be mixed into an application of example (1) An acrylic pant additive and an acrylic painting medium can be mixed into an application of example (1). Linseed oil, a pigment and an oil paint can be mixed into an application of example (1), etc.

Applications made according to these embodiments such as these, might for example: (a) change the inventive image's texture, its color, its light qualities and effects (e.g., making it matte, shiny, less transparent, opaque, adding a new layer of transparency onto it, etc.), and/or other formal elements. (b) They might be used to mark on inventive images, e.g., for painting, drawing, writing, and/or printing. (c) They might be external surfaces, that may even function as coatings or sealers e.g., over weak, fragile or dusty applications, such as pastel or charcoal drawing. (d) From such applications for example, the incompletely cured polymer surface might become further cured or fully cured and/or it might be partially or entirely overlaid. (e) They might be a new further cured or fully cured or hardened surface. (f) Part or all of such applications might be used for bonding purposes e.g., as bonding substances and/or surface preparation stabilizers, for instance, interposed between two parts of an inventive image, bonding to the incompletely cured polymer surface of each, bonding attachments, forms with surface irregularities, paper attachments and particles to a sticky inventive image surface, and/or functioning as a glue such as for collaged materials. (g) Applications of these embodiments might function as underlayers. Drawing, painting, printing, writing and/or collage might be superimposed on such underlayers or surface preparation stabilizers, e.g., even using conventional practices such as conventional paints.

In another illustration, applications of these embodiments (e.g., as surface preparation stabilizers), might enable inventive image surfaces to be used for painting, drawing, writing, printing collage, or a combination of these, that otherwise might not have been desirable for such uses. For instance, underlayers (e.g., as surface preparation stabilizers), made as applications of these embodiments that have acrylic paint in them might be superimposed by acrylic paints, oil paints, encaustic paints, and/or other bonding applications, while those that have oil in them might be superimposed by pastels or markers containing oil, oil paints, egg tempera paints containing oil, oil based inks, encaustic paints, and/or other bonding applications, and those that have wax in them might be superimposed by wax based pastels, encaustic paints, oil paints, and/or other bonding applications.

(h) Sticky polymer inventive image surfaces with applications of these embodiments might be used as initial image supports (e.g., stabilizers). (i) Applications of these embodiments (e.g., surface preparation stabilizers), might also be bonding spots.

A polymer inventive image or a layer of polymer on an inventive image, might for example, be intentionally formed with an incompletely cured surface, in order to have a surface preparation stabilizer upon it that enables it to be superimposed in a desired manner, e.g., with the permanence desired.

Because compositions used to form incompletely cured polymer inventive image surfaces are very diverse, prior to using these embodiments, it is often desirable to select or prepare the specific composition of an incompletely cured polymer image surface, to best suit the specific image desired. These are some examples. It might be best if one sticky polymer inventive image surface is formed of a mixture that might be a surface preparation stabilizer—a mixture of one or more sources of coloration or texture; one or more conventional paints, sizes or primers; one or more binders used in conventional image making materials or media; one or more conventional painting media; or a combination of these, mixed in a larger quantity of cPRM, (in cPRM, some of these ingredients are stabilizers) e.g., mixing a pigment, dye, particles, linseed oil, oil paint, colored acrylic paint, or a colorless acrylic paint binder into cPRM. Then this sticky polymer inventive image surface might function as underpainting for a superimposed application of these embodiments. Thus, when applied on this sticky inventive image surface, an application of these embodiments, for example, might also function as a layer of painting, drawing, writing, or printing, over underpainting. It might function as a second imprimatura, or as an imprimatura over a ground. If the application of these embodiments over the sticky polymer surface is a surface preparation stabilizer, it might be superimposed by painting, drawing, writing, or printing, over two underlayers, each of which might be underpainting, an imprimatura or a ground. Alternately, this new application might function as the third superimposed underlayer.

In another example, an incompletely cured layer of polymer might be intentionally formed on a paper inventive image surface (e.g., on a paper image support) and on a polymer inventive image surface (e.g., on a polymer image support that may be a stabilizer) in order to prepare them for superimpositions such as paints like oil paints, e.g., as an intermediary bonding layer, or a surface preparation stabilizer, which for example, is a mixture of the chemical lacking in these sticky inventive image surfaces and an acrylic paint that can bond to the oil paint that will subsequently be superimposed.

In another embodiment, the incomplete cure of a polymer inventive image surface is used to bond subjects to it that are simply stuck onto or into it. The uses of this method and the strength of bonds formed using this method can both be expanded, if the stickiness of the incompletely cured polymer inventive image surfaces surface is enhanced e.g., by forming it with a composition that leaves its surface especially sticky (such as with a cPRM that contains linseed oil), by forming it in a process that prevents its surface from completely curing (e.g., forming it in an open mold), by applying the appropriate solvent or solvents on it (e.g., MEK), or by using a combination of these methods. Subjects bonded to such incompletely cured polymer inventive image surfaces might, for example, be parts, attachments, applications, or a combination of these, e.g., fine wire, thin papers (such as tissue paper), foils and metal leafs, fine particles (such as flakes of mica, glitter, and pigments), other thin and light materials (such as fabrics, leaves, etc.), and combinations of these. An inventive image processed according to these embodiments may or may not be further processed, as desired, e.g., it might be a final layer, an underlayer, used with Separating Layers or bonding spots.

If desired, sticky polymer inventive image surfaces or applications of these embodiments superimposed upon them (e.g., which make them more fully cured or hardened, and thus, often easier or more desirable for carving, incising or cutting), might be further processed by removing matter from them, e.g., a carving, sanding or cutting tool may clog when used on an incompletely cured polymer. In an example an application of these embodiments might be made on a sticky polymer inventive image surface so that it hardens more fully for easier further processing, e.g., sometimes it is easier and preferable to rework and control a cured or hard polymer surface, than an incompletely cured polymer surface. For example, a carving, sanding or cutting tool may clog when used on an incompletely cured polymer (e.g., when fine drawing is being incised or carved into it), but this problem is solved when the same polymer surface is more fully cured (hardened).

In other embodiments, a bonding agent is applied on incompletely cured polymer surface, or another inventive image surface, for the purpose of reworking and controlling it as desired (e.g., to create the desired aesthetic effect). As another example, the bonding agent may change the inventive image surface into one that is easier or more desirable to rework, by putting a linear polymer surface on a different kind of inventive image surface (e.g., on a cross linked polymer surface or on a non polymeric surface), by putting a crosslinked polymer on a different kind of inventive image surface (e.g. on a linear polymer surface or on a non polymeric surface), by putting a surface preparation stabilizer on an inventive image that bonds to desired superimposition, which the original inventive image surface would not bond to as desired, etc.

In an embodiment, real spatial depth of an incompletely cured polymer surface is physically altered, affecting its smoothness, its continuousness or both. For example, this may be done to mechanically bond a superimposition onto this inventive image, or to strengthen the bond between a superimposition and the incompletely cured polymer. This may be done for aesthetic or functional purposes. For example, surface irregularities can be formed on incompletely cured polymer surfaces as desired (e.g., without completely removing these surfaces from the image. For instance, an incompletely cured polymer surface might be scored (e.g., with a scalpel, razor blade, a knife, a carving tool, etc.), it might be abraded (e.g., sanded, sandblasted, beadblasted, etc.), it might be perforated or chiseled, more polymer might be added onto it, irregular particles might be stuck to it, texture might be inlaid in it, metal or string loops might be inlaid in it, mesh might be attached to it, it might be altered in another way, or it might be altered in a combination of different ways, as desired.

In some embodiments inventive images are graphic art e.g., a public notice, a banner or poster, graphics with an emblem or a logo, graphics with braille, a book or booklet, a graphic presentation or display, etc. In an embodiment, prints are used as parts of inventive images, e.g., computer print outs, lithographs, etchings, photocopies, silkscreen prints, wood block prints, etc.

In embodiments, a design, a drawing or part thereof is transferred to an image, e.g., using heat or any conventional printing or other transfer process. Inventive images may be printed upon. One advantage of polymer printing surfaces is that they typically remain workable, reworkable and controllable as desired, throughout the entire process of their formation, as well as afterwards. As prints, polymer that is transparent, translucent, or partially opaque can be viewed, during and after one or more printing processes, through all of their sides that have been left at least partially see-through. Printing can be done on the internal layers of inventive images, as well as on one or more of their sides, e.g., for new effects. In addition, further work can easily be done on inventive image prints, in the process of creating and afterwards as desired (e.g., using other processes or materials such as carving, drawing, painting or collage). Their see-through, unprinted sides can even be used as their fronts like reverse paintings on glass. Printing on internal surfaces of images can create new, unique effects.

In an embodiment, PRM or cPRM is used as ink, paint or the colorant that is printed onto an image support (e.g., stabilizer). Any printing process or processes may be used, such as ink jet printing, lithography, silk screen, etching, monotype processes, block printing, etc.

In an embodiment, inventive images are printing plates, which can also be inventive images or part thereof. For example, polymer can be used as a tool for image making as desired, e.g., like a wood block, a silk screen, or an etching plate. Imagery or text can be formed on the surface of a polymer image printing plate as desired, e.g., by carving it, incising it or embossing it. The print may for example, be polymeric or non polymeric e.g., conventional paper, an image support or an inventive image. As printing plates, polymer can typically be workable, reworkable and controllable as desired, and remain this way, e.g., further work can always be done on them. This is a very different from most conventional printing plates. Further work can easily be done on printing plates made of polymer, at any time in the process of creating a print, and afterwards (e.g., using other processes or materials such as carving, and attachments). For example, a used polymer printing plate has colored printing inks on some of its surface. Its bare polymer spots can serve as bonding spots for a superimposed layer of cPRM, to form an inventive image with an internal layer of coloration. This might be the complete inventive image desired, or it might be further processed. This inventive image might even be used for further printing as desired, e.g., to print another color.

Due to the workability, reworkability and controllability of the polymer, a single polymer printing plate can be used to print any number of colors as desired. A printing plate made of polymer can even be altered in the process of making a print, e.g., between colors. Thus, the print formed with inventive image printing plate or plates, can typically be formed according to the Principle of Whole Development and Unity to the extent desired and in the manner desired, often to a greater extent than ever before.

In some embodiments, inventive images and image supports (e.g., stabilizers) which have coloration (e.g., by dyes, pigments, particles with light effects, conductive polymers) are made so that they have at least their two largest sides essential to their coloration and their aesthetic. These inventive images and image supports may or may not have coloration in other locations (e.g., on edges, other parts, attachments, internal coloration, colored lighting). For example, they might be 2D or 3D; planar or volumetric, and transparent, translucent, opaque or a combination of these. If desired, they may be displayed so that two or more of their colored sides are visible, though they may or may not have a clearly distinguishable front and back side. Examples are inventive images and image supports that function as: drawings, paintings, prints, sculpture, images with writing, graphic art, tiles, partitions, windows, doors, table tops, walls, screens, etc.

In some embodiments, one of the largest sides of a planar inventive image is completely or partially opaque, such as an image support. The rest of each of these inventive images and image supports may or may have any coloration. Such inventive images and image supports may be drawings, paintings, prints, photography, images with writing, graphic art, tiles, partitions, windows, doors, table tops, walls, screens, or images that are a combination of these. For example, if the backside of a transparent polymer painting is opaque white or a reflective color (such as metallic), light might pass into the image's front side, through its transparent or translucent spatial depth and reflect off of its backside back out to the viewer. Moreover, such an image might be made with conductive polymer(s).

Figure 77:
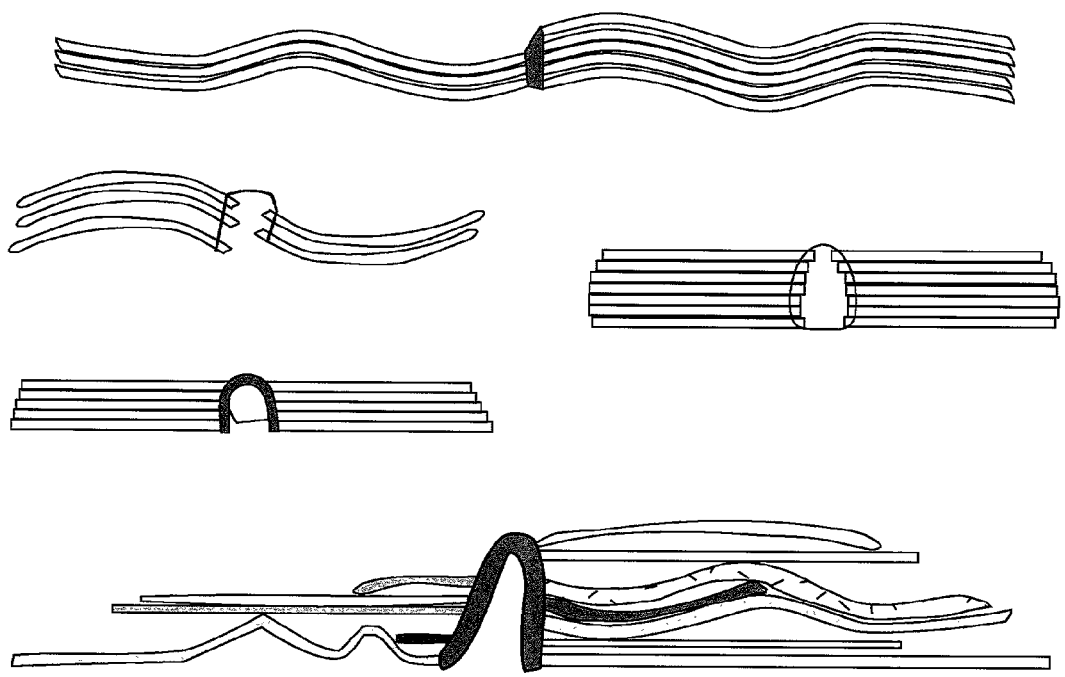
FIG. 77 shows examples of joining separate parts together to form inventive images, e.g., books.

Inventive images made in some embodiments are writing surfaces, they have writing, or both. In some embodiments, inventive images are books, e.g., these images might have their outside cover or some or all of their pages made of flexible or rigid polymer, or conductive polymer, with text or graphics. For example, an inventive image book is made with printed text and graphics, on both sides of six translucent pages, each of which has light effects. If they are made with a conductive polymer, they might be electrically active, e.g., interactive, light emitting, etc. Examples of inventive image books are shown in FIG. 77 and described in forthcoming text.

To form an image or a part thereof, or an image support or a part thereof in an embodiment a first polymer is superimposed upon a substrate made of a different second polymer. For example, the two different polymers might be selected to bring different desirable qualities to the resultant image or image support, such as different aesthetic, structural, or functional qualities, or different levels of permanence, e.g., one polymer enhances the permanence of another. For instance, the substrate might be a strong polymer with a high refractive index that is superimposed by a polymer layer that will bond to one or more further superimpositions, e.g., a superimposed paint, an ink, a primer, a photographic emulsion, a glue, etc. As another example, the substrate might be a non-absorbent polymer that is superimposed by an absorbent polymer and thus will bond to one or more further superimpositions. In another example the substrate might be a polymer that is rigid or strong that is superimposed by a polymer that is less strong, flexible, capable of bonding to one or more further superimpositions, or that provides or enables an aesthetic quality to the image, such as visible light.

As a further illustration, a polymer substrate underlying a different superimposed polymer can give structure, support, strength, a means of display, or rigidity to the superimposed polymer that may not be capable of providing the inventive image with these qualities as desired, even though it may be desirable in the image for other purposes (such as a polymer desired for bonding to one or more superimpositions, e.g., to a paint, an ink, a primer, a photographic emulsion, a glue, etc., or a polymer that enables or provides another aesthetic quality). The polymer substrates in this embodiment might be strengthening stabilizers previously described, e.g., as illustrated in the inventive images in FIG. 7 described in forthcoming text. Inventive images of this embodiment can be made in any form desired. The two polymers superimposed may have the same or different dimensions. Forms can even be made using this embodiment that are like the forms of conventional images or of conventional image supports. For instance, the polymer substrate can take the shape of a conventional wooden stretcher (e.g., as a strengthening stabilizer), and the polymer superimposed upon it can take the shape of a conventional canvas. As another example, the image or image support made in this embodiment might have only a horizontal section at its top or a horizontal section at its bottom made of the two superimposed polymers described in this embodiment, e.g., with the remainder of the image or image support only having one of the two polymer layers, for example in the form of a conventional scroll.

In some inventive images of this embodiment, an ingredient is added into the cPRM used to form at least one of the two polymers superimposed. This ingredient can include: (a) one or more of the monomer/catalyst pairs used in the cPRM of the other polymer, and/or a monomer/catalyst pair that bonds to the other polymer; (b) a monomer/catalyst pair that was not used in the cPRM of the other polymer that will form polymer with a coefficient of expansion that is close to or the same as the other polymer; (c) particles or small pieces of the other polymer; or (d) particles or small pieces that have a coefficient of expansion close to or the same as that of the other polymer. It is desirable to add this ingredient (measured by volume) into the cPRM at about 0.4% to 40%, preferably about 0.4% to 25%, more preferable about 0.4% to 15%, and most preferably about 0.4% to 10%. The use of this ingredient might be desirable for permanence, such as for bonding the two superimposed polymers together, and/or to lessen a difference in their rates of expansion and contraction, their coefficient of expansion. This ingredient might be a stabilizer.

In some embodiments, inventive images can have one or more computers as parts. For example, a computer can give an inventive image graphic or design elements, video elements, text, auditory elements, or interactive elements. For example, inventive images might be made of polymers capable of conducting electricity, polymers that convert electricity to light, polymers capable of amplifying an electrical signal like a transistor, or polymers capable of fast digital calculations that makes them capable of producing images and that makes them capable of computing. As another illustration, the inventive image might function for visual observation as the computer screen. Thus, inventive images may have computer chips, appropriate wiring, or a control device. In some embodiments, sound such as spoken words are part of inventive images, such as recording coming from a device or object that is part of the image, or voice recognition technology, e.g., on recordings or by using live participants. Also, in embodiments inventive images may have one or more devices, and or elements such as a laser, a camera, a printer, a sensor, a transistor, a radio or a device that plays or records sound; a mechanism that enables the image or part thereof to move; a capacitor, photodiodes, photovoltaics, circuits, batteries, a solar cell, etc.

In some embodiments, large surface irregularities are used to form or to fortify one or more bonds between two or more inventive image parts (e.g., layers, surfaces, components, or attachments). For example, large perforations are used with a bonding substance to bond inventive image parts together. For instance, many materials, such as wire mesh and lace already have large surface irregularities. A polymer can be formed with large surface irregularities (e.g., perforations), or it can be perforated during the gelation stage of its polymerization or thereafter. Any kind of surface irregularities can be made as desired on an inventive image, e.g., by drilling, by hand (with and without hand tools such as scalpels), by punching, tearing, carving, or cutting. As an illustration, parts of an inventive image can interlock, e.g., image parts looped together, a hook part interlocking with a continuous image part material, interlocking using male and female parts, such that a positive part fits into a the negative space of another part, etc. Large surface irregularities might be used to bond or to fortify the bond of a surface preparation stabilizer onto an inventive image.

In an embodiment, the gelled surface of cPRM is used for bonding, as desired. For instance, this might be gelled cPRM on a mold, or on a polymer or non polymeric inventive image surface. For example, such a gelled cPRM might be: a layer, a part, an entire inventive image, or a bonding substance on an inventive image or on a part thereof. Gelled cPRM can also be used as desired to bond or to strengthen the bond to superimposed subjects to an inventive image (e.g., parts or attachments, inlays, etc.). For instance, fiber, particles, pigments, dyes, texture, other parts, or a wide range of other subjects can be stuck onto a gelled polymer surface as desired, preferably after it is hard enough to maintain its form to the extent desired.

Superimposed subjects (such as attachments and inlays) with SSI will mechanically bond to gelled cPRM, such as subjects that cPRM will penetrate. If the subject is not able to bond to the gelled cPRM or if the subject is not able to bond to the gelled cPRM as well as desired, SSI or more SSI may be made on it. In one method of this embodiment, it is preferable superimpose a subject (such as an attachment or an inlay) on gelled cPRM after the cPRM has gelled firmly enough to hold its own form, e.g., so that the attachment does not sink down into the liquid cPRM, out of the position desired. In another preferred method, subjects are bonded to gelled polymer before it is gelled firmly enough to maintain its own form, e.g., these subjects often sink down into the gelled cPRM or the gelled cPRM often permeates these subjects. This embodiment can be used for purposes that are aesthetic, structural or functional. In an example, gelled cPRM surfaces are used to bond or to fortify the bond of an inventive image to a superimposed surface preparation stabilizer. Light effects might be added to a polymer in this method, e.g., by sticking iridescent particles, glitter, crystal pieces, mirror pieces, other reflective particles, wires, light sources, or devices into a gelled polymer. For instance, drawing, design or painting can be done in such a method, e.g., collage, and applications of coloration can be done in such a method, such methods can be used to form and alter light, form, structure, or texture in an inventive image, sgraffito, carving, and combinations of these, as desired. Attachments can also be pressed into, inlaid into, or pressed through gelled polymer, as desired, e.g., to install hardware such as mounts, hooks, screws, and wire, for instance, to hang an inventive image. Fiber or other stabilizers might be pressed into gelled polymer so that its weave absorbs enough of the wet cPRM to bond as desired. For a myriad of effects and purposes, all kinds of non polymeric ingredients can be pressed into gelled polymer, at any depth, or all of the way through it and many will bond. These might for example remain in the polymer as part of it when it hardens; or be removed after their insertion in the gelled polymer, e.g. to form a negative space. In addition, in working with gelled polymers, the VIMC can be used to control or to try to control the image as desired, e.g., to prolong the gelation time of a polymer so that further processing can be done as desired.

Connecting Parts—Components, Attachments, Inlays, etc.

The inventive medium enables the formation of images in parts as never before. Inventive images can be made in two or more parts, each made of polymeric and/or non polymeric materials of any kind. Such connected parts are workable, reworkable and controllable as permitted by their ingredients. Some inventive images can be made using the Principle of Whole Development and Unity more to the extent and manner desired, and in processes which can be more WYSIWYG than they would be using conventional practices. One or more parts of an inventive image might contribute to its formal elements in any way and to any extent desired, for example, affecting its shape, structure, compositional arrangement, surface, light, function, and/or its method of display. Examples include: attached, inlaid, connected, and embedded image parts, layers, components, sections, materials, media, objects and devices such as: gold and silver leaf, paper, fiber like fabrics (e.g., stabilizers), metal, wood, plaster, polymer, stone, glass, rubber, felt, wax, mirror, natural elements like shells, clay elements, found objects, hardware, tiles, tessera, springs, calculators, pens, leaves, branches, berries, flowers, other organic materials, prisms, crystals, a lens, a computer, computer parts and devices, string, light sources, materials and devices for light sources, other parts which enable the image to have light effects; devices which produce sound, devices which enable the image to be interactive, wires, cords, collaged materials, a clock, photographs, holograms, drawings, writings, drawings in space; cut-outs, another artwork; a book; graphic designs; decoration, toys, handles, casters, devices which rotate; bases, stands, legs, mounts, parts of mounts, materials for installation or display of the image; and/or other sources of coloration. Among further examples are any ingredients found in a conventional work of art available to those of ordinary skill in the art.

Various bonding methods and compositions can be used to prepare inventive images. In one embodiment, a bonding agent is used to join two or more polymer inventive image parts, or a non polymeric image part and a polymer inventive image part. The bonding agent might include a bonding substance like a cPRM, a mixed polymer, or surface preparation stabilizer. Such image parts might be connected using the same cPRM used to make one or both of the parts, a cPRM which has at least one of the same monomer/catalyst active ingredient pairs as one or both parts, a cPRM which bonds to both parts, and/or a mixed cPRM, or a combination thereof. If the cPRM or other bonding agent does not bond sufficiently to one or more of the parts which it is connecting, it is desirable to fortify the bond, e.g., chemically and/or mechanically, such as by making SSI. To make the connection, the bonding substance might be applied on one or more of the contact surfaces, which are then placed in contact. Or, the inventive image parts might be placed with one or more negative spaces in between them, in which the bonding agent can form one or more connections or connection seams. Another preferred method is to construct a temporary mold around each region of contact on the inventive image parts being connected (e.g., an open and/or enclosed mold), which if necessary, holds the inventive image parts in the desired position. If within this temporary mold, there are one or more negative spaces in between the regions of contact on the parts being connected, the bonding agent put into the temporary mold might form one or more connection seams.

It is preferable that any bonding agent put into molds connecting inventive image parts bond as strongly and permanently as desired to the regions of contact on the inventive image parts being connected. For example, if cPRM is the bonding agent, it is preferable that its active ingredients (or at least one of its monomers and its catalyst) are either the same as those used to form the polymer inventive image parts, or that they bond well with the polymer inventive image parts being connected. In another embodiment, a polymer inventive image is connected to one or more non polymeric inventive image parts using a bonding agent. If the bonding agent used is a cPRM, it is preferable for at least one of its monomers and the catalyst for it be the same as those used to form the polymer part. In one preferred embodiment, cPRM is included in the bonding agent, even if used for non polymeric parts being connected.

Attaching to or inlaying in polymer or non polymeric inventive images can be done in any suitable manner, including being installed deeply or shallowly into an inventive image. In many methods of inlaying, the form, shape and/or size of the part of an inlay may preferably undercut the image for a secure installation. An inlay might be attached to an inventive image before or in the process of installing it in the inventive image.

A mechanical bond can be used to connect one or more inventive image parts, e.g., polymeric and/or non polymeric image parts, such as image components, layers, attachments, or inlays, etc. Mechanical bonds can be formed in many different ways, some of which also form chemical bonds, and some of which require or could be enhanced using a bonding agent, e.g., using hinges, wire, cord, screws, nuts, bolts, metal corners, other hardware, sewing methods, tying methods, and/or a peg. In addition or instead, a mechanical bond might be formed by connecting both parts to a third part which holds them all together, such as a metal or wood backing, or such as stringing both parts on the same metal ring or wire. An inventive image collage is made using a planar polymer which has SSI on all of its sides, e.g., relying on the mechanical bond of a bonding substance to the SSI on this inventive image's surface. It is often preferred to bond an attachment to an inventive image mechanically which will not bond chemically or will not bond as strongly and/or as permanently as desired chemically. For example, SSI can be made on one or each of the surfaces which will be in contact, and the attachments can be adhered onto the inventive image using a bonding substance (like a cPRM) on any remaining surfaces.

The present invention offers a wide variety of ways to strengthen and reinforce any bonds in inventive images to provide desired strength and permanency, such as joints, seams and other areas of an inventive image where parts were connected. For example, over a polymer connecting seam, fiber stabilizer, a layer of cPRM, one or more other materials, media, objects, devices, or combinations thereof might be used as reinforcement. Inlays might be reinforced with metal prongs, e.g., like gems. Reinforcement might be done using a casing, a rim, a flange, or a bezel which extends up from the surface of the inventive image and surrounds the perimeter of the inlay to secure it in place, e.g., as with gems. Fiber might be used to secure an inlay's edges and/or its perimeter to an inventive image surface, or used through perforations on an inlay or attachment and/or one or more protective coatings (e.g., polyurethane or varnish) that may coat or cover one or more inlays, attachments or a part of these. A fiber stabilizer might be used as part of the connection of an attachment to its inventive image surface (such as fiber used through the perforations of an attachment, or fiber used perpendicularly across the connection seam). A fiber stabilizer might be the item attached to an inventive image. In some circumstances, when strength and permanence are important in an inventive image or when further superimpositions are as desired, it may be desirable to use one or more other stabilizers with, on, and/or in attachments, e.g., as a coating to limit or prevent discoloration or damage.

In some embodiments, one or more drawings, paintings, prints, images of graphic art, images of computer art, images on transparencies, photographs, or other such works are attached to an inventive image surface, e.g., in it, over it, and/or under it. The resultant inventive image might be complete, or might be further processed, e.g., superimposed by more cPRM, attachments, or both. For example, a drawing made on a conventional surface, such as paper, images on transparencies (such as overlays), and computer print outs might be attached under a polymer inventive image, such as a carved polymer plane.

In FIG. 69, two separate parts are connected to form the single inventive image shown in 69.*d* and 69.*e*. Each part may be polymer, or one may be polymer and the other non polymeric, e.g., wood, or cast paper. They will be connected using a bonding substance such as cPRM, however, if one or both of these two separate parts does not bond well to the bonding substance (e.g., one is an old polymer or one is non polymeric), the area on its surface which will be in contact with the bonding substance is abraded so that its SSI will bond better with the bonding agent. Views in this illustration may be aerial. FIG. 69.*a* shows the two separate parts placed in the desired arrangement in relation to one another, leaving a negative space in between for the formation of a connecting seam joining them. FIG. 69.*b* shows a temporary mold (in black) connecting the two inventive image parts in the position desired, leaving the negative space in between them empty for the formation of the connecting seam. This temporary mold is preferably well sealed to both parts of this inventive image, and the surfaces which will come into contact with the bonding substance are cleaned well. Once the bonding substance is put into the negative space between the two parts surrounded by the temporary mold, it may look like either FIG. 69.*c.i.a* or 69.*c.ii.a*. FIG. 69.*c.i.a* shows that the mold does not enable the side edges of the connection seam to form perfectly aligned with the sides of this inventive image, and the bonding substance overflows the mold's negative space a little. FIG. 69.*c.ii.a* shows the negative space within the mold that enables the bonding substance to form a connection seam with side edges which are perfectly or near-perfectly aligned with the sides of this inventive image, and the bonding substance is added into the negative space of the mold with its upper surface more or less level with the upper surface of this inventive image. The use of fiber is optional. Refer to the description of FIGS. 69.*c.i.b.* and *c.ii.b.* herein. Whether or not fiber is used, once the connection seam has formed and the mold is removed, FIG. 69.*c.i.a* will look like FIG. 69.*d* and FIG. 69.*c.ii.a* will look like FIG. 69.*e*. The inventive image in FIG. 69.*d* has some irregularity in the joint formed, which may or may not be desirable. The inventive image in FIG. 69.*e* has little or no irregularity in the joint formed. If this inventive image comes out as in FIG. 69.*d*, and this is not desirable, this image can be made into the image in FIG. 69.*e*. using subtractive processes.

In one embodiment, one or more metals and/or ceramics may be sprayed onto inventive images using equipment made by Tafa® in Concord, N.H. The spray may be a very thin coat or it may only be on selected areas of an inventive image.

Tacking

In many embodiments, a tacking process is desirable for connecting or fastening inventive image parts together as desired, in a bond that is slight, temporary or both, e.g., in a loose bond. Tacking can be done using any method available to those of ordinary skill in the art. For example, one or more tacks can be formed using bonding agents including cPRMs, glues, other adhesives, pastes, gels, other media, wire, paper clips, staples, string, clips, brackets, clamps, hooks, nuts and bolts, screws, rubber bands, brads, thumb tacks, stickers, fabric, plastic wrap, other plastics, other hardware, other objects, other devices, instruments, and the like, or a combination thereof. Tacking may be used: (a) in one or more areas between inventive image parts, continuously between inventive image parts, or both (b) partially or entirely around inventive image parts, (c) through inventive image parts, or (d) a combination thereof. Tacked inventive image parts may also be bonded to one another at any stage in making the inventive image. Tacking is a preferred process for holding any inventive image parts together just sufficiently so that they stay in a desirable position. It is generally preferable for tacking in inventive images to be temporary. Tacked parts in finished inventive images may further be bonded to one another in one or more other ways, so that the tacked parts are well bonded to one another.

Tacking can be useful for many purposes in making inventive image. Indeed, tacking is often a preferred image making process, because if tacked parts are undesirable (e.g., if the form, the Compositional Arrangement, or other formal elements are not as desired), the slightness or temporary nature of the tacked connections enables them to be easily and quickly altered or removed without risk to the inventive image being formed and without much time or effort. Tacking can enable inventive images comprised of multiple parts to be made using the Principle of Whole Development and Unity. Tacking allows parts to be held together for contemplation (e.g., in the space in which the work will be displayed), approval, adjustment, and modification, after which they can be removed or reinforced. Preferably, tacking can be used in image making processes which are spontaneous, WYSIWYG, experimental, when an inventive image's formal elements are not finalized (e.g., when the vision for the image in the process of creating it must be found, or during the process of creating to determine or affect the inventive image). For example, image makers can use tacking to try different compositional arrangements, forms, structures, light effects, manners of installation, or other variations in formal elements.

When undesired parts are untacked, they might be discarded, repositioned and retacked on the inventive image, or repositioned and bonded to the inventive image. Additional parts might be tacked or bonded onto the inventive image, as desired. The inventive image's parts might be further processed as described herein. Multiple inventive image parts might be tacked together, then the resulting form can be entirely or partially disassembled, altered and reassembled by retacking them together into a different compositional arrangement, a form, and a structure. This process of creating using the present invention can continue and be repeated in any sequence, until the desired inventive image, or part thereof is formed. Thus, tacking of inventive image components typically offers workability, reworkability, and controllability that can affect an image maker's vision and ideas.

Any number of tacks can be part of an inventive image for as long as desired, even permanently. However, because strength and permanence are generally preferred for an inventive image, it is generally not desirable to use tacking permanently in inventive images unless the connection they provide is reinforced in another way. In general, there are three preferred options for tacked inventive image parts, including: (1) well bonding tacked inventive image parts after they are altered and/or approved; (2) disassembling tacked inventive image parts later if they are not approved and/or altering them for approval; and (3) a combination thereof.

Bonding Spots

In some embodiments, it is preferable to use bonding spots within an inventive image between its polymer and/or its non polymeric parts, e.g., layers, components, attachments, and/or sections, such as between layered paint applications. Bonding spots are areas left or made on one or more polymer and/or non polymeric inventive image surfaces which form, assist and/or fortify a bond. The resultant bond might be a chemical, mechanical, or a loose bond or a combination thereof. Bonding spots may be underlayers and/or a surface preparation stabilizer, and can be of any desired strength and permanency. Bonding spots can be used to bond two or more inventive image parts together as desired or to assist or fortify their bond. A bonding spot is typically small in relation to the total size of the inventive image surface area it is used with. The term "bonding spot" does not indicate any particular shape, frequency of repetitious use, position, aesthetic, structural or functional specification, and bonding spots in inventive images can be made to any specification (e.g., thick or thin, scattered or ordered, regular or irregular) with any suitable ingredients (e.g., polymeric and/or non polymeric) and in any shape and color. A single inventive image surface can have any number of bonding spots of the same or different materials. Bonding spots are often used in multiples, as multiple scattered bonding spots, especially if they are between continuous, large, weak, fragile or delicate areas (such as layers of paint) and/or heavy parts, and particularly when bonding spots are relied upon to make a bond without any other fortification. The arrangement of bonding spots can be unplanned or planned, or made using any method(s) even on the same surface within an inventive image. Bonding spots might be the size of pinheads, or lines, sets of intersecting lines (e.g., a grid or scribbled lines with nonbonding space within them), stripes extending at least a portion of the length of an inventive image, lines of a drawing, small circles, large crescents, animal shapes, geometric shapes, a pattern (e.g., a paisley), and/or in the shape of a frame or border (the center of which is not part of the bonding spot), even on the same inventive image surface. It is generally preferable that bonding spots make a desired aesthetic contribution to the image; that they are aesthetically insignificant or not undesirably visible in the image; that they are invisible to the human eye in the image; or a combination of these. Both tacks and bonding spots can be formed, reworked, controlled and removed as desired. A tack can become a bonding spot if fortified, and a bonding spot can become a tack, e.g., it can be weakened.

Bonding spots often bond inventive image parts that are not adjacent, through a third part, sandwiched (thus mechanically bonded) in between. Therefore, the center part (e.g., layer) does not have to bond that well, if at all, to either of its adjacent parts (e.g., layers), though it may. In one preferred method, bonding spots are left within a nonbonding application on an inventive image surface, e.g., the bonding spots are small, scattered, irregular bare dots, for example, bare polymer spots left within an application of oil paint on a smooth, unabraded polymer surface. Then part or all of the oil paint application can be superimposed by one or more materials and/or media, which bond to these bare bonding spots but which might not bond sufficiently to the oil paint, e.g., an application of cPRM. The bonding spots bond the outer layers together, even though the center layer does not bond to the bottom layer and may not bond to the top layer, thereby mechanically bonding the center layer in between.

In addition or instead of bonding spots that are left on an inventive image surface, bonding spots can be applied on an inventive image surface. For example, an inventive image surface is completely covered with a bonding application, such as an acrylic paint bonded to a polymer surface. Within this acrylic application, bonding spots might be applied as raised spots, e.g., as thick impasto brushstrokes raised slightly higher than the rest of the painted surface. Once dry, some or all of the thin parts of the acrylic application are superimposed by an application which does not bond to it, e.g., cPRM. Then, another layer of acrylic paint (e.g., a transparent color) is superimposed over this surface, bonding to the raised acrylic bonding spots and mechanically bonding the polymer layer by sandwiching it in the center. Or as another example, a polymer surface is painted with oil paint, and bonding spots are left as bare polymer spots. But these bare spots are aesthetically undesirable and they may be painted over with colored cPRM which bonds to them. Then, when the entire surface is superimposed with a transparent, colorless layer of cPRM, it bonds with the colored polymer bonding spots within the oil paint application.

Many methods used to form bonds can be used to form bonding spots. For example, SSI and/or large surface irregularities can be bonding spots. One or more other subtractive methods can be used to form bonding spots (such as sanding, sgraffito, carving), and/or one or more additive processes can be used to form bonding spots, even on a single inventive image. Bonding spots can be formed by removing and/or adding matter after the application is made on an image surface and before another material is superimposed. For instance, bonding spots can be made by sanding out areas of oil paint, and/or by adding matter in an aesthetic way, e.g., black lines can be added on a painted application and/or removed from it to serve as bonding spots and as aesthetic elements.

Bonding spots can be made of any bonding substance available in the art, including hardened polymer, mixed polymer stabilizer, conventional adhesives or glues (including those for wood, rubber, metal, ceramic, and paper), cPRM, cPRM that is gelled but not fully hardened when it is superimposed, or any combination thereof Bonding spots can be disposed on an incompletely cured polymer surface which is sticky or has been made more sticky using a solvent (e.g., acetone) thereon. For instance, the ingredient or the mixture of ingredients missing from an incompletely cured polymer, which prevented it from curing completely, can be used pure, and/or added into another substance (e.g. a paint or a cPRM) as bonding spots on incompletely cured polymer surfaces. A mixed polymer bonding spot might contain the same monomer as each of the surfaces that it connects or a compatible one. For example, cPRM containing wax and one of the other stabilizers herein can be applied on polymer as a surface preparation stabilizer made of bonding spots to connect wax-based applications to polymer with which such applications do not bond. Some polymer inventive image surfaces form with their own bonding spots, for example, these may be surface preparation stabilizers or the surfaces of image support stabilizers, e.g., polymer inventive image surfaces made using Byk®-S 740 or Byk®-S 750 form with bonding spots in a surface preparation stabilizer to bond to wax based applications and/or a compatible but different polymer, and they also form with bonding spots to bond more of the same polymer.

Bonding spots can provide inventive images with varied luminosity, color, texture, and real spatial depth of oil paint layers that can be enhanced by applying a cPRM in between oil paint layers with bonding spots, e.g., as a separating layer such as a stabilizer. Bonding spots can enable inventive images to be more versatile, and more workable, reworkable, and controllable than conventional images, and strong and permanent in ways which conventional practices limit.

Further Ways to Use and Control Light in Inventive Images which are at Least Partially Transparent or Translucent, Clarifying Imprimatura The smooth and irregular properties of inventive image surfaces can be formed, developed, reworked and controlled, to create desired effects on an inventive image, e.g., effects of light, darkness, color, surface light (such as matte and glossy) and spatial depth. The smoothness and the irregularities of polymeric and non polymeric inventive image surfaces that are at least partially transparent or translucent can be used for effects of transparency, translucency, clarity, color, and other surface light effects, and these effects are often more workable, reworkable and controllable on polymer.

When an inventive image includes an at least partially transparent portion, the smoothness (or irregularity) of its surfaces is one of the factors determining its surface effects, including clarity, transparency, translucency, color, other surface light effects (e.g., conventional effects such as matte, semigloss, glossy, reflectivity, iridescence, etc.), or a combination thereof, whether it is polymeric and/or non polymeric. When one or more inventive image surfaces are bare and smooth, the inventive image may be as clear, transparent and/or translucent as possible without internal changes and without adding and/or subtracting matter. Internal changes can increase some inventive image's clarity, transparency, translucency, or a combination of these, such as processes which remove a part of an inventive image. Also, adding a transparent layer to an inventive image can make it more of a transparent inventive image. In general, surface irregularities decrease inventive image surfaces' clarity, transparency, translucency or a combination of these.

Common exceptions to these generalizations include many surface irregularities which are perforations. Also, large surface irregularities may affect the transparency, the translucency, the clarity, the color, or the other surface light effects of an inventive image significantly. For example, the effect that large surface irregularities have on an inventive image's features may be abrupt and discontinuous, in a way that may be significant or insignificant to the inventive image's aesthetic, e.g., a sharp thin shadow on the side of a texture that is otherwise as transparent and as translucent as the rest of that same inventive image surface, colored like it and with other surface light qualities like it (e.g., glossy).

Surface irregularities can be created on at least partially transparent or translucent inventive image surfaces to change their color or modify the other surface light effects noted above. One or more transparent or translucent substances may be used to fill in an amount of surface irregularities on polymeric and/or non polymeric inventive image surfaces which are at least partially transparent or translucent (e.g., along with one or more processes for removing matter which can be used to smooth out surface irregularities), if desired. Preferably, these applications bond permanently to their respective image surfaces and modify the surface characteristics. Surface irregularities can be created or filled by adding or removing matter to the inventive image's surface, for example, to modify their spatial depth (e.g., sanding, sandblasting or beadblasting). For example, filling in a sandblasted surface on a colored transparent inventive image surface to any extent (e.g., halfway or completely) with a transparent substance is likely to darken its color (even if the bonding substance has no coloration), it is also likely to clarify its surface, increase its transparency and make it less matte. Because methods of lessening the spatial depth of inventive image surface irregularities can also reduce the variance in their spatial depth, such methods can also alter the variance in the thickness of the application which might be superimposed to fill them in. Such methods might be preferable, for example, when marking on a inventive image surface using a composition that has a refractive index and/or color that is noticeably different from that of the inventive image's surface, although color is often only a concern when the surface irregularities are deep or large. Smaller thickness variations of many applications on inventive image surfaces provide a more consistent look. Of course, removing matter to decrease surface irregularities may not create a sufficient change and can even result in effects that are opposite what may be intended or anticipated.

A wide range of transparent and/or translucent applications can be used to partially or completely fill in surface irregularities. Substances used on small surface irregularities may rely on a mechanical bond to any extent, they may not bond to the inventive image surface in any other way. While this may also be true for applications on larger surface irregularities, additional bonding may be required. Some polymeric and non polymeric inventive image parts may not be made as clear, transparent and/or translucent as desired, and some inventive images cannot be made completely clear or completely transparent and/or translucent, for a wide variety of reasons, e.g., certain monomers used to form a polymer are not completely transparent, fiber in polymer can lessen its transparency and/or translucency, some non polymeric materials are not completely transparent and cannot be so modified, and some problems in polymerization can cause permanent color changes in polymer, e.g., using certain cPRMs.

In applications on surface irregularities on inventive images which are at least partially transparent or translucent, the closer the refractive index of these applications are to that of the inventive image or relevant part of an inventive image, the more transparent and/or translucent the inventive image or parts thereof will become as their surface irregularities are filled and smoothed. For example, if the refractive index of both the bonding substance and the inventive image it is applied upon are the same, once this bonding substance completely fills in and smoothes over this image's surface irregularities, its surface will become as clear as, and as transparent and/or translucent as possible. This inventive image may not become as clear, and as transparent and/or translucent as possible if its refractive index is significantly different from the application used upon it, if the application only partially filled in its surface irregularities, or both. For instance, a transparent colorless cPRM and a colorless bonding substance filling in and smoothing out surface irregularities with the same (or a similar) refractive index may be used to smooth out the inventive image surface to make it transparent. But, using a bonding substance with a substantially different refractive index may increase the clarity and the transparency and/or translucency of this inventive image without making it completely transparent.

Substantially or completely translucent bonding substances are most preferred when filling in inventive image surface irregularities to increase the surface's clarity, transparency and/or translucency; to alter its color; to change other surface light effects; or create a combination thereof. Further, it is preferred that the bonding material(s) used contribute desirably to the aesthetic of the inventive image; that they are aesthetically insignificant in the inventive image or not aesthetically undesirable in the inventive image; that as superimposed layers, these applications are not visible to the human eye as being separate from the rest of the inventive image, or that they are part of the inventive image in a combination of these ways. Often, it is desirable to fill in inventive image surface irregularities with a bonding substance that has a refractive index which is either the same, or as close as possible to that of the inventive image surface it is used upon. Often slight differences in these refractive indexes (e.g., within about 10 percent depending on the material), are not noticeable or significant. Examples of suitable bonding materials for these effects include: cPRMs, paints and painting media like acrylics, wax based (such as encaustic), oil based (such as oil paints), alkyds, paints with cPRM binders, watercolors and tempera, as well as glues, varnishes, fixatives, sealers or, combinations of these. In general, it is preferred to decrease or eliminate undesirable air bubbles when using transparent and/or translucent substances on inventive image surface irregularities, such as with a vacuum or by hand. The bonding materials can be colorless or colored, e.g., with particles.

In some embodiments, variance in the relationship between the refractive index, the transparency, and the color of a bonding substance and the inventive image surface are desired. For instance, the application of transparent colored bonding substance can make a sandblasted inventive image surface comprised of colorless transparent cPRM much darker in color and more transparent. When the bonding substances have noticeably different refractive indexes, color or both, the variance in the thickness of the application of bonding substance caused by the inventive image's surface irregularities can give it a noticeable variation in these characteristics. For example, the bonding substance may be darker and less transparent where its application is thicker, which are the places where the surface irregularity it is filling is deeper than adjacent surface irregularities. However, in applications of bonding substances on SSI of inventive images which have noticeably different refractive indexes, color or both, the variance in the spatial depth of the application of bonding substance caused by the inventive image's surface irregularities may not produce a noticeable inconsistency in the aesthetic of either the application or the inventive image. The irregularities of SSI, such as those formed by sandblasting, are often difficult or impossible to see with the unaided human eye, but can be seen in a microscope.

In one embodiment, applications made on surface irregularities can connect one or more attachments, inlays, parts, objects, and/or devices to the inventive image or part thereof. On polymer, these applications may be surface preparation stabilizers.

Bonding substances may be used to fill in surface irregularities upon inventive image surfaces of the same or different compositions to modify the characteristics noted herein. As used herein, "Clarifying Imprimatura" refers to any transparent and/or translucent application made on surface irregularities on a transparent and/or translucent inventive image surface which is made of a composition that is different from the application, particularly where the application clarifies the inventive image surface and increases its transparency and/or translucency as it fills in its surface irregularities. Applications which only differ from their inventive image surface in color are not Clarifying Imprimatura. A Clarifying Imprimatura may also change other surface light effects of an inventive image, e.g., decreasing its matteness and/or increasing its glossiness, and may be colored, colorless, or even multicolored.

The inventive image surfaces that Clarifying Imprimatura are applied upon may be colored and/or colorless and the application of a Clarifying Imprimatura on an inventive image surface may alter that color. Clarifying Imprimatura which are thicker than needed to fill in the spatial depth of the surface abrasions can also add a layer of transparency, translucency or both. A Clarifying Imprimatura may or may not be a surface preparation stabilizer. But, SSI on polymer inventive images superimposed by Clarifying Imprimatura may be surface preparation stabilizers. A Clarifying Imprimatura might be applied on cPRM, polymer, non polymeric inventive image surfaces, or a combination of these. But, if an inventive image surface cannot become clearer and more transparent and/or translucent (e.g., a surface that is opaque internally and externally), an application made on it is not a Clarifying Imprimatura.

Clarifying Imprimatura can often rely on the mechanical bond to the surface irregularities upon which they are applied. Thus, Clarifying Imprimatura are often made using substances which rely heavily or entirely on surface irregularities to bond to inventive images, as they do not bond as well or at all on smooth inventive image surfaces. Provided they are made using bonding substances that are different from the inventive image they are applied upon, Clarifying Imprimatura can also be applications of bonding substances which do not rely on surface irregularities to bond to inventive images. For example, they can bond to their inventive image surfaces in other ways (e.g., chemically) or with bonding substances which would bond to their inventive image surfaces if they were smooth. Clarifying Imprimatura tend to increase the clarity of inventive image upon which they are applied, and they increase its transparency and/or translucency to varying degrees, e.g., approaching or achieving transparency when the refractive index of the Clarifying Imprimatura and the inventive image are closer.

For example, Clarifying Imprimatura include: (a) a transparent acrylic medium on surface irregularities on a transparent or translucent polymer inventive image surface; and (b) a transparent cPRM on surface irregularities on a transparent or translucent glass inventive image surface. An application of a transparent or translucent cPRM on a polymer inventive image surface formed using a chemically identical cPRM (whether it has surface irregularities or not) is not a Clarifying Imprimatura. Inclusion of a monomer and the catalyst appropriate for polymerizing the cPRM not present in the other image component will, however, be a Clarifying Imprimatura. Further, a transparent or translucent cPRM is a Clarifying Imprimatura when it is applied on surface irregularities of a polymer inventive image surface which bonds to it mechanically, even though its active ingredients are different from the image surface cPRM.

Further examples include: 1) One or more applications of cPRM which are used as the bonding substance on the surface irregularities, on either a gelled cPRM or a polymer. If the composition of the cPRM bonding substance is not the same as the cPRM used to make the inventive image surface, it is a Clarifying Imprimatura; 2) One or more applications other than cPRM may be used as the bonding substance(s) on the surface irregularities on either a gelled cPRM or a polymer to provide a Clarifying Imprimatura; 3) A combination thereof forms a Clarifying Imprimatura on some irregular areas of an inventive image surface which are visually identical to other areas of this same inventive image surface, which have no Clarifying Imprimatura on them. Filling in the surface irregularities on some areas of this gelled cPRM or polymer inventive image using a cPRM bonding substance which is the same as the cPRM used to make the inventive image surface it is applied upon, has the same refractive index and coloration as the bonding substance which is not cPRM (e.g., a paint) that was used to make the Clarifying Imprimatura on other areas of this same inventive image surface, resulted in the consistent increase in the clarity and the transparency of the inventive image surface, change in color, and its change in other surface light effects, despite the use of two different substances on this surface; and 4) Two steps may be used to further process the inventive image. In step (a), matter may be removed (or added) from the inventive image's surface irregularities so that they become significantly smaller (shallower). Then, in step (b), the remaining surface irregularities may be filled in and smoothed over to the extent desired with one or more bonding substances.

As another illustration, a cPRM might be used to fill in and smooth out some irregular areas of a sandblasted transparent polymer surface which is the same composition, which areas are not Clarifying Imprimatura. Other sandblasted areas of this same polymer surface might be filled in and smoothed out using a transparent paint which bonds mechanically to its SSI, which areas are Clarifying Imprimatura. Both the cPRM and the Clarifying inprimatura increase the transparency of this inventive image, and make it more glossy. But, because the bonding substances have different ingredients and different refractive indexes, these increases differ in some areas of this inventive image, and may or may not be visible to the human eye.

The ways in which Clarifying Imprimatura can be applied and used can be the same as or extend far beyond the applications and uses of conventional imprimatura. Clarifying Imprimatura may or may not cover an inventive image surface continuously, or in a veil-like manner. Clarifying Imprimatura can be continuous or discontinuous on one or more surfaces of the same inventive image. Further, Clarifying Imprimatura do not have to be underlayers and do not have to be superimposed by further applications, though they can be either or both. Clarifying Imprimatura might also be final layers on an inventive image, or part thereof, e.g., they can be veils, a drawing, a painting, a sketch, a pattern, a design, or a combination. Or, on a single inventive image, one or multiple Clarifying Imprimatura can serve a combination of these purposes. In addition, Clarifying Imprimatura can be made using multiple superimposed layers of one or more bonding substances, covering one or more inventive image surfaces, partially or entirely, applied as thickly, and as consistently or unevenly as desired. Clarifying Imprimatura can fill in any percentage of the inventive image surface irregularities upon which they are applied, as consistently as desired. The thickness and/or unevenness of Clarifying Imprimatura can even be used as aesthetic elements, e.g., partially or completely applied in impasto brushstrokes. Clarifying Imprimatura may be used in any form of art or design.

Clarifying Imprimatura may produce desirable aesthetic effects on inventive images which bonding substances of the same composition onto which they are applied are unable to produce. For example, when filling in and smoothing out the surface irregularities on a polymer inventive image with more of the same cPRM that was used to form that image, the resultant inventive image surface may be more glossy than desired. This inventive image surface could be made matte by adding surface irregularities, but this may not be desirable. If a matte substance such as a colorless matte paint binder were used instead, this inventive image could be semi-gloss or even matte without surface irregularities, with reduced surface irregularities, or with undesirable surface irregularities reduced or visually eliminated by being filled in. Alternately, bonding substances which are the same as the inventive image surfaces they are applied upon can produce the same aesthetic effects as Clarifying inprimatura. For example, a transparent red cPRM which is the same cPRM that was used to make a polymer inventive image, might have the same refractive index and the same color as a transparent red paint, or the differences in their refractive indexes and their colors might be sufficiently small and unnoticeable to viewers in their application on surface irregularities of the polymer inventive image. A colorless transparent cPRM which is the same cPRM that was used to make a polymer inventive image might have the same refractive index and the same color as a different colorless transparent bonding substance (such as an acrylic gel), or the differences in their refractive indexes and their colors might not be noticeable to viewers.

The change in the composition of inventive image surfaces brought by Clarifying Imprimatura on them can be valuable and desirable, even with the inventive image surface irregularities. Some areas of the surface irregularities superimposed by the Clarifying Imprimatura or the spatial depth of these surface irregularities may be desirable. In some embodiments, surface irregularities are made on inventive images which are at least partially transparent or translucent, for the purpose of bonding a Clarifying Imprimatura to the image which completely fills in and smoothes over these surface irregularities so that they are no longer visible to viewers. This Clarifying Imprimatura might be a final layer or it might be superimposed by one or more further applications. For instance, one or more applications which would not have bonded, or which would not have bonded as desired to this inventive image when it was smooth with no surface irregularities are made on the Clarifying Imprimatura because they bond to it or they bond to it better.

For example, it is often desirable to make applications on inventive image surfaces which are at least partially transparent, but the substance desired for making these applications does not bond to the inventive image as desired. By making SSI on the areas of these inventive images where these applications are desired, this problem may be solved in at least the following ways: 1) These applications can be made on the inventive image's SSI as Clarifying Imprimatura. Thus, for instance, a paint which does not bond to a polymer inventive image, can be mechanically bonded to it by its SSI (SSIs used for bonding such painting on polymers are surface preparation stabilizers); 2) Clarifying Imprimatura can be applied onto these inventive image SSI as an underlayer (e.g., as a continuous colored underlayer like a conventional imprimatura, or as a colorless underlayer, underdrawing, or underpainting). This Clarifying Imprimatura can be superimposed by further applications. Thus, for instance, a paint which does not bond to a polymer inventive image, can be used as desired on a Clarifying Imprimatura. Both these SSI and Clarifying Imprimatura are surface preparation stabilizers; 3) a combination thereof. As another example, it is often desirable to clarify at least part of inventive image surfaces to modify the characteristics of the inventive image surface without diminishing or eliminating the beneficial bonding that the surface irregularities provide to desired superimposed applications, which could not bond as well as desired without bonding mechanically to them. The use of a Clarifying Imprimatura can clarify such inventive image surfaces, increase their transparency and/or translucency, change their color, change other surface light effects, or create a combination of these effects as desired. Even though it can diminish or eliminate the mechanical bond that the filled surface irregularities used to provide, this Clarifying Imprimatura can be made of a composition which bonds as desired to any superimposed application(s).

When the function of surface irregularities is at least partially for the mechanical bond they provide to superimposed application (e.g., as SSI) and their aesthetic effects are partially or completely undesirable, it can be preferable to apply a Clarifying Imprimatura over the aesthetically undesirably visible surface irregularities (e.g., SSI which are surface preparation stabilizers). If further applications are made, its Clarifying Imprimatura can enable the process of their creation, to be freer, more spontaneous, more WYSIWYG, and more according to the Principle of Whole Development and Unity. Because the Clarifying Imprimatura may eliminate the undesirable aesthetic effects created by the some or all of the surface irregularities on such inventive images, while maintaining the ability to bond as desired to subsequent applications, these undesirable aesthetic effects do not have to be eliminated in the process of applying these subsequent applications, and/or thereafter. It is often highly preferable to use a Clarifying Imprimatura to fill in undesirable inventive image surface irregularities so that they are no longer visible before further work on the inventive image proceeds.

A Clarifying Imprimatura can be used as a final layer of an inventive image to change surface irregularities on it so that they are smoother, clearer, more transparent, more translucent, or completely transparent; their color or other surface light effects are different; or a combination of these. Also, when the use of real light, real transparency, real translucency, real spatial depth or a combination of these are important to a particular inventive image which is being made, methods using Clarifying Imprimatura are often preferred. Clarifying Imprimatura can enable new unique painting, printing, drawing, writing, collage and photography to be done on self-supported, transparent surfaces using real depth and real tangible light, typically as desired, in a spontaneous, WYSIWYG process using the Principle of Whole Development and Unity to the extent and manner desired.

For example, a transparent polymer might have SSI (such as sanded abrasions) which are shallow enough to be easily filled in, and thus, easily clarified (or visually eliminated) by the intended superimposed application of Clarifying Imprimatura comprised of one or more transparent or translucent media and/or materials other than cPRM, e.g., paint applications. Thus, these SSI serve as surface preparation stabilizers. For instance, if a viscous transparent or translucent paint is used as the Clarifying Imprimatura on this polymer inventive image (e.g., encaustic paint, oil paint or thick acrylic paint), its application in one layer might fill in the polymer's SSI completely, mechanically bonding to them and clarifying them (or eliminating their visibility) while simultaneously altering the inventive image's color, and increasing its transparency, translucency or both. In addition or alternately, if a thin transparent or translucent paint is used as Clarifying Imprimatura on these surface irregularities (such as watercolor layers, or layers of oil paint thinned with turpentine), it might take multiple applications to completely fill in their spatial depth, the first layer of which mechanically bonds to the surface irregularities and the remainder of which bond both to the remaining surface irregularities and to the previous application of the Clarifying Imprimatura done in the same paint. As the layers of this Clarifying Imprimatura are superimposed and this inventive image's surface becomes smooth, it will be clarified, its color will be changed, its transparency and/or translucency will increase, its other surface light effects will be changed, or a combination of these effects will occur. If one or more layers of the Clarifying Imprimatura are superimposed after this inventive image's surface irregularities are completely filled and smoothed out, these layers may bond to the previously applied Clarifying Imprimatura even though they will have no SSI with which to bond.

By filling in and smoothing out inventive image surface irregularities, the mechanical bond provided to further superimpositions can be decreased or eliminated. However, if it is desirable to fill in and smooth out such irregularities, and then have this surface bond to additional superimpositions (e.g., as a Clarifying Imprimatura that is a surface preparation stabilizer), it is preferable to use an application which can bond to the specific kinds of further superimpositions. The bonding substance might be applied thickly enough to completely fill in and smooth out an inventive image's surface irregularities, thereby clarifying or visually eliminating them while allowing the ability to bond to the further superimpositions as strongly and as permanently as desired. Or, if the visibility of some of these surface irregularities is aesthetically desirable in the inventive image, a Clarifying Imprimatura might be applied partially thereover. Clarifying Imprimatura on inventive images are desirably used on surfaces which are then drawn upon, painted, written upon, printed upon, superimposed by additional different matter, carved, processed in other ways, or processed in a combination of these ways.

On inventive images, it is preferable for Clarifying Imprimatura to be aesthetically desirable; aesthetically insignificant or not undesirably visible; invisible to the human eye; or a combination of these. Examples of preferred uses of Clarifying Imprimatura include: 1) for visual observation, or as a final layer at least partially covering an inventive image surface; 2) for visual observation, serving partially or entirely as a bonding substance or an underlayer, e.g., a surface preparation stabilizer, for further processing. As a bonding substance or an underlayer, it is preferred that a Clarifying Imprimatura bond to superimpositions. Thus, to the extent that Clarifying Imprimatura fill in the inventive image's surface irregularities, it is preferred that superimpositions made thereon do not rely on these same surface irregularities to bond to the inventive image. However, it is more preferable that superimpositions made on these Clarifying Imprimatura do not rely on these same surface irregularities at all to bond to the Clarifying Imprimatura. Thus, it is preferable that Clarifying Imprimatura used as bonding substances or underlayers on inventive images for further superimpositions are able to bond as desired to these further superimpositions; 3) filling in and smoothing over an inventive image's undesirable surface irregularities, instead of using a subsequent application to fill them in, to permit further processing of this inventive image surface, to be more spontaneous, WYSIWYG or even completely WYSIWYG, and/or more according to the Principle of Whole Development and Unity; and 4) use for a combination of these purposes.

In an embodiment, a Clarifying Imprimatura may function like conventional image bonding substances or underlayers, including acting as a primer, a size, a conventional imprimatura, underpainting, underdrawing, adhesive, or a combination of these. For example, used as an imprimatura on a polymer, a Clarifying inprimatura might be comprised of a single pigment or dye homogeneously mixed in a single material and/or medium, which is then applied uniformly onto surface irregularities on a polymer. A Clarifying Imprimatura could be made using the same substance used to make traditional imprimatura, e.g., thin oil paint or thin acrylic paint. Or, if the new form of imprimatura made of polymer previously described herein, is used on inventive image surface irregularities, it can be a Clarifying Imprimatura. Such new imprimatura can be a Clarifying Imprimatura if it is used on surface irregularities on polymer and/or non polymeric inventive image surfaces that are different from the polymers used in these Clarifying Imprimatura. If used as underpainting, a Clarifying Imprimatura might be comprised of a material or medium used in two or more colors, applied onto the polymer's surface irregularities as desired, e.g., in a design which serves as a basic foundation for the rest of the image which will be formed by one or more superimposed applications.

In an embodiment, a sealer, a fixative or a protective coating may be used partially or completely over a Clarifying Imprimatura. In an embodiment, a Clarifying Imprimatura is used as a drawing application, a painting application, a sealer, a fixative, or a protective coating. In some embodiments, it is often preferable for Clarifying Imprimatura used on surface irregularities on a transparent inventive image or part thereof to be made as a single uniform application of a transparent material, medium, or combination thereof, which is preferably colorless. It is often preferable for Clarifying Imprimatura used on surface irregularities on colored inventive images or part thereof to be colored like the inventive image or part thereof upon which they are applied. These preferences are particularly desirable when further applications (e.g., painting, drawing, printing etc.) may be made on these Clarifying Imprimatura, especially when a spontaneous, WYSIWYG, process of creation which is according to the Principle of Whole Development and Unity to some extent is preferred. One of the most preferred materials for use as a Clarifying Imprimatura on polymer inventive image surface irregularities is a transparent colorless acrylic emulsion, paint and/or painting medium, e.g., such as conventional artists' acrylic gels or pastes. These are available in a wide variety, but among these, those acrylics which form bubbles with brushed applications are generally less preferable. Some materials and some media (e.g., some colorless, transparent acrylics) may need to dry or harden before they show their full transparency and/or translucency, however, this is often a quick process.

In an embodiment, a Clarifying Imprimatura is used as a surface preparation (e.g., as a surface preparation stabilizer), to give an inventive image a transparent surface, or to make all of its surfaces transparent. For example, one or more surfaces of a polymer inventive image made in this embodiment (e.g., with one or more surface preparation stabilizers) might be used as image supports (e.g., stabilizers) which are new kinds of 2D or 3D "canvases" for subsequent applications and other subsequent image making processes, e.g., using conventional practices as desired, such as, painting, drawing, printing, photography, carving, engraving, cut-outs, sgraffito, writing, collage, attachments, inlays, and light effects. A wide variety of conventional practices and materials, including those described herein, may also be used. The resulting inventive image might be a conventional art form (e.g., a painting, drawing, sculpture, construction, installation, furniture design, architectural design, or graphic design), a new variation, or a new unique art form.

In a further embodiment, a Clarifying Imprimatura is used to partially fill in undesirable inventive image surface irregularities to lessen their spatial depth. Thus, this inventive image may be clarified, made more transparent or more translucent, change colors or a combination of these effects occur, but they occur to a lesser extent than they might have occurred had these surface irregularities been completely filled in and smoothed over. For example, this might be the effect desired for an inventive image or part thereof, or this effect might be further processed. If the remaining surface irregularities are undesirable, then these effects might be maximized by applying Clarifying Imprimatura until the rest of the undesirable surface irregularities are filled in and smoothed over. It may be desirable to fill in some of the remaining surface irregularities with one or more further superimpositions, which may or may not be layers added to its Clarifying Imprimatura, whether or not they overlay its Clarifying Imprimatura. Other superimpositions can be made which bond to surface irregularities which the Clarifying Imprimatura did not use, e.g., these might be superimpositions that are incompatible with the Clarifying Imprimatura. For example, this embodiment can be used to enhance the permanence of superimpositions on a Clarifying Imprimatura. The remaining surface irregularities and mechanical bonding ability provided in this embodiment both within the Clarifying Imprimatura application and in areas in which the Clarifying Imprimatura is not applied can be useful. They might be used for aesthetic effects by filling them in and/or by leaving them unfilled. For example, the bonding ability may be especially useful for superimpositions which contain little binder; commonly dust, crack, and flake off their surfaces; for joining solid materials, objects, devices or combinations of these to the image, and combinations of these. Media like pastels, charcoal, chalk and conte crayon are conventionally used on a rough surfaces specifically for the same purpose—a mechanical bond, e.g., papers made for pastels have a rough surface texture called a tooth. The mechanical bond may also be valuable for multiple superimpositions made on a Clarifying Imprimatura which can also mechanically bond to this inventive image surface using the surface irregularities, e.g., if multiple superimpositions are unable to bond to their underlayers, or unable to bond as strongly or as permanently as desired, they can mechanically bond to the remaining surface irregularities.

This embodiment may be used when subsequent application(s) or addition(s) to be made on an inventive image fill in the remaining undesirable surface irregularities. For instance, the subsequent application could be a layer of a sealer, a fixative, or a protective coating, e.g., cPRM, a varnish, a layer of paint, objects attached onto the surface, multiple layers, materials, and/or media, or combinations of these. This embodiment might be preferred when a preplanned image making process is being used and/or when spontaneous, WYSIWYG working process according to the Principle of Whole Development and Unity are not necessary, not desired, in conflict with another more desirable preference for an inventive image, or a combination of these.

In some embodiments, Clarifying Imprimatura may be used to connect one or more attachments, inlays, parts, objects, devices or combinations of these to an inventive image.

The following two illustrations, present image making processes in which it may be preferable to use Clarifying Imprimatura.

Illustration One:

A transparent colorless polymer inventive image's entire surface may be abraded to help mechanically bond conventional painting and drawing materials and/or media (e.g., oil paint) to its SSI which function as a surface preparation stabilizer. In comparison to traditional oil painting, this enables a) real spatial depth which is completely or partially transparent and/or translucent; and b) a tangible form of real light (which is generally non-existent or rarely noticeable in traditional oil panting); c) greater use of real transparency; d) greater use of real translucency; e) more workability, reworkability and controllability; I) more creative freedom; and g) greater strength and permanence. The aesthetic effects of the surface irregularities made on this polymer inventive image are largely undesirable. It may be preferable to apply conventional drawing and painting materials and media thinly on said polymer's SSI, using only a single layer, diluted materials or media, and/or a combination of these, e.g., for aesthetic reasons. These desired painting and drawing applications generally cannot be made on this inventive image in a WYSIWYG process, because as the surface irregularities are filled and become clarified, change color, become more transparent, translucent, shallow or smooth, and/or as their other surface light effects change (e.g., become less matte), other areas of this inventive image surface will still have the undesirable visual effects which block WYSIWYG image development. Furthermore, it is unlikely that the intended applications will be applied thickly enough to fill in all of the undesirable surface irregularities to the extent desired, unless filling them slightly and/or to varying degrees is desired and/or unless the image maker makes a conscious effort to fill in all of the undesirable surface irregularities to the extent desired while painting. Thus, in painting this inventive image, it may be preferable to preplan the applications superimposed on the surface irregularities so that they fill in the undesirable surface irregularities to the extent desired as they are applied.

Also, in further processing this inventive image without a Clarifying Imprimatura, it may be unknown how the desired superimpositions will fill in the undesirable surface irregularities, a concern that could have been eliminated by a Clarifying Imprimatura. As the painting progresses, the surface irregularities may be filled in by the composition of the applications used on this inventive image's surface irregularities and by the thickness of these application(s). But, using many materials and media in single layer applications thickly enough to fill in all of the undesirable surface irregularities might, for example, affect or risk affecting the inventive image undesirably, aesthetically and/or structurally, e.g., its strength and permanence. For instance, thickening a layer of a painting or drawing material or medium often means using more of it, adding more of a coloring substance to it, or both. These changes can result in a darker, less transparent, less translucent, or undesirable color, or a combination of these. In addition or instead, thickening such a layer can involve adding a fat vehicle or additive to it (such as stand oil, linseed oil, wax or a combination of these). Examples of undesirable consequences which might result from adding a fat vehicle or additive to it include: a change in color (e.g., caused by diluting the material or medium or by the color of the fat vehicle or additive itself); a change in light reflective qualities (e.g., from matte to glossy); a change in its transparency and/or translucency; a decrease in the material's or medium's strength and/or permanence; or a combination of these. For instance, the addition of one or more fat vehicles or additives in paint can result in a paint layer becoming more glossy; remaining soft, thus vulnerable to damage (e.g., by scratches and by undesirable matter sticking to it); discoloring (e.g., turning amber, yellowish or brownish); wrinkling and/or cracking over time; becoming more transparent and/or translucent over time; raising up (e.g., forming blister like or bubbles like forms); or a combination of these. In addition or instead, thickening such a layer can involve the addition of an additive (such as a filler), which may alter its strength and/or permanence (e.g., lessening the relative amount of binder) and/or which may alter its color (e.g., lessening its intensity). Professional painting conservators usually find lean paint applications made with pure, unadulterated paints the most strong and permanent.

Illustration Two:

The entire surface of a polymer inventive image may be abraded so that conventional painting and drawing materials and/or media which would not bond as desired to its smooth surface (e.g., oil paints), will bond to it. This enables a wonderful new kind of painting, with the desirable features available to image makers described in Illustration One. Again, the aesthetic effects of this polymer's surface irregularities are largely undesirable, but no Clarifying Imprimatura is used. The image maker may prefer to superimpose applications on this inventive image in multiple layers (e.g., for aesthetic reasons) using its SSI as a surface preparation stabilizer, but the number of layers necessary to form the desired inventive image and the thickness desired on various areas of the polymer's surface may be unknown. These determinations may be made during the process of creation, e.g., the image maker does not want to begin the inventive image with a great deal of it already preplanned, preferring to make decisions as the inventive image develops, for instance, according to the Principle of Whole Development and Unity to the extent and manner desired and possible. The first layer or layers of the drawing and painting applications probably can not be done in a WYSIWYG process, and depending on the spatial depth of the deepest undesirable SSI, it is likely that subsequent layers can not be applied in a WYSIWYG process either.

If the initial layer(s) of painting and drawing on the polymer fully fill in all of its undesirable surface irregularities, this method might not have other limitations, problems or undesirable issues. However, this is unlikely, e.g., the first layer or layers of marks on said polymer are not made thickly enough, they are discontinuous, or both. Again, limitations exist due to the lack of Clarifying Imprimatura. Thus, it may be preferable for applications superimposed directly on this inventive image's surface irregularities to be preplanned, or at least have their thickness in relation to the spatial depth of the undesirable surface irregularities, as well as their coverage of undesirable SSI, considered as they are applied. Further, the additional problem of filling in all of the undesirable SSI as the image is formed may exist, which might have to be solved during the painting process. Thus, while working on the inventive image, it is preferable that the image maker imagine the developing inventive image without its undesirable SSI until the process of layering painting and drawing applications progresses enough to fill them all in as desired, thereby becoming a WYSIWYG process. As such, painting and drawing on the inventive polymer may not be spontaneous, or as spontaneous as desired because the image maker has to consider applying sufficient layers over all of the undesirable surface irregularities and each layer or the sum of the superimposed layers in each area has to end up thick enough to fill in the polymer's undesirable surface irregularities to the full extent desired by the time the desired processing is done. The option, the freedom, the control of working and reworking as spontaneously as desired, and the ability to work in a WYSIWYG process and view applications as they will look in the finished work, as they are made are generally preferred, even if some preplanning is necessary. When an application fails to completely fill in and smooth out the total spatial depth of undesirable SSI, or when an application fails to do this to the extent desired, the application may not look as it will look when the total spatial depth of the undesirable SSI is filled in and smoothed out entirely or as desired in the finished image. As in Illustration One, a solution might be to thicken the application(s) of paint.

Nevertheless, the present invention has the versatility and flexibility of having "safety nets" which can be used as desired to avoid beginning a work anew. If the image maker miscalculates in preplanning the inventive image and the painted and drawn layers do not adequately fill in all of the undesirable surface irregularities, or if these applications are spontaneously made without any preplanning or with partial preplanning, the present invention offers various options. For example, painting and drawing applications can be reworked as desired, by modifying or reapplying them in a different manner which fills in all of the polymer's undesirable surface irregularities, some of which can even be used as bonding spots. In addition or instead, the inventive image's design might be modified, e.g., the previously undesirable surface irregularities might be used as part of the inventive image's aesthetic or they might be filled in by one or more superimposed applications (such as another paint layer, a sealer, a fixative, another protective agent, a Separating Layer of polymer or another Separating Layer, or combinations of these). Yet, these options and others can significantly change the specific inventive image the image maker desires to make. In view of these illustrations one and two, it is often preferred to use a Clarifying Imprimatura to increase the control and freedom in making an inventive image and to avoid undesirable visible consequences on the resultant inventive image, to limit conceptual work, to limit physical work, to increase strength and permanency, or a combination of these.

In an embodiment, one or more processes of removing matter may be done on a Clarifying Imprimatura on an inventive image in processes which can be more spontaneous, more WYSIWYG, and more according to the Principle of Whole Development and Unity than these same processes might be on these same inventive image surfaces without their Clarifying Imprimatura. As an illustration, drawing lines might be carved into a thick Clarifying Imprimatura on an inventive image which may or may not penetrate into the image beneath its Clarifying Imprimatura. As these carved lines are made, surface irregularities, some of which are undesirable, may be formed on the Clarifying Imprimatura, which may be filled in with a new application of the same Clarifying Imprimatura put on these carved lines just thickly enough to eliminate their undesirability (e.g., matte finish, tooth marks, etc) but not fill in or alter the carved lines. Of course, the same Clarifying Imprimatura may be used to fill in part or all of undesirable line(s). As an alternate illustration, sgraffito may be done in a Clarifying Imprimatura, the lines of which reveal the initial inventive image's surface beneath its Clarifying Imprimatura as an aesthetic effect, e.g., the Clarifying Imprimatura is a different color than the image surface beneath. In some embodiments, Clarifying Imprimatura can be applied over other applications on inventive images which have surface irregularities, provided these applications are at least partially transparent or translucent. For example, Clarifying Imprimatura can be superimposed on SSI on painting, such as on underlayers on an inventive image. In addition or instead, the bond of a Clarifying Imprimatura superimposed on an application might rely partially or completely on bonding spots within that application (e.g., the bonding spots may be SSI).

In some embodiments, bonding spots can be formed within Clarifying Imprimatura in a variety of ways. Also, whether they are bonding spots or not, surface irregularities on an inventive image which are partially filled in by a superimposed Clarifying Imprimatura, may bond and/or assist in bonding a superimposition to the image over its Clarifying Imprimatura. A Clarifying Imprimatura may be made on an inventive image which only partially fills in the spatial depth of its surface irregularities. Then, cross-hatched strokes of drawing may be done on this Clarifying Imprimatura (e.g., using pastels), filling in the spatial depth of some of this image surface's remaining surface irregularities. But, within these cross hatched lines, some or all areas in which the Clarifying Imprimatura has not yet been superimposed and the spatial depth of the surface irregularities is still not completely filled in may be left as such. In addition or alternately, these areas can serve as bonding spots to mechanically bond a superimposed layer of cPRM to this inventive image, covering the entire pastel drawing on the Clarifying Imprimatura (e.g., even though this cPRM may not be able to bond as well to the pastel drawing or Clarifying Imprimatura).

As a second illustration, a Clarifying Imprimatura might leave bare areas on an inventive image surface, serving as bonding spots to adhere an application thereon over its Clarifying Imprimatura, which can not bond or bond as well to its Clarifying Imprimatura. In a third illustration, a Clarifying Imprimatura may cover some areas of an inventive image surface consistently, and cover other areas with lines. The Clarifying Imprimatura may completely fill in the spatial depth of the inventive image surface irregularities where applied. Then, conventional painting and drawing practices may be superimposed over some areas. Bare areas of surface irregularities which remain in between the linear parts of this Clarifying Imprimatura, may function as bonding spots to bond a superimposed application of cPRM over this surface. These spots may not bond or not bond as well to the Clarifying Imprimatura or to the conventional painting and drawing materials and media on it. In this illustration, the superimposed layer of cPRM which hardens into polymer might serve various purposes, including functioning as a sealer, a fixative, or a protective coating, e.g., for the conventional applications, the entire Clarifying Imprimatura, or both, or for the entire inventive image surface. This layer of cPRM might serve aesthetic purposes, completely filling in the remainder of the polymer's undesirable surface irregularities, increasing the polymer's clarity, transparency, or translucency, changing its color or other surface light effects, or a combination of these. This layer of cPRM might even be used to separate the application or the addition beneath it from those subsequently made over it, e.g., to separate two incompatible applications such as the use of acrylic paints over oil paints. It might be used for other reasons of strength and permanence, aesthetic reasons, or the like. Such a novel layer is referred to herein as a "Separating Layer of polymer."

In some embodiments, one or more opaque applications (which are not Clarifying Imprimatura) may be used to fill in surface irregularities on inventive image parts which are at least partially transparent or translucent. In this embodiment, the surface irregularities which are filled in might have even been formed on the image to provide a mechanical bond to a subsequently superimposed opaque application. Such application can be made using one or more bonding substances which are opaque, the application or layered applications of which are opaque. Some examples of such applications include cPRMs, acrylic paints, wax based media (such as encaustic, etc.), oil based media (such as oil paints, etc.), alkyds (such as alkyd paints), paints which have cPRM in them (e.g., as their binders), glues, varnishes, fixatives, sealers, and combinations of these which are colored and/or have particles mixed into them. These applications can be made on inventive image surface irregularities as desired, e.g., thinly, thickly, consistently, or inconsistently. It is preferable to use substances in these applications which bond to the inventive image as strongly and as permanently as desired. To satisfy these preferences, substances used on SSI may rely on the mechanical bond they form to them and not bond to the inventive image surface. While this may also be true for substances used on large surface irregularities, it is less often the case. Thus, it is often preferable that these substances bond to the large surface irregularities in other ways.

Opaque applications of this embodiment might be made to modify, particularly to decrease and/or eliminate, an inventive image's surface characteristics as described herein. In addition or instead, such applications might be made to decrease the aesthetic brought to the inventive image by undesirable surface irregularities by filling them in as desired such as with a substance which will bond as desired to subsequently superimposed applications that might not otherwise bond or bond well to this inventive image surface, e.g., a bonding substance, as an underlayer, and/or as a surface preparation stabilizer. Such an intermediate opaque application can eliminate or reduce the undesirable aesthetic of the surface irregularities so that the subsequent application can be superimposed on an inventive image surface which is closer to the desired aesthetic, using a process which is more spontaneous, more WYSIWYG, and more according to the Principle of Whole Development and Unity than it could be if it were superimposed on the same image surface if it were simultaneously filling in its undesirable surface irregularities. Thus, when making transparent, translucent or opaque superimpositions over undesirable surface irregularities, it is generally preferable to fill in the inventive image's undesirable surface irregularities before the superimpositions are made, rather than as they are made, whether the application used is a Clarifying Imprimatura or not.

In an illustration, surface irregularities may be made over one entire surface of a planar polymer image support made of a colorless transparent cPRM which may be a stabilizer. Though some of these surface irregularities may be desired in the finished inventive image, the aesthetic contribution of some or most of them may be undesirable. Their ability to bond applications to this inventive image may be desired, and this inventive image may, for example, be further processed using one of the two following methods to make the painted inventive image in FIG. 5.IX.

In Method One, some areas of this polymer inventive image surface may be painted with opaque applications of a blue paint (e.g., a conventional oil or acrylic phthalo blue paint), made directly on its SSI which function as a surface preparation stabilizer (these areas look dark in the illustration). Though this particular paint can be translucent or transparent when it is applied thinly, in these areas it is applied thickly so that it is opaque and it fills in the entire spatial depth of the SSI (which might have appeared lighter if not completely filled in). The remaining bare SSI, also functioning as a surface preparation stabilizer on this inventive image surface, may be partially or completely filled by a colorless transparent Clarifying Imprimatura, e.g., an acrylic Clarifying Imprimatura. This Clarifying Imprimatura changes the surface areas it is applied upon from translucent to transparent; makes this inventive image less matte, semi gloss, glossy or a combination of these; and changes them from milk white to colorless. Then, thin translucent and transparent applications of the same blue paint are made on this inventive image over some areas of this Clarifying Imprimatura, which functions as a surface preparation stabilizer. These areas are illuminated by light that comes through the entire spatial depth of this inventive image. In the process of making some of these blue applications, the paint may be applied and then partially rubbed off of the surface using a cloth wet with the appropriate solvent. The painted blue areas also appear dark in this illustration as it does not show the difference between the painted blue opaque, translucent, and transparent areas. Without surface irregularities, a Clarifying Imprimatura, and/or an application (like a ground) on this inventive image made of a composition which is different from the composition of this inventive image, the particular blue paint applied on this inventive image generally could not have bonded to it sufficiently, strongly or permanently. In the areas where the surface irregularities on this inventive image are filled with the Clarifying Imprimatura, this inventive image generally remains colorless and transparent when the Clarifying Imprimatura is not superimposed (these areas appear white in this illustration).

Instead of using Method One to make this polymer image support into the inventive image in FIG. 5.IX., Method Two might be used. Method Two optionally enables further processing of this inventive image to be done in a process which is more spontaneous, WYSIWYG, and more according to the Principle of Whole Development and Unity than Method One. Here, a Clarifying Imprimatura surface preparation stabilizer may be applied over the entire surface of this inventive image, preferably completely filling in and smoothing over all of its SSI which also function as a surface preparation stabilizer. This Clarifying Imprimatura can make the translucent inventive image transparent; become less matte, semi glossy, glossy or a combination of these; and change this inventive image from milk white to colorless. Even though some surface irregularities are desired in the finished inventive image, a uniform surface without undesirable elements can enable this image to be painted without seeing undesirable surface irregularities and having to fill them in as the painting progresses. Thus, beginning this painting with a Clarifying Imprimatura on it can improve the processability as noted above. The desired surface irregularities can be remade on this image using one or more processes for removing matter from it, e.g., before, during, or after it is painted, or at a combination of these times. Painting is done on this inventive image using the conventional phthalo blue paint used in Method One in applications which are varying thicknesses, and thus the blue is translucent, transparent and opaque in different areas on this image (not fully illustrated in FIG. 5.IX). Unlike Method One, here the darkest opaque areas along with the translucent and transparent blue areas may be painted in a spontaneous manner. As in Method One, the Clarifying Imprimatura here can be the final layer on this inventive image in the unpainted areas of this image, which appear white in FIG. 5.IX.

Regardless of how it is made, the inventive image shown in FIG. 5.IX. might be mounted so that it is illuminated by light reflected through its spatial depth. This might be light reflected off of a white wall, the floor, and/or a reflective image part not shown (such as a reflective underlayer covering at least a portion of the image, which may or may not be physically connected). In addition, or instead, this inventive image might be illuminated by a light source which is part of the image (but which might be hidden from view), such as one or more light bulbs, electro luminescent layers or lamps, LEDs, and/or other light sources which might be within and/or behind the inventive image shown in the illustration, which light source may be physically connected to the image part shown.

Surface Irregularities and Smooth Surfaces on Opaque Portions of Inventive Images Surface irregularities can also change the color and other surface light effects of opaque polymeric and/or non polymeric inventive image surfaces, e.g., softening and/or lightening their color, making them less glossy and/or more matte; giving them shadows, a play of shadow and light, a play of light and dark, or a play of matte and glossy, or a combination of these. For instance, large surface irregularities like textures can create a play of light and shadow on an inventive image, or an image can have a play of light on an opaque surface which is partially matte due to its surface irregularities and partially smooth and glossy. Such light effects might be created on opaque inventive image surfaces by making surface irregularities on them. Conversely, by reducing or eliminating surface irregularities on opaque inventive image surfaces, such effects can generally be decreased. One or more substances and/or methods of applying them described herein for use on the surface irregularities of inventive images which are at least partially transparent or translucent can be used as desired on the surface irregularities of opaque inventive images or part thereof. Such substances can for example, be made of the same composition as the opaque image surface they are applied upon, or they can be made of a different composition (e.g., cPRM used to fill in surface irregularities on a polymer made using the same cPRM or made using a different cPRM). It is preferable to use substances on surface irregularities on opaque inventive images that bond as strongly and permanently as desired, provided these preferences do not conflict with another more desirable preference for a specific inventive image.

In some transparent and/or translucent applications on the surface irregularities of opaque inventive images, the varied thickness of the see-through application caused by the varied spatial depth of the inventive image surface irregularities it is applied upon may cause variance in the consistency of the application, e.g., its color may vary and/or its light may vary. However, often the irregularities on the surface that these applications are made on are small (perhaps even microscopic), and these variations are likely to be slight or not generally noticed. Yet in general, this variance will increase as the variance in the surface level of the inventive image increases.

A substance with a different composition from that of the opaque surface of the inventive image it is applied upon, and which fills in its surface irregularities partially or completely might be used for various reasons, including for aesthetic purposes, e.g., SSI on polymer superimposed by applications such as conventional painting and drawing media are surface preparation stabilizers. In addition or instead, changing the composition of the surface of the inventive image with a superimposition can enable that image to bond to subsequent applications that perhaps would not bond or bond as well directly to the image surface if it were smooth, e.g., such superimpositions made on polymer surfaces may be surface preparation stabilizers. In such situations, the surface irregularities might be made on a surface of the inventive image to change its composition to improve bonding to subsequent superimpositions. One advantage of intermediate applications (e.g., surface preparation stabilizer) rather than directly application of the subsequent application onto the surface irregularities is that the intermediate application can eliminate the undesirable aesthetic of the surface irregularities to more aesthetically apply the subsequent application.

While some paints may not bond as desired to smooth polymer inventive images, they may bond mechanically to surface irregularities. Thus, surface irregularities might be made on such an opaque polymer inventive image. Then, these surface irregularities might be filled in with a substance (e.g., a surface preparation stabilizer) which bonds to them mechanically and perhaps in other ways, to eliminate the visibility of these surface irregularities. Typically, this can enable desired subsequent applications to bond to the image and to enable such subsequent applications to be made according to the Principle of Whole Development and Unity. For instance, if it is desirable to change the aesthetic appearance of an opaque surface of the inventive image with surface irregularities by completely or partially filling them in, it may be desirable to do this before further applications are made so that the aesthetic change which occurs by such filling occurs before the subsequent applications are made rather than as these subsequent applications are made.

In some embodiments, applications made on surface irregularities can connect one or more attachments, inlays, parts, objects, devices or combinations of these to an opaque inventive image or part thereof, which can improve bonding if the applications are different from the inventive image they are used upon. Bonded to the inventive image, these elements might serve aesthetic, structural, and/or functional purposes including mounting, installing and/or framing; or a combination of these purposes. The resultant inventive image might, for example, be a collage, construction, sculpture, vase, table, wall, or book.

In some embodiments, special aesthetic effects can be formed on inventive images by varying the filling of their surface irregularities, including filling in some or all of the surface irregularities on a single surface; partially filling in the spatial depth of some or all of their surface irregularities; using different substances to fill; varying the thickness of an application; layering multiple applications; or varying the specifications of their surface irregularities (e.g., deeper, smaller, or larger). The aesthetic effect created might, for example, be a play of light and dark, of varied spatial depth, of matte and glossy surfaces, of reflective and non-reflective surfaces, of varying degrees of transparency and/or translucency, or of color.

Further Description of Layering

Inventive images can be made in unlimited layers, which can have a wide range of visual effects, e.g., light effects and coloration; and can be made of a wide variety of materials media objects and devices and their combinations. The layering processes of the present invention can make these conventional practices more workable, reworkable, controllable, stronger, permanent, varied, or a combination of these, than they often are in conventional images. Layering can bring real light, real transparency, real translucency and real spatial depth into inventive images, in ways that are not comparable possible in strong, permanent conventional images.

When strength and/or permanence are desired in an inventive image, it is generally preferable that layering use ingredients which result in an image which is as strong and permanent as desired, preferably without undesirable effects.

Thus, it is often desirable to follow conventional rules governing the layering of conventional applications made on surfaces of inventive images, e.g., when superimposing multiple layers of oil paint on a polymer image support (such as a stabilizer), it is generally desirable to follow fat over lean. Yet, when superimposing conventional layers which should follow rules for strength or permanence like fat over lean (e.g., when superimposing layers of oil paint) on inventive images using Separating Layers of polymer (e.g., stabilizers) in between them, conventional rules of layering like fat over lean can be ignored. The use of conventional image making rules in making inventive images is preferably determined on a case-by-case basis, generally according to the resultant inventive image's strength, permanence, its aesthetic qualities, and any undesirable effects.

In some embodiments, partial layers, slivers or pieces of polymer may be used on and/or within non polymeric applications on inventive images. Such pieces of polymer are preferably at least partially transparent or translucent, and preferably used with one or more superimposed applications that are see-through. For example, pieces of polymer might be used between layers of paint on inventive images. One valuable use of partial layers of polymer is to increase the transparency, the translucency, the luminosity, the spatial depth or the combination of these characteristics of conventional layers of paint, including applications like washes, glazes, broken color, drawing, or combinations of these. Such partial layers of polymer may be used between non polymeric applications on polymeric and/or non polymeric image supports (e.g., stabilizers). For instance, pieces of polymer can be used between layers of conventional oil painting on canvas, or they can be used between layers of oil painting on a polymer image support (e.g., a stabilizer). Such partial layers, slivers or pieces of polymer might be bonded to the inventive image using any desired methods, e.g., embedded and/or attached within a layer of paint, using bonding spots, a chemical bond, a mechanical bond, or a combination of these ways. Partial layers, slivers or pieces of polymer might be made with absorbent polymer(s), conductive polymer(s), and/or polymer(s) capable of bonding to that which is superimposed upon its or their surfaces (e.g., they are made with a surface preparation stabilizer). Thus, such materials may be electrically active, e.g. light emitting such as polymer LEDs.

Separating Layers can be used in inventive images to separate one or more layers and/or parts from one another for any reason, e.g., strength, permanence, aesthetic, functional, or structural. Separating Layers may be colorless and/or have opaque or see-through coloration. Separating Layers may have a design, drawing, painting, a pattern, printing, writing, incising, embedding, texture such as carving or inlays, light effects (e.g., a Separating Layer which reflects light, distorts light such as a lens), and/or a Separating Layer which is a light source.

Separating Layers of Polymer

In some embodiments, an inventive image or part thereof may be formed using layers using a new technique called Separating Layers of polymer, whereby almost anything might be superimposed on inventive images with the strength and permanence desired because these layers are separated by one or more Separating Layers of polymer positioned between them. Separating Layer of polymer can be made to any desired specifications, but it is frequently preferable for each to be transparent and/or translucent and to aesthetically contribute to the inventive image. For example, Separating Layers of polymer might have any kind of coloration and/or they might be electrically active, e.g., light emitting, for example, by polymer LED(s). Separating Layers of polymer can be any thickness (e.g., even or uneven) and have any other dimensions desired as long as they include some polymer, they may have any percentage of non polymeric additive ingredients; they can be in any shapes or forms desired (e.g., textured, curved); they can be used on an entire surface of the image or on any part thereof; they can encircle an image; and/or they can be used continuously and/or discontinuously. Separating Layers of polymer may or may not be bonded to an inventive image (e.g., they may be held in place by gravity, by tacking, or by a bond such as by embedding, bonding spots, or surface irregularities). Separating Layers of polymer may bond to one or more superimpositions using any methods and/or compositions described herein, e.g., made of a mixed polymer, have multiple layers (such as with surface preparation stabilizer), SSI, etc. It is preferable for at least one layer, and more preferable for most or all the layers, used on a Separating Layer of polymer to be at least partially transparent and/or translucent. Separating Layers of polymer can be stabilizers in inventive images.

Separating Layers of polymer are typically as workable, reworkable and controllable as desired, e.g., removable. They may enable layering under and over and over them to be more workable, reworkable, controllable, and WYSIWYG than they may have been otherwise. For example, layered applications used under and/or over Separating Layers of polymer may be conventional practices, which cannot be freely made, reworked, repaired, controlled, or removed as freely or as fully as desired in their conventional applications. A wide variety of tools and processes can be used for forming, reworking, and controlling both the polymer and applications on it.

Use of Separating Layers of polymer can liberate image making and images from problems with conventional practices, as in these examples. Separating Layers of polymer may expand the ability to create with, rework and control the use of real tangible variable light, spatial depth, transparency, translucency or a combination of these in inventive images. Separating Layers of polymer can be placed partially or completely between layers and/or applications in an image which might be or would be impermanent, less permanent, weak or less strong, if they were superimposed directly over one another. Thus, for example, limitations and problems (e.g., risks) can be controlled, avoided, or ameliorated as those involved in: a) layering applications like paints according to conventional rules for strength and permanence such as fat over lean (e.g., a Separating Layer of polymer might be colored to look like the fat layer which would have been applied if fat over lean layering had continued according to conventional practices); b) the use of conventional practices which tend to flake and crack when they are layered or used in too many layers (e.g., gouache and paints with little binder in relation to their solid content); c) the use of conventional practices which tend to dust off (e.g., pastels, charcoal, graphite, conte crayon, etc.); d) the use of anything superimposed that does not apply or bond as well as desired (such as materials and media which do not apply well when superimposed over specific applications or surfaces); e) the use of surfaces of conventional images or applications upon them which are undesirably changed (e.g., easily and/or irreversibly) by the process of working and reworking (e.g., by layering or other superimpositions and reworking); and f) the use of superimposed applications which undesirably alter or risk undesirably altering underlayers, previous applications or the image's aesthetic effect, e.g., by smudging or disturbing previous applications, or lines, color, or forms in them, also by disturbing delicate underlayers, etc.

Separating Layers of polymer can form aesthetic effects in inventive images, including by layering on inventive images with numbers and sequences of superimposed layers that would be impermanent or impossible using conventional practices. Aesthetic effects can result from Separating Layer(s) made of conductive polymer, and aesthetic effects can be made by altering the thicknesses, placement, frequency, consistency, ingredients, shapes and textures of Separating Layers of polymer, e.g., to control an image's light. Using Separating Layers of polymer, an unlimited number of layers, and even multiple different layering techniques and/or mediums (e.g., conventional practices) can be superimposed on inventive images in any order and be as workable, as controllable, and as permanent as desired. For example, using Separating Layers of polymer between them, watercolor can be layered in any order with oil paint glazes, glass, tempera, pastel layers, encaustic, scumbling, found objects, pointillist layers of acrylic, ink drawing, oil paint, more layers of oil paint, collage, more oil paint, photography etc.

Non polymeric Separating Layers

In some embodiments, Separating Layers are non polymeric. They can be made of any compositions and according to any specification desired, e.g., paper, glass, fiber, lace, steel wool, leaves, mud, plaster, wax, metal, candy wrappers, etc., or they can be made using conventional practices or even be conventional images (such as a drawing or a painting, a glass image, a print, or a photograph). Non polymeric Separating Layers might be used for the same purposes as Separating Layers of polymer, e.g., to separate applications which might otherwise be impermanent or impossible, to add aesthetic, or structural effects, or a combination thereof. Non polymeric Separating Layers can be stabilizers in inventive images, e.g., surface preparation stabilizers or fiber stabilizers. In some embodiments, one or more air pockets or negative spaces in inventive images may serve functions similar to or the same as other Separating Layers, e.g., used to increase an image's space and/or its light.

Separating Layers

If strength and permanence are important in an inventive image, it is generally preferable that all applications (e.g., all Separating Layers) are bonded to the inventive image. In some embodiments, fiber (e.g., stabilizer) may be used in Separating Layer(s) or the inventive images, e.g., for strength, bonding, aesthetics. Separating Layers can also be thick and/or include ingredients to enhance their strength. In some embodiments, Clarifying Imprimatura, surface preparation stabilizers and bonding substances are Separating Layers.

Further Description of Fiber

In some embodiments, fiber such as a glass fiber or a fabric, may be added within or onto an inventive image or part thereof as desired. All kinds of fiber can be used in inventive images. Examples are layered fiber, fiber strands, chopped fiber, continuous strand fiber, single strand or monofilament fiber, mixtures of different fibers; fibers with different kinds of binders, sizes, colorants, or a combination of these; glass fibers, fabrics, laces, gauzes, burlaps, metallic fibers, metal fibers, cottons, silks, synthetic fibers such as nylon and rayon, and open and closed weave fibers. Inventive images can even be made with a fiber made of conductive polymer. Fiber is often a stabilizer in inventive images.

Fiber can become part of an inventive image using any method, means, manner, or combinations of these. For example, fiber can be bonded to an inventive image, or to parts thereof, or tacking processes can join fiber to inventive images as desired. Bonding agents can bond fiber to inventive images, such as these examples. Bonding substances used to join fiber to inventive images may mechanically bond to the fiber by penetrating its strands or the open spaces in its weave, (thus they may or may not bond to that fiber in other ways, such as chemically). Bonding substances may bond chemically to fiber used in inventive images, e.g., to it strands, to its binder, to its size, or to a combination of these. In addition, fiber can be used as a separate part of an inventive image that is not bonded to the rest of it. Fiber can be added to a polymer of the present invention as desired. For example, fiber can be embedded within polymer layers or attached to external polymer surfaces, or both, either partially or entirely covering its surface area (though the use of fiber on or within external inventive image surfaces may be visible unless it is covered or hidden). Fiber can be used in inventive images in any amount desired, as consistently or as inconsistently as desired, throughout a polymer or part thereof to the extent desired, or throughout non polymeric ingredients to the extent desired. For example, cPRM may be used as a bonding substance. Fiber can be partially or entirely used in one or more internal layers of an inventive image, or on one or more of its external surfaces, as desired.

Thus, when strength and permanence are desired in an inventive image, it is generally preferable that fiber be used in it, preferably as a stabilizer, and particularly in its weak and fragile parts, unless that inventive image is already as strong and as permanent as desired, that fiber would conflict with other more preferred desires for that inventive image, or both conditions exist. Sometimes impermanence is desired; sometimes an inventive image made without fiber is strong enough to permanently endure as desired; and sometimes fiber alters an inventive image's aesthetic undesirably, for instance, a fiber within a very thin polymer that is desired perfectly transparent, might be undesirably visible.

In addition, fiber can be added to an inventive image for aesthetic purposes. For example, a stabilizer, a glass fiber, polyester fiber, silk, an electrically active or light emitting fiber, cotton, cheese cloth, lace, or burlap might be added to the polymer part of an inventive image for the aesthetic it provides. In another example, fiber can contribute to an inventive image's aesthetic by changing its optical character, such as the use of fiber stabilizer to decrease a polymer's transparency or its translucency, the use of fiber stabilizer to add a variety of densities of transparency, color, or both to a polymer, and the use of fiber stabilizer to make polymer that is transparent, translucent, opaque, partially opaque, less transparent or less translucent, as desired. The use of fiber might also add other light effects. Among examples are fibers that contribute a play of light and shadow, a blocking of light that is complete or partial, and light reflection, as well as the use of an electrically active or conductive fiber. The addition of a fiber to an inventive image or part thereof that is transparent or translucent that has a refractive index different from the refractive index of the image or image part it is in, can also produce a desirable aesthetic effect, e.g., a desirable effect using a fiber stabilizer in clear polymer. The means used to add fiber to an inventive image, or to part thereof, can contribute to its structure, its form, its strength, its permanence, its light, its color, and its other aesthetic aspects as desired.

When installations of fiber are completed or when inventive images are completed, it is preferable that uses of fiber in or on inventive images are: invisible to the human eye or as invisible as possible; aesthetically desirable, insignificant or not undesirable; or combinations of these (this includes the visibility of any matter on the fiber and of anything used to install fiber, e.g., bonding agents). Generally, the effects of adding fiber in an inventive image can be increased by increasing the thickness of fiber or its quantity. Generally, the effects of adding fiber in an inventive image can be decreased, to the extent desired, by decreasing the thickness of fiber or its quantity. For example, the plies of some fiber can be easily separated without incurring significant distortion or damage (e.g., simply by peeling them apart). It is sometimes preferable to add such single, ply fiber stabilizers in polymers of the present invention, rather than fiber with multiple plies. For instance, a single ply of fiber (separated from a multi ply fiber), might be preferable for use in a thin inventive image comprised only of polymer, in order to reinforce its strength its permanence, its resistance to cracking or a combination of these as desired, without affecting its transparency undesirably because a multiple ply fiber might be undesirably visible in this inventive image.

An inventive image may have as many layers of fiber and as much or as little fiber as desired. Use of fiber in an inventive image might be done in a wide variety of ways, as workably, as reworkably and as controllably as desired, and it can be very versatile in inventive images. Thus, fiber can usually be used as desired in inventive images without compromising other desired aspects of them, such as transparency, translucency, coloration, or other aesthetic qualities. For example, in forming a polymer inventive image with fiber stabilizer, image makers have enormous control over the resulting image by their selection of: a) the kind of fiber used, b) the quantity of fiber used, c) the number of layers or areas of fiber used, d) the size and shape of each fiber piece, each fiber layer and each fiber part; e) the fineness or coarseness of each fiber's strands, their length and continuousness, and whether or not they are woven as single strands (monofilament) or multiple strands, f) the tightness or openness of each fiber's weave, g) the fiber's binder, size, coloration, optical properties, stiffness, strength, its uniformity or the lack thereof, its cleanliness or lack thereof, any tears or holes in it, any clumps, irregular strands or irregularities in its weave, its resistance to undesirable changes over time, or the combination of these, h) the position of each fiber piece and each fiber layer in relation to the height, the width, the depth, the function, and the other specifications of its host inventive image, i) the position of each fiber piece and each fiber layer in relation to the external surfaces of its host inventive image, and j) the bonding agent used to add the fiber to the inventive image (such as cPRM or a paint). These specifications for fiber may not be consistent throughout an inventive image or part thereof, although they can be as consistent as desired. Furthermore, choices regarding fiber in inventive images or part thereof can be changed, as desired. The use of fiber within or on inventive images or part thereof, (e.g., the use of fiber stabilizers) can typically be workable, reworkable and controllable as desired, at any time (e.g., except when conventional practices used in inventive images restrict it as previously described). Reworking fiber stabilizers in polymer in an inventive image might, for example, involve subtractive processes like sanding polymer, adding new fiber (as reinforcement to previously installed fiber), adding a bonding agent such as new cPRM, reworking the surface over the installed fiber or combinations of these, as desired. Thus, use of fiber in inventive images or part thereof, may be VIMC.

It is generally preferred that fiber added to transparent or translucent inventive images, or to one or more transparent or translucent parts thereof, have optical properties, (e.g., a refractive index), substantially the same as its transparent or translucent host, provided this preference does not conflict with any other preference desired or needed for that particular inventive image, provided the fiber's visibility is not undesirable aesthetically. It is more preferred that any fiber added to a transparent or translucent inventive image, or to one or more transparent or translucent parts thereof, be as invisible as possible to the unaided human eye, provided this preference does not conflict with any other preference desired or needed for that particular inventive image. It is also generally preferred that fibers used in a transparent or translucent inventive images, or in one or more transparent or translucent parts thereof, have fine strands rather than coarse strands, and no clumps, tears, holes, foreign particles, or irregularities in either its strands or its weave, so that this fiber becomes as invisible as possible once it is part of the inventive image, provided this preference does not conflict with any other preference desired or needed for that particular inventive image or one or more particular parts thereof. Among the fibers that do become invisible to the human eye or almost invisible to the human eye in transparent or translucent inventive image, or in one or more transparent or translucent parts thereof, often have open weaves, have fine strands, are single strand or monofilament fibers, or a combination of these. For strength and permanence, fibers with continuous rather than chopped strands are preferred, and the longer the strands the more preferred. Fibers with open weaves are preferred in many inventive images. For strength and permanence, fibers with weaves open enough to bond mechanically with the bonding substance or substances (such as cPRM) used to install them in their inventive images are preferred. It is also preferable that the bonding agent that will be used to add fiber to an inventive image, bond to a binder that is already on the fiber.

For example, surfacing veil fiberglass is generally among those fibers most preferred for use in transparent or translucent inventive images, or one or more transparent or translucent parts thereof, provided this preference does not conflict with any other preference as desired or needed for that particular inventive image. For example, Nicofibers of Shawnee, Ohio offers the SURMAT® line. Examples of the specifications of SURMAT® fibers follow. SURMAT® may be made of continuous surfacing veil glass fibers that may be highly uniform with randomly distributed filaments. SURMAT® glass fibers may be made with a few different resin binders. Though they may all be thin glass fibers, the SURMAT® line may offer a wide choice of strand thicknesses, e.g., the SURMAT® 100 SF series of glass fibers may have 30% more filaments and smaller fiber diameter than the regular SURMAT® series of glass fibers. The plies of some surfacing veil fiberglass fibers, peel apart quite easily, without distorting or incurring damage, for those times when fewer plies or even a single ply is desired.

A few examples of exceptions to these preferences stated for transparent or translucent inventive images or one or more transparent or translucent parts thereof, include the use of fiber in an inventive image, that does not satisfy these preferences, but is desired or needed for purposes that are aesthetic, structural, functional, or a combination of these. For example, in an inventive image it might be more preferable to add multiple layers of fiber, to use coarse or heavy fiber, to use chopped fiber, to use other fiber that is discontinuous, to shape or distort fiber or to use fiber that is shaped or distorted, to make holes in fiber or to use fiber with holes, to use a fiber that is tightly woven, or a combination of these, e.g., to enhance the image's strength, permanence, aesthetic, function, or a combination of these, even if this fiber makes the image or part thereof less transparent or less translucent. The fiber needed and desired for specific inventive images or parts thereof can differ significantly.

Other preferred glass fibers are surfacing veil glass fibers by Owens Corning of Toledo, Ohio. Examples of these are Owens Corning's M524 C33 Surfacing Veil, e.g., with glass fibers that may be chemically-resistant and durable in both acid and alkaline environments; as well as a low solubility binder, a polyester resin formulated to be compatible with all commonly used resin systems (for example, compatible with all commonly used polyester, vinyl ester and epoxy resins systems) and most open mold processes. Owens Corning's M524 C50, C64 and C114 Surfacing Veils are further example, e.g., they may be made of glass fibers that are chemically-resistant and durable in both acid and alkaline environments, and they may have a highly soluble binder, a styrene-acrylic copolymer formulated to be compatible with all commonly used polyester, vinyl ester and epoxy resin systems, most open mold processes. Owens Corning's also offers ADVANTEX® Glass Fiber M524-ECR30S Surfacing Veil, e.g., bonded by a polystyrene resin that is highly soluble in styrene; which may have fibers produced from ADVANTEX® glass fibers that are highly resistant to attack in acid environments; which may be formulated for compatibility with all commonly used polyester, vinyl ester and epoxy resin systems, and most open mold processes; and which may be highly resistant to corrosion. Another example is Owens Corning's ADVANTEX® Glass Fiber M524-ECR30A Surfacing Veil, e.g., bonded by a silanated acrylate resin, a low solubility binder; with fibers which may be produced from ADVANTEX® glass fibers that are highly resistant to attack in acid environments; this surfacing veil may be formulated for compatibility with all commonly used polyester and epoxy resin systems, most open mold processes, and it may be compatible with vinyl ester resin systems; it also may be highly resistant to corrosion. Refer also to Owens Corning's milled fibers previously described herein.

It is preferred that fiber that is used in and on transparent or translucent inventive image be free of any undesirable matter, such as air bubbles, pigment, clay, dirt, bugs. If undesirable matter can not be completely removed from fiber, it is generally preferable, to substitute that fiber for new fiber that is completely free of all undesirable matter, before the fiber with the undesirable matter is in contact with the inventive image (e.g., with the bonding substance, such as with cPRM). If the fiber is not replaced, and its undesirable matter is not removed beforehand, it is preferable to remove it completely or as completely as possible, provided its removal is possible without undesirable effects, before that fiber is in contact with the inventive image. For example, if fiber immersed in cPRM has undesirable matter caught in its weave, it is preferable to remove this undesirable matter from it, prior to the gelation stage of polymerization. Methods of removing undesirable matter from fiber that is bonded to an inventive image may risk breaking the structural and aesthetic continuousness of that installed fiber, (e.g., its strands, its weave, or remnants of the repair may show) in a way that in some circumstances, may be difficult or perhaps even impossible to identically restore, though usually an acceptable restoration can be accomplished. For example, undesirable matter can be removed from inventive images, or from part thereof, using any process for removing matter desired. For example, undesirable matter can be sanded or carved out of polymer, and if its weave is broken several solutions are desirable. The broken fiber can be patched with new fiber. Chopped fiber can be added, such as over the seam of the fiber patch, instead of the fiber patch or over the entire fiber patch, a whole second layer of new fiber can be added, no fiber can be added, or combinations of these can be done. A bonding agent like cPRM can be used as desired over the broken fiber or over the restored fiber. Then, any carved indent can be filled and any surface detail can be restored, e.g., new cPRM and paint can be applied on top of the indent formed by the removal of the undesirable matter.

Generally, the deeper fiber is installed in a transparent or translucent inventive image, or in one or more transparent or translucent parts thereof (e.g., as a stabilizer within polymer), and the further it is away from its see through external surfaces, the less visible it may be. Generally, when fiber is installed within an inventive image, the closer that fiber is to one or more of its visible external transparent or translucent surfaces, the more plies comprising that fiber, the more superimposed layers or areas of that fiber, the thicker that installed fiber's depth of space (e.g., chopped fiber is not in layers), the coarser that fiber, and the more visible that fiber and any undesirable matter on it will be within the inventive image, e.g., within clear polymer.

It is generally preferable for fiber used with an inventive image, to be bonded with said image or with part thereof. Fiber can be bonded to an inventive image using any desired method, means, manner or combinations of these. It is generally preferable that the bond between fiber and its host inventive image be strong and permanent, unless this preference conflicts with other preferences for the inventive image. An example of an important exception to this preference is when the aesthetic desired or needed for an inventive image, or for part thereof, requires the use of fiber that may not bond to it, or the use of fiber that may not strongly bond to it, not permanently bond to it, or both. For instance this might be desirable when fiber is used as a separate component in the Compositional Arrangement of an inventive image made of multiple separate components.

When strength, permanence, reinforcement, lessening the likelihood of cracks, or combinations of these are desired in an inventive image, or in part thereof, it is usually preferred that fiber that is part of it (e.g., as a stabilizer within polymer) have specifications that make it as strong and as permanent as possible, provided this preference does not conflict with any other preference for the inventive image, e.g., aesthetic preferences. For example, it is generally preferable 1) that fiber have a weave with long continuous strands (they usually provide greater strength and permanence than other fibers such as fibers with shorter strands, frayed strands, discontinuous strands or combinations of these); 2) that fiber that is bonded to an inventive image, or to part thereof, be used in the least number of separate pieces possible, so that the fiber piece or pieces in the inventive image are as large and as continuous as possible; and 3) that the fiber is not distorted in an manner that weakens its structure (its strands or its weave are not pulled). In addition, when it is desirable that fiber install within or on an inventive image, neatly, flatly or precisely, and when transparency or translucency are desired, it is generally preferable for the fiber installed to be flat and neatly woven (e.g., rather than distorted, creased or pulled out of shape). It can often be difficult and even problematic making fiber that is not flat or neatly woven, install flatly, neatly or precisely, and fiber that is not flat and neat, often is either visible or more visible than it would have been if it were flat and neat.

In an embodiment, thin fine fiber (such as a surfacing veil fiber) may be prepared to be bonded within or under a transparent or translucent inventive image, or one or more transparent or translucent parts thereof (e.g., as a stabilizer within polymer), in such a way that the fiber may be invisible or nearly invisible to the unaided eyes of viewers. Thin fine fibers generally vary in their ability to become invisible or nearly invisible to the human eye within and under polymer. This variance continues in considering the invisibility of thin fine fibers within and under transparent and translucent non polymeric ingredients in inventive images. The thin fine fiber used in this embodiment, is the most preferable fiber among those fibers that can become invisible or nearly invisible when they are installed within or under a specific inventive image surface. The fiber installed in this embodiment may be installed under at least enough of its host's nearest external visible surface, to be entirely covered by its host and it is often preferable that it be installed even further below its host's nearest visible external surface so that this fiber will be as invisible as it is capable of becoming in its inventive image. The depth that the thin fine fibers of this embodiment may be installed beneath their host's nearest external surfaces in order to become as invisible as they are capable of or in order to become nearly invisible varies. It is preferable to install the fiber in this embodiment under its host's external surface at least as deeply as it takes to make it as invisible as it can be, or nearly invisible to the human eye. In addition, often, in order to become invisible or nearly invisible, fiber must be penetrated by its bonding substance or substances. This or these bonding substances might make up the external surface of the inventive image or part thereof. For instance, it can take at least a quarter of an inch of a cPRM to completely penetrate into and cover over a flat layer of one preferred thin fine fiber stabilizer, so that it becomes nearly invisible to the human eye, but it can take a little thicker layer of cPRM for this fiber to become completely invisible. Examples of inventive image surfaces within or under that thin fine fiber often may need to be completely penetrated by one or more bonding substances in order to become invisible or nearly invisible, are surfaces that are transparent and colorless, surfaces that are very transparent, and surfaces that are transparent and thin. Many colored and translucent inventive images hosts can often hide the visibility of thin fine fiber, particularly if they are dark, or dense. However, completely penetrating the fiber with its bonding substance or substances, is preferred both for reducing the visibility of fiber in many see-through inventive image hosts, and for strength, for permanence or both in many inventive images. As further examples, fiber that is deeply within or under thick transparent colored host surfaces of inventive images or darkly colored transparent or translucent host inventive image surfaces, might not need to be completely penetrated by a bonding substance or substances in order to become invisible or nearly invisible within their hosts. Also, fiber used in this embodiment can be installed on all external inventive image surfaces that may not be visible to viewers, e.g., the back sides and under sides of inventive images.

It is preferred that the thin fine fiber used in this embodiment may be cut neatly into one or more straight edged pieces, rather than ripped or torn. When it is ripped or torn, thin fine fiber may distort undesirably and it can also be weakened. If thin fine fiber installed within an inventive image or within part thereof, is completely invisible or nearly invisible to the unaided human eye, then it is usually unlikely that straight edges on its fiber pieces formed by cutting will be invisible or nearly invisible too. It is preferred that each of these fiber pieces may be as large in size as possible, so that as few separate pieces of fiber are installed as possible. But, it is more preferable to use more than one fiber piece when a single piece of fiber would need to be pulled or stretched undesirably, or even folded over upon itself undesirably, in order to lay as flatly and as invisibly as desired on its host inventive image surface. For example, when a single piece of fiber will not lay flatly on a sloping polymer surface unless it is pulled, stretched or folded over upon itself, it is generally preferable to use two or more separate pieces of fiber instead of one single piece of fiber. In addition, adjacent pieces of fiber that are cut to be laid contiguously should preferably be large enough to be installed with their edges overlapping, rather than contiguous.

In some embodiments, heavy fiber is unlikely to distort undesirably when ripped or torn and straight cut edges of heavy fiber can often be seen within a transparent or translucent inventive images, e.g., when used as a stabilizer within clear polymer. Thus, irregular, feathered edges, such as edges made by cautiously ripping or tearing fiber, are generally preferable for installations of heavy fibers within transparent or translucent inventive images. When strength, permanence, reinforcement, lessening the likelihood of cracks, or a combinations of these are desired, and pieces of fiber are being installed adjacent to one another in an inventive image, or in part thereof, it is preferable to overlap their adjacent edges, irrespective of the specifications of their edges.

In an embodiment, one or more bonding substances are used to bond fiber to an inventive image, or to part thereof. Among bonding substances, the same cPRM or a bonding cPRM are among the most preferred for strongly and permanently bonding most kinds of fiber (e.g., glass fiber) to polymeric or non polymeric inventive image surfaces. Another preferred bonding substance may be any substance or any combination of substances that bring a desired effect to an inventive image, e.g., a desired aesthetic effect.

In some embodiments, though one or more substances are used to add fiber to an inventive image surface, one or more additional bonding methods are used to make this connection. For example, because one or more of the substances used to add the fiber to the inventive image surface does not bond to that surface or does not bond to that surface as strongly as desired or as permanently as desired, or though one or more of the substances used bonds to that surface, one or more other bonds are formed that also bond it to that surface, e.g., to fortify the first bond. As an illustration, an inventive image surface is changed in such a way that a bond, between it and fiber applied on it with a substance, is formed or fortified. Examples of substances that might be used though they might not bond fiber to polymer surfaces are incompatible cPRM, glues, and materials and media for painting. Examples of preferred ways of changing these polymer host inventive image surfaces to form or fortify a bond are all processes for forming surface irregularities, bonding spots, and surface preparation stabilizers. A further example is non polymeric applications on these inventive image surfaces, that bond both to these inventive image surfaces and to the substances desired for use in installing the fiber on the inventive image as desired, e.g., an application of a mixed polymer that will bond to both the inventive image surface and to the substance desired for the fiber's installation. Combinations of the processes described in these examples might be used as desired. When the fiber's installation is complete or when the inventive image(s) in this embodiment are complete, it is preferable that changes made to the inventive image surfaces in this embodiment, are not visible to unaided human eyes; that they are aesthetically desirable; that they are aesthetically insignificant or not aesthetically undesirable; not significantly visible; or a combination of these.

Fiber bonded to inventive image surfaces (e.g., fiber stabilizers bonded to polymer) can become partially or completely internal within these images if desired, e.g., by superimposing them with one or more substances or attachments, such as cPRM, paint or a photographic transparency. When installing fiber, it can be wet, penetrated and superimposed as desired. However, as described previously for the purpose of making fiber become as invisible as possible, it is generally preferable to wet, to penetrate and to superimpose fiber completely with at least a slight layer of a bonding substance or with another material or medium. Though fiber is generally installed on an external inventive image surface, it is often preferable for it to become internal within the image by covering it over completely (e.g., with one or more additional layers), unless this preference conflicts with another preference for that inventive image such as an aesthetic preference. It is generally preferable to install fiber internally if its aesthetic contribution to the inventive image is not desired, such as when transparency or translucency, or easy continued control of transparency or translucency is desired in an inventive image. If the aesthetic contribution of fiber installed under a transparent or translucent inventive image surface is not desired, it is preferable to install that fiber as deeply as possible beneath that surface as aesthetically necessary (provided it is possible, e.g., structurally and functionally). But, when strength or permanence are desired in an inventive image (e.g., in polymer), it is generally preferable to position its fiber substantially medial within an inventive image's spatial depth. For example, it is often preferable to install fiber stabilizers substantially medial within polymers, particularly if they are thin and large, if their use requires some strength, permanence or both; if they are valuable; if the fiber will not be visible or undesirably visible; or combinations of these. Or as a more specific example, if one of these polymers is very large and thin, and strength or permanence are necessary but the specific fiber stabilizer that must be used within it will not become as invisible as desired, it may be most desirable to thicken this polymer installing the fiber within it, but perhaps towards its backside or underside rather than precisely medial within it (perhaps making other slight alterations also, e.g., tapering its edges so that its increased thickness may not be seen easily). In addition, or instead, it may be most desirable to install such a fiber stabilizer on or just beneath the back side or underside of this polymer. Combinations of these might be considered preferable to not using any fiber or to using a different fiber.

In an embodiment, fiber may be bonded to an inventive image as desired, using only one or more kinds of hardware, object, device, instrument, or other such means, e.g., using wire, screws, tape, clips, rubber bands, fabric, or string. In another embodiment fiber is bonded to an inventive image as desired using a combination of a bonding substance, and some kinds of hardware, object, device, instrument, or any other such means. In an embodiment, fiber may be held on an inventive image by gravity, but if this fiber becomes internal within the inventive image in a negative space or an air pocket, it may no longer held in place by gravity alone. In many embodiments, fiber is added to polymer during its formation using any method, manner, means or combinations of these.

In an embodiment, a fiber stabilizer is added to wet cPRM while it is still liquid enough for that fiber to sink down into the cPRM as desired. Thus, in this embodiment, fiber is added to cPRM before it is far enough into the gelation stage of its polymerization, to prevent added fiber from sinking down into it. Added fiber might sink down in the cPRM to any position (e.g., any depth and any angle). The sinking of this fiber can be controlled or left uncontrolled as desired, e.g., using any method, means, and manner as desired. Sometimes the position that the fiber stabilizer sinks down into the cPRM in this embodiment can be controlled or partially controlled. These are examples of some further ways that might be used to completely or partially control or try to control the position in which fiber are added to cPRM. Control over the position of fiber added into cPRM might be gained using the VIMC. For example, some monomers are more viscous than others even before they are catalyzed, (such as, thixotropic monomers, old uncatalyzed monomers that have thickened with age). Other ingredients added to the active ingredients in cPRM, such as coloration (e.g., dry powdered pigments, particles), or other stabilizers, can also thicken cPRM and obstruct the free movement of fiber within it.

In many embodiments, it is desirable to have the bonding substance (e.g., cPRM) wet fiber enough to form a strong bond between it and its inventive image surface once it cures, hardens or dries. When possible, it is generally most preferable for the bonding substance to penetrate the fiber completely, fully saturating both its weave and its strands. Often this requires human assistance. However, completely saturating fiber with its bonding substance is not always necessary to bond that fiber to an inventive image surface as strongly and permanently as desired.

In an embodiment, fiber is attached to an inventive image surface using a bonding substance, e.g., a compatible cPRM bonds a fiber stabilizer on polymer. The fiber in this embodiment might be just wet by the bonding substance in multiple scattered areas that bond it as desired to an inventive image surface (e.g., in bonding spots or tacks both described herein, or even in lines that form a pattern, text or a drawing). For instance, this fiber might be laid on areas or spots of wet bonding substance that have been applied to an inventive image surface. Alternately, if the fiber used in this embodiment has a loose or open weave, or if it is easily saturated by the bonding substance used, it might be laid on the inventive image surface and its bonding substance might be applied over it in areas, spots or lines as desired that penetrate through this fiber enough to bond it as desired to the inventive image surface (e.g., thin fibers can often be easily saturated, often even if they are tightly woven). Combinations of these processes might be used wherein the bonding substance is first applied directly on the inventive image surface as desired, the fiber is laid on this surface, and then more of the bonding substance is applied in as desired over the fiber.

In many embodiments, it is often desirable to completely saturate fiber with its bonding substance, e.g., because this will enhance the strength, or permanence the inventive image, to a greater extent than incompletely saturating it can. It may be preferable to completely saturate fiber with its bonding substance for functional or aesthetic reasons. Often this complete saturation does not occur just by placing fiber on a bonding substance, or by applying some bonding substance on fiber. It is often desirable to help bonding substances like cPRM seep completely into a fiber by pushing or pressing the fiber in the wet bonding substance. Preferred tools for this process are often blunt hand held tools, such as a clean blunt tongue depressor, or a clean blunt utensil. This pushing or pressing of the fiber can also secure it down as flatly and as evenly as desired (e.g., as flatly and as evenly it will go) on many inventive image surfaces, though inventive image surfaces vary greatly. Sometimes there is enough of the wet bonding substance applied to fully saturate and completely cover over the fiber as desired. Once this is done, the fiber may not add texture to the inventive image surface, some fine, thin fibers will become invisible or almost invisible, and other fibers will become less visible or they will change color. But because more of the bonding substance or other superimpositions (e.g., other bonding substances) can usually be added as desired, fully saturating the fiber as desired and covering it over as completely as desired are usually not priorities that must be addressed or attained until after the fiber has first been attached to the inventive image surface. However, saturating the fiber as desired, covering over the fiber as completely as desired, and additional superimpositions are often priorities, often once the fiber's bonding substance has cured, hardened or dried, attaching the fiber to the inventive image surface in some fashion. For instance, these are priorities, for aesthetic or functional reasons and also to enable the inventive image to be as strong and as permanent as possible, fiber is often strongest in an inventive image when it is positioned substantially medial within the image's depth.

Another reason to push and press down the fiber into its wet bonding substance is to adjust its position as desired, and to release any undesirable trapped air bubbles as desired e.g., to press down any undesirable fiber irregularities, such as protruding or irregular strands of the fiber.

In embodiments, a bonding substance is used to add fiber onto a polymer surface (e.g., as a stabilizer), or onto another inventive image surface.

In a preferred embodiment, fiber (e.g., as a stabilizer), is add to polymer as it is being formed. In this embodiment, fiber may be placed on wet cPRM, after it has reached the gelation stage of its polymerization and it is firm enough so that fiber added to it can not sink down in it undesirably (e.g., sinking to its bottom surface such as to its mold's surface).

In a further embodiment, fiber that is bonded to its inventive image surface is superimposed with just enough of one or more bonding agents, other materials, media, objects, devices, processes, or interactions; or a combination of these, to completely cover that fiber over and fully embed it. In another embodiment, the position of a layer of fiber within an inventive image surface, is altered or the surface over it are superimposed. For example, this embodiment can be used to make fiber substantially medial within an inventive image's depth. In another embodiment, an inventive image or part thereof are made by placing fiber (e.g., as a stabilizer), at the bottom of a mold or other casting surface and superimposing cPRM or another bonding agent as desired.

In an embodiment, two or more layers of fiber are superimposed within an inventive image, e.g., as stabilizers within a polymer. In some embodiments fiber is used as desired, within or on one or more non polymeric ingredients that are part of an inventive image (with or without cPRM added).

In an embodiment, tightly woven fiber is used in an inventive image, or in part thereof. For example, applying a bonding substance over a tightly woven fiber that is resting on a dry inventive image surface can adhere it to that surface if the bonding substance can penetrate the fiber, or if the bonding substance can connect directly to some or all of the inventive image surface that the fiber is upon. But this method may not bond the tightly woven fiber to its inventive image surface as well, as completely, or as evenly as desired. Bonding substances may not seep through tightly woven fibers as well as they can penetrate and saturate fibers with open weaves. Thus, in this embodiment it is generally preferable to apply the bonding substance to the dry surface or to the backside of the fiber, and then place this fiber onto and perhaps into its inventive image surface. Thereafter, further work can be done on the exposed side of the tightly woven fiber as desired, e.g., further bonding substance can be applied on top of the fiber for example, to alter its appearance if it is possible and to embed it into the inventive image as desired.

In some embodiments, fiber on a polymer inventive image surface serves as a surface preparation stabilizer that is then superimposed. Thus, the fiber surface preparation stabilizer might for example be used for the mechanical bond it provides with one or more superimposed parts, layers, applications, or a combination of these, such as superimposed coloration, photography, collage, other marks (e.g., pencil, ink, writing), or a combination of these. Polymers with such surface preparation stabilizers might be image supports, e.g., that may be stabilizers. The use of various kind of fiber and various methods of joining the fiber and polymer can give inventive images special effects, e.g., of color, light and strength.

In some embodiments, one or more fibers are used as an initial image support or as part thereof to make an inventive image. For instance, layers of cPRM are applied on one or both sides of a fiber stabilizer forming a 2D or 3D inventive image that may or may not be further processed, e.g., with superimposed coloration.

In some embodiments, it is sometimes desirable to use fiber (e.g., glass fiber) as part of a bond in inventive image, or to fortify a bond in inventive image, e.g., as reinforcement. For example, fiber can be used around parts, over parts or through parts to connect them. Fiber can be used in, under, or over connection seams, bonding spots, tacks, and other joints. Fiber can be used to add a mechanical bond where another bond may form also, e.g., in Separating Layers. Fiber can be used to bond attachments that already have some other way of bonding, to secure an inlay or the inventive image surface it is in, and fiber can be used to reinforce embedding (on the embedded item or in the area around it).

In a preferred embodiment, an inventive image, or part thereof, are strengthened by the installation of fiber positioned across one or more weaknesses in it (preferably perpendicularly).

In an embodiment, one or more materials, media, objects, devices or their combinations other than fiber are used across (preferably perpendicularly), and/or around a weak inventive image or part thereof, with or without the use of fiber, or cPRM. For example, a screw tape, glue; a bracket, wire or other hardware, etc. might be used across or around a weak inventive image part, to strengthen it and make it more permanent.

In an embodiment, fiber is added to an inventive image that hangs off of it.

In an embodiment, fiber is tacked to an inventive image surface, just securely enough to hold it in place, such as to hold fiber in place temporarily, e.g., using a bonding agent such as a clamp or a touch of cPRM. The slight connection with which tacking holds fiber in position, can for example, enable fiber to be easily moved and changed while the inventive image is contemplated and changes are made to it as desired. This tacked fiber might be fully bonded to its surface just as it is tacked as desired, or it might be altered as desired (e.g., the parts it holds may be moved into a different position) and then filly bonded to its surface as desired, or this tacked fiber might be removed from its surface as desired partially or completely. As another example, fiber might be tacked to the inventive image surface for convenience, or as an aid to further processing. For instance, fiber might be tacked to hold it in the desired position on an inventive image surface on which this fiber might not otherwise be able to stay in place as desired, to lay flatly as desired, or combinations of these, e.g., fiber laid on a steep slope, a sharp angle, over a bump, over an embossed area, in an indented area, or in an engraved area on the inventive image surface may need to be tacked so that it will stay in place as it is bonded to the inventive image surface as desired. Or as another illustration, fiber might be tacked to a polymer as a surface preparation stabilizer, e.g., for a superimposed underlayer, to bond another layer to the inventive image, or both.

Air Bubbles

In many embodiments, air bubbles can form in PRM or cPRM that may or may not be desirable in the polymer formed. But typically they can be worked, reworked and controlled as desired. Air bubbles can also form in inventive image parts that are not made or not principally made of polymer of the present invention, e.g., in glass, paper inventive image parts, in paint applications on inventive image such as paints and mixtures, etc. These may or may not be desired in the inventive image and these may or may not be as reworkable or as controllable as desired, e.g., removable. For instance, in PRM or cPRM air bubbles may form: a) when PRM or cPRM is stirred, poured, brushed or applied, b) within and around fiber, within and around polymer in the PRM or cPRM, and within and around non polymeric ingredients, c) or a combination. For example, air bubbles frequently occur in and around open weave fibers used with cPRM, and under tightly woven fibers used with cPRM. cPRM with air bubbles can also harden so quickly that the air bubbles will not release, its air bubbles will not release as desired, or most or none of its air bubbles release. Among the methods of reducing, controlling, or eliminating undesirable air bubbles in PRM or cPRM, or all air bubbles in PRM or cPRM are the use of one or more stabilizers or the use of a vacuum. For example, there are stabilizers made for this purpose (refer to the examples provided herein).

It is generally preferable to watch out for undesirable air bubbles when installing fiber and other materials, media, objects, devices, processes, interactions, or their combinations in or on inventive image. Further, it is generally preferable to avoid or to eliminate undesirable air bubbles before they permanently form in inventive image, particularly if they are large, visible, positioned so that they lessen the level of strength or permanence desired. Air bubbles might be undesirable within inventive image for various reasons e.g., aesthetic, structural and functional reasons, such as interfering with the desired transparency or translucency, other light effects, coloration, aesthetic details, overall aesthetic effect, or combinations of these. Beyond the use of stabilizers and vacuums to rid PRM and cPRM of undesirable air bubbles, when there are lots of small air bubbles in an inventive image, it is generally undesirable and often difficult to remove every single one of them.

Sometimes, more air bubbles get trapped in or under fiber and other materials, media, objects, devices, or combinations of these, when these are dry and they are joined to a dry image surface with a bonding substance applied over them. Air bubbles also tend to form when a bonding substance is unable to seep into or through fiber or other non polymeric ingredients (e.g., when a tightly woven fiber is installed in an inventive image). In comparison, when fiber, and other embedded or attached materials, media, objects, devices or their combinations are placed on or into an image surface that has first been wet by its bonding substance, often few air bubbles form if any, and the air bubbles that do occur, can usually be removed as desired, before the bonding substance cures, hardens or dries. Air bubbles can also be removed from hardened polymer and other formed materials and media in inventive images. For example, any process for removing matter from polymer might be used, such as sanding or carving, e.g., undesirable air bubbles in polymer can be opened, then refilled as desired and restored as desired.

Figure 72:
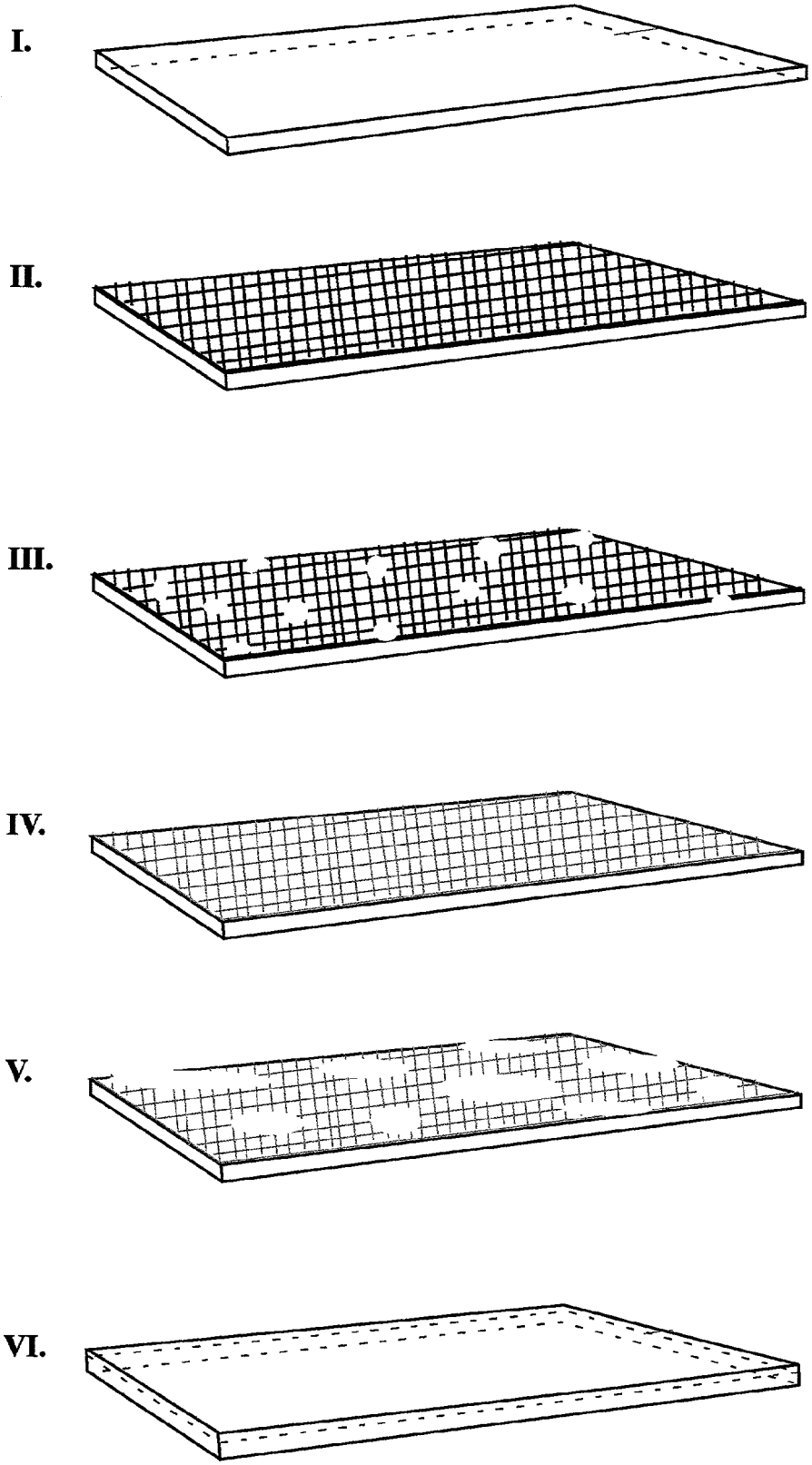
FIG. 72 shows examples of the process of adding fiber to an inventive image.

FIG. 72 shows an example of the addition of a layer of fiber made of a single piece of fiber on or in a polymer inventive image or image support which might be transparent and colorless. Some or all of the steps shown in this illustration may be used. Though all of the stages of this illustration are shown without the use of a mold or temporary mold walls, these may be used as desired, e.g., a mold or a temporary mold wall around the perimeter of this inventive image may be preferable, for example, if the thickness of cPRM applied over the fiber is substantial. FIG. 72.I. shows a layer of gelled cPRM or hardened polymer that might be an image support stabilizer. Next, FIG. 72.II. shows a single piece of fiber laid on the surface of this cPRM or polymer in a single layer. This fiber is clean, it is flat, and shows no other irregularities (e.g., irregularities might have been removed). If the inventive image surface is gelled cPRM, this fiber would stick to it, e.g., becoming a surface preparation stabilizer. This fiber would also stick to this surface if it is a dry formed polymer covered with a bonding substance, e.g., a thin layer of the polymer's cPRM on the polymer surface and the fiber stabilizer laid into it. Alternately, this fiber may be just placed on a dry polymer surface, without any bonding substance. This fiber installation can stop here if desired. Alternately, proceed to the stage in FIG. 72.II., it can skip III. and go to IV., or it can go directly to VI.

FIG. 72.III. shows spots formed on this inventive image, joining this fiber to it by using cPRM or another bonding substance in spots that penetrate and embed the fiber enough for it to become invisible to the eye in those spots. This fiber may for example, be a surface preparation stabilizer. This third step is optional. If this fiber is on gelled cPRM, or if this fiber is on a bonding substance applied on the polymer surface, these spots may be: 1) places in which the wet cPRM or other bonding substance penetrated the fiber layer enough to embed spots (that might occur spontaneously or due to pressing the fiber down); 2) spots embedded because more cPRM or another bonding substance was applied over the fiber in these areas; or 3) both. If this fiber was laid on a dry polymer surface without anything in between, these spots might be tacks of cPRM or another bonding substance over the fiber to embed it in selected spots. This fiber installation can stop here if desired. Alternately, skip the stage in FIG. 72.IV., proceed to the stage in FIG. 72.V. or to VI.

FIG. 72.IV. illustrates two different fiber installations. Either this illustration shows the fiber layer completely embedded in the inventive image by the application of a complete layer of cPRM or another bonding substance over the fiber and the particular fiber used is not capable of becoming completely invisible to the human eye, e.g., the strands of this particular fiber are too thick to become invisible in translucent colorless polymer. Or, this illustration shows the layer of fiber completely saturated with cPRM or another bonding substance thus the fiber is stuck to the image, but it is not completely embedded in it, e.g., the fiber's weave is not completely covered by cPRM or polymer. Thus fiber that may be able to become invisible to the human eye when it becomes completely embedded in the image, is still visible. If this effect is desirable, the installation of this fiber can be complete now. Alternately, it can proceed to the stage in FIG. 72.V. or it can skip to stage VI.

FIG. 72.V shows that once a further application (e.g., of cPRM or of another bonding substance) is made in spots on the fiber layer of this inventive image, this fiber layer becomes invisible to the human eye in these spots. For example, the applications in these spots on this inventive image add additional thickness over embedded fiber enabling it to become invisible in these areas, or the applications in these spots on this inventive image embed its fiber completely in these selected areas leaving the rest of the fiber, completely saturated with the cPRM or other bonding substance, completely attached to the inventive image and perhaps somewhat embedded in it, but not fully embedded in it. If this effect is desirable, the installation of this fiber can be complete now. Alternately, it can proceed to the stage in FIG. 72.VI.

FIG. 72.VI. shows the entire layer of fiber completely embedded within the inventive image such that it is no longer visible to the human eye. For example this might have been done by applying enough cPRM or another bonding substance over this fiber to fully embed it and preferably tapping undesirable air bubbles out as described herein. The dotted line on the inventive image in this illustration denotes the position of the fiber, not exactly medial within its depth, but close so that this image will be sufficiently strong and permanent for its use. This image can be further processed if desired, e.g., it can be thickened.

FIG. 69 shows the optional use of fiber over the connection seam that is formed to join two separate inventive image parts together. FIGS. 69.c.i.b. and c.ii.b. both show a piece of fiber laid on and in the bonding substance (e.g., cPRM) that is in the negative space in between two inventive image parts being joined (all of which is held in position by the use of a temporary mold shown in black). If fiber is installed on or within this connection seam, it may for example be installed as shown in either FIG. 69.c.i.b. or 69.c.ii.b. The difference between these two options is that the fiber piece installed in FIG. 69.c.i.b. overhangs the image, while the fiber piece installed in FIG. 69.c.ii.b. is neatly cut and sized so that it fits over the image's connection seam without overhanging the image. Though in this illustration, the overhanging fiber is rendered over the version of this inventive image in FIG. 69.c.i.a., it could have been put on the version of this image seen in FIG. 69.c.ii.a. and fiber that does not overhang the inventive image could have been used on FIG. 69.c.i.a. Regardless of which option is used, the fiber can be attached to the image over the connection seam and left as such if desired, visible on the image. Provided the fiber used is capable of becoming more invisible or completely invisible to the human eye within the bonding substance used to make the connection seam, the fiber can be completely embedded within the inventive image by the bonding substance, so that it does become more invisible or completely invisible to the human eye as is in FIGS. 69.d. and e. Once the connection seam forms and the mold is removed, the resultant image can look like either FIG. 69.d. or e. because if an irregular piece of fiber was used, its overhanging edges can be cut or sanded off as desired (the irregularity in FIG. 69.d. is not due to its fiber).

Further Description of the Use of Space in Inventive Images

Space can be used in inventive images in any method, means, and manners, desired, many examples are described herein. Unlike many other conventional practices, all polymer have real, spatial depth that can easily be used as desired, e.g., for its aesthetic, structural and other purposes. The spatial depth of polymer inventive images can typically be developed, reworked and controlled as desired, throughout the process of creation and forever afterwards. The real spatial depth of polymer can give inventive images a new form of light, transparency or translucency. In different embodiments, one or multiple kinds of spatial depth can be used, as desired in inventive images.

In many embodiments, one or more textures can be made on inventive images or part thereof, using any methods, means, and manners desired. In a single inventive image, one or more textures can be on polymeric or non polymeric inventive image surfaces. An unlimited variety of real textures can be made on one or more polymer surfaces as desired, e.g., rough coarse textures, precisely controlled textures, textures with deep relief, textures that are transparent or translucent, textures with non polymeric materials and media and objects, textures with fine details, polymer surfaces can be as smooth as desired, or a combination of these.

In embodiments, image makers can have total control, as much control as desired, or as little control as desired over the use of textures on inventive image or part thereof. Textures on cPRM and polymer can typically be as workable, reworkable, and as controllable as desired, e.g., made in a process that is preplanned, WYSIWYG, spontaneous, accidental, or combinations of these. The use of real textures in inventive images can create a myriad of qualities and effects, that are typically as workable, reworkable and controllable, and as strong and as permanent as desired, depending on the use of non polymeric ingredients, e.g., affecting their space; their form, their structure, their permanence, their light qualities and effects; transparency or translucency; textures can alter surface qualities such as matteness or glossiness; textures can alter color, etc.

These are examples of texture on inventive images. FIGS. 5.VI. and VII. show inventive images with texture like that of conventional canvas, fabric or paper that might for example have been formed by a mold, or an attachment (e.g., attached canvas, paper or fabric). FIG. 5.IX. shows an inventive image with texture that might, for example, have been formed using either a mold or subtractive process such as sandblasting or incising.

FIG. 5.X. shows an inventive image, the dotted areas of which might represent indented areas of this image's surface, raised areas of its surface or both. FIG. 6, shows an inventive image that might, for example, be made as a raised or indented linear texture on a polymer plane, e.g., wire or string attached to polymer, embossed polymer surface, or both. FIGS. 15.a.-c. shows inventive image(s) with texture created because their forms were made by connecting alternating differing parts. FIG. 18.b. shows an inventive image with texture on its right side, e.g., that was cast or that was formed by connecting multiple triangular or pyramidal shapes. FIG. 21, shows an inventive image with texture that might be particles, such as flakes, glass or plastic spheres, beads, paper, metal, etc. These particles might for example be stuck to the gelled cPRM on this image's surface before it hardens, they might be adhered to this image's surface using any other bonding substance, or both. FIG. 33 shows a painted inventive image in a cross section or side view with embossed and indented texture on both sides. FIG. 34 shows an inventive image in a cross section or side view with embossed texture on both its sides. FIG. 35 shows an inventive image in a cross section or side view with indented texture on both sides, e.g., carved, cast or both. An inventive image might also have texture from objects which have indented its cPRM, e.g., during gelation. FIGS. 67. shows an inventive image with texture from the overlapping layers used to form it. FIGS. 71.III. shows an inventive image with texture made using multiple temporary molds. FIGS. 72.III.-V. show an inventive image with texture from attached fiber.

In some embodiments, embedding is done within the real spatial depth of inventive images. A tremendous variety of subjects can be embedded into inventive images, examples are described herein. Polymeric or non polymeric embedments can be made in polymeric or non polymeric areas of inventive images using any methods, means or manner desired. In general, two examples of preferred methods of embedding in a polymer are as follows. In an embodiment, one or more non polymeric ingredients are added into either PRM that is then catalyzed, or added into cPRM forming a homogeneous or heterogeneous solution or dispersion. One or more non polymeric ingredients might be added directly into PRM, or into one or more of its ingredients as desired, at any time before it hardens too much for the desired result.

When embedding in an inventive image or part thereof, and strength, or permanence are important, the encasing formed around subjects by their host is often a sufficient bond, particularly if each subject embedded is small in size, or if it has a coefficient of thermal expansion that is close to or the same as the host part it is embedded in. In addition to the mechanical bond formed by embedding, some embedded subjects bond further to their host part. For example, a mixed cPRM might be used to augment the bond formed by embedding a polymer piece into a host polymer part of an inventive image with which it does not bond chemically. Such a mixed cPRM could, for example, be a stabilizer that contains the monomers of both of the two different polymers, as well as the catalysts appropriate for polymerizing them. Stabilizers may be used with embedding as desired e.g., for strength or permanence. For instance, a light fugitive material might be coated with an UV light stabilizer before it is embedded in a transparent host part of an inventive image.

When embedding in inventive images, or part thereof, some subjects (e.g. materials, media, objects, devices, etc.) change undesirably or risk being changed undesirably for example, by the process used to embed them, by contact with their host part, by being embedded over time, or by a combination of these. For instance, some materials are changed by heat from the polymerization reaction, such as embedded wax melting. Changes might occur in other materials and media that become saturated with the medium of their host part, such as an embedded leaf that discolors and changes in form once it is saturated by cPRM. Many solutions exist, which may be desirable. For instance, non polymeric ingredients (such as fiber stabilizer) can be used if desired to reinforce and strengthen embedded items, or their host parts as desired, e.g., embedded items might be sealed, or coated with a material or medium that serves as a stabilizer protecting them from undesirable changes, such as sealing a embedded leaf with a colorless, transparent or translucent polyurethane varnish.

If the strength or permanence of an inventive image are important, it is sometimes preferable to reinforce embedding. For instance, embedded items or the host part in which they are embedded might be reinforced. Embedding can be reinforced any number of ways, e.g., using fiber, for instance, under, over, or around embedding; or by thickening the host of the embedding.

Figure 28:
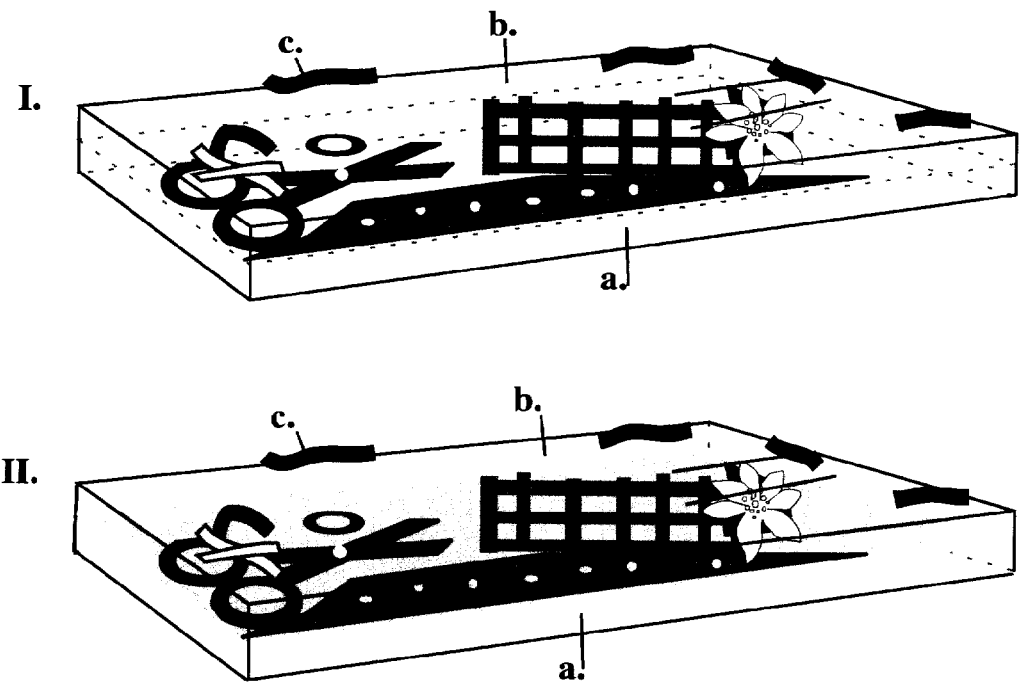
FIG. 28 shows an inventive image made in layers with embedded objects and materials.
Figure 29:
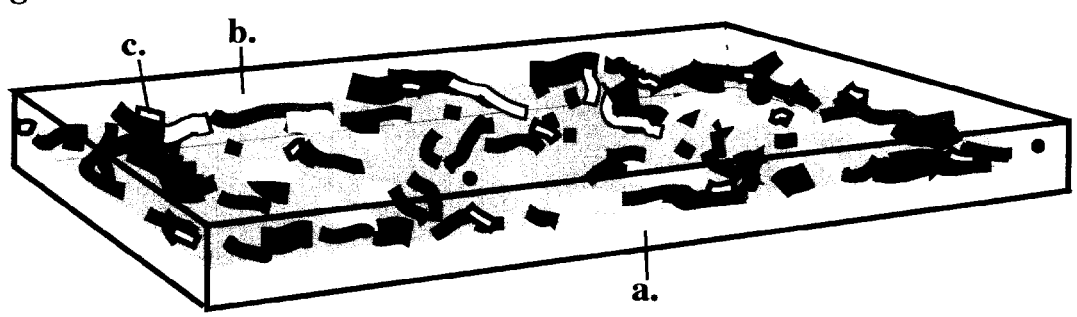
FIG. 29 shows an inventive image made in layers with embedded coloration.
Figure 30:
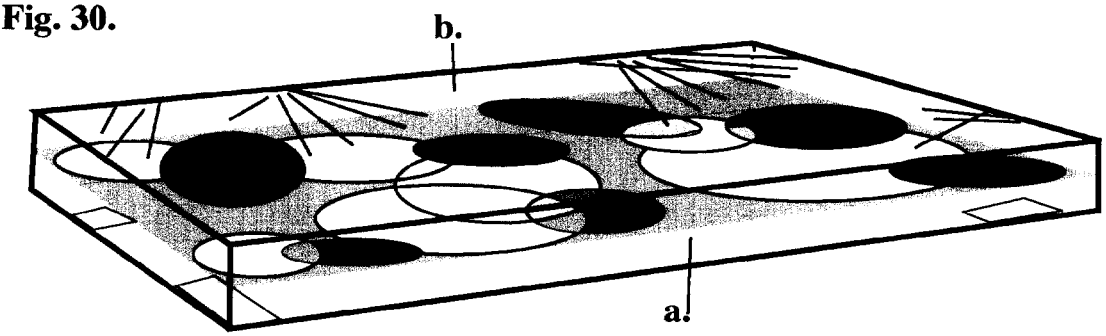
FIG. 30 shows an inventive image made in layers with embedded coloration.

The inventive images in FIGS. 28-30 shown in three quarters views, are all made of at least these three superimposed layers: 1) a bottom layer marked a., that may be polymeric or non polymeric, 2) a central non polymeric layer with bonding spots, and 3) a top layer of transparent colorless polymer marked b. The inventive images in FIGS. 28.I. and .III. have non polymeric embedments within their central layers, each item of which relies on its perforations or its encasement to bond to the layer above and below it. The perforations on the embedment in one or both of these inventive images might for example, serve as bonding spots between two layers that bond to one another, e.g., if layer a. and layer b. are made of the same polymer, if they are made of different bonding polymers, or if layer a. is non polymeric but it bonds to the cPRM of layer b. If on one or both of the inventive images, layer a. and layer b. do not bond to one another or do not bond as well as desired, bonding them requires further processing. For instance such further processing might involve forming SSI on these surface areas, or using an intermediary bonding substance that bonds to both layer a. and layer b. For example, if layer a. is smooth glass, SSI formed on these surface areas will enable them to become bonding spots that the cPRM of layer b. bonds to when superimposed. If layer a. is made of a polymer that does not bond or bond as well as desired, to a different cPRM superimposed upon it to make layer b., an intermediary bonding substance (such as a mixed cPRM stabilizer, a glue or another cPRM) might be applied in the bonding spots.

The only difference between the inventive images in FIGS. 28.I. and II. is that while the inventive image in I. may or may not have a colorless application covering most or all of its central layer along with the items embedded, the inventive image in FIG. 28.II. has a colored application in its central layer along with its embedded items. This colored application in the central layer of FIG. 28.II. may or may not extend continuously underneath its embedded items, and this colored application may be transparent, translucent or opaque. If this layer of coloration does not go underneath the embedded items, the areas inside the perforations on these embedded items might be colored to appear as if the colored application continues underneath them. This layer of coloration in FIG. 28.I. might for example, be paper, metal, fabric, an application of paint, glue or colored cPRM; light emitting polymer, etc. If layer a. on one or both inventive images in FIG. 28, has a composition that is tacked or bonded onto it (such as a Clarifying Imprimatura described herein; a layer of paint, etc.) that is also present in the surface areas of layer a. that are exposed through the perforations of its embedded items, whether this composition is polymeric or not, it may bond to the superimposed cPRM of layer b. both thorough the perforations in the embedded items forming bonding spots and also in the surface areas around these embedded items. But if layer a. has a composition on it that does not bond, or that does not bond as well as desired to the superimposed layer of cPRM, further processing can form the bond desired, making both bonding spots in the perforations of the embedded items and bonding areas around these embedded items. For example: 1) Bonding spots and bonding areas can be made by making SSI on the composition to bond with the superimposed cPRM. 2) Bonding spots might be applied on the composition using an intermediary bonding substance that bonds to both to the composition and to the superimposed cPRM. 3) These two methods might be combined. 4) If the substrate of layer a. beneath its upper layer bonds to the superimposed cPRM of layer b., bonding spots can be made by removing the composition on its upper surface in bonding spots. 5) Bonding spots can be made in a combination of these ways. (For instance, this composition could be either a non polymeric Clarifying Imprimatura on a polymer substrate, or this composition might be a polymer Clarifying Imprimatura on a non polymeric substrate.) Note that in some of the compositions of the inventive image in FIG. 28.I., layer a. and layer b. will bond to one another in the areas of this inventive image's central layer that surround its embedded items, these areas are generally too large to be bonding spots. In interpretations of this inventive image in which layer a. and layer b. do not bond to one another, bonding spots might be made through the perforations of the embedded items (as in the examples previously described), and bonding spots, bonding areas, or both might also be made as desired in the areas surrounding these embedded items. FIG. 28. also has further processing (marked c.) on the top of layer b., e.g., paint.

The central layer in the inventive image in FIG. 29 has embedded broken color painting that might be formed in several ways. For example, broken color painting might be done on layer a., then superimposed cPRM forms layer b. Alternately a polymer layer b. is superimposed over layer a., e.g., once the cPRM of layer a. reaches its gelation stage or after it is hardened polymer, with or without the use of a bonding agent like cPRM. Before layer a. and b. are superimposed, the broken color painting is done on layer a. or layer b. The colored underlayer visible between layer a. and the broken color painting may for example, be: a bonding substance or a surface preparation stabilizer (such as a Clarifying Imprimatura, a layer of underpainting, underdrawing, an imprimatura), a wash, a layer of collage, a printed layer, or a layer of direct painting, e.g., in pencil, pastel, charcoal or graphite; coloration on one side of polymer of layer a., etc. This colored layer may have conductive polymer(s) emitting light.

Consider if for example, the broken color painting in between layer a. and b. in FIG. 29 does not bond as well as desired or if it does not bond at all, to one or to both of these layers. If the areas on the upper surface of layer a. that have no broken color applications and are in direct contact with layer b. do bond as well as desired to layer b., this inventive image may be as strong and as permanent as desired without fortifying the bond between its layers a. and b. further. If the areas on the upper surface of layer a. that have no broken color applications and are in direct contact with layer b. do not bond as well as desired to layer b., it may be desirable to fortify the bond between layers a. and b. further in a manner that is aesthetically desirable. Bonding spots are an option, and they may comprise a surface preparation stabilizer. For example, scattered bonding spots might be disguised as strokes of broken color. For instance, the strokes shown in this illustration in white with heavy black outlines (such as the one marked c.) might all be bonding spots, (perhaps impasto bonding spots), e.g., made of an applied bonding substance that bonds to both the surface of layer a. and to layer b., they might be SSI, or they might be a combination of these. As a more specific illustration, layer a. of this inventive image might be made of polymer superimposed by a surface preparation stabilizer such as a Clarifying Imprimatura, that is painted with conventional acrylics, watercolors or oil paints. This may actually be over a very thin light emitting layer made with conductive polymer(s). Thus none of the surface of layer a. might bond to the cPRM that will be superimposed over it until bonding spots are made by sanding the surface preparation stabilizer off to form stroke shaped spots, colored appropriately, that are strokes of colored cPRM. As a second specific illustration, rather than polymer, layer a. might be made of glass and that is colored using conventional practices. Spots might be sanded that function as bonding spots with the superimposed cPRM and that result in aesthetically desirable inventive image without adding coloration on these bonding spots. In a third specific illustration, the surface of layer a. and layer b. might be two polymers that do not bond to one another or that do not bond as well as desired to one another. Bonding spots might be applied on the surface of layer a. disguised as either broken color strokes or as continuous parts of the surface of layer a., made of a composition that bonds to the two different polymers, e.g., a mixed polymer stabilizer.

Whether or not layer a. and layer b. in the inventive image in FIG. 30 bond to one another, the circular applications in the central layer might be made with a composition (e.g., a paint, or a collaged material) that does not bond or bond as well as desired to layer b. Thus, bonding spots might be made and camouflaged within these circular applications, to appear as continuous part of the aesthetic, made using one or more bonding substances that bond well to layer a., layer b. and the rest of their circular application. For example, these bonding spots might be areas where circle shapes in these applications intersect or these bonding spots might be the border lines around some of the circles. The inventive image in FIG. 30 has further processing, lines on its upper surface and linear rectangles on its lower surface. In an alternate interpretation, each inventive image in FIGS. 28-30 might be made using an image support that may be a stabilizer, and that may be comprised of either one planar form, or two planar forms that become joined.

Internal air pockets are another way to use real spatial depth in inventive images that is not available, or comparably available in many other conventional images, e.g., for aesthetic effect. Air pockets can be in inventive images, within polymeric or non polymeric parts that have been formed intentionally or unintentionally, using any methods, means, and manners as desired. Some non polymeric inventive image parts may have air pockets, e.g., bubble wrap, a hollow cube, a hollow ball, etc. Both during their formation and thereafter, air pockets within polymer typically remain workable, reworkable, and controllable as desired (e.g., removable, repairable, filled, enlarged, reshaped, colored, textured, etc.).

In some inventive images, air pockets are intentional, desirable, or both. As an example, in an embodiment, one of the preferred methods of forming one or more polymer air pockets is by attaching two separate inventive image parts together, so that the surface areas in contact, do not meet each other in at least one place.

If desired, polymeric or non polymeric inventive image ingredients can be within air pockets in inventive images, e.g., bonded to the interior of their air pockets, or loose within their air pockets.

Polymer air pockets can form variations and effects in inventive image, as desired, such as these examples. For instance, polymer air pockets can affect the light of an inventive image by their shapes, by their shadows, by their diffraction of light; or by the inclusion of polymeric or non polymeric elements within them (such as a mirror, polished metal, a lens, a diffraction grating, a prism, a reverse lens, a reverse diffraction grating, a reverse prism, water, oil, or combinations of these, etc.). A polymer air pocket might serve as a lens, a diffraction grating, a prism, a reverse lens, a reverse diffraction grating, a reverse prism or combinations of these. The light effects from polymer air pockets can affect the color of inventive image, as well as their subject matter, content, meaning, strength, or permanence, e.g., air pockets within polymer can make inventive image more fragile or they can seal and preserve elements encapsulated within them.

In comparison, the use of air pockets, their variations and effects within conventional images is limited, problematic and burdened by undesirable issues. And for example, the workable, reworkable, and controllable use of air pockets within many conventional practices is difficult, e.g., air pockets within glass or within applications of transparent painting such as watercolors, and acrylic paints and gels, and many others can not be effectively created or controlled, as desired. The use of air pockets within inventive image offers solutions to limitations, problems and undesirable issues in image making and in images, as well as variations and effects that are new and unique, some of which have never been in images before.

In other embodiments, one or more polymeric or non polymeric objects, shapes, forms, devices or combinations of these are formed in or on polymeric or non polymeric parts or areas of inventive images using any method, means, and manner desired.

The formation of objects, shapes, forms, devices, or combinations of these, in or on conventional images is limited, problematic and burdened by undesirable issues, e.g., ineffective, and often impossible, particularly when transparency or translucency are desired, and particularly in painting and drawing. The present invention offers solutions some of which result in effects and in inventive images that are unlike any ever made before. See the descriptions herein of the formation of objects and devices in inventive images such as: lenses, and sun prints.

In an embodiment, one or more open negative spaces are made within the boundaries of a polymeric or non polymeric inventive image part (e.g., one or more negative cut-outs, holes, other negatives spaces) made as desired, using any method, means and manners desired. Images can give them real light by their inherent transparent or translucent form (provided the ability to see through the polymer is not intentionally blocked), the addition of open negative spaces can bring them another, different kind of real light and another, different kind of transparency, both of which are intangible, and neither of which rely on the use of illusion. Real negative spatial depth such as that formed in inventive images in this embodiment, brings air (space) and light into the inventive image. Open negative spaces can affect other formal elements significantly or as desired, e.g., making an inventive image seem lighter, more airy. For example, open negative spaces can make inventive images function differently and they can be used for many kinds of effects in inventive images, e.g., light effects. The present invention can expand the uses and the effects of open negative spaces in images. Open negative spaces such as negative cut-outs made in polymer are typically workable, reworkable and controllable as desired, from the time that they are made, on. For example, open negative spaces can be made within the boundaries of the perimeter of an inventive image, by using or making a mold that blocks polymer from forming in certain areas within the perimeter of its form, or by cutting, carving, drilling, or chiseling through polymer after it has gelled, once it has hardened, or both.

In an embodiment, the Compositional Arrangement of an inventive image is such that one or more of its parts, go through one or more of its open negative spaces, e.g. for aesthetic, functional or installation purposes. In another embodiment, one or more parts of an inventive image are visible through one or more of its open negative spaces.

Limitations, problems, and undesirable issues in the use of real variable spatial depth in conventional images are among the significant limitations, problems, and undesirable issues restricting the ability to make conventional images according to the Principle of Whole Development and Unity to the extent desired and in the manner desired. By offering space, particularly real variable spatial depth, that is typically workable, reworkable, and controllable as desired (e.g., the use of space in WYSIWYG processes, preplanned processes and in combinations of these), the present invention offers direct solutions to limitations, problems and undesirable issues, many of which have heretofore not had any workable, reworkable, and controllable, useful direct solutions at all in conventional images. For example, despite all the interest and work, there was still no good way to use unlimited, workable, reworkable, and controllable transparent or translucent spatial depth as desired in conventional paintings. Conventional shaped paintings enable some significant use of the real spatial depth in painting, but this is extremely limited. Illuminated images such as Light Box Art, Illuminated transparencies and other examples, offer interesting solutions to the use of real light and real spatial depth in conventional images such as painting, but because the real spatial depth and the real light of these conventional images can not be worked, reworked and controlled as desired, and because they can neither be painted nor sculpted as desired (even though many of these images function as paintings and sculptures), such conventional images solve limitations, problems and undesirable issues by avoiding them. With only conventional practices, there is still no direct solution enabling conventional images (such as paintings and sculptures) to be made using real spatial depth and real light as desired in a format that can be WYSIWYG, and as workable, reworkable, and controllable as desired. Thus, the use of space in conventional images according to the Principle of Whole Development and Unity to the extent desired and in the manner desired remains a basic goal in conventional images, that is often not possible in reality, particularly without undesirable consequence, e.g., without risking or lessening the strength and permanence desired in the conventional images.

The formal element of space in inventive images can typically used according to the Principle of Whole Development and Unity to the extent desired an in the manner desired. Furthermore, the present invention expands the use of space in image making and in images, typically without undesirable consequences, e.g., without risking or lessening the inventive image's strength or permanence. The expanded use of space provided by the present invention, expands the use of other formal elements in inventive images, typically without undesirable consequences, e.g., without risking or lessening the desired level of strength and permanence of the inventive image. For example, a tangible form of real light, real transparency, real translucency or a combination of these can also be used in inventive images, typically with free and full workability, reworkability, and controllability, as desired, e.g., in both WYSIWYG and preplanned processes as desired.

As an illustration, the real spatial depth of external surfaces of inventive images, can typically be made according to the Principle of Whole Development and Unity to the extent desired and in the manner desired. The real spatial depth of external surfaces of inventive images is typically workable, reworkable and controllable as desired, during their formation and afterwards, typically without undesirable consequences, e.g., without risking or lessening the level of strength and permanence desired for the inventive image. Thus, for example, the use of real textures, layered applications and additions, attachments, inlaying, other forms of external spatial depth, and combinations of these are typically all workable, reworkable, and controllable. In addition or instead, the real spatial depth of external surfaces of inventive images can typically be as integrated and as unified as desired, with as many or as few other formal elements of an image and with the image as a whole, as desired. For example, textures, layered applications and additions, attachments, and inlays, on a surface of an inventive image can typically all be formed according to their relationships to one another, and in terms of their relationships to the image as a whole, as desired. Use of the real spatial depth of external surfaces of inventive images can typically be coordinated with other aspects of that image (e.g., its form, its color, its structure, its movement, its subject matter, its means of installation, its function, etc.), and with the image as a whole, as desired. In comparison, using conventional practices, the real spatial depth of external surfaces of conventional images (such as the use of textures, layered applications and additions, attachments, and inlays), is often difficult, uncontrollable, or a risk to the inventive image's strength, permanence or both. The use of the real external spatial depth of inventive images offers solutions to limitations, problems and undesirable issues in image making and in images.

As a second illustration, the real internal spatial depth of inventive images can be used in a wide variety of methods and manners, the real internal spatial depth of inventive images is typically workable, reworkable, and controllable, during their formation and afterwards, without undesirable consequences, e.g., without risking or lessening the desired strength or permanence. The real internal spatial depth of inventive images can typically be used according to the Principle of Whole Development and Unity to the extent desired and in the manner desired. For example, painting and drawing on the internal layers of inventive image, embedding, and air pockets, typically can all exist in an inventive image, in a way that is determined according to their relationships to one another, and in terms of their relationship to each inventive image as a whole, as desired. More specifically, painting and drawing on the internal layers of inventive image, embedding and air pockets, can typically all be coordinated as desired with other aspects (such as their external surfaces, forms, structures, light and functions), so that these internal layers of painting and drawing, this embedding, and these air pockets contribute as desired to make each of them into wholes that are as unified as desired. This way of working is opposed to, for example, having to form the internal spatial depth of an image within limitations or guidelines or in advance of the rest of the image. Prior to the present invention, such limitations and guidelines generally affected the use of the real internal spatial depth of conventional images, e.g., processes for layering and embedding in the real spatial depth of oil paintings, not only limit layering and embedding, but they also limit the strength, permanence, surface light effects and qualities and, the overall aesthetic of the conventional image formed; and often they have to be completed before other formal elements of the image are formed such as before the surface's color, light, and spatial depth are begun, etc. Thus, the use of internal spatial depth of inventive image offers solutions to limitations, problems and undesirable issues in image making and in images.

As a third illustration, the real spatial depth of the forms and structures of inventive images can typically be used as desired (e.g., using the Principle of Whole Development and Unity to the extent desired and in the manner desired), typically with the workability, reworkability, and controllability as desired, during their formation and afterwards, typically without undesirable consequences, e.g., without risking or lessening their desired strength or permanence. Furthermore, the real spatial depth of the forms and structures of inventive images can typically be integrated and unified with their other formal elements into whole inventive image that are unified, as desired. For example, the contour of an inventive image, its support, its hollowness, its solidity, its flexibility, its rigidity, its strength, its permanence; and open negative spaces within the boundaries of its perimeters (such as negative cut-outs), can typically all be formed in a manner that is determined as desired, e.g., according to the Principle of Whole Development and Unity to the extent desired and in the manner desired. The forms and structures of an inventive image can typically be part of the overall inventive image as desired. This is not possible with many conventional practices without limitations, problems and undesirable issues. The use of the real spatial depth of the forms and the structures of inventive image offers solutions to limitations, problems, and undesirable issues in image making and in images.

As fourth illustration, the real transparency and real translucency in the spatial depth of inventive images can typically be developed according to the Principle of Whole Development and Unity to the extent desired and in the manner desired. The real transparency and real translucency of the spatial depth of inventive image is typically workable, reworkable, and controllable as desired, as desired during their formation and afterwards, without undesirable consequences, e.g., without risking or lessening the desired strength or permanence of the inventive image. For example, the use of a transparent Separating Layer of polymer, the use of translucent applications, the use of transparent texture, and the use of transparent forms can typically all be developed in concert with the development of the Compositional Arrangement, the subject matter, the functions, the movement and the structure of an inventive image. Further, the consideration and the use of the real transparency, and real translucency in the spatial depth of inventive images can typically be done according to the Principle of Whole Development and Unity to the extent desired and in the manner desired. This is not possible with many conventional practices without limitations, problems and undesirable issues. The use of real transparency and real translucency in the spatial depth in inventive images offers solutions to limitations, problems and undesirable issues in image making and in images.

As a fifth illustration, the real spatial depth of inventive images that function as paintings, drawings, sculptures, as other conventional planar art forms, as constructions, and other known art forms can typically be used according to the Principle of Whole Development and Unity to the extent desired an in the manner desired. The real spatial depth of inventive images that function as paintings, drawings, sculptures, constructions and other known art forms, is typically workable, reworkable, and controllable as desired during their formation and afterwards, typically without undesirable consequences, e.g., without risking or lessening the strength, the permanence, or the aesthetic desired in the inventive image. Thus, for example, the use both internal and external real spatial depth, the real spatial depth of their forms and their structures, and the use of real transparency and real translucency in the spatial depth (such as the examples in the preceding four illustrations), are typically all workable, reworkable, and controllable as desired. Despite the desire and tremendous effort, this is not possible in many conventional images that function as known art forms, such as many kinds of paintings, drawings, other conventional planar art forms, sculptures, constructions, etc.

Both the use of real spatial depth in inventive images that function as known art forms, and the use of real spatial depth in inventive images that function as new art forms, offer solutions to limitations, problems and undesirable issues in image making and in images.

One important example, that is a notable solution in painting developed prior to the present invention, is the shaped painting because shaped paintings enable some improved use of real space that was previously not used in painting (an art form that was traditionally defined by its lack of real spatial depth and its failure to use space in other ways). Yet, though the perimeter shapes of shaped paintings are made as part of the image maker's or image makers' vision, rather than just as structural support, they usually require significant preplanning to be custom made for a specific conventional images. In addition, because their unique perimeters are designed according to the other elements in these paintings, the other elements in these paintings have to be preplanned to some extent too, e.g., usually in preliminary drawings or studies. Thus, spontaneity is limited in shaped paintings, often severely. Then, once the custom stretchers of shaped paintings are made and stretched, and painting on them begins, these stretchers are rarely reworked. Reworking them involves unstretching the canvas and further custom woodwork. Because this is an interruption in the creative process, because this risks altering or damaging painting done on the canvas' surface, and because this is often difficult, expensive, and time consuming, usually when an adjustment is needed in the process of making a shaped painting, the other elements in the shaped painting are modified (e.g., the forms, the colors, the Compositional Arrangement of the painted forms), instead of the custom stretcher. Though they do expand the use of space and other formal elements in painting, these expanded uses of formal elements are neither reworkable, nor controllable as desired, (e.g., they are not freely and fully reworkable and controllable). Furthermore, shaped paintings do improve image makers' ability to work according to the Principle of Whole Development and Unity to the extent desired and in the manner desired. Also, while shaped paintings do expand the use of space in conventional images by enabling their perimeters to serve aesthetic as well as structural function, they do not affect other limitations, problems and undesirable issues in the use of space in painting, such as, the use of other aspects of the real spatial depth of their forms and structures; their textures, their use of transparent, translucent and see-through spatial depth, their use of inlays, their use of embedding, their use of open negative spaces within their perimeters, such as negative cut-outs, etc. Shaped paintings are a direct improvement of limitations, problems, and undesirable issues and their expanded use of space has kept shaped painting on the cutting edge of painting and art today even though they do not come close to solving the limitations, problems, and undesirable issues in the uses of real space, in painting, in image making or in conventional images. These limitations, problems, and undesirable issues remained until the present invention. The importance and the popularity of shaped paintings is a sign of the promise and the value of the present invention, and of inventive images.

In an embodiment, inventive image shaped paintings are made. Inventive images can also be made that take painting, image making, and images, far beyond conventional shaped paintings to the extent desired, because rather than just improve prior limitations, problems, and undesirable issues, inventive images can solve them. Because typically as much workability, reworkability, and controllability and spontaneity as desired is available in using the present invention, typically, preplanning is not necessary to make inventive image shaped paintings or inventive images in other known art forms, though preplanning can be done as desired. Because the present invention can produce rigid or flexible forms stretchers or other structural support are not necessary, though they may be used as desired. For example, in an embodiment an inventive image can be made that functions as a painting without any stretcher or other additional structural support, that not only might have the irregular perimeters of its part(s) shaped as desired, it might have open negative spaces, within the boundaries of the perimeters of its part(s), it might have real variable textures, its thickness might be made as desired; it might have real transparency, real translucency or both used as desired throughout the depth of its space; it might have embedding and/or inlaying in its spatial depth, it might have parts with hollow spatial depth and/or parts with solid spatial depth; the use of its other formal elements was not limited, problematic or burdened by undesirable issues; its formal elements were workable, reworkable, and controllable as desired when it was formed and they remain so; and furthermore, it was made according to the Principle of Whole Development and Unity to the extent desired and in the manner desired.

As a sixth and final illustration, when the use of real spatial depth in an inventive image is developed according to the Principle of Whole Development and Unity to the extent desired and in the manner desired, the use of real spatial depth can contribute to and even strengthen the subject matter, the content, the meaning and the success of the inventive image in the manner desired. For example, the objecthood quality that many abstract inventive images have due to their real spatial depth, can contribute to their subject matter, their content and their meaning. By so doing, a significant problem in the use of abstraction in images is directly solved by the present invention, without having to rely on illusionary devices unless they are desired.

In an embodiment, an inventive image or part thereof is created that is perceived to be receding in spatial depth. In another embodiment, an inventive image or part thereof is made that is perceived to continue the real space in which it actually exists by the use of receding, spatial depth. In an embodiment, an inventive image or part thereof appears to be a flat plane, without illusions to the extent desired or completely. In an embodiment, an inventive image or part thereof, can be made that is perceived as advancing in space towards the viewer. In an embodiment, the perception of space as negative or as positive can be addressed in inventive images as desired. The present invention can expand the uses of negative and positive space in images.

The sense of space in inventive images can directly involve their other formal elements, such as their subject matter; the ingredients and processes used to make them; their forms and structures; their color; the way in which they are presented, set-up, displayed, installed, or exhibited in space; their content, their meaning, etc.

The real spatial depth of inventive images and the real light it brings them make the use of such effects in inventive images very promising for new images.

Further Description of the Use of Light in Inventive Images

The present invention offers important and valuable solutions to the limitations, problems and undesirable issues in the use of light in image making and in images. The use of light in inventive images is typically workable, reworkable, and controllable as desired. In making inventive images, light can be used in any methods, means, and manners in a myriad of ways to the extent desired and in the manner desired. Thus, for example, this light can typically be partially or completely developed or altered as desired, e.g., augmented, downplayed or eliminated. The use of light in inventive images can contribute to its aesthetic in any way desired, e.g., to any extent ranging from light being the predominant characteristic of its aesthetic, to light being of little or no importance in its aesthetic, as desired; light can be as varied, as inconsistent or as consistent as desired throughout a single polymer or inventive image. Also, the use of light in inventive images can result in a vast range of varied qualities and effects, a number of which are new and unique, and some of which are unlike any qualities and effects heretofore in images. The use of light with the present invention expands the use of light in image making, and in images. Further it promises to produce new unique variations of conventional art forms, and perhaps new unique art form(s). Light can be part of inventive images in ways that are new and unique. For example, new effects of light can be formed in polymer using its real variable spatial depth and one or more colorants. Further examples are throughout this patent.

Like most images, most inventive images have real light hitting their external surfaces, inventive images can have other forms of real light that most conventional images do not have, or do not have comparably. Inventive images can inherently have one or more additional form of light, (provided it is not blocked during the process of creation, e.g. with opaque paint), a unique tangible form of light that is the see through spatial depth of polymer. Many polymers and many inventive images, have light inherently within transparent and translucent forms. If desired, the light inherently within polymer can typically be formed, reworked, varied and controlled as desired, in a myriad of ways, during or after the polymer's formation, typically resulting in inventive images with the level of strength and permanence desired. But unlike other see-through conventional images (such as those made of glass and polymers that are not of the present invention), this tangible form of real light inventive images offer image makers can typically be varied, worked, reworked, and controlled as desired, in one or more processes that can be as free and full as desired, that can often be done at a reasonable cost, during the inventive image's formation and afterwards, typically without any undesirable effects or risks to the inventive images (e.g., compromises of its desired level of strength and permanence). The use of light in inventive images can be as strong and as permanent as desired, thus for example it can be as ephemeral, as weak, as vulnerable to change and as impermanent as desired. The present invention's workability, reworkability, and controllability typically enables image makers to have as much aesthetic control and creative freedom as desired in the use of light in inventive images. For example, light can be brought to an inventive image, shaped, obstructed, colored, blocked, shaded, and otherwise affected by using an enormous variety of materials, media, objects, devices, processes, interactions, sources, or a combination of these, as desired, etc. This capability is unprecedented in image making, and conventional images.

The light in inventive images can create or affect other formal elements as desired. For example light in inventive images can have a visible form or shape, it may be a form of coloration, it can effect the perception of spatial depth, form, texture, shape, size, or weight of inventive images, their subject matter, content, meaning, and combinations of these as desired. Light can even be subject matter in an inventive image if desired and as desired. Many of the ways of forming, reworking and controlling inventive images described herein, can be used to form rework and control light in inventive images as desired. These are further examples.

1). Light in a polymer, or in another inventive image part, can typically be developed, altered and controlled as desired by using VIMC as desired. Example 1: Ingredients used in a cPRM, can affect the resultant polymer's light and if this resultant polymer is not the entire inventive image, these effects can affect the entire inventive image. For example, a change in the proportions of the active ingredients used in a cPRM, can create and enhance effects of light, e.g., over catalyzing some cPRM can result in a transparent color in a polymer, such as a pale pink. Also, different monomers are transparent, translucent, colored and combinations of these to differing extents, e.g., some monomers have a white haze, some are slightly colored, some monomers are capable of polymerizing more clearly than others, etc. In addition, the use of multiple monomers and the catalysts appropriate for polymerizing them can affect the light of the polymer formed. Example 2: Light in a polymer, or in another inventive image part, can be developed, altered and controlled as desired by using one or more stabilizers, as desired, e.g., by adding optical brightener stabilizers such as UVITEX® OB into cPRM, or by adding a wax stabilizer into the cPRM. The specifications of one or more stabilizers, and the specifications of their use in or on an inventive image, can affect its light, e.g., the color and the concentration of each stabilizer used. The specifications of fiber stabilizer used in or on polymer can affect its light, e.g., coarse or fine strands of fiber; the fiber's density; the fiber's weave; the thickness of fiber used; its location with respect to the rest of the polymer and with respect to the rest of the inventive image; number of layers used in or on polymer; the bonding agent used with fiber; the cleanliness of fiber; the use of different fibers (such as lace, heavy fibers, fiberglass, sheer fabrics, metallic fabrics), and combinations of these. Example 3: Light in a polymer, or in another inventive image part, can be developed, altered and controlled as desired by using one or multiple polymeric or non polymeric materials, media, objects, devices, and their combinations, in or on monomer, in or on PRM or cPRM (such as gelled cPRM), as desired. Examples are all pigments, dyes, particles (e.g., both formed polymer particles and other particles like glitter, glass particles, shells, and feathers), etc. Example 4: Light in a polymer, or in another inventive image part, can be developed, altered and controlled as desired by using the surface or surfaces on which the cPRM forms as desired. Examples are, i) the specifications of the mold or other surface used (e.g., the formation of cPRM on a textured mold, or the formation of cPRM on a surface that it bonds to, such as on a transparent, translucent, opaque or see-through surface that is a desired part of the inventive images being formed); ii) the specifications of anything on the mold or other surface upon which cPRM is formed, e.g., powdered pigment, release agents, paint, clay, bugs, objects, particles, or paper on the mold, temporary parts of molds such as clay walls; iii) variables in mold making; iv) alterations to the mold or other surface upon which cPRM is formed such as alterations to a mold containing gelled cPRM like those described herein. Example 5: Light in a polymer, or in another inventive image part, can be developed, altered and controlled as desired by using any or all of the process or processes used to make cPRM into polymer. Examples are, the timing of superimposed layers of cPRM; creating in tiered layers; altering gelled cPRM (such as by cutting it); the specifications of applications of cPRM (such as the thickness of cPRM applications and the viscosity of a cPRM); the process of installing fiber in cPRM or polymer; releasing air bubbles in cPRM; combinations of these, etc. Example 6: Light in a polymer, or in another inventive image part, can be processed, altered and controlled using the environment in which cPRM is formed into polymer, and the accessories used as it forms polymer, e.g., the temperature, humidity and air currents around cPRM; the use of tools, facilities, and special equipment, with polymer of the present invention, etc.

2) Light in a polymer, or in another inventive image part, can be developed, altered and controlled as desired by using one or more ingredients that are completely or partially non polymeric. For example, a number of inventive images have transparent, translucent, or see through areas, parts or combinations of these, of all kinds of descriptions, that are not principally polymeric or are non polymeric (e.g., parts that are glass or crystal, negative cut-outs, projections, found objects; a reflective, iridescent, pearlescents, interference, or fluorescent pigment, dye, material, medium, object or other element, for example, metals such as, gold leaf and silver leaf; mica, mother of pearl, elements with other special light properties; netting, mesh, burlap, wood and paper; elements that bring texture, structure, form, or permanence to an inventive image; elements that absorb or block light such as, opaque paints like encaustics; crystal, glass or polymers that are not of the present invention such as acrylics without light stabilizers; all transparent, translucent, and partially opaque painting processes such as, glazes, washes, chiaroscuro, broken color and other layering processes; or combinations of these, etc.). For instance, the high light refractive qualities of crystal might be desired, the unique light effects of dichroic glass might be desirable and the light effects of ready made acrylic cubes might be desired as part of an inventive image. Or for example, one or more mirrors are on or in an inventive image or part thereof, one or more mirrors are physically separate parts of the Compositional Arrangement of an inventive image (e.g., a mirror might be placed behind an inventive image to reflect light through it), or both.

3) Light in a polymer, or in another inventive image part, can be processed, altered and controlled using one or multiple conventional practices as desired. Such conventional practices are not limited, e.g., conventional practices of metal working, glass making, art, architecture, building, film, photography, conservation, construction, engineering, manufacturing, optics, other sciences, etc.

4) Light in a polymer, or in another inventive image part, can be developed, altered and controlled as desired by using: its the form, its shape, its structure; the process or processes of its creation (e.g., adding or subtracting matter, a WYSIWYG process, alterations during gelation, etc.); its function (e.g., using theatrical lighting of an inventive image stage set, by the movement of an inventive image door opening and closing, by the movement of water flowing in an inventive image fountain and by the changes of light seen in an inventive image window); bonding agents; surface irregularities, bonding spots; surface preparations and underlayers on inventive images; Separating Layers; attachments; inlays; embedding (such as embedded forms and embedded air pockets); texture (internally, externally or both) such as transparent and translucent textures; subjects formed in polymer, such as lenses, prisms, gratings, air pockets, photographs, etc.; air bubbles; fiber; sealers, fixatives, coatings, coverings, other such agents; parts connected to the inventive image; the inventive image's Compositional Arrangement (which may involve forms, colors, shapes, multiple parts, etc.); shadows; its real spatial depth; using illusions (e.g., illusions of transparency, translucency, light, spatial depth, etc.); real movement; a light effect in the inventive image that can be viewed or visible in a relationship to time (e.g., a strobe light, or lights can be on timers); methods of display, installation, set-up or presentation (e.g., the inventive image's relationship to overhead lighting, windows, reflective surfaces like white walls, etc.); by the formation of inventive images as conventional art forms (e.g., as a lamp, as a work of Light Art, or as new unique variations of conventional art forms); negative space (e.g., within the inventive image or around it or both); by the use of one or more conventional art forms in it, on it, or with it (e.g., a cut-out, a photographic transparency, video images, drawings, paintings, graphic designs, drawings in space, sculptures or a combination of these); methods and means to partially or entirely block or cover over light; special effects (such as examples herein such as drawings in light, freestanding transparent inventive image paintings, etc.); methods and means that make an inventive image's light change over time (e.g., due to impermanence, its function, its movement, etc.)

5) Light in a polymer, or in another inventive image part, can be developed, altered and controlled as desired by using variations of these examples and of other examples herein, by using other light effects that are not specified herein, and by using combinations of these.

Often these light effects are at least as workable, reworkable, and controllable as the context in which they exist.

As another illustration, an inventive image might be set-up so that it is interactive with a viewer in a way that changes its light or its ability to detect light, visibly or invisibly. For example if the presence of anyone near the inventive image interrupts a light beam and the inventive image can detect this interruption, the inventive image can respond in a way designed by its image maker, e.g., the inventive image can respond by changing, for instance, it might move, its light effects might change, etc. Or as another example, the light of an inventive image can be affected by the changes of natural light, e.g., the rise and setting of the sun, clouds blocking light, lightning in a thunderstorm, etc. Refer to photochromic effects herein.

In an embodiment, one or more light sources are part of inventive images. These light sources can be of any description, and their use a part of an inventive image can be in any way desired, incorporated using any process or combinations of processes as desired. It is, however, generally desirable to avoid any undesirable effects that may result on the inventive images, e.g., from the placement of one or more light sources too close to them, or from the use of one or more light sources that might change them undesirably. For example, light sources that give off heat, UV light or both, may affect polymeric or non polymeric ingredients in inventive images (e.g., paper, paints, etc.), undesirably, particularly over time. As another example, light sources that require frequent attention or upkeep (e.g., new parts such as bulbs) may be undesirable for inventive images, as might light sources that require visible cords, wires, switches or the like. As illustrations, an inventive image might be back lit, it might be lit from underneath or within, or a combination of these. Polymer LEDs were described earlier in this patent text. In further examples, lighting such as neon tube(s), or electric bulb(s) can be placed behind inventive images, at their sides, in their negative spaces, or in a combination of these locations. A light source might be encased in an inventive image, e.g., LED(s) might be within polymer that is formed around it or them. One or more lights that are part of inventive images might be of a kind or connected in such a way that their illumination is not constant, e.g. their illumination dims or brightens, it goes on and off (for instance on timers, by being activated in a pre arranged way, or using strobe lights), etc. In addition, electroluminescent lamps (EL Lamps) may be used in inventive images. One or more EL Lamps may be shaped as desired as part of inventive images. For instance, they can be in shapes that contribute to an inventive image's aesthetic, e.g., in one or multiple abstract shapes (such as circles, rectangles, small irregular shapes, polka dots, undulating or zig zag lines, etc.); in one or multiple realistic shapes (for instance shaped like birds, fish or flowers); or both. For example, one or more EL Lamps might be used within, behind, or under an inventive image so that they illuminate it without being seen by viewers, one or more EL Lamps might also be used on inventive images. EL Lamps are made in a variety of colors and are available custom-made. As another example, one or more lasers are part of an inventive image.

In embodiments, polymer can be used around a light source as desired. Further, it can be worked and reworked there too if desired. As another example, one or more light sources can be a part of the Compositional Arrangement of an inventive image, yet not physically connected to it. For instance, as a part of an inventive image, a red neon light in spiral shape might be visible both through a transparent area of polymer and on two of its sides. Light can be a part of a polymer in a combination of varied ways. Any wires, cords, transformers, plugs, bulbs, and other parts of light sources may be visible or hidden in an inventive image to any extent desired, using a myriad of methods, means, manners, often due to the workability, reworkability, and controllability of the present invention. It is preferred that the visibility of any light sources as part of inventive images is aesthetically desirable, aesthetically insignificant, not aesthetically undesirable, hidden or a combination of these as desired. This is a sharp contrast to the image making options available using conventional practices using real light sources.

Inventive images may give off light as part of their functions, and they may be light sources in addition to their aesthetic functions, e.g., light fixtures, candelabrum, etc. Isamu Noguchi is known for having created numerous light fixtures with paper shades called Akari that are still produced and sold today and widely copied. As an illustration, inventive image lamps might be designed and made that are original images that are similar to Noguchi's Akari, or even copies of them, but because the uniqueness of Noguchi's Akari relies principally on their translucent paper shades, that are reinforced with visible rib-like structures (e.g., which might be made of bamboo), inventive image lamps might be designed and produced with comparatively greater strength, permanence, workability, reworkability, and controllability; and in a diversity of aesthetic variations that are virtually unlimited, many of which are impossible to make, or to make strongly or permanently in paper. Among the further comparative disadvantages of paper lamp shades such as those of the Akari which can be avoided by using the present invention are: a) that paper has a limit to its toleration for reworking, e.g., erasing or otherwise removing applications made on paper is often problematic, layering is problematic (for instance, layered coloration), and repairs to paper are often visible, b) paper has a limit to its toleration for light (e.g., bright light for long periods of time can burn or discolor paper, UV light can discolor paper, etc.); c) paper is absorbent, e.g., of moisture and pollutants in the air; d) it does not take much to tear paper or to deform paper lamp shades, e.g., a child can easily do this; e) for other reasons of durability and permanence (e.g., it is often problematic to clean paper), etc. Refer to the discussion of the Akari herein and to the light emitting inventive image in FIG. 44.

In many embodiments, one or more intangible forms of light are part of inventive images as desired, though their source or sources may or may not be part of these inventive images. These inventive images would not be complete images or they would be different complete images, if their intangible light were not a part of them. For example some of these inventive images require certain lighting specifications for the place in which they are viewed, e.g., specifications for overhead light fixtures. In an illustration, one or more laser beams are part of an inventive image, e.g., a required specification for their display. Others inventive images have lights, reflective effects, or other light effects from sources that are not physically connected to them. Others require light from a source that can not be a physical part of them, e.g., sunlight, moon light, light reflected off of a river or off of a building, etc. Other inventive images have light source parts such as inventive images with EL Lamp(s) or LED(s).

In an embodiment, one or more subjects are part of an inventive image that have a refractive index different from that of the inventive image or the part thereof which is nearest to them. For example, one or more of these subjects might be embedded, inlaid, or attached to an inventive image; formed on or within an inventive image; or a combination of these. Examples of these subjects are: glass particles or glass pieces such as regular glass, powdered glass (as a powdered pigment is used in enameling), any piece of dichroic glass, leaded glass (crystal) etc.; mica, quartz and other rocks; fabrics like lace and gauze; fibers such as fiberglass and papers; optical devices such as lenses, prisms and diffractive gratings; wax, oils, conventional paints, photographic transparencies, and materials and media containing a high percentage of oil or wax (such as "fat" oil paints, egg tempera with oil, and encaustic); or combinations of these; etc.

In some embodiments such as this one, glass beads from Flex-O-Lite Inc. in Fenton, MO might be used as part of inventive images. Glass Beads are available in different refractive indexes from Flex-O-Lite ranging as high as a refractive index of 1.9 and even 2.1. A preferred method of using such glass particles and other particles with special light effects in inventive images is to stick them onto the surface of an inventive image, e.g., stuck onto polymer for instance, on gelled polymer, because for example, the refractive properties of such particles may not be visible if they are mixed into polymer or paint. In embodiments, glass bubbles are used in inventive images, such as those available from the 3M Company and other sources.

In an embodiment, some, most or all of the light in an inventive image can made to reflect in a certain direction or manner. For example, each source of light, and each source creating effects of light that is part of an inventive image (whether it is physically attached to the rest of it or not), can radiate light to or from that inventive image, or to or from part thereof, continuously or intermittently. Moreover, the light from each source, and each effect can be the same or different, in the manner desired. For instance, it can be of a narrow bandwidth, a broad bandwidth, or a bandwidth in between these; it can be of several bandwidths, narrow, broad, combinations of these, etc. The light can be delivered in a variety of shapes. It can, for instance, be shaped internally or externally, e.g., by lenses, prisms, etc. Furthermore, the initiating light itself need not be visible if it interacts with one or more materials, media, objects, devices, processes, interactions, effects or their combinations in an inventive image, e.g., materials that are iridescent, fluorescent, or phosphorescent.

In an embodiment, inventive images are made with effects described in "Giant Birefringent Optics in Multilayer Polymer Mirrors" by Michael F. Weber, Carl A. Stover, Larry R. Gilbert, Timothy J. Nevitt, and Andrew J. Ouderkirk, in the magazine, Science, Mar. 31, 2000, Vol. 287 No. 5462, pages 2451-2456.

Generally, it is preferable to take all precautionary measures that are possible to prevent undesirable effects from the use of light as part of inventive images. For example, heat from one or more nearby lights sources can often affect subjects used on polymer (such as painting and drawing media), e.g., altering their permanence. For instance, it might not be desirable to position a light that gives off significant heat near a polymer surface that has been painted with encaustic paint. Examples of precautions that might be desirable to prevent heat from light from changing an application of encaustic paint are: the use of lighting that emits less heat per visible light (e.g., polymer LEDs); increasing the distance between the polymer's encaustic surface and the heat producing light; inserting a filter in the light path to remove the invisible infrared light that only supplies heat; or sealing or coating the paint, e.g., with a layer of cPRM, etc. Such containment in a plastic can be used to protect that which is below it from UV radiation. As another example, UV light can often affect non polymeric inventive image ingredients, such as paper that is not archival, e.g., collaged newspaper. Again, examples of precautions that might desirable are the appropriate variations of the examples herein.

In an embodiment, a dichroic or dichromatic light effect or quality is added to an inventive image. For example, a dichroic effect or quality can be brought to an inventive image by adding one or more dichroic materials, media, objects, devices, or their combinations to it, e.g., glass, paper or another polymer that has a dichroic effect or quality can be attached, embedded or inlaid, as desired. As another example, a dichroic effect or quality can be made on an inventive image. Inventive images might have dichroic effect(s) in both of these ways. Savoy Studios in Portland, Oregon makes dichroic glass and creates custom dichroic effects that can be used in inventive images. As an example, a transparent or translucent dichroic effect could be used on or in an inventive image that emits light through or on the dichroic layer or image part. In a number of embodiments, fluorescence is used in or on inventive images, as desired. Any fluorescent subject may be used as desired as part of an inventive image, e.g., fluorescent materials, media, objects, devices, etc. Though it is generally preferable for fluorescent subjects used in inventive images to be as stabile and permanent as possible, they may be part of an inventive image regardless of their stability or permanence, regardless of the type of light, it or they may require in order to fluoresce, and regardless of the presence of that type of light. As an illustration, a fluorescent material, medium, object, or a combination of these might be used in an inventive image (e.g., such as a fluorescent dye added into cPRM, or a fluorescent paint applied on polymer), in such a way that enables UV light to reach it, e.g., UV light is not blocked from reaching it by a stabilizer. For example, it might be desirable to use one or more sources of UV light, e.g. natural sunlight, or even "black lights," to elicit the fluorescence in an inventive image. One or more sources of UV light might be incorporated as part of an inventive image; or one or more sources of UV light might shine upon this fluorescence yet not be part of this inventive image; or combinations of these. As another example, fluorescent dyes may be used as desired, as part of inventive images. UV light from a light bulb or from natural sunlight can excite their fluorescence. It is often desirable to make inventive images, and parts thereof, so that nothing blocks or prevents the light of the exciting wavelength from reaching their fluorescence, e.g., this fluorescence might be used in an inventive image design in which it is not beneath polymer that contains a chemical that absorbs or blocks the light of the exciting wavelength from reaching this fluorescence. For example, both the exciting UV source and the fluorescent material might be in a volume of the finished product (e.g., an air space) that contains no UV absorbent or UV blocking material.

In a further illustration, one or more fluorescent minerals might be used in or on an inventive image. Many natural minerals will fluoresce when excited by long wave or short wave UV light. Their fluorescence is likely to be a permanent property. However, the fluorescent light emitted when excited by the short wave (higher frequency) UV may be different from that emitted by the long wave (lower frequency) UV, e.g., the fluorescent color may differ in its hue or intensity. (This is because the higher frequency of the short wave UV light can cause the electrons to behave differently than electrons hit by long wave UV light.) Here are examples of fluorescent minerals. Calcite can fluoresce yellow-orange or red with short wave UV light, and blue or purple with long wave UV light. Travertine can fluoresce yellow-brown with short wave UV light, and green with long wave UV light. Hydrozincite can fluoresce blue or white with short wave UV light, and yellow or white with long wave UV light. Opalite can fluoresce bright green with short wave UV light, and light green with long wave UV light. Semi-Opal can fluoresce bright green with short wave UV light, and light green with long wave UV light. Aragonite or Aragonite Coral can fluoresce white with both short wave and long wave UV light. Scheelite can fluoresce blue-white with short wave UV light. Barite can fluoresce blue white or yellow with short wave UV light, and white or yellow with long wave UV light. Wemerite can fluoresce light yellow with short wave UV light, and yellow with long wave UV light. Zeolite in Wyomingite, can fluoresce yellow with long wave UV light. Halite, can fluoresce orange with short wave UV light. Hackmanite in syenite can fluoresce light orange with short wave UV light, and bright orange with long wave UV light. Turritella Agate can fluoresce yellow with both short wave UV light and long wave UV light. Dumortierite can fluoresce blue with short wave UV light. Willemite can fluoresce green with short or long wave UV light. Meyerhofferite can fluoresce white-yellow with short wave UV light, and yellow with long wave UV light. Gypsum (rose) can fluoresce white with short wave UV light, and orange with long wave UV light. Coquina can fluoresce yellow with both short and long wave UV light. Orendite can fluoresce white with short wave UV light, and yellow with long wave UV light. Fluorite can fluoresce blue with both short and long wave UV light. Chalcedony can fluoresce green with short wave UV light, and light green with long wave UV light. Thus, for example, by using such fluorescent minerals and using UV light as desired, image makers can make and control fluorescence and color as desired in inventive images, and they can even do so as a function of time (i.e., switch from one color to another at a given time).

In an embodiment, one or more fluorescent monomers or polymers are used in inventive images. This might, for example, result in fluorescence in the inventive image produced. Examples of fluorescent polymers (e.g., sheets and pellets) or monomers are made by Cyro Industries of Orange Connecticut. For example the fluorescence in a polymer inventive image might exist without special lighting. Examples are Cyro's line of ACRYLITE® GP and GP-FL fluorescent color acrylic sheets, and Cyro's ACRYLITE® fluorescent colored acrylic molding compounds colored with LISA® dyestuffs (by Bayer AG of Germany, the parent company of Mobay Corporation of Pittsburgh Pa.) that absorb ambient light and transform this light to longer wavelengths, that are re-mitted. In addition or instead, the fluorescence in a polymer inventive image might be initiated using UV light. In addition or instead, the fluorescence in a polymer inventive image might be initiated using infrared light sources, such as laser beams or perhaps other sources of infrared light of the proper wavelengths. The fluorescence in such polymers may for instance be desirable for creating 3D luminescent inventive images. Cyro Industries of Orange Connecticut makes polymer that glows when stimulated by two different infrared light sources (e.g., laser beams) that coincide within the polymer. Inventive images might be made with effects described in the article, "Visible light emission from dyes excited by simultaneous absorption of two different frequency beams of light" by Alexandra Rapaport, Karine Ayrault, Eyitope St. Matthew-Daniel, and Michael Bass; Applied Physics Letters, vol. 74, No. 3, Jan. 18, 1999.

Further examples of colorants that can provide inventive images with light effects are pigments or particles. Such colorants are, for example, made or sold by Kremer Pigments Inc. Examples are: crystalline Malachite (available in different grinds, all washed for added clarity); and Mica—potassium aluminum silicate in its natural form comes in shimmering scales of varying size (e.g., Muscovite Mica, lentil sized scales, shimmering white; Muscovite Mica Fine, small flakes; Mica Very Fine, pearlescent powder; Phlogopite Mica, silver-grey, bronze shade, even sized flakes ca. 1-3 mm; and Natural Graphite Glimmer, graphite in shiny, grey flakes). Kremer offers Fish Silver that are genuine fish scales. Kremer offers metal powders that are genuine metals in powder form retain all of their natural characteristics. Examples are: Pewter Powder, warm yellowish, pure, leadfree, grey, very fine; Iron Filings, Cast-Iron Powder, 0-250 my, fast rusting; Blacksmith Powder, coarse black; Stainless Steel Powder, cool grey; Zinc Dust, cool opaque grey; Aluminum Powder, bright silver; Copper Powder, reddish dull (e.g., reacts with patina, e.g., 1 qt. ammonia, 1 qt. white vinegar, 1 tsp. lemon juice, 1 tsp. salt); Copper Paste, bright lustre, in naphta thinner to prevent oxidation, e.g., for oil colors. Kremer also offers Silver Glitter pigments in a range of sizes that are pigments based on aluminum flakes coated with epoxy to withstand oxidation, e.g., from Silver Glitter 0.1 mm very fine to Silver Glitter 0.6 mm coarse, and Paliochrome Blue Violet iridescence, Paliochrome Blue Silver with silver metallic iridescence, and Paliochrome Copper with a bluish tint. Kremer also offers fluorescent pigments for use in inventive images.

More examples of colorants with light effects for use inventive images are Pearl Luster Pigments made by BASF in Germany. These are mica flakes coated with metal oxides that are extremely lightfast and suitable. Kremer Pigments recommends the use of these in combination with transparent organic pigments. The COLIBRI types are opaque metallic. CHROMA types are interference pigments, their mother-of-pearl effect is especially striking on a dark ground.

In an embodiment, fiber-optic glass or a comparable fiber-optical material can be embedded, inlaid or attached to an inventive image, it can be a physically separate inventive image part, or a combination of these. The amount of light transmitted through the fiber optics to its tip might depend on the difference in refractive indexes between the fiber and the surrounding material or medium used, e.g., the surrounding polymer used. If their difference were great, less light will leak out of the fiber optics and more light will go to its tip. As their difference approaches zero, more and more light will leak out along the length of the fibers and the fiber itself will become less visible. If desired, this device may be used to introduce UV light should the fiber transmit the UV light or it may be used to introduce any other light to a given region (or spot) within the inventive images.

In some embodiments, filters, lenses and other special effects of light are used in or on inventive images, for instance, in or on polymer. This can result in effects of light, some of which are new and unique. Examples are a Fresnel Lens or its negative impression, prisms, or a diffraction grating; special glass such as dichroic glass; dichroic papers, reflective papers, or other papers that create effects of light; or filters such as a polarizing filter). For example, by spreading out wavelengths in the spectrum (the visible spectrum and beyond) a prism can be used for visual effects in inventive images. In one of the preferred methods of forming a polymer directly off of the Fresnel Lens, the use of a spray release agent applied in a thin even layer is most preferred, because it is least likely to interfere with the desired polymer to be formed. The polymer formed will be a flat, negative impression of the Fresnel Lens. To form a positive, polymer, or, in other words an imitation of a flat, Fresnel Lens, a preferred method is to take a mold directly off of the Fresnel Lens (e.g., an alginate or silicone rubber mold). The polymer that will form in this negative mold will be a positive, it will be an imitation of a Fresnel Lens.

Forming a polymer on a grating is much more difficult because its texture is so fine. It's texture may if fact be too fine to make much of an effect on either a polymer formed directly on the grating or on a mold formed on the grating in which a polymer can be formed later. To take a mold off of a grating it is preferable to use a mold material that picks up fine details exceptionally well like alginate.

The negative impression or positive imitation of a prism is easy to form in polymer. The smoother the surface is on a prism formed in polymer, the more effectively it will work with light. To make a polymer surface smoother it might for example be sanded finely and then coated with a thin layer of cPRM (e.g., applied with a paint brush).

Covering any amount of area on a single polymer surface, actual Fresnel Lenses, gratings or prisms, and both the negative and the positive imitations of Fresnel Lenses, gratings and prisms can be used, independently or in combinations, in their entirety or as fragments, etc. just as the image maker desires. A Fresnel Lens, grating, prism or combinations of these can also be attached onto, inlaid or embedded into a polymer. These special effects can be combined freely with the myriad of other effects of light in polymer in inventive images.

In a cross section or side view, FIG. 18.a. shows a polymeric inventive image or an image support made with embedded air pockets shaped as prisms (shown as triangles) that might or might not function as prisms when exposed to light. This image may be used as an image support (e.g., a stabilizer). For example, transparent coloration can be applied onto the image, e.g., using one or more conventional media or materials (e.g., a paint); or a cPRM with a pigment, dye or both. This image can be colored partially or entirely on one or more of its sides, as desired, e.g., using multiple layers. In a further example, one or more transparent or translucent polymer LEDs might be on or within this inventive image emitting light, e.g., enhancing the light effects of its prisms. When light passes through this image, its internal prisms will enhance its sense of light and color, and if the light changes over time, it will have a sense of movement too. The inventive image shown in cross section or side view in FIG. 18.b. is made of a polymeric composition with multiple adjacent polymer triangles or pyramids, with or without a backing (an image support made of polymer or made of another composition). For example, the forms that comprise this image might be polymer prisms that function as prisms. The inventive image in FIG. 18.b. might be made as a single part. Alternately, it might be made as multiple separate parts that are then bonded to one another, or to a common support, in the compositional arrangement shown. If desired, the inventive image in FIG. 18.b. may be further processed. For instance, it might serve as an image support that may or may not be a stabilizer. The inventive image in FIG. 18.b. might be colored using transparent coloration, or polymer LED(s) that emit light (as described for FIG. 18.a.). If this image has prisms, they can enhance the visual effect of its coloration with exposure to light, an if the light is varied, the image will have a sense of movement too.

In a number of embodiments, one or more photographic prints or parts thereof, photographic transparencies, or parts thereof, or a combination of these are part of inventive images. These photographic prints or transparencies may be of any description, they may be used in any quantity, they may be part of inventive images in any way desired, etc.

As an illustration, photographic prints, transparencies and parts of these that are part of inventive images may be in the form of negatives, conventional prints, they may be positive transparencies (e.g., slides, transparencies or films like such as those on clear sheets for use in overhead projectors, as overlays, on light boxes, or with other forms of back lighting), they may be other kinds of prints or transparencies, or a combination of these. For example, in an inventive image a photographic print or transparency might be: embedded in an air pocket; attached to the surface; embedded at any depth within transparent or translucent polymer; a physically separate part of the image; projected onto the image; transferred to an inventive image (e.g., using one or more printing processes, such as, photo silkscreen); etc. Epson Accessories Inc. makes Epson Ink Jet Back Light Film for printing transparencies from the computer. These printed transparencies can be used on or in polymer in inventive images. If desired, photographic prints, transparencies and parts of these which are part of polymeric inventive images may be further processed, as desired, e.g., by further applications, such as paint or cPRM, or by subtractive processes. If desired, applications can be superimposed over photographic prints, transparencies and parts of these, e.g., embedding them at any depth or at several depths. In addition or instead, matter might be removed from them using any process and any tools desired, e.g., they may be incised, carved, sanded, engraved, etc. Other kinds of further processing might be done too, if desired.

In some embodiments, the negatives of Polaroid film (made by Polaroid Corporation of Cambridge, Mass.), can be used to transfer images onto one or more inventive image surfaces of any description, e.g., surfaces that are polymeric or non polymeric, flat, curved, textured, embossed, perforated, transparent, translucent, opaque, etc. For instance, this can be done by pulling the negative and the positive sides of exposed Polaroid film apart early, e.g., after about 10 to 20 seconds, (perhaps up to 30 seconds if using Polacolor Pro 100 film). Then, place the Polaroid negative or part thereof on an inventive image surface or part thereof. There are numerous variations of this and similar techniques that can be used to make inventive images as desired, e.g., to achieve a specific desired aesthetic effect. For example, the choice of a particular Polaroid film (e.g., Type 669 film or Polacolor Pro 100), exposures, filters (e.g., Polaroid suggests trying a 20 cc red or 30 cc magenta filter with an increase in exposure of ½ a stop) and other such variables can affect the image transfer. The transfer might be assisted using pressure on the negative as it is on the receptor surface, for instance by passing a roller (e.g., brayer) over it (e.g., this may to get rid of any air bubbles) or by the use of a weight on it (e.g., a sheet of glass). The receptor surface's wetness or dryness, its absorbency or its lack of absorbency, and its temperature can also affect the transfer. For instance, Polaroid recommends transferring images onto damp or wet paper that has been soaked in water. Images can be transferred onto damp or wet inventive image surfaces made of polymer or paper, e.g., surfaces made using absorbent polymers. Keeping the negative or the receptor surface warm during the transfer can affect the results, e.g., warmed with warm water, with a hot plate underneath it, with a blow drier, iron, etc. Polaroid recommends approximately 100° F. or warmer. The receptor with the negative against it can even be put through a laminator set at low heat once or multiple times, e.g., using Polacolor Pro 100 film. Altering the time that the negative is on the receptor surface can result in different qualities of transfers too. Though in their literature Polaroid recommends that the negative be on the receptor surface for about 2 minutes, experimenting can be done, e.g., with 1 to 4 minutes or even longer, for instance, up to 30 minutes. Other examples of variations of this transfer process are, coloring the receptor surface prior to the transfer (e.g., with a metallic color paint, a transparent wash of color, etc.); coating the receptor surface with gelatin and Kodak Photo-flo; or covering the receptor surface with an acrylic medium prior to the transfer; etc. And once some of these transfers are made (e.g., using Polacolor Pro 100 film), they can be altered (e.g., clarified) by sponging or putting them in a bath, such as a bath comprised of equal parts of distilled water, white table vinegar and hypo clearing agent, in which the transferred image is agitated and softly brushed (e.g., for about 2 minutes), and then put in a running water bath (e.g., for about 15 minutes). In addition, the image transfer may be further processed as desired, e.g., transferred colors can be altered or other coloration can be added using conventional practices (like painting, drawing, incising or scraffito, using retouching dyes, etc), using the present invention (such as by superimposing a new layer of polymer), or combinations of these. On the inventive image surface the resultant image may be opaque, transparent, translucent, or a combination of these; it can be as in focus or as out of focus and as color saturated or as pale in color as desired. The inventive image may be finished, but if not it may be further processed, as desired.

As another illustration of this embodiment, the emulsion or the emulsions of one or more developed photographs, part thereof, or combinations of these, might be transferred in any way desired, onto one or more inventive image surfaces. Photographic emulsions may be transferred in any way desired onto inventive image surfaces that are of any description, e.g., comprised of any polymeric or non polymeric ingredients; and flat, curved, textured, undulating, reflective, light emitting, electrically active, embossed, perforated, transparent, translucent, opaque, etc. Then if desired, further processing can be done as desired.

As a more specific example, most photographic emulsions commonly used in Polaroid films can be removed from their conventional Polaroid backing in processes such as this one. After a Polaroid photographic print is developed and dry (e.g., 8 to 24 hours after it is made, or sooner if it is forced dried such as with a blow drier), it is immersed face up in water (e.g., distilled water), that is 160° F. or hotter, e.g., for about 4 minutes. Then this Polaroid photographic print is transferred into cold water, e.g., using tongs. While it is in the cold water, the flimsy transparent emulsion bearing the photograph can be removed from its conventional backing. Then, either in the water or removed from the water, this emulsion can be laid as desired, onto another backing, such as the inventive image surface or a part thereof. For example, this emulsion can be lifted out of the cold water with the temporary support of a sheet of acetate, vinyl or mylar, e.g., the acetate can be on top of the emulsion, with the acetate supporting the emulsion wrinkles can be taken out of the emulsion by dunking the acetate supported emulsion in and out of the water, and the acetate can be peeled off of the emulsion once the emulsion is laid on the inventive image as desired. Then once the emulsion is laid as desired on the inventive image, if acetate or another temporary support was used to transfer the emulsion onto the inventive image, it can be peeled off of the emulsion. Polaroid also states that the emulsions on developed prints made using Polaroid films such as Time-Zero can be peeled off their Mylar backings, and that the white developer should be washed off of these emulsions. Emulsions used on inventive images can be placed, laid, and altered on one or both of sides at any time as desired. Thus for example, in removing an emulsion from its conventional backing, in transferring it to the inventive image or part thereof, once it is on its new backing, or at more than one of these times, said emulsion might be flattened, stretched, wrinkled, torn, cut, perforated, folded, colored or marked, or changed in a combination of these ways, etc. Polaroid recommends the use of a soft rubber Breyer roller, squeegee, a warm image dry-mount press, or a combination of these. In addition or instead, said inventive image can be further processed as desired, e.g., with bonding spots or Separating Layers that may strengthen the bond between the emulsion and said inventive image, or that may enable superimpositions. Once emulsions are installed as desired, their inventive images may be finished, but if they are not they may be further processed.

Information from Polaroid Corporation of Cambridge Mass. is in their over sized brochure on "unusual instant photography techniques", entitled, "{Inspiration} A Step-By-Step Guide" printed in USA, August 1995. Information from Polaroid is also at 1-800-225-1618 and on their web site, www.polaroid.com, within which are many documents.

For example, an emulsion measuring 10 inches by 8 inches might be transferred onto a clear colorless polymer measuring 14 inches by 12 inches by 0.8 inch to make a photographic transparency with a border around it. This photographic transparency may be the complete image or it can be further developed and controlled as desired. For example, this inventive image might be further processed by the superimposition of a Separating Layer of polymer completely covering it embedding its photographic transparency. Then, drawing and painting might be done on the new Separating Layer of polymer. If this image is not complete, it might be further processed by the superimposition of a second photographic emulsion, partially or entirely over the first one. In addition, or instead, a second piece of preformed polymer measuring 8 inches by 4 inches by 0.8 inches might be bonded to this inventive image using a bonding agent, forming a plane that is at a right angle to the original plane of the inventive images. If the image is still not complete, it can be further processed as desired.

By phone, the technical staff at Eastman Kodak Company of Rochester, N.Y. says that the emulsions of all Kodak photographs can be removed from their Kodak backings (e.g., in warm water), and transferred onto other surfaces. They note that there are articles describing such processes in photography periodicals.

In a further illustration of this embodiment, one or more photographs, transparencies, parts thereof, or combinations of these can be made on an inventive image or on part thereof. For example, a photographic emulsion may be applied on one or more inventive image surfaces of any description, at any stage in their development, e.g., on polymer or non polymeric surfaces that are flat, curved, textured, perforated, transparent, translucent, partially opaque, opaque, or combinations of these. For example, a photographic emulsion might be applied on an inventive image over polymer LED(s) or over a Separating Layer of polymer separating the photo emulsion from OLED(s). Applications of photographic emulsions may be made on surfaces of inventive images in any way desired, e.g., they do not have to be continuous applications. The resulting inventive image may be complete or further processed as desired.

One company that sells emulsions that can be used as part of inventive images in this embodiment is Rockland Colloid Corporation of Piedmont, N.Y. Rockland Colloid's photographic emulsions are named LIQUID LIGHT®, AG-PLUS®, etc. The contrast of the resultant image can be increased by adding a small amount of print developer (working solution) to the Liquid Light emulsion (e.g., one part developer to ten parts emulsion); by aging the emulsion after it is applied; or both. When dried, that photographic emulsion is exposed to light selectively, just as if it were a photographic print paper. When developed, washed (an acidic "short-stop" cannot be used), and fixed (e.g., with standard photographic chemicals available in any photographic store), the result is a negative print of the light to which it was exposed. In other words, should a black and white negative be projected onto that emulsion, then after processing that emulsion would be a negative-of-that-negative or a simple positive print much like a similar positive print on paper. If the surface under the emulsion is opaque, then the developed photograph will resemble a positive print on paper. If the surface underlying the emulsion is transparent or translucent, (e.g., polymer), the positive print will resemble a photographic transparency. Further examples of variations of this embodiment, can be made using other products available from Rockland Colloid. For example, Rockland Colloid sells a chemical to tint the residual silver emulsion, or its background. Rockland Colloid also sells a preparation HALO-CHROME® Silver Toner that transforms the black microparticle silver of the negative images into a bright mirror-like highly reflective silver, and such a reflective surface appears essentially as a positive of the light source. If desired, more than one type of photograph or transparency might be formed on an inventive image of this embodiment.

LIQUID LIGHT® photographic emulsion might, for example, be made as follows. It may have 20% Silver halides having these ingredients: 5% Silver Bromide; 5% silver chloride; and 10% Gelatin. LIQUID LIGHT might also has a trace percentage of Cadmium chloride (Sara III), and less than 95% water.

AG-PLUS® photographic emulsion might, for example, be made as follows. It may have 40% silver halides having these ingredients –10% silver bromide; 10% Silver chloride; and 10% gelatin. AG-Plus® might also have a trace percentage of Cadmium chloride (Sara III), and less than 95% water. Halo-chrome® Toner might, for example, be made as follows. It may have an ammonium hydroxide/sodium hydroxide solution made of 30% ammonium hydroxide (Sara III); 2.5% sodium hydroxide (Sara III); and 67.5% Non hazardous ingredients and water. Bleach for Halo-chrome® might for example be made with 38% cupric chloride (Sara III) and 62% water. Hardener For Subbing might, for example, be a Chromium Potassium Sulfate, 10% solution with 90% water.

Luminos Photo Corporation of Yonkers N.Y. also has an emulsion that can be used in this embodiment called Silverprint Liquid Emulsion that is produced by Kentmere Ltd UK. It is a blue-sensitive silver halide sensitizer that displays deep rich tones, excellent contrast and exceptional detail. Because it is a gel at room temperature, Silverprint Liquid Emulsion needs to be heated to be liquefied, e.g., in a water bath of hot water at 110° F. to 120° F. for 45 to 60 minutes. Shaking and vigorous stirring may cause undesirable air bubbles. This emulsion can be applied onto any kind of inventive image surface desired, using any method or manner desired, preferably using safe light conditions (e.g., amber or light red light). The emulsion can be diluted for a variety of different effects, however anything more than 1:3 dilution may result in black spots. Like Liquid Light, Silverprint Liquid Emulsion might for example be painted on an inventive image, poured, dripped on, rolled on, sprayed on, dipping processes might be used, multiple coats might be applied, etc. Silverprint Liquid Emulsion will bond to an alkyd-based underlayer, such as a conventional alkyd paint or painting medium e.g., an alkyd surface preparation stabilizer. Applications of Silverprint Liquid Emulsion on inventive images can be liquefied (e.g. to rework them) by heating them, e.g., with hot air from a blow drier. The emulsion is preferably dried in total darkness, chilling it or cool air can will speed this drying. Then the emulsion can be exposed to light as desired (e.g., with an enlarger or contact printing with a slide projector), developed using conventional practices (washed preferably with running water, an acidic "short-stop" cannot be used), and if desired, further processed as desired. As example, Silverprint Liquid Emulsion could be substituted for LIQUID LIGHTS in the forthcoming examples. Silverprint Liquid Emulsion might, for example, be made as follows. It might have 93.5% water, 3.8% gelatin, 0.05% Phenol, 2.4% silver halides, 0.26% ethanol and 0.004% stabilizer. It might contain silver bromide. Further information is available from Luminos Photo Corp.

Two books describe practices that might be employed in making inventive images, 1) Polaroid Transfers: A Complete Visual Guide to Creating Image and Emulsion Transfers by Kathleen Thormod Carr, published by: Watson-Guptill Publications, Incorporated; Jun. 1, 1997; Imprint: American Photographic Book Publishing Company; and 2) Silver Gelatin: A User's Guide to Liquid Photographic Emulsions by Sarah Jones with Martin Reed, published by Watson-Guptill Publications, Incorporated, August 1996.

Examples of further effects for inventive images of this embodiment that have transparencies are the use of: additional lights (such as polymer LEDs), or additional light qualities and effects (e.g., reflective materials). For instance, a photographic transparency might be attached to a polymer (e.g., an image support that may be a stabilizer) back lit by polymer LED(s) or EL Lamp(s). Thus, if desired, an inventive image of this embodiment, or part thereof, might have one or more illuminated transparencies, e.g., like one or more overlays, films, or photographic transparencies on a light box.

In addition, or instead, if desired, one or more montages or photomontages can be done on or in an inventive image or part thereof as desired. In addition, or instead, if desired, an illuminated transparency, a montage, a photomontage, or combinations of these, might be part of an inventive image in one or more other ways. Furthermore, if desired, an inventive image or part thereof, might be one or more montages, photomontages, photographs, transparencies, illuminated transparencies, surfaces for projections, new forms of photographs or transparencies, or combinations of these, etc. Further these inventive images can be new and unique versions of these conventional art forms.

Inventive images or part thereof, are one or more sun prints, photograms, negative photographic prints, positive photographic prints, negative photographic transparencies, positive photographic transparencies, holograms, or as combinations of these, as desired. These can be transparent, translucent, opaque, partially opaque, or combinations of these, and they can be further processed as desired. For instance, inventive images or part thereof might be transparent photographic transparencies made on polymer that is transparent, translucent, opaque, partially opaque, or a combination of these, e.g., portraits landscapes, abstractions, photographs of conventional images, etc. If desired, these photographs may be altered as desired in a computer program before they are part of an inventive image. As an illustration, a conventional photograph on conventional photographic paper might be bonded to the flat backside of an inventive image using any singular or multiple methods, means and manners desired, for viewing through its other sides, any and all of which might be painted, carved, flat, undulating, perforated, textured, inlaid, printed upon, written upon, designed with one or more photographs on them, with embedding, designed in one or more other ways, or a combination of these. In a further illustration, one or more photographic transparencies are made or transferred onto the backside or the underside of transparent or translucent polymer in making an inventive image.

It is sometimes desirable to cover photographic emulsions on external surfaces of inventive images with a material that protects them from undesirable changes. For example, a photographic emulsion can be coated with a stabilizer, a material or a medium, that protects it from UV light, e.g., cPRM with a UV stabilizer in it, or a standard protective spray available in a photographic or art supply store that might, for instance, be an acrylic spray containing a substance that absorbs UV light. For example, the polyacrylic spray described above can be applied on a photographic emulsion on an inventive image, preferably in more than one layer, letting each layer dry before applying the next layer. Care and precaution to avoid or to prevent undesirable changes to a photographic emulsion on an inventive image are often desirable prior to superimposing it with anything. A photographic emulsion on an inventive image might, for example, be superimposed by: cPRM, polymeric or non polymeric ingredients.

The present invention expands the use of photographs, transparencies, parts thereof, and combinations of these in images far beyond its prior boundaries, e.g. with a wide variety of qualities and effects that are not available in conventional practices, such as: real variable spatial depth; real variable light; light effects; layered effects; etc.

In an embodiment, one or more holograms are part of an inventive image or part thereof, e.g., in or on the image. For example, a hologram can be attached to an inventive image, inlaid in it, embedded in it, or it can be a part of an inventive image that is not physically attached to it but which is visible through its transparent polymer or glass. For instance, holograms made by DuPont Displays in Logan Utah may be used in inventive images. In a further embodiment, one or more conventional images or part thereof that are stereoscopic, autostereoscopic, lenticular, computer generated, or a combination of these are part of an inventive image.

In another embodiment, one or more PHSCOLOGRAMS® are part of an inventive image. PHSCOLOGRAMS® are inventions by Ellen Sandor of Chicago, Ill.; Daniel Sandin of Chicago, Ill.; William Cunnally of Island Lake, Ill.; and Stephan Meyers of Chicago Ill. PHSCOLOGRAMS® are described in several patents, e.g., U.S. Pat. Nos. Re35,029, 5,113,213, 5,519,794, and 5,330,799.

In an embodiment one or more solar panels are used in inventive images. The energy captured by such solar panels may be used as desired. For example, solar panels on an inventive image might provide the energy for conductive polymer(s), for one or more lights illuminating that inventive image, they might provide energy to run sound, video or a computer equipment on the same image, they might provide the energy to run a motor or a fan on the same image, (e.g., on a mobile or kinetic sculpture) or a combination of these.

In the use of the present invention a wide variety of surface light qualities and effects can typically be developed, reworked, and controlled as desired, entirely or partially on one or more sides inventive images, as well as from within them, as desired, at any time during or after their formation, using any methods, means and manner desired. Many examples are herein such as these. Surfaces of inventive images can have variable light effects and qualities from a) the use of real and illusionary forms of light (tangible or intangible), transparency, translucency, or a combination of these; b) texture; c) light that is direct, indirect, diffracted, reflected, distorted, colored, from any direction or from many directions; d) gloss, semi-gloss and matte effects; e) iridescent, dichroic, metallic, reflective, pearlescent, interference, fluorescent or phosphorescent effects; f) polymer and from non polymeric ingredients; g) the process or processes of their formation (e.g., use of superimposed transparent layers, incising, abrading, bonding processes); h) use of underlayers; i) one or more marks, patterns, designs, drawings, pictures, writings, texts, drawings in light; j) various other forms of coloration; k) combinations of these.

The present invention offers a myriad of surfaces light qualities and effects, typically with workability, reworkability, and controllability as desired, even with the use of non polymeric inventive image ingredients or conventional practices (such as oil paints, watercolors, pastels, etc.), that are limited, problematic and burdened by undesirable issues in their conventional applications, but which yield a myriad of new possibilities and freedom that is significantly greater than that offered by most other conventional images (particularly most of those that are permanent, workable, reworkable, and controllable) in inventive images. The variety, the workability, reworkability, and controllability; the aesthetic possibilities, and the freedom available with the surface light qualities and effects of inventive images, is limited or only marginally existent in the formation of many other strong permanent conventional images made using conventional practices. Despite the old, long standing ideal Principle of Whole Development and Unity, it is rare for surface light qualities and effects in strong permanent conventional images to be as workable, reworkable, and controllable as desired, even though other formal elements in these conventional images are significantly more workable, reworkable and controllable, e.g., formal elements such as color, form, function, method of display, etc. In many strong permanent conventional images, these surface light qualities and effects were and are commonly limited, e.g., limited by the choice of the conventional medium before the image was begun and limited by other conventional practices, for example, all that could be done was and is ofen a choice between matte, glossy and semi-gloss finishes, applied in a uniform manner, on a conventional image after it was or is completed, often when it was too late for important aesthetic elements, or any significant aesthetic elements to be added to them. Consequently, it was and it is rare to see surface light qualities and effects used as important or meaningful aesthetic elements in many strong permanent conventional images.

For example, among the major limitations, problems and undesirable issues in the use of surface light qualities and effects in permanent conventional image making, are the restrictions that govern superimposed layering (such as fat over lean that governs the layering of oil paints). (See previous text). Fat over lean makes free use, and control of surface light qualities and effects a risk to the strength and permanence of oil painting. In painting with oils according to fat over lean, layers of oil paint are superimposed with increasing percentages of fat ingredients. Thus, oil painted surfaces commonly become more glossy, as layers with added oil are superimposed, and more matte as oil paint layers with added wax are superimposed. But, the number of oil paint layers that can be superimposed is limited because high percentages of oil in oil paints risks their strength and permanence. Layers with high percentages of wax risk the strength and permanence of the images too, because of their softness and fragility, e.g., they scratch very easily, dust sticks to them, etc. In addition, though there are a variety of materials, media, objects and combinations of these, that can be mixed into oil vehicles and into oil paints for use independently, or for use with other oil paints, (e.g., iridescent, pearlescent, interference, and metallic pigments are available as dry powders, some of which are made with mica rather than metal so they are permanent; and thixotropic paint additives), these can risk the strength or permanence of the images. The conventional practices available for further surface light qualities and effects in permanent oil painting, e.g., light qualities and effects from textures, inlays and attachments, are also quite limited, problematic and burdened by undesirable issues.

The general perception of surface light qualities and effects as aesthetically neutral, even meaningless elements in permanent images has heretofore been common, but unknown to many, this has seldom been determined by image makers, in fact it has seldom had much relationship to the aesthetic desires of image makers, or to the surface light qualities and effects that image makers would desire or use if a variety of options were available to them in using conventional practices to make images. Generally, surface light qualities of many kinds of conventional images were and are uniform, e.g., traditional paintings. It was either decided by the choice of conventional image making practices before the image was made or it was decided by the choice of a sealer, coating, covering or other such agent applied to the image after it was completed, e.g., the use of a matte, glossy or semi gloss coating, like a varnish, over a conventional painting or sculpture. The use of surface light qualities and effects in many conventional images was limited, often extremely limited, by conventional practices, unless the strength or the permanence of the conventional image was or is risked or compromised. The present invention offers solutions to this problem. Inventive images can have surface light qualities and effects that are unique, that are much more varied than ever before, and inventive images can have surface light qualities and effects the likes of which no conventional images has ever had. For example, matte, opaque, textured, and light absorbent surfaces can be dramatically contrasted against the real transparency, real translucency, real depth and real light of transparent or translucent polymer to form an inventive image, unlike any ever seen before. As a different kind of example, a polymer inventive image surface can be painted with oil paints. Then if desired, painted parts of this surface can become matte by superimposing a Separating Layer of polymer over them. Then, parts of that Separating Layer of polymer can be covered with a matte acrylic paint, or abraded, or both, in order to achieve the exact surface light quality or effect and the exact overall aesthetic desired. Using the surface light qualities and effects of the present invention, can catalyze a change in the general perception of the surface light qualities and effects in images, because an enormous variety of surface light qualities and effects can freely be determined by image makers for the first time ever.

The fact that inventive images can have real variable tangible light within their forms, and the fact that there are a myriad of other ways of using all kinds of forms of real light in inventive images as desired are important factors enabling inventive images to: a) be as free from the use of illusions as desired (e.g., successful without relying on illusions, or successful without any illusions); b) to be successful with one or more new unique illusions, c) use real light as desired, e.g., without undesirably visibility of cords, wires, bulbs and other such necessities for using real light in conventional images, or without any of these elements; d) use real light as desired, e.g., without undesirable specifications for the location in which it is viewed, for the way in which it is set-up, installed, displayed or exhibited, both of these, or without either of these specifications; e) have the sense that they are made with light as part of their aesthetic, e.g., integrated and considered like other formal elements; f) have other desirable content, meaning, aesthetic elements, and aesthetics (e.g., luminosity, glow, sparkle, radiance, spirituality, etc.); g) be new unique variations of conventional art forms, and even to be new unique art forms, h) other consequences described herein, and combinations of these.

More specifically, the new and unique use of light and other formal elements in inventive images enable them to focus on relationships involving light as never before. Examples are the relationship between light and dark; between light and shadow; between transparency and opacity; between varying densities of transparency or translucency between various ways of seeing through and into the inventive images; between the use of space and the use of use of light; between the use of illusionary light, illusionary transparency or translucency, and real light, real transparency, or translucency; or a selection of these; between reality and illusion in other ways; etc. For instance, any one of these relationships, or two or more of them, can be used as subject matter in an inventive image. Many of the resulting inventive images are new, unique, and some are so innovative, that they have never been created in images before.

Further Description of the Methods, Means, and Manners in which Inventive Images are Set-up, Presented, Installed, Displayed, and Exhibited Inventive images can be set-up, presented, installed, displayed, exhibited, or used in combinations of these ways, using any conventional, or any novel method, processes, means, manner, materials, media, objects, devices, or their combinations of these as desired. In some embodiments, inventive images are set-up presented, installed, displayed, exhibited, or prepared for viewing with specially designed mounts. Inventive images might be set up for viewing using mount systems designed to enhance their notable aesthetic elements, such as their transparent or translucent spatial depth and their use of light, often in combination with their use of color and/or other elements. It is often desirable to display transparent and translucent inventive images so that the view through the image and the light on the image are aesthetically desirable, e.g., the inventive images is displayed, at a distance determined by the image maker in front of a reflective surface like a white wall. Inventive images can be displayed using one or more parts that may or may not be image parts, e.g., such as a conventional base, pedestal, frame, or mat that are not part of the inventive image. Parts of inventive images that enable them to function (such as electrical wires, transformers, and components for light sources) may be visible to viewers, hidden from view or both.

In an embodiment, inventive images are set-up, presented, installed, displayed, exhibited, or used in a manner which is interactive with one or more viewers. For example, an image might be set-up so that viewers have to walk through it, or into it in order to see it. The relationship between the space (or environment or site) in which an image exists, and the way in which that it is set-up, presented, installed, displayed, or exhibited, in that space can affect that inventive image enormously. If desired, image makers can control and use this relationship, as desired, to affect an inventive image in myriad of ways ranging from slight to major, as desired. For example, viewers may have to rotate an inventive image, turn a lever, the inventive image may have an interactive computer, or the physical presence of viewers may interrupt a signal sent off by an inventive image that may respond to this interruption. The interaction of an inventive image or part thereof with one or more viewers can form, alter or control effects in an inventive image. For example, a sensor in an inventive image might detect a viewer's presence and change the light of the inventive image accordingly. For example, an inventive image might require viewer participation, e.g., the viewer might have to touch or step on a sensor for the inventive image's light to change, the viewer might have to activate a key or a button to show a light effect in an inventive image (such as pushing a computer key), or the viewer might have to push or rotate a part of the inventive image to cause its light effect, etc. As a more specific illustration, by pushing a part of an inventive image that has negative cut-outs within its positive form, that part of the inventive image rotates and the pattern of light and shadow it makes on the floor or the wall changes as it rotates.

As an illustration, inventive images can be made that interact with viewers in the same way or similar to the way of Robert Rauschenberg's *Soundings* 2, 1968 v.2 that is 96×432×54 and composed of three rows or layers, each with nine acrylic panels. Sensors within *Soundings* 2, cause different levels of illumination in response to different sounds from viewers in a darkened exhibition space. The visibility of silkscreened prints of chairs on *Soundings* 2's three layers of acrylic panels is determined by how much of *Soundings* 2 is illuminated. Similarly the light effects of inventive images can be determined by the sounds of viewers. As another illustration, an inventive image can be made that interact with viewers in the same way as Rauschenberg's *Solstice,* 1968 with four superimposed layers of transparent acrylic doors each of which has a different Compositional Arrangement of colored silkscreen prints on it. Each layer of these doors automatically opens for viewers to enter the artwork and seeing it from multiple points of view. See-through inventive images and interactive inventive images can be made with many more variations of effects of light and color than these artworks by Rauschenberg. With or without the use of these enhanced effects, inventive images can be made which open up for viewers to walk into and see from multiple vantages.

Figure 73:
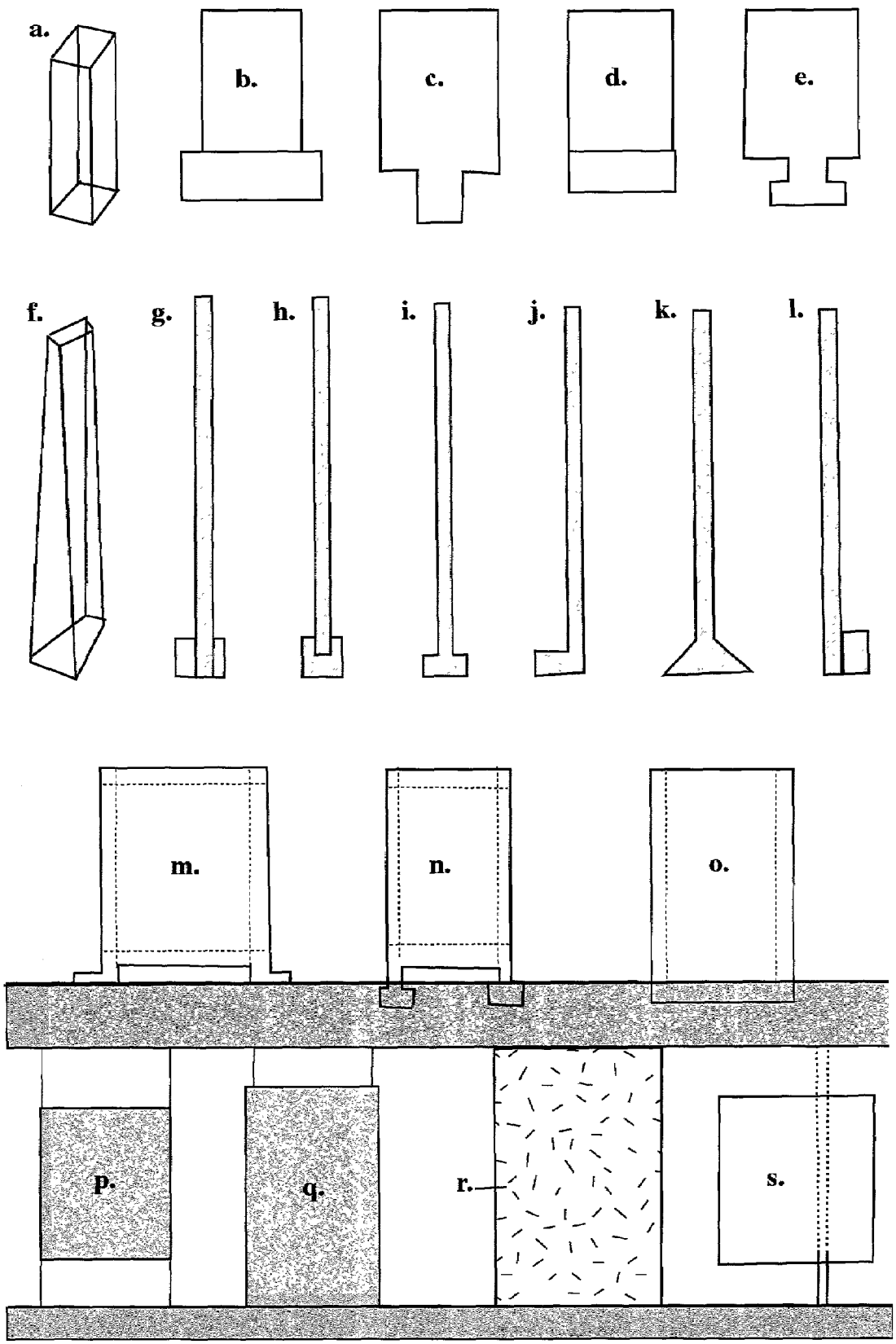
FIG. 73 shows varied examples of how inventive images can be displayed.

Some examples of ways that 2D or 3D inventive images might be set up for display are shown in FIG. 73. Note that though these inventive images are almost all simple forms (e.g., rectangular), the forms of inventive images such as those using these methods of display are not restricted to such simple forms.

FIG. 73.*a*.-1. shows inventive images that might for example be freestanding, some of these might have attached bases. These inventive images, others that are freestanding, large inventive images, and inventive images that are a combination of these, might for example be weighted so that their upper portions are light in comparison to their lower portions (e.g., their upper portions might be hollow, thinner than their lower part, or made of a composition that is lighter than their lower part).

FIG. 73.*m*. shows a freestanding inventive image that is supported by leg-like parts or braces on its sides. As the dotted line around the perimeter of the inventive image indicates, these supporting parts may or may not be part of a frame around this inventive image, e.g., for support.

FIG. 73.*n*. shows an inventive image that also has leg-like parts or braces, but these are secured in the floor, the ground, or into another base or structure for support. As the dotted line around the inventive image's perimeter indicates, these supporting parts may or may not be part of a frame around this inventive image, e.g., for support.

FIG. 73.*o*. is an inventive image that extends down into a structure below for support, e.g., into the ground, a base, or a floor. As the dotted line around the perimeter of the inventive image indicates, this inventive image might have a frame on its right and left sides, e.g. for support.

FIG. 73.*p*. shows an inventive image that is held up by vertical supports on its right and left sides that go to from this image to a structure beneath it, and from this image to a structural support above (though one or both of these vertical supports may or may not run the length of the inventive image). For example, these may be rigid or taught flexible rods, bars, poles, wires, or cords (e.g., polymer, metal or wood vertical supports).

FIG. 73*q*. shows an inventive image that rests on a structure below (e.g., the floor, the ground or a base) and is held at both of its upper sides by flexible or rigid mount parts (e.g., wire, cords, rods, bars, etc.) to a structure above it (e.g., a ceiling, beam, rod, archway, etc.).

FIG. 73*r*. shows an inventive image that is secured to both the structures above and below.

FIG. 73*s*. shows a 2D or 3D inventive image held by a vertical support off of its vertical center, e.g., this support might be an attached rod, beam, bar, column, or another such vertical structure, for instance, made of polymer, steel, wood, taughtly secured wire or cord, or a combination of these, etc.

The twelve 2D or 3D inventive images in FIG. 7 are a few examples of ways that inventive images can be strengthened or reinforced using layers or parts (e.g., strengthening stabilizers shown in gray in each image) that are on or in their polymer (shown in white). These colors are for clarity in understanding this illustration and do not necessarily indicate coloration in these images. These strengthening layers or parts may enable these images to be displayed in the manner desired, e.g., by strengthening, supporting, or enhancing the support of the weak or less strong, flexible, fragile, delicate, brittle, gelatinous, or somewhat gelatinous polymer that comprises most or all of the rest of these images. The polymer part of each image that is strengthened by the added layer or part might be 2D or 3D, and transparent, translucent, or opaque, and the same description applies to the strengthening layer or part. The images in FIG. 7. may or may not have additional aesthetic elements that are not illustrated (such as coloration, incising, other compositional elements, air pockets, etc.). The strengthening layers or parts on these images (shown in gray) might be polymeric, or non polymeric, e.g., they might be comprised of a cross linked polymer, a rigid polymer, another strong polymer, wood, or metal. In each of these inventive images in FIGS. 7.I.-XIII., the strengthening layer or part (shown in gray) might be within, underneath, or over part or all of their polymer layer (shown in white). Also, the strengthening layer or part in the images of FIGS. 7.I. and II. might be attached to the edge around the perimeter of each of these images, e.g., like conventional frames or mats.

The inventive images in FIGS. 7.III. and IV. each have ribs or struts that function as a strengthening layer or part. FIGS. 7.V.-IX. show other variations, the design of which, as in the other images in FIG. 7., may contribute to the strength, stability, permanence, or ability of these images to be displayed, and also to their aesthetic, provided both the polymer layer and the added strengthening layer or part are visible when the image is displayed. The polymer layer or part of the inventive images shown in white in FIGS. 7.I., II., V., IX., and X-XIII., might for example, be flexible. In the images in FIGS. 7.X.-XIII., this flexible polymer might even be rolled or folded up (e.g., like a scroll) on their other strengthening part (shown in gray) that might be rigid. Also, the strengthening layer or part may enable the images illustrated in FIGS. 7.I., II., IV., and IX. to be self supporting or free standing. This is also true of the images in FIGS. 7.X.-XIII. if their strengthening layer or part is larger than their other layer or parts made of polymer.

Another example is shown in FIG. 20 where the inventive image might have a strengthening layer (for example an image support shown darkly colored, e.g., a dark red transparent polymer, a reflective metal or mirrored layer, etc.) encased in polymer (shown in white). Also, FIGS. 71.II. and 72 both may show inventive images with strengthening layers that have the same width and length as the polymer layers they are upon. In FIG. 71.I. this strengthening layer may be another layer of a polymer that is different from and stronger than this image's initial polymer layer, e.g., a polymer that is cross-linked or rigid. In FIG. 72, this strengthening layer is a fiber added to the image's polymer image support in FIG. 72.III.

FIG. 79 shows side views of examples of the wide variety of different ways inventive images can be made and hung, installed, or mounted for display. These images might be any size, and they might be installed at any height. The fine, straight, vertical lines in FIG. 79. represent walls on which many of these images are displayed. The horizontal line in the center of each page of FIG. 79, may indicate a floor, ground, another base, structure, or a ceiling. The images in FIG. 79 might be mounted or installed using conventional practices, or using individualized variations of them.

FIG. 79I. shows a concave image (e.g., that may function as a large lens) mounted out from a wall. FIG. 79II. shows an inventive image made of three parallel polymer planes which might have different thicknesses, and which might be freestanding, e.g., it might be a painting, a sculpture, a wall, or even a screen. This image (and others made of multiple parallel planes) might take advantage of the transparency and translucency of the inventive medium. For example, the viewer might see this image as a composite of the aesthetic elements on several or on all of its six exposed surfaces or within its three planar polymer forms, e.g., as a painting made many layers each of which may have any of the aesthetic effects described herein. Among the other inventive images in FIG. 79 made of superimposed planes that might also be seen as a composite view of aesthetic elements at multiple, different real spatial depths using negative space, are the inventive images shown in III., V.-IX., and to some extent XII., XV-XVI. The images in FIGS. 79.III.-V. are constructions that might also be enhanced by the novel aesthetic variations that can be created using this invention. The image in FIG. 79.V might be placed on the floor using its mount parts as legs (with the side of the image shown on the left in the illustration on the floor) and reworked into an image that also functions as a table. The images in FIGS. 79.VI. and VIII. might function as paintings or as screens or walls. The image in FIG. 79.IX. might use the plane of its form that is flush against the wall as a surface that contributes to the image aesthetically and is visible though the polymer of the image's other vertical plane, e.g., this plane against the wall might have coloration on it, it might be reflective, or it may emit light. In comparison, the images shown in FIGS. 79.XV., XVII., and XIX., that are mounted out from the wall without a planar part flush against the wall, might be enhanced by light reflecting off of the white walls behind them. The images in Figs. X. and XII. might also be enhanced by light reflecting through them from the walls they are flushly mounted against. Any or all of the images shown in FIG. 79. might emit light using conductive polymer(s), e.g., using polymer LED(s) in or on their polymer forms. Thus, in addition to their aesthetic function, one or more of these inventive images might be a light source.

In embodiments, a sealer, a coating, a varnish or a similar protectant is used on an part or all of an inventive image. Such a surface layer might enhance the image's permanence, or it might contribute to the image aesthetically, e.g., evening out the surface and providing a surface light effect.

In an embodiment a new unique rigid mount system is made and used for setting up, presenting, installing, displaying or exhibiting inventive images. In another embodiment a new unique wire mount system is made and used for these same purposes. In a further embodiment, a new unique mount system is made with a design that is a combination of the rigid mount system and the wire mount system. These specially designed mounts are stabilizers. Use of one or more of these mount systems can create a wide variety of set-ups, presentations, installations, displays, exhibitions, or other modes of viewing inventive images that are structurally and aesthetically effective, and that can be new and unique. For example, with or without any other method, means, or manner for their set-up, presentation, display, installation or exhibition, any of these mount systems or a combination of them can affect inventive images structurally, aesthetically, functionally, or have a combination of these effects, to any extent desired and in any manner desired, ranging from a critical effect to no noticeable effect at all, as desired. All of these mount systems are typically workable, reworkable, and controllable as desired. For example, they can be adjusted without removing them or they can be removed, and then if desired, replaced, altered, repositioned, etc. For example, their aesthetic can be shaped as desired because their basic forms and structures are so minimal and simple. Used with inventive images, any or all of these mount systems can be hidden from view or visible as desired. It is preferred that the visibility of each of these mount systems be aesthetically desirable, or it is preferred that these mounts systems be hidden from view, e.g., by the opacity of the part of the inventive image between the mount system and viewers.

The aforementioned rigid and wire mount systems, and mount systems that are combinations of these, are comprised of one or more mounts, each of which has the same basic, three-component design. Component (A) is an anchoring mount component to securely hold the inventive image onto the mount. It is embedded or inlaid in, attached to, or placed against the inventive image as desired. Component (B) is an adjustable middle, mount component that holds and fixes the inventive image at the desired distance from the structure from which it is mounted (e.g., from a wall or ceiling), while typically leaving the space in between the inventive image and the structure from which it is mounted, adjustable as desired, controllable as desired, and often workable and reworkable as desired. These adjustable mount components may also absorb shocks to the inventive image that might otherwise cause its polymer and perhaps other parts to crack undesirably or incur other undesirable changes. Component (C) is a mount component on the structure from which the inventive image is mounted, that connects to the inventive image's aforementioned middle mount component. The basic, minimal forms of all three components of the mounts comprising rigid mount systems, wire mount systems and mount systems that are a combinations of both of these, are intended to facilitate the creation of innumerable, diverse, individualized variations, as desired. For instance, the basic forms of all three mount components for all three of these mount systems can be formed, sized, shaped, embellished, and finished individually in a myriad of variations, as desired, e.g., for structural needs, aesthetics, or for other functions, as desired. A single inventive image can be set-up, presented, installed, displayed, exhibited or prepared for viewing in a combination of these ways, using one or more rigid mounts, one or more wire mounts, one or more mounts that are a combination of a rigid and a wire mount, or using any combination of these mounts, simultaneously or interchangeably. It is preferred that most of the parts used in all three of these mounting systems are metal, preferably, steel or stainless steel.

Any of these three mount systems can be used to install inventive images as close as desired to a structure (such as a wall or ceiling), or as distanced from it as desired (e.g., leaving space, air, and light in between, as desired). Further, this proximity may be permanently freely adjustable in any of these three mounting systems without any compromise or sacrifice to any preference in the inventive image, (e.g., without sacrificing the image's strength or permanence), and without reworking the image. For example, a with rigid mount system, a wire mount system or with a combination of these, the display of a single, inventive image can have areas mounted flushly against the wall, and other areas mounted away from the wall (e.g., in inventive images that have one or more changes of level on their backsides, or in inventive images mounted with their backsides angled in relation to the wall). Any of the mounts from these three mount systems can have any number of attachments to one or more parts of an inventive image, as desired (whether they are polymeric or non polymeric parts of an inventive image). In general, for stability in mounting inventive images from vertical structures like walls with any of these mounting systems, one mount going from an inventive image to its vertical supporting structure can be undesirably risky for most inventive images. In general, an inventive image on two mounts may rock undesirably. Thus, on vertical structures, it is generally preferable to use three or more mounts (from any or from multiple mount systems), going from the inventive image to the structure from which it is mounted. Each mount system is comprised of one or more mounts and each of these parts is comprised of three components referred to herein as Mount Component (A), (B), and (C).

In an embodiment, rigid mounts are made, and one or more of them are used to set-up, present, install, display, exhibit or to prepare inventive images for viewing in a combination of these ways. For example, in one design for rigid mounts, most of the rigid mount components function against the pull of gravity, holding up weight. Rigid mounts can be used in a mount system that is completely comprised of rigid mounts, or in a mount system that is comprised of rigid mounts and one or more other kinds of mounts. In an embodiment, wire mounts are made, and one or more of them are used to set-up, present, install, display, exhibit or to prepare inventive images for viewing in a combination of these ways. For example, in one design for wire mounts, most of the wire mount components function along with the pull of gravity, i.e., weight hangs from them. Wire mounts can be used in a mount system that is completely comprised of wire mounts, or in a mount system that is comprised of wire mounts and one or more other kinds of mounts. In an embodiment, mounts are made that are a combination of the aforementioned rigid and wire mounts, and one or more of them are used to set-up, present, install, display, exhibit or to prepare inventive images for viewing in a combination of these ways. These combination mounts can be used in a mount system that is completely comprised of such combination mounts, or in a mount system that is comprised of such combination mounts and one or more other kinds of mounts.

Mount Component (A) is the anchoring mount component that is embedded or inlaid in, attached to, or placed against the inventive image. Because carving a cavity into an inventive image to embed or inlay its anchoring mount component may substantially weaken both the inventive image and its connection to its mount (e.g., possibly cutting through an inventive image's fiber layer exactly where more strength is needed), it is often preferable to thicken the inventive image (e.g., by adding fiber) where mount components are embedded, inlaid, attached, or placed. It may be preferable to form the appropriate image area or areas with their anchoring mount component or components in them. In thickening areas on the backside or underside of an inventive image to embed a mount component, or for any other purpose, the diffraction of light caused by abrupt edges of these thickened areas may be visible as shadow lines seen through the inventive image. By tapering these edges or any other similar image areas so that they slope gradually, such visible, shadow lines can be eliminated. When these mount components are connected to polymer, a stronger polymer than that used for the rest of the inventive image may be preferable in the mounting area or areas, even for example, if the use of such a monomer compromises other preferences for that inventive image. Because it is preferable that they remain permanently within the inventive image, it is preferable for embedded mount components to be made of strong permanent materials (e.g., stainless steel rather than steel), and installed fairly flush with the inventive image's surface. Like all embedding and inlays in inventive images, anchoring mount components can be reworked, removed or replaced if desired. Further it is preferable to be aware that all mount components made of materials that do not absorb knocks or shocks (like metal mount components protruding significantly out of the inventive image) are risks, because if knocked, polymer may be at risk for cracking or breaking.

These anchoring mount components are made of two pieces joined. One piece anchors the inventive image onto its mount. This first piece is preferably designed with as wide an expanse and as deep a grip as the inventive image can aesthetically handle. Like all materials embedded, inlaid and attached polymer, if these pieces are significant in size they should either have close to the same coefficient of expansion as their polymer host, or it is preferable to take measures to lessen differences in coefficients of expansion that put the image at risk, e.g., by perforating the anchoring mount component, etc. (Refer to the prior description of this subject herein.) If desired, for extra strength, permanence or both, further measures can be taken, e.g., fiber can be installed on the inventive image through the perforations of most embedded, inlaid or attached mount components (for example, as cut strips or chopped). The other piece of anchoring mount components is welded, silver soldered, mechanically secured, or otherwise a part of, or joined to its first piece. When embedded in the inventive image, only this part of the anchor mount component remains permanently exposed—it is in effect inlaid rather than embedded. It is half of a mating set of hardware connecting the inventive image to the other two components of the same mount (e.g., it might be a hex nut, or an eye loop). If the anchoring mount component attaches to the inventive image on an area that is metal, only its second half, the exposed, half of the mating set of hardware is necessary. Its anchoring part can be eliminated.

Mount Component (B) is the adjustable, middle mount component and may have a rigid form or a wire form. The basic, minimal design of the rigid form is shaped like the letter "O" and variable in length, width and depth, but preferably rectangular, with squared corners. For example, "O" mounts might be made of three-quarter inch steel channel for strength. At the top of the "O" mount, is a part that connects with mating hardware on the inventive image's anchoring mount component. The forms of these two mating parts are determined individually for each inventive image mount, typically according to function and aesthetics. For example, a threaded rod of any length through the top of the "O" mount can connect it to a mating, exposed hex nut on the anchoring mount component. The threaded rod can protrude out of the "O" mount at any length. If the hole at the top of the "O" mount that it passes through is wider than the threaded rod, the rod can be positioned at any angle. The threaded rod can even remain adjustable if it is tightened in position with respect to the "O" mount by hex nuts. The use of shock absorbent washers under these hex nuts (e.g., made of vinyl) are preferable to protect the polymer inventive image from cracking. Another example is a combination of Rigid and Wire Mounts. It is made of the same, rigid "O" mount, with a taught wire of any length attached as desired, instead of the threaded rod. This wire could, for example, join to an eye hook, a loop or other connector exposed on the inventive image's anchoring mount component. A hook, a metal loop, or other solution might be substituted for the wire. Many other modifications are possible, especially changes of the "O" mount's shape for aesthetic purposes.

The adjustable, middle mount component's alternate rigid form uses gravity. It is made of a male and a female part. One of these mating parts securely attaches to the inventive image (but is removable from its anchoring mount component for safe handling). The other mating part is below the inventive image, attached to the third mount component (C), that is on the support from which the inventive image is mounted, e.g., resting on the floor, a table, a base or on another stable, gravity bound support. The male part is shaped like a stick, but it might be a cylindrical rod, a rectilinear rod or any other variation rod. It is fitted to go inside the female part that is shaped like a tube, e.g., a cylindrical or rectilinear tube, etc. For example, if these mating parts are cylindrical, and only one mount is used, the inventive image can rotate. A lubricant between these two parts, such as a grease, to facilitate rotation and any means of initiating or perpetuating the inventive image's movement on this rigid mount component can be used, e.g., a motor, a human hand, wind power, etc. This mount component can give an inventive image new dimensions by giving it the formal element of movement. The inventive image's movement may change its light, another formal element. This rigid form of the adjustable middle mount component might actually be made of the same polymer as the inventive image, of another polymer that is stronger, of one or more non polymeric ingredients, or of a combination of these, as desired. This mount component might attach to a metal area on the inventive image, or if it is for one or more other metal parts of inventive images, this mount component can be welded or soldered onto them.

The adjustable, middle mount component's wire form is a wire, cord, rope, chain or even plastic wire (e.g., clear fishing line), that is able to hold the weight of the inventive image up by connecting to both the anchoring mount component in or on the inventive image, and connecting to the structure from which the inventive image is mounted. The use of stranded, stainless steel wire is often preferred so that should a strand break, others hold the inventive image up. For example, metal wire can be looped through the connector piece of the image's anchoring mount component and firmly crimped to itself with crimps (e.g., copper or steel), and using crimping pliers (such as those commonly used by telephone companies). It is preferable to crimp firmly and to insure against the failure of a crimp, it is preferable to use more than one. If a plastic wire (like clear fishing line) is used, it can be secured by tying or gluing as desired. The selection and quantity of wires, and the method and places of their attachment to the inventive image typically depends on aesthetics and on other individual inventive image specifications, which in inventive images, are largely controlled by variables that typically still remain workable as desired. The use of wire that has the capacity to hold more weight than necessary is preferred. When more than one wire is used, their weight capacity is cumulative. All wires may be doubled, tripled, etc.

It is often necessary to change the image's center of balance (e.g., when hanging an inventive image from a single wire, or when hanging them at a specific angle). Due to the typically everlasting workability of inventive images, their center of balance can typically be altered as desired, typically easily, e.g., by sanding or cutting. These changes are increasingly effective the farther they are away from the inventive image's center of balance.

A variation of this form of the wire middle mount component is to run the wire through the inventive image and secure it on the inventive image's reverse side as desired, e.g., by crimping. The wire can be terminated after it is crimped, or it can continue on to other destinations (e.g., to other compositional elements) as desired. The wire can be crimped to an embedded, anchoring mount component or it can be crimped under a mount component that is embedded, inlaid, or placed against the inventive image, between it and its crimps, or combinations of these, as desired. Although the wire can be terminated on the other side of the inventive image using crimps, without an anchoring mount component, this method is generally not preferable, especially for heavy inventive images, for inventive images hung from a single wire, or for other similar inventive images because the anchoring mount component spreads the inventive image's weight out so that it is held over a larger surface area, rather than just by the tiny spot of the crimp(s).

For instance, in one method, to install a wire through an inventive image, make a hole through it, preferably through a place that is strong and thick, or a place that has been made strong and thick for this purpose (e.g., by drilling). A straight hole, slightly wider than the diameter of the wire is usually best. Once through the inventive image, (polymer or non polymeric materials, media, objects, devices, processes, interactions, or combinations of these), the wire should be crimped firmly. Tubing, steel or stainless steel, may be inserted over the wire as it passes through the inventive image to protect it as desired. If the tubing is long, it can constrict the inventive image's uncontrolled, wobbling movement, e.g., when hanging an inventive image from the ceiling with a single wire—the longer the tubing, the more constricted the inventive image's movement. If desired, special visual effects of weightlessness can be created using this mount variation, especially if only a single wire is used to hang the inventive image from above, and if the wire is so thin or so clear that it is imperceptible or nearly so. The visual effect of weightlessness in inventive images frequently brings the additional formal elements of movement and time into the inventive image. These formal elements can be freely minimized, eliminated, or accentuated to any degree, as desired. For example, wire mount components and their variations are particularly useful in creating mobiles with multiple parts.

Mount Component (C) is the mount component on the structure from which the inventive image is mounted that connects to the middle mount component to hold the inventive image as desired. It is frequently necessary for this mount component to reinforce the structure from which the inventive image is mounted, especially for heavy inventive images and for inventive images projected out from their mounting structure (e.g., an inventive image mounted four inches out from the wall requires its mount to hold an exponentially greater weight than the same image's mount must hold if it is mounted flush against the wall). Some inventive images do not need a mount component on the structure from which they are mounted, e.g., some light weight inventive images, and some inventive images that can already connect directly to the structure from which they are mounted. This mount component on the structure from which the inventive image is mounted can be made according to both its function and the aesthetic effect as desired.

When hanging an inventive image, this third mount component (C) can be any part with an eye hook, an open hook, or other means of connection, that can preferably be stably secured to the structure from which the inventive image is mounted and that at a minimum holds the weight necessary, preferably more than necessary (e.g. it might be screwed to the studs in the wall or into a ceiling joist). The length of the middle mount component made or partially made of wire (or another hanging material) may be adjusted and secured using any method, e.g., by tying, gluing, crimping, or combinations of these, as desired. Wire, for example, can be run through this mount component (C) and terminate, or it can be brought further to other destinations as desired, e.g., to one or more other compositional elements of any material. This wire's end may be secured using any method.

Although rigid "O" mounts and their variations can be screwed or bolted directly into the wall, ceiling or other support, all metal "O" mounts and their variations on for an inventive image might also be welded to a single plate (e.g., of steel) that can be screwed, bolted or otherwise securely connected to the structure from which the inventive image is mounted (e.g., into studs in the wall, or joists in the ceiling), often, for precise alignment, for inventive images with more than one mount attachment, or for convenience. In attaching to the wall or other support, this plate (which might be metal), may distribute the weight of the inventive image over a larger surface area. This plate also may fix the middle mount component(s') position in relation to the structure on which it or they are mounted so that the installation of the image is less complex and less dependant on the eye of the installer while typically still allowing middle mount components to be permanently adjustable (e.g., the length and angle of the threaded rods). A Wire Mount System can also be used off of a mounting plate either independently or in combination with Rigid Mounts (the mounting plate might be metal).

The size, thickness, and other specifications of such mounting plates are preferably determined according to individual structural and aesthetic considerations. Aesthetically, for example, such a plate can be used as a compositional design element under the inventive image, e.g., as a layer for underpainting and underdrawing, or a reflective or light emitting layer for instance, using polymer LED(s). Often, any significant part of this mounting plate that is painted the same color as the wall and seen through an inventive image will be visually perceived as part of the wall, i.e., as if the mounting plate was not there or almost so. A thin mounting plate can often be used without being noticed. The inventive image might also be painted, incised or otherwise further developed and finished on all of its exposed sides. The aesthetic possibilities using such a plate as an underlayer are extraordinary. The aesthetic control and creative freedom afforded by its use with inventive images are unequaled in fine arts, and in many other images too. When mounting a transparent or translucent inventive image, the entire mount including this plate can be a visual part of the inventive image that the image maker may shape, texture, paint, etc. as desired according to the inventive image's structural and aesthetic needs. The plate may be cut in an irregular shape (e.g., the shape of a person's silhouette), or the plate may actually be more than one plate, all of which are secured (preferably flushly) against the wall or other supporting structure, typically depending on the structural and aesthetic needs of the inventive image. Alternately, the plate may be a three dimensional inventive image part, e.g., of metal. When this plate is used to mount a transparent inventive image, and the plate or a part thereof is painted to look the same as the supporting structure it is attached to (e.g., if it is painted white like the white wall it is bolted onto), the plate may be camouflaged and it may be effectively invisible. Thus, the image maker can have a lot of structural and aesthetic control.

For rigid middle mount components, the third mount component includes the other half of the mating pair previously described protruding upwards from it, that can be either half of the mating pair. This third mount component can take one of two forms. It can be floor bound, such as a base, a pedestal, or a table top, or it can be a vertically mounted metal plate, in which case it is sometimes preferable to make the mating parts in shapes that are not cylindrical to avoid rotation, e.g., they might be rectilinear rod with a fitted, mating tube.

The wire and rigid mount systems can be combined as desired. In one example, the "O" mount, threaded rod, hex nuts and washers in the rigid mount system are substituted by a wire or cord. One end of the wire might loop around an embedded piece in the inventive image (preferably around an embedded metal piece) and it might be knotted, crimped, glued or otherwise secured. The other end of the wire might connect to the wall or other supporting structure, or to a plate on the supporting structure (typically secured on the supporting structure, preferably flushly upon it, and preferably bolted upon it), this wire again connecting by crimping, welding, etc., e.g., onto an eye-hook on the wall or through a loop on a metal plate on the wall. Alternately, rather than connecting one end of the wire to the inventive image and the other to the supporting structure, the wire might be strung through the mount piece (typically a metal piece) embedded in the inventive image and strung through an eye-hook, metal plate or other part on the wall, then if desired, using a double crimp its two ends might be crimped together (or welded or glued together). In this example a metal piece that might be embedded in the inventive image may not need a hex nut welded to it, but preferably a loop-like part would be accessible on it for the wire to connect to. This mount will work only if the area on the inventive image that attaches to the wire mount is lower than the location of the wire mount's connection on the wall, ceiling (or other supporting structure). This example differs from the wire mount system because its wire does not go through the inventive image knotting or crimping on its other side. Its wire stays on one side of the inventive image. However its wire might continue on either end to connect to other parts. A second example of combining wire and rigid mount systems begins with the wire mount system but substitutes an "O" mount instead of the wire or cord. The rigid "O" mount goes through the inventive image, ending on its other side.

Art Forms, Special Qualities & Effects, Processes, Function, Content, Meaning, etc.

In an example, polymer and non polymeric inventive image surfaces can be used for further processing with conventional practices (e.g., conventional applications), in inventive images that are typically as strong and permanent as desired, instead of or in addition to the use of their regular or conventional surfaces in inventive images, e.g., paper or canvas. Because many surfaces of inventive images, particularly polymer surfaces, often have characteristics that are different from conventional images surfaces, new and unique effects can be created in inventive images.

Using the present invention, images can be made that are new and unique variations of almost every conventional art form. For example, the present invention allows one to make images that are new and unique kinds of images in known art forms, and perhaps even new of art forms. In addition, because of the workability and reworkability of the present invention, images can often be changed from one art form to another, as many times as desired, typically as they are made or anytime thereafter, as described herein in many examples. In addition to those previously described, a myriad of further special qualities and effects can be made in inventive images, using or affecting virtually every formal element. A wide variety of these are limited, problematic and burdened by undesirable issues in conventional images. For example, substantially every quality and effect that can be made in conventional images that relates to the novelty and uniqueness of the present invention can be enhanced using the inventive medium. For instance, while the use of real formal elements in images, such as real light, real spatial depth, and real transparency (as opposed to illusions), is an important factor in image making, the use of these formal elements is significantly expanded by the present invention. Special qualities and effects can also be made in inventive images, for example, using coloration in real spatial depth with real light. As a result, inventive images can have qualities and effects of real light, real spatial depth and real transparency that are new and unique. Unlike many conventional images, special qualities and effects in inventive images are typically workable, reworkable, and controllable as desired, and can be used with or without conventional practices. Special qualities and effects in inventive images can be real (e.g., made using real 3D space, real light etc.), they can be illusionary, they can be perceptual (e.g., made with color, shadows, lines or illusions), or a combination of these. Thus, special qualities and effects in inventive images can be tangible, intangible, or both. Special qualities and effects in inventive images may be or affect their content, e.g., as a reflective light effect might suggest water. They can be used with the function of the inventive image, e.g., as the real workable transparency of polymer might enable a window to be made of the inventive medium. They can be used with the way an image is set-up or installed, e.g., a thin polymer inventive image might be rigid and strong enough to be self supporting.

In some embodiments, the inventive images or part thereof are drawings. Unlike conventional drawings, drawings made with the inventive medium can be 2D planar, 2D or 3D. Such drawings can be objects or have a sense of objecthood if desired. For example, drawings can be made on inventive image surfaces that are principally or completely comprised of polymeric or non polymeric ingredients. Such surfaces might for example be transparent, translucent, partially opaque, opaque, textured, perforated, made in parts, made in layers, undulating, light emitting, electrically active, or a combination of these, as desired. Such surfaces might for example have already been worked and developed, using any processes desired, e.g., they might already have light effects, coloration, photography, embedding, inlays, attachments, air pockets, negative cut-outs, combinations of these, etc. Both polymer and non polymeric drawing surfaces of inventive images might have deckled edges, e.g., deckled edges can be formed on a planar polymer medium, by the shape of its mold's walls, by carving, sanding or other processes of removing matter, or by a combination of these. Drawings can be made on surfaces of inventive images in a wide variety of processes, and polymer in them is typically as workable, reworkable, and controllable as desired, e.g., using additive or subtractive processes, with or without use of conventional practices.

In some embodiments, drawings on inventive images can be made using carved, engraved or incised marks, in polymeric or non polymeric surfaces. For example, these drawings may be made on polymer surfaces (e.g., on image support stabilizers) by removing or adding matter, and then shaping it if desired. Then, a layer of cPRM or a layer of formed polymer might be superimposed on the drawn underlayer. As a more specific illustration, a drawing might be carved on the surface of a polymer image support (e.g., stabilizer) depicting a scene of woman in a pasture of irises and high grass. This carved drawing might have depths between approximately 0.5 to 2.5 inches, in a transparent polymer image support that is about 3 inches thick. Further, this drawing can be carved in transparent polymer with such precision and control, that viewers of can distinguish iris petals, blades of grass, and strands of the woman's hair. Comparable detail, care and control is not available using comparable conventional practices. Further drawing can be done on the cloudy abrasions of its carved surfaces, e.g., using a transparent colorless cPRM or Clarifying Imprimatura. These drawn strokes may smooth the abrasions (SSI) of this image's carved surfaces to varying extents as desired, turning them from their cloudy white color to varying degrees of increased transparency, as desired. In addition or instead, this carved drawing can be painted, e.g., using SSI for bonding, for example, a paint made using cPRM as an ingredient (for instance, as its binder) can bond to a compatible polymer surface, and paint can bond to Clarifying Imprimatura. In comparison, the use of transparent and translucent texture in conventional painting is limited, problematic and burdened by undesirable issues, particularly if detailed or controlled texture is desired.

In a further illustration, a drawing on the inventive medium can be made with its positive or its negative elements embossed, inlaid, attached, or a combination of these. If desired, drawing may also be done in other ways on the surface of this inventive image. If the resultant drawing has raised elements, it might for example, be further processed in one of the following 3 variations.

In variation 1, some or all of the surface of this drawn inventive image is superimposed to the extent desired, with a bonding substance (like cPRM), that can be visually distinguished from its raised drawing, e.g., it has different coloration or the raised part of this drawn inventive image may remain physically raised higher than the application of the bonding substance. Because the raised portion of the initial drawn inventive image is visually distinct from the bonding substance, the bonding substance and the raised drawing might be the same height on the image's surface, flush with one another. If the bonding substance is see-through and the raised portion of the initial drawn inventive image is visually distinct from the bonding substance, the bonding substance might cover over the raised drawing embedding it. In variation 2, some or all of the raised portion of the drawn inventive image is changed (e.g., colored) so that it will be visually distinguishable from a superimposed bonding substance once it cures, hardens or dries. Then a bonding substance is superimposed. In variation 3, the surface of the drawn inventive image is covered with one or more preformed, see-through materials, media, objects, devices or a combination of these, attached to its raised areas forming one or more air pockets between it and the areas of the image's surface that are not raised, e.g., a sheet of polymer (for example, acetate, mylar, vinyl, polypropylene, polyester) is attached to the raised parts or to the drawn image's perimeter, for instance, using hardware, or a mount. If desired, this or these air pockets may be partially or completely filled.

In some embodiments, a drawn inventive image is made on a non polymeric image support, that is then partially or entirely covered with cPRM. As an illustration, such a drawn image is made on one or both sides of a sheet of see-through paper or fabric (e.g., paper that is perforated, transparent, translucent, cotton, rag, vellum, construction paper, typing paper, acid free paper, acetate, mylar, shims; fabric such as silk, open weave fabric, sheer fabric, linen, lace). This paper is then is covered with cPRM on both of its sides (e.g., so that it is encased). Then, if desired, additional layers of cPRM can be added with or without drawing being made on these further layers. This sequence of drawing and layering cPRM can be repeated as many times as desired to make a 2D or 3D inventive image.

In some embodiments, two or more spatial depths are used on, or within the inventive medium to make an image. Coloration at different real depths often can give images real form, real volume, or both, with or without the use of illusionary form, or volume. For example, conventional shading processes such as cross hatching and modeling can be made in superimposed layers of real depth when they are made using polymer of the present invention.

As another example, inventive images can have visual qualities and effects of stained color, bleeding color, flowing color, and other such qualities and effects, hereinafter referred to as bleeding color effects. Bleeding color effects in the inventive medium are typically workable, reworkable and controllable using many methods, and the present invention enables many more art forms to have bleeding color effects than ever before. For example, the flow of colored cPRM or the flow of color on polymer can typically be controlled; bleeding color effects in and on inventive images can typically be reworked, or partially or entirely removed. As another example, bleeding color effects in and on inventive images can be lightened by the removal of color or by the addition of real light or other light effects to the inventive image. Further, the use of solvents (such as turpentine or acetone), sanding, sandblasting, scraping, erasing, rubbing, etc. on bleeding color effects in and on the inventive medium enables them to be worked and reworked, e.g., any undesirable alterations and effects can be reworked.

As an illustration, an inventive image with bleeding color effects might be made by forming cPRM on a surface without any mold side walls. For instance, colored cPRM might be poured, run, splattered, or thrown onto the surface of a mold or a polymer inventive medium, so that it flows, unrestricted by mold side walls, any thickness, in one or multiple layers. Another preferred method of making bleeding color effects on surfaces of the inventive medium or on inventive images by applying one or more substances that flow, run or absorb in or on inventive image surfaces that are polymer or non polymeric, (e.g., surfaces of inventive images with paper pulp, fiber, straw, sand). Bleeding color effects can also be made in or on inventive images by using coloration that is mixed into a binder or a vehicle heterogeneously, e.g., this might be a paint heterogeneously mixed into a thinner substance; or a pigment mixed inconsistently into cPRM as previously described. In addition or instead, a surface preparation stabilizer can be used on an inventive image surface for bleeding color effects. For example, the close-up view of the inventive image in FIG. 5.VI. is a polymer inventive image with bleeding or stained color.

In some embodiments inventive images are colored to give them antiqued effects.

In many embodiments, the inventive medium or part thereof are paintings. Such paintings can be made in all conventional and new unique forms. Paintings made using the present invention can use conventional practices, e.g., stretchers, frames, conventional paints, etc. They can be set-up, presented, displayed, installed, exhibited or prepared for viewing using any methods, means and manner, e.g., on or near a wall, hung, mounted or otherwise set out from the wall. Also, some paintings made using the inventive medium are lit according to specifications designed by their image makers (e.g., a specific light is set between one of these paintings and the wall), and some of this illumination may be a permanent part of these images.

In some embodiments, planar inventive images are made that have coloration from one or more particles, objects, devices or combinations of these dispersed in some or all of their polymer, e.g., embedding visible through the polymer's transparency, its translucency or both. For instance, such embedding might obscure or distort the view through the polymer, create texture, light effects, coloration (e.g., as part of an imprimatura); or a combination of these, as desired. For example, keys, doorknobs, jacks, CD Rom discs, glass particles (e.g., glass that is opaque, colored, crystal or dichroic), formed polymer particles, sand, shells, coins, paper money, candy wrappers, marbles, beads, stones, mica, fluorescent mineral particles, metal particles, sawdust, seeds, leaves, flowers, combinations of these etc. can be dispersed consistently or inconsistently in polymer in inventive image drawings or paintings. For instance, such an inventive image might superimposed by painting, drawing, printing, writing, etc., used for example, as an image support. It might even be light emitting and, such an initial image support might be embedded and inlaid with light effects, such as pieces of crystal attached to and inlaid in an inventive image.

Inventive images are made that function as books or as pads in addition to their function for visual observation. These inventive images are made of bound polymer pages that may for example, be flexible or rigid, with any shapes, forms and dimensions desired. They may even be light emitting, e.g., using conductive polymer. The polymer pages of these inventive images may or may not have non polymeric ingredients, e.g., as entire pages or as parts of pages, or conventional binding. Some of these inventive images are finished images with words, images, or both. As examples, FIG. 77. shows five different examples of inventive image books, with covers and pages made of polymeric or non polymeric ingredients (e.g., conventional paper or board, cardboard, mat board; rubber; fabric; metal, or a combination of these, such as cardboard covered with silver leaf). The binding of these inventive image books may be made of polymer or conventional binding.

Some of these inventive images are left unfinished by their first image maker or makers, and then transferred (e.g., given or sold), to a different second image maker or makers who may further process it as desired. As a further illustration, the second image maker or makers might use one of these unfinished inventive images like conventional blank paper pads and blank books are used. For example, pages of some of these unfinished inventive images might be prepared by the first image maker or makers so that they will bond to superimposed applications made by the second image maker or makers (such as conventional applications like painting, drawing, photography, printing, collage, gold leaf, fresco, wax based applications, oil based applications, water based applications, or a combination of these). For example, pages of these inventive images may have surface preparation stabilizers on them prepared by the first image maker or makers that are superimposed by the second image maker or makers. In addition or instead, these inventive images might be further processed using subtractive processes, such as by cutting, carving, sanding, incising, etc. In comparison, the polymer pages of these inventive images can be worked and reworked in ways that cannot be comparably done and in ways that are not possible with conventional pads and books. Furthermore, effects can be made on these inventive images that can not be comparably made if they can be made on their conventional counterparts, e.g., refer to light effects, spatial depth etc.

In many embodiments, inventive images (such as drawings, paintings, sculptures, chairs) are completed images that are reworked over a year or more after their completion.

Because it expands the use of formal elements that are limited, problematic, and burdened by undesirable issues in conventional images (e.g., real light, real space, real transparency, real translucency, structural strength and permanence, etc.), inventive images can be made with real volume that is see-through in a range that is much broader than comparable conventional images.

In another illustration, a 3D inventive image painting is made in the real volumetric space of a block of polymer. For instance, a layer of polymer is formed. Onto this layer, the first cross-section of the 3D painting is applied. Then a second layer of cPRM or polymer is superimposed and the next cross-section of the desired 3D painting is applied onto it. As further layers of cPRM or polymer are superimposed, the next cross section of the 3D painting is formed on their surface. This process is repeated until the desired inventive image painting in space is made. In such inventive image paintings in space, however, superimposed layers of polymer can be partially or completely bonded to one another; they can be separate from one another; or two or more of the superimposed layers can be bonded to one another and one or more others can be separate yet still be superimposed layers of the same inventive image painting in space. Air pockets or air spaces between bonded polymer layers can be of any dimension desired and negative space between separate layers of polymer can be of any dimension desired. Separate polymer layers of a single inventive image painting in space can be mounted parallel to one another or superimposed at angles to one another. This same process can be used to make an inventive image sculpture in real space with real light, which is a drawing, a series of layered light effects, a written inventive image sculpture, a printed inventive image sculpture, a collaged inventive image sculpture, an inventive image sculpture with series of layered photographs, an inventive image sculpture with a series of layered cut-outs, an inventive image sculpture with series of layers that have one or more other kinds of processing on them, an inventive image sculpture that is processed with new and unique effects on both of one or more of their layers; or a combination of these as desired.

In another illustration, drawing is done on and within a single sheet of colorless transparent polymer to form an inventive image drawing that is a life size portrait using broken color strokes of pastels. The real spatial depth of the polymer in this inventive image is used to form the spatial depth in this pastel drawing. Thus, though the drawing is an illusion of a specific person, it does not have any illusionary spatial depth in it. This pastel drawing is formed by casting a layer of polymer then drawing a cross section of the individual's head in pastel. Then superimposing this pastel with another layer of cPRM or polymer, drawing the next cross section of the individual's head on it, and repeating this process alternating, adding a layer of polymer and drawing a cross section of the form on it, until the entire portrait is created as desired. In addition, if desired, both sides of this polymer can be processed to form the portrait. For instance, on the initial layer of polymer, the cross section of the head depicted can be a center cross section of the head, and additional layers of drawing and polymer can be added onto both sides of this polymer sheet until the desired portrait is formed. This is drawing with real light and real spatial depth as it has never been done in conventional images. There is no conventional practice that enables comparable drawings to be made, reworked, and controlled.

In a further example, multiple polymer blocks made with desired coloration and light qualities and effects are assembled and rearranged into the inventive image sculpture desired.

As a further example, a layer of polymer is formed and one or more light effects are added on it, e.g., crystal pieces are stuck on it, it is carved, it is colored, it is collaged, photography is done on it, its light is blocked, or a combination of these light effects are added to it. Then, this inventive image layer is superimposed with another layer of cPRM or polymer, as desired. Or then the other side of this inventive image is further processed with light effects as desired. Then one or both of its sides are covered partially or entirely with cPRM or polymer, and further light effects are added onto one or both of these surfaces as desired. Such alternating layers are repeated until the desired inventive image is formed. One or more of the polymer layers might be light emitting, e.g., with a conductive polymer. The resultant inventive image sculpture may, for instance, be a block of polymer with internal light effects, it may be a block of polymer with internal and external light effects, it may be two blocks of polymer with a negative space in between them and light effects, or it may be an inventive image sculpture made of multiple separate layers of polymer, multiple separate blocks of polymer, or at least one layer of polymer that is separate from at least one block of polymer with negative space in between them. For instance, it may be several layers of polymer, all of which have light effects on both of their sides, mounted parallel to one another on a base. One or more layers or blocks of this inventive image might be made principally or even entirely of non polymeric ingredients. Such a method might be used to form an inventive image table, paper weight, seat, bench, sculpture made of multiple blocks, etc.

Making an inventive image can be making an image with real light, and this can be done in ways and to an extent that has heretofore never been possible. For example, making inventive image can be painting with real light, sculpting with real light, or building with real light. Using the present invention, both tangible and intangible light forms of real light can be used with coloration, with real transparency, with real translucency, with real spatial depth, in conventional art forms, and in ways as never before. In addition, the present invention even offers a myriad of new and unique light effects and qualities. As a specific example, an inventive image can be formed of a single clear colorless polymer that has a form of real tangible light, e.g., that might be its transparent or translucent form or light emitted by the use of conductive polymer. In making this inventive image, the real light of its polymer can be colored, shaped and directed, reflected, partially blocked, incised, attached to other parts, superimposed with layers, superimposed with a photographic transparency, reworked in ways that remove some of its coloration and add other transparent colors, superimposed with more layers, inlaid, processed in ways that restore some of its blocked light, processed in ways that brighten its light with additional light sources, processed some more, and so on, etc., continuing until the inventive image is made as desired. Such spontaneous development and reworking of real light in inventive images is not possible in conventional practices. Real light can typically be used in inventive images in processes that are as WYSIWYG as desired, this is often not possible using conventional practices. In inventive images real light can typically be used according to the Principle of Whole Development and Unity to the extent desired and in the manner desired. This is often not possible with conventional practices. Refer to the Light Section herein. Consequently, the applications of image making with real light are vast and varied in inventive images.

In some embodiments, a Tyndall effect is created in an inventive image for aesthetic purposes. A Tyndall effect might, for example, be made by dispersing a conventional image making material, medium or both, in cPRM that is used to make an inventive image, or a part thereof, e.g., dispersing a pigment, an acrylic paint, an acrylic paint binder, oil paint, linseed oil, fine particles of sand, fine particles of silica, or a combination of these. If desired, inventive images that have Tyndall effects might also have other light effects, such as added sources of real light like polymer LED(s), EL lamp(s), neon or light bulb(s), and added materials that reflect light. As further illustrations, controlled light beams produced in an inventive image as Tyndall effects might form a pattern or they might be used to affect the perception of three dimensional form, e.g., using Tyndall effects in an inventive image to model form.

In an embodiment, inventive image paintings are transparent or translucent polymer shapes and forms that are designed as desired principally or exclusively using the light qualities and effects of the present invention. For example, light is the subject matter or part of the subject matter of these paintings, many of them have little or no paint at all.

In an illustration, an inventive image drawing is partially or completely made using light effects that are new and unique. For instance, such an inventive image drawing may or may not use any conventional drawing media or materials. For example, negative spaces within an inventive image form a drawing or part thereof. Shadows, reflections, real tangible light of polymer that is transparent or translucent, defracted light, photography, holograms, crystal, other glasses, light source(s) like LED(s) and EL Lamp(s), other light effects, combinations of these, etc., are used to form a drawing on an inventive image surface as desired.

Inventive images can be made that dematerialize volumetric space, and a subset of these can dematerialize volumetric space to a greater extent than ever before in conventional images. Inventive images can be made that dematerialize volumetric space in ways that are new and unique in comparison to conventional images. Inventive images that dematerialize volumetric space can be new and unique images, e.g., they can expand their art form (e.g., sculpture) and perhaps they can even form one or more new art forms. Inventive images can also be made that achieve a combination of these goals, as desired. Inventive images can be made with volumetric space dematerialized in a variety of ways, some of which are real, some of which are illusionary, and some of which combine both illusionary and real elements. Here are five examples. 1). The inventive polymer medium can emit light. 2). Inventive images can be made that actually have less tangible volumetric space than comparable conventional images. For example, the new unique characteristics of polymer of the present invention enables inventive images to be made with volumetric space that is actually more open than comparable conventional images. For instance, in an inventive image sculpture, open space can be defined by a using see-through polymer bars or rods, instead of using open conventional materials, like chicken wire, tree branches, or netting. The 3D image shown in FIG. 3 is an example, it might for instance be made of transparent bars as a huge sculpture. The strength and permanence of polymer of the present invention enables it to be used in ways in which are undesirable or impossible in many conventional see-through materials, media, objects, devices and their combinations, e.g., glass, and other polymers that are not of the present invention. 3). The use of see-through polymer parts in an inventive image can create the illusionary perception of dematerializing the real volume of that inventive image, even though that inventive image would have just as much tangible volume if metal or reinforced glass were substituted for its see-through polymer. As an example, refer to the inventive images based on Brancusi's Fish herein. 4). Inventive images can be made with volumetric space that is actually dematerialized, with volumetric space that creates the illusionary perception of being dematerialized, or with both of these, by its use of real light with polymer of the present invention. For instance, this can be done using one or more forms of light that are tangible or intangible, e.g., the use of special light qualities and effects in inventive image. 5). Inventive images can be made with volumetric space that is dematerialized by the use of a combination of these techniques.

Because the present invention offers a new unique form of real light, real transparency and real translucency with real spatial depth and strength, that is typically as workable, reworkable, controllable as desired and in the manner desired, volumetric space can be dematerialized in inventive images to a greater extent than ever before. Further, because the present invention offers all of these characteristics with a myriad of aesthetic variations as desired, many of which can not be made using conventional practices (e.g., coloration and light effects), and with the level of permanence desired, volumetric space can be dematerialized in ways that are not possible using conventional practices, and the resulting inventive images might be new, unique, and even unlike any images ever made using conventional practices. In comparison to making inventive images that dematerialize volumetric space, conventional practices for making images that dematerialize volumetric space are limited, problematic and burdened by undesirable issues. For example, image makers making sculpture that dematerializes volumetric space often work in metal. Metal is inherently opaque and weighty, even though image makers reduce this aesthetic by using metal and metal working processes that form open volumetric space, such as chicken wire, fencing, metal rods, wire, casting metal, welding metal, fabricating metal, etc. For example, images makers often sacrifice strength, permanence or both, to make sculptures that dematerialize volumetric space, e.g., using materials like tree branches, paper maché, plaster, clay, felt, etc.

The present invention opens up a whole new realm of possibilities for image makers to make 2D and 3D inventive images that dematerialize volumetric space. Examples of these are: inventive image sculptures, mobiles, assemblages, installations, stage sets, constructions, Light Art, Light and Perceptual Art, furniture, monuments, architecture, inventive images with other functions such as bowls, etc. As an illustration, instead of metal, strong, permanent, transparent or translucent polymer rods can be used to make an inventive image sculpture with open volumetric space. One or more of these polymer rods can be left colorless, they can be given light effects, they can have coloration so that they become partially or completely transparent, translucent or opaque; or a combination of these, etc. For examples, refer to the inventive image rods, bars and strips shown with just a few aesthetic variations in FIG. 9. FIGS. 9.I shows polymer rods, bars or strips in side views and 9.II. shows them in cross section views. In dematerializing volumetric space, polymer parts of inventive images (like the polymer rods on the previous inventive image sculpture), can not only make inventive images appear lighter, less solid and less volumetric than comparable conventional images, such polymer parts can also bring their inventive image a new kind of real, tangible see-through spatial depth and a new kind of real, tangible light, (which may be from their transparency or translucency, and from their ability to emit light), that has heretofore never been comparably available in such conventional images. Further, this new kind of real tangible see-through spatial depth and this new kind of real tangible light can typically be used in inventive images to the extent desired an in the manner desired, with the workability, reworkability, control, strength, permanence, and aesthetic variations desired. Thus, for example, inventive images such as inventive image sculptures, can use negative and positive space, line, form, the perception of their weight and balance, and real light in ways that are new and unique in sculpture. And consequently, if desired, inventive images such as inventive image sculptures can use illusions of these formal elements in ways that are new and unique too, e.g., as is described herein. Using the present invention, images can be made with volumetric space in sculpture, mobiles, assemblages, installations, stage sets, constructions, Light Art, Light and Perceptual Art, furniture, monuments, architecture, etc. can be dematerialized to a far greater extent than ever before and these kinds of images can be made with a myriad of aesthetic variations heretofore non existent.

Paintings made using the present invention with open negative space within their forms, may be perceived as having volumetric space, and a subset of these, also dematerialize volumetric space in painting. Paintings made using the present invention with air pockets may also dematerialize volumetric space in painting. Inventive images sculptures are made that are linear and volumetric using real space e.g., as large drawing in space, lines in space using new clear rods, cast forms, planes, etc. as desired. These inventive images may dematerialize volumetric form as never before, e.g., depending on their forms, their coloration, their light effects etc. As another illustration, inventive images can be new unique drawings in space, depending on the perception of their negative space as positive form, e.g., FIG. 3. This may be a new kind of drawing in real space with real light. Inventive image drawings in space can emit light, e.g., using a conductive polymer.

In a further example, an openwork inventive image sculpture is made. Among the advantages this image maker may have that image makers prior to the present invention did not have, are: 1) the ability to make this in an ordinary workspace or studio without special expertise, 2) the ability to make this inventive image at a cost that is lower than comparable conventional images, 3) the ability to use a wider range of transparent and translucent spatial depth with coloration if desired, 4) the use real light and a wider range of other light effects, 5) the ability to make this inventive image independent or as independent as desired from dependence on the help of others (e.g., staff), 6) the ability to recast polymer without the delay common in casting metal, 7) the ability to add matter to a part of the inventive image without removing the area reworked from the image, 8) the ability to dematerialize volumetric form beyond that which is possible using conventional practices, etc.

Inventive images, can be made that seem lighter or more airy than conventional images or both. For example, they may appear even lighter, more airy or lighter and more airy than openwork conventional sculptures (e.g., lighter than conventional welded openwork sculpture and lighter than conventional drawings in space) and they may appear even lighter than conventional architecture (e.g., glass architecture). Furthermore, these inventive images can take the aesthetic of light and space further than ever before, typically without sacrificing their desired strength and permanence. Among examples are see-through images, openwork images, and images made using rods and bars of polymer (previously described). Using the present invention, real and illusionary light can be used with real or illusionary volume in a vast range of ways to make inventive imagess with new and unique qualities and effects, e.g., perceptual effects, effects in content, meaning, or both.

The real light, the real transparency, the real translucency, the fact that real form and real volume of inventive images can be see through enables inventive images to have the effect of both their form and their function being visible simultaneously.

As further illustrations there are other practical and aesthetic uses for the expanded use of real forms of formal elements in inventive images. For example many functions are possible in inventive images due to the physical strength, permanence, rigidity, and/or the workability, reworkability and controllability of the real light, the real form, the real structure and the real spatial depth of polymer in inventive images, that are limited, problematic and burdened by undesirable issues in similar conventional images. For example, an inventive image painting made in flows of color like a classic Jackson Pollack drip painting but without an initial image support underlying it, could be made into a table, a wall, a partition, or a table and then a partition, as desired. As another example, the strength and rigidity of polymer of the present invention that enables inventive images to be made without undesirable additional reinforcement makes it possible for these inventive images to dematerialize volumetric space beyond that that is possible in conventional images. A wide variety of aesthetic qualities and effects can be formed as a result of the strength and rigidity of inventive images, and because there has never been a comparable transparent medium, these qualities, these effects and these inventive images can be new and unique.

In addition to their aesthetic functions, inventive images may serve other architectural functions, or they may be architectural design, e.g., interior architecture, landscape architecture, etc. Planar inventive images might for example, be used as walls or as part thereof, windows, skylights, doors, partitions, shades or shutters, fences, gates, flooring or part of flooring, etc., (even for example, if they were previously used as fine art, e.g., as paintings or sculptures). These inventive images can typically be made to be strong and permanent despite their use and despite their exposure to light, despite the impact and other wear they might encounter.

In some embodiments, inventive image ceilings are made in parts. In some embodiments, inventive images are made that are ceilings and skylights, e.g., indoors or outdoors (for example on a patio or pavilion). These images might for instance be made so that they change as sky changes, e.g., they allow any degree of visibility of the sky, the stars, storms, lightning, rain, etc., for example by showing changes in light and color. Some of these inventive images may also be light emitting, e.g., using conductive polymer(s).

The sense of reality presented in an image, such as in an inventive image can be created in a myriad of different ways, many of which differ from conventional practices yielding new unique content and meaning in images. The sense of reality presented in an image such as an inventive image can be important or unimportant in an image to any extent desired. The sense of reality in an image, such as an inventive image, the content and meaning it brings to that image, and the importance of these can change over time. For example, the uses of formal elements in inventive images in ways that are real (rather than illusionary, or of some other nature) are significantly expanded in comparison to conventional images, e.g., inventive images can have forms of real light, transparency, translucency and spatial depth that are typically variable, workable, reworkable, controllable, spontaneous, and WYSIWYG, as never before. As another example, because the real spatial depth of inventive images is typically workable, reworkable, and controllable as desired, inventive images can be made into shaped paintings as never before. Or, due to the real spatial depth and the rigidity of polymer, an inventive image can have the quality of objecthood. Furthermore due to the use of real formal elements in the present invention, inventive images can be made without relying on the kinds of illusions used in conventional images, inventive images can be made without relying on illusions at all, and inventive images can be made without any illusions at all, e.g., as never before in the history of images. In addition, by its expansion of the use of formal elements, the present invention also expands the use of illusion in images, both with and without the use of conventional practices for making illusions. Thus, inventive images can be made with illusions that are new unique versions of illusions used in conventional images and inventive images can be made with entirely new unique illusions. For example, the use of real light, transparency, translucency and spatial depth that is typically variable, workable, reworkable, controllable, spontaneous, and WYSIWYG, as never before, enables new and unique illusions to be made in inventive images. As another example, the present invention expands the use of illusion in images because conventional practices for making illusions can typically be used with more workability, reworkability, controllability, in processes that can be more spontaneous, more WYSIWYG and in more variations than in conventional images. In inventive images, reality, illusion and perception can function as they do in conventional images, but in addition or instead the use of reality, illusion and perception in inventive images can be new, or new and unique.

The use of real formal elements in inventive images can free image makers from the need to rely on illusionary devices (conventional or new ones) to the extent that they would be needed in conventional images, or to any extent desired. Thus for example, in inventive images, the use of illusionary devices can be optional not essential, and if desired, inventive images can be made without illusions, e.g., in a wider array than ever before. The use of real formal elements in inventive images also 1) enables image makers to create new and new unique illusions, 2) can take the place of illusions to any extent desired, 3) can enable new and unique abstractions, and/or 4) can give inventive images new relationships between abstraction and reality, and between reality and illusion. For example, in a realistic oil painting that shows the inside of a room at night lit only by a single candle painted in the center of the canvas, both the candle light and its illumination of the dark room are illusionary. But if this same painting were on a transparent polymer image support, the candle light and the illuminated parts of the dark room could be see-through polymer that may even emit light, the real light and transparency of which takes the place of realistically painted illusions of light. The real light of the polymer of the present invention has changed the illusion, incorporating the elements of real light and real see-through spatial depth into it, but it is still an illusion, there is no candle. Taking this example a step further using the present invention, all of its illusionism can be eliminated by abstracting the subject matter used in an inventive image, for example, using real transparent and translucent spatial depth, real light e.g., polymer LED(s), and color, with polymer of the present invention, a prominent oval form can be made in the center of an abstract painting of the present invention radiating real light out into the surrounding dark area of the image without any illusions. This image can not be comparably made in conventional painting that is strong and permanent; or workable, reworkable, and controllable as desired.

Illusions can be made in inventive images as desired. For instance, conventional practices for making illusions in conventional images can be used in combination with the new unique characteristics of the present invention (e.g., light and space) to produce inventive images with illusions that are new and unique, and to produce inventive images that are new unique images. In addition or instead, new kinds of illusions can be made in inventive images that do not directly use conventional practices. Many of these new kinds of illusions are unique and some are unlike any even made in images before.

In embodiments, inventive images are made with one function that is changed after a period of time. In comparison, the function of images made using many conventional practices often can not be changed, e.g., if such a change were desired, a new image would have to be made.

In embodiments, inventive images are made that are spiritual, religious, or both, e.g., spiritually is often associated with light in images. These inventive images may also have one or more other functions. For example, such inventive images might be paintings; sculptures; objects with specific religious functions such as menorahs, ceilings in houses of worship (e.g., dome shaped ceilings); alters; a window, a series of windows or a wall of colored windows in a place of worship (e.g., like stained glass windows in a church); images memorializing the dead (e.g., in a Holocaust Museum), etc. Inventive images can also have spiritual or religious content in other ways, e.g., religious text or graphics can be embedded, printed, painted or written in and on inventive images. In further examples, inventive images with or without a specific religious function, subject matter, or association, can have real light or other light qualities and effects that give them spiritual and religious content and meaning, e.g., light can represent spiritual or religious enlightenment, prayer, hope, heaven, nature, a particular religion (such as light representing Christ); goodness vs. evil, or right vs. wrong, etc. Light has been used for its association with spirituality and religion in innumerable images throughout history, e.g., the use of halos painted over people's heads in paintings and the abstract use of light to evoke spirituality as in the paintings of Marc Rothko.

EXAMPLES

An image maker makes 107 flat rigid rectangular planar initial image supports of transparent polymer of the present invention, each measuring between approximately 18 inches by 24 inches, but varying in thickness between approximately 0.20 inches and 4 inches. All of these images are made in a conventional mold. Some of these initial image supports have surface preparation stabilizers on them or they are initial image support stabilizers. These image supports may also have other stabilizers, e.g., fiber or an UV light stabilizer. These 107 inventive images, are all formed by processing their image supports 1-107 differently, as follows.

Image Supports 1-4 are colorless polymers that are each painted on both of their sides and their edges with transparencies, using different conventional fine arts practices, e.g., watercolors, oil paints, or acrylics. Thus, these image supports are used as conventional painting surfaces, only strong, permanent conventional painting surfaces are not transparent; they do not offer comparable use of color with transparency, real spatial depth, and real light; and most of them are not self supporting, e.g., paper and canvas need to be matted, backed, framed or stretched, canvas needs stretchers. Image Support 5 has texture on one of its largest sides created by irregular reflective particles inlaid and embedded in the polymer. This image is further processed with transparent painting applications made principally on its reverse smooth sides. In a few areas, some cPRM is poured over broken color paint applications. Some of this new polymer is overlaid by transparent paint.

Image Support 6 is polystyrene formed with a slight green iridescent coloration unevenly dispersed in its cPRM. The styrene in the cPRM forming this image is catalyzed with about 0.7% Benzoyl peroxide (by volume). N,N,N',N'-tetramethyl-ethylenediamine is added into this cPRM in an amount that is the same or almost the same as that of the catalyst. Dibutyl phthalate is also added into the cPRM at about 7% (by volume). After this polymer image support is formed, it is further colored using oil based paints on both of its sides.

Image Supports 7-9 are all polystyrene formed with a cPRM made as described in Image Support 6., but each of these images is made with a different amount of dibutyl phthalate added into its cPRM. The amounts of dibutyl phthalate added into the cPRM used to make these three images is about 5%, 9%, and 15% (by volume). No color is added into these three cPRM. The resulting three polystyrene images are all painted with oil based paints but using different kinds of oil media. Image Supports 10, 11. and 12 are also polystyrene. The cPRM mixtures used to make them are comprised just as those used to make Image Supports 7-9, but the amount of dibutyl phthalate added into these cPRM is different. Dibutyl phthalate added into these three cPRM at about 1%, 3%, and 13% (by volume). After these polymer image supports are formed, they are further colored using oil based paints on one or on both sides. Image Supports 13-17, are also polystyrene formulated using cPRM comprised as the cPRM used to make Images Supports 10-12. Dibutyl phthalate is added at differing amounts between approximately 1% and 15% (by volume) into these three cPRM, however it is not completely stirred into these cPRM mixtures. As a result the oil based media superimposed on the polystyrene image supports absorbs into different areas on their surfaces differently.

Image Supports 18-25 are formed using Butyl methacrylate catalyzed with about 0.1% (by volume) benzoyl peroxide. N,N,N',N'-tetramethyl ethylenediamine is added into this cPRM in a quantity that is the same or almost the same as that of the catalyst. For each of these images, the open mold is completely covered and sealed well from air as their cPRM polymerize. The polymer image supports formed are then superimposed with oil based coloration, such as oil paints and oil pastels.

Image Supports 26-85 are hydrophilic polymers. They are all made by catalyzing 2-hydroxyethyl methacrylate with about 0.8% Benzoyl peroxide (by volume). N,N,N',N'-tetramethyl ethylenediamine is added into these cPRM in a quantity that is the same or almost the same as that of the catalyst. Ethylene glycol dimethacrylate is added into the cPRM of all but four of these images at about 2% to 15% (by volume) so as to get different levels of absorbency and swelling in the polymer image supports formed. In making each of these images, the open mold is again closed and well sealed from air as their cPRM polymerize. The polymer image supports formed are then superimposed with water based coloration, such as watercolors, tempera, and acrylic paints. A clear colorless acrylic gel medium is superimposed on 25 of these images as a layer of underpainting that is continuous on most of them, but discontinuous on some images. The thickness of this underpainting varies from image to image. This underpainting is then superimposed by further coloration that in some images is water based, in some images it is oil based, and in some images, both oil based and water based coloration are superimposed.

Both sides of Image Support 86 are carved and some of its carved areas are colored. A conventional, see through piece of paper is attached to one side. Some of this paper surface is painted with watercolors and some of it is superimposed with new polymer into which lines are incised. Image Support 87 is colored using conventional practices on only one of its external sides, forming an image that is principally or completely opaque on one side.

Image Support 88 is formed with 2% (by volume) of an oil binder used in conventional painting (such as linseed oil) mixed into its cPRM. This polymer image support stabilizer is painted using transparent and translucent oil based paints and drawn upon using oil pastels.

Image Support 89 is a rigid, non absorbent polymer. Bonding spots are formed on its surface that bond a superimposed layer of a highly absorbent, transparent colorless polymer to it. This image is then superimposed by coloration that absorbs into it. Image Support 90 is carved and this carved surface is coated with a transparent or translucent photochromic layer so that its color changes with changes in light hitting it.

A transparent photochromic layer is put onto one side of Image Support 91. Its photochromic surface is made so that it bonds to superimposed paint. It is then colored with transparencies. A little painting is done on the reverse side of this image also. Three additional parts are attached onto Image Support 92 so that the inventive image formed occupies five times as much volumetric space as its initial image support occupied.

Image Support 93 is colorless. Reflective coloration is added on one side, and it is colored with transparencies on the reverse side. Image Support 94 is colorless, but it is colored with pastels and acrylics on one side and encaustics on the other side. Image Support 95 is incised with lines that form a drawing. A small polymer plane is joined to part of this surface over part of its incised drawing. Conventional additive processes are used to draw on part of the exposed surface of the newly attached part, e.g., ink, pastels, etc. Image Support 96. is colorless. It is colored with multiple layers of oil paint on both sides, using multiple layers of glazes and impasto.

Image Support 97 is colorless. It is colored with multiple layers of pastels on both sides. On selected areas of its pastel applications, new transparent polymer is superimposed. Then this inventive image is painted in randomly varied areas with oil paint. Image Support 98 has some internal green coloration. It is further colored with writing on one side and traditional oil painting on the other side. Image Support 99 is perforated by negative cut-outs that are made within it as it is further colored by conventional printing processes and conventional painting processes.

Image Support 100 has some red coloration and some colorless areas. A little linear drawing is done on this image support, and it is cut into five irregular pieces, some of which are drawn upon. Then all of these pieces are bonded to one another in a new, 3D Compositional Arrangement, and some painting is done on this new 3D form. Image Support 101 has internal coloration from polymer LED(s). The color light they emit changes over time so as to present a changing abstract image, that may change very fast, e.g., like a video. If desired, this image is further developed, e.g., with superimposed coloration. Image Support 102 is colorless, its internal polymer LED(s) emit colorless light, the brightness of which can be modulated as desired. It is colored with transparent painting, e.g., watercolors on one side and oil paints on the other.

Five image supports #103-7, are used as the image support to make a single composite inventive image, Image Support 103, which has areas of pale transparent blue coloration. Image Support 104 has painted stokes with some opaque coloration that block light emitted by its polymer form. The light emitted can be controlled as desired. Image Support 105 has some linear coloration. Image Support 106 is colorless. Image Support 107 is thickened with additional polymer. It has nine embedded reflective square particles. These five forms are put together into a single composite image that has five superimposed polymer layers alternating with six layers of transparent painting, all of which the viewer sees simultaneously though one or more of this image's polymer layers which may or may not be bonded to the rest of this inventive image.

In further embodiments, inventive images are also made using planar polymer sheets, as in these illustrations.

Illustration 1.

100 planar polymer inventive images are made in succession in a conventional elastomer mold, the negative space of which measures about 24 inches by 36 inches by 1.5 inches. Fifty of them have embedded fiber stabilizers and fifty of them do not. Forty of them have new unique colored polymer imprimatura, twenty of which have fiber stabilizers. Each of these 100 images is an edition of one, even though many are the same or even identical in their early stages. If necessary, before each polymer is made, the mold is cleaned with a cationic cleaner (such as "Fantastic") and water. If desired, the mold is coated with a thin, preferably even layer of a conventional mold release agent, e.g., spray petroleum jelly. These planar polymer images are further processed as initial image supports, e.g., as stabilizers.

Figure 74:
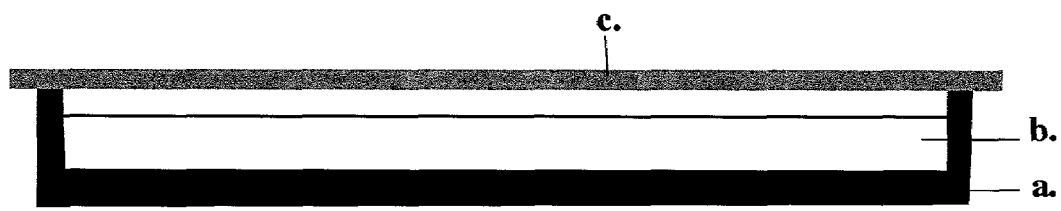
FIG. 74 shows the use of a roof over cPRM forming polymer exposed to air.

The first fifty of these polymer images are made without fiber stabilizers as follows. A batch of PRM is made by putting about 7080 milliliters (7079.184 ml.) Silmar® Polyester Resin S-40, made by SILMAR®, a division of Interplastic Corporation in Covington Ky., into a polypropylene container. This is a monomer that can form transparent colorless polymer. A concentrated-stabilizer-mixture might be made by taking about 150 ml from this quantity of S-40 monomer and mixing it well with about 28 grams of TINU-VIN® 328 by Ciba Geigy (a light stabilizer in powder form) in a separate glass jar, so that the stabilizer is thoroughly wet out without lumps. Then this concentrated-stabilizer-mixture might be poured into the original batch of S-40 monomer to form the PRM desired. If after mixing thoroughly, there are lumps of the concentrated-stabilizer-mixture in the PRM, these are either broken apart, wet out and mixed into the PRM, or removed so that no trace of the concentrated-stabilizer-mixture is visible within the PRM. This PRM is then catalyzed with about 71 ml of CADOX® M-50 MEKP made by AKZO Chemicals in Arnehm, The Netherlands, and mixed well. This cPRM is poured into the mold's negative space, forming a thin layer approximately 0.3 inches to 0.6 inches thick. Immediately thereafter, a clean piece of cardboard might be placed over the entire mold, covering it completely. Because this piece of cardboard might be supported by the mold's side walls, there is an air pocket between it and the surface of the cPRM in the mold, as shown in FIG. 74. The next day the polymer image is removed from its mold and it is cleaned using soap and water.

Although this same process is repeated to make all fifty of these polymer inventive images, an extra step is added in making twenty of them. This additional step is the homogenous mixture of coloration into the PRM used to make them, so that they have new unique imprimatura, e.g., in a concentrated-coloration-mixture made by taking about 125 ml of the PRM and putting it in a separate jar with a concentrated amount of the desired coloration (for example, the quantity of coloration added varies according to the discretion of image makers). The PRM and coloration are mixed together well, e.g., wetting out the pigment as completely as possible. Then slowly, small amounts of the concentrated-coloration-mixture are mixed homogeneously into the rest of the PRM until the desired coloration is achieved, the quantity used varies.

Each of the second fifty of these polymer inventive images are made in the same mold with an embedded layer of fiber stabilizer positioned approximately medial within each of them as follows. A batch of PRM is made using the same mixture used in the first fifty images as described above. This PRM is divided into two halves. Half of this PRM is catalyzed using about 36 ml. of MEKP, it is mixed well and poured into the negative space of the mold forming a layer approximately 0.14 inches to 0.25 inches thick. Once this layer of cPRM begins to gel firmly enough so that a superimposed layer of fiber will not sink down into it, a single piece of very thin, fine, clean, open weave surfacing veil Surmat® continuous glass fiber made by Nicofibers of Shawnee, Ohio, measuring 24 inches by 36 inches is laid on its upper surface and pressed into its wetness so that it lays flat, so that it sticks to the cPRM and so that it becomes as saturated with the wet cPRM as possible, while remaining on its surface rather than sinking into it. A blunt hand tool (such as a blunt wooden stick or tongue depressor), is used to press the fiber down flatly onto the surface of the cPRM, wetting it and releasing undesirable trapped air bubbles. An hour later, the remainder of the PRM is catalyzed in small quantities of about 125 ml. using about 1.25 cc MEKP, each of which is applied onto the inventive image, forming a layer approximately 0.14 inches to 0.25 inches thick, embedding the fiber in a manner that enables undesirable bubbles to be removed, e.g., using an ordinary paint brush with dark colored bristles. immediately thereafter, a clean piece of cardboard might be placed over the entire mold, covering it completely (described above for the first 50 polymer inventive images). The next day the polymer image is removed from its mold and cleaned using soap and water.

Although this same process is repeated to make all fifty of these polymer inventive images with fiber embedded in them, an extra step is added in making twenty of them. This additional step is the addition of coloration (e.g., transparent pigment), into the original batch of PRM (e.g., using a concentrated-coloration-mixture), before this PRM is divided in half or catalyzed using the process described above for the previous twenty images with imprimatura. Thus, twenty of these polymer inventive images that have fiber within them, also have a new unique imprimaturs.

Then, forty of the polymer inventive images without any fiber in them, (twenty-five of which are colorless and fifteen of which have a new unique imprimaturs), and forty of the polymer inventive images that have fiber stabilizers within them, (twenty-five of which are colorless and fifteen of which have a new unique imprimaturs), are given a surface preparation stabilizer. Example A., some of these polymers are sandblasted on their two sides and edges, cleaned well with soap and water, given a final rinse with distilled water and allowed to dry completely. Then the SSI on some of these polymers are painted, drawn upon, and/or printed upon, using conventional practices (such as paints, pastels, etc). SSI on others of these sandblasted polymer images are given a Clarifying Imprimatura made of transparent colorless acrylic medium (e.g., gel) that is capable of being brushed on without undesirable air bubbles. (Thus, some of these images have two kinds of underlayers superimposed.) All of these Clarifying Imprimatura are applied on these images thickly enough so that they fill in the sandblasted abrasions or SSI on the surfaces of these polymer images completely. All of these Clarifying Imprimatura are applied in a manner such that undesirable air bubbles are not formed or trapped in them. The Clarifying Imprimatura on these inventive images fill in their SSI completely, smoothing out their sandblasted surfaces, restoring their transparency, their color and their clarity. Example B Some of these polymer images are superimposed by a surface preparation stabilizer that functions as an underlayer, and/or as a glue, bonding to both the layer beneath it and the layer above it. For example, a surface preparation stabilizer is made using a mixture of the same cPRM used to make the initial polymer form with approximately 1% (by volume) of a conventional medium mixed in (such as a conventional oil or acrylic paint, linseed oil, or an acrylic medium). Example C, these polymer images are given surface preparation stabilizers that are a combination of those in Examples A. and B, e.g., such surface preparations stabilizers contribute to the aesthetic of these images, for example as a design or drawing underlayer. Thereafter, all eighty of these images are each painted differently using conventional practices, for example, on their sides and edges, e.g., using conventional practices. The paint used on one side of some of these images is reflective (such as a silver and/or iridescent paint), and the paint used on their reverse side is transparent.

The remaining ten inventive images without any fiber in them, (five of which are colorless and five of which have a new unique imprimaturs), and the remaining ten polymer images that have fiber within them, (five of which are colorless and five of which have a new unique imprimatura), are all given a surface preparation stabilizer on only one of their sides, e.g., their other side and edges may not be further processed in any other way. Refer to examples of surface preparation stabilizers previously described herein. Thereafter, all twenty of these images are painted differently using conventional practices.

The resulting 100 inventive images may be mounted using conventional practices, they may be viewed from one side only, or they may be viewed from both sides, and they may function as paintings, as windows, as table tops, stage sets, wall panels, graphic design, etc. Each of them is exposed to light.

Illustration 2.

100 planar polymer image supports (which may or may not be stabilizers, or initial image supports) are made in succession in a conventional elastomer mold, the negative space of which measures 24 inches by 36 inches by 1.5 inches. Fifty of these polymers have fiber in them installed as described above in Illustration 1. Each of these 100 images is an edition of one, even though many of them are the same or even identical in the early stages. All of these image supports are made of a cPRM mixture that has about 0.4% to 15% (by volume) of one or more ingredients from one or both of these two categories: i). conventional paints, sizes and primers; binders used in conventional image making media and materials; conventional media for painting; and wax and compositions containing wax; ii). absorbent polymers. These image supports might have other special effects that are not comparably existent in conventional images such as light effects. For example, each of these image supports might have an internal layer of polymer LED(s) and/or another kind of electrically active layer, as well as a switch, a sensor and/or a control for this electrically active layer. These image supports are further processed.

Illustration 3.

100 planar polymer image supports (that may or may not be stabilizers, and/or initial image supports) are made as described in Illustration 2. (half of them have fiber in them as described in illustration 1.), but these are made using cPRM comprised of about 70% to 100% by volume of one or more absorbent polymers (refer to previous examples herein). These image supports might have other special effects that are not comparably existent in conventional images such as light effects. These image supports are further processed.

In a different illustration, a polymer image support is made using transparent or translucent PLED(s) over a reflective substrate.

In some embodiments, image supports are made with PLED(s) so that as they are further developed, the light they emit can be modulated or changed as desired.

In a different illustration, inventive image parts made with little or no polymer of the present invention, serve as initial image supports. Though these image supports are not image support stabilizers, they might be other kinds of stabilizers such as fiber stabilizers, and/or they may contain stabilizers (e.g., UV light stabilizers). For instance, an inventive image might be formed by partially or entirely covering one or more of these initial image supports with cPRM. For example, this may be desirable because: a). a see-through layer of polymer on such an initial image support, can give it light, transparency, translucency, and/or coloration; b). a layer of polymer can thicken its spatial depth; c). polymer can make many initial image supports rigid or more rigid, strong or stronger, self supporting or more self supporting, polymer can reinforce image supports, or a combination of these e.g., polymer can make paper or fabric (for instance, a stabilizer) rigid, a conventional drawing on paper covered with polymer may no longer need matting, framing or either, and a conventional canvas or a conventional image on canvas covered with polymer may no longer need a conventional stretcher or frame; d). polymer can give these initial image supports other aesthetic effects. For instance, it might change the quality of their transparency, translucency, clarity, texture, other light qualities (e.g., matte or glossy), or other aesthetic qualities. For example, once they are covered with cPRM, absorbent papers and fabrics (e.g., stabilizers), that may or may not have conventional applications on them (such as painting, printing or writing), will become transparent, translucent, more transparent, more translucent, or a combination of these. As another example, covering these initial image supports with polymer may enable them to be further processed in ways that might have been difficult or impossible otherwise, for instance, while paper, canvas, and other fabrics (e.g., stabilizers) can not be carved, incised, or inlaid, a polymer layer on these materials can be processed in these ways. e). polymer can coat or seal these initial image supports. Polymer can also coat or seal conventional applications made on these initial image supports. For example, a layer of polymer can seal a sheet of paper, gold leaf on a conventional image support, or conventional drawing (such as graphite, pastels, or charcoal) on a paper or canvas initial image support. If desired, polymer can separate the surfaces of these initial image supports from subsequently superimposed applications; f). polymer can give the surface a layer that is absorbent, hydrophilic, and/or hydrophobic; g). polymer can enable these initial image supports to bond, as desired, to subsequently superimposed or connected parts, attachments, and/or applications, e.g., cPRM used as a bonding substance; h). polymer can repair these image supports, e.g., a tear in paper repaired with cPRM; i). polymer can contribute to an image by being electrically active, j). polymer can serve other functions or a combination of these functions.

An initial image support made with little or no polymer of the present invention, may be planar, and 2D or 3D, opaque, transparent, or translucent. For instance, it may be wood, paper, a reflective material like metal or a mirror; metal with other finishes; a mesh or fabric such as one made of stainless steel; it may be ceramic, glass, stone, etc. Such an initial image support might be a frame work, e.g., of metal or wood. It might be fiber such as a fabric that might be opaque, transparent or translucent, or it might be another kind of strengthening stabilizer. Such an initial image support may be a combination of these, etc. In a further example, an inventive image may begin on one or more initial image supports that are found objects or devices, e.g., an inventive image painting made using four conventional dinner plates as initial image supports. An inventive image might be made by partially or entirely covering one or more conventional image supports with polymer, e.g., an inventive image made by covering paper, glass, plastic and/or canvas with cPRM. An inventive image may be made by partially or entirely covering one or more conventional images with cPRM, e.g., a conventional photograph, painting, drawing, collage, print, fresco, graphic design, cut-out, sculpture, etc. For instance, four separate positive cut-outs, one made of paper, another made of metal, a third made of wood, and the fourth made of a fabric stabilizer might be partially or entirely covered with cPRM to make a single inventive image, e.g., that might function as a painting, a table, a mobile, or a sculpture.

As a further example, an inventive image painting is made on one, or on both sides of an initial image support comprised of see-through paper or a fabric stabilizer, covered with cPRM partially or completely on one of its sides or on both of its sides, before the painting is done, as the painting is done, after the painting is done, or at more than one of these times. This paper or fabric initial image support might be paper or fabric of any conventional kind (e.g., cotton, vellum, rag, linen, lace, construction paper, typing paper, acid free paper, acetate, mylar, shims, nylon, silk, it may have strands of metal in it, it may have dried flowers in it, it may have particles such as beads in it, might have an open weave, a tight weave or both, etc.). Before it is covered with cPRM or afterwards, this initial image support might, for example, be perforated, it might have negative cut-outs, it might be transparent, translucent, or a combination of these. The polymer superimposed on this initial image support, might partially or entirely cover or serve as reinforcement for painting on it. The polymer may or may not absorb into its image support. Painting or other marks might be made on the polymer inventive image surface and if desired. Whether or not its surface has painting on it, this image might then be further processed with one or more additional layers of cPRM, partially or completely covering it. Then, if desired, painting can be done on this image. If desired, a sequence of painting and layering cPRM can be repeated as many times as desired, to make a 2D or 3D inventive image painting as desired. The resultant inventive image painting may have a one, two or more sides for viewing. This inventive image may be self supporting, e.g., it may or may not need or have additional support.

Figure 16:
FIG. 16 shows three stages in layering an inventive image.

In cross section or side views, FIGS. 16 and 17 show inventive images made by covering an initial image support with further applications, so that this initial image support becomes internal within the inventive image. FIG. 16 shows three progressive stages in the development of a single inventive image marked 16.a., b. and c., FIG. 17 shows one view of a different inventive image. For example, each of the initial image supports used in the inventive images in FIGS. 16-17 might be either a conventional image support (such as a sheet of paper, a piece of canvas, a piece of wood, a piece of glass, a board, etc.), or a conventional image (such as a conventional drawing, e.g., a pastel or pencil drawing; a conventional painting such as an oil, encaustic, fresco or watercolor painting; a conventional photographic print or transparency; a conventional cut-out; or a conventional print, such as an etching, lithograph or silkscreen). Or the image supports within the inventive images in FIGS. 16-17 might be made of compositions that have polymer and thus may be image support stabilizers. FIGS. 16-17 show both of these inventive images further processed with a superimposed layer (e.g., of cPRM) completely covering them, shown as a white layer outlined in black. Upon the layer of polymer on the inventive image in FIG. 17, an application is superimposed discontinuously (shown in black) that may or may not be comprised or principally comprised of polymer (e.g., it might be paint, attached photographs, attached pieces of wood, etc.). FIGS. 16.*b*. and 16.*c*. show further applications made on various sides of the inventive image in FIG. 16.*a*. that may be polymer applications, they may be principally, partially or entirely made of a different composition (such as paint, etc.), or they may be a combination of these. In another example, initial image supports might instead be partially covered (e.g., with cPRM) to form an inventive image, e.g., with polymer on only one of the image support's sides, or with polymer on its surfaces in a pattern, drawing or design.

FIG. 64 shows views of a single inventive image at progressive stages in its layered development from vantages that approximate three-quarters views. In FIG. 64.I. an octagonal polymer medium layer is formed (that may or may not be a perfect octagon), made of a transparent colorless polymer. This polymer form is an initial image support stabilizer. A bonding speckled application is applied to its underside that might be opaque, see-through or both. This speckled application might for example be a paint or a bonding substance (e.g., cPRM) with elements dispersed in it, (e.g., particles of mica, minerals, shells, sand, glass, fluorescent matter, colored polymer, glitter, beads, sticks, hay, metal, paper, pigment, fiber, ceramic, fabric, metal, and/or ribbon), this speckled application may be collaged speckled paper, or paper adhered with a speckled bonding substance, a group of discontinuous marks (e.g., made using a painting medium, a drawing medium, a writing medium, and/or a printing medium such as pastel, crayon, pencil, paint or ink marks), or this speckled application might be a combination of these. This inventive image in FIG. 64.I. may be the image desired but if not, this image can be further processed. One of the ways that it can be further processed is by sanding or carving, e.g., making indentations in its surface or removing part or all of the speckled application. Another way it can be further processed is with a layer of large discontinuous opaque marks added to its upper surface and to some of its side edges as in FIG. 64.II. These opaque marks might for example, be paint, pastel, ink, collage, or cPRM, that is printed, painted, drawn, and/or attached to this inventive image. If this inventive image is not yet complete it can be further processed. For example, some or all of these opaque marks can be removed from one or more of its sides. If desired the image can be returned to the way it was in FIG. 64.I., or it can be returned to a colorless transparent polymer octagonal form (its initial image support) without any coloration. FIG. 64III. shows another way that it might be further processed with a new layer of transparent polymer medium added onto its upper surface and dark opaque marks e.g., of oil paint, photographs, fabric, cPRM (such as colored cPRM), ink, metal (such as pieces of gold leaf), charcoal, another plastic, particles, pastel, encaustic, printed areas, pieces of rubber, or pieces of paper. Because there is a layer of colorless transparent polymer in between this layer of marks and the previous layer of marks, there is real noticeable spatial depth and a real noticeable tangible form of light within this inventive image, between all three of its layers of marks. The image of FIG. 64.III. may be finished as desired. If not it can be further processed. For example, polymer LED(s) on its underside may enable it to emit light.

Another example of further processing is in FIG. 64.IV. which shows the image of FIG. 64.III. with another layer of transparent colorless polymer on its upper surface, that is then superimposed by three areas of transparent coloration, e.g., a painting or drawing application, colored attachments (such as collaged tissue paper or attached pieces of glass), and/or portions of a photographic transparency attached to or formed on the surface of this inventive image. Between this layer of marks and the previous one, there is a layer of real noticeable transparent spatial depth and a tangible form of real light. The inventive image of FIG. 64.IV. may be the desired finished image, if not it can be further processed as desired.

As an example of further processing this inventive image, FIG. 64.V. shows yet another layer of transparent colorless polymer added onto its upper surface, and numerous colored circular shapes upon both this new polymer surface and this image's sides. For example, these opaque circles might be stickers, other paper, felt or silk; painted or drawn applications (such as charcoal or pastel); or they might be a combination of these. The inventive image of FIG. 64.V. may be the desired finished image, if not it can be further processed as desired. For example, some or all of these new circular shapes can be removed; their shapes can be reformed; their coloration can be changed; they can be repositioned, or a combination of these. As another example, FIG. 64.VI., shows attachments made to this inventive image, e.g., rods, bears or pieces of a material are attached to this image. If the attachments are unsuccessful, they can be removed, e.g., the image surface can be reworked so that the image bears no evidence of ever having had these attachments. Moreover, while this image initially was 2D, as matter is added to it, it might have become a 3D image. Also, regardless of which stage in the development in FIG. 64.I.-VI. this image progresses to, it might be one part of an inventive image made of multiple parts, e.g., one part of an image made of 20 octagonal parts put together like building blocks to form one larger inventive image.

Attachments made on top of the inventive image in FIG. 64.V. are shown in FIG. 64.VI. These attachments might, for example, be made of metal or wood (e.g., carved wood completely coated with cPRM that bonds to the polymer surface of this image). These attachments might have SSI on its underside, e.g., perforations, abrasions or both. Thus they might be bonded to the polymer surface beneath using the same cPRM as a bonding substance and/or screws.

Figure 27:
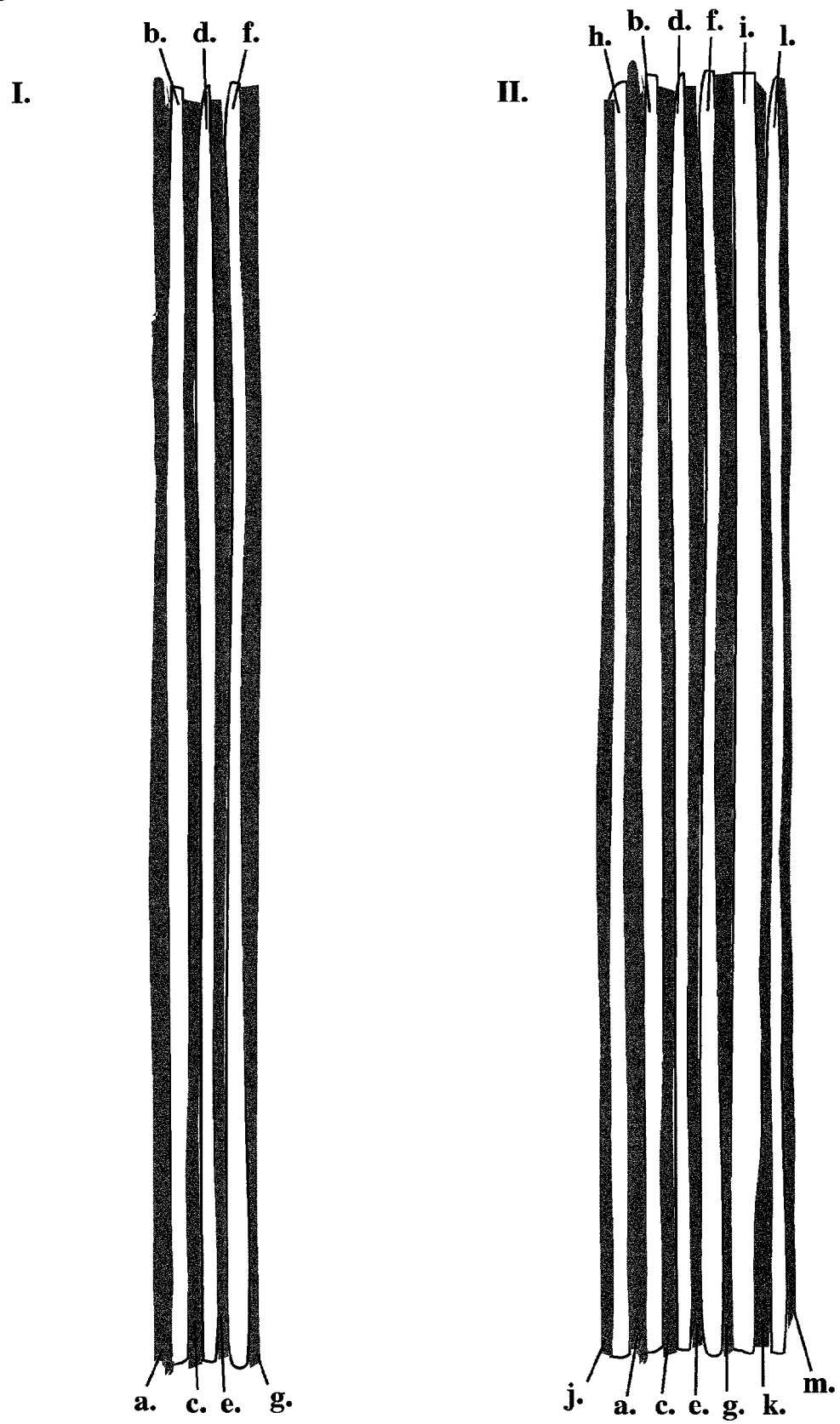
FIG. 27 shows two stages in the layered formation of an inventive image in cross section or side views.

In the following descriptions, the inventive images illustrated in cross section or side views in FIGS. 25 and 27 might be interpreted so that their white layers are polymer. The other layers in these inventive images shown colored in varying shades of gray are of a composition that is different from the composition of the particular polymer of the present invention that was used in their white layers, e.g., conventional paint, a drawing medium, collage, printing, a photograph, text, a polymer different from the one used in the other layers (such as a polymer made from a cPRM with one or more active ingredients that are different from the polymer layers), fabric (such as a stabilizer), polymer LED(s), another electrically conductive layer, a bonding substance (such as a glue, paper, particles, a reflective and/or iridescent medium and/or material), or a combination of these.

Figure 25:
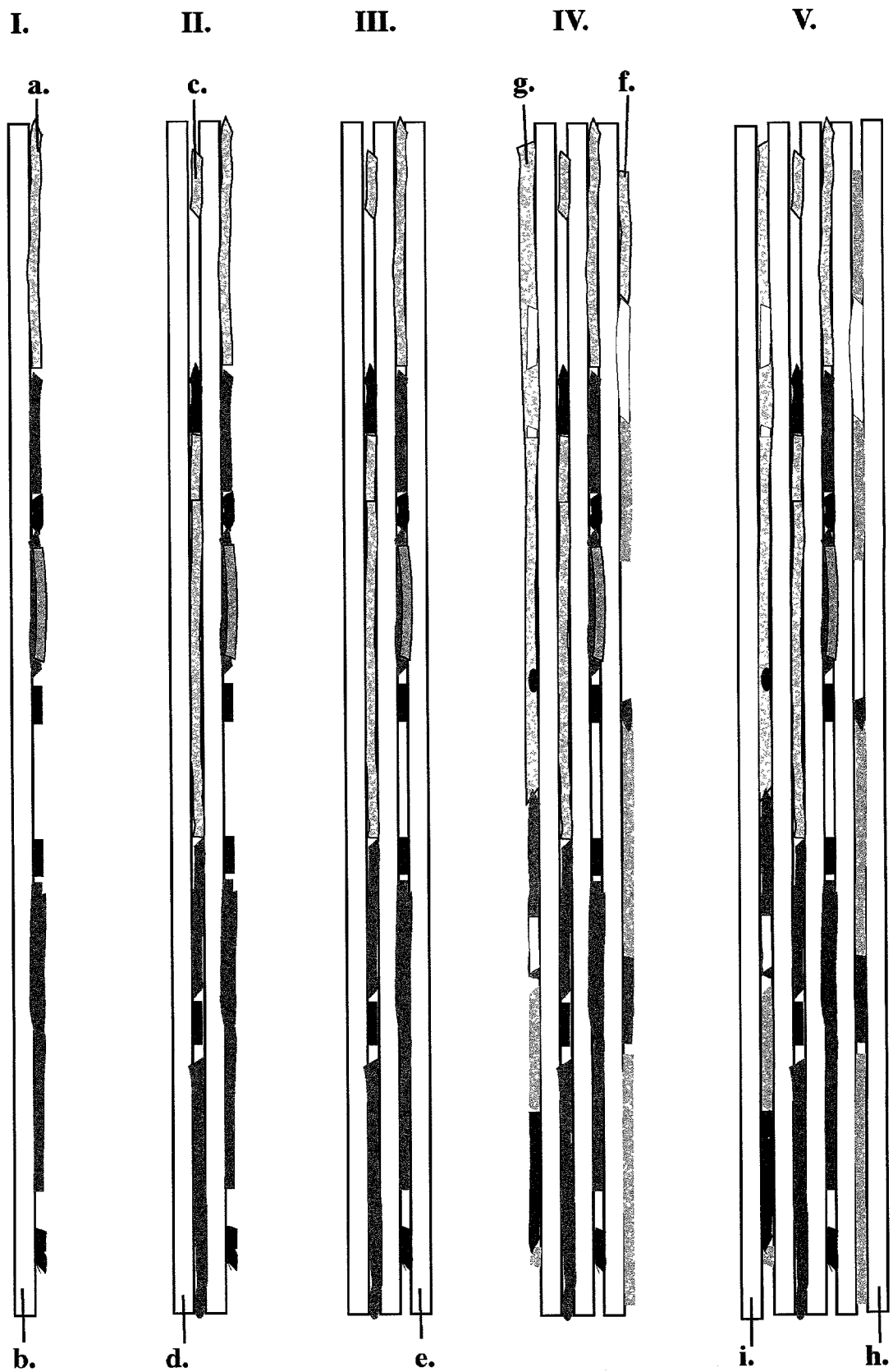
FIG. 25 shows five stages in the layered formation of an inventive image in cross section or side views.

FIG. 25 shows the formation of an inventive image in five stages. FIG. 25.I. shows a layer of polymer marked b., that is an image support that may or may not be a stabilizer, that is covered with a discontinuous layer of another composition marked a. If this is not the finished image desired, this image is further processed. For example, FIG. 25.II. shows this image with two additional layers added on its left side, the first marked c. is made of a composition that is different from this image's polymer layers and the second new layer marked d. is a new layer of polymer (that may for example be a Separating Layer Stabilizer). One or both of these two new layers might have been formed on this image or they might have been formed separately and then added onto this image. Though they were just added, both layers d. and c. could be removed returning this image back to the stage in FIG. 25.I. In addition or instead, its layer marked a. in FIG. 25.I. might be removed. Or for example, this image might be further processed by continuing to add layers to it as in FIG. 25.III. in which, e., a new layer of polymer is added onto the right side of the composition made in FIG. 25.II. (which may for example be a Separating Layer Stabilizer). If this is not yet the finished inventive image desired, it may be further processed. For example, FIG. 25.IV., shows further processing with two added layers marked f. and g., both of which are made of compositions that are different from the polymer or polymers used in this image's white layers. Thus two of the largest outer sides of this image are now changed so that rather than having continuous polymer surfaces as in FIG. 25III., they now have discontinuous surfaces made of one or more different compositions. This may be the finished image desired, but if it is not this image can be further processed as desired. For example, if desired, either or both of these two new layers can be reworked. For instance, their coloration, composition, texture, forms, discontinuousness, or thickness can be altered as desired, e.g., their color can be lightened or darkened, for example, using one or more additive processes, and/or subtractive processes. Part or all of these two new layers can be removed. As another example, a new layer of polymer of the present invention might be added to both the right and left exposed surfaces of this inventive image, as in FIG. 25.V. marked h. and i. FIG. 25.V. might be the finished image desired, but if not it can be further processed.

While the layers of polymer appear continuous in FIG. 25. and the layers made of one or more other composition appear discontinuous, in an inventive image, layers of both compositions can be as continuous or as discontinuous, as even or as uneven as desired. Furthermore, their continuousness their evenness or their lack of these can be changed as desired. FIG. 27. shows another example. This inventive image might have irregular but continuous layers of polymer of the present invention, marked b., d. and f., alternating with irregular but continuous layers made of one or more other compositions marked a., c., e., and g. In FIG. 27.II. of this illustration, this same image has been further processed with additional layers of polymer of the present invention h., i., and l., and with additional layers of other compositions marked j., k. and m. Note, the inventive images in both FIGS. 25 and 27 are processed on multiple sides.

In the inventive image in FIG. 25., one or more of the layers marked b., d. and e. might be Separating Layers of polymer in between non polymeric layers of discontinuous applications, such as layers of broken color painting, direct painting, collage, photography, drawing, writing, printing, attachments, inlays, impasto painting, etc. For example, these Separating Layers of polymer might separate layers of oil painting that are applied lean over fat, fat over lean, or with a fat content that generally stays the same neither increasing nor decreasing, e.g., so that layers of oil paint will not build up thickly enough to jeopardize their permanence. By their transparency, these Separating Layers of polymer might give the image a desired sense of deep spatial depth, light or both. Thus, for example, viewing the inventive image in FIG. 25.V. through layer h. or i., could be looking into four superimposed layers of pastel drawing with real space and real light and perhaps an iridescent or a reflective light effect in between them from their transparent Separating Layers of polymer. It might be looking into four superimposed layers of transparent oil painting spaced at slightly different spatial depths, a new kind of painting in space. Or, it may be looking into a new kind of drawing in space that is tangible.

Figure 26:
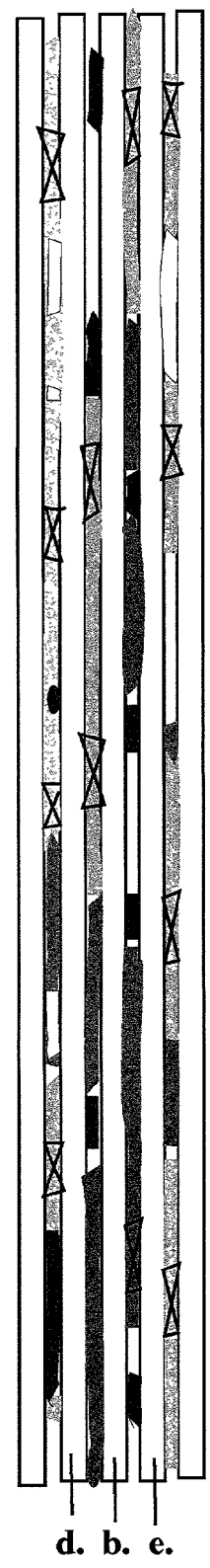
FIG. 26 shows a cross section or side view of a layered inventive image with bonding spots.

FIG. 26 is the same inventive image that appears in FIG. 25.V. showing examples of bonding spots (marked "|X|") that might be connecting three internal Separating Layers of polymer b., d. and e., both to one another with the discontinuous non polymeric layers, and to this inventive image's two external polymer layers. Similarly, there might be bonding spots in the inventive image in FIG. 27. connecting a Separating Layer Stabilizer to non polymeric applications on both its upper and lower sides One or more of the layers in the inventive image in FIG. 27.II. that are marked h., b., d., f., i., and l. and are shown in white, might be Separating Layers of polymer in between continuous non polymeric applications (shown in gray). Again, these Separating Layers of polymer might for example, separate layers of oil painting that are applied lean over fat, fat over lean, or with a fat content that generally stays the same neither increasing nor decreasing, e.g., so that layers of oil paint will not build up thickly enough to jeopardize their permanence. These Separating Layer Stabilizers might separate layers of painting, drawing, photography, collage, printing, writing, encaustic, dichroic glass, paper, combinations of these, etc. Though they are rendered white in this illustration, these Separating Layers of polymer might have drawing on them, they might have reflective elements attached to their surfaces, engraving in them, they may even emit light using PLED(s), etc. Viewing the inventive image in FIG. 27.II. through its external layers j. or m., might be looking into seven distinct, superimposed layers of watercolor painting that are illuminated by the light of transparent colorless Separating Layers between them. It might be looking into three layers of oil painting, alternating with four layers of watercolors, all seven of which are spaced between transparent Separating Layers of polymer. It might be looking into seven superimposed layers of drawing applications with real spatial depth and real light in between them from their Separating Layers of polymer. It might be looking into seven layers of a single oil paint glaze that are separated by see-through Separating Layers of polymer. Or it might be looking through seven layers of collage (which have components such as, photographic transparencies, see through paper, objects, etc.) separated by the real spatial depth of transparent colorless layers of polymer. As a further illustration, the inventive image in FIG. 27.II. might be an area of a painting of the present invention that is a copy of an oil painting by Rembrandt, Vermeer or Turner, but that has more luminosity than any of these original paintings, because while the originals paintings by these artists have multiple layers of transparent or translucent oil paint, this painting of the present invention has the same layers of transparent or translucent coloration that can be made with the same oil paint, but it can have this with interspersed transparent and/or translucent Separating Layers of polymer. The inventive image in FIG. 27.II. might for example be layers of chiaroscuro painting technique formed using Separating Layers of polymer (e.g., made of colored cPRM) in a painting of the present invention that is a copy of a painting by Rembrandt.

FIG. 6 shows a 2D or 3D image that might have faceted sides, and that might have been made in a number of different ways using the inventive medium. For example, this image might have been made from a single mass of polymer inventive medium using one or more subtractive processes (such as carving, chiseling, or sanding). This image might be made by adding matter to an initial plane or an initial mass using the inventive medium, and then shaping this matter (e.g., subtracting from it) as necessary, into the shape desired, which might be a faceted shape, e.g., by sanding or carving it. As a third alternative, this image might be made by connecting multiple separately formed parts, e.g., polymer parts. In a further example, this inventive image might a 2D or 3D form (e.g., a plane) of a polymer made using the inventive medium with lines on it (e.g., formed by painting, printing, incising, drawing, embossing, inlaying; attaching or embedding one or more elements such as string, wire, particles, etc.), that create the illusion of 3D spatial depth. This 2D or 3D image might have been cast as it appears, with or without coloration, without any further processing. This image's form might be open, made of multiple connected rods, bars and/or strips. This image might be made of multiple superimposed layers of cPRM, with or without any other material and/or media. If this image is closed form it might be solid or hollow.

FIG. 5.I. shows an inventive image made of a transparent polymer planar image support that may or may not be a stabilizer. On this image support, a realistic sky scene full of clouds might be painted in transparencies, using conventional painting practices. This image relies upon real light for its visibility; for its luminosity, its radiance and its brilliant sense of light; as well as for its sense of great spatial depth; its realistic 3D illusion of clouds and sky; and other aspects of its subject matter, function, content, and meaning.

FIG. 5.I. might be an inventive image depicting a cloud filled sky the coloration of which was applied on a polymer initial image support (e.g., a stabilizer) using transparent conventional materials and media. This may be the image desired, but if it is not, this image can be further processed as desired. FIG. 5.IV. shows an example of further processing in which coloration is removed unevenly and artistically to lighten the clouds in this image and to give them more of an illusion of volume. This lightening of applied coloration and this modeling of form is typically easy using the present invention, though reworking many conventional practices on conventional surfaces can be limited, problematic or impossible. This image may be finished, but if it is not it can be further processed as desired. As an example, the contrast and drama of this image are heightened by inconsistently darkening its background sky with added color, as in FIG. 5.II. Though this sky is darkened, it is still translucent in its darkest areas and transparent or translucent in its other areas. This image might even emit light through its painted illusion of the sky. The addition of this or these new layers onto this inventive image may noticeably affect its light, form, content and meaning, and it may or may not significantly affect its real spatial depth. This may be the image desired, but if it is not, this image can be further processed as desired. As an example, coloration can be removed from this image returning it to the way it was in FIG. 5.I., returning it to the way it was in FIG. 5.IV., making it into the image in FIG. 5.III., or removing all of the conventional media superimposed so that it is back to being the image support it was initially. This kind of workability, reworkability and control typically does not exist in conventional practices. The resultant image might for example be a painting, a wall, a window, a partition, a table top, and/or light source, etc.

In FIG. 5.I., transparent painting is done on a planar polymer image support using conventional practices. This image support might have been made with a surface preparation stabilizer on it, e.g., so that it bonds more strongly to conventional paints. It might also have PLED(S) enabling it to emit light. This painting might be done on one or both of this polymer's larger sides, with or without painting its side edges. It may also have internal coloration. However, in addition to just using conventional practices on this inventive image, it might be further processed on one or more of its sides in one of these ways. 1). Conventional applications made in individual layers, in multiple layers, or both such as conventional painting applications can be applied to this polymer inventive image separated by one or more Separating Layer Stabilizers made of polymer that are transparent, translucent or both. Thus, for example, the cloudy sky in this image can be painted using one or multiple layers of conventional painting, the real spatial depth of which is usually very limited (e.g., unless impermanence is desired). 2). The cloudy sky in this inventive image may be painted using one or more layers conventional applications as desired, superimposed by a Separating Layer Stabilizer made of polymer, then superimposed again by one or more layers conventional applications as desired, and then if desired, repeating these alternating steps as many times as desired, until the inventive image desired is formed, with the coloration, spatial depth and other formal elements desired. Using the latter method, both the total number of layers used to make the cloudy sky in this inventive image and the real spatial depth of this inventive image are unlimited, or limited only by the image maker to a determination that can be changed if desired and as desired. The result can be a 2D or a 3D inventive image.

Thus a painting of a subject like a sky, which is an illusion of real spatial depth and of real light, can be made using more real spatial depth and more real light than ever before. It can also be made luminous in a way that it has never been luminous before. Further, the use of layering with Separating Layer Stabilizers made of polymer can give the resultant inventive image other new and unique effects of light, color, form, movement, and other formal elements. For example, this cloudy sky can be a permanent image made using layering arrangements and combinations of layers that might only be made in impermanent conventional images, or that simply do not exist in conventional images. Examples are the use of watercolor over oil paint, pastel over 30 superimposed oil paint glazes, 40 superimposed applications of pastel, 100 superimposed watercolor washes within which there are three layers of broken color oil painting, the superimposition of 1000 layers of line drawing, the superimposition, or 3000 layers of pointillist dots in various different conventional media, etc. Moreover all of these variations can be combined with the use of polymer LED(s). Applications superimposed on this image can change its subject, content and meaning, e.g., on one side of this image airplanes can be painted so that viewed from this side, this image shows a fleet of planes in front of a cloudy sky, while viewed from its opposite side, this same image shows a fleet of airplanes in the distance, deep in the vast cloudy sky.

As an alternate interpretation, FIG. 5.I. might be an inventive image made according to the description above, on an image support that is made of a composition that is completely or partially non polymeric, e.g., this image support might be a transparent fabric such as a shim, canvas, paper, wood, metal, or another conventional painting surface, with or without a cPRM coating. Rather than conventional applications or in addition to them, the inventive image of FIG. 5.I. might be further processed by adding one or more layers of colored cPRM used as paint. Using one of the many processes of creation described above, the inventive image in FIG. 5.I. might have one or more of its external surfaces made of one or more different conventional applications or layers of cPRM. In the processes of creation described above, one or more subtractive processes might be used on part or all of the inventive image being formed, at one or multiple times during its formation. Whether polymeric or non polymeric, the image support used to make the inventive image of FIG. 5.I., might for example have a texture like a conventional canvas or paper, as the example shows in FIG. 5.VII., or the deckled edges as those shown in the example in FIG. 5.VIII. The resultant inventive image of FIG. 5.I. may for example, be a painting, a window, a wall, a room divider, a table top, a floor, a ceiling, a skylight, a light source, and/or it might be one of these art forms and then at a later date be changed into another one of these art forms. Also, the inventive image of FIG. 5.I. may be strong enough and rigid enough to be freestanding without any additional structural support. Regardless of which way that the inventive image of FIG. 5.I. described above is made, if the resultant inventive image is not the finished image desired, it can be further processed as desired.

The use of light in FIG. 5.I. contributes to its sense of space significantly. While this image is a single vertical plane (e.g., like a wall or a window), its use of light gives it illusionary spatial depth.

In one interpretation of FIG. 82.I. shows a colored inventive image having a plurality of see through superimposed layers, yet despite the number of layers, it may not be very thick e.g., about 36 inches high by 52 inches wide by 1.25 inches deep. An enlarged cross section view of the layering this image may have is shown in FIG. 8.I. with numbers indicating an example of the order in which the layers may have been applied. This image i might be made in an indoor workspace with a normal room temperature and good ventilation. This image might be begun in a mold made of a flat elastomer bottom surface with oil formulated clay side walls, without any mold release. The rectangular negative space of this mold measures 36 inches by 52 inches by 1 inch.

To make the first layer of this image, a batch of colorless transparent PRM is made. A quantity of about 7670 ml of SILMAR® Polyester Resin S-40 is put into a polypropylene container. A concentrated-stabilizer-mixture might be made by taking about 40 ml of the S-40 monomer and putting it into a separate container (such as a glass jar), that contains about 7 grams of TINUVIN® 328 stabilizer in powder form. Note that a very low percentage of TINUVIN® is used because this polymer cast will have many layers of polymer superimposed. These are mixed well so that the stabilizer is thoroughly wet out without lumps. Then this concentrated-stabilizer-mixture might be poured into the original batch of S-40 monomer to form the PRM desired, any lumps are either broken apart, wet out and mixed into the PRM, or removed so that no trace of the concentrated-stabilizer-mixture is visible within the PRM. This PRM is catalyzed with about 77 ml of MEKP, mixed into it well and poured into the mold forming a thin layer approximately 0.25 inches thick. Once this polymer gels, but before it is firm, about 50 small pieces of aluminum leaf are pressed into it, so that they embed. Within an hour this image is hard to the touch and within two hours another layer is superimposed on it.

A second batch of the same PRM is made in three quarters of the quantity previously made (using about 5752 ml. S-40 resin monomer) to form the second layer of this image in three superimposed applications—an application of cPRM, an application of fiber, and then another application of cPRM. A half of the total PRM prepared is put into a separate container (which might be polypropylene), and catalyzed with about 58 ml of MEKP that is mixed into it well. Then using an ordinary paint brush with dark bristles, this cPRM is generously brushed onto the polymer image's surface so that it covers it well. All brush hairs shed on the image are removed. Then a single, clean piece of very fine open weave fiber stabilizer measuring 52 inches by 36 inches is stuck onto the wet cPRM and pressed down using a blunt end on a wood stick or tongue depressor, so that the fiber is completely and flatly stuck on the image, as completely saturated with cPRM as possible, and so that trapped air bubbles are released. One hour later, this layer of fiber is superimposed with more cPRM using the rest of the prepared PRM, but not catalyzed in one batch, catalyzed in smaller quantities of approximately 925 ml with about 125 ml MEKP. As each container of cPRM is catalyzed, it is poured on the surface of this image and brushed out over it using an ordinary paint brush with dark bristles to embed the layer of fiber within the image. All brush hairs shed on the image are removed.

Another batch of colorless transparent PRM is made using S-40 and TINUVIN® 328, just like the previous batch. A few spoon fulls of a transparent blue pigment are put into a separate container with about 75 ml of PRM from the prepared batch. These are mixed thoroughly, completely wetting out the pigment with the PRM to make a concentrated-coloration-mixture that is then catalyzed with about 0.75 cc MEKP catalyst and used as a paint. Further processing of this inventive image continues.

An alternate interpretation of the inventive image in FIG. 82.I is that its depth is less than 0.5 inch, though it is comprised of 15 superimposed layers of cPRM, each of which is differently colored, so that even though it does not have significant spatial depth, the effect of its coloration relies on its transparent spatial depth and on the light that passes through it. In a different interpretation, the inventive image of FIG. 82.I. is made of many superimposed layers of colored transparent cPRM, yet its form is 2D planar, it is not significantly thicker than paper. In yet another interpretation, the inventive image in FIG. 82.I. is a block of polymer (e.g., as deep as it is wide), with coloration throughout its transparent spatial depth that relies on light passing through its 3D form. With a form that is a block of polymer, this inventive image might for example, function as a seat or a table.

In another interpretation, FIG. 82 is shown in two versions, part I. and part II. This image might have begun as a transparent rectangular polymer planar image support that may or may not be a stabilizer, onto which numerous applications of coloration were layered. These applications might have been colored transparent polymer, alternating with layers of one or more pigments, dyes or a combination of these, made using conventional image making practices. But, the coloration and the degree of transparency was varied in small, similarly shaped and sized areas across the surface of almost every layer used to form the pattern or design of this inventive image. Thus, as layers were superimposed to form this image, its coloration, spatial depth, and the degree of transparency, translucency or opacity of each of the small areas on its surfaces was built up. The color of each small area visible on the surface of the image in FIG. 82 might actually be color formed with real spatial depth and a real tangible form of light. As a whole, the areas of this image present the entire range of light from complete opacity to complete transparency, with a multitude of degrees of transparency and translucency in between. The use of light and the sense of spatial depth of this inventive image varies across its surfaces. Once the image of FIG. 82I. is made, the image might be complete, or it may be further processed as desired. FIG. 82II shows further processing wherein the image shown in part II. is less transparent, less translucent, and darker than part I. due to the additional coloration superimposed. This new version of this image may be the desired finished image. If it is not, however, this image can be further processed as desired. For example, one or more additional superimposed applications may be applied, e.g., attached or collaged items, photographic transparencies, etc. Alternately, one or more subtractive processes might be used on this image, e.g., carving, sanding, or sandblasting, for instance, making it lighter either in areas or all over. Such removal of matter from this image can return it to the way it was in FIG. 82.I. if desired.

An alternate interpretation of the processing done on the inventive image in FIGS. 82.I. and II., accounting for its changed appearance might be that it is only its illumination that is changed, e.g., no change might occur to its polymer of the present invention or to its other polymer of the present invention, to its pigment or to its other forms of coloration. For example, the processing done on this image that changes it from one stage to another, from 82.I. to 82.II., or from 82.II. to 82.I. might just be a change in the light source or sources that are part of this image, though it is only their intangible illumination that is visible as part of the image (their tangible light source part may be hidden from viewers). For example one or more lights behind, and/or within this image are changed from FIG. 82.I. to FIG. 82.II.

A cross section view of the layers of the image in 82.I. or 82II. might look like either of the two diagrams in FIG. 8 (whether or not light sources are part of it). Similarly, the transparent spatial depth and luminescence of the images in FIG. 84 might have also been built up as either of the diagrams in FIG. 8 shows. The numbers on the layers in the diagrams in FIG. 8 might indicate the order in which the layers of such inventive images were applied, notice that these layers vary significantly and these images are processed on multiple sides as they are formed. Though one of these diagrams shows 21 layers on the inventive image, such an image might be complete at any stage before layer 21, e.g., layer 4 or layer 12 might be the last layer. The same is true for the other diagram in FIG. 8 that shows 18 layers. Alternately, the inventive images in FIGS. 82, and 84 might have their see through layers built up as shown in the progression of cross section views in FIGS. 41.I.a.-c., and thin flat EL Lamp(s) or polymer LED(s) might be installed air pocket(s) within their layers, illuminating one or more of these inventive images, preferably without the light source itself being visible.

The inventive image in FIG. 68.d. may be a finished image. It is hung on the wall. Six years later, its image maker sees it differently and decides to rework it. With two vertical cuts, this image is cut into three pieces, each with the same height and each with different widths. With no further processing, one of these pieces is a new finished inventive image. A layer of new cPRM is applied over the coloration on one side of another of these pieces. Once this polymer hardens, this image is installed as a finished inventive image window. The third piece may be left as an unfinished inventive image.

FIGS. 19-20 show cross section or side views of inventive images. The image of FIG. 19, may have begun with an initial inconsistent planar polymeric image support that may or may not be a stabilizer, and that might have been made in a number of different ways. For example, it might have been made as a consistently transparent polymer plane and then externally colored with superimpositions that are opaque or translucent, e.g., painting applications. Then, if desired, one or more further applications of coloration might be superimposed as shown in the white layer superimposed on its left, top and bottom sides in FIG. 19. This superimposed layer might, for example, be a layer of transparent coloration such as a single light transparent layer of color (like a transparent white paint, a transparent iridescent blue paint, or a transparent yellow cPRM). This image in FIG. 19 might have begun as an opaque polymer image support. See-through areas might have been formed by cutting into this image, or by cutting into it and then filling its negative spaces with colorless transparent cPRM. An alternative interpretation of the inventive image in FIG. 19 would be that the inconsistent coloration on its initial image support is internal coloration, as in the following two examples. Example 1) this planar polymer might be one continuous form, with transparent areas and with areas that are translucent and/or opaque formed in a number of ways. For instance, it might be formed as a transparent polymer with embedded items that are opaque, translucent or both (such as embedded pieces of preformed polymer, wood, glass, metal, paper, a fiber stabilizer, lumps of dry paint, pastels, clay, checkers, dominos, and/or rubber, etc.). Or, for instance, it might be a polymer formed from connecting multiple separate parts that might be made of polymer or of polymer and other ingredients. Example 2). this image's initial image support might be opaque or translucent, with see-through negative spaces or holes in it. But regardless of the way in which the initial planar image support of the image of FIG. 19 is made, it is further processed with a superimposed layer shown on its left, top and lower sides (e.g. a layer of transparent coloration). The image of FIG. 19 can use the light that hits it in a novel and unique way, and it may also be capable of emitting light, e.g., in a pattern created by its coloration.

The image of FIG. 20 is made of a planar initial image support (shown in black in the illustration) that is an opaque or translucent polymer plane. It may or may not be a stabilizer. It is then superimposed on all of its sides with one or more additional layers (shown in white in the illustration), e.g., one or more layer or layers of coloration or colorless cPRM, as desired. Thus, the initial planar polymer support of this image becomes completely embedded or encased. As an alternate interpretation of the inventive image in FIG. 20, its initial planar form (shown in black in the illustration) might begin as a transparent or translucent polymer image support, that is completely covered with coloration that might be opaque or almost opaque. For example, all of its sides are covered with white paint, blue paint, white gesso, or with painting done in a variety of different opaque or almost opaque colors. The inventive image in FIG. 20 may be finished, or it may be further processed, as desired. In a different interpretation, the inventive image in FIG. 20 might be electrically active, e.g., polymer LED(s).

In an embodiment an image can be made that is a large outdoor sculpture measuring about 7 feet long, five feet wide, and ten feet high. It is based on the concept of a waterfall and it functions as a fountain. Because its structure is made of crosslinked polymer selected for its strength, most of which is reinforced with a fiber stabilizer, it is strong enough for children to play on. The polymer of this sculpture is color stabilized so that it does not change undesirably in the hot sun. Part of this sculpture is a fountain, water that runs over and through its polymer parts and its other parts. Many of the polymer parts have special effects of light, e.g., photochromic and dichroic effects, reflective effects (e.g., from mica, silver or paint in them), a see-through photograph is made on a transparent or a translucent part of them, they are cut and faceted like crystal, they have crystal pieces mirror, or glass embedded and inlaid into them, fluorescent and phosphorescent effects, they have a lens or a prism within or on them, etc. The light effects of this sculpture change significantly as the light changes outdoors, during the day and night, and from season to season. In addition, this inventive image may emit light at night. Though this one waterfall image is made initially, a year after it is completed, someone sees it and orders an edition to sell to others.

In another example, an image maker making inventive images might have a variety of polymer and non polymeric parts, as well as the molds, and the remains of the molds in which these or other parts were made. Among these parts there might be rods, bars and strips of polymer medium such as those shown in side and cross section views in FIG. 9. For instance, among these might be polymer rods that are cylindrical, "L" shaped, some from molds taken off of stranded rope, some from molds taken off various branches, some others rectangular, octagonal, hollow (with or without air pockets), some of which are shaped and functioning as prisms, etc. Among these there might be rods, the cross section of which is shaped in a cross. Though polymer forms made using the present invention can be made with a high degree of accuracy and precision, in this image variations from a lack of perfect accuracy are desirable. For example, these cross shaped rods might be made in polymer in five sizes. Size A rods are made roughly with both of the cross bars of its plus sign cross section measuring about 1.5 inches long and about 0.25 inch thick. Size B rods are made roughly with one cross bar measuring about 2 inches long and the other measuring about 1 inch long and both about 0.25 inch thick. Size C rods are made roughly with both of their cross bars measuring about 1 inch long and about 0.25 inch thick. Size D rods are made about 1 inch cross bars and about 0.15 inch thick. Size E rods are made about 0.5 inch cross bars and about 0.12 inch thick. Though these bars are made in five sizes, they are made from twenty molds, because some rods in each size are made that are generally straight, and the rest of the rods in each size are made in three differing curves. The molds for these bars are made long so that rods can be cast at a variety of lengths by using oil formulated clay to shorten the length of the negative space in these molds.

From this variety of parts, this image maker might make a variety of different types of inventive images over a period of time, e.g., paintings, sculptures, constructions, a chair, a cabinet, etc. Inventive images can be made with solid or hollow volumetric mass, with apparent volume created by intersecting polymer planes, a 2D or 3D linear inventive image with or without a sense of volume.

For example, the linear image in FIG. 3 is made of one continuous line. This image might be planar, thus 2D, e.g., a cut-out. Or the position of its linear rod or bar might change in spatial depth as it curves in which case this image is 3D, e.g., as the rod winds inward, it might be closer to viewers. All of these forms can use their light and space with, for example, transparency or translucency, coloration, optical effects, light effects etc. that can be made using the present invention for results that are new and unique. The image in FIG. 3 may be a large polymer sculpture made of a crosslinked polymer (with or without the support of an internal metal rod).

An inventive image is made as a stage set comprised of 7 polymer rods installed vertically that may emit light. Because they are made of a crosslinked polymer they are strong and stabile. These rods are made with discontinuous light effects so that their forms sparkle and seem to dematerialize when illuminated by the stage lights, e.g., some of these rods emit light. After a period of time, this image becomes a permanent installation in a building lobby.

The strength and rigidity available for inventive images can be used in many ways, and among them are a number of special qualities and effects. For instance, these properties can be used to give an inventive image a sense of being light, precarious, airy, threatening, floating, ethereal, a sense of defying the laws of gravity and nature, etc. For instance, an inventive image can be mounted from the wall from a single point, installed in a position out from the wall, balancing on a point, held up by a part that looks insufficient and unstable, held from a mount or a structure that moves, etc. One inventive image, about 45 inches in diameter, comprised of a crosslinked polymer with one fine layer of invisible fiber stabilizer positioned medial within its approximate 1.5 inch width, is hung from the ceiling (e.g., like a big flying pancake) using a single stranded stainless steel wire secured through the approximate 1.5 inch width of its center.

FIG. 71 shows an example of the basic formation of an image polymeric composition, and basic processes of building up of superimposed layers of polymer. FIG. 71.I.a. shows a rectangular mold made using conventional practices. FIG. 71.I.b. shows cPRM in this mold. One layer of polymer can be formed in this mold, or multiple layers of polymer could be superimposed upon on another in this mold, as desired. FIG. 71.II.a. shows the resultant inventive image formed, removed from its mold. This may be the finished image desired, it may be an image support further processed, or it may be further processed back in a mold, as desired. For example, one or more additional layers of polymer may be formed on this image by making a temporary mold wall around it, e.g., as in Fig. II.b. Then, one or more layers of polymer might be formed on the surface of this polymer image, within these temporary mold walls, until it is as thick as desired. Thereafter, the temporary mold wall is removed, showing the image formed in FIG. 71.II.c. (the grey dotted line in this illustration, shows the previous thickness of this image). However, if at any time thereafter, further thickening of this image is desired, this process can be repeated as many times as desired as in FIG. 71.II.d. with another temporary mold wall built on the image in FIG. 71.II.c. Polymer can be added onto the upper surface of this polymer image within these temporary mold walls, e.g., these temporary mold walls can even be extended higher if necessary to contain additional polymer. FIG. 71.II.e. shows the thickened polymer image once its temporary mold walls have been removed. The two grey dotted lines in this illustration, show the two previous thickness of this image at earlier stages in its development. As an alternate example, FIG. 71.II.c. or e. may be used as image support that may be a stabilizer.

One or more layers of polymer can be added to selected areas of an inventive image's surface also if desired. As an example, FIG. 71.III.a. shows two areas of a polymeric image's surface encircled with temporary mold walls and cPRM added within these two encircled areas, e.g., one or more layers of polymer. FIG. 71.III.b. shows these two polymer additions to this image once their temporary mold walls are removed, marked as i. and iv. FIG. 71.III.b. also shows this method repeated. The areas on this image marked as ii. and iii. are two new areas encircled with temporary mold walls with new cPRM forming in them. FIG. 71.III.c. shows this inventive image once its new polymer applications have formed and their temporary mold walls are removed. This could be the finished image desired, but if it is not, it can be further processed as desired. FIG. 71.III.c. may for example, be used as image support that may be a stabilizer.

FIG. 70. shows cross section views of three examples of how polymer might be added onto the polymer medium in FIG. 70.a. that already has one or more applications of other media and/or materials on it, e.g., applications of conventional paints. In FIG. 70.a.1.i., a temporary mold is formed off of the side edge of the inventive image, tightly sealed to this image, and new polymer is formed in it that attaches to this image's side, as in FIG. 70.a.1.ii., in which this image has its added polymer part and its temporary mold has been removed. Alternately, new polymer might be added to this image at an angle, as in FIG. 70.a.2.i., using the same process—with a temporary mold tightly sealed to the image and new polymer formed within it. FIG. 70.a.2.ii. shows this image once its added polymer part has extended it at the angle desired and its temporary mold is removed. As a third variation, FIG. 70.*a*.3.*i*. shows this same process used to add a polymer part to this image that is textured by its temporary mold. FIG. 70.*a*.3.*i*. shows this image once its new textured polymer part is made and its temporary mold is removed. Regardless of which of these three ways that new polymer is added to extend this image, the resultant image can be the finished image desired, or it can be further processed as desired.

In an embodiment, an inventive image or part thereof, is set-up, presented, installed, displayed, exhibited, used, or set for viewing in a combination of these ways, such that there is empty space, between it and the closest tangible form (e.g. between the image and the structure from which it is installed, displayed or exhibited). For example, such inventive images are not entirely installed flushly against surfaces or structures, like walls, table tops or floors. For instance, transparent and/or translucent inventive images are installed, displayed or exhibited, such that there is empty space between them, and the structure from which they are installed, displayed, or exhibited, e.g., there may be five inches between a transparent polymer inventive image and the wall, or there may be three inches between a transparent polymer inventive image and the floor, or there may be a foot between a transparent polymer inventive image and the ceiling, etc. Or for instance, an inventive image with five cut-outs is mounted four inches away from a white wall. For example, overhead, a 300 watt light is positioned so that it shines down against the wall behind this inventive image, (rather than shining directly on any of its surfaces). An illustration of one of the valuable uses of this embodiment which can effectively enhance an inventive image as desired, is to leave empty space between an inventive image and the closest tangible form, for light (direct or reflected), to hit and penetrate the rear, the backside, the underside, the sides, the edges or combinations of these surfaces, on the inventive image.

In a embodiment, one or more components used to set-up, present, install, display, exhibit, to use, or to prepare an inventive image for viewing in a combination of these ways, are entirely or partially visible, e.g., through the transparency and/or translucency of an inventive image, all of the components of the two mounts inlaid in its backside are visible, contributing to its aesthetic.

In another embodiment, one or more components used to set-up, present, install, display, exhibit, to use, or to set an inventive image for viewing in combinations of these ways, are hidden from view.

A series of inventive images called Fish Images are made based on the five different highly polished bronze versions Constantin Brancusi made of his 1922 marble Fish. In these sculptures, Brancusi used reflectivity to convey subject matter, content and meaning—his idea that our perception of the fish is as a moving flicker of light. The simplified, thin elongated oval forms of these Fish Images are like Brancusi's, but these Fish Images are transparent, translucent or both, with coloration, light effects (such as reflective effects and emitted light), and other effects which are not available using conventional practices. These Fish Images are mounted and installed in these three general ways. Method a). Some of these Fish Images are affixed to bases which resemble the bases Brancusi designed for his Fish, e.g., some are made with conventional materials. However, at least the upper part of all of the bases of these Fish Images (the part directly under the affixed fish), is at least partially transparent or translucent which makes the fish of these Fish Images appear lighter and less earth bound, contributing to a sense of the fish moving. In addition, some of these bases have light sources hidden within them, e.g., concealed electric lights, LED(s), or EL Lamps illuminating the fish portions of these inventive images, continuously or discontinuously. Many of these Fish Images also have other light qualities and effects, e.g., reflectivity. In Method b). mounts hold up the polymer fish parts of some of these Fish Images, comprised of a single slender rod on a base below. These rods and bases are polymeric and/or nonpolymeric, e.g., some are transparent colorless polymer, others are black matte metal or highly polished metal, some are flexible and some are rigid. The bases holding these rods are all simple plates or blocks, e.g., some of these bases rest on other surfaces such as tables or pedestals, while others extend down to the floor. Method c). The rest of these Fish Images, are hung, e.g., from a ceiling, a joist, a branch, or a beam using strong, see-through fishing wire, or a slight looking, yet strong stranded stainless steel wire. These hanging Fish Images have real movement (e.g., due to their light weight and their sail-like thin planar forms) initiated for example by air currents. The inventive medium enables image makers to control the weight of their images and of parts thereof e.g., distributing it advantageously.

The following 14 illustrations describe some of these Fish Images. The exact dimensions of each Fish Image varies. However, in general all of their fish parts are elongated ovals which at their greatest axis, measure approximately 6.5" to 12.5" long, 2"-5.5" wide and 0.75"-2" thick. All of the fish of the following Fish Images that are made in two or more parts, are then bonded together into one whole fish form, using the same cPRM used to make them, using a mixed polymer (e.g., stabilizer) or using another bonding substance. Once the separate parts of these fish are bonded to one another, all traces of their having been separate parts are reworked so that these fish look like they are unified whole forms. For example, all clay and release agents are cleaned off of them, all irregularities in their forms such as connection seam lines are reworked, e.g., by sanding them and by adding more of the same cPRM to them as necessary.

The fish part for Fish Image 1. is made of a colorless transparent cPRM with transparent bronze pigment mixed heterogeneously into it. This polymer fish may be made in part with conductive polymer, thus it may emit light continuously or discontinuously, which might be variable in its brightness and/or color, colors or its lack of color. This polymer fish might be made in two parts bonded together, each of which is slightly less than 50% of the whole so that further layers can be superimposed onto it. Or this polymer fish might be made in a single mold and processed with careful attention to the release of air displaced from inside of this mold by the cPRM going into it. Once the fish is one whole polymer form, flat silver wire is used to form a few lines of drawing on one of its external surfaces, tacked on with a few small thin pieces of oval shaped crystal using drops of the same cPRM, e.g., using clay walls as needed. Once these polymer tacks harden, the fish's surface is cleaned of all traces of clay and oil, e.g., using the appropriate solvent, hand tools and a sanding bit if necessary. Then a coat of the same cPRM is superimposed over this entire side of the fish, embedding the tacked silver and crystal pieces in the desired position. (Without tacks, these silver and crystal pieces might have moved out of the desired position before the superimposed cPRM gelled.) The same tacking and embedding processes are repeated to install silver wire and crystal pieces more sparsely on this fish's reverse side. Then a pale paint made of the same cPRM and a blue iridescent mica pigment is applied in scattered dash and dot-like paint strokes on both sides of this fish. All of these marks are given more coats of the same paint, using the same careful process so as to prevent drips. When this fish is completed, its surface is speckled with embossed blue iridescent dashes and dots.

The fish part for Fish Image 2. is made in two parts, one of which is 80% of the whole. First the smaller part of the fish is made of colorless transparent cPRM, some of which may be electrically active, e.g., light emitting. Then, the larger part of this fish is made in layers as follows. A layer of colorless transparent polymer is formed first. Then using coloration made with the same cPRM as its binder, a dark transparent blue streak is painted almost completely down this fish's length, near its bottom edge, e.g., curing the application with a radiation stabilizer. Once this streak hardens, the entire surface of this fish is covered by another layer of the same colorless cPRM. After this hardens, a second streak is applied using a matte opaque black acrylic paint, extending almost the entire length of the fish, roughly in the center of its height, not superimposing its first streak. Once this acrylic paint dries, this entire fish surface is superimposed by another layer of the same colorless cPRM. When this polymer hardens, a third streak is applied down this fish's length near its upper edge, not superimposing its other streaks, using a paint made of the same cPRM and crushed red fluorescent minerals. Once this third streak hardens, this piece is bonded to the other fish piece using the same cPRM. After hardening for a week, twelve tiny lines are engraved in this fish's external surface along its back edge. Then three dots sanded on one of its sides serve as surface preparation stabilizers which are painted over with impasto orange oil paint.

The fish part for Fish Image 3. is made in two polymer parts which may contain conductive polymer or polymer LED(s). Half of the fish's form is cast in each of two molds using the same colorless transparent cPRM. When the cPRM in one of these two molds gels such that it is somewhat firm but still wet on its surface, a layer of an open weave black netting stabilizer is quickly pressed onto its surface, firmly enough to attach in the position desired. Then, once the other polymer half of the fish has progressed far enough into its gelation so that its form is firm enough that it no longer requires the support of its mold in order to harden as desired, yet while both its surface and the surface of the other polymer fish half with the attached netting are still wet with cPRM, the polymer fish half without the attached netting is flipped over onto the polymer half with the attached netting. The upper mold is completely removed. Immediately, the two polymer fish halves are aligned in relation to one another to form one whole fish by sliding the top polymer fish half on the bottom polymer fish half as necessary. The bottom mold might be cut back to aid in this alignment. Once these two joined parts harden, they are bonded together as a single whole fish form.

After this polymer fish hardens for a week, linear negative cavities are carved into its external surfaces in order to inlay mosaic tessera along almost the entire length of this fish's form on both sides, but in lines which do not superimposed one another. The back sides of irregularly shaped pieces of crystal (tessera), are sanded to give them a mechanical bond with the cPRM bonding substance attaching them into the fish's negative cavities, e.g., this cPRM bonding substance is the same cPRM that was used to make this polymer fish. First, the negative cavity in one side of the fish is lined with this cPRM bonding substance. When it gels, but before it hardens, each crystal tessera is placed on it with its abraded side in contact with the cPRM. Each laid tessera is then pressed into the wet cPRM so the cPRM completely fills its sanded abrasions, and they are no longer visible at all. In a number of places, these crystal tessera are pressed into the gelled cPRM enough, so that the gelled cPRM extends slightly over the top edges of these tessera, onto their external surfaces just enough to secure them in place. Once all of the tessera on one side of the fish are attached and their cPRM bonding substance hardens, any or all of the remaining negative spaces between tessera, and between tessera and the edge of the negative cavity in the fish's surface, are filled with more of the same cPRM, e.g., using oil formulated clay walls as necessary to control the cPRM so that it hardens in the desired places without running. Any cPRM that dripped or that hardened in an undesirable manner is reworked. These crystal tessera form a few mosaic lines on this fish which do not obstruct the view of its embedded netting.

The fish part for Fish Image 4. is made of transparent colorless polymer with a large air pocket within it extending its entire length, which functions as a prism. This fish is mounted using method a). (described above). The uppermost surface of this base is lit by a light source beneath it, it is highly reflective, and/or it emits light, e.g., it is covered with mirror, silver leaf, or highly polished bronze, and it has LED(s), and/or an EL Lamp beneath it. This fish is made in two molds. One of the fish parts will be substantially larger than the other. It is made first. The larger mold is filled about two thirds full with a colorless transparent cPRM. A prism shaped part which this cPRM can not bond to (e.g., a piece of rubber in the shape of a prism, a material with a release agent covering it), is submerged into the liquid cPRM and secured into position (e.g., to the mold's side walls), with one of the pointed edges of its length directed downward, and with one of the flat surfaces of its length even, flush with the exposed top surface of the liquid cPRM. Once this polymer has hardened, the positive prism shape is removed. The negative prism space formed in this polymer can be reworked as desired, e.g., to make its two polymer sides perfectly smooth they can be sanded and lined with a new coat of cPRM if desired. This polymer is removed from its mold or its mold's side walls are cut back making its perimeter edges clearly visible so that it can be aligned with the other part of this fish when they are joined together. The negative prism space and the upper surface of this polymer are cleaned well (e.g., cleaned of release agent, clay etc.).

The other, smaller fish part of this fish is formed in another mold using the same cPRM, such that it has a flat upper exposed surface. This fish part may have a thin layer of pLED(s). Once this polymer part hardens, it is removed from its mold. If necessary, it is reworked, so that once it is bonded to the larger fish part, its upper surface will complete the negative prism shape embedded within the fish by providing the third flat side of this negative prism (e.g., its surface may be sanded, given more cPRM, or both), so that its surface will align properly completing the negative prism within this fish when its two parts are bonded to one another. The two fish parts are bonded together forming a negative prism internally. Using a conventional paint brush which applies media with precision, cPRM is applied carefully only to the flat area of contact on the surface of the larger fish part which is not part of its internal prism. Once this application of cPRM gels so that it will not run or ooze when placed in contact with the other fish part, but while this cPRM is still wet, the smaller fish part is turned over and placed upon the larger fish part very carefully in the alignment desired, so that no cPRM enters the negative prism air pocket within the fish and so that the two fish parts do not need to be slid against one another to be aligned.

The fish part for Fish Image 5. is made of colorless transparent cross linked polymer which is cast in two separate halves, each approximately half of the fish's thickness and its entire length. A week after these polymer halves harden, the surface of each of these polymer fish halves which will be within the whole fish once these two separate parts are joined, is carved so that when these two halves are joined, the carving and air pockets within them forms the design desired, internally within the fish. As a variation, if desired, before these two fish parts are joined, their internal carving can be colored as desired (e.g., painted, drawn upon or written upon), provided that this processing does not interfere with bonding the two fish parts together as desired, e.g., provided bonding spots or unpainted areas are left to enable the two parts to be joined into one fish. This fish is mounted using installation method a). the uppermost surface of its base is highly reflective, and/or it is illuminated by a light source beneath it, or in it. Three fish made for three different Fish Images 6., are each made in either one part (e.g., from one mold), or in two parts (formed in the same mold or in two molds) that are bonded together into a single form. Fish #1. has graphite particles and blades of green grass dispersed in its colorless transparent cPRM. Fish #2. has particles of charcoal and particles of a fluorescent mineral dispersed in its colorless transparent cPRM. Fish #3. has particles of metal leaf (e.g., silver, gold or aluminum leaf) and/or another reflective material, dispersed in its colorless transparent cPRM. If desired, a surface preparation stabilizer may be applied on part or all of one or more of these Fish Images, which is then superimposed by coloration.

The fish part for Fish Image 7. is made in either two parts in two separate molds or in three parts in three separate molds. This fish is made hollow with a colorless transparent crosslinked cPRM, and it contains something. Choices in making the two or three polymer parts of this fish form, are intentional uses of the VIMC designed to produce polymer fish parts which are full of air bubbles. For example, the monomer or monomers used in the cPRM is especially viscous (e.g., a monomer that is made viscous by its manufacturer, a monomer that is viscous because it is old, a monomer with an added filler or stabilizer that increases its viscosity, a combination of these, etc.). The PRM for these two or three these fish parts is intentionally catalyzed using a percentage of the appropriate catalyst or catalysts, which is significantly higher than the manufacturer's recommended percentage so as to harden with air bubbles. These viscous cPRMs are stirred a lot to cause air bubbles. This process was successfully tested in advance.

To make this fish hollow, three parts might be formed in three molds as concave shells, a part for each side of the fish both of which include the fish's bottom, and one piece for the fish's top which will function like an opening on a hollow container once its two sides are joined. For instance, a layer of cPRM is applied to each mold, then when this polymer gels or hardens enough to stay in place in each mold, each mold is tilted so that one of its sides can be lined with a layer of polymer. This process might be repeated until all of the sides are formed for each of the polymer fish parts. Refer to tiered processes previously described. Once its three parts are cast, the two polymer fish sides which include the fish's bottom are bonded tightly. These joined parts leave only one opening at the top of the fish's hollow form, which the third part of this fish is designed to fit.

Alternately to make this hollow fish two concave polymer parts might be formed, one of which comprises the fish's two sides and its bottom made in a closed mold with careful attention to the release of air displaced as the cPRM enters the mold. The other part is the fish's top which will function like an opening on a hollow container with the first, larger fish part.

The hollow polymer fish is then filled about halfway with colorless carbonated water (e.g., seltzer) and its polymer top piece is bonded tightly onto it, sealing the polymer fish completely.

The fish part for Fish Image 8. is also hollow. One or more sources of light are put inside of it, such as polymer LED(s). Thus the design of the concave parts which make the hollow form of this fish appropriately accommodates its contents. For example, this fish part is comprised or two or more joined parts, but their connection remains one which can easily be reopened (e.g., to change a battery, to replace a bulb, etc.). The specific ingredients used in the cPRM for this fish (e.g., the monomer or monomers, stabilizers etc.) are chosen so that the resultant polymer of the formed fish will not change undesirably with contact and exposure to the specific kind of light or lights used within it (e.g., the cPRM is made with a UV light stabilizer, with a stabilizer to increase heat resistance, with heat and light stabile colorants, and the polymer formed can take the light's heat and rays). As an illustration, this fish part might be made using one of the methods described above for Fish Image 7., however because air bubbles are undesirable in this polymer fish, the VIMC are used very differently to make it. For example, within this fish might be an EL Lamp, LED(s), fiber optics, small light bulbs, neon tubing, etc. One or more of these light sources might for instance, be secured in position within the fish's hollow form. Though every effort is taken to insure that there are no cords, wires, or other parts of these light sources coming out of this fish, if there are, these are integrated with this Fish Image's design, e.g., with its method of display. If desired, this fish part may be further processed. For example, a surface preparation stabilizer might be applied on this fish made by mixing a small quantity of a either conventional paint or a conventional paint binder (such as an oil paint, linseed oil, an acrylic paint, or an acrylic medium), into a larger quantity of the cPRM used to make this fish. Once it hardens, the surface of this illuminated fish is painted as desired (e.g., principally in transparencies and translucencies, and light reflective paints), using the kind of conventional paint that was mixed into its surface preparation stabilizer, e.g., a conventional oil or acrylic paints.

The fish part for Fish Image 9. is made of one part, without a mold. This fish begins with its central element, a single long narrow thin piece of transparent dichroic glass is sanded on all sides. Then it is covered on all sides one at a time, with a layer of colorless transparent cPRM which completely fills in its sanded abrasions, returning this piece of glass to its prior state of transparency and its prior color one side at a time. Then numerous subsequent layers of the same cPRM are superimposed over this fish covering all of its sides, again one side at a time, building up this fish's form. Each of these layers has different transparent, pale coloration. If for example, this fish needs shaping, e.g., as it is formed or thereafter, it can be reworked as desired (e.g., sanded or carved, additional polymer can be added onto it, or a combination of these).

In Fish Image 10., many fish are made for many different Fish Images using variations of the same design. All of these fish are made of transparent colorless polymer (though some of them get coloration mixed into their cPRM). All of these fish are made with photographs of light on both of their external sides, selected from one of these 3 categories. Fish with Category 1 Photos, have photos of light that on them showing light moving in a definite direction, e.g., photos of streaks of light, fireworks at night, light coming through a prism, other light spectrums, the fiery glow of a volcano erupting a night, etc. These photos are all used so that their original subjects are no longer detectable, all that is seen is light moving in a defined direction, positioned on the sides of the fish in the direction that it would move if it were real. For instance, the use of a photo of a volcano erupting on the sides of one of these fish might look like one main horizontal red streak branching off into three smaller streaks on a black background along the side of a fish without any hint of the source of these red streaks. Fish with Category 2 Photos, have photos of sunsets, sunrises and the aurora borealis on them, most of which show striated colors without any land. Fish with Category 3 Photos, have photos of real fish with light effects, e.g., glowing colored markings, light reflecting off of their scales, etc.

These are examples of the uses of photos from these three categories on fish of Fish Images. Example 1, the transparent photographic emulsions from photographic prints from all three of these categories are removed off of their conventional backings, altered if desired and as desired, and transferred onto fish of these Fish Images. As an illustration of this example, a polymer fish is made with or without internal coloration. Then one at a time, two Polaroid prints from the Category 1 Photos are submerged in water that is about 160° F. or hotter for about 4 minutes at which time they are transferred into cold water (e.g., using tongs). In the cold water, one at a time their photographic emulsions are removed from their conventional backings, taken out of the water (e.g., with the support of acetate on their front sides), and transferred onto the polymer fish. (Then if acetate or another temporary support was used to transfer them onto the inventive images, it is peeled off of the emulsion.) The emulsion can also be flattened as desired on the inventive images surface. If desired, as these photographic emulsions are removed from their backings, taken out of the water, transferred to the fish and positioned on the fish, e.g., they can be stretched, folded, cut, torn, perforated or altered in a combination of these ways, as desired. Once the fish is dry it can be further processed if desired. For instance, if this fish has exposed areas of polymer, the edges of these emulsions can be tacked to these exposed areas of polymer using the same cPRM that was used to form the polymer fish. In addition or instead, one or more layers of the same cPRM can be superimposed over the entire fish, one side at a time, using bonding spots. Then if desired, some parts of this superimposed layer of polymer can be given a matte finish or painted as desired, e.g., by sanding and/or painting, by using a surface preparation stabilizer, such as SSI with a matte Clarifying Imprimatura with or without transparent coloration.

In Example 2 of the use of Category 1, 2, and 3 Photos on fish for Fish Images, photos are formed on the fish for these Fish Images, e.g., from existing negatives. As an illustration, a polymer fish can be made in two separate parts which are more or less equal in thickness, and which are both comprised of the same transparent cPRM, e.g. this cPRM can be colorless or it can have transparent or translucent coloration mixed into it before it hardens such as a pale black dye, a pale green pigment, or particles of a fluorescent mineral. It may also be light emitting or electronically active in another way. Then, a photograph can be made on the surfaces of both separate fish parts which will be the external surfaces of this fish once it is put together. This might be done using a process like that which would be used to print and develop the same negatives on conventional photographic paper. For example, the product "Liquid Light®" (made by Rockland Colloid Corporation of Piedmont, N.Y.), can be painted on to the fish surface using a conventional paint brush. Preparation of that surface before applying the emulsion is described in Rockland Colloid's literature. "Liquid Light®" can be applied onto surfaces, such as the sides of this fish, as consistently or as inconsistently as desired, e.g., it can leave visible streaks, strokes and other marks from the paint brush; a design, a pattern or a combination of these as well as uncoated polymer surface areas, as desired. When dried, each of the two surfaces covered with "Liquid Light®" photographic emulsions are exposed to light selectively, projected through one or more negatives (e.g., just as if it were a sheet of conventional photographic paper). When developed, washed (an acidic "short-stop" cannot be used), and fixed (e.g., with conventional photographic chemicals), the result is a positive transparency of the negative. Note, practically any way a conventional photo can be altered as it is printed and developed from a negative in the darkroom can be used to alter photographic transparencies and photo prints made on inventive image surfaces, such as these polymer fish parts.

Once the photographic transparency is completely dry on both fish parts, the two parts of this fish are bonded together carefully so as not to disturb the photography undesirably. If desired, before and/or after these two fish parts are bonded together, it sides can be partially or completely superimposed by one or more layers of polymer, e.g., using the same cPRM, with or without added coloration. In addition or instead, painting, drawing, writing, printing, engraving, other further processing or a combination of these can be done to the fish's surfaces, before and/or after its parts are connected.

Example 3. Fish like those made in Example 2. can be made, but these have internal light effects, e.g., reflective materials, polymer LED(s), and they have photographic transparencies on their external surfaces or embedded just under their external surfaces. It may be desirable to form their photographic transparencies before installing their internal light effects. As an illustration, a fish can be formed in two or more polymer parts which is hollow enough to accommodate the internal light effects. Examples such negative space within fish are: a). concave fish parts such as those described in Fish Images 7 and 8.; b). polymer fish parts formed with something stuck in the cPRM and is then removed leaving a negative space or cavity such as is described in Fish Image 4. (which has a prism shaped air pocket formed within it); c). fish parts from which matter is removed, for example, during gelation, from the hardened polymer or both; or d). a combination of these.

Example 4. is another variation of the Example 2. in which the Rockland Colloid preparation which transforms the black microparticle silver of the negative images into a bright mirror-like highly reflective silver (such that a reflective surface appears essentially as a positive of the light source) is used to form photos on fish in a manner similar to that described in Example 3.

The fish part for Fish Image 11. is made in two parts with small irregularly shaped transparent pieces of dichroic glass embedded within it. For example, if desired, these pieces of dichroic glass can be abraded prior to their installation. However, because these pieces of glass are small and because they all have polymer all of the way around them, this fish will be strong and permanent even if these glass pieces are not abraded. If these glass pieces are abraded, it may be desirable to fill in their abrasions with the same cPRM used to make the fish prior to installing them in the fish, so undesirable air bubbles do not fill their abrasions instead of cPRM during their installation. In a mold, approximately half of the fish's form is made in an application of colorless transparent cPRM, the top surface of which will later be approximately in the center of the fish's thickness. Embedded in this fish part might be polymer LED(s). Whether the glass pieces are abraded or not, once this cPRM gels firmly but its surface is still wet, several rows of the dichroic glass pieces are pressed onto it with spaces in between all of them. After this polymer hardens, a thin layer of the same cPRM is superimposed, embedding the layer of glass pieces. The rest of the fish's form is made in a separate mold and joined to the larger fish part. This may be the inventive image desired, but if it is not it may be further processed as desired, e.g., as described in these two examples.

Example 1., one or more photographic transparencies are added to this fish. For example, this can be done following instructions from Polaroid, in one of these two methods. Method 1., a color Polaroid photograph of the rippled sunlit surface of lake taken previously is immersed in water that is about 160° Fahrenheit or at a slightly hotter temperature for about 4 minutes, at which time it is transferred into cold water (e.g., using tongs). While the photograph is in the cold water, its flimsy transparent color emulsion is removed from its conventional backing and under water, about half of this photographic emulsion is cut into horizontal slivers, each of which shows the rippling of the sunlit water. One by one, these pieces of photographic emulsion are taken out of the water, carefully because they are flimsy (e.g., to prevent them from changing undesirably such as to prevent them from folding over upon themselves, they are supported by a sheet of acetate on their front sides). Each piece of the photographic emulsion is laid on in the desired arrangement on the same side of the polymer fish's surface, and if acetate or another support was used to transfer an emulsion onto the fish, it is peeled off once the emulsion is laid. The laid emulsions can also be flattened as desired on the inventive image surface, and each is stretched a little, so that they loose some of their realistic clarity and their perimeter edges are less straight (they are softened). When these pieces of emulsion are completely dry, they are tacked into their positions on the polymer fish using drops of the same cPRM and these tacks are allowed to harden. Then this entire side of the fish is superimposed with a complete layer of the same cPRM (painted on using a conventional paint brush), which embeds the tacked pieces of emulsion. Once this polymer hardens, the same process is carried out on the other side of this fish. If necessary the fish may be reworked so that its form is as smooth and continuous as desired. Method 2., the transparent photographic emulsion or emulsions from one or more Polaroid photos described in any of the Category Photos in Fish Image 10., can be transferred onto this fish, by using this same underwater process described in the paragraph above, or by using a different variation of it. For instance, two Polaroid photos of directional light can be immersed in water that is about 160 Fahrenheit or at a slightly hotter temperature for about 4 minutes, and then transferred into cold water. The polymer fish can be under the cold water too. One at a time, each of the flimsy transparent color emulsions are removed from their conventional backings and carefully stretched across the surface of one of the fish's two sides underwater. It might be desirable to have an assistant hold the first emulsion onto the fish while the second emulsion is being transferred onto the other side of the fish and while the fish is being lifted out of the water. Once the fish is out of the water, the photographic emulsions can be smoothed, flattened, distorted, stretched, wrinkled, and cut as desired. Once this fish is completely dry, it can be superimposed by a layer of the same cPRM used to make the fish, applied onto one side of the fish at a time, e.g., using bonding spots if desired. This fish is finished so that it is as smooth and continuous a whole form as desired.

Example 2., a surface preparation stabilizer is applied onto this fish to enable it to bond as desired to one or more further superimpositions, e.g., applications of conventional paints, inks, printing, drawing, writing, etc.

The fish part for Fish Image 12. is made in two parts, one of which is twice as large as the other because it has two layers of embedded mirror pieces separated by a Separating Layer Stabilizer, all of which will be approximately medial within this fish's thickness once it is whole. To make the larger fish part, approximately a third of the fish's thickness is formed in a single application of a transparent cPRM in a mold. Next the first layer of mirror pieces is installed with their reflective sides face down. For example, this might be done in a method like that described for the layer of dichroic glass pieces installed within Fish Image 11. But, these mirror pieces are pressed into the gelled cPRM so they are at slightly different angles, and any abrasions made on their reflective sides do not affect their reflectivity undesirably once these irregularities are filled in by cPRM. When this polymer hardens, another layer of the same cPRM is superimposed over this fish (e.g., painted on using a conventional paint brush). It is a Separating Layer Stabilizer between the fish's two layers of mirror. If the backsides of the installed mirror pieces are abraded, care is taken to make sure that the cPRM fills these abrasions fully. Once this polymer layer hardens, another layer of the same cPRM is superimposed and once it gels, a second layer of mirror pieces is laid in it, reflective side up (e.g., in the method of Fish Image 11. again) leaving space in between all the mirror pieces. If these mirror pieces are abraded, their abrasions are filled in the same way described for the previous layer, as described for Fish Image 11. Like the first layer of mirror pieces, each of these mirror pieces is pressed into the gelled cPRM at a slightly different angle. Once this polymer hardens, this second layer of mirror pieces is embedded by a superimposed layer of the same cPRM, (again painted on using a conventional paint brush). This hardens. If desired, for alignment with the other fish part which will be joined, the larger fish part can either be completely removed from its mold or this mold's sides can be lowered (e.g., cut down) so that the side edges of the larger fish part are clearly exposed all of the way around the fish's perimeter.

In a second mold the rest of the fish's thickness is formed. This fish part is formed of the same cPRM, and it constitutes approximately a third of the fish's thickness. The two fish parts are bonded together, aligned as desired, for example, in one of these two methods. Method 1., the smaller fish part hardens and is then completely removed from its mold. A thin layer of cPRM is painted on the exposed surfaces of both parts of this fish. If desired, the image maker can wait until this cPRM gels so that it is not runny. Then, the two fish parts are placed in contact with one another with the smaller fish part on top of the larger one and they are aligned as desired. Method 2, a thin layer of cPRM is painted on the exposed surface of the large fish part. Then, once the cPRM of the smaller fish part gels firmly enough to so that it will maintain the form shaped by its mold without the support of its mold, but while its exposed surface is still wet, it is removed from its mold completely, and flipped over onto the larger fish part. In both methods, before the fish hardens, cPRM oozing or dripping out of the seam between its joined parts may be cleaned off. This may be the completed fish desired, but if it is not, this fish may be further processed as desired, e.g., as the following three examples.

Example 1. the fish is painted, written upon, drawn upon, printed upon, incised, collaged, carved into, or a combination of these. Example 2. this fish is covered partially or entirely with a surface preparation stabilizer to enable it to bond as desired to further superimpositions without being abraded first. Example 3.. a week after cPRM was last added to this fish, this fish is gently sandblasted forming SSI which are a surface preparation stabilizer. For example, these SSI might be superimposed directly by drawing, painting and other marking. For instance, it might be given a Clarifying Imprimatura, which is a transparent colorless acrylic with a slightly visible blue iridescent mica pigment mixed into it. Using Example 1., 2., 3., or a combination of these on this fish, it might have any other of the following further processing using conventional practices, or a combination of them. a). It may be painted using oil paints, e.g., in washes, glazes and transparent colors using simple abstract shapes. b). It may be painted using a few strokes of transparent paint that are dripped, splattered or thrown onto each of its sides in the style of Jackson Pollack. c). It may be painted simply in a few superimposed layers of transparent broken color oil painting which are reminiscent of the broken color laying of Monet's painted water-lilies. d). It may be painted with an inconsistent coat of very matte, transparent black acrylic paint. e). It may be written upon. f). Text may be printed onto it. g). One or more emulsions from Category Photos in Fish Image 10. may be transferred onto this fish's surface as desired, e.g., using processes previously described in which they can be distorted or shaped as desired. Thereafter, the fish may be complete, but if it is not, further processing may be done, e.g., once this fish is completely dry, part or all of both of its sides may be further processed.

The inventive images shown in cross section or side views FIG. 41 might be made of connected image supports (e.g., stabilizers). For instance, these might be polymer image support stabilizers made with an absorbent polymer, or made with a surface preparation stabilizer upon them. FIGS. 41.I. shows progressive image making from a. to c. as more layers and more air pockets are added onto a hollow inventive image. FIG. 41.II shows a cross section or side view of another hollow inventive image. Its three polymer layers (one of which is marked a.), appear white with black outlines. These three polymer layers have two hollow spaces between them, (one of which is marked c.), and their side walls are used as four internal painting surfaces. One of these internal layers of paint is identified as b. This may be the finished image, or it may further processed as desired. FIG. 41.III. shows a different inventive image made of polymer marked a. (shown in white with black outlines). This image also has two internal hollow spaces, one of which is identified as c., with side walls used as four internal painting surfaces, one of which is identified as b. But unlike the images FIGS. 41.I. and II., this image is shown with multiple varied applications on its external and its internal surfaces, e.g., paint applications. Thus, this image might, for example, have four internal layers of transparent paint, two external layers of transparent paint and its external sides as painted layers too. In the images in FIGS. 41.I., II. and III. layers of coloration may superimpose one another without contacting one another separated by negative spaces and polymer planes. Thus for example, with negative space or polymer planes separating layers of superimposed applications it would not matter if these superimposed applications (e.g., paint applications) follow any of the entire range of rules which govern and limit the direct superimposition of applications using conventional practices (e.g., fat over lean), it would not matter if these applications would be impermanent or if they would apply well if they were directly superimposed. The images in FIG. 41 can be further processed as desired, e.g., with more layers.

In some embodiments, two or more spatial depths are used on, and/or within the inventive medium to make an image. Drawing at different real depths often can give images real form, real volume, or both even if the drawing is linear, with or without the use of illusionary form, volume, or both. For example, conventional shading processes such as cross hatching and modeling can be made in superimposed layers of real depth when they are made using polymer of the present invention.

The use of conductive polymer in FIG. 84 has been mentioned in prior text. However, whether or not the image or images shown in FIG. 84 have conductive polymer, and whether or not it or they emit light, there are useful additional interpretations of FIG. 84 which describe the present invention, such as these. The following description applies to either the single inventive image which might be shown in three stages in FIG. 84, or to each of the three separate inventive images which might be shown in FIGS. 84.I., II., and III. This image or these images in FIG. 84 might be made using polymer image support(s), e.g., stabilizer(s), and coloration, in real varied spatial depth within its or their 2D or 3D form, e.g., with LEDs and/or with EL lamps. This or these polymer image support(s) may be made in any thickness desired, perhaps as thin as about 0.25". Moreover it or they may have one of a number of different structures. For example, the front surface of this or these inventive image(s) might be flat, or it or they might be relief(s) with each square in its or their grid pattern recessed or concave. In another example, this or these image(s) might be made using layers that are superimposed, with or without negative space between them, e.g., as in the layering variations shown in diagrams in FIG. 8. where superimposed layers of different thicknesses are numbered, for example, in order of their application. This image or each of these images of FIG. 84 might have superimposed layers like those shown in one or more of FIGS. 25, 27, 41, 51-55, and/or 64. Thus, color and other aesthetic elements might be: on the image's or images' surface, within it or them in any number of layers, or within its or their spatial depth in another way. Coloration might be from one or multiple of the examples of sources described herein, and this image or these images might also be enhanced by one or more other light effects. In one interpretation of this illustration, the Compositional Arrangement, the LED(s) and/or the shape of the EL Lamp(s) with respect to the polymer's coloration, results in real light shining through this or these inventive image(s) in repeated "X"shapes (with or without color or multiple colors). The LED(s) and/or EL Lamp(s) might be installed within the colored or colorless polymer plane of this or these image(s), on its or their reverse side, or on another surface behind it or them, e.g., on an underlayer (such as another layer of polymer or a layer of wood), or on a wall from which this or these inventive image(s) might be mounted. In addition or instead, the polymer of this or of each of these image(s) might be colored by the use of one or more photographic transparencies on and/or within the surface of a transparent polymer plane. Also, this or these polymer plane(s) might be inconsistently colored using coloration in its cPRM throughout some or all of its thickness. The coloration in this or these imge(s) might be painting, drawing, or printing on and/or within its polymer plane. Or, for example, the coloration of this or these inventive image(s) might be formed in a combination of these ways. The image(s) in FIG. 84 may be finished. Alternately, further processing might be done. For example, such processing might be done by adding and/or subtracting coloration, light or both, e.g., by adding and/or subtracting a light source, one or more layers of colored cPRM or colored polymer, or by doing a comination of these. Note that if this or these image(s) are made so that it or they use electricity, it or they can easily be made without any visible cords, wires or other such materials if desired. And it or they might be developed into another art form if desired, e.g., if it is 3D it can be a seat; it might also be a skylight, a window, a wall, a lamp, a painting, etc.

FIG. 1. shows the versatility of the inventive medium. FIGS. 1.*d*.1. and 2. show opposite sides of an inventive image with multiple layers of coloration applied on the external surfaces of a transparent colorless polymer initial image support stabilizer. Most or all of the external coloration applied on this image is opaque, thus its two opposite sides in FIGS. 1.*d*.1. and 1.*d*.2, look related to one another, but very different. This inventive image might for example, be a painting (e.g., for viewing from one or two sides), it might function as a window, a skylight; a room divider, a screen, a partition, a wall, etc. 1). The inventive image in FIGS. 1.*d*.1. and 2. might be made using mostly or only opaque colors on opposite sides of a polymer initial image support (e.g., stabilizer). Its color might, for example, be: painted on, collaged on, printed on, drawn on, transferred on, and/or inlaid on, internally and/or externally. 2) The forms illustrated in FIG. 1.*a*. might be two cut-outs made using the inventive medium, e.g., made using cPRM, made by cutting these shapes out of a polymer, or made by using cPRM with non polymeric materials, etc. Alternately these two cut-outs might be made in a subtractive process from FIG. 1.*d*.1., or from FIG. 1.*b*., or made from FIG. 1.*c*. using subtractive and additive processes. One or both of these cut-outs in FIG. 1.*a*. may be completed images, or together they might form a single completed image made of two physically separate parts, e.g., using any mounting, framing or installation method. 3). The image in FIG. 1.*b*. might be a cut-out made by putting the two parts of FIG. 1.*a*. together. It might be made from scratch, e.g., cast as one form in a mold, or made by cutting the form out of a polymer plane, etc. It might be made by casting one of the two parts on top of the other. Or, the image in FIG. 1.*b*. might be made in a subtractive process either from the image in FIG. 1.*d*.1., or from the image in FIG. 1.*c*. 4).The image in FIG. 1.*c*. might be made by adding matter extending and encircling the perimeter of the cut-out in FIG. 1.*b*. or by a similar process adding matter, connecting and reshaping the cut-outs in FIG. 1.*a*. It might have been made by collaging the cut-outs shown in either FIG. 1.*a*. or FIG. 1.*b*. onto a circular image support. It might have been made using subtractive processes from the image in FIG. 1.*d*.1. 5). The inventive image in FIGS. 1.*d*.1. and 1.*d*.2. might be made as a development from the image in FIG. 1.*a*, FIG. 1.*b*., or FIG. 1.*c*., or as a progressive development in which two or all three of these images are stages. 6). The leaf-like part of FIG. 1.*a*. (depicted by a black contour line) may be made of one continuous polymer rod, e.g., as a Drawing in Space. If this is not the finished inventive image desired, it might be further processed to form one of the other versions of this inventive image shown.

All of the variations of this inventive image shown in this illustration might be further processed as desired (e.g., with additional layers, using other additive processes, using subtractive processes, or a combination of these). The inventive image shown from two of its sides in FIGS. 1.*d*.1. and 2. might a room divider, it might be inserted as a wall segment, as a window or as a skylight; or it might be cut in half to function as a pair of doors or as a diptych. It might also be a light source e.g., using conductive polymer.

FIGS. 43, and 14.IV. show inventive images which have color in and/or on them in gradations. If both the cPRM used to make these polymeric compositions and any coloration applied onto their surfaces are see-through, light can pass in and out of their real spatial depth to varying degrees. If the inventive images in FIGS. 43, and 14.IV. with graduated color are transparent, translucent or both, they may have new and unique effects of light. If desired, these images might even be enhanced by having one or more light sources as part of them, e.g., behind and/or within them. For instance, FIG. 14.IV. shows a frontal or a side view of an inventive image with coloration in gradations which might for example be illuminated from behind e.g., by natural daylight, an EL lamp, standard light bulbs, neon, and/or fluorescent light (such as natural light during the day and an EL lamp at night). Thus the coloration of this inventive image in combination with its transparent spatial depth and its illumination enables it to be very new and unique in its function for visual observation, as well as in its function as a wall, a sculpture, a ceiling, a floor, or a painting. An alternate interpretation of the inventive images in FIGS. 43, and 14.IV. is that they are opaque polymeric forms made using the inventive medium, which may be internally and/or externally colored in gradations. For instance they might be opaque polymeric forms with additional layers of transparent cPRM superimposed upon them. Thus light would only be able to enter into a limited portion of their real spatial depth, though these surfaces and/or the initial polymeric image supports (e.g., stabilizers) beneath them might be iridescent, reflective or both.

Examples of inventive images formed using superimposed layers without any initial image support are inventive images formed by throwing, splattering and flowing cPRM on a mold which may not even have any side walls so that the resultant form is somewhat determined by chance, by the thrust of this process, and the viscosity of the cPRM. FIG. 5.X. illustrates an inventive image in a close up view which may be made without any initial image support. Its colored cloud scene may, for instance, be formed using overlapping applications of cPRM, or polymer (e.g., with a bonding substance), which resemble conventional broken color applications and/or pixels, but without a canvas like support. In its entirety, this inventive image might for example be very small (e.g., about 2" square) or very large (e.g., about 7' high×10' wide). This may be the inventive image desired, but if it is not, it may be further processed as desired.

An inventive image formed using superimposed layers without any initial image support is in FIG. 67. The superimposed layers in the inventive image in FIG. 67 might for example be made of disconnected applications (such as normal size, large or very large broken color applications, e.g., of cPRM), and/or they may be made of separate parts (e.g., polymeric and/or non polymeric parts connected with a bonding substance). FIG. 67.*a*. shows an inventive image made of a Compositional Arrangement of multiple separate parts. This may be the inventive image desired, but if it is not it may be further processed as desired. For example, FIG. 67.*b*. shows a way in which another layer of disconnected applications and/ or separate parts can be added to this image such that they partially overlay some of the separate parts in the initial layer. This may be the inventive image desired, but if it is not it may be further processed as desired. For example, a third layer of superimposed applications and/or parts can be added onto this inventive image as shown in 67.*c*. This may be the inventive image desired, but if it is not it may be further processed as desired. For example, this inventive image may be developed from its reverse side, with a new layer of superimposed applications and/or parts, as in FIG. 67.*d*. in which the reverse side of this inventive image is its underside. This may be the inventive image desired, but if it is not it may be further processed as desired. For example, the new layer added to this inventive image in FIG. 67.*d*. can be removed and the inventive image could return to the way it was in FIG. 67.*c*. As an alternate example, another discontinuous layer could be added onto the side of this image which is shown in the illustration in FIG. 67.*e*., making the inventive image denser.

This may be the inventive image desired, but if it is not it may be further processed as desired. For example, the new layer added to this inventive image in FIG. 67.*e.* can be removed and the inventive image could return to the way it was in FIG. 67.*d.* As an alternate example, another discontinuous layer could be added onto the side of this image which is shown as frontal in the illustration in FIG. 67.*f.*, making the inventive image even denser. This may be the inventive image desired, but if it is not it may be further processed as desired. For example, some of the applications which were layered in the formation of this inventive image could be removed, as illustrated in three variations in FIGS. 67.*g.i., g.ii.,* and *g.iv.* The inventive image formed in FIG. 67.*g.i.* has a negative space in the center of its form. FIG. 67.*g.ii.* shows this inventive image in two separate parts by the removal of some of its applications. These two parts in FIG. 67.*g.ii.* might either be two parts of a single inventive image, or they may be two separate inventive images. In FIG. 67.*g.iv.*, the inventive image of FIG. 67.*f.* is cut down to a rectilinear shape. One of these images may be the inventive image desired, but if it is not, this image can be further processed as desired. For example, some or all of the applications removed from the inventive image might be added back to it again, either as they were before or in a different position. Alternately, the two separate parts of the image in FIG. 67.*g.ii.* might be connected by a single larger rectangular planar image support superimposed on or under them, as in FIG. 67.*g.iii.* In a further option, such as rectangular image support might be superimposed on both sides of the inventive image in FIG. 67.*g.iv.* (though this is not shown in the illustration). One of these images may be the inventive image desired, but if it is not, this image can be further processed as desired. Note that whereas this inventive image might function as a wall piece, a floor piece (e.g., sculpture) or a mobile in FIGS. 67.*a.-c.*, in FIGS. 67.*d.-g.ii.* the processing done to this same inventive image might make it more suited to function as a shaped painting, a sculpture or an irregular partition, and the processing done to it in FIGS. 67.*g.iii.* and *g.iv.* might make it more suited to function as a painting, a table top, the surface of a bench, a light source or a wall. Note that this inventive image in FIG. 67.*giii.* might have been made differently, though this alternative is not illustrated. For example, it might have begun on a planar initial image support. The versatility of the inventive medium enables such options. FIGS. 65 and 66 also show inventive images made using multiple parts without any initial image support.

In another example, all of the parts of an inventive image are connected to a single common part, which may be a strengthening stabilizer, e.g., an image support. For instance, all of the parts are connected to a 2D or 3D polymer, to a piece of fiber, to a block of wood, to a sheet of metal, to a 2D or 3D mesh form, to a framework or lattice, to a common mount, frame or base (for instance, they all hang from a single mount), etc. For example, a fiber stabilizer is used as one part of a two part image support. On this fiber image support, a polymer part, a paper part and a plaster part are formed. A wire mesh is used as the other part of this same image support. On it a polymer part, a paper part and a plaster part are formed too. Three more polymer parts are formed, all partially on the fiber image support and partially on the wire mesh image support. Some of these parts are further processed, e.g., with superimposed layers of coloration, etc. In a third example, ten translucent and opaque paper parts are formed on cheese cloth image support, and painted with colored cPRM.

Inventive images can be made by one or by multiple image makers. In some embodiments, an image is formed by two or more image makers in a collaborative process. In other embodiments, an image is made by multiple image makers in a process which is not collaborative, e.g., in a process with little or no communication between the image's makers. For example, an image is made in a process in which at least one image maker works on it, either leaving it unfinished or completing it, and then transfers it to one or more other image makers who further process or rework it, perhaps completing it (without collaborating with the first image maker or makers). Then if desired, the second image maker (or the second group of image makers) might transfer this same image to a third image maker (or to a third group of image makers) who might further process it or rework it, perhaps completing it, without collaborating with any of this image's previous image makers. Such processes whereby an image is made, reworked, or both, by multiple image makers who do not collaborate with one another can be repeated as many times as desired, over any period of time.

As an illustration, images are processed with any specifications desired using any one or multiple methods, means and manners of the present invention. For example, these images may have a wide variety of different shapes, sizes, structures, forms, uses of coloration, light effects or the ability to emit real light, other aesthetic specifications, they might have a utilitarian function in addition to their function for visual observation, etc. While some of these images are finished, and others are left unfinished as works in progress, all of them are transferred from their initial image makers to other image makers who have no contact with their initial image makers. For example, these images might be transferred from their initial image maker to a different image maker through an intermediary party who does not alter the image in any way, such as an image that is sold (e.g., at stores that sell conventional art and design supplies, at a gallery or art studio), an image which is transferred as an anonymous gift, or an image that is transferred as part of a procedure for making a particular work of art or design in which the contribution of multiple image makers is needed. Then, image makers who had nothing to do with making any of these images, reworks and further processes it, perhaps finishing some, most or all of the unfinished image, as desired. Perhaps, along with one or more of these images, the first image maker or makers might also transfer instructions for its further processing which might be followed, adapted or ignored by the second image maker or makers (e.g., a template, a drawing, or instructions for painting, carving, mounting, adding polymer and non polymeric parts and layers to it, etc.). For example, images might be made as works in progress which are transparent or translucent 2D or 3D polymers. They may be image supports which may or may not be stabilizers. Then another image maker might purchase one of these images and further process it by painting, writing, printing, collaging, carving, cutting, adding parts (such as attachments, inlays, embedding, joined components, layers, sections, electrical parts, found objects, mounts, hinges, wire, other hardware, etc.), etc. Once these images are reworked, further processed or finished, some of them might have one or more functions in addition to their function for visual observation, which they may or may not have had before their transfer, or, some of these images might no longer have one or more additional functions which they had prior to their transfer. As another example, an image maker purchasing such an image support might decide that it is not an image support but a finished image without further processing and display it as such.

Figure 85:
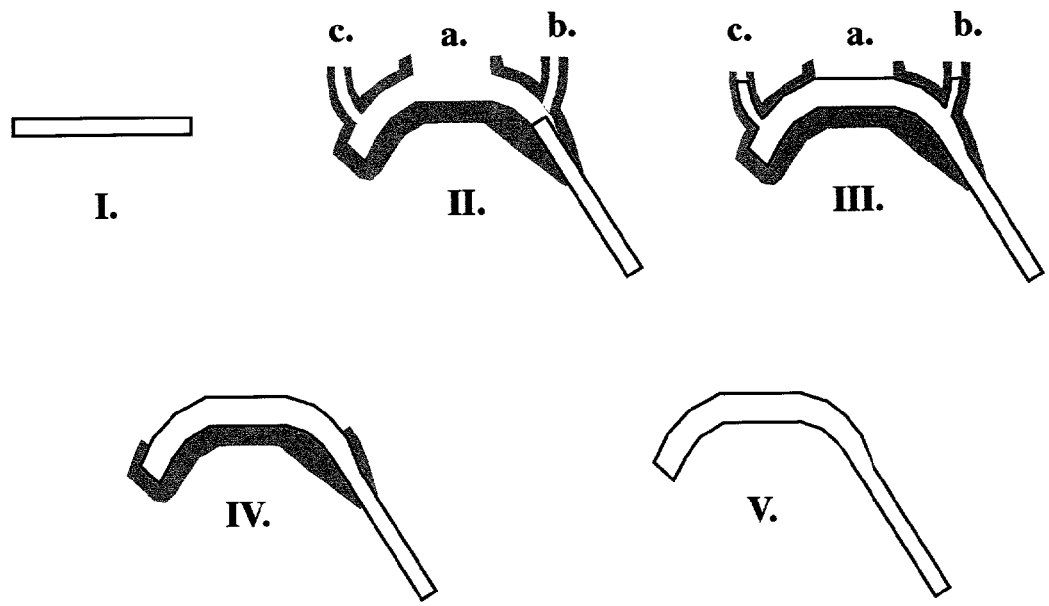
FIG. 85 shows a new polymer part formed on an inventive image using a temporary mold.

Both open and enclosed molds may be used to make inventive images, as well as molds that are partially open and partially enclosed. FIG. 80 shows an example of both an open mold in which cPRM polymerizes and an example of an enclosed mold in which cPRM polymerizes. FIG. 85 shows the formation of polymer in a mold that is partially open and partially enclosed.

The formation of an inventive image shown in cross section or side views in FIGS. 80.V.-VIII. is an example of the formation of a polymer in an enclosed mold with multiple openings. FIG. 80.V. shows an enclosed mold with four openings (labeled a.-d.) before anything has been put into it. FIG. 80.VI. shows the same mold after it has been filled with some cPRM and two of its openings (labeled b. and d.) have been closed. The cPRM was poured into this mold from the opening labeled a. first. Once this cPRM reached the level desired within the mold at opening b., opening b. was sealed off. More cPRM was poured into this mold from the opening labeled c. Once it reached the level desired within the mold at opening d., it was sealed off. This illustration shows that this mold is already filled with cPRM to the level desired at opening a., thus opening a. is now ready to be sealed off. The level that the cPRM has reached within the rest of the mold is marked e. on this illustration. FIG. 80.VII. shows opening a. sealed off. It also shows that cPRM has been poured into opening c. to the level desired, but while all the other openings were sealed off to prevent them from leaking cPRM as higher levels of the image were poured, the level at opening c. is the highest level that this image reaches within this mold, thus there is no need to seal off opening c. Opening c. is left to vent air, vapors, gasses and/or heat, though the cPRM used might not give off substantial heat. After it is determined through opening c. that the cPRM within this mold has gelled firmly enough to maintain its own form without the mold's upper half, it is carefully cut off, so as not to disturb the cPRM at all, as in FIG. 80.VIII., thus exposing the upper portion of the inventive image. If desired, this inventive image can be further processed before it hardens. For example, alterations that can be made to gelled cPRM are described herein (e.g., carving and engraving can be done in gelled cPRM, materials can be stuck onto gelled cPRM, it can be inlaid, etc.). Once this inventive image hardens enough so that it no longer requires the support of any mold, the rest of its mold is removed from it. If it was not altered during its gelation stage, the resulting hardened polymer image appears in FIG. 80.IV.

FIG. 80.IV. shows a polymer inventive image which can be formed identically, or as close to the same as desired, in a tiered process and in an enclosed mold (the use of an enclosed mold was previously described). The formation of the inventive image in FIG. 80.IV. using a tiered process is in FIGS. 80.I.-III. and VIII. In FIG. 80.I., cPRM is applied in the lowest valleys of an open mold (the mold is shown in dark gray and the cPRM is white outlined in a black line). In FIG. 80.I. temporary clay walls are formed on the first polymer tier, so that the second polymer tier will form overlapping a portion of it, creating a connection seam between these two tier layers. This connection seam is visible in FIG. 80.III. where new cPRM has been added into the negative spaces formed by the temporary clay walls. But the seam line in FIG. 80.III. indicating the connection seam between the first and second tiers of polymer is not actually visible on this image because both of its polymer layers were made using either, the same cPRM, or different cPRMs of the same color which bond to one another. Also, notice that there is no seepage when its second tier is made. If there were seepage, it would be visible in FIG. 80.III. as cPRM that was added into the negative space formed by the temporary clay walls to form the second tier layer of this inventive image, which ran under the first layer of polymer, between it and the mold. If desired, once the upper part of this mold is no longer needed to support the cPRM within it, it can be removed (e.g., as in FIG. 80.VIII.). This inventive image can be altered during its gelation if desired. However if it is not altered, the resultant inventive image will be as shown in FIG. 80.IV.

Inventive images can be made with aesthetic elements from the surfaces which they were formed upon, or which one or more of their parts were formed upon. Many of these aesthetic elements could not have been comparably brought to these inventive images in any other way. In one illustration, inventive images or part thereof can be formed on organic materials, natural materials or combinations of these, (whether they are polymer, and/or non polymeric parts). Also inventive images or part thereof can be formed on molds that are partially or entirely formed on organic materials, natural materials or combinations of these. As a specific illustration, either or both of these processes can be used to form inventive images or part thereof using Nymphaeaceae Victoria leaves (also known as Giant Water-lilies, Water Platters, and Amazon Water-lilies), in either or in both of its two species; Nymphaeaceae Victoria amizonica (also known as Nymphaeaceae Victoria regia, Amazon water-lily, Royal Water-lily, and Water Maize), and Nymphaeaceae Victoria cruziana (also known as Santa Cruz Water-lily and Victoria trickeri), or in any Nymphaeaceae Victoria hybrids, e.g., Victoria Longwood hybrid, all of which are referred to as Amazon Water-lilies herein. Though these particular leaves vary in their sizes, shapes and forms, any of these leaves, or any part or parts of them can be used as desired to make inventive images.

For example, inventive images or part thereof can be polymer negative impressions of Amazon Water-lilies (whole or partial). In addition or instead, inventive images or part thereof can be polymer positive replicas of Amazon Water-lilies (whole or partial). One or more parts of inventive images which are not principally made of polymer can be negative impressions of Amazon Water-lilies (whole or partial); positive replicas of Amazon Water-lilies (whole or partial), or they can be combinations of these, as desired. Also, the use of one or more selected parts of Amazon Water-lilies (rather than their entire forms) offers further variations, and further variations can also be made in other ways. For example, both Amazon Water-lilies, and molds taken off of Amazon Water-lilies can be altered to make a myriad of different aesthetic elements for using in inventive images. Specifically, for instance, the texture of an Amazon Water-lily can be flattened and simplified by filling its depth in partially, e.g., a bonding substance can be used to fill in half of the depth of the deepest negative spaces in the surface texture of a mold that is a negative impression of an Amazon Water-lily, along with some of its other details. (For instance, prior to applying cPRM on the surface of such a leaf, this surface might be sealed, e.g., all holes, tears and perforations might be sealed with oil formulated clay and then the entire surface might be sprayed with polyurethane. Then the leaf's surface might be covered with a release agent and the VIMC might be used to make sure that there is no excessive heat during the polymerization process.) The resultant polymer formed on this leaf's surface might be used as an image support (e.g., an initial image support and/or an image support stabilizer) which is further processed on its front and/or back sides, e.g., it might be painted, drawn upon, written upon, printed upon, engraved, etc. If some of the texture on this polymer which came from the Amazon Water-lily is undesirable, this texture can be reworked as desired, e.g., it can be filled in, polymer or non polymeric media can be added to it, it can be carved (for instance carved so that it is flatter or carved so that it is a different texture) or it can be further processed in a combination of these ways, as desired.

Figure 81:
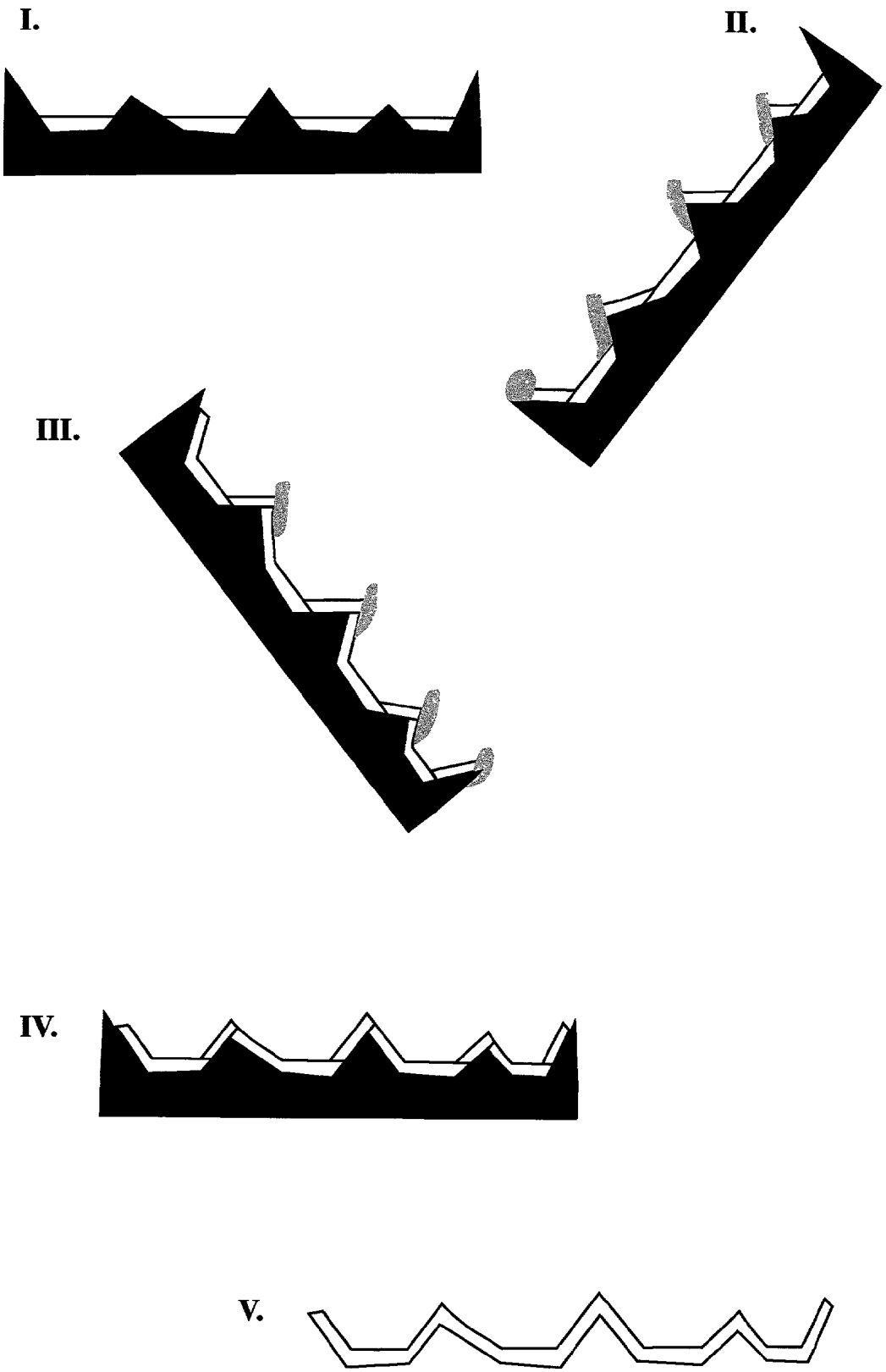
FIG. 81 shows the formation of an inventive image in tiered layers by tilting the mold.

FIG. 81 shows the formation of an inventive image using a tiered process, in which the mold is tilted multiple times. FIG. 81.I. shows a mold which is partially filled with cPRM. (The mold is shown in black and the cPRM is shown in white outlined in black.) After this cPRM gels firmly enough to maintain its form as desired and is no longer giving off noticeable heat if it did do this during its polymerization (e.g., during gelation or once this first layer of polymer hardens), temporary mold walls (shown in gray in these illustrations) are added on both this first tier layer and on the mold to form the second tier layer. The mold is tilted and new cPRM is applied in a second tier layer which superimposes the first tier layer of polymer with connection seams, as in FIG. 81.II. Though the connection seams between the overlapping tier layers are indicated in these illustrations, they are not visible in this inventive image because both layers are made using cPRM of the same color. The tilt of this mold may be varied in order to apply all of the cPRM on a level or more level surface. Also, though the tilt of this mold is supported, its support is not shown in this illustration. Notice that no seepage of the cPRM from the second tier layer seeps between the first tier layer and the mold. These temporary mold walls are totally removed and the mold is returned to a horizontal position anytime after the cPRM has gelled firmly enough so that it is not undesirably effected by these changes. Then, this mold is tilted in the opposite direction; new temporary mold walls are built on both the newly formed tier layers and on the mold; and a third tier layer is formed on this inventive image using new applications of cPRM, as in FIG. 81.III. Again, though the connection seams between overlapping tier layers are indicated in these illustrations, they are not visible in this inventive image because they are made using cPRM of the same color. Again, the tilt of this mold may be varied in order to apply all of the cPRM on a level or more level surface. And again, though the tilt of this mold is supported, its support is not shown in this illustration. Notice again that no seepage of the cPRM from the third tier layer seeps between either of the previous tier layers and the mold. These temporary mold walls are totally removed and the mold is returned to a horizontal position anytime after the cPRM has gelled firmly enough that it is not undesirably effected by these changes as in FIG. 81.IV. The resultant polymer inventive image is in FIG. 81.V. This may be the inventive image desired, but if it is not further processing can be done as desired. For example, this inventive image can be reinforced on one or more sides with a layer of fiber as described herein. It can be colored as desired. Or, for example, some or all of the sharp angles on this inventive image can be made smoother using one or more processes that are additive and/or subtractive.

Different processes of removing matter from polymer or from other parts of inventive images can be used as desired, for instance, to create different effects, e.g., sandblasting, carving, cutting, engraving, sgraffito, incising, drilling, etc. For instance, a Paasche "AEC Eraser Set" described herein might be used for this purpose. Different effects of color in a polymer can also be created by removing matter from a cPRM at different stages in its polymerization. For example, at the end of its gelation, some kinds of carving are easier and more effective than at other times in its gelation. Different effects of color can also be created in an inventive image by removing polymer and/or nonpolymeric matter from it, e.g., at different times during and after its process of drying, curing or hardening.

FIGS. 22a, 22b., and 23 show three inventive images in cross section or side views, all of which have new unique polymer imprimatura (such as those previously described) of a different thickness as their central layer. For example, these imprimatura may be initial image supports, e.g., which may be stabilizers. Thus, all three of these imprimatura provide structural support to their respective inventive images, enabling them to be further processed on all of their sides, and further applications are made on both the right and the left sides of all three of these images and on the side edges of FIG. 23. As another example, these imprimatura may be surface preparation stabilizers on image supports which may also be stabilizers. As a different kind of example, the inventive images shown in cross section or side views in FIGS. 16a.-c. and 17, might be made on conventional image supports or on conventional images which serve as image supports, such as inventive images made on paper; canvas; a drawing (e.g., a pastel or pencil drawing); a painting (e.g., an oil or watercolor painting); a photograph; a print (e.g., an etching, lithograph or silkscreen); a piece of wood; a piece of glass; a board, etc. These inventive images have new unique polymer imprimatura (rendered in white with black outlines) over their internal, conventional image supports, directly and completely covering the innermost (conventional) part of each of these inventive images. These polymer imprimatura may form and/or fortify the structure of these inventive images to any degree, and because cover all sides of these four inventive images, they can function as imprimaturs on all of their sides. The inventive images in FIGS. 16b., 16c. and 17 show further applications superimposed on these imprimatura.

In another example, a polymer ground might have one or more dissolved or dispersed dyes or pigments; it might have dispersed particles of sand, metal, light reflective materials, paper pulp, sawdust, polymer, or conventional image making materials, etc. A ground made in these embodiments may be a surface preparation stabilizer on an image support which may also be a stabilizer. Alternately, a ground made in these embodiments may be an image support which may be a stabilizer. An illustration of such a new unique ground is shown in a cross section or side view of an inventive image in FIG. 21. The image in this illustration has texture in it from particles that are in its ground, and a further application (e.g., a layer of transparent paint or other coloration) on its textured ground on both its right and its left sides. If the internal image support in FIG. 20 in cross section or side view, is completely opaque, it may also be a new unique ground, but without texture. This ground also is further processed, it has another application superimposed on all of its sides (e.g., paint or other coloration).

FIG. 21 previously described is an inventive image with a new unique polymer ground. The texture of this ground is comprised of embedded particles which may have been mixed into the cPRM that formed this ground, inlaid particles which were stuck into this ground when it was gelled cPRM, and/or attached particles which were adhered to the hardened ground of this inventive image using a bonding substance, e.g., using the same cPRM, or using a bonding, similarly colored cPRM as a glue.

Figure 45:
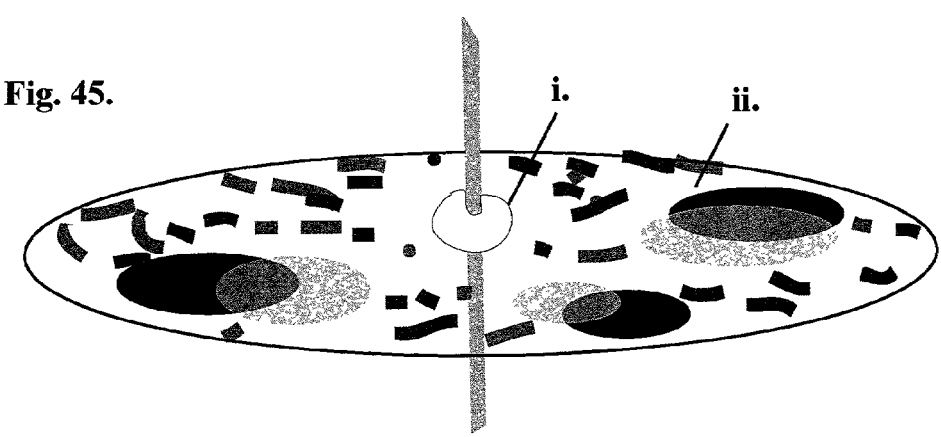
FIG. 45 shows an inventive image which may emit light.

Further examples of inventive images which might be printed are: the cloud filled sky on the inventive images in FIGS. 5.I.-IV., IX., and .X.; the graduated coloration shown in the inventive image in FIG. 14.IV.; the abstract coloration on the inventive image in FIG. 45. and the patterns shown in the inventive images in FIG. 84.

In some embodiments, inventive images are made that have at least their two largest sides essential to their coloration and their aesthetic. Also, in some embodiments, colored image supports (e.g., stabilizers), are made which have at least their two largest sides essential to their coloration and their aesthetic. These inventive images and image supports may or may not have coloration in other locations (e.g., on edges, other parts, attachments, internal coloration, colored lighting, etc.). For example, they might be 2D or 3D; planar and/or volumetric, and transparent, translucent, opaque or a combination of these. If desired, they may be displayed so that two or more of their colored sides are visible, though they may or may not have a clearly distinguishable front and back sides. Examples are inventive images and image supports that function as: drawings, paintings, prints, sculpture, images with writing, graphic art, tiles, partitions, windows, doors, table tops, walls, screens, etc.

Inventive images made in some embodiments are writing surfaces, they have writing, or both. For example, inventive images or part thereof, are written works of all kinds, some of which have illustrative art and designs e.g., new kinds of graphics, illuminated manuscripts, tablets, scrolls, and books. For instance, methods, means and manners of drawing described herein can be used (e.g., adapted if necessary), to write on inventive images surfaces, as desired. The inventive image surfaces which are written upon can be of any description, e.g., transparent, translucent, opaque, partially opaque, they can have negative cut-outs, texture, perforations, they can undulate. Further, these images can be developed in any manner desired and to any extent desired, before they are written upon, as they are written upon, after they are written upon, or at a combination of these times. Inventive images with writing can also have other features (e.g., drawing, painting, etc.) and/or one or more parts without writing, as desired. Inventive images can have words, letters or both, formed in ways other than by writing, e.g., printed, painted, embossed, carved, incised (for instance, in the form of sgraffito, engraved or both), made by embedded materials, formed by inlays, brought to it by attachments (such as collaged pieces of newspaper), brought to it by photography, brought to it by found objects, brought to it by other non polymeric parts, etc. A mold can make raised or indented words on the inventive image surface, e.g., polymer surfaces, non polymeric surfaces such as paper, or both. The forms of inventive images or the form of parts of them might be made in the shape of one or more letters or words.

In some embodiments, inventive images are made which are books. Examples are shown in FIG. 77. Inventive images which are books might, for example, have their outside cover and/or some or all of their pages made of flexible and/or rigid polymer. As an illustration, planes of polymer are used to make inventive image books. For example, an inventive image book is made with printed text and graphics, on both sides of six translucent pages, each of which is made using a cross linked polymer of the present invention with a layer of fiber embedded approximately medial within their thickness which may be approximately a quarter of an inch so that the fiber may not be not visible to viewers. This book might be bound using conventional practices. If desired, additional text, graphics, or both can be engraved on the pages of this book, photographic transparencies can be added to this book, this book's text and/or graphics can be embedded, this book might have other special light qualities and effects, etc. As a second example, an inventive image children's book is made which uses its transparency, translucency, spatial depth, layers, pages, negative cut-outs, coloration, embedding, other new and unique qualities and effects, or a combination of these in a playful manner. For instance, as many conventional children's books, an inventive image book can be made which plays a peek-a-boo game as its pages are turned, e.g., through the cover and/or current page, a hint of the following page is visible, for instance due to the transparency and/or translucency of the polymer, and/or due to perforations and cut-outs. As a third example, an inventive image book is made which uses see-through pages made using polymer of the present invention, to change a form as its pages are turned. For example, an inventive image book with transparent and/or translucent pages colored on both sides might present a complex design or subject to viewers which is formed by the superimposition of all of its pages. As its pages are turned, new images are continuously being formed, its complex design becomes increasingly simplified on the book's right hand side, as a new image is formed and becomes increasingly complex as the turned pages stack up on the book's left hand side. As a fourth example, an inventive image book, card, envelope, or page can be made which unfolds into a 3D form, e.g., an inventive image book or greeting card made of rigid and/or flexible polymer expands like an accordion, or has pop-out parts.

In FIGS. 37 and 39 cross section or side views are shown of layered inventive images which have letters on their sides marking their superimposed layers. As an example, all of those layers identified by a letter on their upper side might be polymer layers, and those layers and elements identified by a letter on their lower side might generally, but not exclusively, be entirely or principally non polymeric. These inventive images also have other letters with varying references. For example, to make the inventive image in FIG. 37, the polymer layer labeled h. may be formed first. On layer h., a second polymer layer is made labeled g. Once the cPRM of layer g. gels, but before it gels firmly, three non polymeric rectangular items are embedded in it in different positions, one of which is marked f., e.g., embedded pieces of mirror or glass. Once layer g. hardens, the layer of coloration labeled i. is made on the reverse side of polymer layer h. Though layer i. is non polymeric, some or all of it bonds to the polymer of this inventive image. Layer i. might for example be comprised of paint, a photograph, and/or collaged paper. Then the polymer layer e. is made on polymer layer g. Once the cPRM of layer e. gels, four darkly colored, pyramid shaped inlays are put into it. Once layer e. hardens, five small temporary molds are built on its surface (e.g., in the manner in FIG. 71.III. described herein), and filled with cPRM which hardens forming five textural protrusions, collectively referred to as layer d. With these molds removed, the five hardened polymer protrusions of layer d. are carved and/or sanded into seven, pointed textural protrusions extending out from layer e. Then, some of the texture of layer d. is painted various colors. These painted applications on layer d., collectively labeled c., may bond by adhering to the SSI on textured layer d. formed by carving and/or sanding it. The SSI on the unpainted surface areas of layer d. are filled in and smoothed out with a painted application of the same cPRM used to make them, thus they return to the degree transparency they had before they were carved and/or sanded.

On the reverse side of this inventive image, shown in this illustration as its right side, a new layer of polymer layer j. is formed on layer i. which bonds to layer i., e.g., in the same manner as layer h. After layer j. hardens, eight negative spaces are carved and/or sanded into it, and eight non polymeric inlays, collectively labeled k., are inset into them. They are bonded to this inventive image using the SSI left on the surfaces of these negative cavities by sanding and/or carving, and a bonding substance which adheres to each of the eight inlays. The bonding substance not only adheres these eight inlays to SSI lining the negative spaces in which they are inlaid, it fills in all of the remaining negative space around these inlays in these cavities. Meanwhile separately, a new thin, planar layer of polymer is formed for the left side of this inventive image. Once formed, it will be attached to this inventive image as its layer b. This layer b. is attached to the some of the high points of the texture of layer d. using cPRM. The negative spaces within the texture of layer d. are now air pockets between layers d. and b. The exposed side of layer b. is then superimposed by non polymeric applications of coloration, collectively labeled a., that bond to this inventive image, e.g, in the same manner as layer i. The inventive image in FIG. 39 is begun by first making the polymer image support layer h. which is formed with colored particles embedded in it mixed into its cPRM. Then, non polymeric layers of coloration collectively labeled layer g. are made on layer h. For example, the layers of layer g. might be bonded to one another using conventional practices (e.g., layers of conventional paint or collaged layers glued together) or the layers of layer g. might be placed upon one another but not bonded to one another. Also, for example, layer g. might be partially or completely made of non polymeric ingredients which bond to the polymer of layer h., it might have SSI bonding it to layer h., layer g. might be bonded to layer h. using other methods, or layer g. may be upon layer h. without being bonded to it at all (e.g., if layer g. is made of paper and no bonding agent is used to adhere it, or if layer g. is made of a paint which is incompatible with layer h.). Layer g. is then superimposed by a new layer f., which is made of the same cPRM as layer h. but without any coloration in it. Layer f. encases and embeds layer g. in this inventive image by bonding to the edges of polymer layer h. Thus, if before layer f. was made, layer g. was not bonded to this inventive image, or layer g. was not bonded as well as desired to this inventive image, once layer f. is made, layer g. is mechanically bonded to this inventive image because it is embedded in it. Layer f. may or may not bond or bond well to layer g.

Next, the exposed hardened polymer surface of layer f. is further processed. Layer f. is superimposed by three applications of non polymeric coloration (shown on the lower side of this illustration, e.g., applications of a conventional paint), and three non polymeric colorless, transparent items which have no SSI (shown on the upper side of this illustration, e.g., pieces of crystal). These six additions, collectively referred to as layer e., are encircled by a temporary mold wall which almost encompasses the entire surface of layer f. When this temporary mold is filled with a cPRM that bonds to layer f. (which may not be the same as the polymer of layer f.), all layer e. becomes embedded. Once the support of this mold is no longer needed it is removed, leaving the newly formed firmly gelled layer d. While layer d. is still wet, multiple colored non polymeric superimpositions are made on it collectively labeled layer c., e.g., layers of paper, metal, paint, photographs, board, leaves, fabric, fiber, etc. The other layers in layer c. are connected to one another using conventional practices, but they are not bonded to this inventive image as well as desired. For instance, one of the elements of layer c. which is labeled q., may only be loosely bonded to the rest of layer c. Once layer b. is superimposed, layers c and d. become embedded in this inventive image. Layer b. is made of a cPRM that bonds to the polymer of layer f., but which is not able to bond to the different polymer of layer d. Layer b. bonds to this inventive image principally by bonding to layer f. around the perimeter of the embedded layers c. and d.

Once the polymer of layer b. hardens its surface is changed. These changes are collectively referred to as layer a. First, this polymer surface is carved. Some of this carving is left as negative spaces on this inventive image surface, either leaving the SSI from the carving process of their formation, or with their SSI sanded smooth and then its shallow abrasions filled in with an application of cPRM which is so thin that it does not noticeably alter the shapes of these carved negative spaces. In other carved areas on the surface of layer b., inlays are installed. Some of these inlays are flush with this inventive image's external surface (e.g., the inlay labeled m.), while other inlays protrude from it, e.g., the inlay labeled n. A few other carved negative spaces in this inventive image surface are filled in with coloration which adheres to the SSI formed by carving, e.g., the painted areas labeled p.

On the reverse side of this inventive image, a lens labeled j. is inlaid. This is done by forming layer i. on layer h. using the same cPRM that was used to make layer h., but without the coloration added into it. Once layer i. gels firmly, the convex side of lens j. is placed on it and pressed into this gelled cPRM, just enough for its curved form to rest in an indentation in layer i., but not enough for cPRM to spill over the edge of lens j. onto its concave, exposed side. If desired, as a precaution, a release agent such as petroleum jelly, may be applied over the entire concave side of lens j. before it is added to this inventive image. Once the polymer of layer i. hardens with lens j. in it, the release agent might be removed from the perimeter edges of lens j. so that a polymer rim can be formed around lens j. to hold it onto layer i. securely. The polymer rim labeled k., is made encircling the entire perimeter of lens j. In making rim k., a layer of fiber may be embedded within it, indicated in this illustration by a gray dotted line in rim k., even though this embedded fiber can be invisible within this inventive image.

FIG. 71, previously described, shows the addition of new polymer parts on a polymer inventive image. New polymer parts can be formed on non polymeric inventive image surfaces using this same process, e.g., if this surface will bond to the cPRM; if this surface has SSI; or if SSI are made on this surface. FIG. 70 shows the addition of a new polymer part on a polymer inventive image using a temporary mold built on the polymer inventive image. Though each of the polymer images in FIGS. 70.*a*.1., *a*.2. and *a*.3., already have superimposed applications of coloration on multiple sides, these illustrations show the formation of a new polymer part on a side of each of these polymer inventive images which has nothing on it. A new polymer part might also be formed on any other side of these images, even though they already are superimposed by coloration. For example, if possible, cPRM might be used which bonds to the coloration on these sides of the inventive image in FIG. 70. Some or all of this coloration might be removed so that new cPRM will bond to the polymer beneath it using one or more processes for removing matter from inventive image (such as sanding or sandblasting). Then if desired, the resultant bare or partially bare polymer surfaces of an inventive image can be superimposed with colored cPRM to replicate the coloration that was removed. With or without this coloration, the new polymer part can be added. A third example of a method which may be used to add a new polymer part to non polymeric inventive image surfaces with coloration which does not bond to cPRM is using bonding spots described herein.

Figure 75:
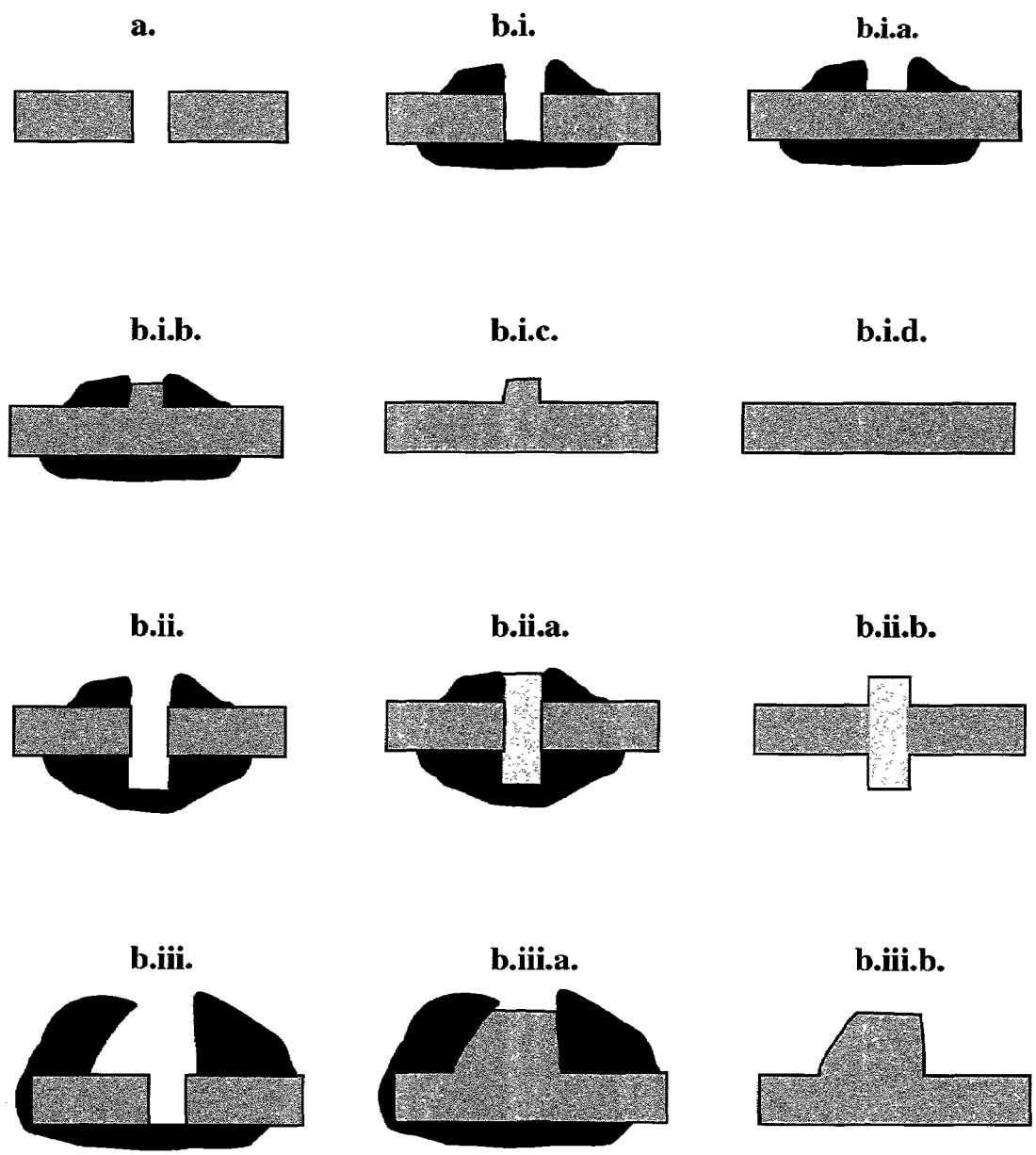
FIG. 75 shows the joining of two separate parts in making an inventive image.

FIG. 75.*a*. shows two parts placed as desired in relation to one another to be joined together in forming an inventive image. One or both of these two parts is polymer of the present invention, they might both be polymer. The cPRM used in between them to join them bonds to both of these two parts as strongly as desired. FIG. 75. shows these two parts joined in three different ways each of which is illustrated in a separate series of stages marked b.i., b.ii. and b.iii. FIG. 75.*b.i.* shows a mold formed on these two inventive image parts (e.g., using temporary clay walls) with its bottom inside surface flush with the bottom sides of the two parts being connected and its upward side left open with side walls built on the two parts to prevent spillage onto their surfaces. The two edges of the two parts being connected are clean so that they will bond to the cPRM well. FIGS. 75.*b.i.a.* and *b.i.b.* show two different heights to which the cPRM poured into the mold of FIG. 75.*b.i.* might be poured, each of which yields a different form on the resultant inventive image, as shown in the flush continuous joint formed between the two parts in the resultant inventive image in FIG. 75.*b.i.d.,* and the discontinuous, raised joint formed between the two parts in the resultant inventive image in FIG. 75.*b.i.c.* Note that if desired, the raised portion of the joint formed in FIG. 75.*b.i.c.* may be removed (e.g., cut down during its gelation, or sanded down once it is hardened polymer) so that the resultant inventive image is that in FIG. 75.*b.i.d.* Alternately, if desired more cPRM can be added to the inventive image in FIG. 75.*b.i.d.* to make it into the inventive image in FIG. 75.*b.i.c.* The inventive image formed may be finished, but if it is not it may be further processed as desired.

Alternately the two parts in FIG. 75.*a.* might be joined using the mold in FIG. 75.*b.ii.* which is designed so that rather than simply joining these two parts, it joins them by forming a third part (shown in light gray) in between the two parts, which greatly affects the form of the resultant inventive image. FIG. 75.*b.ii.a.* shows cPRM poured into this mold which extends above and below the space in between the two initial parts significantly, forming the inventive image in FIG. 75.*b.ii.b.* This may be the finished image desired, but if it is not it may be further processed as desired. As another alternative, the two parts in FIG. 75.*a.* might be joined using the mold in FIG. 75.*b.iii.* which is designed so that rather than simply joining these two parts, it joins them by forming a third part in between the two parts, which greatly affects the form of the resultant inventive image. FIG. 75.*b.iii.a.* shows cPRM poured into this mold which extends above the space in between the two initial parts significantly and even extends onto the upper surface of one of the initial parts. The resultant inventive image is in FIG. 75.*b.iii.b.* This may be the finished image desired, but if it is not it may be further processed as desired.

Figure 60:
FIG. 60 shows an inventive image with discontinuous layers.

FIG. 60 shows an inventive image made by connecting three rectangular parts (shown in white) with superimposed applications (shown in shades of gray). In FIG. 60.I. these three rectangular parts are superimposed only on one of their sides. These superimposed applications may connect these three separate parts together as desired. This may be the inventive image desired, but if it is not, this image can be further processed. For example, this inventive image can be superimposed by additional applications on its other sides (shown in gray in FIG. 60.II.), embedding its three rectangular parts. The three rectangular parts are encased, thus mechanically bonded within this inventive image. The inventive image in FIG. 60 might for example, be polymer, or it might be polymeric and non polymeric. As an example, the three rectangular inventive image parts (shown in white), might be polymer, e.g., transparent colorless polymer with or without a surface preparation stabilizer such as a Clarifying Imprimatura on them. These three polymer parts might be superimposed by see through applications of a conventional paint (shown in shades of gray), which bond to them, connecting them, e.g., broken color or impasto applications. Alternately these applications superimposed on the polymer parts might be collaged paper, photographs, and paint; pieces of wood, clay, metal or glass; or a combination of these, attached by a bonding substance. As a different example, the three rectangular parts of this inventive image (shown in white) might be non polymeric, such as pieces of wood, glass, metal, clay, paper, conventional drawings, applications of paint, or a combination of these. These three rectangular parts might be superimposed by see-through colored cPRM (shown in shades of gray) which bonds to them, connecting them together.

The form in FIG. 67.*g.ii.* has two parts which may be one inventive image made of two parts, or two separate inventive images. These two parts are connected together in FIG. 67.*giii.* by a new third part which might be an image support (e.g., stabilizer), or which might be polymer formed around and/or on these two parts. The result is a single larger inventive image. The inventive image in FIG. 18*b.* might be made by connecting a number of triangular or pyramid shaped parts to one another and/or to a common image support. FIGS. 65 and 66 show inventive images formed of multiple connected parts which are connected, disconnected, and then reconnected in different Compositional Arrangements as these images are developed. The inventive images in FIG. 36 are both made of two large parts (marked a. and c. in both images) which are joined by multiple intermediary parts inlaid in both of them (marked b. in both images). In each of these images, the two parts a. and c. comprise a single image support (e.g., stabilizer). Both of the images in FIG. 36 may have one or more non polymeric parts.

Figure 13:
FIG. 13 shows a two part image support connected by a superimposition.

FIG. 13 shows an inventive image which might be made by superimposing polymer over an image support (e.g., stabilizer) made of two parts which have negative space in between them. The layer shown in pale gray might be polymer. Beneath it, the two parts of the image support (shown in white outlined with black lines) may or may not be polymer (e.g., they might be wood, glass, paper, plaster, fabric, etc. as desired). On the top of this inventive image, (shown in dark grey) might be broken color strokes of paint. The inventive image in FIG. 13. might have been made in a number of ways. For example, it might have been formed: i). by filling in the negative space between the two parts of the image support using a temporary mold wall and applying cPRM into it, ii). by attaching the two part image support to a preformed piece of polymer or other material using a bonding substance, iii). by attaching the two part image support to gelled layer of cPRM, etc.

Figure 76:
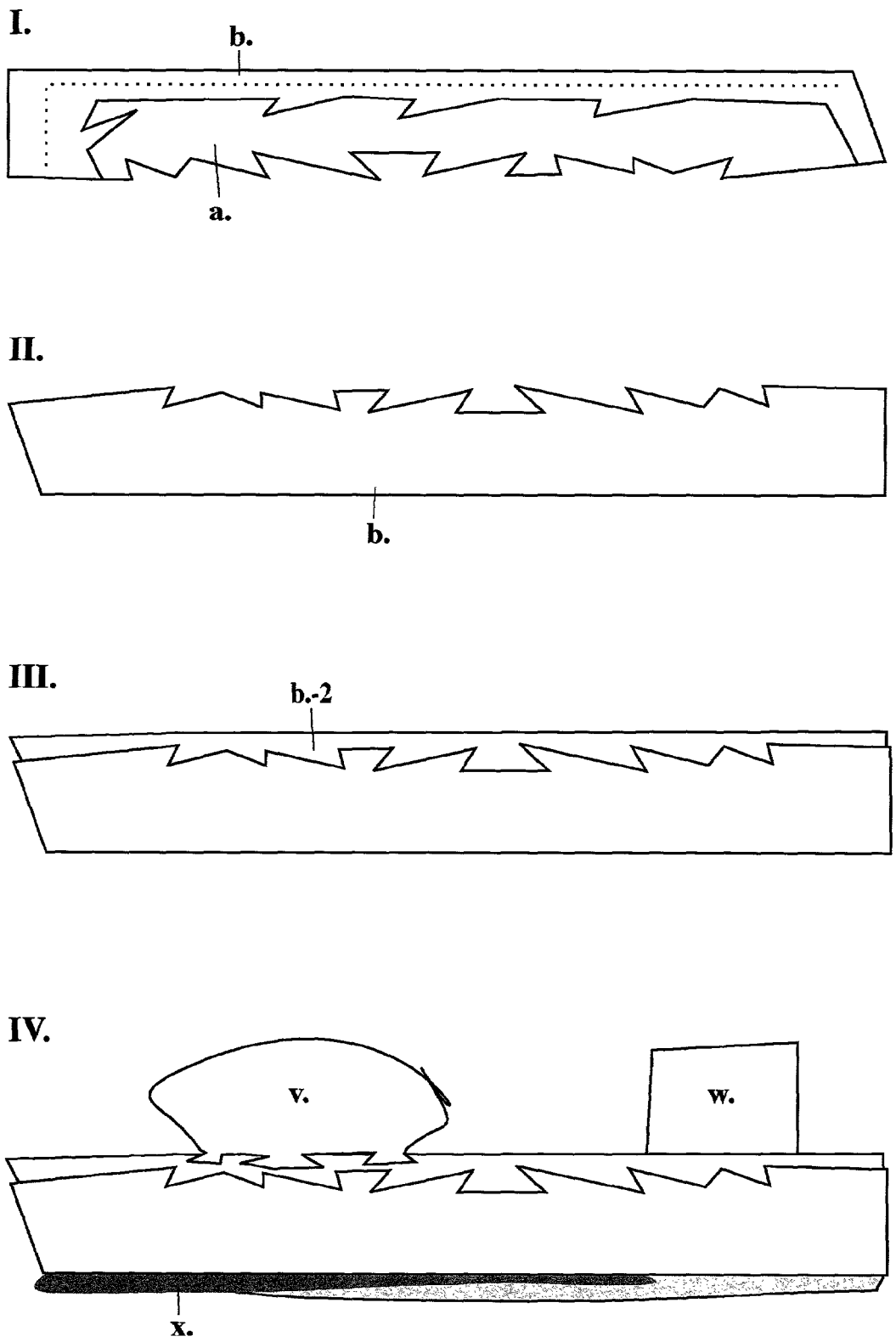
FIG. 76 shows an inventive image's development, e.g., two parts are added to it.

FIGS. 15*a.*-*c.* show either one or two inventive images made of multiple similar parts bonded to one another in a row using a bonding substance. FIG. 15*b.* shows the image of FIG. 15*a.* used as an initial image support (e.g., stabilizer) for further processing. This coloration on FIG. 15*b.* might be a conventional paint or ink, colored cPRM, collaged colored paper, or a combination of these. FIG. 15*c.* could either be a different image from that in FIGS. 15*a.* and *b.* (e.g., an image made using multiple parts which are colored before they are bonded to one another, for example, parts made with colored cPRM, parts colored externally, or parts colored internally and externally). Or, the inventive image in FIG. 15*c.* could show an alternate way FIG. 15*a.* could be used as an initial image support (e.g., stabilizer) for further processing. Note that while the coloration of the image in FIG. 15*b.* visually unifies its separate parts, the coloration of the image in 15*c.* emphasizes the separate parts of the image. FIGS. 27, 76 and 79 are other illustrations herein which also show inventive images formed of multiple connected parts.

Because actual bonding spots are often not distinguishable or hard to see within real inventive images, on many of these illustrations, bonding spots are identified with marks which would not be visible in actual inventive images.

Figure 24:
FIG. 24 shows a layered inventive image with bonding spots in a cross section or side view.

FIGS. 24-26 and 27 are cross section or side views of inventive images with layers that generally alternate between polymer layers, and layers which are not made of polymer. In FIG. 24, an inventive image is shown made of four layers. It leftmost layer, colored in gradations, a thinner layer is superimposed upon it (marked c. in the illustration) bonds to the layer on its left side. Upon layer c. are four bonding spots (marked with "|X|" marks) within a layer which is an air pocket (rather than a tangible application, e.g. of paint or cPRM). These bonding spots bond the rightmost layer of this inventive image (marked a.) to its other layers, while also raising layer a. out from the surface of layer c. such that there is an air pocket. It is possible that layer c. could not have bonded to layer a. as well as desired, without the use of these bonding spots as an intermediary. In addition or instead, it is possible that the composition used to make layer a., layer c., or both could not have been shaped into the raised form show in these bonding spots to connect layer a. to layer c. in such as way that they are separated by an air pocket in between them. For example, the leftmost layer of this inventive image might not be made of polymer, layer a. and layer c. might both be made of different polymers which do not bond as well as desired to one another, and these bonding spots might be made of a mixed polymer stabilizer which contains at least one of the monomers contained in both layer a. and layer c. and the catalyst appropriate for polymerizing it or them. Such cPRM bonding spots might have been made in their raised shape using temporary clay walls. Alternately, the leftmost layer of this inventive image might be a polymer imprimatura, upon it layer c. might be an acrylic Clarifying Imprimatura, the bonding spots might be a thick acrylic gel, an acrylic paste, or a stiff glue, that bonds to acrylic and to the material of layer a. which is polymer of the present invention.

FIG. 26 shows the inventive image formed in FIG. 25V. with bonding spots marked with "|X|". These bonding spots are within non polymeric applications (shown in shades of gray in this illustration), their coloration camouflages them. These bonding spots bond this image together by connecting its polymer layers (which are shown in white with black outlines) to one another, and sandwiching the non polymeric applications in between them. Perhaps one or more of these non polymeric applications which have bonding spots, are not able to bond or to bond as well as desired to the adjacent polymer layers, e.g., a conventional paint which does not bond or bond as well as desired to the contiguous polymer. The bonding spot or spots used within such paint applications might be made using appropriately colored cPRM which is the same or which is compatible with the contiguous polymer. Alternately, the bonding spot or spots used within such paint applications might be made using a different appropriately colored conventional paint which bonds as desired with the contiguous polymer.

Figure 31:
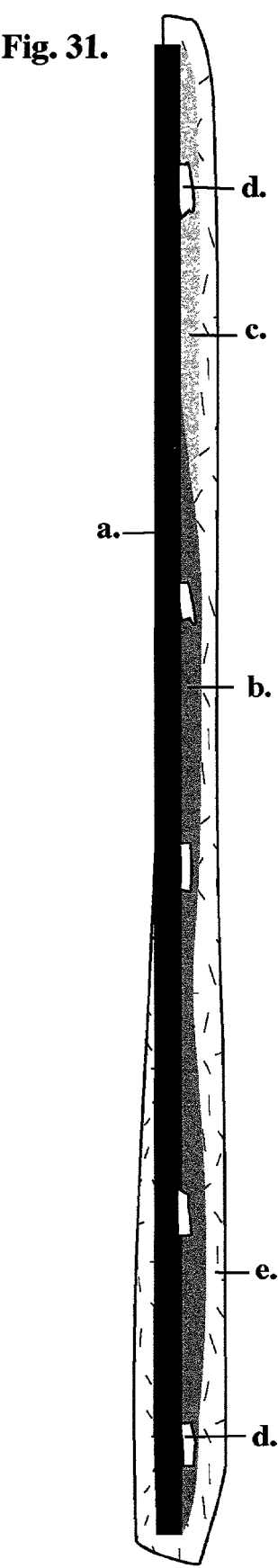
FIG. 31 shows a cross section or side view of a layered inventive image with bonding spots.

FIG. 31 shows an inventive image, which may for example, be an opaque polymer image support, marked a., e.g., a stabilizer. It is superimposed by two non polymeric applications marked b., and c. which do not bond or do not bond well to the polymer a. Thus, bonding spots are used in between these layers (shown in white with heavy black outlines, an examples are marked d.) Though this inventive image might have been complete at this stage, it is further processed with the superimposition of another layer of cPRM with dispersed coloration marked e., on all of its sides.

In cross section or side views, FIG. 85 illustrates reworking a polymer inventive image by adding another part to it using a mold on it that is partially open and partially closed. FIG. 85.I. shows the initial polymer inventive image. FIG. 85.II. shows a mold which is partially open and partially closed built on the initial polymer inventive image, e.g., using oil formulated clay. As this mold is made care is taken to make sure that the part of the initial polymer inventive image which ends up within the interior negative space of this enclosed mold is clean, so that it will bond well to the cPRM which will be put into this mold. This mold is made with three openings marked a., b. and c. on the illustration in FIG. 85.II. The openings b. and c. are principally made to enable the polymerizing cPRM to release air, vapors, gasses, heat, or a combination of these. Polymer formed in these tube-like openings marked b. and c. will be undesirable, it will be cut off of this inventive image when it is gelled or once it is hardened. FIG. 85.III. shows this mold filled with cPRM that has the same color and optical properties as the initial polymer inventive image, thus there is no visible seam between the initial polymer and the newly added part. While the opening labeled a. is principally used to pour the cPRM into this mold, the openings labeled b. and c. may also be used for pouring into this mold. Also, if desired, this mold might be tilted as cPRM is put into it, e.g., to make sure trapped air escapes as desired. Once this cPRM has gelled firmly enough so that it will maintain its form as desired without the upper portion of its mold, the upper portion of its mold is removed from it. As this portion of the mold is removed, the gelled cPRM extensions formed in the protruding openings of this mold labeled b. and c. are cut off. The resulting inventive image is in FIG. 85.IV. FIG. 85.V. shows this inventive image with the rest of its mold removed.

Figure 86:
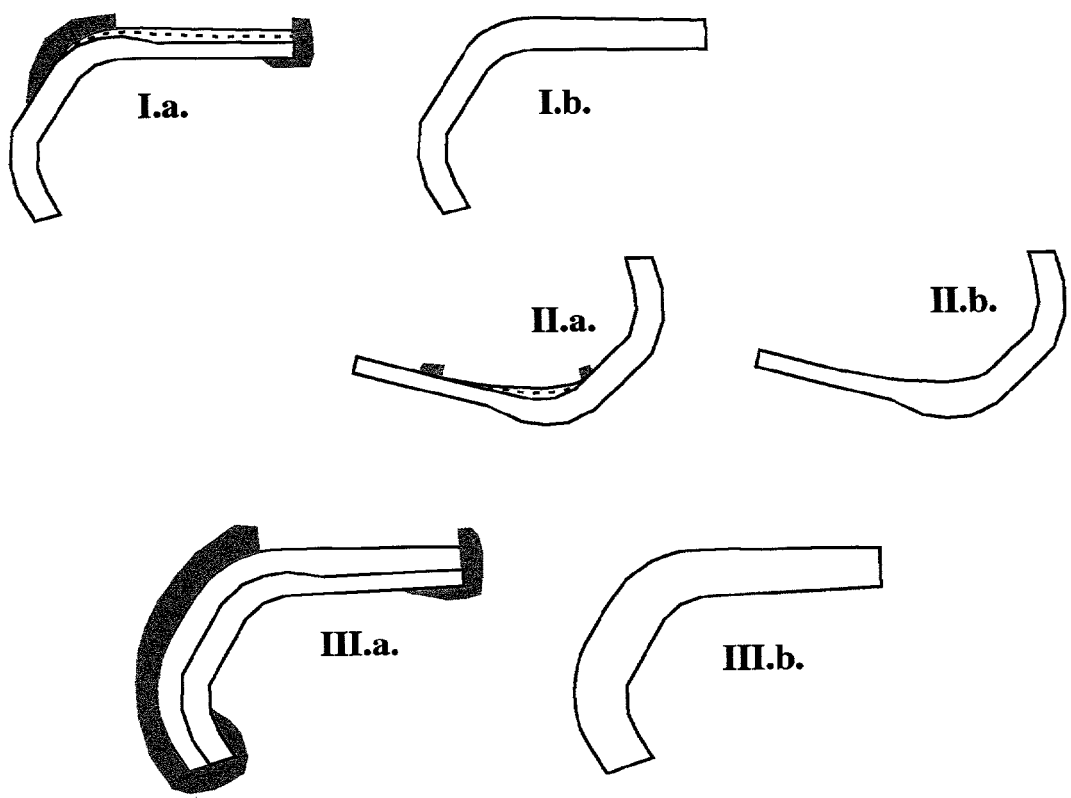
FIG. 86 shows the reinforcement of the joint of the inventive image in FIG. 85.

FIG. 86 shows three different ways of reinforcing the inventive image in FIG. 85.V. with cPRM and fiber (e.g., as a stabilizer) either on one of its sides as in FIG. 86.I.a., or on its reverse side as in FIG. 86.II.a. FIG. 86.I.a. shows dark gray temporary mold walls built on the inventive image of FIG. 85.V. forming an interior mold space across one of its surfaces which includes the joint between its two constituent parts as well as surface area extending beyond this joint. The negative space within this temporary mold on this inventive image is largely open, only a small segment is closed. Though vent holes are not illustrated, they might be made on the closed portion of this mold to release air, gasses, etc. as the mold is filled (e.g., like the vent holes in FIGS. 85.II. and III. previously described). This inventive image is reinforced by a thin layer of cPRM applied in the negative space of its mold, which may fill up its closed portion, but before this cPRM gels, a layer of fiber (represented by a dotted line in FIG. 86.I.a.) is laid into and onto it. If there are undesirable air bubbles (e.g., in the fiber), these are released as desired, e.g., by a hand tool. Then, cPRM is applied over this fiber embedding it. The resultant inventive image might look like FIG. 86.I.b., provided the cPRM is aesthetically the same as that used to make the initial inventive image and provided the fiber embedded is capable of becoming invisible within the cPRM. Alternately, the inventive image of FIG. 85.V. might be reinforced on its reverse side, as in FIG. 86.II.a., e.g., using a similar procedure with a completely open temporary mold. Provided the cPRM used is aesthetically the same as that used to make the initial inventive image and provided the fiber is capable of becoming invisible within the cPRM, the resultant inventive image could look like that in FIG. 86.II.b. As an alternative way of reinforcing the inventive image of FIG. 85.V. which is not illustrated, both of its sides might be reinforced, e.g., reinforcement might be added as shown in both FIGS. 86.I.a. and 86.II.a.

Yet another way of reinforcing the inventive image of FIG. 85.V. is in FIG. 86.III.a. using a temporary mold which is partially open and partially closed is built on the inventive image of FIG. 85.V. so that a new layer of polymer can be formed entirely over one of its sides. Though vent holes are not shown on this mold on this inventive image in is illustration, vent holes may be desired on its closed portion to release air, heat, gasses, etc. as this mold is filled (e.g., like the vent holes in FIGS. 85.II. and III. previously described). However, because this illustration shows the mold on this inventive image after it has been completely filled with cPRM, vent holes which might have functioned (e.g., to release air, heat, gasses, etc.) as this mold was filled, might have been used and then sealed, and/or cut off. The new layer of polymer formed on the inventive image in FIG. 86.III.a. may contain one or more layers of fiber though no fiber is indicated in this illustration. For example, a fiber stabilizer layer might be at the bottom of this new layer of polymer, between the surface of the initial polymer image and its new layer of polymer. Or for example, a fiber stabilizer layer might be within the spatial depth of this new layer of polymer on this inventive image, e.g., medial. If undesirable air bubbles form during the reinforcement of this inventive image, they should preferably be removed. Though the new layer of polymer formed on this inventive image might increase its thickness consistently or inconsistently, this new layer of polymer might have increased the image's thickness as much or as little as desired (e.g., this new layer of polymer may be made with one or multiple thin or thick layers of cPRM). The illustration in FIG. 86.III.a. shows that the thickness of this inventive image is more or less doubled by its new layer of polymer. Provided the new layer of polymer is aesthetically the same as the polymer used to make the initial inventive image and provided any fiber used in this inventive image is capable of becoming invisible within it, the resultant inventive image could look like that in FIG. 86.III.b. If desired, the reverse side of the inventive image in FIG. 86.III.b. might also be reinforced, e.g., as in FIG. 86.III.a. or II.a.

In an illustration, as the surface irregularities of an inventive image which are at least partially transparent or translucent are filled in by the bonding substance or substances, the image's color will change, it will become clearer, it will become more transparent and/or translucent, its other surface light effects will change, or a combination of these effects will occur. The more completely filled in and smoothed over the inventive image's surface irregularities become, the closer it will come to reaching its maximum clarity, its maximum transparency and/or translucency, the maximum of its other light effects (e.g., its maximum glossiness) or a combination of these. For example, if the bonding substance and the inventive image it is applied upon, have the same refractive index and the same coloration, completely filling in and smoothing over this image's surface irregularities with the bonding substance can bring this image to the color, the clarity, and the degree of transparency and/or translucency that it would have if it never had any surface irregularities. Once all of the surface irregularities on a transparent inventive image are completely filled and smoothed over using a transparent bonding substance, some inventive image surfaces, some parts of inventive images and some entire inventive image, will become totally clear and totally transparent. But once all of the surface irregularities on other, transparent and/or translucent inventive images are completely filled and smoothed over using transparent bonding substances, their clarity and translucency will increase, but invasive internal changes may be necessary to make them more translucent and/or transparent and such changes may or may not be desirable. As this example shows, some polymer and non polymeric inventive image parts can not be made as clear, or as transparent and/or translucent as desired, and some inventive image can not be made completely clear or completely transparent and/or translucent, for a wide variety of reasons, which might involve the internal composition of specific images and the composition of the specific bonding substances used. (For example, some monomers used to form a polymer are not completely transparent, fiber in polymer can lessen its transparency and/or translucency, some non polymeric materials are not completely transparent and can not be made completely transparent, and some problems in polymerization can cause permanent color changes in polymer, e.g., using some cPRM, as described herein.).

In the following illustration two separate parts are connected using a Clarifying Imprimatura to form one inventive image. The areas of contact on an old smooth transparent colorless polymer surface and on the smooth transparent colorless surface of a small piece of glass are both abraded by sanding. Though the surface irregularities on the polymer and the glass are shallow, both surfaces are translucent and matte. A thick application of transparent yellow cPRM is applied on the abraded polymer surface completely filling in its SSI so that they are no longer visible (e.g., this bonding substance is a cPRM in which a yellow dye has been homogeneously dissolved). This cPRM is the same cPRM as that was used to make this polymer, though the polymer was made long ago. The transparency of the piece of polymer has increased substantially after the cPRM filled in and smoothed out its SSI. The polymer's clarity and its glossiness both of which were reduced when this polymer was sanded, appear restored. A thick application of the same cPRM which is colored with a transparent blue, is applied on the abraded glass surface bonding to and completely filling in its SSI so that they are no longer visible (e.g., this bonding substance is a cPRM in which a blue dye has been homogeneously dissolved). Though the application of this same cPRM (with different coloration) was not a Clarifying Imprimatura on the polymer inventive image surface, it use is a Clarifying Imprimatura on this glass inventive image surface. After the Clarifying Inprimatura filled in and smoothed out its SSI, the transparency, the clarity and the glossiness of this glass surface increased substantially. Both cPRM applications are allowed to gel. Once they are firmly gelled but still wet, they are placed in contact with one another, pressed together a little and allowed to harden in this position. The resulting transparent inventive image has colorless polymer and glass parts, and three colors. It has yellow visible through its transparent colorless polymer side, green visible sandwiched in its center where the two cPRMs mixed, and blue visible through its transparent colorless glass part. The entire colored central layer of the resultant inventive image can be considered a Clarifying Imprimatura, because the yellow cPRM (which was not a Clarifying Imprimatura) was added as another layer onto the blue Clarifying Imprimatura while it was wet. In this illustration, the use of a bonding substance on SSI brought a desired color and aesthetic into this inventive image, as well as a desired connection between two parts. The surface irregularities were all SSI made on both of these parts of the image exclusively for the purposes of bonding, their aesthetic effects were temporary and controllable. As the bonding substance filled in and smoothed out the SSI on each of these two parts, they were clarified, and their transparency increased, and their color darkened. None of the surface irregularities formed in the process of connecting these two parts are visible to viewers of the resultant inventive image. In an alternate version of this illustration, the cPRM bonding substance Clarifying Imprimatura is made of active ingredients which are different from those used to make the polymer part of this inventive image. Thus, the application of this cPRM on the polymer part of this inventive image is a surface preparation stabilizer.

FIG. 76.I. shows fiber embedded within a bonding substance used on inventive image's surface irregularities. In this illustration, the bonding substance is identified as b. and the fiber layer within it is rendered as a dotted line. The use of fiber within this bonding substance is optional. This application of b. with its optional embedded fiber is made on the surface irregularities of the inventive image identified as a. Once this application is completed, the same image is shown in FIG. 76.II., turned over. Then, in FIG. 76.III., the surface irregularities remaining on this inventive image are filled in and smoothed out by another application marked b.-2. which may be the same as the previous application b. or which may be made of a different composition. The inventive image part a., the applications b. and b.-2. made upon it, and the other parts v. and w. added to this image in later stages of its formation may be made of any composition desired, provided at least one of them is polymer. For example, this inventive image a. in this FIG. 76., might be polymer and/or non polymeric (e.g., glass, wood, metal, a conventional drawing on paper, a conventional painting on canvas, a collage, etc.). The bonding substances b. and b.-2. used on this inventive image a. might, for example, be Clarifying Imprimatura, they might be the same composition as the inventive image a., they might be a substance applied on an opaque inventive image a. and made of a composition that is either the same or different from a., or a combination of these. For example, if b. is transparent or translucent, FIG. 76.II. shows that the layer of fiber embedded in it either becomes invisible, or its visibility is so slight that it is not seen or is not noticed, though it may decrease the transparency of this inventive image slightly due to its close proximity to its external surface. No fiber is added to the application b.-2. made in FIG. 76.III., but while b.-2. is still wet, two new parts are attached to it which are marked v. and w. in FIG. 76.IV. One or both of these two new parts may be polymer and/or non polymeric. The new part v. is stuck into b.-2. It has surface irregularities on its bottom surface, but because it protrudes outward so much from this inventive image, it may not rely only on the mechanical bond of its surface irregularities to bond it to b.-2. The new inventive image part w. is attached to the surface of b.-2., bonding to it without surface irregularities once b.-2. is firm enough so that w. does not sink into it. FIG. 76.IV. also shows a new application marked x. (shown in shades of gray on this image's underside) added on application b. FIG. 76.V. shows how this inventive image might look if its connection seams are not visible or not noticeable. FIG. 76.VI. shows the optional installation of three separate fiber pieces (shown as dotted lines marked y.) across the joints connecting the new inventive image parts v. and w. to this image. This fiber might for example, be placed on a thin layer of a bonding substance which is applied (e.g., painted) on these areas of this image. Thus these fiber pieces might be tacked or attached onto the image in the desired places, then superimposed and embedded by more of the same bonding substance used to tack or attach them to the inventive image. FIG. 76.VII. shows how this inventive image might look if none of its internal connection seams are visible or noticeable, e.g., if a., b., b.-2., v., w., y (the fiber) and the bonding substance used with y. are all the same color and all have the same refractive index, or the differences in these features are not noticeable. This might be the inventive image desired, but if it is not, this inventive image might be further processed, as desired.

Unlike many other conventional practices, all polymer have real, spatial depth that can easily be used as desired, e.g., for its aesthetic, structural and other purposes. Unlike many other conventional practices, the real spatial depth of polymer in inventive images can be used, altered, downplayed, ignored, or even negated, as desired, throughout the creation of the polymer and afterwards, and throughout the creation of the inventive image and afterwards (unless it is obstructed by non polymeric ingredients in an inventive image). This can affect other formal elements in inventive images as desired, e.g., light, color, structure, subject matter, content and meaning. The real spatial depth of polymer, gives inventive images a new form of light, transparency and/or translucency, or a combination of these, as desired. These can also affect other formal elements, e.g., light.

FIGS. 10-12; 25-27, and 56-62 show cross section or side views of inventive images made of multiple layers which can be interpreted to alternate between one or two layers completely or principally made of polymer, and one or more layers that are completely or principally non polymeric. All of the inventive images in these illustrations can be interpreted as having one or more Separating Layer (e.g., stabilizer), which may serve one or more functions, such as: a). to separate incompatible applications, e.g. so that acrylic can be permanently painted over oil paint; b). to separate applications which would be less strong and/or less permanent than desired directly superimposed, e.g., lean applications might be separated from fat applications beneath them; c). to increase the spatial depth, e.g., increase transparent or translucent spatial depth, or enable unlimited layering in permanent inventive images; d). to bring light into the image (e.g., using methods and means described herein); e). to seal, coat or fix applications, e.g., charcoal, pastel, graphite, and watercolor applications which may be undesirably altered by a further superimposition without such a protective or coating layer; f). to build up the form of an image; g). for other aesthetic purposes, e.g., they might provide a preferable surface for a subsequent application be made on more successfully than this application could be made without a Separating Layer; h). for other structural purposes, e.g., to make a flexible inventive image or even a conventional image (such as a painting on paper) rigid; i). to make other formal elements of art in an inventive image as desired, e.g., they might be used to enhance an inventive image's color, function, subject matter, etc.; j). for a combination of these purposes; k). for no particular purpose at all.

In each of the inventive images in FIGS. 10-12, 25-27, and 56-61, there is at least one layer and often multiple layers shown in white with a black outline. In at least one interpretation of each of these inventive images, these white layers are polymer. Specifications for the actual coloration of the layers of the inventive images illustrated in FIGS. 10-12, 25-27, and 56-61, are unlimited, e.g., they may be consistently or inconsistently colored and/or colorless, they may be transparent, opaque, translucent, or a combination of these, etc. If however one or more layers in these inventive images are transparent and/or translucent, light will pass through their spatial depth into the inventive image.

In FIGS. 10-12, 25-27, and 56-62, applications which are non polymeric might, for example, be made of one or more of a broad range of ingredients, e.g. collage, photography, painting, drawing, printing, writing, inlaying, attachments, all additive conventional image making practices, all new additive image making practices described herein, or a combination of these. Note that the polymer and the other applications in these inventive images may also be carved, incised, engraved, or altered by other subtractive processes. In addition, any of these inventive images can be further processed as desired. For example, one or more of their layers can be completely or partially removed, one or more layers can be added to these inventive images, or both. Though the majority of these examples are generally layered fairly straight (e.g., they are examples of layering built up on planar surfaces), these layering combinations as well as others could also be made on surfaces of inventive images which are curved, 3D or both and they can also be made with layers that are more uneven and/or more inconsistent.

FIG. 10. shows an inventive image which might have four polymer layers, marked a., b., c., and d., shown in white with black outlines which alternate with five non polymeric applications shown in shades of gray and black. The layer marked e. may be a sliver or piece of polymer, in between non polymeric layers. Notice that the four full layers of polymer encase or embed the three non polymeric layers in between them. One or more of these four full polymer layers may be Separating Layer Stabilizers. For example, in this inventive image, the layers a., b., c., and/or d. might be transparent colorless Separating Layer Stabilizers separating layers such as layers of painting. These layers of oil paint might be arranged such that one or more fat layers are superimposed over lean layers; one or more lean layers are superimposed over fat layers; some or all the superimposed oil paint layers in this sequence have the same or generally the same fat content, or a combination of these. Alternately, the image maker might be unsure of the fat content of one or more of these oil paint layers. As another alternate example, in this inventive image, the layers a., b., c., and d. might be transparent, colorless, non polymeric Separating Layers which can not otherwise be layered directly upon one another as successfully, as permanently or both, e.g., due to layers of pastel, charcoal, incompatible applications, applications which will undesirably alter another layer beneath them, etc. By their transparency, these Separating Layer Stabilizers might give the inventive image a desired sense of deep spatial depth, light, luminosity or a combination of these.

As a further illustration, this inventive image might have begun by applying paint (shown in gray) according to conventional painting practices on both sides of the colorless transparent polymer initial image support. Then the paint on the right side of polymer layer d., is superimposed by new colorless transparent cPRM forming layer c. The layer of paint under polymer layer c. might bond to it and/or layer c. might bond to the exposed parts of layer d. on the upper and lower sides of this illustration. Then layer c. is superimposed by more paint (shown in grays) within which a sliver of cPRM or polymer is embedded (shown in white) marked e. While this new paint application might have been directly superimposed over the earlier paint application without the Separating Layer Stabilizer c. in between them, layer c. brings spatial depth and light to this inventive image and may benefit it in other ways too, e.g., making it more permanent. (For instance, if both of these two paint layers were oil paint, their direct superimposition might cause impermanence, e.g., discoloration, cracking, etc.) This second paint layer of this inventive image is superimposed by another full layer of colorless transparent cPRM marked layer b. Layer b. might bond to the paint layer beneath it, and/or layer b. might bond to the exposed parts of the polymer layer c. on the edges of this inventive image. Layer b. is superimposed by a layer made of a painted photographic transparency (shown in gray), layer b. is a Separating Layer Stabilizer. The layer of the painted photographic transparency is then superimposed by another layer of transparent colorless cPRM marked layer a. Layer a. might bond to the previous non polymeric layer and/or layer a. might bond to the exposed parts of the earlier polymer layer b. on the edges of this inventive image. Layer a. is superimposed by pastel, graphite and transparent painting, it is a Separating Layer Stabilizer. When the resultant inventive image is viewed through its last layer, a photographic transparency is visible through painting, drawing and real spatial depth, and this photograph has further spatial depth, form, luminosity, coloration and other effects from the applications visible beneath it. When viewing this inventive image through its opposite side, it has effects of luminosity, color, deep space, and form created with more real spatial depth than might be possible in permanent conventional painting. In this illustration, any of the Separating Layer Stabilizers might have a surface preparation stabilizer on them.

In a second further illustration, this inventive image is made by painting on the right side of the polymer layer d. with oil paints, and by applying watercolors and pastels on the left side of polymer layer d. Layer d. is again a polymer initial image support which may or may not be a stabilizer. As in the previous illustration, the transparent colorless Separating Layer Stabilizer c. is formed and it is superimposed by non polymeric applications, e.g., impasto acrylic painting. Over this layer, the transparent colorless Separating Layer Stabilizer b. is formed, and it is superimposed by non polymeric applications, e.g., conventional oil painting. Repeating the pattern, the transparent colorless Separating Layer Stabilizer a. is superimposed, then it is overlaid by watercolor painting forming this inventive image's right external layer. Within this inventive image, oil paints are layered both under and over acrylic paints, watercolors are layered both under and over oil paints, and the quantity of layers permanently superimposed is greater than is possible in most conventional practices, e.g., in oils or in watercolors. When viewing this inventive image from the vantage of either the side shown as its right or the side shown as its left, watercolors are seen over oil painting and acrylic painting, with real spatial depth and real internal light which is not available in either conventional watercolors or conventional oils.

As interpretation 1. of the inventive image in FIG. 11, it has Separating Layers marked b., d. and f. of varying thicknesses and coloration. For instance, the Separating Layers b. and f. might be made of polymer as stabilizers and the middle Separating Layer d. might be made of glass with marks on it (e.g., etched, colored blown glass, color fused on glass, color painted on glass, etc.). Or for example, the Separating Layers b., d. and f. might all be made of polymer as stabilizers. These three Separating Layers add considerable spatial depth to this inventive image, thus if they are see through they might give this inventive image significant light also, e.g., unless the layers over and under them block the light from reaching them. As interpretation 2. of FIG. 11, this inventive image has two Separating Layers marked c. and e. For instance, layers c. and e. might be Separating Layer Stabilizers separating three layers b., d. and f. which are made of pieces of glass, wood, paper, fabric or a combination of these, which all have pastel, pencil or charcoal drawing upon them. For example, layers b., d. and f. might be reverse paintings on glass, conventional paintings, cast paper forms, conventional sculptures, found objects, painted inventive image parts, printing plates, carved blocks, or a combination of these separated and connected by Separating Layer Stabilizers c. and e. and coated by external layers of polymer. As interpretation 3. of FIG. 11, this inventive image is made using an image support or an initial image support. For example, this may be a non polymeric image support, or an image support stabilizer, comprised of layers b., d. and f., comprised of layers f. and d., or comprised of layers f. and b. Or, for example, this polymer and/or non polymeric image support is made of layers c. and e. As interpretation 4. of FIG. 11, this inventive image may have one or more surface preparation stabilizers. For example, layer c. and/or e. may be surface preparation stabilizers. Alternately layers b., d. and/or f. may be surface preparation stabilizers. Or, either layers f. and c.; or layers b. and e. may be surface preparation stabilizers. As interpretation 5. of FIG. 11, all of the layers in this image may be made with polymer.

The inventive image in FIG. 12 has five Separating Layer Stabilizers shown as thin white layers with black outlines, in between six non polymeric layers, each of which has multiple applications colored gray and black. Non polymeric layers are on two of the external sides of this inventive image, its right and left sides. Because the five Separating Layer Stabilizers within this inventive image connect to one another at its top and bottom sides, they encase or embed the four non polymeric layers in between them. One or more of these Separating Layer Stabilizers might for example, separate layers of conventional practices which would otherwise be less permanent and/or less strong. They might separate layers of oil painting applied lean over fat, or applied fat over lean, e.g., so that layers of oil paint will not build up thickly enough to jeopardize their permanence. They might separate layers of oil painting which are of the same or generally the same fat content. One or more of these Separating Layer Stabilizers may separate different media, different kinds of applications, or both, e.g., pastel from paint, impasto oil paint from watercolors, glazes from impasto, encaustic from gouache, collage from paint, charcoal from paint, encaustic from egg tempera, etc. Or, these Separating Layer Stabilizers might serve a combination of these functions. This inventive image's spatial depth is primarily formed by its non polymeric applications, not by its five thin Separating Layer Stabilizers, though they can affect its aesthetic. As an alternate interpretation FIG. 12, all of this image's layers may be polymer or contain polymer.

Figure 56:
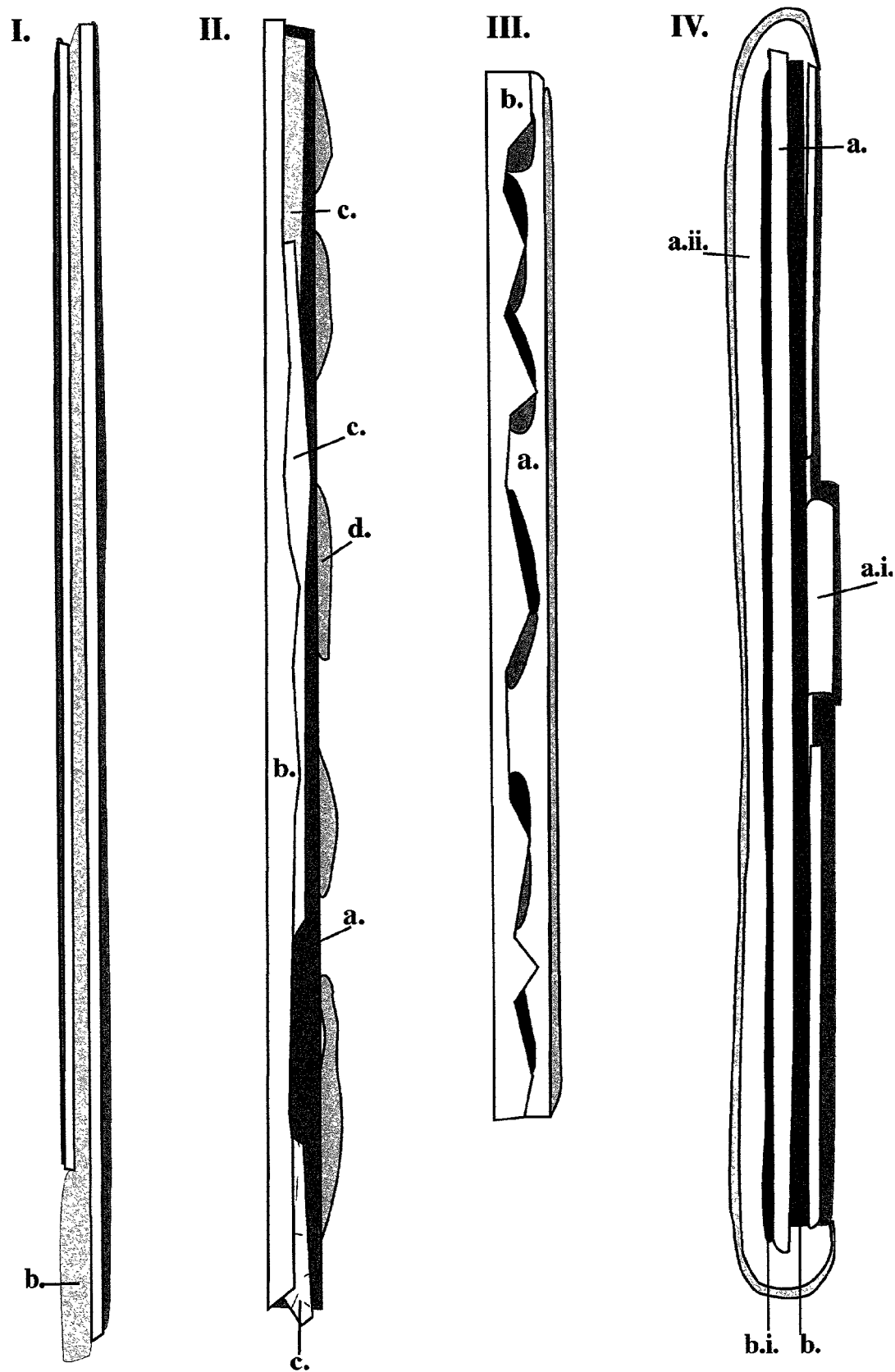
FIG. 56 shows variations in layering inventive images in cross section or side views.
Figure 56:
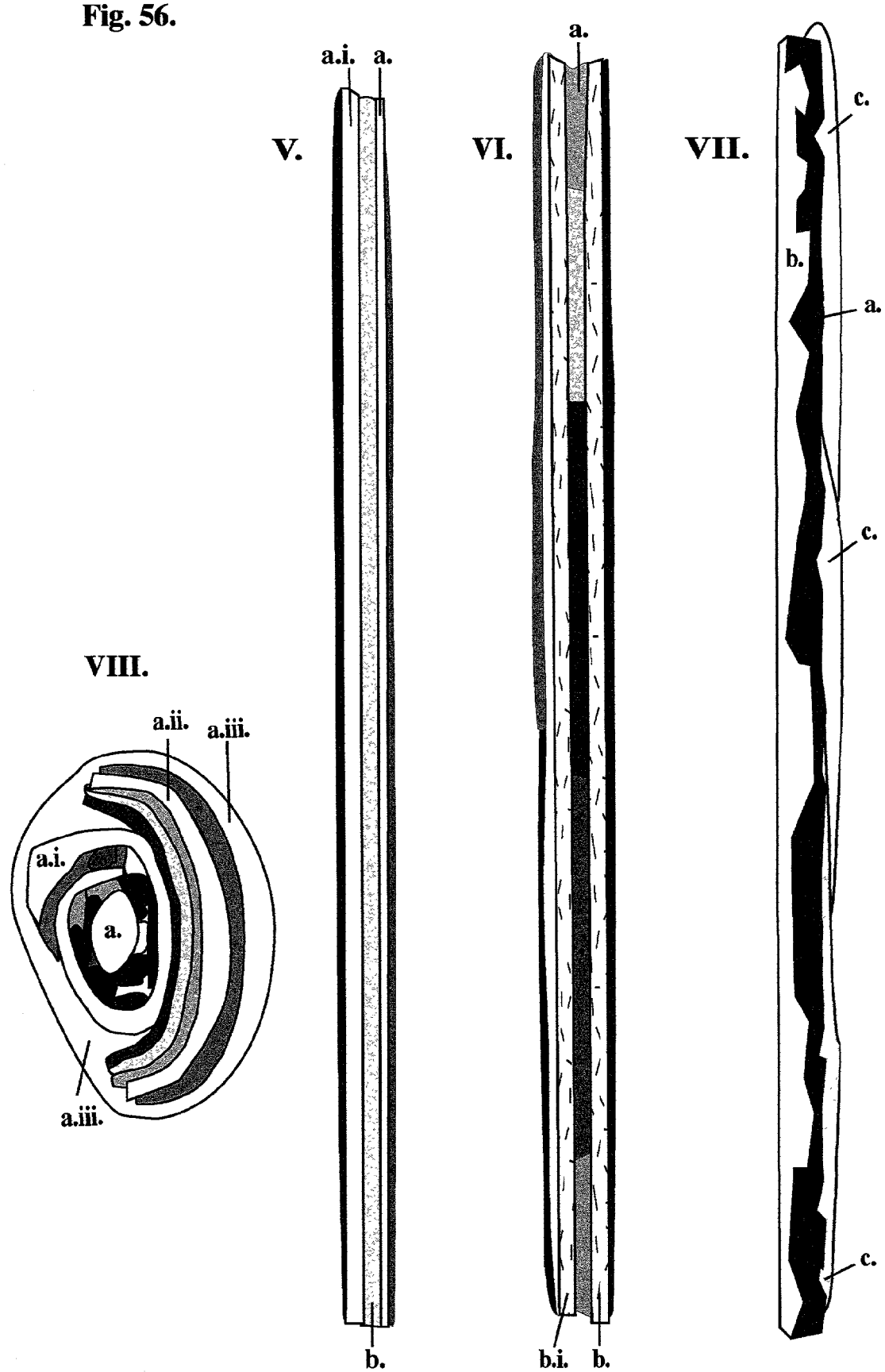
Figure 56:
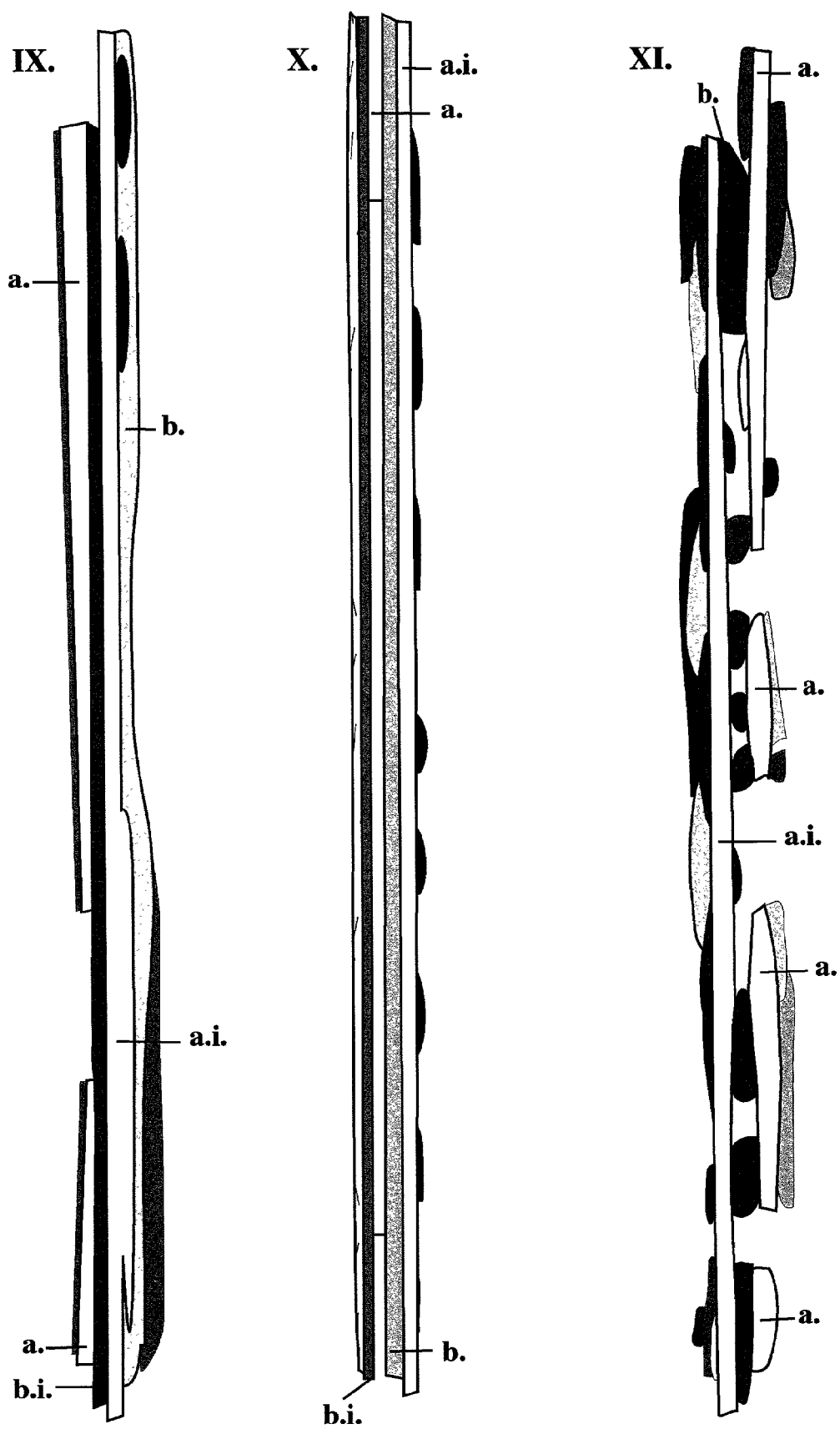
Figure 56:
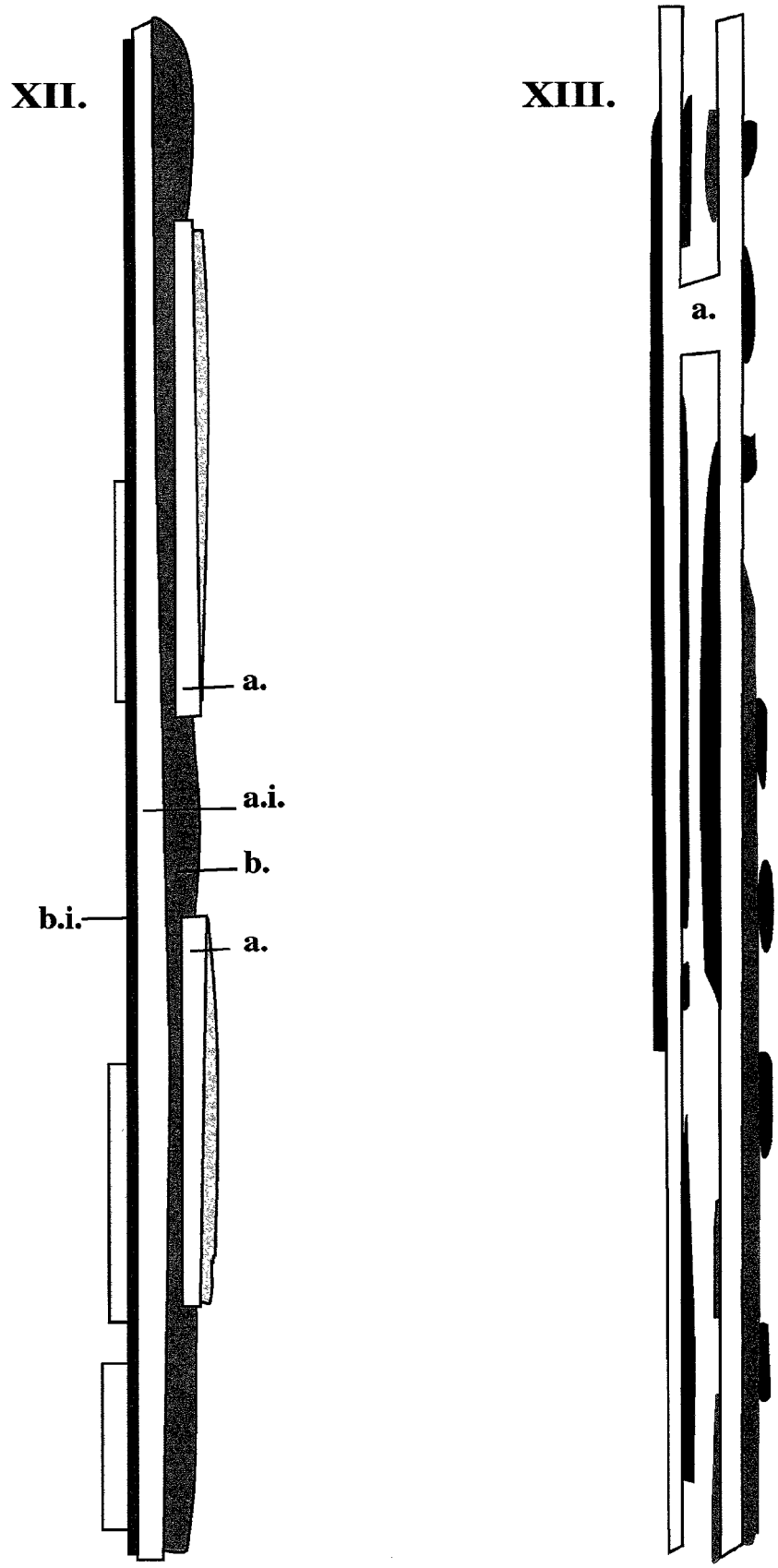

FIG. 56.I. shows an inventive image which might have layer b. as a Separating Layer, or it might have one or both of the layers shown in white as Separating Layers. Layer b. might not contact the leftmost layer of this image which appears darkly colored in the illustration. As a specific example, layer b. in this inventive image might be a conventional image, the two layers shown in white might be polymer, and the two external, right and left layers of this inventive image might be conventional paints such as oil paints.

In the inventive image in FIG. 56.I., the layer a. might for example, be a Separating Layer between the layers b. and c. to the left, and layer d. to the right. For instance, layers b. and c. might be polymer, the Separating Layer a. might be an acrylic paint which also functions as a surface preparation stabilizer, and layer d. might be oil paint. Or, for example, layer b. might be carved wood or stone; and layers d. and c. might be conventional applications (e.g., oil paints, photographs, collage, etc.), separated by Separating Layer Stabilizer a. in between them.

FIG. 56.III. shows an inventive image in which layer a. may function as a Separating Layer. For example, layer b. might be carved or cast polymer, the angles of which are emphasized by the applications of color shown in gray (e.g., a special effect) which are of a different composition than the polymer layer b., e.g., this color is a cPRM paint or a conventional paint (such as impasto and/or iridescent oil paint) which may or may not bond to its polymer support. These colored applications are superimposed and embedded by Separating Layer a. which might be comprised of either the same cPRM as layer b. or a cPRM which bonds to layer b. Because layer a. bonds to exposed bonding spots, layer a. and/or b. may or may not bond or bond well to the coloration in between them. Layer a. is then superimposed by a different application, e.g., watercolor paint. Then, viewing this inventive image through the side shown as its right side, might for example, be viewing iridescent oil colors angled at different real spatial depths beneath conventional watercolor washes in an inventive image with significant luminosity.

FIG. 56.IV. shows an inventive image in which layers a., a.i., and a.ii. might all be Separating Layer Stabilizers between other conventional media and materials. Alternately, in this inventive image, layers b. and b.i. might be Separating Layers in between layers of different compositions.

In inventive image in FIG. 56.V. the layer a., layer a.i. or both might be Separating Layers. Or, a., b. and a.i. might comprise a single Separating Layer or a single image support (e.g., stabilizer). For example, layer b. might be a new unique imprimatura made of colored polymer covered on two sides by a surface preparation stabilizer marked layers a. and a.i. which enables further superimpositions to bond. Alternately, if a., b. and a.i. are subdivisions of a single layer, a. and a.i. might be made by embedding a form in polymer with the polymer segment marked b. in between them. For instance, a. and a.i. might be photographic transparencies, conventional drawings on paper, paper casts, metal casts, cut-outs, conventional paintings, or a combination of these completely encased, which both serve as Separating Layer Stabilizers separating the two non polymer external layers on the right and left sides of this inventive image, from one another, e.g., separating a layer of encaustic from a layer of gold leaf. As another illustration, layer b. might be a fresco or a mosaic, layers a. and a.i. might both be Separating Layer Stabilizers and the two external right and left layers of this inventive image might be conventional paints, such as oil paints. As an alternate interpretation of this inventive image, layers a. and a.i. might be Separating Layer Stabilizers, glass or both, separating the layers of conventional paint, which are layer b. and this image's two outer layers.

FIG. 56.VI. shows an inventive image with a continuous multicolored layer marked a. which might be an image support (e.g., stabilizer), a Separating Layer Stabilizer or a Separating Layer of a conventional paint, e.g., acrylic paint. Or, layer b. and/or b.i. could be polymer and/or non polymeric Separating Layers, e.g., glass or paint, perhaps with a surface preparation stabilizer on them which enables them to bond strongly to the applications in direct contact with them.

FIG. 56.VII. shows an inventive image in which layer b. is textured (e.g., carved, or cast with texture). The application made on layer b., layer a., also has some texture on its upper surface, e.g., it is engraved or incised. Further applications marked c. are made on layer a., e.g., transparent applications. Layer a. might for example be a Separating Layer, or it might be a surface preparation stabilizer. For example, layer b. might be a carved layer of polymer. Layer a. might be an incised application of paint, or an incised piece of wood bonded to layer b., and layer c. might be further applications of polymer, conventional paint such as acrylics, or both. As another example, layer b. might be a carved piece of wood, plaster, or stone, or textured paper; layer a. might be polymer with engraving, and layer c. might be paint.

FIG. 56.VIII. shows a volumetric inventive image. Within it, layers a., a.i., and a.ii. might for example, be Separating Layers, e.g., polymer separating layers or conventional paint (such as oils, water based paints, etc.). Or layer a. might be a metal, wood or glass rod; layer a.i. and a.ii. might be crystal; layer a. iii. might be polymer, and all of the other layers within this inventive image might be conventional paints.

In the inventive image in FIG. 56.IX. layer b., a.i., b.i. or a. may be Separating Layers. Both layers b. and b.i. might be Separating Layers; both layers a.i. and a. might be Separating Layers; or both layers b. and a. might be Separating Layers. For example, layer a.i. might be metal, wood, stone, paper, a drawing on paper or a photograph; layer b. might be polymer superimposed by a layer of a conventional paint; layers b.i. and a. might both be polymer and the leftmost layer of this inventive image might be a conventional paint.

FIG. 56.X. shows an inventive image which might have layer a., a.i., b., or b.i. as a Separating Layer. Alternately, this inventive image might have both layer a. and a.i., both layers b. and b.i., or both layers a.i. and b.i. as Separating Layers. Also, the shapes of the air pockets on either side of layer a. in between the two longer layers b. and b.i., indicate that layers b., a. and b.i. were not superimposed as liquids, but rather that one or more of these layers was pre formed (to some extent at least) and then attached. For example, layer a. might be a piece of glass and layers b. and b.i. might be colored polymer layers. All three of these layers might be bonded using the same cPRM as is used in layers b. and b.i. Alternately, layers b., a. and b.i. might all be made of different papers stiffened and connected by a coating of polymer in which case no single one of these layers would function as a Separating Layer, but all three together as a single unit might function as such separating the leftmost layer of this inventive image from layer a.i.

FIG. 56.XI. shows an inventive image in which the layer a. and the layer a.i. might both be Separating Layer Stabilizers (even though the layer a. is not continuous) separating applications which are neither cPRM nor polymer. Alternately, layers a. and a.i. in this inventive image might be non polymeric Separating Layers, (e.g., glass, metal, paper, canvas, etc.) separating various colored and colorless polymer pieces or applications in this inventive image's other three layers. In a third interpretation of this same inventive image, the layer b. might be a Separating Layer made of multiple discontinuous segments, which is polymer and/or non polymeric (e.g., multiple parts, broken color, impasto, multiple parts, etc.).

FIG. 56.XII. shows an inventive image in which layers a., a.i., or both might be Separating Layers; layers b., b.i. or both might be Separating Layers; or layers a. and b.i. might be Separating Layers. For example, layers a. and a.i. might both be Separating Layer Stabilizers with conventional paints on them, layer b.i. might be a layer of silver leaf, and the leftmost layer might be a conventional paint. Alternately, layer b.i. could be an image support, or a surface preparation stabilizer, e.g., on layer a.i. which could be an image support.

In the inventive image in FIG. 56.XIII. the air pockets within its vertical layered form marked a. may function as a Separating Layer. For example, the inventive image part marked a. might be made of polymer and all of the applications of coloration might be polymer and/or non polymeric. Alternately, the inventive image part marked a. might be non polymeric (e.g., it might be wood, metal, glass, paper, etc.), and the applications of coloration upon it might be made with colored cPRM; and/or they might be made of polymer and then colored (e.g., painted).

Figure 57:
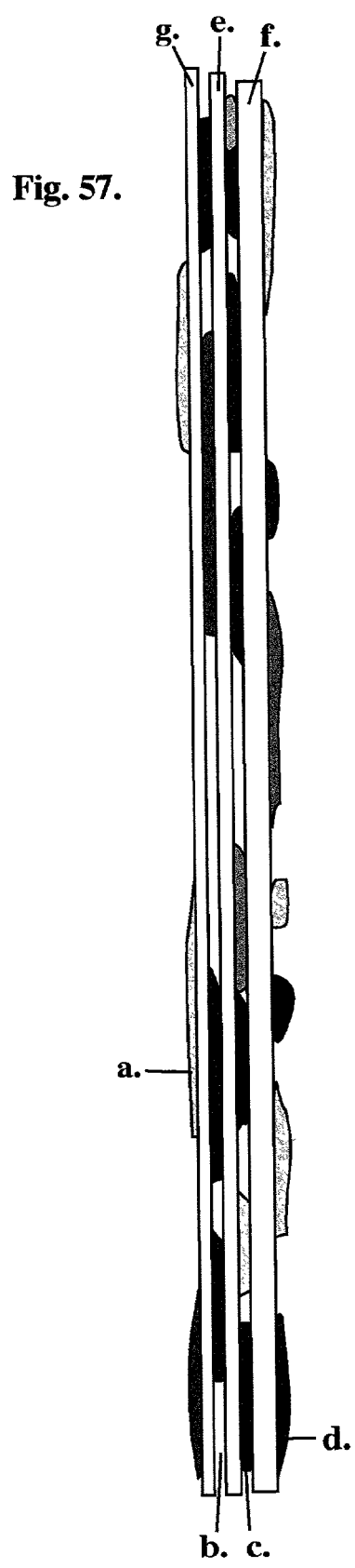
FIG. 57 shows an inventive image with alternating continuous and discontinuous layers.

In the inventive image in FIG. 57 one or more of the layers e., f., and g. might be Separating Layers and/or an image support made of one or more parts. Or, the layers c. and/or b. might be Separating Layers, even though these layers are discontinuous. As alternate interpretation, layers b. and f. might both be Separating Layers, or layers g. and c. might both be Separating Layers. For example, layers e., f., and g. might all be Separating Layer Stabilizers, keeping layers of other compositions apart, such as paints (e.g., incompatible layers of paint, layers of paint which could not have otherwise been layered so thickly, or layers of paint which could not be directly superimposed for other reasons). If layers. e., f. and g. are transparent or translucent, they would bring light into this image. As a different interpretation, the layers b. and c. might be Separating Layer Stabilizers; layers e., f. and g. might for example be paper, glass, printing plates, wood, canvas; conventional drawings, paintings, prints or photos, etc.; and the external layers d. and a. might be polymer and/or non polymeric.

Figure 58:
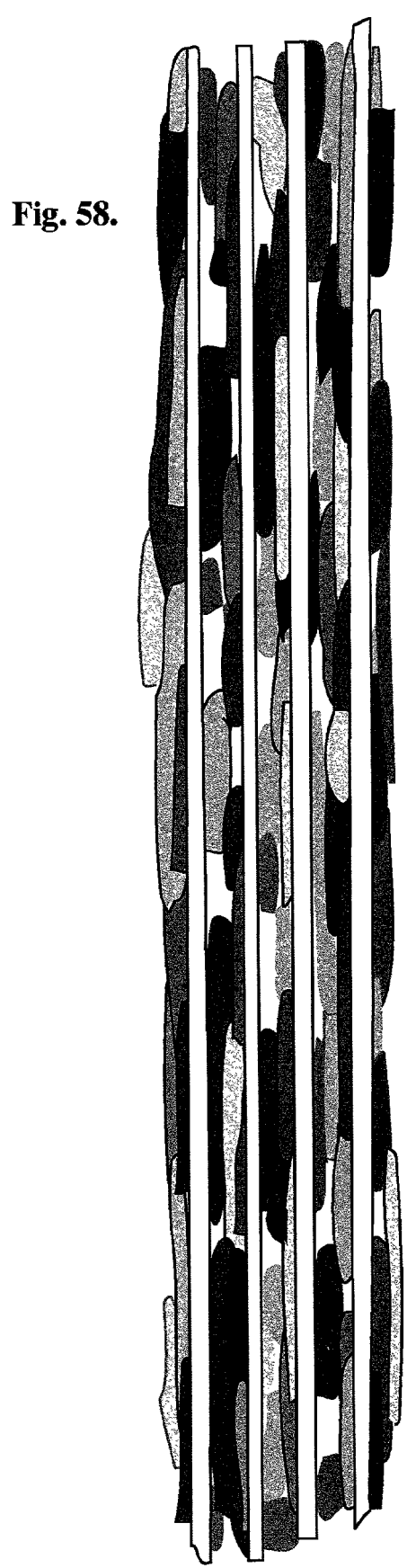
FIG. 58 shows an inventive image with alternating continuous and discontinuous layers.
Figure 59:
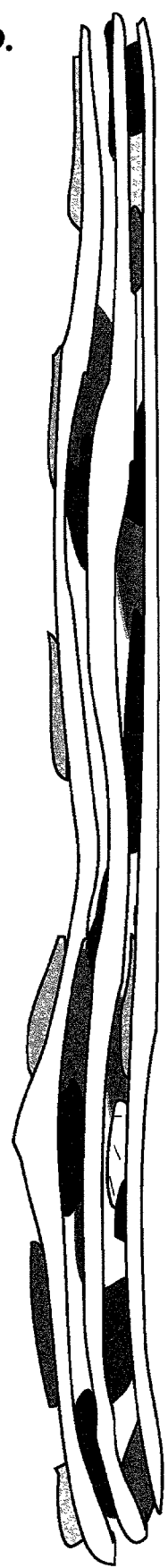
FIG. 59 shows an undulating inventive image with continuous and discontinuous layers.

The inventive image in FIG. 58 and the curved inventive image in FIG. 59 can be interpreted in the same ways as the inventive image in FIG. 57, though their layers shown in gray are greater in number. If for example, the layers of the inventive images shown in white in FIGS. 57-59 are strong enough, the layers of these inventive images might be made and superimposed in any order, and rearranged as desired. For instance, any layer shown in white in each of these inventive images might have served as a part of the image's initial image support which was further processed on one or both sides.

Figure 61:
FIG. 61 shows layering variations in inventive images which may have broken color applications.

FIG. 61 shows cross section or side views of four different layered inventive images which in the following interpretations, each have at least one polymer layer. In one interpretation, all of the layers shown in white in the four inventive images of FIG. 61 might be made of polymer, the other layers might be made of either a combination of polymer and other ingredients, or they might be entirely non polymeric. In an alternate interpretation, all of the layers shown in gray and black might be polymer and the layers shown in white might be made of either a combination of polymer and other ingredients, or they might be entirely non polymeric. In a different interpretation, all of the layers in the inventive images in FIG. 61 might be made of polymer.

One or more of the layers of each inventive image in FIG. 61 might have been made with a surface preparation stabilizer such as a mixed polymer. One or more of the internal layers of each of these four inventive images might serve as Separating Layers. One or more of these inventive images might have been processed from more than one of its sides. One or more of these inventive images might have begun with one or more layers serving as initial image support which may be a stabilizer, e.g., one or more, or even all the white layers in any or all of these inventive images could serve as initial image supports. The formation of one or more of these images might have involved combining two or more images into one whole. The formation of one or more of these inventive images might have involved rearranging their layers. Most or all of the layers in one or more of these inventive images might be transparent or translucent. One or more of the layers within one or more of these images might contain a light source, (e.g., one which does not require protruding parts like electric cords) such as EL Lamp(s), or LED(s). One or more of the layers within one or more of these images might be light reflective, e.g., a layer of paint, cPRM with reflective particles, dichroic glass, etc. These are more specific examples.

FIG. 61.I. shows an inventive image which might have begun with layer a. which might have served as an initial image support, e.g., made of a new unique imprimatura made of colored cPRM; made of a colorless transparent polymer plane; made of a conventional image covered with polymer (such as a drawing or a photograph); made of a fiber stabilizer embedded in polymer; or made of a conventional image support such as canvas or wood. Layer a. might have a surface preparation stabilizer on both of its sides which enables layers d. and e. to bond to it well. Layers d. and e. might both be made of segments, broken color and/or multiple parts, e.g., they might be made using polymer, conventional paint, inlaid or attached objects, or a combination of these. Layers b. and c. might for instance, be made of polymer separately, and then attached to this inventive image e.g., using a bonding agent, or just bonding to layers d. and e. while they were wet. Layers b. and c. might be comprised in one of the ways suggested for layer a. But before layers b. and c. are attached to this inventive image one or both of their sides might be covered with one or more layers such as collage, applications of painting such as glazes and washes, layers of photography, layers of drawing or a combination of these. Once layers b. and c. are attached to this inventive image, their external sides are further processed with additional bonding coloration. Thus, looking through the right and left sides of this inventive image is looking through a variety of different kinds of layers. For example, looking through this inventive image from its right side might be looking through a painted photograph, a layer of polymer, pieces of colored glass and more polymer, broken color paint, more polymer and impasto paint.

FIG. 61.II. shows an inventive image which may have four very different layers. For example, its rightmost layer might be impasto (e.g., oil or acrylic paint), or it might be attached or inlaid materials and/or media (e.g., wax, cast metal parts, wire, paper forms, glass forms, polymer forms, etc.). The layer to the left marked layer a., might be a Separating Layer, e.g., of polymer or of glass. Alternately layer a. might be an image support. To the left of layer a. is a very thin layer marked layer b. which might, for example, be made of polymer, paint, paper, metal, photography, leaves, fabric, a conventional painting on silk or canvas, a conventional drawing on paper, a conventional print, a conventional written document (such as a letter or a legal document), a combination of these, etc. If layer a. is not a Separating Layer b. might be. The leftmost layer of this inventive image (which is about twice as thick as layer a.), might or might not be made of polymer, e.g., it might be glass, canvas, polymer, wood or a combination of these. As a further illustration, viewing this inventive image through its rightmost layer might be looking through the spaces around impasto painting through a transparent colored layer a. made of polymer to see a delicate layer of transparent painting (layer b.) which is supported by a transparent layer of polymer which is slightly reflective so that it reflects light back out through the layers of this inventive image. In another interpretation, the leftmost two layers of this image might be a polymer image support stabilizer, the colored part of which labeled layer b. may be a surface preparation stabilizer. Alternately, layer a. may be a surface preparation stabilizer and beneath it, layer b. may be an image support.

Viewing the inventive image in FIG. 61.III. from its right side might for example, be looking through attachments and inlays, polymer, glazes and photographic transparencies, polymer, broken color, underpainting, scumbling and direct painting with traditional painted highlights. In this inventive image, layer a., b., c., or d. may be Separating Layers (provided layer a. is superimposed) or an image support which may have one or more surface preparation stabilizers on it or them. Alternately layers e., f., g., or a combination of these may be Separating Layers, perhaps with surface preparation stabilizers on one or more of them. Or, layers from both of these two groups which are not in direct contact may be Separating Layers, perhaps with surface preparation stabilizers upon it or them. Alternately, layers g. and/or e. may be an image support.

FIG. 61.IV. shows an inventive image with numerous layers. In this inventive image, layer a., b., c., d., e., f, g., h., or a combination of these may be Separating Layers, perhaps one or more of which have surface preparation stabilizers upon them. Alternately layer j., k., l., m., n., o., p., q., or a combination of these may be Separating Layers, perhaps one or more of which have surface preparation stabilizers upon them. Or, layers from both of these two groups which do not come into direct contact with one another may be Separating Layers and perhaps one or more of these have surface preparation stabilizers upon it or them. For example, viewing this inventive image through its rightmost layer might be viewing through polymer with incised drawing on it to see: broken color painting, a thin layer of polymer, layers of glazes, a layer of glass, a layer of connected polymer parts, layers of chiaroscuro, impasto painting, on a polymer with a Clarifying Imprimatura oil painting, partial layers or slivers of polymer, a layer of photograph transparencies on a polymer with painting on its reverse side. This image might have been multiple images that were stacked on one another. For example, layers i., j. and g. may have been an image, separate from the image formed by layers k. and e., separate from the image formed by layers d. and l., separate from the image formed by layers m., b., n., and a., etc.

Figure 62:
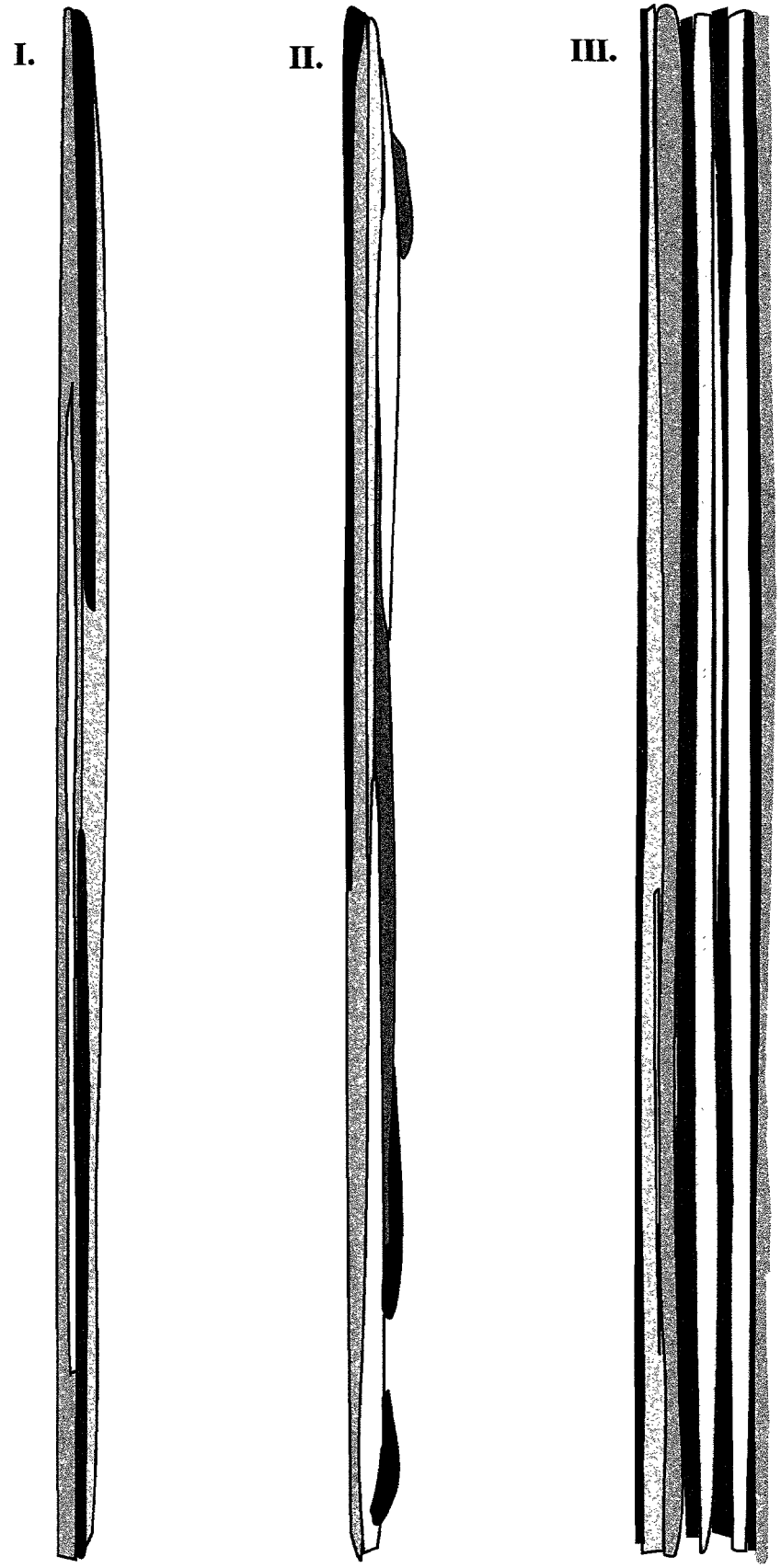
FIG. 62 shows cross sectional or side views of layering variations in inventive images.
Figure 62:
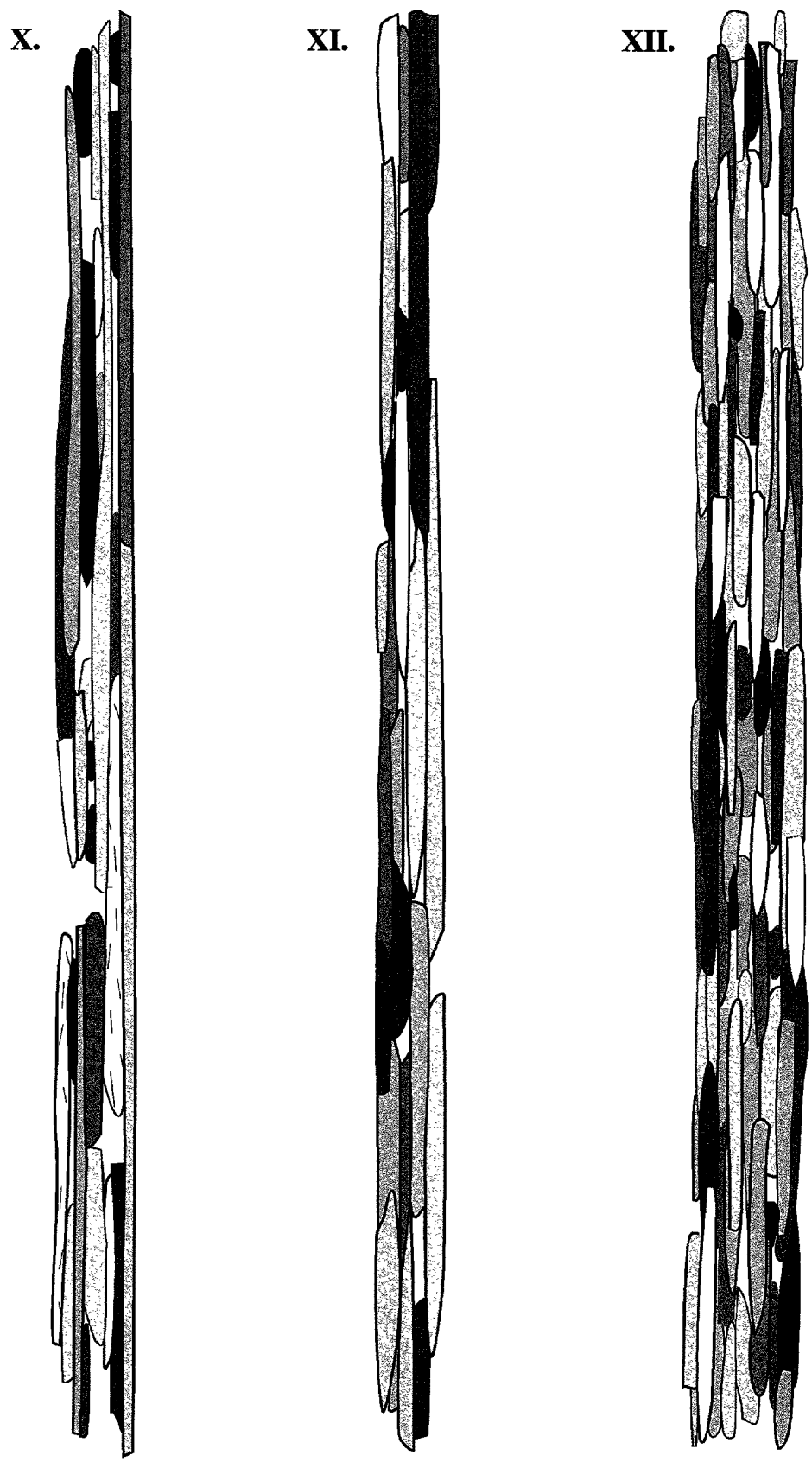

FIG. 62 shows further examples of layering in twelve inventive images. The inventive images in FIG. 62 all have at least one layer of polymer, though these are not specifically designated. For example, the inventive images in FIG. 62 might be inventive images made of polymer layers that alternate with other applications, such as layers of conventional paint alternating with colored polymer; these images might have Separating Layer Stabilizers, non polymeric Separating Layers, various surface preparation stabilizers, image supports, they might have layers that form chiaroscuro effects, or a combination of these, etc. FIG. 62.XII shows a new effect with applications that might be broken color.

One or more of the inventive images in FIGS. 57-59, 61, and 62.VII.-XII. might for example be close up cross sections or side views of paintings of the present invention which are copies of Monet water lily paintings, Seurat paintings, or other broken color paintings. FIGS. 62.I.-VII. might for example be close up cross section views of paintings of the present invention which are copies of paintings by Dutch old masters such as Rembrandt and Vermeer. But in comparison to the originals (which may have become more transparent or translucent due to the natural aging of their layered oil paint), these inventive images could be more transparent, more translucent, more luminous, and their use of real light and real spatial depth particularly with color, can be developed in a wider range of ways for effects unlike anything these or any other old masters could make.

Figure 49:
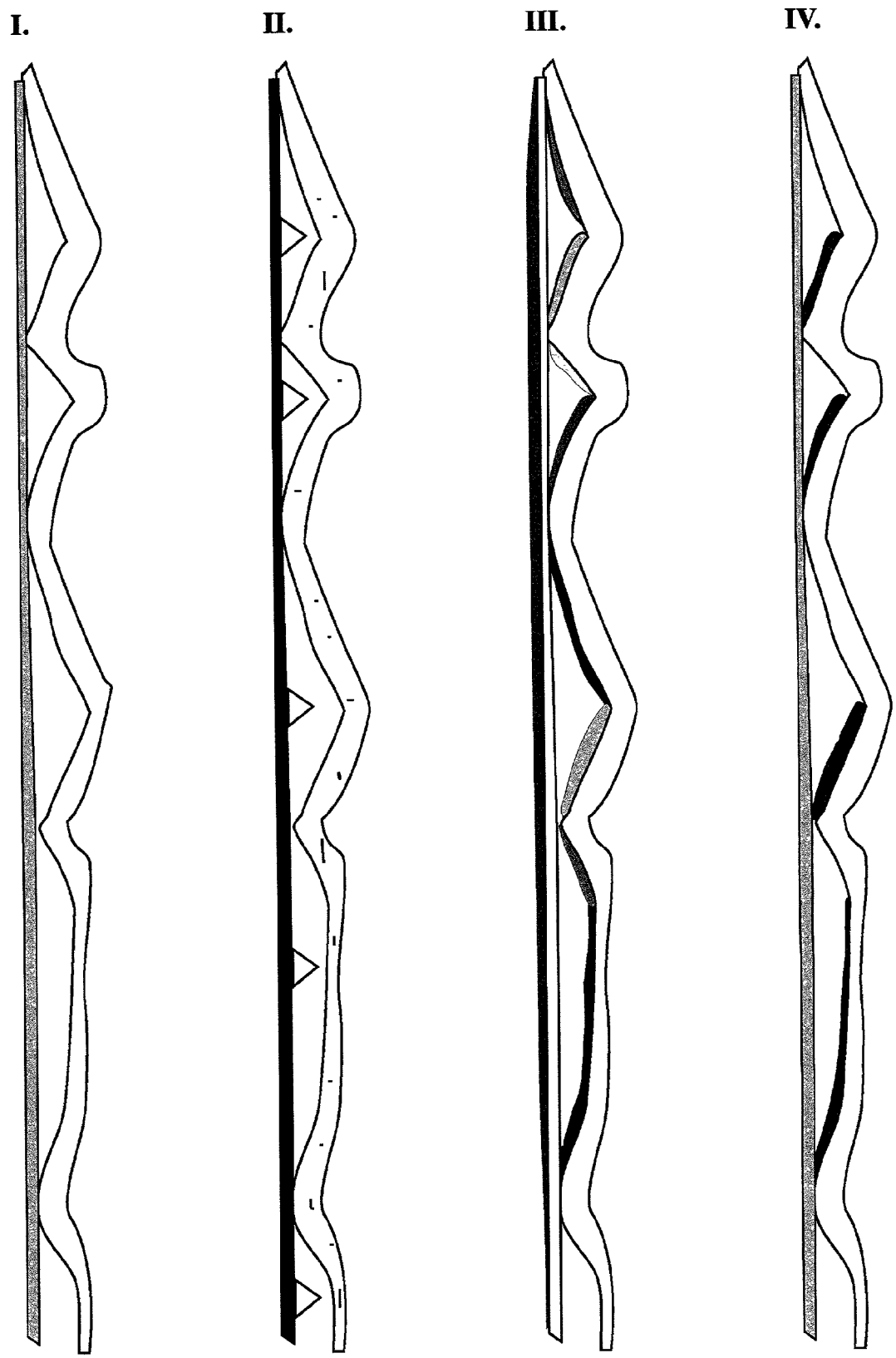
FIG. 49 shows layering variations in inventive images using an irregular form.
Figure 49:
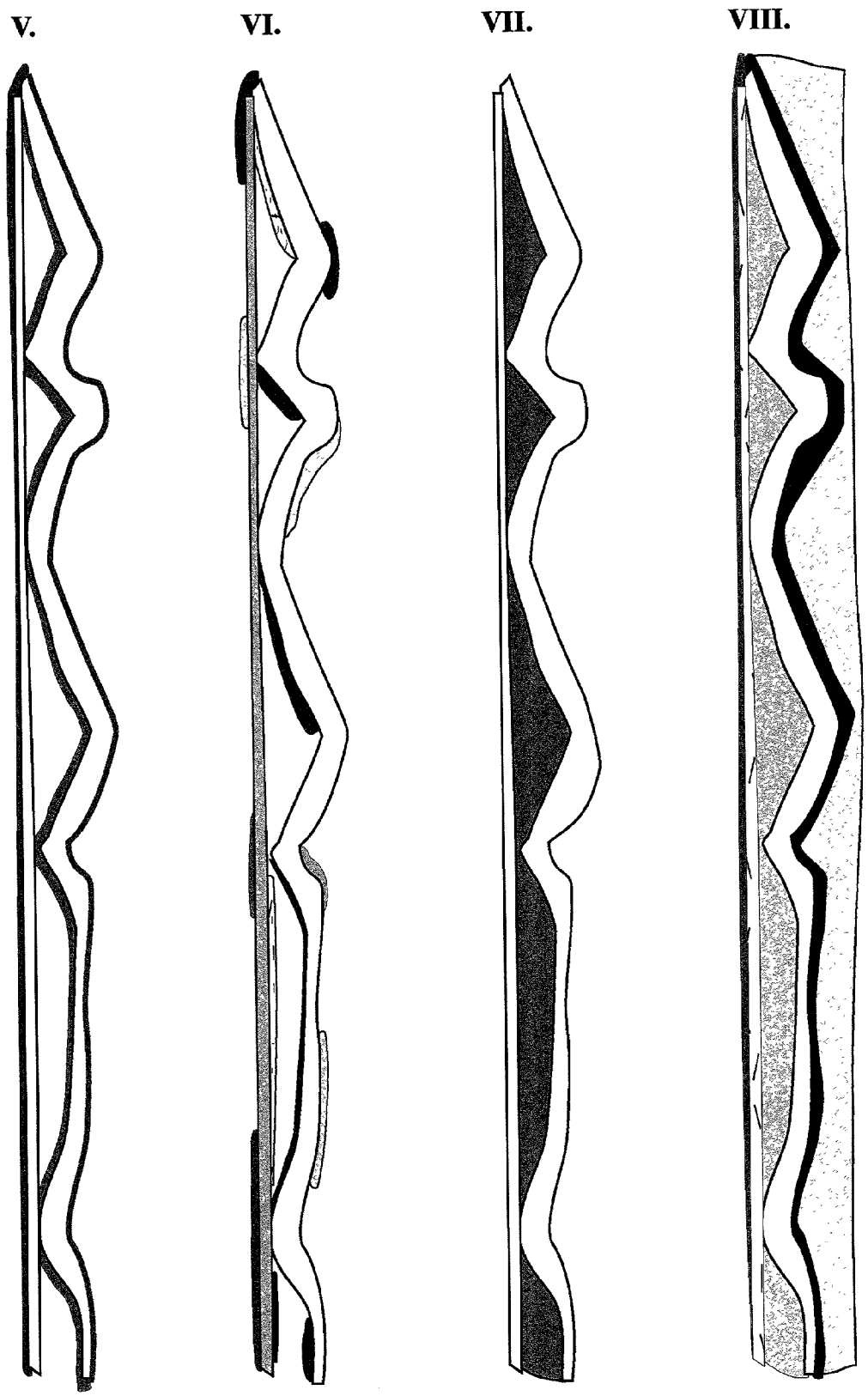
Figure 50:
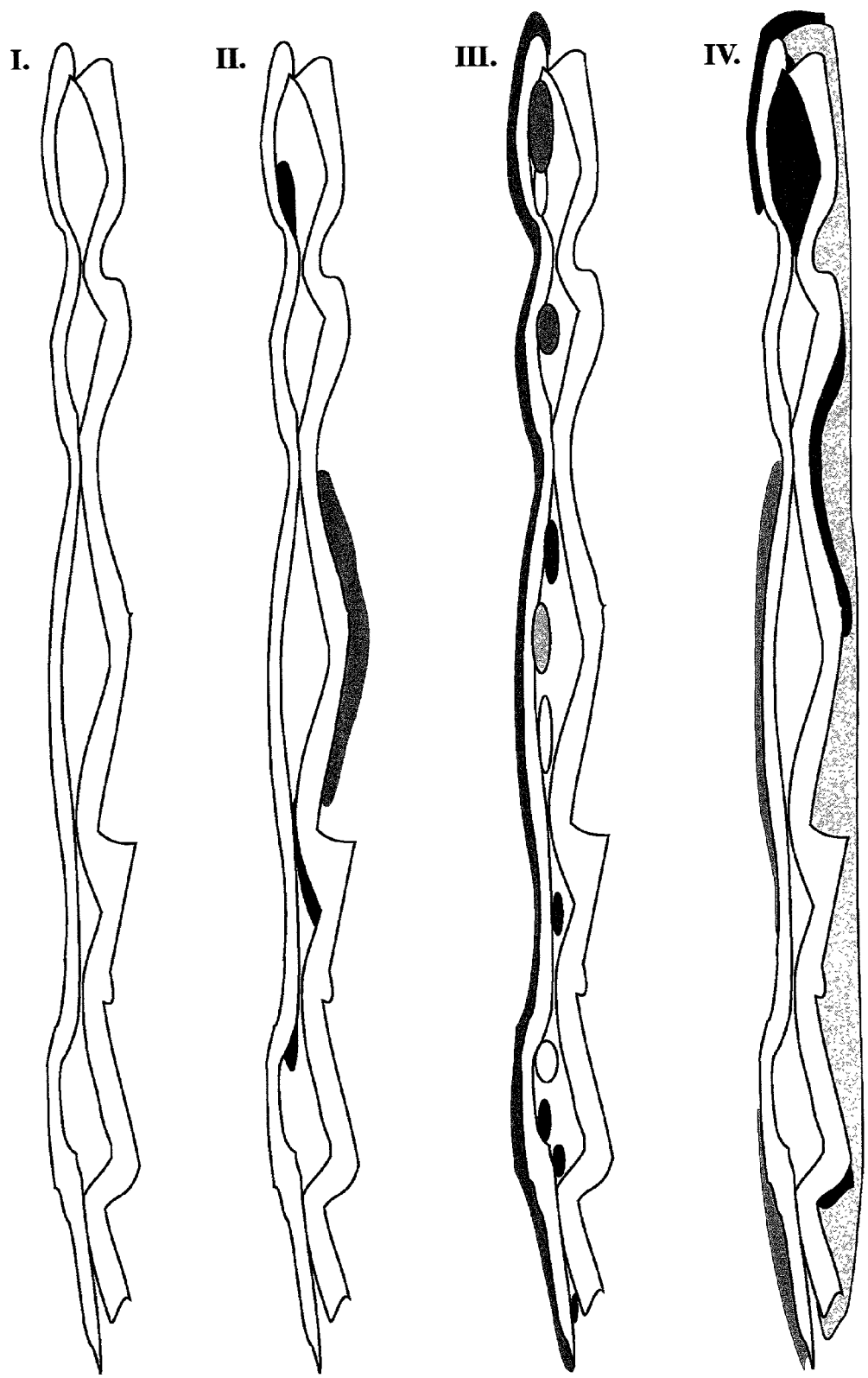
FIG. 50 shows layering variations in inventive images using an irregular form.
Figure 50:
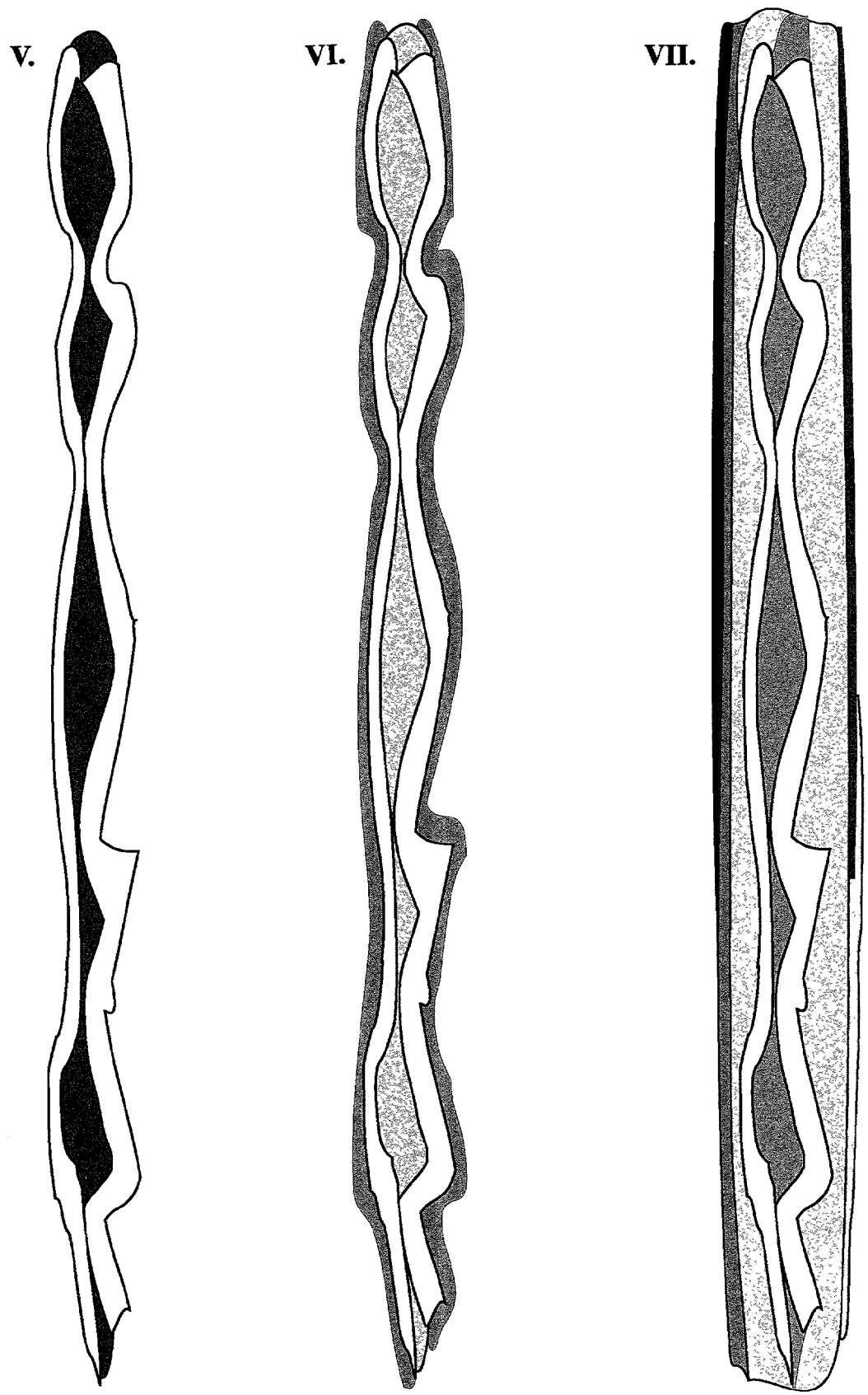
Figure 51:
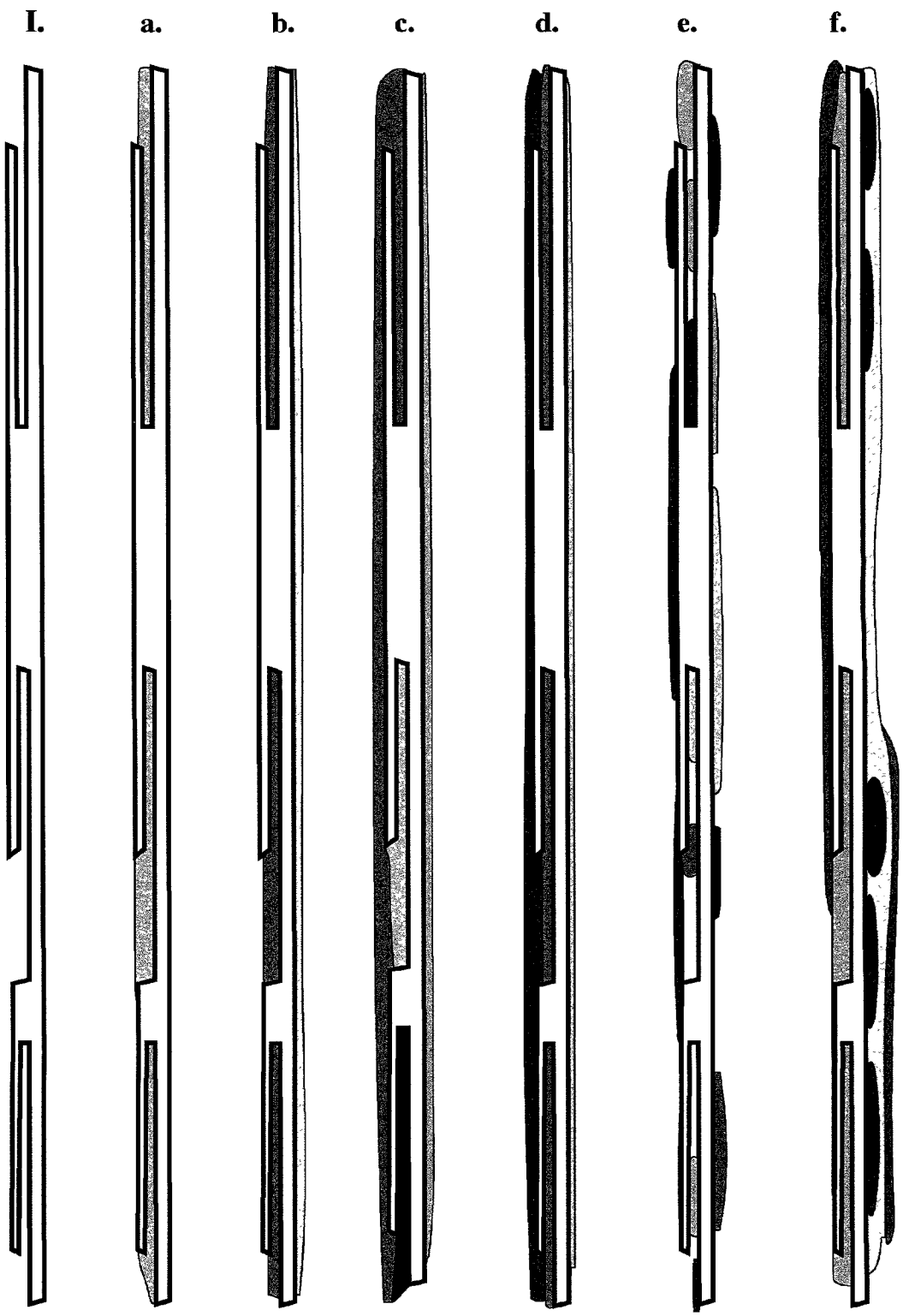
FIG. 51 shows cross section or side views of layering variations in inventive images.
Figure 51:
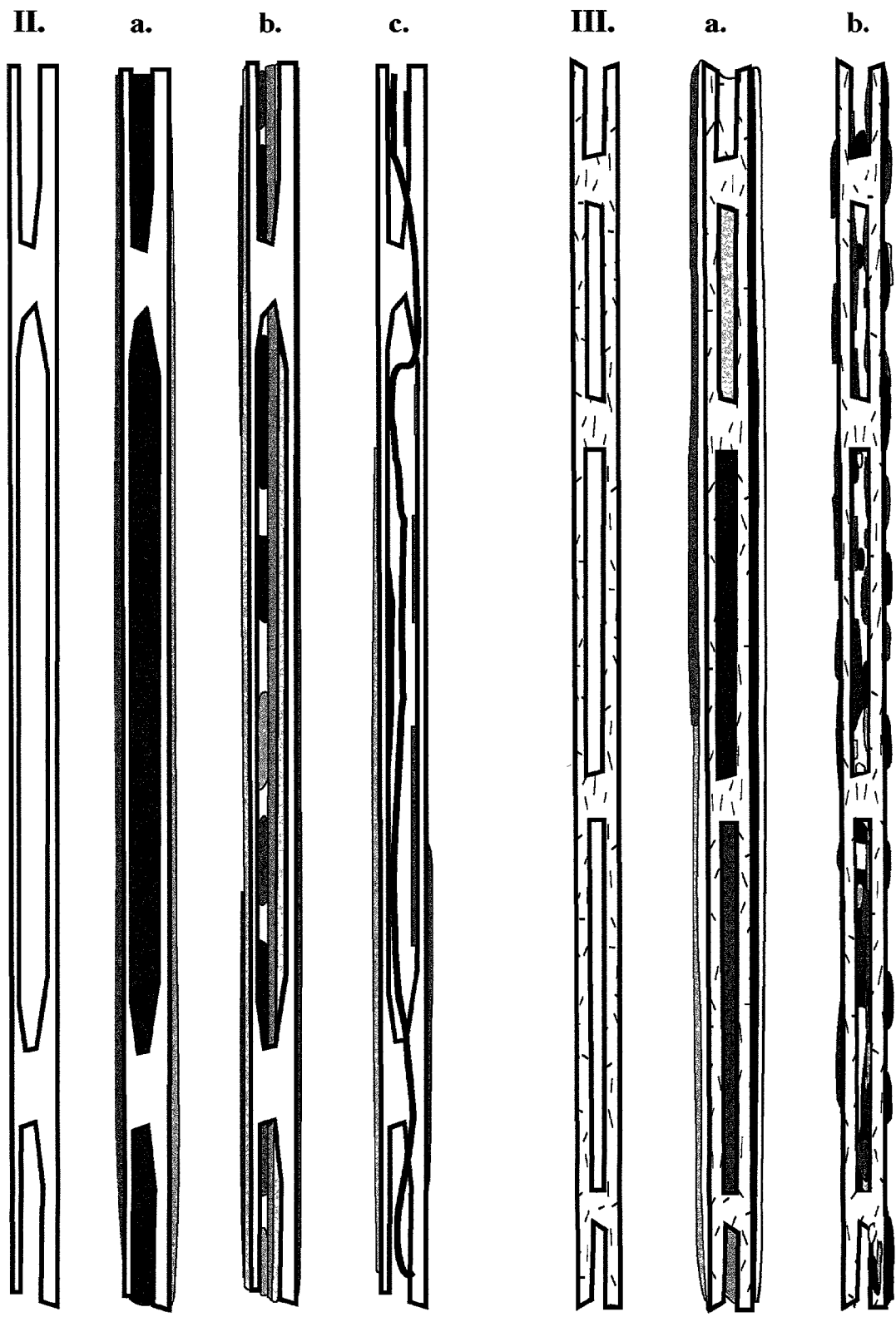
Figure 51:
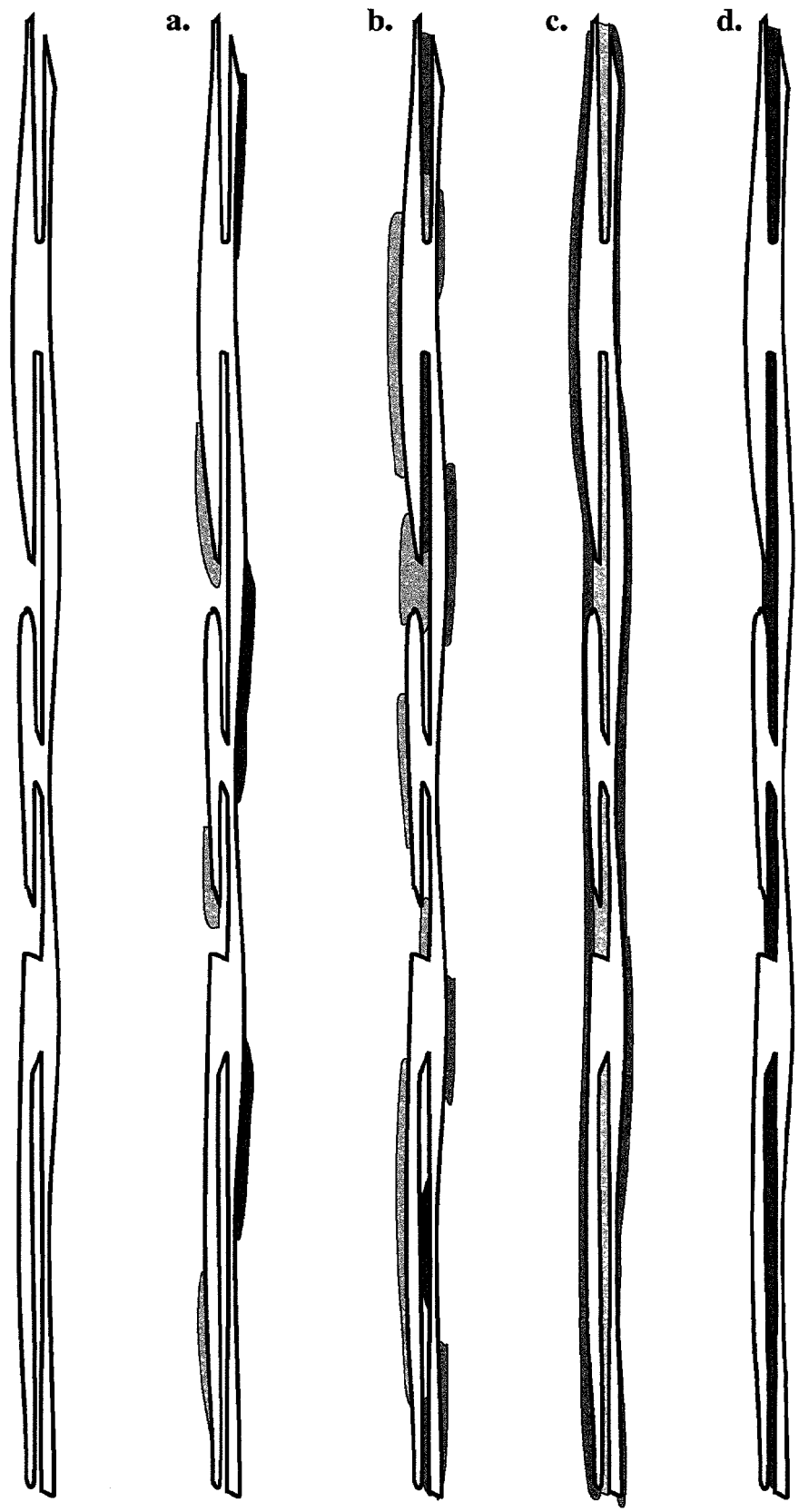
Figure 51:
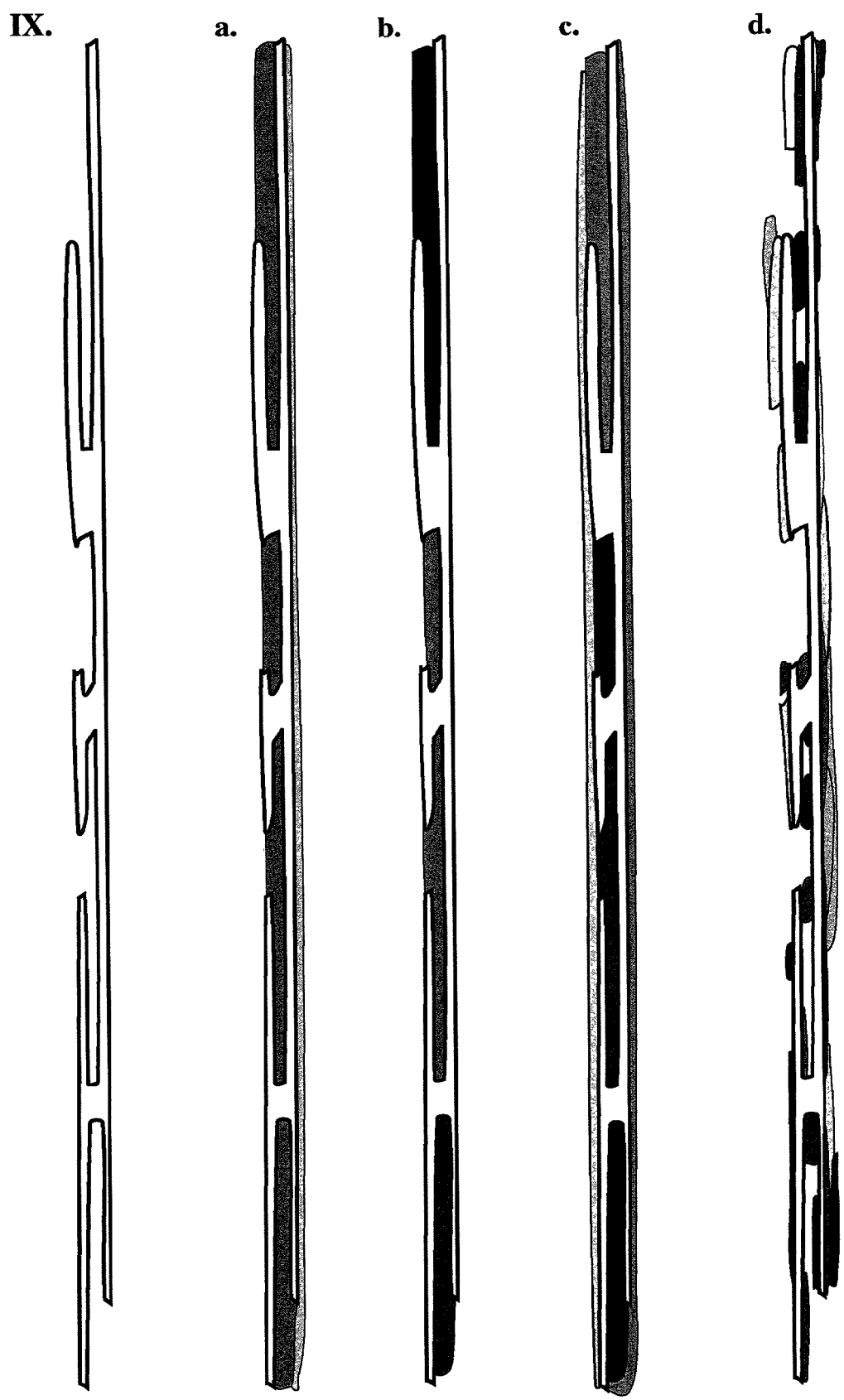

The inventive images shown in cross section or side views in FIGS. 49-51. are further examples of the ways of using layers and parts in inventive images. The first inventive image shown in FIG. 49.I., in FIG. 50.I., and in each of the series I-IX in FIG. 51, is made of polymer or of polymer and one or more other ingredients, e.g., polymer with a surface preparation stabilizer which enables bonding of superimposed applications, or such bonding enabled by the composition of the entire polymer form, for example by the use of an absorbent polymer. Thereafter, different options for the development of the same initial polymer formation are shown in the series of similar inventive images that follow in 49.II.-VIII., 50.II.-VII., and in the second through to the last image shown in each of these series I.-IX. of FIG. 51. to illustrate variations of ways individual layering formations might be used with other polymer and/or non polymeric layers, e.g., for desired effects. Some of the layering formations in FIGS. 49-51 might have one or more Separating Layers, some have layers of different kinds of applications, e.g., photography over paint, over drawing, over printing, over writing, new painting processes over conventional ones, different conventional image making processes over one another, such as broken color over washes, etc. Imagine the visual effect of these inventive images if they are layered with conventional paints, such as layers of transparent oil paint, watercolor, or both. Many of the effects which might be made in such layering formations can not be comparably made using conventional practices. One or more of these inventive images may also be further processed as desired.

In FIG. 49.I. an inventive image is shown made of two layers, the rightmost layer has undulations (e.g., texture), the leftmost layer is planar, and there are air pockets in between these two layers. The right layer might for example, be made of polymer and the left layer might be polymer and/or non polymeric (e.g., a reflective metal, mirror, or a polymer covered with a material or medium that makes it upper surface reflective, such as silver leaf, iridescent or metallic paint, etc.). Alternately, the right layer might be crystal and the left layer might be polymer with an upper surface that reflects light up through the crystal layer, e.g., polymer with an incised drawing and a painted upper surface. In FIG. 49.II, the right layer of this inventive image layering formation may have paint on it and/or particles attached to it, there are prisms in its central air pockets and its left layer may be made of a mirror, or of an image support with an EL lamp on it. In FIG. 49.III. the leftside of both the white layers of this inventive image may be colored, e.g., with applications of paint or colored cPRM. In FIG. 49.IV. the leftside of the undulating rightmost layer of this inventive image may be colored and/or reflective with repeated applications at angles, and its leftmost layer is colored. In FIG. 49.V. there are continuous applications superimposed on both sides of the right white layer of this inventive image, and on its leftmost side, e.g., conventional paint such as watercolor washes or oil paint glazes. In FIG. 49.VI. there are broken color or partial layers of differently colored applications on both sides of both the planar and the undulating layers of the inventive image. In FIG. 49.VII. an application of coloration (e.g., polymer, paint, wax, sand, plaster, paper pulp, or a combination of these) fills in the air pockets in between the two white layers of this inventive image completely. In FIG. 49.VIII. applications of different coloration are on all sides of the two white layers of the inventive image, filling its internal air pockets.

FIG. 50.I. shows an inventive image layering formation made of two undulating layers with empty air pockets in between them. These two layers might for example, both be polymer or one might be polymer and the other glass or paper.

Figure 32:
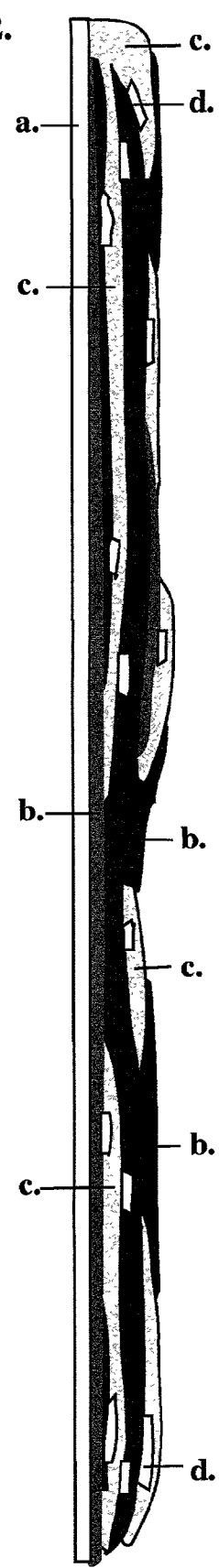
FIG. 32 shows a cross section or side view of a layered inventive image with bonding spots.

FIG. 32 is an inventive image interpreted in different ways. Its layer a. might be its initial image support. The smallest white rectangles within this inventive image, such as those marked d., might be pieces or slivers of polymer in between other applications, e.g., for aesthetic purposes, such as for light and spatial depth. For instance, if these are pieces or slivers of polymer, layer a. might be polymer (e.g., a stabilizer), and layers b. and c. might be conventional paints. Alternately, the pale gray partial layers within this inventive image (such as c.) might be partial layers of polymer. The small white rectangular shapes within this inventive image (such as d.), might be bonding spots, bonding these partial layers of polymer to non polymeric layers (shown in medium and dark grays such as b.). Layer a. may be polymer and/or non polymeric. For example, the medium and dark gray layers (such as b.) might be a conventional paint which does not bond or bond well to polymer. The bonding spots (such as d.), may enable this paint to bond as well as desired to the layers of polymer shown in pale gray (such as c.). In this example, these bonding spots might, for instance, be made of a mixed polymer stabilizer, or they might be made of a paint with SSI. And in another alternative, the small white rectangles within this image may indicate sites of bonding which are substantially less wide than shown in this illustration.

FIGS. 52-55 show cross section or side views of inventive images which have embedded pieces, partial layers, or slivers (illustrated in white), which might for example, be polymer and/or non polymeric, e.g., glass, wood, lenses, mirrors, mica, a drawing, a painting, a photograph, transparent paint, iridescent paint, light sources, metal, a combination of these, etc. The layers in direct contact with this embedding (illustrated in grays), might be made of polymer. The layer of each these inventive images on their furthest left sides (shown in white) might be polymer and/or non polymeric, e.g., made of glass, wood, lenses, mirrors, mica, a drawing, a painting (even on a traditional canvas), a photograph, a light source, metal, a combination of these, etc. Thus, as a specific example, from its left layer to its right, the inventive image in FIG. 54.I. could be made of a layer of metal, superimposed by a new unique imprimatura of colored transparent polymer. The three applications on the imprimatura (show as embedded white layers) might be one photographic transparency, one piece of crystal and one application of a conventional transparent paint. These three applications, might then be superimposed and thus embedded, by a transparent layer of the same polymer used for the imprimatura, with slightly different coloration. As a second example, from its left layer to its right, the same inventive image in FIG. 54.I. might be a layer of transparent polymer (shown in white) superimposed by a surface preparation stabilizer (such as a Clarifying inprimatura) or it might be a smooth acrylic polymer surface which will bond to application superimposed (shown as a gray layer). Either way, this image might be superimposed on the side shown on the right by three small applications (illustrated in white) which might be three pieces of transparent polymer; one photographic transparency, one piece of crystal and one application of a conventional transparent paint; or a combination of these. These three elements might then be superimposed and embedded by another layer of acrylic paint. Refer to embedding in FIGS. 60.II. and 48.II.

Figure 52:
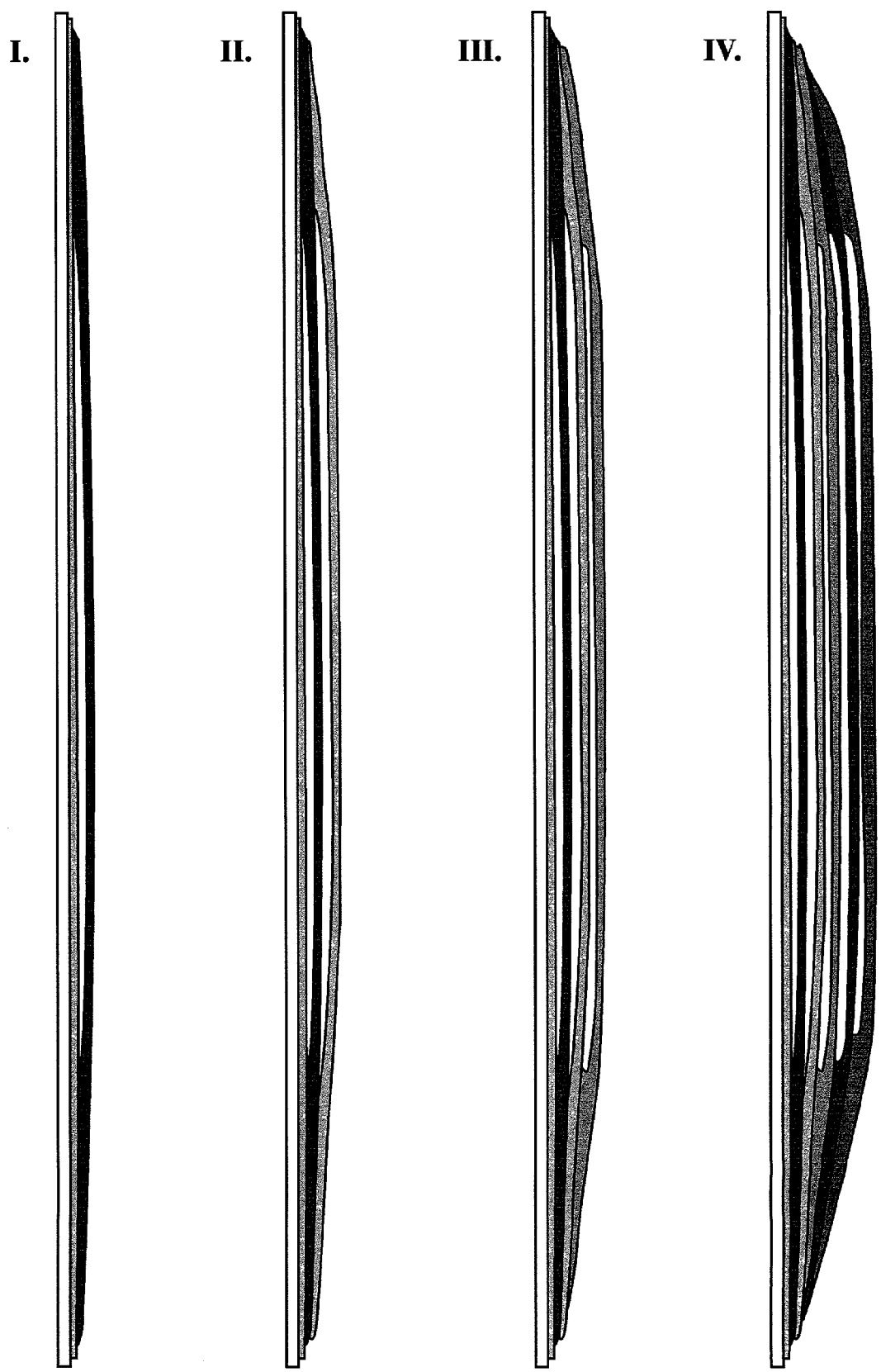
FIG. 52 shows cross sections or side views of an inventive image as layers are added and embedded.

FIGS. 52-55, show inventive images which may have partial layers, slivers or pieces of polymer (shown in white) in between their layers of other applications which might, for example, be of any composition that is different from the specific polymer used in each image's partial layers of polymer, e.g., these might be conventional applications of paint, drawing, collage, printing, a photograph, text, or a combination of these. In addition or instead these might be applications of a polymer different from that in their partial layers of polymer. Each of these images might have an image support (which might be an initial image support and/or a stabilizer) shown on their left side in white. FIG. 52.I-IV., shows the progressive formation of an inventive image in four stages. For example, this inventive image could be made of layers of polymer (shown in white) alternating with layers of other applications (shown in shades of gray). Specifically, for instance, these inventive images might begin on a polymer initial image support shown on their leftmost side, and be superimposed on their right side by another different application (shown in gray), then by a partial layer of polymer (shown in white), and then by a different application again (shown in gray). FIGS. 52.I.-IV. shows these partial layers of polymer embedded in this inventive image because they are superimposed by other applications. This process of adding alternating partial layers of polymer (shown in white) with layers of other applications (shown in gray) can continue until the desired inventive image is formed. If the inventive image desired is formed at any stage in this progression before IV., further processing can cease. If the inventive image in FIG. 52. part IV. is not the image desired, it can be further processed, e.g., carved or layers can be removed and/or added. Alternately, the inventive image in FIG. 52. part IV. can be made into the inventive image in either FIGS. 53.I. and/or 53.II. In FIG. 53.I., the inventive image in FIG. 52.IV. is superimposed on its right side by a layer of polymer (shown in white with black outlines), which covers its three sides of other applications, encasing this entire inventive image in polymer, while maintaining its curved shape. The inventive image in FIG. 53.II. is also encased, by superimposing either the inventive image in FIG. 52.IV. or 53.I. with another layer of polymer which straightens the image's curved shape.

FIG. 53. can also be interpreted in a different way. FIGS. 53.I. and II. may be two independent inventive images, or FIG. 53.II. can be made as a progression from FIG. 53.I. The initial image layer shown on the left side of both of these inventive images in FIG. 53. (shown in white) might be a non polymeric ingredient, e.g., wood, glass, paper, canvas, a painting (even on a traditional canvas), a drawing, a photograph, or a combination of these. One or more of the gray layers superimposed might be polymer. And one or more of the white smaller partial layers in between the gray polymer layers, might be embedded non polymeric applications, e.g., glass, mirrors, lenses, gratings, paper, wood, paintings, drawings, photographs, found objects, collages, or a combination of these. Then, the final layer superimposed over three sides of each of these two inventive images (shown in white on their rightmost side) may be polymer and/or non polymeric. For example, on one or both of these inventive images this last encasing layer might be polymer, e.g., which bonds to the inventive image's other polymer layers (shown in gray) in the areas in which they are in contact. Alternately, the final layer superimposed on three sides of one or both of these inventive images might be non polymeric, e.g., bonding to the image support on the far left side of one or both of these inventive images (the image support which bonds to polymer layers in one or both of these inventive images, or a combination of these). For example, this final layer might be made using a colorless transparent acrylic gel which bonds to surface irregularities with which it is in contact, even though no other part of the same inventive image might be made of acrylic or of the same acrylic.

FIG. 54. also shows an inventive image formed using embedded partial layers, pieces or slivers (shown in white), which alternate with layers of other applications (shown in shades of gray) on an initial image support (shown on the far left side in white). FIGS. 54.I. and II. might be two independent inventive images or the inventive image in FIG. 54.II. might be formed by further processing the inventive image in FIG. 54.I. For example, the inventive images in FIG. 54. might be made using a polymer and/or non polymeric initial image support (shown on the left side in white), superimposed by a non polymeric application (shown in gray), e.g., conventional painting application, drawing application, a drawing on paper, a painting on paper or canvas, a photograph, metal, wood, found objects, glass, or a combination of these. This non polymeric layer (shown in gray) is then superimposed by partial layers, pieces or slivers of polymer (shown in white), e.g., colorless transparent polymer. Then these pieces of polymer are superimposed by another non polymeric layer which embeds them. More specifically, for example, the inventive image in FIG. 54.I. might be a polymer sheet (shown on the left in white) with conventional paint on it (shown in gray), onto which three small polymer pieces are superimposed (the three white pieces) e.g., forming a broken layer of polymer. These pieces of polymer are then overlaid with a second layer of transparent or translucent paint (shown in gray) which embeds them.

The inventive image formed in FIG. 54.I may be the image desired, but if it is not it may be further processed. For instance, it might be reworked using one or more processes which remove matter from it, e.g., it might be incised. Or as another example, its last layer on its right side can be partially or completely removed and its central broken layer of polymer pieces can be made continuous by adding cPRM in between them. Then if desired, its last layer can be reapplied.

In addition or instead, this inventive image might be further processed using only additive processes. For instance, it might be further processed by continuing to apply alternating layers like, or similar to those which were used to form it—more pieces of polymer (shown in white) superimposed by non polymeric applications (shown in gray) which embeds them forming the inventive image in FIG. 54.II. This may be the inventive image desired, but if it is not this image may be further processed as desired.

The inventive image in FIG. 55.I. may be the inventive image in FIG. 54.II. further processed, or it may be formed independently. For example, the inventive image in FIG. 54.II. can be superimposed by a layer of the same polymer or by a non polymeric layer of the composition used to make its initial image support (the outer layer on its left side), forming the inventive image in FIG. 55.I. and encasing this image in a consistent outer layer, e.g., embedding its layers in transparent polymer. Alternately, this inventive image in FIG. 54.II. might be superimposed by a layer made using a composition which bonds to it, but which is different from the composition used to make its initial image support. Either way, the inventive image formed in FIG. 55.I. might be the inventive image desired, but if it is not, this image may be further processed as desired. For example, it may be formed into the inventive image in FIG. 55.II. by superimposing further applications all around it (a segment of which is marked a. in this illustration). These new applications may be polymer and/or non polymeric, as desired. The inventive image in FIG. 55.II. might be the image desired, but if it is not, it might be further processed as desired. Alternately, if the inventive image in FIG. 55.I. is independent from the inventive image in FIG. 54.II., it might be very different from it. For instance, one or more of the layers shown in gray in the inventive image of FIG. 55.I. might be partial layers of polymer, and one or more of the layers shown in white in this image might be non polymeric, e.g., they might be metal, glass, an application of paint, a drawing application, a drawing on paper, a painting on canvas, a photograph, wood, paper, etc. This may be the inventive image desired, but if it is not, this image may be further processed with more superimposed polymer and/or non polymeric applications, as in FIG. 55.II. As a specific example, if all of the layers shown in gray in the inventive image in FIG. 55.I. are transparent polymer, the smaller embedded white layers within these polymer layers might be embedded pieces of transparent dichroic glass, and this entire inventive image might be covered by a Clarifying Imprimatura (shown as the white layer encircling this inventive image) made of a semi gloss, colorless transparent acrylic gel. This may be the inventive image desired, but if it is not, this image may be further processed by superimposing conventional applications of acrylic paint and/or an oil paint on its Clarifying Imprimatura so that it is also a surface preparation stabilizer, as in FIG. 55.II.

The inventive image in FIG. 60.I. is made using three pieces of polymer (shown in white), which are superimposed and connected by multiple non polymeric applications (e.g., conventional broken color painting). This may be the inventive image desired, but if it is not, this image can be further processed. One way that this inventive image can be further processed is by applying non polymeric applications on the other sides of these three pieces of polymer, embedding them as in FIG. 60.II.

Figure 48:
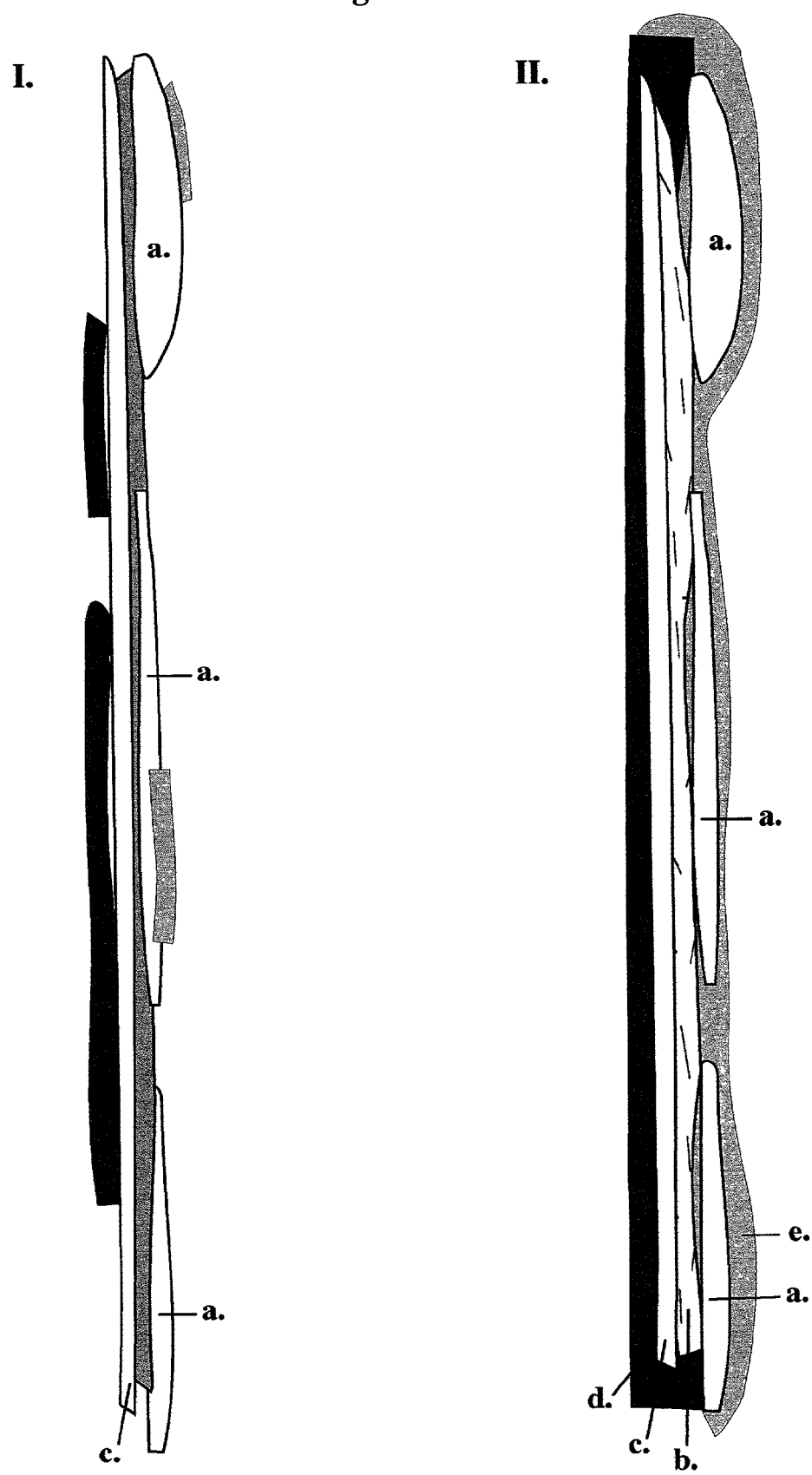
FIG. 48 shows two inventive images with layers of different compositions and sizes.

FIGS. 47-48 also show inventive images with partial layers of polymer in cross section or side views. In the inventive image in FIG. 47 the white partial layers marked a. and b. are polymer and the rightmost white layer, a continuous layer marked c., may be polymer and/or non polymeric. All of the other applications on this inventive image might be either entirely or principally non polymeric, e.g., they might be collage, photography, wood, metal, glass (for instance, crystal, lenses, dichroic glass, colored glass, etc.), paint applications, a painting on canvas, a drawing on paper, or a combination of these, as desired. All of the layers of this inventive image are bonded together so that it is strong and permanent. Similar layering exists in the inventive image in FIG. 48.I. which has three separate pieces of polymer forming a broken layer marked a. (shown in white with black outlines). The uneven thickness of these three pieces of polymer in layer a. give this side of this image texture. The continuous layer c. in this inventive image (also shown in white), may be polymer and/or non polymeric. The other applications in this image (shown in shades of gray, in between a. and c. and on their external sides), are non polymeric. For example, these applications might be made of any of the compositions which were not polymer of the present invention, previously listed for FIG. 47. All of the layers of this inventive image are bonded together so that it is strong and permanent. This inventive image might be the image desired, but if it is not, it can be further processed as desired. For example, more cPRM superimposed on its right surface can turn these three pieces of polymer of layer a., into a continuous polymer layer, embedding the two non polymeric applications superimposed on them, shown in gray in FIG. 48.I. The inventive image in FIG. 48.II. has the same layers a. and c. as FIG. 48.I., but the applications forming its other layers are different from those in the inventive image in FIG. 48.I. In FIG. 48.II. the layer b. which had speckled coloration, may be polymer and/or non polymeric. For example, layer c. and layer b. might both be polymer layers that are differently colored. Layer c. might be polymer and layer b. paint. Or, layer c. might be glass and layer b. might be polymer. Layer e. may not be polymer, e.g., paint. All three pieces of polymer which comprise layer a. rest partially on layer b. and partially on layer e., and two of them also rest partially on layer d. The application of layer e. over layer a. embeds all three pieces of polymer which form layer a. For example, if this inventive image is viewed through the transparency of layer e., and the three pieces of polymer in layer a. are also transparent, these three polymer pieces would increase the real spatial depth and transparency of this image differently in these three select areas. All of the layers of this inventive image are bonded together so that it is strong and permanent. This inventive image might be the image desired, but if it is not, it can be further processed as desired.

Conventional Practices can be used with the inventive medium to embed items in it e.g., embedding done as cPRM polymerizes, or afterwards for instance by connecting parts or by carving and then using additive processes.

In some inventive images, air pockets are intentional, desirable or both, e.g., two separate inventive image parts are attached together, so that the surface areas in contact, do not meet each other in at least one place. For instance, the inventive images in FIG. 41 are made with internal air pockets. In another example, a negative indentation is made into the top of cPRM (e.g., into gelled cPRM) and a planar image part is put over the indentation. For instance, such indentations can be made by carving, cutting or drilling into gelled cPRM and/or into hardened polymer. Or they can be made using one or more objects against cPRM which will not bond to it (such as an object covered with a release agent).

FIG. 36 shows two different inventive images which both have air pockets within them. For example one way that the both of the inventive images in FIG. 36 can be made is by forming the polymer layer labeled a. in both illustrations with cPRM in a mold. Once this cPRM gels, the polymer and/or non polymeric parts labeled b. in both illustrations, are pressed into the exposed surface of this gelled cPRM, inlaid in it. SSI are made on any of these parts which are unable to bond as desired with the gelled cPRM prior to their insertion in it. Separately a second polymer is made labeled c. in both illustrations. Once its cPRM gels, the first polymer (which has the inlaid parts) is turned over and its protruding inlays are pressed down into the gelled cPRM of the polymerizing second polymer layer, so that the parts inlaid in the first polymer, also become inlaid in the second polymer, forming air pockets in the negative spaces in between them as shown in FIG. 36. Alternately one or both of the inventive image in FIG. 36 can be made by adhering separate parts together using a bonding agent such as cPRM as a glue. For example, a bonding substance, can be applied onto the cavities or indentations in both of the two separate polymer planes of each of these inventive images. Then, the parts shown in the central layer of both of these inventive images labeled b., can be positioned in these cavities or indentations in both polymer planes of each of these images.

Another example of a method of making one or both of the inventive image in FIG. 36 is by forming each of these images entirely in a single mold that is removed from the inventive image once it is formed. Or, a single mold can be used to make one of the outer layers and the central layer of either or both of these inventive images, and then a second mold or temporary mold walls on the formed inventive image might form its third layer. Once the images are formed, the second mold is removed.

The inventive image in FIG. 41.II. has air pockets within it, with coloration applied on the inside walls of these internal air pockets. For example, to make the inventive image in FIG. 41.II., it may be preferable to make and color its three verical polymer planes and its two horizontal polymer planes all separately and then join them together using variations of the method in FIG. 69 in which a bonding substance is used as a glue to adhere separate polymer planes to one another. Multiple inventive image parts can be bonded to one another using variations of the method in FIG. 69, if desired even placing loose contents in the area which will become this inventive image's internal air pocket(s) once its sides are all connected. Further illustrations of inventive images with internal air pockets are herein.

In other examples, parts, pieces, shapes and forms, embedded or inlaid in certain positions in relation to one another, within or on an inventive image or part thereof, form a whole shape, a whole form, a whole device, or a whole that is combinations of these. For instance, sections of a circle, of a portrait, or of a plate are joined and thus recognizable as a circle, a portrait and a plate by their inclusion in an inventive image.

Inventive images can have the very valuable and useful aesthetic quality of objecthood. A few reasons for this quality are because inventive images have real depth that can be an integral part of the image as a whole; and because their structure and their form can be united. Because elements which affect objecthood in inventive images are typically workable, reworkable and controllable as desired, the objecthood of inventive images is just as workable, reworkable and controllable, and just as free from undesirable consequences (such as undesirable loss of strength or permanence) as these formal elements are. This quality of objecthood often enables inventive images to be free from illusionism, as do other qualities offered in inventive images such as the use of real light, real transparency and real translucency.

The inventive image in FIG. 46 may be formed from a colorless, transparent rectangular polymer image support (e.g., stabilizer) about 0.4" thick. If this image support is not able to bond as desired to superimposed applications, it is given a surface preparation stabilizer. For example, this entire polymer image support is sandblasted on both of its sides and both of its sides are given a colorless transparent Clarifying Imprimatura (e.g., using acrylic gel or using a workable fixative), which completely fills in its surface irregularities, restores its original state of transparency. Alternately, this surface preparation stabilizer is comprised of a polymer which is either hydrophilic or absorbent of oil. The surface preparation stabilizer enables applications of conventional painting and drawing materials and media to bond to it strongly and permanently. Then a design is made on this inventive image which is based on conventional patterns and motifs (e.g., American Indian patterns), spontaneously, in a WYSIWYG process of adding and removing matter to and from both of its sides. This might be done with conventional applications of conventional drawing and painting materials and media, as well as using processes for removing matter from images which are both conventional (such as erasers and solvents) and new (such as sanding the inventive image and restoring removed matter as desired). The area marked a. on the illustration is cut out.

In another illustration of this embodiment, an inventive image or part thereof, is made with an embossed drawing covering its external surfaces. In a further illustration, an inventive image or part thereof, is made with an engraved or incised drawing covering its external surfaces. The images formed in these two examples might be finished. Alternately they might be further processed into finished images. If desired, the images in these examples might be used as printing plates.

An example of an inventive image lamp inspired by Noguchi's Akari is in FIG. 44. In this illustration, the rigid polymer lamp is labeled ii., and the optional conventional light bulb is labeled i. (e.g., if this lamp is made with conductive polymer the bulb might not be used).

Lamps can be made with shades formed using multiple polymer pieces which are transparent, translucent, colored, partially opaque, which have light effects, or which have a combination of these, as desired. These polymer pieces may for example, differ in size and shape as for instance, the polymer part of the lamp in FIG. 44. labeled ii., might have been made of multiple planar polymer pieces that were bonded to one another seamlessly at the angles in this illustration, by the angled contours of this lamp's perimeter. Multiple polymer pieces might be joined into a polymer lamp shade by using a bonding cPRM to bond them to one another, by using another bonding agent, or by attaching the polymer pieces to an underlying form such as to an armature or other structure. For instance the shade of an inventive image lamp might be transparent with a sparkle that is iridescent, metallic, or fluorescent. Or for instance, the shade of an inventive image lamp might have hanging polymer pieces that resemble the way crystal is conventionally used on conventional lamps.

FIG. 45. shows a light emitting inventive image based on simple design, but with coloration and light effects can not be comparably created, in a strong, permanent form using conventional practices. In this inventive, the transparent colored planar polymer part is labeled ii. The light bulb on this image labeled i., is optional because its polymer form might be made with a conductive polymer that emits light. The vertical rod piercing through the center of this light emitting image indicates a way that it can be hung from above, or mounted on a stand from below. This image's planar polymer form might for example, have transparent and opaque coloration applied using conventional practices with fine iridescent mica dispersed unevenly throughout its form (not visible in this illustration), and random strokes of broken color both internally and externally, e.g., superimposed layers of color might be the darker areas.

Figure 40:
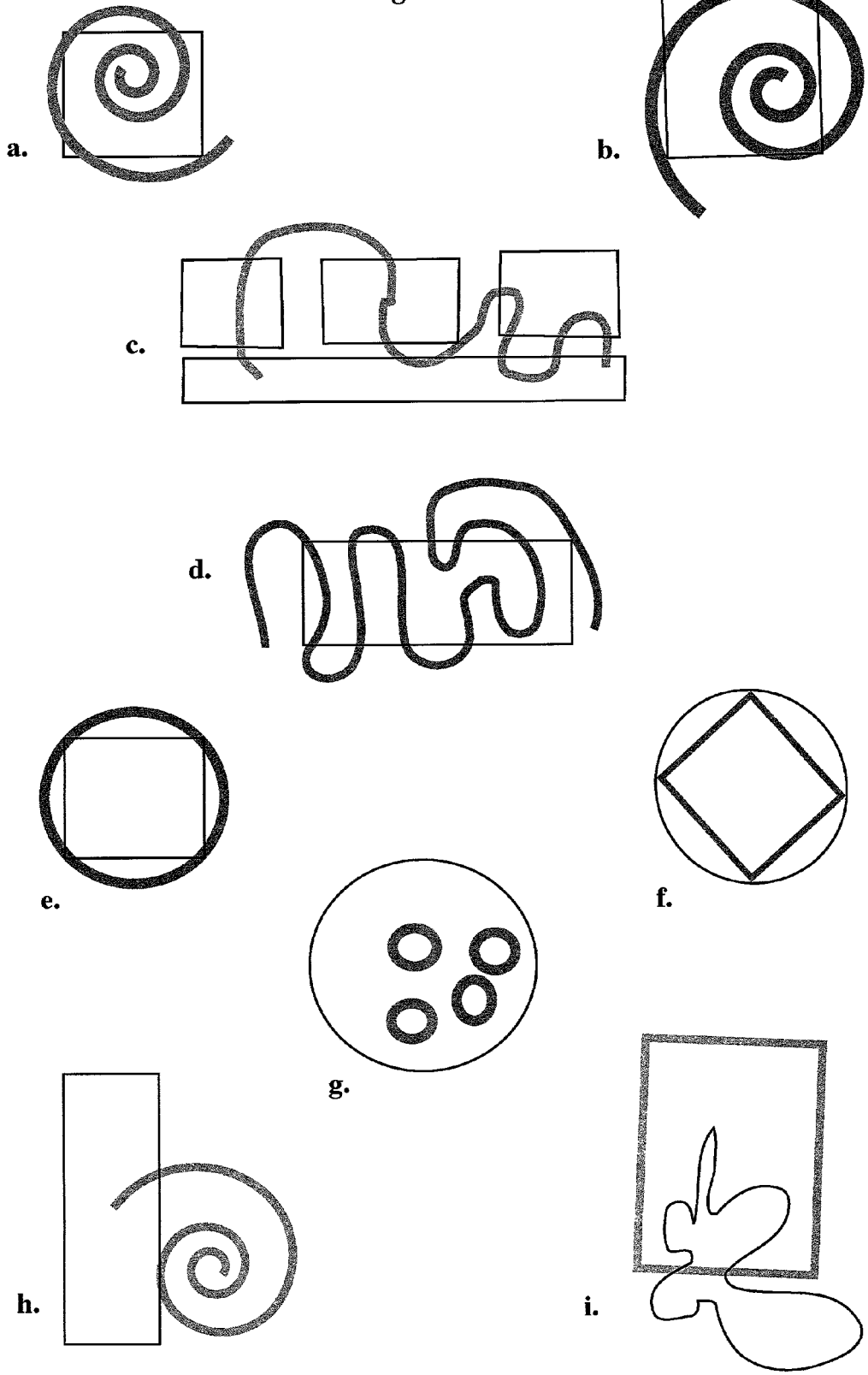
FIG. 40 shows inventive images that all have light sources in their Compositional Arrangements.

Compositional Arrangements of inventive images with multiple parts can be made that have light source(s) as parts which may or may not be connected to the rest of these images. All of the inventive images in FIG. 40 are comprised of one or more polymer parts illustrated as white forms outlined with thin black lines, in Compositional Arrangements with one or more light sources (e.g., neon light bulbs) which are rendered as wide gray lines. FIG. 40.*a.* shows an inventive image made of a transparent square polymer with a spiral shaped light source in front of it which extends out beyond the polymer's sides. FIG. 40.*b.* shows an inventive image with a spiral shaped light source visible behind its transparent polymer square, and extending out beyond its sides. FIG. 40.*c.* shows an inventive image made of four separate rectangular polymer parts and one irregularly shaped light source behind them. FIG. 40.*d.* shows an inventive image with a see through rectangular polymer in front of an irregularly shaped light source which extends beyond the polymer's side edges. FIG. 40.*e.* shows an inventive image with a rectangular polymer in front of a circular light source. FIG. 40.*f.* shows an inventive image with a rectangular light source and a larger circular polymer. This polymer may be in front or behind this light source, or this light source may be within this polymer, e.g., in a hollow air pocket, or in the negative space within it. FIG. 40.*g.* shows an inventive image with a single large circular polymer that has four small light sources in front of it and/or behind it. FIG. 40.*h.* shows an inventive image made of a transparent rectangular polymer with a single spiral shaped light source to its side and behind it. FIG. 40.*i.* shows an inventive image with an irregular polymer in front of a larger rectangular light source.

In a further illustration of the present invention, an inventive image is made using two or more superimposed layers of a conventional acrylic paint and/or a conventional acrylic painting medium, with at least one stabilizer in a mold. For example, an acrylic painting medium mixed with a defoamer and/or a bubble reducing stabilizer is put into the mold at a thickness of about 0.15" and allowed to dry. The inventive image shrinks significantly in the mold. A second layer of the same composition and about the same thickness is superimposed over this image. If desired, in addition to or instead of the defoamer and/or a bubble reducing stabilizer, a fiber stabilizer might have been added to this image, e.g., in between its two layers, carefully installed so as to prevent bubbles. Further processing may be done as desired, in and/or out of the mold.

Figure 63:
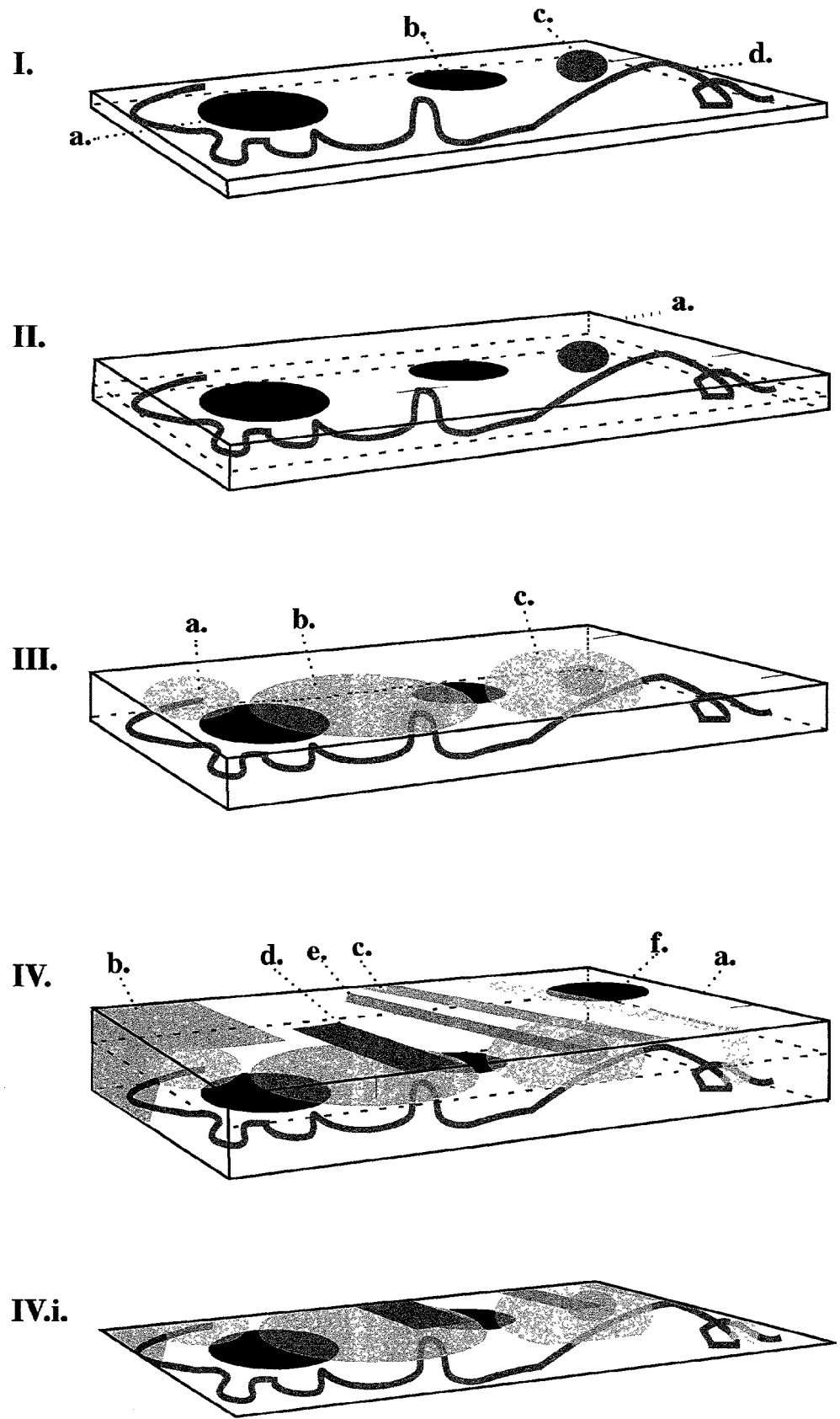
FIG. 63 shows a varied process of making an inventive image in superimposed layers.
Figure 63:
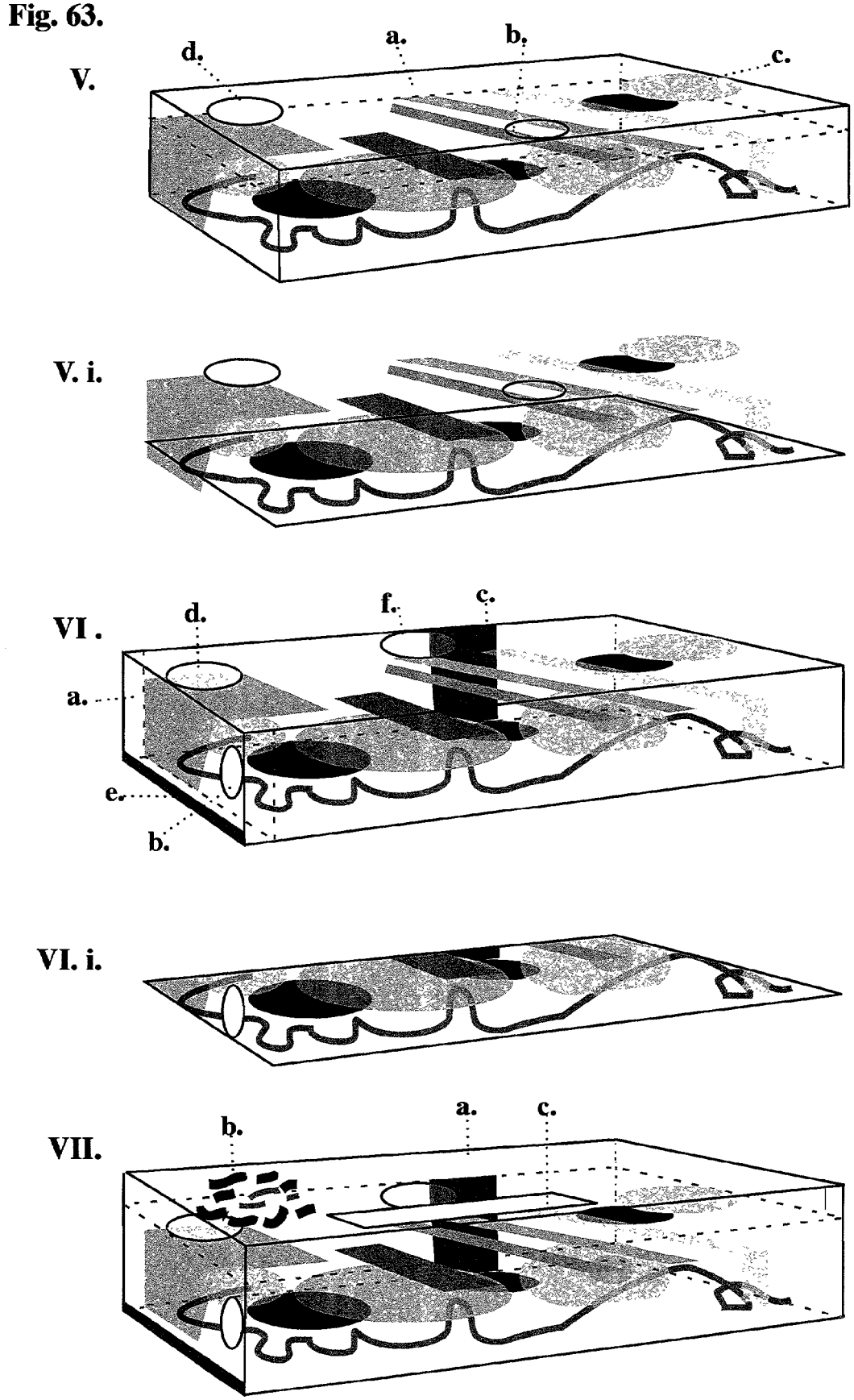

In an illustration, FIG. 63 shows an inventive image is made by forming a transparent colorless polymer in a rectangular planar shape and further processing it with coloration shown at 13 points in its development, marked as 63.I.-XIII. However, if it is finished as desired at any time along this progression, no further processing would be done, or if instead this inventive image is not complete after these 13 stages additional processing can be done as desired. In addition, in 5 of the 13 stages of this inventive image's development a second illustration (marked with a number ending in "i.") compares the development of this inventive image to what could be accomplished using conventional practices which are as close to the process(es) of making this inventive image as possible. The 13 principal illustrations of FIG. 63 have dotted lines indicating one or more new layers added on the inventive image and letters identify all newly added elements. This illustration begins showing the inventive image in FIG. 63.I. as a 2D or 3D transparent colorless planar polymer initial image support with real spatial depth and four elements of coloration on its upper surface marked a.-d. For example, this image might be rigid and/or flexible, the colored element marked d. might be a painted line, and the other three circular elements marked a., b., and c. might be opaque circles made of paint and attached paper. This may be the inventive image desired but if it is not, this image can be further processed as desired. As an example, some or all of its coloration may be reworked or removed. In addition or instead, more coloration might be added, and/or the rectangular shape of this image might be altered. FIG. 63.II. shows this same inventive image further processed with a new layer of transparent colorless polymer superimposed, marked a., which embeds its coloration. The cPRM used bonds well to the underlying layer of polymer, though it may not bond, or it might not bond well to the surface areas covered with coloration, e.g., the cPRM of this new layer is the same as that which was used to form the initial polymer support of this image. This may be the finished inventive image desired but if it is not, it can be further processed as desired. Note that there is no comparable, permanent way to make such a thick transparent colorless layer on a conventional image to embed its surface coloration. A conventional image comparable to the inventive image in FIG. 63.II. could not have been made.

FIG. 63.III. shows this inventive image further processed with transparent coloration (e.g., paint) applied to its top surface in three circular shapes, marked a., b. and c. This image may now be finished, but if it is not, it can be further processed as desired. FIG. 63.IV. shows this same inventive image further processed with a newly superimposed layer of transparent colorless polymer marked a., on its top surface. This image's top surface and two of its sides are also have transparent and translucent coloration in areas marked b.-f., e.g., applications of paint, of colored cPRM or both. This may be the finished image desired but if it is not, it can be further processed as desired. FIG. 63.IV.i. shows how comparable marks might appear on a conventional image which is as close as possible to this inventive image. Note that the conventional image could not be built up with the see-through spatial depth which was created on the inventive image, and note that only a small portion of the new see-through coloration applied on the inventive image (marked b.-f. on FIG. 63.IV.) appears on the conventional image. FIG. 63.V. shows this same inventive image further processed with superimposed applications: a new layer of transparent colorless polymer is superimposed marked a.; a circular line is marked b. (e.g., a drawn or painted line, or a wire attachment); and two new circular applications of opaque coloration are marked c. and d. This may be the completed image desired, but if it is not, this inventive image can be further processed as desired. Notice that many of the superimpositions made on this inventive image are so determined by and dependent upon its spatial depth, that they could not even be made on a comparable conventional image as FIG. 63.V.i. shows.

FIG. 63.VI. shows this same inventive image further processed with the removal of two previous applications and the addition of multiple new applications. The applications marked b. and d. in FIG. 63.V. were removed, e.g., by sanding them off and then applying more cPRM to the abraded polymer surface if necessary, so that it is visually continuous with the rest of this inventive image. In addition, a new layer of transparent colorless polymer is added onto the left side of this inventive image, marked a. upon which two new applications of opaque color are made marked b. and e. On this inventive image's top surface, new coloration is added in the form of a translucent circle marked d., and a transparent circle marked f. (e.g., painted coloration), and coloration is also applied on the backside of this inventive image marked c. This image may be the finished image desired but if it is not, it can be further processed as desired. The conventional image in FIG. 63.VI.i., developed as closely as possible to this inventive image, shows how different these new applications and previous applications would appear and how some of them would not be able to be made at all on using comparable conventional practices. The inventive image of FIG. 63.VI. is shown further processed in FIG. 63.VII. with three changes. A thick new layer of transparent colorless polymer marked a. is added on its upper surface, upon which a broken color application is made marked b. and an opaque application is made marked c. This may be the finished inventive image desired but if it is not, this image can be further processed as desired. For example, one two or three of these new changes made to this image could be reversed, e.g., the layer of polymer or the coloration could be removed, or both could be removed. FIG. 63.VIII. shows this same inventive image further processed with new superimpositions. Another new thick layer of colorless transparent polymer is added marked a., upon which three new applications of coloration are made—two circles b. and e., and a rectangle d. This may be the inventive image desired but if it is not, it can be further processed as desired. There is no way to have made a conventional image comparable to this inventive image.

FIG. 63.IX. shows this same inventive image further processed. It has been superimposed by a new thick transparent colorless layer of polymer marked a., upon which a variety of new colored applications are made, marked b., d. and e. In addition, the looping shape marked c. in FIG. 63.VIII. is removed and reworked, so that in FIG. 63.IX. the same part of this inventive image which is also marked c., shows that this loop was replaced by a linear segment (e.g., the loop was carved or sanded out of the image, then, the new colored line was applied and the image's polymer reformed). This inventive image may be the inventive image desired but if it is not, it can be further processed as desired. In comparison, none of the changes made on this inventive image in this stage could be comparably made on a conventional image. FIG. 63.X. shows this inventive image further processed. A darkly colored transparent circle is made on the left side of this image marked a., and a new, thin transparent colorless layer of polymer marked b. is added onto this image's upper surface which has two transparent colored shapes on it marked d. and f. In addition, a darkly colored rectangle and a darkly colored circle marked c. and e. are applied onto the underside of this inventive image. This may be the inventive image desired but if it is not, this image can be further processed as desired. FIG. 63.X.i. shows a conventional image which is undergoing processing which is as close to that of this inventive image as possible. While the applications marked c. and e. on the inventive image in FIG. 63.X. can be made on the conventional image in FIG. 63.X.i., these applications extend off of its surface, and none of the rest of the new applications made on the inventive image in FIG. 63.X. could be comparably made on this conventional image.

FIG. 63.XI. shows this inventive image further processed. A new thick layer of transparent colorless polymer marked a. is added onto its underside and its surface (the underside of this inventive image) is colored with two transparent circular applications marked b. and d. In addition, a new thick layer of transparent colorless polymer marked c. is added onto the top surface of this inventive image, and it is colored with broken color applications marked e. This may be the completed inventive image desired but if it is not, this image can be further processed as desired. For example, either or both of its new polymer layers can be removed and/or its new coloration can be partially or entirely removed. FIG. 63.XI.i. shows just how much of this inventive image's development would not be able to be done on a comparable conventional image which would remain 2D or 2D planar as the rectangle of its perimeter indicates.

FIG. 63.XII. shows this inventive image further processed using both additive and subtractive processes. Two new thick layers of transparent colorless polymer are added onto this inventive image, one added on its bottom side marked a., and the other added on its top side marked b. By removing matter from this inventive image (e.g., by carving it, sanding it, or both), three negative pyramid shaped indentations (marked c., d., and e.) are made in it, one or two sides of each of which is colored. Notice that the indentation marked e. cuts through some of this inventive image's internal coloration. Notice also that these indentations are cut in through this image's side, without affecting the continuousness of its bottom surface. The surface abrasions or SSI left from forming these three indentations are filled and smoothed out with coloration, cPRM or both, leaving the surfaces within these three negative indentations transparent and clear. In addition, broken color applications marked f. are made on this inventive image's upper polymer surface. This may be the finished inventive image desired, but if it is not, it can be further processed as desired. None of the changes made to this inventive image in this stage could be comparably made in processing a similar conventional image.

FIG. 63.XIII. shows this inventive image further processed with texture added onto its top surface and one of its sides marked a. For example, this texture might be made by connecting pyramid shaped attachments onto this image; this texture might be made by forming new polymer on small subdivided areas of this image's top and side surfaces (as in FIG. 71.III.) and then carving and shaping this polymer into pyramid shaped texture; or this texture might be made in a combination of these ways. This may be the complete image desired but if it is not, it can be further processed as desired.

The inventive image in FIG. 5.V. is made. In a mold made using conventional practices, a planar polymer initial image support stabilizer measuring 8"×10"×0.4" might be made using cPRM that is colorless and transparent, with tiny iridescent mica particles mixed into it. More specifically, the cPRM might be made using a PRM that has about 525 ml. (524.384 ml.) of Silmar® S-40 polyester resin monomer, with about 2 grams of the stabilizer, Tinuvin® 328 added into it. If desired to add the stabilizer into the PRM, about 40 ml. of this polyester resin monomer PRM might be taken out of the batch and mixed, preferably thoroughly, with about 2 grams of the Tinuvin® 328, preferably completely wetting out the Tinuvin® powder to produce a concentrated-stabilizer-mixture. All of this concentrated-stabilizer-mixture might then be mixed into the PRM, preferably thoroughly. If after mixing thoroughly, there are undesirable lumps of the concentrated-stabilizer-mixture in the PRM, these might either be broken apart, wet out and mixed into the PRM, or these might be removed, optimally so that the concentrated-stabilizer-mixture is not visible within the PRM. Then, if desired, about 40 ml. of the PRM might be taken from the batch and put in another separate jar and added to about 2 teaspoons of the Mearlin® Luster pigment, "Supersparkle" which is made using mica and titanium dioxide, and offered by Engelhard Corporation of Iselin, N.J. These might be mixed, preferably well, to form a concentrated coloration mixture which might then be added into back the batch of PRM and preferably mixed into it well. This PRM may then be catalyzed with about 5.25 ml. Cadox® M-50 MEKP, stirred well and poured into the planar negative space of the elastomer mold which may not be coated with a mold release agent. If desired, after this cPRM is put in its mold, this mold might be covered with a piece of cardboard resting on the top edges of the mold's perimeter walls, leaving an enclosed air pocket in between the surface of the cPRM in the mold and the underside of the cardboard roof over the mold (as in FIG. 74), so that the polymer formed will be more of a smooth, level plane. Two days after this polymer is formed it is removed from its mold, cleaned well using cationic cleaner and water, and allowed to dry. An existing 8"×10" Polaroid photograph of the inventive image in FIG. 5.I. is immersed in water about 160° F. water for about 4 minutes, at which time it is transferred into cold water. While under water, the transparent photographic emulsion is removed from its Polaroid backing carefully so that it does not tear, and placed on a sheet of acetate or Mylar to temporarily support it, with the front side of the photo emulsion against the acetate or Mylar. The polymer image support is nearby, but not in the water. Using the acetate or Mylar, the photographic emulsion is lifted out of the water. If the emulsion is distorted (e.g., wrinkled undesirably), this is straightened out as desired, e.g., by dunking the emulsion in and out of the water so that it flattens as desired on its temporary acetate or Mylar support. Once it is out of the water, the exposed side of the photographic emulsion is placed onto the polymer image support aligned as desired. Then the acetate or Mylar which is face up is removed. If the emulsion has any undesirable distortions such as wrinkles, these are corrected as desired, e.g., in this process water may even be put on the inventive image. Meanwhile, the photographic emulsion is intentionally distorted, as shown in FIG. 5.V. The resultant inventive image may be complete, but if not, it might be further processed.

For example, once this inventive image is dry, more cPRM (e.g., of the same composition which was used to make the polymer) might be applied on it (e.g., painted on) forming a narrow band straddling the perimeter of the photographic emulsion and the bare polymer surface, securing the edges of the photographic emulsion to the rest of the inventive image on its top plane as well as it side edges. Alternately, this inventive image might be superimposed by a Separating Layer Stabilizer of polymer either of the same composition of cPRM in the polymer plane or of a bonding composition (e.g., transparent, colored or colorless, even or uneven, textured, undulating or smooth, as thick or thin as desired, etc.), completely embedding its photographic emulsion. Its Separating Layer Stabilizer might be entirely or partially superimposed by a surface preparation stabilizer to enable further superimpositions, e.g., for bonding purposes for instance to paint applications, printing, writing, drawing, etc. perhaps using conventional practices such as oil paint, acrylic paint, ink or watercolors. The resultant inventive image could have two superimposed layers of marks made by painting, drawing, writing, printing or a combination of these, with a photographic transparency, iridescence, real spatial depth and real light in between all of these layers. The resultant inventive image may be the image desired, but if it is not, it might be further processed.

In some embodiments, inventive images are made which resemble conventional architecture that is made largely of glass, e.g., a house, a pool house, a beach home, a shop, a green house, a building resembling the glass *Grand Louvre Pyramid* by I. M. Pei, etc. But among their primary differences, these inventive images are made largely of polymer that is transparent, translucent, partially opaque or a combination of these, instead of glass. Thus, they are artistically designed with more diversity than the conventional architecture they resemble, and/or they have less additional non polymeric structural support visible than the conventional architecture they resemble. For example, inventive images are made which resemble conventional architecture that is made largely of glass, but they have artistic variations which can not be made in glass and they are made using a cross linked polymer which makes them stronger than glass, thus they require substantially less metal reinforcement.

FIG. 14V. is a side view of inventive image stairs with tapered edges, made of a strong, transparent, cross linked polymer with metal bonded underneath (such as ornamental ironwork and/or metal with a reflective upper surface), though the metal is not indicated in the illustration. Each stair might for instance have been made with multiple layers of cPRM (e.g., 5-20 layers), with see-through coloration.

Figure 78:
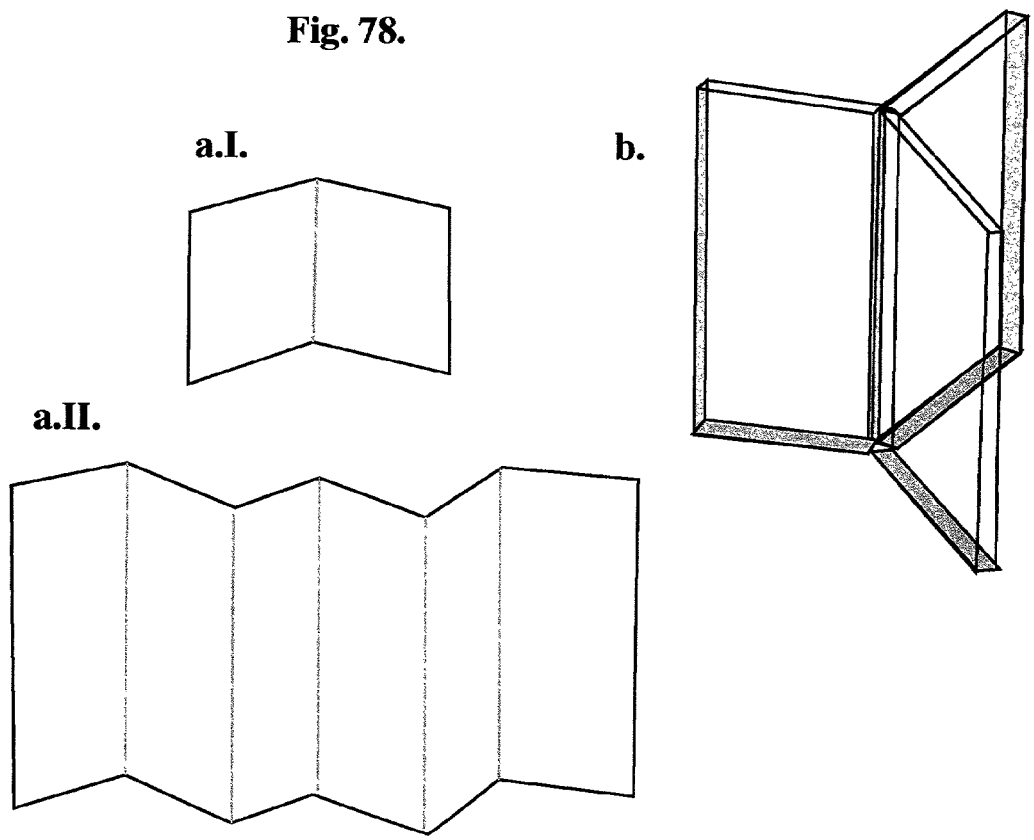
FIG. 78 shows examples of inventive images with their form and their structure united.

FIG. 78, shows 3D inventive images made of multiple planes which have their structure and their form united, 78.a.I.-a.II. might function as art and/or as screens or partitions, or even as cards, depending on their size and on the applications made on them, e.g., writing. The inventive image in FIG. 78.b. has a form that is similar to a revolving door. It might for example be further processed with design elements on all of its six external surfaces, e.g., painting, drawing, photography, collage, printing, etc. This image in FIG. 78.b. could for example function as a revolving door, or as an art work revolving around a central pole (as in art by Marcel Duchamp exhibited in New York City in 1997). Alternately inventive image of FIG. 78.b. could be stationary, displayed for viewing, e.g., as art.

In addition to their aesthetic functions, inventive images, serve other architectural functions, or they are architectural design, e.g., interior architecture, landscape architecture, etc. Planar inventive images might for example, be used as walls or as part thereof, windows, skylights, doors, partitions, shades or shutters, fences, gates, flooring or part of flooring, etc., (even for example, if they were previously used as fine art, e.g., as paintings or sculptures). These inventive images can be made to be strong and permanent despite their use and despite their exposure to light, despite the impact and other wear they might encounter. Many of the inventive images illustrated herein could be walls, such as those in FIGS. 1.d.1. and 1.d.2.; 2., 5.; 14.I.-IV.; 67.giii. and g.iv.; 79.VI.; 82 and 84. For example, the inventive images in FIGS. 14.I.-IV. can function as facades of buildings, or as walls inside of buildings. The inventive image in FIG. 14.I. may be made of transparent or translucent polymer, with coloration not illustrated. Its fifteen arches are either negative spaces (openings), or they are polymer windows. The inventive image in FIG. 14.II. is made of colored polymer with special light effects and seven rectangular polymer windows. The inventive image in FIG. 14.III. has an artistic design, the rectangular shape on its left side is a door frame and the circular formation within it is either a gate or the design on the door. The inventive image in FIG. 14.IV. is made of polymer colored in gradations of value from light to dark.

In some embodiments, inventive image ceilings are made in parts. They are aesthetically varied and they are installed in different kinds of locations using different methods, means and manners, e.g., conventional practices used in sculpture, architecture, engineering, construction, etc. As an illustration, inventive image ceilings are made in curved parts and installed in various ways, e.g., some are made on curved molds, some are made in tiered processes, some of these curves are made while their cPRM is gelled. These parts might be bonded together with fiber reinforcement. The curve of this inventive image ceiling can be altered as its parts are connected, e.g., increased and/or decreased. One of these inventive image ceilings may be a dome. As another illustration, inventive image ceilings are made with two or more superimposed parts (e.g., for aesthetics, structure or both), with or without negative space between their superimposed parts, and/or with or without unique effects of color and light, as desired. For example three square parts of different sizes may be superimposed so they are smaller as they are closer to viewers (e.g., in an Albers pattern).

In some embodiments, inventive images are made which are ceilings and skylights, e.g., indoors or outdoors (for example on a patio or pavilion). These images might for instance be made so that they change as sky changes, e.g., they allow any degree of visibility of the sky, the stars, storms, lightning, rain, etc., for example by showing changes in light and color. For instance, inventive image ceilings and skylights might be made with light effects, e.g., using light sources and reflective materials and media such as mirrors, dichroic materials, crystal, see through fibers, colored light, fluorescent materials, lenses, gratings, Fresnel Lenses, prisms, paints (such as in veil layers and/or layered in broken color); metal leaf, mica, photographic transparencies, shadows, negative cut outs, negative spaces between connection seams, drawings in light, photochromic effects, or combinations of these, etc. In some embodiments, inventive images ceilings and skylights are made which appear to recede in space, e.g., using illusions of a sky, transparency and/or translucency, they bear a painted copy of the Sistine Ceiling, using other means, or using a combination of these.

As Window Example 1)., a set of large inventive image picture windows are made for a building using the inventive medium. These inventive images picture windows are designed to obscure, blur, distort, or partially block, the view through them to any extent, the light passing through them to any extent, or a combination of these, as desired. As Window Example 2)., inventive image large picture windows are made that have one or more representations of nature on them, such as one or more photographic transparencies, a painting and/or a collage of mountains, ocean, a waterfall, a garden, etc. As Window Example 3)., inventive image windows are made which are see-through copies of conventional images. For instance, one of these inventive images windows might have a transparent copy of Vincent Van Gogh's painting, *The Starry Night* 1889, and another might have a copy of a Louis C. Tiffany stained glass window. However, because the metal subdivisions which are essential to structurally support such conventional stained glass images are not structurally necessary in inventive images, the metal subdivisions Tiffany had to use in his stained glass image, are intentionally left out. Thus, in comparison to stained glass windows and to the specific Tiffany windows that are copied in these inventive image windows, these inventive images are visually continuous. As Window Example 4)., inventive image windows are made that have embedding in them, e.g., embedded effects of coloration and light brought by one or more materials, media, object, devices, and their combinations that alter the light such as prisms, crystal, dichroic materials, reflective subjects, paints, texture, light sources, other coloration, or combinations of these. In addition or instead, light coming through these inventive images windows might be directed in a particular way, e.g., in a direction or pattern for instance created by attachments, inlays, embedding, painting, photographs, texture, carving, other elements and combinations of these.

In some embodiments, see-through lunettes are made using the inventive medium. Real light passes through them into interior spaces. For instance, an inventive image lunette may be made of transparent polymer that is covered with small attached crystal or dichroic glass particles, collaged with photographic transparencies, painted with transparencies, or a combination of these.

In an embodiment, tiles are made using the inventive medium. For example, such tiles can be made so that they are more permanent than other transparent and translucent tiles, e.g., glass tiles. Most of these tiles are in standard sizes and geometric shapes, and most of them are made with strong polymer which can take some impact without undesirable effects. These tiles are all works in progress, finished when they are arranged and installed. These are examples. Tile Design 1. are tiles that are transparent, translucent, partially opaque or a combination of these. They are colorless with irregularly embedded natural and organic subjects, e.g., grasses, leaves, flowers, roots, pebbles, acorns, and other plant forms, combinations of these, etc. These might also be painted. Tile Design 2. is a set of tiles with one or more of the set having a logo, owners name, coat of arms or other such identifying symbol, mark or graphic on it. Tile Design 3. is the same as Tile Design 1. and 2., with additional light effects. For instance, some of them have iridescent pigments, some of them have bits of metal or metal leaf in them such as silver or aluminum leaf. Tile Design 4. These tiles are not necessarily made in standard shape or sizes. Instead their sizes and their perimeter shapes are designed to contribute to the illusion of spatial depth that they form when they are assembled and installed as the desired image, e.g., when installed their perimeter shapes form receding lines of perspective. Further Tile Designs are shown in the inventive images in the following Figs. provided they are made in appropriate sizes: FIGS. 1.*c*. and 1.*d*.; 2, 5; 14.IV.; 28-30; 38.*c*.-*d*.; 38.*e*.2.; 63.I-III, 64, 68.*d*. and 82.

In some embodiments, inventive image sets of columns are made for use in architectural functions. For example, one of these inventive images might be a set of four columns for a home. As an illustration, an inventive image set of twenty columns are made for a grand covered walkway through a garden area in a park. These columns are cylindrical polymer, with parallel vertical light qualities and effects all of the way around them. For example, air pockets in the form of prisms might be embedded in vertical lines in these polymer columns, extending their entire length, and repeating all of the way around them. Or these columns might be embedded with light reflective materials in vertical stripes all of the way around them. The roof of this grand walkway might also be made using polymer of the present invention to maximize its play of light and shadow, and its aesthetic. As a second illustration, an inventive image set of six slender cylindrical columns with the molded vertical indentations often seen on conventional columns might be made of transparent polymer, and painted and carved internally and externally so that they look even more fragile (e.g., so they look cracked), even though they are made with cross linked polymer and reinforced internally, e.g., with multiple layers of a fiber stabilizer which are not visible. These columns might hold up a roof on a promenade which looks like it is very heavy, e.g., it is dark in color and appears to be stone of some kind. Walking in this promenade, may be uncomfortable for viewers because it seems like the columns are about to collapse, unable to hold the weight above them. Other installed inventive image sets of columns give viewers very different aesthetic environments. For instance, one installed inventive image set of columns which are unusually tall, makes viewers feel as if they are floating, in a ethereal environment.

An abstract inventive image measuring 40"×40" is made as a multi-layered photomontage which begins on a polymer initial image support. A layer of cPRM is applied approximately 0.5" thick, into the 40"×40" negative space in a flat mold made using conventional practices. The cPRM is made of about 13110 ml. (13109.6 ml.) of Silmar® S-40 polyester resin monomer with the added stabilizer, about 262 grams of Tinuvin® 328. If desired, approximately 75 ml. of the polyester PRM might be taken out of the batch and mixed thoroughly with about 262 grams of Tinuvin® 328, completely wetting out the Tinuvin® powder to produce a concentrated-stabilizer-mixture (previously described). All of this concentrated-stabilizer-mixture might then mixed thoroughly into the PRM. If after mixing thoroughly, there are lumps of the concentrated-stabilizer-mixture in the PRM, these might either be broken apart, wet out and mixed into the PRM, or they might be removed so that no trace of the concentrated-stabilizer-mixture is visible within the PRM. This PRM is then catalyzed with about 131 ml. (131.096 ml.) Cadox® M-50 MEKP, stirred well and poured at a thickness of approximately 0.4" into the planar negative space of the mold which is not coated with a mold release agent. If desired, after this cPRM is put in its mold, this mold might be covered with a piece of cardboard resting on the top edges of the mold's perimeter walls, leaving an enclosed air pocket in between the surface of the cPRM in the mold and the underside of the cardboard roof over the mold (as in FIG. 74), so that the polymer formed will be a smooth, level plane.

Once this layer of polymer hardens, it is removed from its mold and all of the residual matter remaining on it from its mold (e.g., clay release agents, etc.) is cleaned off of its two large surfaces, though traces of matter may be left on its side edges. Then the first of the three layers of the abstract photomontage of this inventive image is made on one of the sides of this hardened polymer surface using two photographic processes simultaneously, listed in the following description as 1). and 2)., with or without additional processing listed herein as 3). A collection of over 50 Polaroid photographs taken of a variety of subjects, was previously prepared. Though many of these photographs are easily identifiable representations of objective reality, they were taken and chosen for their abstract elements, such as their colors; their abstract shapes, lines, etc. In Processes 1). One at a time selected Polaroid photographs from the collection are immersed in water that is about 160° F. or a higher temperature, for 4 minutes. Each photo is then removed from this heated water (e.g., it can be lifted with tongs), immersed in cold water, where its transparent photographic emulsion is removed from its conventional backing, removed from the cold water (e.g., with the support of a sheet of acetate on the side of the emulsion which will be used as its front side), and then laid as desired on the polymer surface. (Then if acetate or another temporary support was used to transfer an emulsion onto the inventive image, it is peeled off of the emulsion once it is laid on the polymer surface.) The emulsion can also be flattened as desired on the polymer surface. Less then a third of the total collection of photographs is used on this layer of the abstraction. Before it is transferred onto the polymer surface, as it is transferred onto the polymer surface, once it is laid onto the polymer surface, once it has dried on the polymer surface, or at more than one of these times, each of these photographic emulsions is altered in a way which makes it impossible to determine what its original real objective subject matter was. For example, each of these transparent photographic emulsions might be wrinkled, torn, cut, perforated, folded, stretched, drawn upon, painted upon, sgraffito might be done in it, it might be superimposed by another photographic emulsion, it might be superimposed by other processing, or it might be altered in a combination of these ways, as desired. These photographic emulsions are placed on the polymer surface in the position desired, often with negative space between them, sometimes overlapping one another to varying extent and sometimes they are pressed onto the polymer surface, e.g., by passing a roller over them, or by setting a weight upon them such as a sheet of glass. Thus their realistic pictures loose clarity and distort. On the polymer surface, these photographic emulsions begin to form the desired abstraction.

In Processes 2)., one or more Polaroid photographs are taken of various subjects, again for their abstract elements, not for their portrayal of objective reality. But rather than allow them to develop for the time necessary to produce a standard Polaroid print, each is pulled off of their negatives early, e.g., after 10-15 seconds rather than after 60 seconds. Then each of these Polaroid prints is set aside and its negative is used to transfer the photographic image or one or more parts of it onto the polymer surface. This is done by pressing this negative face down against the polymer surface as desired, preferably having warmed the polymer surface in advance (e.g., with a hot air blower). In general, keep the negative pressed down against the polymer surface for about 2 minutes, however this time can be varied for different effects, e.g., the negative can remain down for any amount of time between 1-30 minutes. Also, during the transfer, keep the negative warm e.g., with hot air, and if desired pass over it with a roller, keep it weighted down, or both. Various effects might be produced on the inventive image surface by cutting these negatives and then only using one or more parts of them, by using them repeatedly on the polymer surface (which will likely produce progressively faded image transfers) and by preparing the polymer surface differently for receiving these images transfers, (e.g., by coating the polymer surface with various materials, etc.). For example, often the same negative is used in whole or in part, repeatedly to transfer a photograph or a part of a photograph onto the polymer sheet in multiple places, at different angles creating a sense of repetition with variation. Then, if desired, the underdeveloped Polaroid prints (which were pulled off of the negatives used for these images transfers), can be used to make pale emulsion transfers on the polymer surface as desired, using the underwater method of emulsion removal described above in Process 1).

In Processes 3). If desired, painting, drawing, sgraffito, other processing or a combination of these can also be done as desired on this abstract surface, e.g., before and/or after this abstract layer is formed, and/or as it is formed.

If desired, the use of one or more of these kinds of further processing can also form desired bonding spots or bonding areas for connecting the layer of new cPRM which will be superimposed subsequently. For example, marking (such as painting and drawing) can be done using media which contain a bonding substance (like the same cPRM), and sgraffito can expose bare polymer bonding spots. Throughout the process of making this layer, this inventive image is continuously viewed from both of its sides. In the process of making the abstract elements of this layer, processing that is done to this polymer surface that is undesirable or less than desirable can be reworked or removed, as desired.

Once the surface of this inventive image photomontage is about 30% covered with the desired abstract elements, e.g., colors, shapes, sizes and of various degrees of transparency and translucency, it is checked to make sure it has bonding spots. Then, a mold wall is built around this inventive image (e.g., out of oil formulated clay), and a Separating Layer of the same cPRM is superimposed over the layer of abstract elements, if desired the same kind of cardboard roof might be used over this layer of cPRM that was previously described so that its surface hardens flat and smooth. Then, on either side of this inventive image, the aforementioned processes 1). and 2). are repeated, and using 3). if desired. Again, throughout the process of making this second layer of abstract elements, this inventive image is viewed continuously from both of its sides. This new, second layer of abstract elements is then superimposed with another Separating Layer of the same cPRM which bonds to it as desired. If desired, the same kind of cardboard roof might be used over it that was previously described so that its surface hardens flat and smooth. Then, the third and final layer of abstract elements is added to this inventive image on either of its polymer sides, as desired, again using the photographic processes 1). and 2). and if desired, 3). Again this inventive image is viewed from both sides throughout the formation of this final layer of abstract elements. With the completion of this layer the abstraction is finished, and a final Separating Layer of the same cPRM is superimposed, and if desired, a cardboard roof might be used over (as previously described), completing this inventive image photomontage.

Note that if desired, fiber (e.g., stabilizer) can be used in this inventive image photomontage, (such as for aesthetic purposes, structural use or both), e.g., an embedded fine open weave fiber glass stabilizer which is invisible to the unaided human eye. For instance, fiber can be added onto one of the polymer surfaces of this inventive image before and/or as one of its three abstract photographic layers are formed. For example, prior to forming one of these abstract layers, a thin coat of the same cPRM which was used to make this polymer can be painted on it using a conventional paint brush, and/or fiber can be added when the polymer is gelled. While this polymer surface is wet, a single sheet of fiber 40"×40" or slightly larger can be attached and pressed into the wet cPRM, eliminating undesirable air bubbles. Then this attached fiber can be fully embedded in polymer by a superimposed layer of the same cPRM, and if desired, it might be covered with the cardboard roof such as that previously described. Once this hardens, any fiber extending out beyond the edges of this image can be reworked as desired (e.g., cut off, sanded, and smoothed out with cPRM), and then the abstract layer can be formed on this polymer surface as desired.

If desired, variations of this inventive image can be made by giving it one or more additional layers of polymer (e.g., with surface preparations stabilizers) which have marking using means which are not photographic, such as a layer of drawing, painting, printing and or a combination of these.

This inventive image photomontage might be mounted at a distance of approximately 5" out from a white wall which is lit with normal overhead lighting, natural light from windows and reflected light. For example, this might be done in one of two ways. In one installation method, this inventive image photomontage might have a metal frame around it, e.g., steel, encircling its perimeter which is slightly wider than the width of this inventive image. In a second example of an installation method for this inventive image photomontage, three or four metal mounts can be installed in this inventive image as it is made, e.g., installed within its layers of polymer and reinforced with fiber if desired, for example, perhaps worked into the abstract design and/or hidden by it. These metal mounts can either directly connect this inventive image to a supportive structure that is behind it or above it (e.g., to a wall or to the ceiling), or these mounts can connect the inventive image to another mount part that connects the inventive image to a supportive structure. Then, several years later, the owner of this inventive image photomontage might change its function installing it in a wall as a window where it viewed from both sides. If it was installed about 5" out from a wall using the installation method described above, its mount can be stripped down to its basic minimal band of metal encircling the perimeter of this inventive image, and then installed in the wall as a window. However, if this inventive image photomontage was installed about 5" out from a wall using the second method described above, all of the mount of this inventive image which extends beyond its surface is removed. Then, if the mount parts inlaid in this inventive image are not aesthetically undesirable, they are left within it and this inventive image is installed as a window. However, if the mount parts installed within this inventive image are aesthetically undesirable, they can be removed and the inventive image photomontage can be reworked so that it is once again both aesthetically and structurally desirable. For instance, these mount parts might be removed from this inventive image by sanding away the polymer around them. Once they are removed, the negative cavities in this inventive image can be reworked using the same cPRM, any abstract elements desired, and pieces of fiber if desired in the same processes which were used to make this inventive image.

Inventive images are furniture, e.g., tables, chests, cabinets, stools, carts, chairs, benches; etc. In an illustration, inventive image furniture can be made in conventional forms which have glass, but polymer can be used in place of their glass. Also, inventive images serve household functions, though there is no limitation on the context of their actual use. For example, bowls, trays, cups, plates, goblets, pitchers, soup tureens, placemats, stools, refrigerator doors, etc. Numerous artists and architects have been noted for their images which function as household objects. As an illustration, cups made of transparent plastic which are not of the present invention scratch with normal use. These scratches are visible on such conventional cups and often they alter graphics or text. Generally, after a while, such conventional cups are no longer aesthetically desirable. Inventive image cups can be made with or without graphics and text that will not scratch as easily by using crosslinked polymers of the present invention. Furthermore, aesthetic variations can be used on inventive image cups in a much broader range than in conventional cups like the one in this example. As a second illustration, inventive image are made which serve household functions (such as goblets, plates, dishes, trays, pitchers, bowls, vases, etc.) which are made using see-through polymer and metal, e.g., silver, bronze, brass, aluminum, ornamented metal work such as filigree or a combination of these. For instance, conventional images made of glass and metal which serve these functions can be copied, or copied and varied using polymer in place of the glass, e.g., an antique goblet with a glass cup, an ornate silver stem and base and a silver filigree rim can be made as an inventive image using polymer instead of glass. The resulting inventive image can be made stronger and more permanent than these conventional images, and with vastly more aesthetic variations than these conventional images. In a third illustration, fine conventional glass images which serve the household functions described in this example, can be copied or copied with variations using the present invention, instead of the glass or instead of some of the glass. For example, many conventional crystal images, and many parts of conventional crystal images do not take advantage of the high refractive index of crystal. These can easily be made as inventive image substituting polymer for the crystal or other glass. Again, the resulting inventive image can be made stronger and more permanent than these conventional images, and the resulting inventive image can be made with vastly more aesthetic variations than these conventional images. As a third illustration, inventive images which serve household functions have one or more embedded sources of diverse coloration.

As further examples, inventive images might be used as, cases, containers, a tent, an awning, a banner, a fountain, signs; patio, pool or lawn furniture, etc. For example, one such inventive image used outdoors (e.g., a wall), might have new unique light qualities and effects designed to work with the changing natural light outdoors, e.g., light effects which are seen as changes in colors on its surface, as the sun rises and sets.

Inventive image containers are made which are called "baskets," though most of them do not look like regular baskets. Basket 1. is polymer with negative cut-outs in it. Basket 2 is rigid crosslinked polymer colored internally with dissolved washes of bright colors, and with embedded particles of different shapes and sizes. It has no holes. It was cast in a single pour of polymer in a single mold. It has an opening at its top which has no cover. It has a flexible polymer handle attached using a metal piece made for attaching handles to purses and tote bags. Basket 3. is transparent. It was made in separate pieces of rigid polymer and which then were connected together using a bonding substance, thus it has a very geometric, architectural look. It has a top piece which is hinged onto it. Basket 4. was made as a single large curved rigid polymer form, that was cast in tiers. Its tier edges were sanded down so that its surface is a smooth curve. It is substantially larger than Basket 2., and its top opening is substantially wider than Basket 2. Basket 5. is made of multiple curved rigid polymer parts attached to one another either with, a). a metal framework holding them together rigidly, or b). using metal loops which enable the curved parts to flex and move. Basket 6. is polymer painted realistically to look like a real straw basket, but on closer inspection it is clearly not straw. It contains fiber stabilizer that is slightly visible. It may be used on the floor and on counter tops, e.g., holding flowers, fruit, eggs, decorative objects, magazines, mail, etc. Basket 7. is colorless and completely transparent with its hardware, (e.g., hinges) and its contents completely visible. It functions as a purse. Basket 9, is flexible, made of polyvinyl chloride pieces made according to the present invention that are bonded to one another, e.g., used at the beach on trips, etc. Basket 10. is flexible, made of colored woven strips of polyvinyl chloride made according to the present invention. Basket 11. is used over Easter for visual observation and to hold things like eggs. Basket 12. is made of crosslinked rigid polymer cast about 0.75" thick. It is used to hold, carry and display a collector's Faberge eggs. It has a top opening that is very wide. Though its sides are colorless and transparent, its base is mirrored. Basket 13. is an inventive image comprised of 15 baskets without any handles, made, painted, displayed and sold in a Compositional Arrangement that is one inventive image. Its Compositional Arrangement is rearrangable as desired. Basket 14. is a limited edition of 2000 baskets made by a fine artist and sold through an art gallery. Basket 15. is paper with a flexible colored polymer handle. Basket 16. is polymer with inlays which give color it and light effects. Basket 16. is very thin, but it is a crosslinked polymer and it has fiber installed medial within the thickness of its polymer. Basket 17. has juxtaposed areas that are partially opaque and areas that have light effects. Basket 18. is painted opaquely. It is a container that is lined on its inside with silver leaf. Thus, when it is viewed from its outside, this underlayer of silver reflects light through its multiple superimposed layers of see-though color, comprised of polymer and non polymeric ingredients.

Inventive images are made with one function which is changed after a period of time. In comparison, the function of images made using many conventional practices often can not be changed. As an illustration, a sculpture of the present invention is made which is a mushroom shape with a flat top surface that is approximately 30" high and 30" in diameter (though its surface is irregular, rather than a perfect circle).

After years of living with this sculpture, it comes to be used as a table. In a further illustration, a sculpture of the present invention made of 3 separate solid polymer cubes with internal coloration and light effects measuring, 16" high×12" deep×15" wide; 15" high×14" deep×17" wide; and 14" high× 16" wide×14" deep is sometimes used as three seats. As another example, an inventive image is made which functions in one way but once it is slightly altered, it functions in a completely different way. For example, the holes used to mount a polymer painting of the present invention against the wall, are used to attach legs onto it so that it becomes freestanding as a new form of painting, sculpture, room partition, table, etc. Later these same holes are used to mount this inventive image as a ceiling skylight.

In another example of image making using the present invention, whether or not they are physically connected, two or more image parts might be layered parallel to one another or more or less parallel, or they might be layered with one or more negative spaces in between them in an image of this embodiment.

Constructions are made using the inventive medium. For example, because constructions often have overlapping layers, the uses of transparency, translucency, and other light effects can result in inventive images with new and unique effects. Further examples of inventive image constructions are shown from side views installed on walls in FIGS. 79.I., III.-V., IX., XIII.-XV., XVII. and XIX.

FIG. 4. shows a group of cut-outs made using the inventive medium. Each could be a separate inventive image or two or more of them could form an image together (connected, partially connected or not connected), e.g., as a wall pieces or in a mobile. Whether these image cut-outs are 2D or 3D, their internal white shapes can be negative spaces and/or positive areas. The polymer parts in these cut-outs might be rods, bars, planes, strips or a combination of these made in a number of different ways, e.g., cast and/or made using subtractive processes (cut, carved, or sanded down) and/or made by connecting multiple separate parts. The cut-outs in FIG. 4. might be installed in different ways to form images in different art forms, e.g., hung from the ceiling to form an installation, stage set or mobile; mounted from the floor using rods or a stand to form a sculpture or stage set; mounted on or from the wall as a wall piece or construction; placed or mounted on or near the floor as sculpture; mounted on a larger image support as a wall, a window, a painting, a sculpture, a table top, etc. If these cut-outs of the present invention are transparent, translucent or both, and particularly if they also have negative spaces cut within their forms these cut-outs offer uses of light, and uses of light with space (e.g., negative space and spatial depth), which are new and unique in images and in image making.

FIG. 6. shows another example of an image that can be either 2D or 3D and which can be made in many different processes, as described previously.

Figure 38:
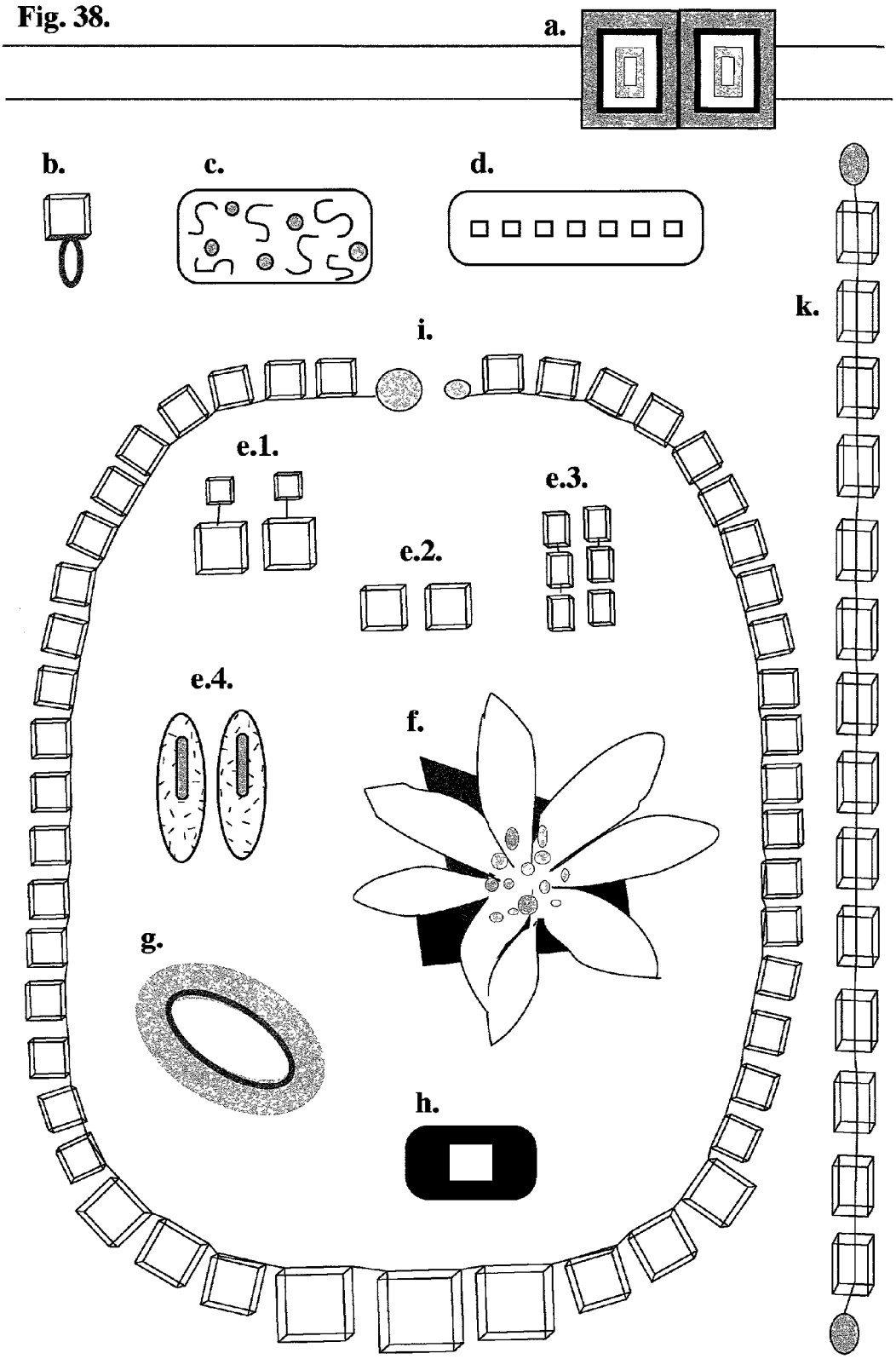
FIG. 38 shows inventive images made with control, precision, craftsmanship and delicacy.

These are examples of a high level of control, precision, and craftsmanship that can be achieved in 2D and 3D inventive images. The delicate inventive images in FIG. 4. (described above) show a high level of control, precision, and craftsmanship using the inventive medium, regardless of their size, whether they are 2D or 3D, e.g., they can be made with diameters of approximately 1" to 100", with thicknesses approximately 0.015" to 10" thick, or with their thickness varying, as desired. If the inventive images in FIG. 38 are made small, (e.g., as personal images such as jewelry), they are fine, delicate forms which could only be made with a high degree of craftsmanship, precision and control. For example, the inventive image in FIG. 38.*a*. could be a flexible image belt with a rigid multi-colored polymer belt buckle completely made of the inventive medium; 38.*b*. might be a ring; 38.*c*. might be a bracelet or a pin, the "S" shapes in its design might be incised and the gray circles in its design might be paint or they might be polymeric or non polymeric inlays (such as stones, crystals, gems, glass or polymer); 38.*d*. might be a bracelet with inlays indicated by the central row of small squares; 38. *e*.1.-4. might be four pairs of earrings, two of which are made of precisely connected parts; 38.*f*. might be a very delicate flower pendant or a pin (this image may be volumetric or planar, 2D or 3D, its petals can be rounded, they can curve, they can extend up and out from the flower's center, etc., as desired); 38.g. may be a bracelet; 38.*h*. may be either a ring or a bracelet with either a negative space in it or an inlay in it indicated by the white square; 38.*i*. might be a necklace; 38.*k*. might be a bracelet, anklet or watchband (both 38.*i*. and *k*. have precisely connected parts). Jewelry made using the inventive medium such as these examples, can be made using polymer that is transparent, translucent, partially opaque or a combination of these, which can even simulate gems and stones. Further the backsides these polymer "gems" might be colored in ways that also give them desirable light effects, e.g., colored with dichroic paper, aluminum leaf, a fluorescent or iridescent material, mica, a combinations of these, etc. Such jewelry can be produced less expensively than comparable jewelry with real gems, stones and gold.

FIG. 38 shows the precision and control with which multiple parts of inventive images parts can be connected. The inventive images in FIG. 38 may be any size, and they may or may not have non polymeric parts. For example, the polymer parts used to make the inventive images in FIGS. 38.*e*.1., *e*.3., *i*., and *k*., might be connected by a). a fine wire (e.g., a fine stainless steel wire or a fishing wire), this wire may be knotted, or even knotted to a small piece of fiber within the polymer parts it connects; b). a thin band, rod bar or strip of polymer that is rigid flexible or both, c). fiber, d). string, cord, or rope, e). a combination of these. Any of these connector parts might for example be cast in the cPRM used to make these inventive images and/or they might be joined to these inventive images after their parts are formed. For instance the connecting part of the inventive image in FIG. 38.*k*., might pass through a hole in each of its parts. In another example, the inner band of the inventive image in FIG. 38.*g*. (illustrated in dark gray) might be made of a metal mechanically bonded by SSI to the larger outer polymer band (illustrated in a lighter gray), or the metal inner part of this inventive image might be slightly inlaid in its larger outer polymer part. The square forms in the inventive image in FIG. 38.*d*. might be precise inlays, e.g., held in place as gems are secured in jewelry. Or, these square forms might be attachments, or negative spaces in this image. In another example, the upper portion of the delicate floral inventive image in FIG. 38.*f*. might be made completely of polymer, and most of this inventive image might be backed by a reflective piece of metal, fiber or both for strength. Thus if the polymer upper layer of this inventive image is transparent and/or translucent, a metal underlayer will reflect light through the polymer above it, making this image look brighter and lighter. FIG. 38.*a*. shows an inventive image belt comprised of a rigid polymer buckle on a flexible belt. This belt buckle may have been made using a tiered process in which five, increasingly smaller, differently colored polymer tiers were superimposed, on each of two rectangular polymer surfaces.

In embodiments, inventive image parts may be connected by sewing, binding, looping, bracketing, wiring stringing, and hooking multiple parts together to make inventive images. In some embodiments joints are made between multiple parts of inventive images which interlock, e.g., snap, hook or clip together. Large surface irregularities are often used for such purposes, and flexible polymer is useful for such purposes too.

A variety of other inventive image lamps are in FIG. 42, many without illustrations of the light sources which might be behind them. The inventive image in FIG. 42.a. is made of multiple hollow cube shaped polymer parts, that are darkly and translucently colored and that might have light bulbs within them. The inventive image in FIG. 42.b. is made with polymer rods and undulating polymer planes, behind which may be two tube shaped lights. The inventive images in FIGS. 42.c. and e. have coloration and perforated polymer forms. The inventive image in FIG. 42.d. has a base (e.g., made using conventional practices), and its polymer shade resembles stained glass. The inventive image in FIG. 42.f. has coloration embedded in its polymer. The inventive images in FIGS. 42.g. and j. have painting made using conventional practices. The inventive image in FIG. 42.h. is made of flexible polymer with coloration in gradations, with a vertical row of hanging rigid polymer parts on its right side. The inventive image in FIG. 42.i. is made of a metal netting with attached colored polymer pieces. These can all be further processed as desired, e.g., with unique new light effects, such as those described herein.

Inventive images might serve personal functions, e.g., they jewelry, hats, clothing, tote bags, belts, costumes. In an illustration, inventive image clothing is made, for instance using conventional practices and polymer that is rigid, flexible or both, e.g., the inventive image in FIG. 38.a. is a belt which has flexible and rigid parts.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A method for making a synthetic fine-artist's image-making canvas support medium as a new reinvented version of the conventional utilitarian fine artist's canvas, wherein the new reinvented canvas support medium facilitates the creation of art, design or architecture therewith, thereupon or therefrom, referred to herein as an image, which method comprises:
   preparing the canvas support medium with at least one non-conductive or poorly conductive polymer and forming the canvas support medium so that it can support its own weight or be free standing and the method requires one or more of A)-(F):
   (A) the at least one polymer is non-absorbent, the canvas support medium is formed with a visible surface that is transparent, translucent or both to allow light to pass into it or through it, the canvas support medium is made with at least one fine-art stabilizer present to provide or enhance a property of the polymer, and the canvas support medium is made with polymer or with polymer and a fine-art stabilizer providing sufficient mechanical or structural properties so that the canvas support medium can support its own weight or be freestanding, and additionally, the canvas support medium is prepared according to A-1 or A-2:
   A-1 the at least one polymer is partially or entirely poly(methyl methacrylate) or acrylic, or it is partially or entirely a polymer made with a methacrylate ester or methacrylamide derivative, and
   (i) an impact modifier stabilizer is present; a stabilizer is present that affects surface flow or leveling, or a stabilizer is present that facilitates superimposing applications; a stabilizer is present to further enhance the ability of the formed canvas support medium or the image to remain color stable or to remain unchanged with exposure to ultraviolet light; or a stabilizer is present that enhances bonding or that is a surface preparation stabilizer layer,
   (ii) the at least one polymer is: (a) partially or entirely 2D planar; or (b) partially but not completely poly(methyl methacrylate) or acrylic, or it is partially but not completely polymer made with a methacrylate ester or methacrylamide derivative; or
   (iii) the canvas support medium has: deckled edges, irregularities throughout resembling the texture of handmade paper, texture resembling conventional canvas, or a polymer form that is partially rigid and partially flexible, or,
   A-2 when the at least one polymer is a different non-absorbent polymer than that described in A-1 above, it has a stabilizer present to enhance the ability of the formed polymer, the canvas support medium or the image to remain color stable or to remain unchanged with exposure to ultraviolet light, and the canvas support medium also has one or more of (i)-(iii):
   (i) the at least one polymer is made with only one monomer or one polymer and this at least one polymer is: (i-a) consistently rigid, 2D planar polyvinyl chloride with a stabilizer to enhance bonding, or (i-b) one that differs from polyvinyl chloride,
   (ii) the at least one polymer is a copolymer, the at least one polymer is a mixture with more than one polymer, or the at least one polymer is superimposed by a second polymer that differs from it,
   (iii) the canvas support medium has a stabilizer present that enhances bonding or that is a surface preparation stabilizer layer; it has a stabilizer present that affects surface flow or leveling, or it has a stabilizer present that facilitates superimposing applications; it has deckled edges, irregularities throughout resembling the texture of handmade paper, or texture resembling conventional canvas,
   (B) making at least part of the canvas support medium with: its at least one polymer being a synthetic absorbent polymer; one or more conductive polymers in addition to its at least one polymer; or an organic light emitting diode (OLED) made with one or more conductive polymers;
   (C) enhancing the ability to develop the aesthetic image by additive processes, or providing this development by:
   (i) making the canvas support medium as a transparent or translucent form with a surface preparation stabilizer layer or other stabilizer in or on it's surface that enhances or enables bonding to at least one conventional artist's medium;
   (ii) forming the canvas support medium with a polymer surface made with a stabilizer ingredient in it that bonds or fortifies the bond between it and one or more superimposed conventional artist's mediums, wherein this stabilizer ingredient is at least one conventional artist's painting medium, primer or binder; or
   (iii) developing the aesthetic image by using the at least one polymer to prepare one or more transparent or translucent separating layers separating applications, layers or attachments of one or more other kinds of aesthetic, design or pictorial elements on it's or on their opposing sides, and, the method requires at least one of (iii-1)-(iii-5) plus at least one of (iii-a)-(iii-f):

(iii-1) two or more of these transparent or translucent polymeric layers separate applications or layers of one or more kinds of conventional artist's mediums from this group: oil paint, encaustic, other oil based artist's mediums, paint stick, casein paint, vinyl paint, alkyd paint, watercolor, gouache, tempera, egg tempera, ink, pastel, charcoal, conte crayon, pencil, graphite, collage, photographic transparencies, and photographic emulsions;

(iii-2) one or more of these polymeric layers separate applications, layers or attachments of one or more kinds of aesthetic elements in (D) (i)-(iv) below, either with one or more applications described above in (iii-1) or free of them;

(iii-3) two or more of these polymeric layers separate applications, layers or attachments of one or more elements in (iii-1) or (iii-2) above, from an application or layer of acrylic paint;

(iii-4) two or more of these polymeric layers separate one or more kinds of applications, layers or attachments in (iii-1)-(iii-3) above from carving or incising that is free or nearly free of legible text; or (iii-5) two or more of these polymeric layers separate one or more kinds of applications, layers or attachments in (iii-1)-(iii-4) above from at least one LED, OLED or light source;

moreover, in addition, the method requires that all of these layers bond to one another or that they be bonded to one another to make one whole form, and one or more of (iii-a)-(iii-f):

(iii-a) the form is made according to (iii-2) above;

(iii-b) the polymeric separating layers are: poly(methyl methacrylate) or acrylic and also non uniform, irregular, perforated or with a negative space; they are made with a methacrylate ester or methacrylamide derivative and also non uniform, irregular, perforated or with a negative space; they are made with polymer according to section (A) above; they are a polymer that is different from these; or they are a combination of these;

(iii-c) a stabilizer or surface preparation stabilizer is added to enhance or enable bonding;

(iii-d) both opposing sides of each polymeric separating layer are cleaned sufficiently to render them receptive to a conventional artist's medium named in (iii-1) above and to provide enhanced bond strength and permanence to facilitate development of the aesthetic image;

(iii-e) the canvas support medium or image is accompanied by instructions for the development or further development of the aesthetic image; or (iii-f) the work is prepared with a means or a key part of a means of installation or display;

(D) preparing the canvas support medium or image with a polymeric, visible, aesthetic element: (i) at least part of the positive or negative form of which functions as a lens, a Fresnel lens, a grating, a diffraction grating or a prism; a transparent or translucent lenticular lens or form; or two or more of these; (ii) with a photochromic effect and a form made for viewing apart from the human face, unsuitable or uncomfortable to wear on the human face or incapable of fitting on the human face, or with a dichroic effect; or (iii) with an electrochromic effect whereby it responds to changes in electrical current by changing or by changing it's state of or it's level of: transparency, translucency, reflectivity, light emission employing conductive polymer, it changes the path or color of the light passing through it, or a combination of these; (iv) one or more of (i)-(iii) that serves as part or all of an image support, an image support stabilizer or an underlayer; and this canvas support medium prepared according to (i), (ii), (iii), or (iv) is also prepared with one or more of (1)-(4): (1) a conductive polymer or an absorbent polymer, (2) a stabilizer that provides or enhances it's color stability or it's ability to remain unchanged with exposure to ultraviolet light; (3) it is cleaned sufficiently to render it receptive to artist's paint and to provide enhanced bond strength and permanence to facilitate development of the aesthetic image; or (4) it is developed into an aesthetic image by being used as an underlayer, as an image support, or as an image support stabilizer for a work with painting, drawing, a photographic transparency or collage; it is developed into an aesthetic image by the addition of a pictorial or a design element free of visible legible text or it is developed into an image of fine art; or the photochromic, dichroic or eletrochromic effect of (ii) or (iii) above provides a pictorial or design element, a picture or a drawing thereby developing the aesthetic image;

(E) preparing the canvas support medium according to (a) or (b): (a) with a form that is transparent, translucent or both and with a strengthening stabilizer that is internal or on it's underside that is invisible or largely invisible to viewers, wherein it is also prepared with (1) or (3) below; or (b) preparing the at least one polymer so that it is at least partially poly(methyl methacrylate) or acrylic, or it is at least partially polymer made with a methacrylate ester or methacrylamide derivative, and also this polymer is stiffened with one or more of: a different second polymer, an impact modifier stabilizer, a strengthening stabilizer of a different, stronger or more rigid polymer; or the fiber strengthening stabilizer in (3) below;

moreover this canvas support medium prepared according to (a) or (b) is also prepared with at least one of (1)-(4): (1) a stabilizer that provides or enhances it's color stability or it's ability to remains unchanged with exposure to ultraviolet light or alternately, a stabilizer that enables or enhances bonding to conventional artist's mediums; (2) it is cleaned sufficiently to render it receptive to artist's paint and to provide enhanced bond strength and permanence facilitating development of the aesthetic image; (3) a strengthening stabilizer that is a surfacing veil fiberglass or a fiber that becomes largely invisible or invisible to the unaided human eye when used within or under transparent colorless polymer or when used within or under transparent colorless polymer that penetrates it, that is at least about a quarter of an inch thick, or both, or (4) it is developed into an image by the application a conventional artist's drawing or painting medium to which it bonds, or it is developed into an image of fine art; or (F) preparing the canvas support medium or aesthetic image as or with a visible display device that includes multiple non-light-emissive colorants capable of changing their visibility, their color or both, with energy from a source that is part of the canvas support medium or image, or with energy conducted by the canvas support medium or image, so that the overall visual effect is sufficient to enable at least a portion of the canvas support medium or the aesthetic image to have a display that is a visible aesthetic, design or pictorial element, and the canvas support medium prepared with one or more of (A)-(F) above, is made with it's at least one polymer, or with one or more conductive polymers in an amount sufficient to provide or enable the image to have at least one aesthetic element, so that the reinvented canvas support medium facilitates artistic expression, and the creation and display of an aesthetic image that is art, design or architecture made therewith, thereupon or therefrom that is a work or object for visual observation or display and a whole in and of itself with distinct boundaries or edges; and the method also requires one or more of a)-h) below:

a) developing the canvas support medium into an aesthetic image that is art, design or architecture, wherein the canvas support medium has polymer providing or enabling at least one aesthetic element, and at least one of (a-i)-(a-iv): (a-i) the at least one aesthetic element is provided or enabled by an absorbent polymer; (a-ii) the at least one aesthetic element is provided or enabled by at least one non-conductive or poorly conductive polymer and: (a-ii-a) the image is made according to (A), (C), (D), or (E) above, or alternately, it is made according to (B) above with a conductive polymer OLED or free of the specifications of (F) above, or (a-ii-b) the image is made according to (F) above wherein the display device has conductive polymer or is free of conductive polymer and wherein the image is otherwise free of the specifications in (B) above and it is free of the specifications in (A), and (C)-(E) above, moreover, this image is fine art, it is architecture, or it is a work of design for viewing or display apart from direct contact with the human body rather than worn on it as fashion design;

(a-iii) making the canvas support medium into an image of fine art with a flexible, 2D planar, light-sensitive photographic recording material that has conductive polymer, wherein the canvas support medium also has conductive polymer that is separate from this photographic recording material which provides or enables at least one aesthetic element; or making the canvas support medium into an image of fine art free of this photographic recording material wherein the canvas support medium has conductive polymer that provides or enables at least one aesthetic element;

(a-iv) developing the canvas support medium into another kind of aesthetic image, or an image of design or architecture using a conductive polymer that provides or enables at least one aesthetic element and (1) or (2):

(1) conductive polymer that is separate from that in the canvas support medium's photographic recording material (above) or conductive polymer in a canvas support medium free of this photographic recording material provides or enables at least one aesthetic element and this conductive polymer: (1-i) leaves the thermal and static electrical properties of canvas support medium and the image substantially unchanged or constant; (1-ii) provides or enables an aesthetic element by conducting electricity, or by its use with electrical current, with electricity that flows or that can flow, or with non-static electricity, or (1-iii) provides or enables at least one visible aesthetic element; or alternately, (2) the conductive polymer provides or enables the canvas support medium and the image to have at least one aesthetic element that is audible, interactive or a light emitting;

b) accompanying the canvas support medium with instructions on developing it into an aesthetic image that is art, design or architecture and (i), (ii) or (iii):

(i) making the canvas support medium with a flexible, 2D planar, light-sensitive photographic recording material having conductive polymer and at least one other ingredient and accompanying it with instructions on how it's other ingredient or ingredients might be further developed to form an aesthetic image for viewing;

(ii) making the canvas support medium according to (F) above wherein the display device has conductive polymer or is free of conductive polymer and wherein the canvas support medium is otherwise free of the specifications in (B) above and it is free of the specifications in (A), (C)-(E) above, and wherein the canvas support medium is made for forming an image of fine art, an image of architecture, or an image of design for viewing or display apart from direct contact with the human body rather than worn on it as fashion design; or alternately, (iii) making the canvas support medium entirely free of the photographic recording medium, and: (iii-1) free of the specifications of (F) above; (iii-2) according to (A), (C), (D), or (E) above; or (iii-3) according to (B) above with absorbent polymer, or with conductive polymer that is separate from it's display made according to (F) above;

c) forming the canvas support medium with a polymer surface made with a stabilizer ingredient in it that bonds or fortifies the bond between it and one or more superimposed conventional artist's mediums, wherein this stabilizer ingredient is at least one conventional artist's painting medium, primer or binder;

d) forming the canvas support medium with an aesthetic texture made by taking one or more negative or positive impressions from one or more organic or natural materials, to make texture on the canvas support medium that resembles the organic or natural material's texture or each organic or natural materials' texture, a negative impression of it or them, or a combination of these, or such a texture made on the canvas support medium from at least part of a Nymphaeaceae Victoria also known as an Amazon Water-lily, however when the canvas medium is formed only according to (A) above and is free from the specifications in (B)-(F), the method requires making the canvas support medium in an overall form that is abstract or geometric, that appears unnatural, inorganic and nonhuman, or that is otherwise free from looking like the real natural or organic form or forms from which the texture was made, and therefore free from being: a realistic portrayal; a human, animal or plant form; or a specimen or model that looks like the real, natural or organic form or forms, e) forming the canvas support medium with: deckled edges, irregularities throughout resembling the texture of handmade paper, or texture resembling conventional canvas, or forming the canvas support medium with an aesthetic texture and a display having conductive polymer, an OLED having conductive polymer or with the display in (F) above, such that the aesthetic texture is deeper than small surface irregularities, or an ordinary sandblasted or sanded surface;

(f) preparing the canvas support medium with a means or a key part of the means of installation or display as an aesthetic image wherein the canvas support medium is formed: (i) according to (A), (C), (D) or (E) above, or with an absorbent polymer; (ii) with either a conductive polymer OLED or with the display in (F) above whereupon it is free or nearly free of visible legible text; or (iii) with conductive polymer that is not part of any OLED or display in (F) above;

g) preparing the canvas support medium with conductive polymer, with an OLED made with conductive polymer, or according to (C) or (F) above, and also cleaning it sufficiently to render it receptive to a superimposed artist's medium and to enhance the strength and permanence of the bond formed between that surface and an artist's medium; or h) the canvas support medium is prepared according to D (ii) or D (iii) above and the photochromic, dichroic or eletrochromic effect provides a pictorial or design element, a picture or a drawing thereby developing it into an aesthetic image.

2. A method for making a synthetic fine-artist's image-making canvas support medium as a new reinvented version of the conventional utilitarian fine artist's canvas, wherein the new reinvented canvas support medium facilitates the creation of art, design or architecture therewith, thereupon or therefrom, referred to herein as an image, which method comprises:

preparing the canvas support medium with at least one non-conductive or poorly conductive polymer and making the canvas support medium into a plurality of associated sheets arranged in a pad or book for image-making, or in a pad or a book with a form of or similar to a conventional blank paper pad or blank book for image-making, and one or more of (A)-(F):

(A) the at least one polymer is non-absorbent, the canvas support medium is made with at least one fine-art stabilizer present to provide or enhance a property of the polymer, the canvas support medium is made with a visible surface that is transparent, translucent or both to allow light to pass into it or through it, and the canvas support medium has at least one of these specifications marked (i)-(vi):

(i) the at least one polymer is flexible cellulose acetate, flexible polyester or polyvinyl chloride that is thicker than 2D planar, or it is flexible cellulose acetate, flexible polyester or polyvinyl chloride made with a stabilizer to enable or enhance bonding that is a conventional image making paint, size, or primer or a binder used in a conventional image making medium or material; alternately, the at least one polymer is made with a different polymer and: (a) a stabilizer to enhance or provide the ability of the formed canvas medium or the image to remain color stable or to remain unchanged with exposure to ultraviolet light, (b) a stabilizer to enhance or provide the ability to bond, or (c) both (a) and (b), (ii) the at least one polymer is a co-polymer, or a mixture of more than one polymer; or the at least one polymer is partially or entirely poly(methyl methacrylate) or acrylic, or it is partially or entirely made with a methacrylate ester or methacrylamide derivative; or preparing the at least one polymer so that it is at least partially poly(methyl methacrylate) or acrylic, or it is at least partially made with a methacrylate ester or methacrylamide derivative, and also stiffening this polymer with one or more of: a different second polymer, an impact modifier stabilizer, a strengthening stabilizer of a different, stronger or more rigid polymer; or the fiber strengthening stabilizer in (iv-c) below;

(iii) the canvas support medium is partially or entirely thicker than 2D planar; or it is 2D planar with a strengthening stabilizer on or in it's polymer that is one or more of: a rigid layer, part or area; a layer or a part that is or that functions as a crossbar, as a reinforcing rib or strut, as a frame, as a stretcher, as a mat, or as a framework to enhance strength or as reinforcement; a partial or discontinuous layer to enhance strength or reinforce; a strengthening stabilizer that is not visible to viewers in its use within the polymer form; or a strengthening stabilizer that is fiber, (iv) the canvas support medium's form is made transparent, translucent or both with a strengthening stabilizer that is internal or on its underside, which is invisible or largely invisible to viewers; additionally, the canvas support medium is prepared with one or more of: (iv-a) a stabilizer that enables or enhances bonding to conventional artist's mediums, (iv-b) it is made color stable or so that it remains unchanged with exposure to ultraviolet light or it is made with a stabilizer providing or enhancing this feature, or (iv-c) a strengthening stabilizer that is a surfacing veil fiberglass or a fiber that becomes largely invisible or invisible to the unaided human eye when used within or under transparent colorless polymer or when used within or under transparent colorless polymer that penetrates it, that is at least about a quaffer of an inch thick, or both, (v) the canvas support medium has: at least one substantially inflexible curve, angle or other feature; it is non-planar; it has or it is accompanied by a means of display or a key part thereof; it has texture resembling conventional canvas; it has a surface, form or underlayer that is irregular or non-uniform; it has deckled edges; it has irregularities throughout resembling the texture of handmade paper; its transparent or translucent surface is textured with a texture deeper than small surface irregularities, or an ordinary sandblasted or sanded surface; or the canvas support medium is either consistently rigid 2D planar polyvinyl chloride with a stabilizer to enhance bonding, or it is made with another specification and it is (a) rigid or partially rigid, (b) capable of self support or freestanding, or (c) both (a) and (b), or (vi) preparing the canvas support medium as a form with one or more of: a dichroic or photochromic effect; a lens, a prism or a grating; embedded air bubbles; embedding, or at least two different light properties in separate locations, (B) making at least part of the canvas support medium with: its at least one polymer being a synthetic absorbent polymer; one or more conductive polymers in addition to its at least one polymer; or an OLED made with one or more conductive polymers;

(C) forming the canvas support medium with a polymer surface made with a stabilizer ingredient in it that bonds or fortifies the bond between it and one or more superimposed conventional artist's mediums, wherein this stabilizer ingredient is at least one conventional artist's painting medium, primer or binder; or preparing the canvas support medium with a stabilizer that affects surface flow or leveling, or with a stabilizer that facilitates superimposing applications;

(D) preparing the canvas support medium or aesthetic image as or with a visible display device that includes multiple non-light-emissive colorants capable of changing their visibility, their color or both, with energy from a source that is part of the canvas support medium or image or with energy conducted by the canvas support medium or image, so that the overall visual effect is sufficient to enable at least a portion of the canvas support medium or the aesthetic image to have a display that is a visible aesthetic, design or pictorial element, (E) preparing the canvas support medium or image with a polymeric, visible, aesthetic element: (i) at least part of the positive or negative form of which functions as a lens, a Fresnel lens, a lenticular lens or form; a grating, a diffraction grating or a prism; or two or more of these; (ii) with a dichroic effect, or with a photochromic effect; (iii) with an electrochromic effect whereby it responds to changes in electrical current by changing or changing it's state of or it's level of: transparency, translucency, reflectivity, light emission employing conductive polymer, it changes the path or color of the light passing through it, or a combination of these; or (iv) one or more of (i)-(iii) that serves as part or all of an image support, an image support stabilizer or an underlayer;

(F) forming the canvas support medium with an aesthetic texture made by taking one or more negative or positive impressions from one or more organic or natural materials, to make texture on the canvas support medium that resembles the organic or natural material's texture or each organic or natural materials' texture, a negative impression of it or them, or a combination of these, or such a texture made on the canvas support medium from at least part of a Nymphaeaceae Victoria also known as an Amazon Water-lily, and the canvas support medium prepared according to one or more of (A)-(F) above, is made with it's at least one polymer, or with one or more conductive polymers in an amount sufficient to provide or enable the image to have at least one aesthetic element, so that the reinvented canvas support medium facilitates artistic expression, and the creation and support of an aesthetic image that is art, design or architecture made therewith, thereupon or therefrom that is a work or object for visual observation or display and a whole in and of itself with distinct boundaries or edges.

3. A method for making a synthetic fine-artist's image-making canvas support medium as a new reinvented version of the conventional utilitarian fine artist's canvas, wherein the new reinvented canvas support medium facilitates the creation of art, design or architecture therewith, thereupon or therefrom, referred to herein as an image, which method comprises:

preparing the canvas support medium with at least one non-conductive or poorly conductive polymer and making the canvas support medium in a form that is sufficiently flexible so that it is incapable of supporting its own weight or so that it is drapable, and is:

(I) non-uniform, irregular, or both, (II) a nonplanar, uniform, regular form, or (III) a planar, uniform, regular form that is partially or entirely thicker than 2D planar, and the method also requires one or more of (A)-(F):

(A) the at least one polymer is non-absorbent, the canvas support medium is made with at least one fine-art stabilizer present to provide or enhance a property of the polymer, the canvas support medium is formed with a visible surface that is transparent, translucent or both to allow light to pass into it or through it, and the canvas support medium has at least one of these 7 specifications marked (i)-(vii):

(i) it has a stabilizer present to enhance the ability of the formed canvas medium or the image made therewith, thereupon or therefrom to remain color stable or to remain unchanged with exposure to ultraviolet light, and: it is polyvinyl chloride and made with the specifications of (I) above; it is polyvinyl chloride made according to (II) or (III) above with a stabilizer present to enhance bonding; or it is made with another polymer;

(ii) it has a stabilizer present to enhance or enable bonding, or that is a surface preparation stabilizer layer;

(iii) it has: deckled edges; irregularities throughout resembling the texture of handmade paper; texture on its main surface resembling conventional canvas; it's transparent or translucent surface is textured more deeply than small surface irregularities, or an ordinary sandblasted or sanded surface; it has embedded air bubbles or pockets; it has at least one substantially inflexible curve or angle; it has a rigid part or area; or it is made according to (I) above and it has: (a) a surface or an underlayer that is irregular and non-uniform or (b) a form that is uneven and non-uniform in thickness;

(iv) the at least one polymer is partially or entirely poly (methyl methacrylate) or acrylic, or partially or entirely made with a methacrylate ester or methacrylamide derivative;

(v) the canvas support medium has a strengthening stabilizer on or in it's polymer; the canvas support medium is made according to (I) above with a mount, a means of display or installation or a key part thereof; the nonplanar canvas support medium is made according to (II) above with a mount, another means of display or installation, or a key part thereof that may maintain it's uniformity and its regularity or that may interrupt it; or the canvas support medium is made according to (III) above with a means of display or part thereof that may maintain its uniformity and regularity, or that may interrupt it which is: embedded; one or more rigid or inflexible areas that enhances or enables its display; part of the canvas support medium's form; or a supportive rigid or inflexible part for another part of the canvas support medium that folds, unfolds, rolls out or scrolls, (vi) the canvas support medium has a dichroic or photochromic effect; a lens, a prism a grating or two or more of these; at least two different light properties in separate locations; or it has a reflective side or backside visible through its transparent or translucent surface, or (vii) the canvas support medium has a rigid or inflexible part, area or feature in its polymer or in its form, or it has a strengthening stabilizer that is one or more of: one or more rigid or inflexible parts or areas in it's polymer; a layer or a part in it's polymer that is or that functions as a crossbar, as a reinforcing rib or strut, as a mat, or as a framework to enhance strength or reinforce; a partial or discontinuous layer to enhance strength or reinforce; or fiber in it's polymer; or (B) making at least part of the canvas support medium with: its at least one polymer being a synthetic absorbent polymer; one or more conductive polymers in addition to its at least one polymer; or an OLED made with one or more conductive polymers;

(C) enhancing the ability to develop the aesthetic image by additive processes, or providing this development by:

(i) making the canvas support medium as a transparent or translucent form with a surface preparation stabilizer layer or other stabilizer in or on it's surface that enhances or enables bonding to at least one conventional artist's medium;

(ii) forming the canvas support medium with a polymer surface made with a stabilizer ingredient in it that bonds or fortifies the bond between it and one or more superimposed conventional artist's mediums, wherein this stabilizer ingredient is at least one conventional artist's painting medium, primer or binder; or preparing the canvas support medium with a stabilizer that affects surface flow or leveling, or with a stabilizer that facilitates superimposing applications;

(iii) developing the aesthetic image by using the at least one polymer to prepare one or more transparent or translucent separating layers which meet the specifications in (I), (II) or (III) above, and using the layer or layers to separate applications, layers or attachments of one or more other kinds of aesthetic, design or pictorial elements on it's or on their opposing sides, and:

(iii-1) two or more of these transparent or translucent polymeric layers separate applications or layers of one or more kinds of conventional artist's mediums from this group: oil paint, encaustic, other oil based artist's mediums, paint stick, casein paint, vinyl paint, alkyd paint, watercolor, gouache, tempera, egg tempera, ink, pastel, charcoal, conte crayon, pencil, graphite, collage, photographic transparencies, and photographic (iii-2) one or more of these polymeric layers separate applications, layers or attachments of one or more kinds of aesthetic elements in (D) (i)-(iv) below, either with one or more applications described above in (iii-1) or free of them;

(iii-3) two or more of these polymeric layers separate applications, layers or attachments of one or more elements in (iii-1) or (iii-2) above, from an application or layer of acrylic paint;

(iii-4) two or more of these polymeric layers separate one or more kinds of applications, layers or attachments in (iii-1)-(iii-3) above from carving or incising that is free or nearly free of legible text; or (iii-5) two or more of these polymeric layers separate one or more kinds of applications, layers or attachments in (iii-1)-(iii-4) above from at least one LED, OLED or light source;

moreover, in addition, the method requires that all of these layers bond to one another or that they be bonded to one another to make one whole form;

(D) preparing the canvas support medium or image with a polymeric, visible, aesthetic element: (i) at least part of the positive or negative form of which functions as a lens, a Fresnel lens, a grating, a diffraction grating or a prism; a transparent or translucent lenticular lens or form; or two or more of these; (ii) with a photochromic effect and a form made for viewing apart from the human face, unsuitable or uncomfortable to wear on the human face or incapable of fitting on the human face, or with a dichroic effect; (iii) with an electrochromic effect whereby it responds to changes in electrical current by changing or by changing it's state of or it's level of: transparency, translucency, reflectivity, light emission employing conductive polymer, it changes the path or color of the light passing through it, or a combination of these; or (iv) one or more of (i)-(iii) that serves as part or all of an image support, an image support stabilizer or an underlayer; and this canvas support medium prepared according to (i), (ii), (iii) or (iv) is also prepared with one or more of (1)-(6): (1) a stabilizer that provides or enhances it's color stability or it's ability to remain unchanged with exposure to ultraviolet light; (2) it is cleaned sufficiently to render it receptive to artist's paint and to provide enhanced bond strength and permanence to facilitate development of the aesthetic image; (3) it is prepared with a lenticular lens and developed into an aesthetic image by being used as an underlayer, an image support, or an image support stabilizer for a work with painting, drawing, a photographic transparency, collage, design or a pictorial element free of text that is incised or carved; or it is free of lenticular lenses and it is developed into an aesthetic image; (4) it is prepared according to (I) above; (5) it is made with absorbent polymer or conductive polymer; or (6) it is prepared with the photochromic, dichroic or eletrochromic effect in (ii) or (iii) above that provides a pictorial or design element, a picture or a drawing thereby developing it into an aesthetic image;

(E) preparing the canvas support medium according to (a) or (b): (a) with a form that is transparent, translucent or both and with a strengthening stabilizer that is internal or on it's underside that is invisible or largely invisible to viewers, wherein it is also prepared with (1) or (3) below; or (b) preparing the at least one polymer so that it is at least partially but not completely poly(methyl methacrylate) or acrylic, or that it is at least partially made with a methacrylate ester or methacrylamide derivative, and also this polymer is stiffened with one or more of: a different second polymer, an impact modifier stabilizer, a strengthening stabilizer of a different, stronger or more rigid polymer; or the fiber strengthening stabilizer in (3) below; moreover this canvas support medium prepared according to (a) or (b) is also prepared with at least one of (1)-(4): (1) a stabilizer that provides or enhances it's color stability or it's ability to remains unchanged with exposure to ultraviolet light or alternately, stabilizer that enables or enhances bonding to conventional artist's mediums; (2) it is cleaned sufficiently to render it receptive to artist's paint and to provide enhanced bond strength and permanence facilitating development of the aesthetic image; (3) a strengthening stabilizer that is a surfacing veil fiberglass or a fiber that becomes largely invisible or invisible to the unaided human eye when used within or under transparent colorless polymer or when used within or under transparent colorless polymer that penetrates it, that is at least about a quarter of an inch thick, or both, or (4) it is developed into an image by the application a conventional artist's drawing or painting medium to which it bonds, or it is developed into an image of fine art; or (F) preparing the canvas support medium or aesthetic image as or with a visible display device that includes multiple non-light-emissive colorants capable of changing their visibility, their color or both, with energy from a source that is part of the canvas support medium or image, or with energy conducted by the canvas support medium or image, so that the overall visual effect is sufficient to enable at least a portion of the canvas support medium or the aesthetic image to have a display that is a visible aesthetic, design or pictorial element, and the canvas support medium prepared with one or more of (A)-(F) above, is made with it's at least one polymer, or with one or more conductive polymers in an amount sufficient to provide or enable the image to have at least one aesthetic element, so that the reinvented canvas support medium facilitates artistic expression, and the creation and support of an aesthetic image that is art, design or architecture made therewith, thereupon or therefrom that is a work or object for visual observation or display and a whole in and of itself with distinct boundaries or edges; and the method also requires one or more of a)-h) below:

a) developing the canvas support medium into an aesthetic image that is art, design or architecture, wherein the canvas support medium has polymer providing or enabling at least one aesthetic element, and at least one of (a-i)-(a-iv) below:

(a-i) the at least one aesthetic element is provided or enabled by an absorbent polymer;

(a-ii) the at least one aesthetic element is provided or enabled by at least one non-conductive or poorly conductive polymer and: (a-ii-a) the image is made according to (A), (C), (D) or (E) above, or it is made according to (B) above with a conductive polymer OLED or free of the specifications of (F) above, or alternately, (a-ii-b) the image is made according to (F) above wherein the display device has conductive polymer or is free of conductive polymer and wherein the image is otherwise free of the specifications in (B) above and it is free of the specifications in (A), (C), (D) and (E) above, and this image is fine art, it is architecture or it is a work of design for viewing or display apart from direct contact with the human body rather than worn on it as fashion design;

(a-iii) making the canvas support medium into an image of fine art with a flexible, 2D planar, light-sensitive photographic recording material that has conductive polymer wherein the canvas support medium has conductive polymer that is separate from this photographic recording material which provides or enables at least one aesthetic element; or making the canvas support medium into an image of fine art free of this photographic recording material wherein the canvas support medium has conductive polymer that provides or enables at least one aesthetic element; (a-iv) developing the canvas support medium into another kind of aesthetic image, or an image of design or architecture using a conductive polymer that provides or enables at least one aesthetic element and (1) or (2):

(1) conductive polymer that is separate from that in the canvas support medium's photographic recording material (above) or conductive polymer in a canvas support medium free of this photographic recording material provides or enables at least one aesthetic element and this conductive polymer: (1-i) leaves the thermal and static electrical properties of the canvas support medium and the image substantially unchanged or constant; (1-ii) provides or enables an aesthetic element by conducting electricity, or by its use with electrical current, with electricity that flows or that can flow, or with non-static electricity, or (1-iii) provides or enables at least one visible aesthetic element; or alternately, (2) the conductive polymer provides or enables the canvas supportive medium and the image to have at least one aesthetic element that is audible, interactive or light emitting;

b) accompanying the canvas support medium with instructions on developing it into an aesthetic image that is art, design or architecture and (i), (ii) or (iii):

(i) making the canvas support medium with a flexible, 2D planar, light-sensitive photographic recording material having conductive polymer and at least one other ingredient and accompanying it with instructions on how it's other ingredient or ingredients might be further developed to make the form into an aesthetic image for viewing;

(ii) making the canvas support medium according to (F) above wherein the display device has conductive polymer or is free of conductive polymer and wherein the canvas support medium is otherwise free of the specifications in (B) above and it is free of the specifications in (A), (C), (D) and (E) above, and wherein the canvas support medium is made for forming an image of fine art, an image of architecture, or an image of design for viewing or display apart from direct contact with the human body rather than worn on it as fashion design; or alternately, (iii) making the canvas support medium entirely free of the photographic recording medium, and: (iii-1) free of the specifications of (F); (iii-2) according to (A), (C), (D), or (E) above; or (iii-3) according to (B) above with absorbent polymer, or with conductive polymer that is separate from it's display made according to (F) above;

c) forming the canvas support medium with a polymer surface made with a stabilizer ingredient in it that bonds or fortifies the bond between it and one or more superimposed conventional artist's mediums, wherein this stabilizer ingredient is at least one conventional artist's painting medium, primer or binder;

d) forming the canvas support medium with an aesthetic texture made by taking one or more negative or positive impressions from one or more organic or natural materials, to make texture on the canvas support medium that resembles the organic or natural material's texture or each organic or natural materials' texture, a negative impression of it or them, or a combination of these, or such a texture made on the canvas support medium from at least part of a Nymphaeaceae Victoria also known as an Amazon Water-lily, however when the canvas medium is formed only according to (A) above and is free from the specifications in (B)-(F), the method requires making the canvas support medium in an overall form that is abstract or geometric, that appears unnatural, inorganic and nonhuman, or that is otherwise free from looking like the real natural or organic form or forms from which the texture was made, and therefore free from being: a realistic portrayal; a human, animal or plant form; or a specimen or model that looks like the real, natural or organic form or forms, e) forming the canvas support medium with: deckled edges, irregularities throughout resembling the texture of handmade paper, or texture resembling conventional canvas, or forming the canvas support medium with an aesthetic texture and a display having conductive polymer, an OLED having conductive polymer, or with the display in (F) above, such that the aesthetic texture is deeper than small surface irregularities, or an ordinary sandblasted or sanded surface (f) preparing the canvas support medium with a means or a key part of the means of installation or display as an aesthetic image wherein the canvas support medium is formed: (i) according to (A), (C), (D) or (E) above, or with an absorbent polymer; (ii) with either a conductive polymer OLED or with the display in (F) above whereupon it is free or nearly free of visible legible text; or (iii) with conductive polymer that is not part of any OLED or display in (F) above;

g) preparing the canvas support medium with conductive polymer, with an OLED made with conductive polymer, or according to (C) or (F) above, and also cleaning it sufficiently to render it receptive to a superimposed artist's medium and to enhance the strength and permanence of the bond formed between that surface and an artist's medium; or h) the canvas support medium is prepared according to D (ii) or D (iii) above and the photochromic, dichroic or eletrochromic effect provides a pictorial or design element, a picture or a drawing thereby developing it into an aesthetic image.

4. A method for making a synthetic fine-artist's image-making canvas support medium as a new reinvented version of the conventional utilitarian fine artist's canvas, wherein the new reinvented canvas support medium facilitates the creation of art, design or architecture therewith, thereupon or therefrom, referred to herein as an image, which method comprises:

preparing the canvas support medium with at least one non-conductive or poorly conductive polymer and making the canvas support medium to be (a) sufficiently flexible so that it is incapable of supporting its own weight or so that it is drapable, (b) entirely 2D planar, and (c) in a form that is planar, uniform and regular, with the form of the canvas support medium made sufficiently supportive and stable to be capable of hanging free from added reinforcement in an aesthetic image, and the method requires one or more of (A)-(G), (A) the at least one polymer is non-absorbent, the canvas support medium is made with at least one fine-art stabilizer present to provide or enhance a property of the polymer, the canvas support medium is formed with a visible surface that is transparent, translucent or both to allow light to pass into it or through it, and the canvas support medium has at least one of these three specifications (A-1)-(A-3):

(A-1) the at least one polymer is principally or entirely poly(methyl methacrylate) or acrylic or it is principally or entirely a polymer of a methacrylate ester or methacrylamide derivative;

(A-2) the canvas support medium is made with inconsistent flexibility; with one or more rigid or inflexible areas or parts in its polymer or in its form; with at least two different light properties in separate locations; with embedded air bubbles; with deckled edges; with irregularities throughout resembling the texture of handmade paper; its transparent or translucent surface is textured with a texture deeper than small surface irregularities, or an ordinary sandblasted or sanded surface; or it has a strengthening stabilizer that is one or more of: one or more rigid or inflexible parts or areas in it's polymer; a layer or a part in it's polymer that is or that functions as a crossbar, as a reinforcing rib or strut, as a mat or as a framework to enhance strength or reinforce; a partial or discontinuous layer to enhance strength or reinforce; or fiber in it's polymer; or (A-3) the at least one polymer is cellulose acetate, polyvinyl chloride or polyester made with a stabilizer to enable or enhance bonding that is a conventional image making paint, size, or primer or a binder used in a conventional image making medium or material; or another polymer is used and at least one stabilizer is present (a) to enhance the ability of the formed canvas medium or the image to remain color stable or to remain unchanged with exposure to ultraviolet light, (b) to enable or enhances bonding or that is a surface preparation stabilizer layer, or an absorbent polymer is present that enables or enhances bonding so that the canvas support medium bonds well to at least one kind of conventional artist's paint that is oil paint, water soluble oil paint, acrylic paint, alkyd paint, encaustic, watercolor, tempera, egg tempera, casein paint, vinyl paint, ink, or gouache, or (c) to affect surface flow or leveling, or to facilitate superimposing applications;

(B) the at least one polymer is absorbent or the canvas support medium is at least partially made with a synthetic absorbent polymer; and forming the canvas support medium so that it has one or more of (B-1)-(B-5):

(B-1) a form that is partially but not completely poly(methyl methacrylate) or acrylic, or a form that is partially made with polymer of a methacrylate ester or methacrylamide derivative wherein this form has one or more of (a)-(c):

(a) an impact modifier stabilizer, a stabilizer present to enhance the ability of the formed canvas support medium or the image to remain color stable or to remain unchanged with exposure to ultraviolet light, a stabilizer is present to enhance or enable flexibility or or a stabilizer is present that affects surface flow or leveling, or that facilitates superimposing applications;

(b) a stabilizer or a stabilizer that is an absorbent polymer is present specifically to enhance or enable bonding to at least one kind of conventional artist's paint or conventional artist's drawing medium that is: oil paint, water soluble oil paint, acrylic paint, alkyd paint, encaustic, paint sticks, watercolor, tempera, egg tempera, casein paint, vinyl paint, ink, gouache, pastel, pencil, conte crayon or charcoal, (c) the canvas support medium has a drapable form; or a light effect that is reflective or iridescent, (B-2) the canvas support medium is made with inconsistent flexibility; with one or more rigid or inflexible areas or parts in its polymer or in its form; with deckled edges; with irregularities throughout resembling the texture of handmade paper; its transparent or translucent surface is textured with a texture deeper than small surface irregularities, or an ordinary sandblasted or sanded surface; or it has a strengthening stabilizer that is one or more of: one or more rigid or inflexible parts or areas in it's polymer; a layer or a part in it's polymer that is or that functions as a crossbar, as a reinforcing rib or strut, as a mat or as a framework to enhance strength or reinforce; a partial or discontinuous layer to enhance strength or reinforce; or fiber in it's polymer;

(B-3) the canvas support medium bonds well to at least one kind of conventional artist's paint that is oil paint, water soluble oil paint, acrylic paint, alkyd paint, encaustic, watercolor, tempera, egg tempera, casein paint, vinyl paint, ink, or gouache, and this bond is enabled or enhanced by: (a) a stabilizer or a surface preparation stabilizer layer when the at least one polymer is non absorbent, (b) by a synthetic absorbent polymer which is a polymer of a chelating absorbent monomer or a crosslinked polymer of a chelating absorbent monomer, with a stabilizer present to enhance the ability of the formed canvas medium or the image to remain color stable or to remain unchanged with exposure to ultraviolet light, (c) by a different absorbent polymer or by a stabilizer that enhances or enables bonding present in a canvas support medium with a different absorbent polymer, or (d) by a combination of these, (B-4) the canvas support medium has a means of display or part thereof that may maintain its uniformity and regularity, or that may interrupt it which is: one or more rigid or inflexible areas or parts that enhance or enable display; embedded; part of its form; or a supportive rigid or inflexible part for another part of the canvas support medium that unfolds, rolls out or scrolls out for viewing, or (B-5) the canvas support medium has at least two different light properties in separate locations; embedded air bubbles; texture that resembles conventional canvas; or it is prepared according to (b), (c), (e) or (h) below;

(C) forming the canvas support medium with one or more conductive polymers, or with an OLED made with one or more conductive polymers;

(D) forming the canvas support medium with a polymer surface made with a stabilizer ingredient in it that bonds or fortifies the bond between it and one or more superimposed conventional artist's mediums, wherein this stabilizer ingredient is at least one conventional artist's painting medium, primer or binder;

(E) preparing the canvas support medium or image with a polymeric, visible, aesthetic element: (i) at least part of the positive or negative form of which functions as a lens, a Fresnel lens, a grating, a diffraction grating or a prism; a transparent or translucent lenticular lens or form; or two or more of these; (ii) with a photochromic effect or with a dichroic effect; (iii) with an electrochromic effect whereby it responds to changes in electrical current by changing or by changing it's state of or it's level of: transparency, translucency, reflectivity, light emission employing conductive polymer, it changes the path or color of the light passing through it, or a combination of these; or (iv) one or more of (i)-(iii) that serves as part or all of an image support, an image support stabilizer or an underlayer; and this canvas support medium prepared according to (i), (ii), (iii) or (iv) is also prepared with one or more of (1)-(5): (1) an absorbent polymer or a conductive polymer, (2) a stabilizer that provides or enhances it's color stability or it's ability to remain unchanged with exposure to ultraviolet light; (3) it is cleaned sufficiently to render it receptive to artist's paint and to provide enhanced bond strength and permanence to facilitate development of the aesthetic image; (4) it is prepared with a lenticular lens and developed into an aesthetic image by being used as an underlayer, an image support, or an image support stabilizer for a work with painting, drawing, a photographic transparency, collage, or a design or pictorial element free of text that is incised or carved; or it is free of lenticular lenses and it is developed into an aesthetic image; or (5) it is prepared according to (ii) or (iii) above and the photochromic, dichroic or eletrochromic effect provides a pictorial or design element, a picture or a drawing thereby developing it into an aesthetic image;

(F) preparing the canvas support medium according to (a) or (b):

(a) with a form that is transparent, translucent or both and with a strengthening stabilizer that is internal or on it's underside that is invisible or largely invisible to viewers, wherein it is also prepared with (1), (2), (4) or (5) below; or (b) preparing the at least one polymer so that it is at least partially but not completely poly(methyl methacrylate) or acrylic, or that it is at least partially made with a methacrylate ester or methacrylamide derivative, and also this polymer is stiffened with one or more of: a different second polymer, an impact modifier stabilizer, a strengthening stabilizer of a different, stronger or more rigid polymer; or the fiber strengthening stabilizer in (4) below; moreover this canvas support medium prepared according to (a) or (b) is also prepared with at least one of (1)-(5):

(1) an absorbent polymer; (2) stabilizer that provides or enhances it's color stability or it's ability to remains unchanged with exposure to ultraviolet light, or alternately, stabilizer that enables or enhances bonding to conventional artist's mediums; (3) it is cleaned sufficiently to render it receptive to artist's paint and to provide enhanced bond strength and permanence facilitating development of the aesthetic image; (4) a strengthening stabilizer that is a surfacing veil fiberglass or a fiber that becomes largely invisible or invisible to the unaided human eye when used within or under transparent colorless polymer or when used within or under transparent colorless polymer that penetrates it, that is at least about a quarter of an inch thick, or both, or (5) it is developed into an image by the application a conventional artist's drawing or painting medium to which it bonds, or it is developed into an image of fine art; or (G) preparing the canvas support medium or aesthetic image as or with a visible display device that includes multiple non-light-emissive colorants capable of changing their visibility, their color or both, with energy from a source that is part of the canvas support medium or image, or with energy conducted by the canvas support medium or image, so that the overall visual effect is sufficient to enable at least a portion of the canvas support medium or the aesthetic image to have a display that is a visible aesthetic, design or pictorial element, and the canvas support medium prepared with one or more of (A)-(G) above, is made with it's at least one polymer, or with one or more conductive polymers in an amount sufficient to provide or enable the image to have at least one aesthetic element, so that the reinvented canvas support medium facilitates artistic expression, and the creation and support of an aesthetic image that is art, design or architecture made therewith, thereupon or therefrom that is a work or object for visual observation or display and a whole in and of itself with distinct boundaries or edges; whereupon the method also requires one or more of a)-i):

a) developing the canvas support medium into an aesthetic image that is art, design or architecture, wherein the canvas support medium has polymer providing or enabling at least one aesthetic element, and at least one of (a-i)-(a-iv) below:

(a-i) the at least one aesthetic element is provided or enabled by an absorbent polymer;

(a-ii) the at least one aesthetic element is provided or enabled by at least one non-conductive or poorly conductive polymer and: (a-ii-a) the image is made according to (A), (B), (C), (D), (E) or (F) above, or it is made according to (C) above and either with a conductive polymer OLED or free of the specifications of (G) above, or alternately, (a-ii-b) the image is made according to (G) above, wherein the display device has conductive polymer or is free of conductive polymer and wherein the image is otherwise free of the specifications in (C) above and it is free of the specifications in (A), (B), (D), (E) and (F) above, and this image is fine art, it is architecture or it is a work of design for viewing or display apart from direct contact with the human body rather than worn on it as fashion design;

(a-iii) making the canvas support medium into an image of fine art with a flexible, 2D planar, light-sensitive photographic recording material that has conductive polymer, wherein the canvas support medium has conductive polymer that is separate from this photographic recording material which provides or enables at least one aesthetic element; or making the canvas support medium into an image of fine art free of this photographic recording material wherein the canvas support medium has conductive polymer that provides or enables at least one aesthetic element;

or (a-iv) developing the canvas support medium into another kind of aesthetic image, or an image of design or architecture using a conductive polymer that provides or enables at least one aesthetic element and (1) or (2): (1) conductive polymer that is separate from that in the canvas support medium's photographic recording material (above) or conductive polymer in a canvas support medium free of this photographic recording material provides or enables at least one aesthetic element and this conductive polymer: (1-i) leaves the thermal and static electrical properties of the canvas support medium and the image substantially unchanged or constant; (1-ii) provides or enables an aesthetic element by conducting electricity, or by its use with electrical current, with electricity that flows or that can flow, or with non-static electricity, or (1-iii) provides or enables at least one visible aesthetic element; or alternately, (2) the conductive polymer provides or enables the canvas support medium and the image to have at least one aesthetic element that is audible, interactive or light emitting;

b) accompanying the canvas support medium with instructions on developing it into an aesthetic image that is art, design or architecture and (i), (ii) or (iii):

(i) jmaking the canvas support medium with a flexible, 2D planar, light-sensitive photographic recording material having conductive polymer and at least one other ingredient and accompanying it with instructions on how it's other ingredient or ingredients might be further developed to make the form into an aesthetic image for viewing;

(ii) making the canvas support medium according to (G) above, wherein the display device has conductive polymer or is free of conductive polymer and wherein the canvas support medium is otherwise free of the specifications in (C) above and it is free of the specifications in (A), (B), (D), (E) and (F) above and wherein the canvas support medium is made for forming an image of fine art, an image of architecture, or an image of design for viewing or display apart from direct contact with the human body rather than worn on it as fashion design; or alternately, (iii) making the canvas support medium entirely free of the photographic recording medium, and; (iii-1) free of the specifications of (G) above; (iii-2) according to (A), (B), (D), (E) or (F) above; or (iii-3) according to (C) above with conductive polymer that is separate from it's display made according to (G) above;

c) forming the canvas support medium with a polymer surface made with a stabilizer ingredient in it that bonds or fortifies the bond between it and one or more superimposed conventional artist's mediums, wherein this stabilizer ingredient is at least one conventional artist's painting medium, primer or binder;

d) forming the canvas support medium with an aesthetic texture made by taking one or more negative or positive impressions from one or more organic or natural materials, to make texture on the canvas support medium that resembles the organic or natural material's texture or each organic or natural materials' texture, a negative impression of it or them, or a combination of these, or such a texture made on the canvas support medium from at least part of a Nymphaeaceae Victoria also known as an Amazon Water-lily, however when the canvas medium is formed only according to (A) above and is free from the specifications in (B)-(G), the method requires making the canvas support medium in an overall form that is abstract or geometric, that appears unnatural, inorganic and nonhuman, or that is otherwise free from looking like the real natural or organic form or forms from which the texture was made, and therefore free from being: a realistic portrayal; a human, animal or plant form; or a specimen or model that looks like the real, natural or organic form or forms, e) forming the canvas support medium with: deckled edges, irregularities throughout resembling the texture of handmade paper, or texture resembling conventional canvas, or forming the canvas support medium with an aesthetic texture and a display having conductive polymer, an OLED having conductive polymer, or with the display in (G) above, such that the aesthetic texture is deeper than small surface irregularities, or an ordinary sandblasted or sanded surface;

f) preparing the canvas support medium with a means or a key part of the means of installation or display as an aesthetic image wherein the canvas support medium is formed: (i) according to (A), (B), (D), (E) or (F) above; (ii) with either a conductive polymer OLED or with the display in (G) above whereupon it is free or nearly free of visible legible text; or (iii) with conductive polymer that is not part of any OLED or display in (G) above;

g) preparing the canvas support medium according to (C), (D), (F) or (G) above, and also cleaning it sufficiently to render it receptive to a superimposed artist's medium and to enhance the strength and permanence of the bond formed between that surface and an artist's medium;

(h) developing the aesthetic image by using the at least one polymer to prepare one or more transparent or translucent separating layers and separating applications, layers or attachments of one or more other kinds of aesthetic, design or pictorial elements on it's or on their opposing sides, and:

(1) two or more of these transparent or translucent polymeric layers separate applications or layers of one or more kinds of conventional artist's mediums from this group: oil paint, encaustic, other oil based artist's mediums, paint stick, casein paint, vinyl paint, alkyd paint, watercolor, gouache, tempera, egg tempera, ink, pastel, charcoal, conte crayon, pencil, graphite, collage, photographic transparencies, and photographic emulsions;

(2) one or more of these polymeric layers separate applications, layers or attachments of one or more kinds of aesthetic elements in (E) (i)-(iv) above, either with one or more of the applications described above in (1) or free of them;

(3) two or more of these polymeric layers separate applications, layers or attachments of one or more elements in (1) or (2) above, from an application or layer of acrylic paint;

(4) two or more of these polymeric layers separate one or more kinds of applications, layers or attachments in (1)-(3) above from carving or incising that is free or nearly free of legible text; or (5) two or more of these polymeric layers separate one or more kinds of applications, layers or attachments in (1)-(4) above from at least one LED, OLED or light source;

moreover, in addition, the method requires that all of these layers bond to one another or that they be bonded to one another to make one whole form; or i) the canvas support medium is prepared according to E (ii) or E (iii) above and the photochromic, dichroic or eletrochromic effect provides a pictorial or design element, a picture or a drawing thereby developing it into an aesthetic image.

5. A method for making a synthetic fine-artist's image-making canvas support medium as a new reinvented version of the conventional utilitarian fine artist's canvas, wherein the new reinvented canvas support medium facilitates the creation of art, design or architecture therewith, thereupon or therefrom, referred to herein as an image, which method comprises:

preparing the canvas support medium with at least one polymer and (I), (II) or both:

(I) this at least one polymer is one or more conductive polymers, or it is at least one conductive polymer that is part of an OLED;

(II) a visible display device that includes multiple non-light-emissive colorants capable of changing their visibility, their color or both, with energy from a source that is part of the canvas support medium or image or with energy conducted by the canvas support medium or image, so that the overall visual effect is sufficient to enable at least a portion of the canvas support medium or the aesthetic image to have a display that is a visible aesthetic, design or pictorial element, and the canvas support medium prepared with one or more of (I) or (II) above, is made so that one or more of it's polymers are in an amount sufficient to provide or enable the image to have at least one aesthetic element, so that the reinvented canvas support medium facilitates artistic expression, and the creation and display of an aesthetic image that is art, design or architecture made therewith, thereupon or therefrom that is a work or object for visual observation or display and a whole in and of itself with distinct boundaries or edges; and the method also requires one or more of A)-K) below:

A) developing the canvas support medium into an aesthetic image that is art, design or architecture, wherein the canvas support medium has at least one of A-i)-A-iv) below:

A-i) the at least one aesthetic element provided or enabled by an absorbent polymer;

A-ii) the at least one aesthetic element provided or enabled by at least one non-conductive or poorly conductive polymer and (1) or (2):

(1) the canvas support medium or image is made according to (I) above with: (a) conductive polymer enabling, enhancing or a part of an audible or light emitting element, an aesthetic element, an OLED, a solar cell, a battery, a power source, or an interactive feature; (b) conductive polymer that is separate from it's flexible, 2D planar, light-sensitive photographic recording material made with conductive polymer; or (c) conductive polymer in a form made of composition that is free from such a photographic recording material, wherein in the preceding (b) or (c) the conductive polymer conducts electricity that flows, it provides or contributes to an aesthetic element, it emits light, it is part of an image of fine art, or the conductive polymer enables or is part of an audible or light emitting element, an OLED, a solar cell, a battery, a power source, or an interactive feature; or (2) the canvas support medium or the image is made according to (II) above, wherein the display device of (II) above has conductive polymer or is free of conductive polymer and wherein the image is otherwise free of the specifications in (I) above, and this image is fine art, it is architecture or it is a work of design for viewing or display apart from direct contact with the human body rather than worn on it as fashion design;

A-iii) making the canvas support medium into fine art with a flexible, 2D planar, light-sensitive photographic recording material that has conductive polymer, wherein the canvas support medium also has conductive polymer that is separate from this photographic recording material which provides, enables, or is a part of: at least one aesthetic, audible or light emitting element, an OLED, a solar cell, a battery, a power source, or an interactive feature; or making the canvas support medium and the image of fine art with other ingredients, free of this photographic recording material wherein the canvas support medium and the image of fine art have conductive polymer that provides, enables, or is a part of: at least one aesthetic, audible or light emitting element, an OLED, a solar cell, a battery, a power source, or an interactive feature; or A-iv) developing the canvas support medium into another kind of aesthetic image, or an image of design or architecture using a conductive polymer and (1) or (2):

(1) the canvas support medium either has conductive polymer that is separate from that in the it's photographic recording material (above) or it has conductive polymer and it is free of this photographic recording material, and prepared one of these 3 ways: (1-i) it's conductive polymer leaves the thermal and static electrical properties substantially unchanged or constant; (1-ii) it's conductive polymer provides, enables or is a part of an aesthetic element by conducting electricity, or is used with electrical current, with electricity that flows or that can flow, or with non-static electricity, or (1-iii) it's conductive polymer provides, enables, or is a part of at least one aesthetic element that is visible, audible, interactive or light emitting, an OLED, a solar cell, a battery, or a power source, or alternately, (2) the conductive polymer provides or enables at least one aesthetic element that is audible, interactive, or light emitting;

B) developing the canvas support medium or aesthetic image so that viewers see an overall visual aesthetic element or effect, that is free or nearly free of visible legible text, and that is: a pictorial element, a design, a design that is abstract, an image, drawing, painting, at least partially made with a conventional image making medium; at least partially drawn, incised, carved or painted; a portrayal with or of a figure, figures, a still life, landscape, the sky, skylight or a combination of these, wherein the method requires (i) or (ii):

(i) the canvas support medium or image is made according to (I) above and: it has substantially unchanging or constant thermal and static electrical properties, it has conductive polymer that leaves it's thermal and static electrical properties substantially unaffected or constant, it has conductive polymer providing or enabling light emission or conducting electrical current that flows; it has an OLED, a solar cell, a battery or a power source made with conductive polymer; it has conductive polymer providing, enabling or part of an aesthetic, design or pictorial element, or it is fine art; moreover, in addition, this canvas support medium or image made according to (I) above either; (a) has conductive polymer separate from it's flexible, 2D planar, light-sensitive photographic recording material, or (b) it is free of such a photographic recording material, or, (ii) the canvas support medium or the image is made according to (II) above, wherein the display device of (II) above has conductive polymer or is free of conductive polymer and wherein the canvas support medium or the image is otherwise free of the specifications in (I) above, and is; fine art, architecture or a work of design for viewing or display apart from direct contact with the human body rather than worn on it as fashion design;

C) accompanying the canvas support medium with instructions on developing it into an aesthetic image that is art, design or architecture and (i), (ii) or (iii):

(i) making the canvas support medium with a flexible, 2D planar, light-sensitive photographic recording material having conductive polymer, and also with the specification of (I) or of (II) above separate from the photographic recording material, and accompanying the canvas support medium with instructions on how part of it other than it's photographic recording material might be further developed to make the form into an aesthetic image for viewing;

(ii) making the canvas support medium according to (II) above, wherein the display device has conductive polymer or is free of conductive polymer and making the canvas support medium otherwise free of the specifications in (I) above, wherein the canvas support medium is made for forming an image of fine art, an image of architecture, or an image of design for viewing or display apart from direct contact with the human body rather than worn on it as fashion design; or alternately, (iii) making the canvas support medium entirely free of this photographic recording medium that has conductive polymer, and free of the specifications of (II), according to (I) above;

D) forming the canvas support medium or image with deckled edges, irregularities throughout resembling the texture of handmade paper, or texture resembling conventional canvas; forming the canvas support medium or image with an aesthetic texture deeper than small surface irregularities, or an ordinary sandblasted or sanded surface; or forming the canvas support medium or image with an aesthetic texture made by taking one or more negative or positive impressions from one or more organic or natural materials to make aesthetic texture on the canvas support medium or image;

E) developing the canvas support medium by creating a visible aesthetic element free or nearly free of visible legible text, that is pictorial, that is a design, or developing it into a work of fine art, and (a) or (b):

(a) the aesthetic element is created by painting, drawing, incising, carving, or by the application of a conventional artist's medium; or (b) the aesthetic element employs electric current; it employs light emitted by the canvas support medium, the image or conductive polymer; it is seen according to the visibility or lack of visibility of non-light-emissive colorants in (II) above; or conductive polymer provides, enhances or contributes to the aesthetic element, moreover, the canvas support medium either:

(i) has conductive polymer that is separate from it's flexible, 2D planar, light-sensitive photographic recording material made with conductive polymer; or
(ii) it is made with another composition so that it is free of such a flexible, 2D planar, light-sensitive photographic recording material and either; (1) made according to (II) above and it is for forming an image of fine art, an image of architecture, or an image of design for viewing or display apart from direct contact with the human body rather than worn on it as fashion design; or (2) made according to (I) above and either free of the specification in (II) above or with conductive polymer that is separate from it's display made according to (II) above;

F) preparing the canvas support medium as or with a display, and also with one or more interactive features that enable an image maker, an artist or a viewer to change at least one visible aesthetic element which is free of alphabetic, numeric or other typographical characters, thereby either developing the canvas support medium into an aesthetic image free or nearly free of visible legible text or changing the aesthetic image;

G) applying at least one conventional artist's painting or drawing medium to the canvas support medium to develop it into an aesthetic image; forming the canvas support medium with a polymer surface made with a stabilizer ingredient in it that bonds or fortifies the bond between it and one or more superimposed conventional artist's mediums, wherein this stabilizer ingredient is at least one conventional artist's painting medium, primer or binder; preparing the canvas support medium with a surface preparation stabilizer which enhances or enables bonding to at least one conventional artist's medium; or making the canvas support medium or aesthetic image with an overall form that is representational or figurative;

H) preparing the canvas support medium free or nearly free of visible legible text capable of making an aesthetic image that is also free or nearly free of visible legible text, with a means or a key part of a means for installation or display which either:
  (i) is a rigid mount system, a wire mount system, or a combination rigid and wire mount system; or
  (ii) enables it to be installed or displayed like a conventional aesthetic image wherein the canvas support medium either: (a) has conductive polymer that is separate from it's flexible, 2D planar, light-sensitive photographic recording material made with conductive polymer; or (b) it is made with another composition so that it is free of such a flexible, 2D planar, light-sensitive photographic recording material;

I) making the canvas support medium into a plurality of associated sheets arranged in a pad or book for image-making, or in a pad or a book with a form of or similar to a conventional blank paper pad or blank book for image-making; or developing one or more of such a pad or book's pages or sheets into an image;

J) the canvas support medium or image is prepared with an electrochromic effect whereby it responds to changes in electrical current by changing or by changing it's state of or it's level of: transparency, translucency, reflectivity or light emission, or by changing the path or color of the light passing through it, moreover, this electrochromic effect:
  (i) is uneven, inconsistent, irregular or non uniform, it makes the canvas support medium or image incapable of functioning as a window, or it is part of a form that is: non-planar, irregular, non-uniform, with one or more negative spaces, discontinuous or incapable of functioning as a window; with a pictorial or design element; or textured more deeply than small surface irregularities or an ordinary sandblasted or sanded surface; or
  (ii) the electrochromic effect provides or contributes to a design, drawing, a pictorial element or a picture to the canvas support medium or image; or (K) preparing the canvas support medium or aesthetic image so that it serves at least one of these additional specialized functions listed as (i)-(viii):
  (i) preparing the canvas support medium or aesthetic image so that it is recognizable an functioning altar, or a menorah, or as a canvas support medium or an aesthetic image for spiritual or religious use;
  (ii) preparing the canvas support medium or aesthetic image as a vase, a bowl, a placemat, stairs, a candelabrum, an awning, a costume, a fountain, a pitcher, a tureen, a goblet, a dish for food or display, a stage set or a basket;
  (iii) preparing the canvas support medium or aesthetic image according to (II) above, as a ceiling, floor, fountain, case, container, tent, basket, fence, stairs, tray, cup or door; as a partition, a screen or as a partition or screen with one or more negative spaces within it;
  (iv) preparing the canvas support medium or aesthetic image as furniture, a table, a chair, a bench, a stool or a chest, wherein it is made according to (II) above or it is made according to (I) above and it has:
substantially unchanging or constant thermal and static electrical properties, conductive polymer that leaves it's thermal and static electrical properties substantially unaffected or constant conductive polymer providing or enabling light emission or conducting electrical current that flows, an OLED made with conductive polymer, or conductive polymer providing or enabling a visible aesthetic, design or pictorial element;
  (v) preparing the canvas support medium or image with an OLED made with conductive polymer or with conductive polymer providing or enabling light emission, and making the canvas support medium or image function as a door in an architectural structure, as a window, as a skylight, as a lunette, as a fence, as a tent, as a floor or part thereof; as a case or a container; as a partition, a screen or as a partition or screen with one or more negative spaces within it, wherein the canvas support medium or image is capable of emitting visible light;
  (vi) preparing the canvas support medium or image with an OLED made with conductive polymer or with conductive polymer providing or enabling light emission and making the canvas support medium or image function as clothing or as a clothing or fashion accessory, as a belt, a purse, a tote bag or as a hat wherein the canvas support medium or image is capable of emitting visible light and the main or the exclusive function of this light is non-utilitarian, visual and aesthetic;
  (vii) preparing the canvas support medium or image to function as jewelry, wherein it is made either according to (I) above and is free of the specifications of (II) above, or it is made according to (I) above and it has conductive polymer that is separate from it's display made according to (II) above, and also:
    (a) it has an OLED made with conductive polymer, or it has conductive polymer providing or enabling light emission or a visible aesthetic element,
    (b) it is incapable of storing or retrieving medical or related information and it is incapable of detecting radiation, or (c) it is an image making medium or an image that functions as jewelry free from any additional utilitarian function; or (viii) preparing the canvas support medium or aesthetic image so that it functions as a shade or a shutter that is made according to (I) above free of the specifications of (II) above, or that is made with conductive polymer that is separate from it's display made according to (II) above, wherein this shade or shutter:

presents a representational or abstract picture, design or image;

depicts a figure or figures, a still life, a landscape, the sky or skylight;

has an OLED made with conductive polymer;

is incapable of functioning as a window;

has conductive polymer providing or enabling a visible aesthetic element that is irregular, uneven, non-uniform, discontinuous, pictorial, drawing, a design, predominately or entirely non-utilitarian; or emitted light;

has it's main form, in addition to or instead of it's perimeter, that is at least partially opaque, or has a main surface or a form that is irregular, uneven, non-uniform, discontinuous, representational, with a negative space, with embedding, or textured more deeply than small surface irregularities or an ordinary sandblasted or sanded surface; or alternately, preparing the canvas support medium or aesthetic image according to (II) above so that it functions as a shade or a shutter.

6. The method of claim 5 wherein the canvas support medium or the art, design or architecture made therewith, thereupon or therefrom referred to herein as the image is prepared by one or more of (a)-(h):

(a) providing it with an electrode, a power source, a battery, a solar cell, electrical current or energy, a computer, or part of a computer; an interactive feature, an interactive part or a means of being interactive; sound, music, a microphone or a speaker; a moving part or a means that makes it capable of movement; a control mechanism, or device; a viewer input device, a switch, a button, a touch control, a mechanism or device which enables control or change when pressure is applied, a drawing device, a trackball, a mouse, a means of responding to sound or voice command; voice recognition technology; a means of controlling or changing the canvas support medium or image from a distance, via wireless communication or via a broadcast method; a sensor, a means of detecting a viewer, movement or change in light or in the environment, a means so that an image maker or a viewer can control, change or vary the electrical current, color, light, form, movement or an aesthetic element; or providing it with a conventional artist's medium, a photograph, a photographic emulsion or a tangible photographic transparency;

(b) preparing it's display device with non-light-emissive colorants in one or multiple microcapsules, or preparing it's display device by charging it's non-light-emissive colorants so that they are able to change from visible to hidden, or from hidden to visible with electrical current which causes their position to change within a fluid with respect to an electrode;

(c) developing the canvas support medium, or the image, the part of it made with conductive polymer, it's OLED, it's display, it's other device, it's surface or it's form so that: (i) it shows at least part of a drawing, picture, design, or so that it shows one of these that is figurative, realistic, abstract, a landscape, a depiction of the sky or of sky light, or a still life, (ii) it shows one of these when given electrical current, (iii) it shows one of these with emitted light, (iii) it shows one of these with the visibility, or the visibility and the lack of visibility of non-light-emissive colorants; (iv) it is developed with a visible aesthetic element that is one or more of: pictorial, illusionary, abstract, representational, realistic, surrealistic, a landscape, a still life, figurative or with figures, accompanied by sound or music; or free or nearly free of visible legible text; (v) it or a part of it depicts the sky or the light of the sky (vi) it or a part of it depicts the sky or the light of the sky and this portrayal is at least partially formed by color or light changing as the sky changes or changing in a manner that portrays or represents the sky; or (vii) it shows one of these in manner that is static, that changes or can be changed, in an interactive way, in a way that responds to change in the environment, or in a way that enables a person to change it;

(d) forming the canvas support medium or image with at least one non conductive or poorly conductive polymer, with absorbent polymer, with paper, or forming it with: an image support, a paper image support, a thin planar image support, a metal or metallic layer, indium tin oxide; a layer that is: transparent, translucent, partial, external or structurally supportive; with one of these made with non conductive or poorly conductive polymer, with glass or both; with one of these used in association with a conductive polymer, an OLED, a display or a device; or with one of these upon which conductive polymer is applied or superimposed;

(e) preparing the canvas support medium or image, it's OLED, it's display or it's device with a form that is: rigid, flexible, rigid and flexible, capable of rolling or folding, a mural, a continuous form with at least one negative space open to light and air within it; a form that is a non geometric and visibly irregular; a form that is partially opaque, and partially transparent or translucent with light passing through it; a form made with: electronics, wires, cords, a battery, a power source or utilitarian parts that are visible or that are hidden from view;

a form, a planar form or a planar two dimensional form that is transparent or translucent and made with polymer, which also has two or more light sources in it or attached to it; a transparent, planar, two dimensional form made with polymer that has multiple light sources, OLEDs or other LEDs in it or attached to it;

forming or developing the canvas support medium or image so that it has two or more layers, with at least one layer that is: partially or entirely transparent or translucent or such a layer that is external; a polymeric or non polymeric image support, image support stabilizer or strengthening stabilizer; made with or of glass, fabric, embedding, polymer, conductive polymer, a device, a light effect, an aesthetic element that uses electricity, or a non polymeric aesthetic ingredient; providing color, or an internal layer or back layer providing color; or a combination of these; or a layered form that has conductive polymer in between two or more layers that are: transparent, translucent, polymeric, glass, non conductive or poorly conductive, or a combination of these, or such a layered form with conductive polymer capable of conducting electricity to one or more devices or light emitters that are also sandwiched in between these other layers;

(f) preparing the canvas support medium or image with conductive polymer that conducts electricity, conducts ions, or emits light in one or more colors; preparing the canvas support medium, the image or a display that is the canvas support medium, the image or part thereof, with a property provided or enhanced by a fine-art stabilizer; preparing the canvas support medium so that it serves a second utilitarian function in addition to it's use for image making; developing the aesthetic image so that it serves a utilitarian function;

(g) preparing the canvas support medium or image with conductive polymer applied by: a printing process, ink jet printing, screen or silk screen printing, a lithographic process, a coating process, blow molding, calendering, fiber spinning, a solution spinning process, compression molding, extrusion, brush, drawing or painting, writing, a rolling process, gel process, a spraying process, solution processing, a casting process, spin casting, blade coating, an evaporation process, conventional practices or conventional image making practices; the conductive polymer is applied thinly, unevenly or discontinuously; the conductive polymer is used to make pixels or it is used in a composition that is layered or (h) developing the canvas support medium into an aesthetic image that is art, design or architecture and displaying it; preparing the canvas support medium or aesthetic image with a means or part of a means for mounting, installation or display; or preparing the canvas support medium or aesthetic image with a means or a part of a means of installation or display which is: (i) a means or a part of a means for display on a wall or vertical surface or by hanging; a hook or wire attached to enable hanging; or holes to enable hanging, (ii) a base, a stand, a frame, a backing, reinforcement, a part or a form that enables it's installation or display, or a means that enables installation or display in a manner that resembles the manner in which conventional aesthetic images are displayed for viewing; (iii) a part, parts or the means by which it can scroll, roll, unroll, fold out or fold up or preparing it with a form that scrolls, rolls, unrolls, folds, or unfolds; (iv) a rigid mount system or a combination rigid and wire mount system capable of displaying the canvas support medium or the image from a wall; (v) a means of displaying the canvas support medium or image that leaves negative space between it and the wall, ceiling, floor or other structure from which it is displayed; or (vi) a means of being self supportive or freestanding.

7. The method of claim 5 wherein the canvas support medium or the art, design or architecture made therewith, thereupon or therefrom referred to herein as the image is prepared with a property provided or enhanced by a fine-art stabilizer that is:

a supportive layer, an image support stabilizer, a separating layer stabilizer, a strengthening stabilizer, a surface preparation stabilizer that enhances or enables bonding to superimposed mediums, a stabilizer that provides or enhances color stability, a stabilizer that provides or enhances stability when exposed to ultraviolet light, a stabilizer that enhances permanence, or a stabilizer that is a processing aid;

a fine-art stabilizer that partially or completely shields or blocks one or more vulnerable or potentially vulnerable parts of the canvas support medium or the image from moisture, oxygen, ultraviolet light, agents used to clean or care for it or them, or other agents that otherwise would or that otherwise have the risk of undesirably modifying, changing or damaging the shielded part or parts of, or the rest of the form of the canvas support medium and/or the image;

a fine-art stabilizer that is a barrier, a means of encapsulation or a shield protecting the canvas support medium, the image, conductive polymer, the display, the OLED, or part of any of these against the ingress of moisture, water, oxygen or any agent that will or might modify, damage or destroy a property of the conductive polymer, the display, the canvas support medium, or the image, or a fine-art stabilizer that is: energy, electrical current or electricity conducted by the conductive polymer; a form, device, battery, solar cell, electrode, anode, cathode, or wire that supplies, conducts or carries energy to the conductive polymer; spin casting, ink jet printing or other printing process used to apply conductive polymer; an aid used to process the conductive polymer; a solvent or liquid that enables or enhances solution processing of the conductive polymer; a dopant or agent used to treat polymer so that it becomes conductive or more conductive or this doping process or treatment.

8. A method for making a synthetic fine-artist's image-making canvas support medium as a new reinvented version of the conventional utilitarian fine artist's canvas, wherein the new reinvented canvas support medium facilitates the creation of art, design or architecture therewith, thereupon or therefrom, referred to herein as an image, which method comprises: preparing the canvas support medium with at least one non-conductive or poorly conductive polymer and forming it with an aesthetic texture made by taking one or more negative or positive impressions from one or more organic or natural materials, to make texture on the canvas support medium that resembles the organic or natural material's texture or each organic or natural materials' texture, a negative impression of it or them, or a combination of these, or such a texture made on the canvas support medium from at least part of a Nymphaeaceae Victoria also known as an Amazon Waterlily, and the canvas support medium is made so that one or more of its polymers are in an amount sufficient to provide or enable the image to have at least one aesthetic element, so that the reinvented canvas support medium facilitates artistic expression, and the creation and display of an aesthetic image that is art, design or architecture made therewith, thereupon or therefrom that is a work or object for visual observation or display and a whole in and of itself with distinct boundaries or edges; and the method also requires one or more of (A)-(G) below:

(A) making the canvas support medium: opaque, planar and two dimensional, or making the canvas support medium transparent, translucent or both to allow light to pass into it or through it, and the at least one polymer is poly(methyl methacrylate) or acrylic, or it is a polymer made with a methacrylate ester or methacrylamide derivative and one or more of (i)-(iv):

(i) an impact modifier stabilizer is present, a stabilizer is present that enhances or enables bonding or that is a surface preparation stabilizer layer; a stabilizer is present that provides or enhances the ability of the canvas support medium, the image or both to remain color stable or to remain unchanged with exposure to ultraviolet light; or a stabilizer is present that affects surface flow or leveling, or that facilitates superimposing applications;

(ii) the at least one polymer is partially or entirely 2D planar;

(iii) the at least one polymer is partially but not completely made with poly(methyl methacrylate) or acrylic, or is made with a methacrylate ester or methacrylamide derivative with at least one different polymer or monomer, or with a strengthening stabilizer that is a surfacing veil fiberglass or that is fiber located in a transparent or translucent polymer part of the canvas support medium, wherein this fiber is capable of being largely invisible or invisible to the unaided human eye when used within or under transparent colorless polymer or when used within or under transparent colorless polymer that penetrates it, that is at least about a quarter of an inch thick, or both; or (iv) the at least one polymer is partially but not completely made with poly(methyl methacrylate) or acrylic, or a methacrylate ester or methacrylamide derivative and the canvas support medium is cleaned sufficiently to render it receptive to artist's paint and to provide enhanced bond strength and permanence to facilitate development of the aesthetic image;

(B) preparing the canvas support medium as a form that is partially or entirely transparent, translucent or both, capable of bonding to conventional artist's mediums, with a stabilizer that provides or enhances the ability of the formed polymer, the formed canvas support medium and the image to remain color stable or to remain unchanged with exposure to ultraviolet light, and: (i) accompanying it with instructions on developing it into an aesthetic image; (ii) cleaning it sufficiently to render it receptive to artist's paint and to provide enhanced bond strength and permanence to facilitate development of the aesthetic image; (iii) making it with a strengthening stabilizer that is not visible to viewers within it's transparent or translucent polymer form and developing it into an aesthetic image; (iv) preparing it with a means or a key part of a means of display; or (v) making the canvas support medium with two or more layers, one of which is transparent or translucent polymer and another of which makes a visible aesthetic contribution to the canvas support medium as an underlayer, or it provides or assists in the support or structure of the canvas support medium;

(C) preparing the canvas support medium with a surface preparation stabilizer layer or other stabilizer in or on it's surface that enhances or enables bonding and one or more of:

(i) forming the canvas support medium with a polymer surface made with a stabilizer ingredient in it that bonds or fortifies the bond between it and one or more superimposed conventional artist's mediums, wherein this stabilizer ingredient is at least one conventional artist's painting medium, primer or binder;

(ii) accompanying it with instructions on developing it into an aesthetic image;

(iiii) cleaning it sufficiently to render it receptive to artist's paint and to provide enhanced bond strength and permanence to facilitate development of the aesthetic image; or (iv) making the canvas support medium: opaque, planar and two dimensional, or making the canvas support medium transparent, translucent or both to allow light to pass into it or through it, and the method requires one or more of: (iv-a) adding a stabilizer to provide or enhance the ability of the formed polymer, the formed canvas medium and the image to remain color stable or to remain unchanged with exposure to ultraviolet light, (iv-b) adding a means or a key part of a means of installation or display as an aesthetic image; or (iv-c) developing the canvas support medium with a conventional artist's painting or drawing medium, or developing the canvas support medium into an aesthetic image;

(D) preparing the canvas support medium with at least one absorbent polymer, with at least one conductive polymer, or with an OLED made with conductive polymer; forming the canvas support medium with deckled edges, with irregularities throughout resembling the texture of handmade paper, or with texture resembling conventional canvas; preparing the canvas support medium with a stabilizer that affects surface flow or leveling, or with a stabilizer that facilitates superimposing applications; or providing the canvas support medium with a rigid mount system or a combination rigid and wire mount system capable of displaying the canvas support medium or the image from a wall or vertical surface;

(E) forming the canvas support medium with texture from an Amazon Water-lily and developing it into an aesthetic image by one or more additions which contribute to it's aesthetic that are: collage or a drawing medium; a photographic picture, emulsion, or transparency; a film or video; an electrically active layer, part or device; embedding, inlay, crystal, a hologram, a monitor, a battery or a solar cell, an air pocket, air bubbles, a light reflective or iridescent material or medium; a means of detecting or sensing a person, the environment or change, and then responding or responding by changing a color, a light property or an aesthetic element; a light source or a means of emitting sound; the ability to be interactive or at least one interactive feature or part; or a means or a key part of a means of display as an aesthetic image;

(F) preparing the canvas support medium or image with a polymeric, visible, aesthetic element: (i) at least part of the positive or negative form of which functions as a lens, a Fresnel lens, a grating, a diffraction grating or a prism; a transparent or translucent lenticular lens or form; or two or more of these; (ii) with a dichroic effect, or with a photochromic effect; (iii) with an electrochromic effect whereby it responds to changes in electrical current by changing or by changing it's state of or it's level of: transparency, translucency, reflectivity, light emission employing conductive polymer, it changes the path or color of the light passing through it, or a combination of these; (iv) one or more of (i)-(iii) that serves as part or all of an image support, an image support stabilizer or an underlayer; wherein this canvas support medium or image prepared according to (i), (ii), (iii) or (iv) above is also prepared with one or more of (1)-(5) as follows: (1) it is cleaned sufficiently to render it receptive to artist's paint and to provide enhanced bond strength and permanence to facilitate development of the aesthetic image; (2) it is prepared with a surface preparation stabilizer or another stabilizer that enables or enhances bonding to conventional artist's mediums; (3) it is developed into an aesthetic image; or it is prepared according to (ii) or (iii) above and the photochromic, dichroic or eletrochromic effect provides a pictorial or design element, a picture or a drawing thereby developing it into an aesthetic image; (4) it is accompanied by instructions on how it can be developed into an aesthetic image; or (5) it is made with absorbent polymer or conductive polymer;

(G) making the canvas support medium in an overall form that is geometric, nonrepresentational, or free from looking like the real natural or organic form or forms from which it's texture was made, and therefore free from being: a realistic portrayal, specimen or model that looks like the real, natural or organic form or forms from which it's texture was made, wherein preparation of the canvas support medium requires one or more of (G-A)-(G-C):

(G-A) making the canvas support medium opaque, planar and two dimensional or making it transparent, translucent or both to allow light to pass into it or through it, and one or more of (i) - (viii): (i) in a planar, two dimensional form or a sheet-like form; (ii) adding stabilizer to provide or enhance the ability of the polymer or the canvas support medium to remain color stable or to remain unchanged with exposure to ultraviolet light, (iii) preparing the canvas support medium's surface with a surface preparation stabilizer layer or other stabilizer in or on it to enhance or enable bonding; (iv) accompanying this canvas support medium with instructions on how it might be further developed into an aesthetic image; (v) cleaning the canvas support medium sufficiently to render it receptive to artist's paint and to provide enhanced bond strength and permanence to facilitate development of the aesthetic image; (vi) making it with a strengthening stabilizer that is not visible to viewers within it's transparent or translucent polymer form and developing it into an aesthetic image; (vii) preparing it with a means or a key part of a means of display and developing it into an aesthetic image; or (viii) preparing the canvas support medium according to the specifications in (F), subsection (i), (ii), (iii) or (iv) above;

(G-B) developing the canvas support medium with (1) and (2) as follows:

(1) it is prepared with all of (a)-(d):

(a) it is opaque, planar and two dimensional, or it is transparent, translucent or both, to allow light to pass into it or through it, (b) it is prepared with an at least one polymer that is one or more of (i)-(v):

(i) partially but not completely poly(methyl methacrylate) or acrylic, or that is partially made with a methacrylate ester or methacrylamide derivative, (ii) poly(methyl methacrylate) or acrylic, or a methacrylate ester or methacrylamide derivative and an impact modifier stabilizer is present; a stabilizer is present to further enhance the ability of the formed canvas support medium or the image to remain color stable or to remain unchanged with exposure to ultraviolet light; or a stabilizer is present that enhances bonding or that is a surface preparation stabilizer layer;

(iii) poly(methyl methacrylate) or acrylic, or a methacrylate ester or methacrylamide derivative and the canvas support medium has: deckled edges, irregularities throughout resembling the texture of handmade paper, texture resembling conventional canvas;

(iv) poly(methyl methacrylate) or acrylic, or a methacrylate ester or methacrylamide derivative with a form that is 2D planar; or (v) a different polymer;

(c) it is made to be color stable, or to remain unchanged with exposure to ultraviolet light, or a stabilizer is present that provides or enhances one or both of these features; and (d) it is capable of bonding to at least one conventional artist's painting medium, artist's drawing medium or photographic emulsion, or a stabilizer is present to provide or enhance this bonding, and (2) developing the canvas support medium also requires one or more of (e)-(h):

(e) a means or a key part of a means for installation or display as an aesthetic image;

(f) it is cleaned sufficiently to render it receptive to conventional artist's paint and to provide enhanced bond strength and permanence to facilitate further development of the aesthetic image;

(g) it is accompanied by instructions on developing it into an aesthetic image; or (h) it is developed into an aesthetic image; or (G-C) preparing the canvas support medium with texture made from at least part of a Nymphaeaceae Victoria or Amazon Water-lily.

9. The method of claim 1, wherein the canvas support medium or the art, design or architecture made therewith, thereupon or therefrom referred to herein as the image is prepared according to one or more of (a)-(f):

(a) developing the canvas support medium into an aesthetic image that is art, design or architecture and displaying it; or preparing the canvas support medium or image with a means or a part of a means of installation or display which is: (i) a means or a part of a means for display on a wall or vertical surface or by hanging; a hook or wire attached to enable hanging; or holes to enable hanging, (ii) a base, a stand, a frame, a backing, reinforcement, a part or a form that enables it's installation or display, or a means that enables installation or display in a manner that resembles the manner in which conventional aesthetic images are displayed for viewing; (iii) a part, parts or the means by which it can scroll, roll, unroll, fold out or fold up or preparing it with a form that scrolls, rolls, unrolls, folds, or unfolds; (iv) a rigid mount system or a combination rigid and wire mount system capable of displaying the canvas support medium or the image from a wall; (v) a means of displaying the canvas support medium or image that leaves negative space between it and the wall, ceiling, floor or other structure from which it is displayed; or (vi) a means of being self supportive or freestanding;

(b) preparing a surface on the canvas support medium or image that is clean or that is cleaned sufficiently to be receptive to a conventional artist's medium or to enhance the strength and permanence of the bond formed between that surface and an artist's medium; preparing the canvas support medium or image to bond to a conventional artist's medium so that the bond endures well through the image making process and through the use or display of the resultant image, or preparing it to bond as such wherein the conventional artist's painting medium is one or more of: oil paint, water soluble oil paint, acrylic paint, alkyd paint, encaustic, paint sticks, watercolor, tempera, egg tempera, casein paint, vinyl paint, ink or gouache; or forming the canvas support medium or image so that it is as stable over time or as permanent as possible;

(c) forming or developing the canvas support medium or image using conventional image making practices or using conventional practices for making art; forming or developing the canvas support medium or image by adding: a conventional image making medium, a conventional artist's medium, a primer conventionally used to make images, an underlayer, an imprimatura, a Clarifying Imprimatura, a ground, underdrawing, underpainting, painting, drawing, or collage which bonds to the canvas support medium, the image or to its polymer; adding at least one paint, ink or other colorant at two or more different spatial depths which are visible to viewers within the transparent or translucent form of the canvas support medium or image; using one or more transparent or translucent separating layers of polymer to separate one or more applications, layers or attachments of aesthetic, design or pictorial elements on the separating layer or layers' opposite sides; adding a part or layer with a refractive index different from that of the rest of the canvas support medium, the image, the nearest part thereof or any of these made of polymer;

preparing the canvas support medium or image with at least one conductive polymer that provides or enables an aesthetic effect or emitted light, and also with at least one: lens, prism, grating, variation described in claim 1 (D), light effect, at least one of these that effects the light visible in or emitted from the canvas support medium or image, or one or more of these that serve as part of all of an image support;

adding: an image support, a clear external layer of polymer, a colorant; a light source or a means of emitting light, a light effect or a material, a device or another means that effects light properties; a solar cell, a battery, a power source, a lens, a grating, a prism, a filter; crystal, gem, stone, fabric, paper, clay, ceramic, wood, embedding, an air bubble, a hologram, a photographic image, a photographic emulsion, or a photographic transparency; a dichroic or dichromatic ingredient; writing, text, incising, inlay, carving or embossing; texture or an ingredient that adds texture; a moving part or a means to be capable of movement, a photochromic effect; an electrically active feature, or adding an anti-glare, anti-scratch or anti-reflective coating, layer ingredient or surface;

(d) making the canvas support medium or image in a shape or form that contributes to the image's aesthetic by being one or more of: representational, figurative, openwork, linear, discontinuous, non geometric, non-uniform, irregular, uneven, nonplanar, hollow, with a negative space, with an air pocket; with irregularities that make it look handmade; with at least one curve, angle or undulation; capable of folding, unfolding, rolling out or scrolling; with two or more parts that are joined or separate; with all edges deckled; with a form that is partially or entirely: layered, opaque, transparent, or translucent; with a form, a planar form or a planar two dimensional form that is transparent or translucent and polymeric, and that has two or more light sources in it or attached to it; or with a transparent, planar, two dimensional polymeric form that has multiple light sources, OLEDs or other LEDs in it or attached to it; or forming or developing the canvas support medium or image so that it has two or more layers, with at least one layer that is: partially or entirely transparent or translucent or such a layer that is external; a polymeric or non polymeric image support, image support stabilizer or strengthening stabilizer; made with or of glass, fabric, embedding, polymer, conductive polymer, a device, a light effect, an aesthetic element that uses electricity, or a non polymeric aesthetic ingredient; providing color, or an internal layer or back layer providing color; or a combination of these;

(e) preparing the canvas support medium or image with: a computer or part of a computer, an interactive feature, an interactive part or a means of being capable of interactivity; sound, music, a microphone or a speaker; a control mechanism or device, a viewer input device, a switch, a button, a touch control, a mechanism or device which enables control or change when pressure is applied, a drawing device, a trackball, a mouse, a means of responding to sound or voice command; voice recognition technology; a means of controlling or changing the canvas support medium or image from a distance, via wireless communication or via a broadcast method; a sensor, a means of sensing or detecting a viewer, movement, sound, or change in light or in the environment, or such a means of sensing or detecting with a means of responding or of responding by changing an aesthetic element of the canvas support medium or image; or a means so that an image maker or viewer can control, change or vary the electrical current, color, light, form, movement or an aesthetic element in the canvas support medium or image; or making the canvas support medium, image or part thereof change in relation to change in natural light or skylight; or making it portray the sky or the light of the sky, wherein this portrayal is static, it changes, it can be changed, or an image maker or a viewer can change it this portrayal is abstract, representational, realistic, surrealistic, with figures, with landscape, with a still life or it is illusionary; this portrayal is at least partially formed with light in one or more colors, or this portrayal is at least partially formed by color or light changing as the sky changes or in a manner that portrays or represents the sky; or (f) the canvas support medium or image made with an aesthetic effect created by electricity that causes the positions of particles, of liquid crystals, or of liquid crystals in a polymer layer or matrix to change.

10. The method of claim 3, wherein the canvas support medium or the art, design or architecture made therewith, thereupon or therefrom referred to herein as the image is prepared by one or more of (a)-(f):

(a) developing the canvas support medium into an aesthetic image that is art, design or architecture and displaying it or preparing the canvas support medium or image with a means or a part of a means of installation or display which is: (i) a means or a part of a means for display on a wall or vertical surface or by hanging; a hook or wire attached to enable hanging; or holes to enable hanging, (ii) a base, a stand, a frame, a backing, reinforcement, a part or a form that enables it's installation or display, or a means that enables installation or display in a manner that resembles the manner in which conventional aesthetic images are displayed for viewing; (iii) a part, parts or the means by which it can scroll, roll, unroll, fold out or fold up or preparing it with a form that scrolls, rolls, unrolls, folds, or unfolds; (iv) a rigid mount system or a combination rigid and wire mount system capable of displaying the canvas support medium or the image from a wall; (v) a means of displaying the canvas support medium or image that leaves negative space between it and the wall, ceiling, floor or other structure from which it is displayed; or (vi) a means of being self supportive or freestanding;

(b) preparing a surface on the canvas support medium or image that is clean or that is cleaned sufficiently to be receptive to a conventional artist's medium or to enhance the strength and permanence of the bond formed between that surface and an artist's medium; preparing the canvas support medium or image to bond to a conventional artist's mediums so that the bond endures well through the image making process and through the use or display of the resultant image, or preparing it to bond as such wherein the conventional artist's painting medium is one or more of: oil paint, water soluble oil paint, acrylic paint, alkyd paint, encaustic, paint sticks, watercolor, tempera, egg tempera, casein paint, vinyl paint, ink or gouache; or forming the canvas support medium or image so that it is as stable over time or as permanent as possible;

(c) forming or developing the canvas support medium or image using conventional image making practices or using conventional practices for making art; forming or developing the canvas support medium or image by adding: a conventional image making medium, a conventional artist's medium, a primer conventionally used to make images, an underlayer, an imprimatura, a Clarifying Imprimatura, a ground, underdrawing, underpainting, painting, drawing, or collage which bonds to the canvas support medium, the image or to its polymer; adding at least one paint, ink or other colorant at two or more different spatial depths which are visible to viewers within the transparent or translucent form of the canvas support medium or image; using one or more transparent or translucent separating layers of polymer to separate one or more applications, layers or attachments of aesthetic, design or pictorial elements on the separating layer or layers' opposite sides; adding a part or layer with a refractive index different from that of the rest of the canvas support medium, the image, the nearest part thereof or any of these made of polymer;

preparing the canvas support medium or image with at least one conductive polymer that provides or enables an aesthetic effect or emitted light, and also with at least one: lens, prism, grating, variation described in claim 3 (D), light effect, at least one of these that effects the light visible in or emitted from the canvas support medium or image, or one or more of these that serve as part of all of an image support;

adding: an image support, a clear external layer of polymer, a colorant; a light source or a means of emitting light, a light effect or a material, a device or another means that effects light properties; a solar cell, a battery, a power source, a lens, a grating, a prism, a filter; crystal, gem, stone, fabric, paper, clay, ceramic, wood, embedding, an air bubble, a hologram, a photographic image, a photographic emulsion, or a photographic transparency; a dichroic or dichromatic ingredient; writing, text, incising, inlay, carving or embossing; texture or an ingredient that adds texture; a moving part or a means to be capable of movement, a photochromic effect; an electrically active feature, or adding an anti-glare, anti-scratch or anti-reflective coating, layer, ingredient or surface;

(d) making the canvas support medium or image in a shape or form that contributes to the image's aesthetic by being one or more of: representational, figurative, openwork, linear, discontinuous, non geometric, hollow, with a negative space, with an air pocket; with irregularities that make it look handmade; with at least one curve, angle or undulation; capable of folding, unfolding, rolling out or scrolling; with two or more parts that are joined or separate; with all edges deckled; with a form that is partially or entirely: layered, opaque, transparent, or translucent; with a form, a planar form or a planar two dimensional form that is transparent or translucent and polymeric, and that has two or more light sources in it or attached to it; or with a transparent, planar, two dimensional polymeric form that has multiple light sources, OLEDs or other LEDs in it or attached to it; or forming or developing the canvas support medium or image so that it has two or more layers, with at least one layer that is: partially or entirely transparent or translucent or such a layer that is external; a polymeric or non polymeric image support, image support stabilizer or strengthening stabilizer; made with or of glass, fabric, embedding, polymer, conductive polymer, a device, a light effect, an aesthetic element that uses electricity, or a non polymeric aesthetic ingredient; providing color, or an internal layer or back layer providing color; or a combination of these;

(e) preparing the canvas support medium or image with: a computer or part of a computer, an interactive feature, an interactive part or a means of being capable of interactivity; sound, music, a microphone or a speaker; a control mechanism or device, a viewer input device, a switch, a button, a touch control, a mechanism or device which enables control or change when pressure is applied, a drawing device, a trackball, a mouse, a means of responding to sound or voice command; voice recognition technology; a means of controlling or changing the canvas support medium or image from a distance, via wireless communication or via a broadcast method; a sensor, a means of sensing or detecting a viewer, movement, sound, or change in light or in the environment, or such a means of sensing or detecting with a means of responding or of responding by changing an aesthetic element of the canvas support medium or image; or a means so that an image maker or viewer can control, change or vary the electrical current, color, light, form, movement or an aesthetic element in the canvas support medium or image; or making the canvas support medium, image or part thereof change in relation to change in natural light or skylight; or making it portray the sky or the light of the sky, wherein this portrayal is static, it changes, it can be changed, or an image maker or a viewer can change it; this portrayal is abstract, representational, realistic, sur-realistic, with figures, with landscape, with a still life or it is illusionary; this portrayal is at least partially formed with light in one or more colors, or this portrayal is at least partially formed by color or light changing as the sky changes or in a manner that portrays or represents the sky; or (f) the canvas support medium or image made with an aesthetic effect created by electricity that causes the positions of particles, of liquid crystals, or of liquid crystals in a polymer layer or matrix to change;

wherein the methods of developing the canvas support medium or aesthetic image listed in (a)-(f) above or other methods of development maintain, interrupt or change the uniformity, regularity or flexibility of their forms.

11. The method of claim 4, wherein the canvas support medium or the art, design or architecture made therewith, thereupon or therefrom referred to herein as the image is prepared by one or more of (a)-(f):

(a) developing the canvas support medium into an aesthetic image that is art, design or architecture and displaying it or preparing the canvas support medium or image with a means or a part of a means of installation or display which is: (i) a means or a part of a means for display on a wall or vertical surface or by hanging; a hook or wire attached to enable hanging; or holes to enable hanging, (ii) a base, a stand, a frame, a backing, reinforcement, a part or a form that enables it's installation or display, or a means that enables installation or display in a manner that resembles the manner in which conventional aesthetic images are displayed for viewing; (iii) a part, parts or the means by which it can scroll, roll, unroll, fold out, or fold up, or preparing it with a form that scrolls, rolls, unrolls, folds, or unfolds; (iv) a rigid mount system or a combination rigid and wire mount system capable of displaying the canvas support medium or the image from a wall; or (v) a means of displaying the canvas support medium or image that leaves negative space between it and the wall, ceiling, floor or other structure from which it is displayed; or (vi) a means of being self supportive or freestanding;

(b) preparing a surface on the canvas support medium or image that is clean or that is cleaned sufficiently to be receptive to a conventional artist's medium or to enhance the strength and permanence of the bond formed between that surface and an artist's medium; preparing the canvas support medium or image to bond to a conventional artist's mediums so that the bond endures well through the image making process and through the use or display of the resultant image, or preparing it to bond as such wherein the conventional artist's painting medium is one or more of: oil paint, water soluble oil paint, acrylic paint, alkyd paint, encaustic, paint sticks, watercolor, tempera, egg tempera, casein paint, vinyl paint, ink or gouache; or forming the canvas support medium or image so that it is as stable over time or as permanent as possible;

(c) forming or developing the canvas support medium or image using conventional image making practices or using conventional practices for making art; forming or developing the canvas support medium or image by adding: a conventional image making medium, a conventional artist's medium, a primer conventionally used to make images, an underlayer, an imprimatura, a Clarifying Imprimatura, a ground, underdrawing, underpainting, painting, drawing, or collage which bonds to the canvas support medium, the image or to its polymer; using one or more transparent or translucent separating layers of polymer to separate one or more applications, layers or attachments of aesthetic, design or pictorial elements on the separating layer or layers' opposite sides; adding a part or layer with a refractive index different from that of the rest of the canvas support medium, the image, the nearest part thereof or any of these made of polymer;

preparing the canvas support medium or image with at least one conductive polymer that provides or enables an aesthetic effect or emitted light, and also with at least one: lens, prism, grating, variation described in claim 4 (E), light effect, at least one of these that effects the light visible in or emitted from the canvas support medium or image, or one or more of these that serve as part of all of an image support; or adding: an image support, a clear external layer of polymer, a colorant; a light source or a means of emitting light, a light effect or a material, a device or another means that effects light properties; a solar cell, a battery, a power source, a lens, a grating, a prism, a filter; crystal, gem, stone, fabric, paper, clay, ceramic, wood, embedding, an air bubble, a hologram, a photographic image, a photographic emulsion, or a photographic transparency; a dichroic or dichromatic ingredient; writing, text, incising, inlay, carving or embossing; texture or an ingredient that adds texture; a moving part or a means to be capable of movement, a photochromic effect; an electrically active feature, or adding an anti-glare, anti-scratch or anti-reflective coating, layer, ingredient or surface;

(d) making the canvas support medium or image in a shape or form that contributes to the image's aesthetic by being one or more of: representational, figurative, openwork, linear, non geometric, hollow, with a negative space, with an air pocket; with irregularities that make it look handmade; with at least one curve, or undulation; capable of folding, unfolding, rolling out or scrolling; with two or more parts that are joined or separate; with all edges deckled; with a form that is partially or entirely: layered, opaque, transparent, or translucent; with a form, or a two dimensional form that is transparent or translucent and polymeric, and that has two or more light sources in it or attached to it; or with a transparent, planar, two dimensional polymeric form that has multiple light sources, OLEDs or other LEDs in it or attached to it; or forming or developing the canvas support medium or image so that it has two or more layers, with at least one layer that is: partially or entirely transparent or translucent or such a layer that is external; a polymeric or non polymeric image support, image support stabilizer or strengthening stabilizer; made with or of glass, fabric, embedding, polymer, conductive polymer, a device, a light effect, an aesthetic element that uses electricity, or a non polymeric aesthetic ingredient; providing color, or an internal layer or back layer providing color; or a combination of these;

(e) preparing the canvas support medium or image with: a computer or part of a computer, an interactive feature, an interactive part or a means of being capable of interactivity; sound, music, a microphone or a speaker; a control mechanism or device, a viewer input device, a switch, a button, a touch control, a mechanism or device which enables control or change when pressure is applied, a drawing device, a trackball, a mouse, a means of responding to sound or voice command; voice recognition technology; a means of controlling or changing the canvas support medium or image from a distance, via wireless communication or via a broadcast method; a sensor, a means of sensing or detecting a viewer, movement, sound, or change in light or in the environment, or such a means of sensing or detecting with a means of responding or of responding by changing an aesthetic element of the canvas support medium or image; or a means so that an image maker or viewer can control, change or vary the electrical current, color, light, form, movement or an aesthetic element in the canvas support medium or image; or making the canvas support medium, image or part thereof change in relation to change in natural light or skylight; or making it portray the sky or the light of the sky, wherein this portrayal is static, it changes, it can be changed, or an image maker or a viewer can change it; this portrayal is abstract, representational, realistic, surrealistic, with figures, with landscape, with a still life or it is illusionary; this portrayal is at least partially formed with light in one or more colors, or this portrayal is at least partially formed by color or light changing as the sky changes or in a manner that portrays or represents the sky; or (f) the canvas support medium or image made with an aesthetic effect created by electricity that causes the positions of particles, of liquid crystals, or of liquid crystals in a polymer layer or matrix to change;

wherein the methods of developing the canvas support medium or aesthetic image listed in (a)-(f) above or other methods of development maintain, interrupt or change the uniformity, regularity, flexibility or thinness of their forms.

12. The method of claim 1, wherein the canvas support medium or the art, design or architecture made therewith, thereupon or therefrom referred to herein as the image is prepared by one or more of (a)-(h):

(a) making the canvas support medium or image with: (i) a co-polymer wherein one monomer is methacrylate ester, methacrylamide derivative or methyl methacrylate; (ii) a co-polymer wherein one monomer is methacrylate ester, methacrylamide derivative or methyl methacrylate and another is a monomer that enhances the strength or rigidity of the resultant polymer, canvas support medium or image; (iii) a mixture wherein one polymer is poly(methyl methacrylate) or it is made from methacrylate ester or methacrylamide derivative; or (iv) a mixture wherein the polymer is made with poly(methyl methacrylate) or a polymer made from methacrylate ester or methacrylamide derivative, and a second polymer that enhances the strength or rigidity of the resultant polymer, canvas support medium or image;

(b) making the canvas support medium or image with two or more different layers, one of which is an external surface preparation stabilizer layer on the canvas support medium's or image's main surface that is made with: (b-i) a non absorbent polymer that is transparent, translucent or both, (b-ii) a synthetic absorbent polymer, or (b-iii) a combination of both, wherein this surface preparation stabilizer layer bonds well to at least one kind of conventional artist's painting medium or photographic emulsion, and it bonds well to the part of the image, the canvas support medium or the image support beneath it;

(c) forming the canvas support medium or image with an at least one polymer that is absorbent and another ingredient, with the absorbent polymer used in a formulation, an amount and a design sufficient to enable or enhance the canvas support medium's or image's bond with at least one kind of superimposed conventional artist's medium which it absorbs, wherein the other ingredient is of a composition, and is used in an amount and in a design which enhances the canvas support medium's or image's mechanical or structural properties;

(d) the canvas support medium or image is made with: a copolymer or a polymer mixture with at least one synthetic absorbent polymer; a synthetic absorbent polymer and a non absorbent polymer; a synthetic absorbent polymer on an image support made with non absorbent polymer; or any of these wherein the canvas support medium or image is transparent or translucent;

(e) the canvas support medium or image has two or more layers or parts made of different polymers which are superimposed or connected, wherein at least one of these polymer layers or parts provides support to the medium or image, and at least one different layer or part provides or enables the image to have at least one element selected from the group consisting of an aesthetic element, transparency, translucency, an ability to emit visible light, an ability to bond to at least one superimposed application, or an ability to be further developed by cutting, carving, sculpting or incising;

(f) forming the canvas support medium or image with a stabilizer that: enables or enhances it's color stability or it's ability to remain stabile with exposure to ultraviolet light; is an ultraviolet light stabilizer, an ultraviolet light absorber, or a hindered amine light stabilizer; is a fiberglass surfacing veil, or a fiber that like surfacing veil fiberglass, becomes largely invisible or invisible to the unaided human eye when used within or under transparent colorless polymer or when used within or under transparent colorless polymer that penetrates it, that is at least about a quarter of an inch thick, or both;

a stabilizer that enhances permanence, a stabilizer that is a processing aid, a surface preparation stabilizer, a stabilizer that enables or enhances bonding, a strengthening stabilizer, a stabilizer that modifies the absorbency of at least some of the polymer; a stabilizer that maintains or enhances impact resistance, scratch resistance or hardness; a stabilizer that is radiation which cures or crosslinks the at least one polymer; a stabilizer that crosslinks an absorbent polymer, a stabilizer that is a crossliniking monomer used with an absorbent polymer; or the canvas support medium, the image or some or all of its polymer is reinforced by, made stiffer by, or has its means of display provided or enhanced by a strengthening stabilizer within or on it or a portion of it, or bonded to it or a portion thereof, or it has such a strengthening stabilizer that is: (1) not visible to viewers; (2) made with a different, stronger or more rigid polymer; (3) a means of display or part of a means of display, a rigid mount system or a combination rigid and wire mount system capable of displaying the canvas support medium or the image from a wall; or (4) fiber, a surfacing veil fiberglass or a fiber that like surfacing veil fiberglass, becomes largely invisible or invisible to the unaided human eye when used within or under transparent colorless polymer or when used within or under transparent colorless polymer that penetrates it, that is at least about a quarter of an inch thick, or both;

(g) developing the canvas support medium or image by the application a conventional artist's drawing or painting medium to which it bonds; developing the canvas support medium or image so that it shows at least part of a drawing, picture or design, or one of these that is figurative, realistic, representational, abstract, illusionistic, a landscape, or a still life; developing the canvas support medium or the aesthetic image as a mural on a wall, ceiling or other architectural structure; or (h) making the canvas support medium or image so that serves a second utilitarian function in addition to it's function for image making; preparing the image to serve a utilitarian function, or making the canvas support medium or image function as: a door, a gate, a fence, a stage set, a partition, a screen, furniture, a table, a chair, a stool, a chest, a cabinet, a cart, a bench, a tent, an awning, a fountain, a basket, a case or container, a light fixture, candelabrum, a window, a skylight, a lunette, shades, shutters, a tile, a column, or a set, grouping or compositional arrangement of these that is a single work; a building facade, a wall, a ceiling, a floor, stairs or another architectural form or structure; craft design, a vase, a bowl, a tray, a cup or goblet, a plate, a dish, a pitcher, a soup tureen, a placemat, or a work of design for household use; an altar, a menorah or an image for spiritual or religious use; a book or pad that is a new version of the conventional image making blank book or blank paper pad capable of being developed into visual pictorial image, or a plurality of associated sheets arranged in a book or pad form capable of such image making; an image of graphic design or book design free or nearly free of visible legible text; an image of design, fashion design, clothing, a fashion or clothing accessory, jewelry, a hat, a belt, a purse, a tote bag, or a costume.

13. The method of claim 3, wherein the canvas support medium or the art, design or architecture made therewith, thereupon or therefrom referred to herein as the image is prepared by one or more of (a)-(h):

(a) making the canvas support medium or image with: (i) a co-polymer wherein one monomer is methacrylate ester, methacrylamide derivative or methyl methacrylate; (ii) a co-polymer wherein one monomer is methacrylate ester, methacrylamide derivative or methyl methacrylate and another is a monomer that enhances the strength, rigidity, flexibility or permanence of the resultant polymer, canvas support medium or image; (iii) a mixture wherein one polymer is poly(methyl methacrylate) or it is made from methacrylate ester or methacrylamide derivative; or (iv) a mixture wherein the polymer is made with poly(methyl methacrylate) or a polymer made from methacrylate ester or methacrylamide derivative, and a second polymer that enhances the strength, rigidity, flexibility or permanence of the resultant polymer, canvas support medium or image;

(b) making the canvas support medium or image with two or more different layers, one of which is an external surface preparation stabilizer layer on the canvas support medium's or image's main surface that is made with: (b-i) a non absorbent polymer that is transparent, translucent or both, (b-ii) a synthetic absorbent polymer, or (b-iii) a combination of both, wherein this surface preparation stabilizer layer bonds well to at least one kind of conventional artist's painting medium or photographic emulsion, and it bonds well to the part of the image, the canvas support medium or image support beneath it;

(c) forming the canvas support medium or image with an at least one polymer that is absorbent and another ingredient, with the absorbent polymer used in a formulation, an amount and a design sufficient to enable or enhance the canvas support medium's or image's bond with at least one kind of superimposed conventional artist's medium which it absorbs, wherein the other ingredient is of a composition, and is used in an amount and in a design which enhances the canvas support medium's or image's mechanical or structural properties;

(d) the canvas support medium or image is made with: a copolymer or a polymer mixture with at least one synthetic absorbent polymer; a synthetic absorbent polymer and a non absorbent polymer; a synthetic absorbent polymer on an image support made with non absorbent polymer; or any of these wherein the canvas support medium or image is transparent or translucent;

(e) the canvas support medium or image has two or more layers or parts made of different polymers which are superimposed or connected, wherein at least one of these polymer layers or parts provides support to the medium or image, and at least one different layer or part provides or enables the image to have at least one element selected from the group consisting of an aesthetic element, transparency, translucency, an ability to emit visible light, an ability to bond to at least one superimposed application, or an ability to be further developed by cutting, carving, sculpting or incising;

(f) forming the canvas support medium or image with a stabilizer that: enables or enhances it's color stability or it's ability to remain stabile with exposure to ultraviolet light; is an ultraviolet light stabilizer, an ultraviolet light absorber, or a hindered amine light stabilizer; is a fiberglass surfacing veil, or a fiber that like surfacing veil fiberglass, becomes largely invisible or invisible to the unaided human eye when used within or under transparent colorless polymer or when used within or under transparent colorless polymer that penetrates it, that is at least about a quarter of an inch thick, or both;

a stabilizer that enhances permanence, a stabilizer that is a processing aid, a surface preparation stabilizer, a stabilizer that enables or enhances bonding or flexibility, a strengthening stabilizer, a stabilizer that modifies the absorbency of at least some of the polymer; a stabilizer that maintains or enhances impact resistance, scratch resistance or hardness; a stabilizer that is radiation which cures or crosslinks the at least one polymer; a stabilizer that crosslinks an absorbent polymer, a stabilizer that is a crossliniking monomer used with an absorbent polymer; or the canvas support medium, the image or some or all of its polymer is reinforced by or has its means of display provided or enhanced by a strengthening stabilizer within or on it or a portion of it, or bonded to it or a portion thereof, or it has such a strengthening stabilizer that is: (1) not visible to viewers; (2) made with a different, stronger or more rigid polymer; (3) a means of display or part of a means of display, or (4) fiber, a surfacing veil fiberglass or a fiber that like surfacing veil fiberglass, becomes largely invisible or invisible to the unaided human eye when used within or under transparent colorless polymer or when used within or under transparent colorless polymer that penetrates it, that is at least about a quaffer of an inch thick, or both;

(g) developing the canvas support medium or image by the application a conventional artist's drawing or painting medium to which it bonds; developing the canvas support medium or image so that it shows at least part of a drawing, picture or design, or one of these that is figurative, realistic, representational, abstract, illusionistic, a landscape, or a still life; developing the canvas support medium or the aesthetic image as a mural; or (h) making the canvas support medium or image so that serves a second utilitarian function in addition to it's function for image making; preparing the image to serve a utilitarian function, or making the canvas support medium or image function as: a door, a gate, a fence, a stage set, a partition, a screen, furniture, a table, a chair, a stool, a chest, a cabinet, a cart, a bench, a tent, an awning, a fountain, a basket, a case or container, a light fixture, candelabrum, a window, a skylight, a lunette, shades, shutters, a tile, a column, or a set, grouping or compositional arrangement of these that is a single work; a building facade, a wall, a ceiling, a floor, stairs or another architectural form or structure; craft design, a vase, a bowl, a tray, a cup or goblet, a plate, a dish, a pitcher, a soup tureen, a placemat, or a work of design for household use; an altar, a menorah or an image for spiritual or religious use; a book or pad that is a new version of the conventional image making blank book or blank paper pad capable of being developed into visual, pictorial or design image, or a plurality of associated sheets arranged in a book or pad form capable of such image making; an image of graphic design or book design free or nearly free of visible legible text; an image of design, fashion design, clothing, a fashion or clothing accessory, jewelry, a hat, a belt, a purse, a tote bag, or a costume;

wherein the methods of developing the canvas support medium or aesthetic image listed in (a)-(h) above or other methods of development maintain, interrupt or change the uniformity, regularity or flexibility of their forms.

14. The method of claim 4, wherein the canvas support medium or the art, design or architecture made therewith, thereupon or therefrom referred to herein as the image is prepared by one or more of (a)-(h):

(a) making the canvas support medium or image with: (i) a co-polymer wherein one monomer is methacrylate ester, methacrylamide derivative or methyl methacrylate; (ii) a co-polymer wherein one monomer is methacrylate ester, methacrylamide derivative or methyl methacrylate and another is a monomer that enhances the strength, rigidity, flexibility or permanence of the resultant polymer, canvas support medium or image; (iii) a mixture wherein one polymer is poly(methyl methacrylate) or it is made from methacrylate ester or methacrylamide derivative; or (iv) a mixture wherein the polymer is made with poly(methyl methacrylate) or a polymer made from methacrylate ester or methacrylamide derivative, and a second polymer that enhances the strength, rigidity, flexibility or permanence of the resultant polymer, canvas support medium or image;

(b) making the canvas support medium or image with two or more different layers, one of which is an external surface preparation stabilizer layer on the canvas support medium's or image's main surface that is made with: (b-i) a non absorbent polymer that is transparent, translucent or both, (b-ii) a synthetic absorbent polymer, or (b-iii) a combination of both, wherein this surface preparation stabilizer layer bonds well to at least one kind of conventional artist's painting medium or photographic emulsion, and it bonds well to the part of the image, the canvas support medium or image support beneath it;

(c) forming the canvas support medium or image with an at least one polymer that is absorbent and another ingredient, with the absorbent polymer used in a formulation, an amount and a design sufficient to enable or enhance the canvas support medium's or image's bond with at least one kind of superimposed conventional artist's medium which it absorbs, wherein the other ingredient is of a composition, and is used in an amount and in a design which enhances the canvas support medium's or image's mechanical or structural properties;

(d) the canvas support medium or image is made with: a copolymer or a polymer mixture with at least one synthetic absorbent polymer; a synthetic absorbent polymer and a non absorbent polymer; a synthetic absorbent polymer on an image support made with non absorbent polymer; or any of these wherein the canvas support medium or image is transparent or translucent;

(e) the canvas support medium or image has two or more layers or parts made of different polymers which are superimposed or connected, wherein at least one of these polymer layers or parts provides support to the medium or image, and at least one different layer or part provides or enables the image to have at least one element selected from the group consisting of an aesthetic element, transparency, translucency, an ability to emit visible light, an ability to bond to at least one superimposed application, or an ability to be further developed by cutting, incising or a subtractive process;

(f) forming the canvas support medium or image with a stabilizer that: enables or enhances it's color stability or it's ability to remain stabile with exposure to ultraviolet light; is an ultraviolet light stabilizer, an ultraviolet light absorber, or a hindered amine light stabilizer; is a fiberglass surfacing veil, or a fiber that like surfacing veil fiberglass, becomes largely invisible or invisible to the unaided human eye when used within or under transparent colorless polymer or when used within or under transparent colorless polymer that penetrates it, that is at least about a quarter of an inch thick, or both;

a stabilizer that enhances permanence, a stabilizer that is a processing aid, a surface preparation stabilizer, a stabilizer that enables or enhances bonding or flexibility, a strengthening stabilizer, a stabilizer that modifies the absorbency of at least some of the polymer; a stabilizer that maintains or enhances impact resistance, scratch resistance or hardness; a stabilizer that is radiation which cures or crosslinks the at least one polymer; a stabilizer that crosslinks an absorbent polymer, a stabilizer that is a crossliniking monomer used with an absorbent polymer; or the canvas support medium, the image or some or all of its polymer is reinforced by or has its means of display provided or enhanced by a strengthening stabilizer within or on it or a portion of it, or bonded to it or a portion thereof, or it has such strengthening stabilizer that is: (1) not visible to viewers; (2) made with a different, stronger or more rigid polymer; (3) a means of display or part of a means of display, or (4) fiber, a surfacing veil fiberglass or a fiber that like surfacing veil fiberglass, becomes largely invisible or invisible to the unaided human eye when used within or under transparent colorless polymer or when used within or under transparent colorless polymer that penetrates it, that is at least about a quarter of an inch thick, or both;

(g) developing the canvas support medium or image by the application a conventional artist's drawing or painting medium to which it bonds; developing the canvas support medium or image so that it shows at least part of a drawing, picture or design, or one of these that is figurative, realistic, representational, abstract, illusionistic, a landscape, or a still life; developing the canvas support medium or the aesthetic image as a mural; or (h) making the canvas support medium or image so that serves a second utilitarian function in addition to it's function for image making; preparing the image to serve a utilitarian function, or developing the canvas support medium or image with properties or features useful for creating an aesthetic image, that also has a second utilitarian function either (i) in it's 2D planar form, or (ii) with it's 2D planar form augmented by the addition of matter or augmented by it's superimposition on another form; or developing the canvas support medium or image so that it functions as:

a door, a gate, a fence, a stage set, a partition, a screen, furniture, a table, a chair, a stool, a chest, a cabinet, a cart, a bench, a tent, an awning, a fountain, a basket, a case or container, a light fixture, candelabrum, a window, a skylight, a lunette, shades, shutters, a tile, a column, or a set, grouping or compositional arrangement of these that is a single work; a building facade, a wall, a ceiling, a floor, stairs or another architectural form or structure; craft design, a vase, a bowl, a tray, a cup or goblet, a plate, a dish, a pitcher, a soup tureen, a placemat, or a work of design for household use; an altar, a menorah or an image for spiritual or religious use; a book or pad that is a new version of the conventional image making blank book or blank paper pad capable of being developed into visual pictorial or design image, or a plurality of associated sheets arranged in a book or pad form capable of such image making; an image of graphic design or book design free or nearly free of visible legible text; an image of design, fashion design, clothing, a fashion or clothing accessory, jewelry, a hat, a belt, a purse, a tote bag, or a costume;

wherein the methods of developing the canvas support medium or aesthetic image listed in (a)-(h) above or other methods of development maintain, interrupt or change the uniformity, regularity, flexibility or thinness of their forms.

15. The method of claim 8 which requires preparing the canvas support medium or the art, design or architecture made therewith, thereupon or therefrom referred to herein as the image with one or more of (a)-(g):

(a) developing the canvas support medium into an aesthetic image that is art, design or architecture and displaying it; or preparing the canvas support medium or image with a means or a part of a means of installation or display which is: (i) a means or a part of a means for display on a wall or vertical surface or by hanging; a hook or wire attached to enable hanging; or holes to enable hanging, (ii) a base, a stand, a frame, a backing, reinforcement, a part or a form that enables it's installation or display, or a means that enables installation or display in a manner that resembles the manner in which conventional aesthetic images are displayed for viewing; (iii) a part, parts or the means by which it can scroll, roll, unroll, fold out or fold up or preparing it with a form that scrolls, rolls, unrolls, folds, or unfolds; (iv) a rigid mount system or a combination rigid and wire mount system capable of displaying the canvas support medium or the image from a wall; (v) a means of displaying the canvas support medium or image that leaves negative space between it and the wall, ceiling, floor or other structure from which it is displayed; or (vi) a means of being self supportive or freestanding;

(b) preparing a surface on the canvas support medium or image that is clean or that is cleaned sufficiently to be receptive to a conventional artist's medium or to enhance the strength and permanence of the bond formed between that surface and an artist's medium; preparing the canvas support medium or image to bond to a conventional artist's mediums so that the bond endures well through the image making process and through the use or display of the resultant image;

(c) forming or developing the canvas support medium or image using conventional image making practices or using conventional practices for making art; forming or developing the canvas support medium or image by adding: a conventional image making medium, a conventional artist's medium, a primer conventionally used to make images, an underlayer, an imprimatura, a Clarifying Imprimatura, a ground, underdrawing, underpainting, drawing, painting or collage which bonds to the image, the canvas support medium or to its polymer; adding at least one paint, ink or other colorant at two or more different spatial depths which are visible to viewers within the transparent or translucent form of the canvas support medium or image; adding a part or layer with a refractive index different from that of the rest of the canvas support medium, the image, the nearest part thereof or any of these made of polymer;

preparing the canvas support medium or image with at least one conductive polymer that provides or enables an aesthetic effect or emitted light, and also with at least one: lens, prism, grating, variation described in claim 8, light effect, at least one of these that effects the light visible in or emitted from the canvas support medium or image, or one or more of these that serve as part of all of an image support; or adding: a colorant; an image support, a clear external polymer layer, a light source or a means of emitting light, a light effect or a material, a device or another means that effects light properties; a solar cell, a battery, a power source, a lens, a grating, a prism, a filter; crystal, gem, stone, fabric, paper, clay, ceramic, wood, embedding, an air bubble, a hologram, a photographic image, a photographic emulsion, or a photographic transparency; a dichroic or dichromatic effect; writing, text, incising, inlay, carving or embossing; texture or an ingredient that adds texture; a moving part or a means to be capable of movement; a photochromic effect; an electrically active feature, or adding an anti-glare, anti-scratch or anti-reflective coating, layer, ingredient or surface;

(d) preparing the canvas support medium or image with: a computer or part of a computer, an interactive feature, an interactive part or a means of being capable of interactivity; sound, music, a microphone or a speaker; a control mechanism or device, a viewer input device, a switch, a button, a touch control, a mechanism or device which enables control or change when pressure is applied, a drawing device, a trackball, a mouse, a means of responding to sound or voice command; voice recognition technology; a means of controlling or changing the canvas support medium or image from a distance, via wireless communication or via a broadcast method; a sensor, a means of sensing or detecting a viewer, movement, sound, or change in light or in the environment, or such a means of sensing or detecting with a means of responding or of responding by changing an aesthetic element of the canvas support medium or image; or a means so that an image maker or viewer can control, change or vary the electrical current, color, light, form, movement or an aesthetic element in the canvas support medium or image; or making the canvas support medium, image or part thereof change in relation to change in natural light or skylight; or making it portray the sky or the light of the sky, wherein this portrayal is static, it changes, it can be changed, or an image maker or a viewer can change it; this portrayal is abstract, representational, realistic, surrealistic, with figures, with landscape, with a still life or it is illusionary; this portrayal is at least partially formed with light in one or more colors, or this portrayal is at least partially formed by color or light changing as the sky changes or in a manner that portrays or represents the sky;

(e) making the canvas support medium or image in a shape or form that contributes to the image's aesthetic by being one or more of: representational, figurative, openwork, linear, discontinuous, non geometric, non-uniform, irregular, uneven, nonplanar, hollow, with a negative space, with an air pocket; with irregularities that make it look handmade; with at least one curve, angle or undulation; capable of folding, unfolding, rolling out, rolling up or scrolling; with two or more parts that are joined or separate; with all edges deckled; with a form that is partially or entirely: layered, opaque, transparent, or translucent; with a form, a planar form or a planar two dimensional form that is transparent or translucent and polymeric, and that has two or more light sources in it or attached to it; or with a transparent, planar, two dimensional polymeric form that has multiple light sources, OLEDs or other LEDs in it or attached to it; or forming or developing the canvas support medium or image so that it has two or more layers, with at least one layer that is: partially or entirely transparent or translucent or such a layer that is external; a polymeric or non polymeric image support, image support stabilizer or strengthening stabilizer; made with or of glass, fabric, embedding, polymer, conductive polymer, a device, a light effect, an aesthetic element that uses electricity, or a non polymeric aesthetic ingredient; providing color, or an internal layer or back layer providing color; or a combination of these;

(f) developing the canvas support medium or image so that it shows at least part of a drawing, picture or design, or one of these that is figurative, realistic, representational, abstract, illusionistic, a landscape, or a still life; or the canvas support medium or image has an aesthetic effect created by electricity that causes the positions of particles, of liquid crystals, or of liquid crystals in a polymer layer or matrix to change; or (g) making the canvas support medium or image so that serves a second utilitarian function in addition to it's function for image making; preparing the image so that it serves a utilitarian function, or making the canvas support medium or image function as: a mural, a door, a gate, a fence, a stage set, a partition, a screen, furniture, a table, a chair, a stool, a chest, a cabinet, a cart, a bench, a tent, an awning, a fountain, a basket, a case or container, a light fixture, candelabrum, a window, a skylight, a lunette, shades, shutters, a tile, a column, or a set, grouping or compositional arrangement of these that is a single work; a building facade, a wall, a ceiling, a floor, stairs or another architectural form or structure; craft design, a vase, a bowl, a tray, a cup or goblet, a plate, a dish, a pitcher, a soup tureen, a placemat, or a work of design for household use; an altar, a menorah or an image for spiritual or religious use; a book or pad that is a new version of the conventional image making blank book or blank paper pad capable of being developed into visual pictorial or design image, or a plurality of associated sheets arranged in a book or pad form capable of such image making; an image of graphic design or book design free or nearly free of visible legible text; an image of design, fashion design, a fashion accessory, jewelry, a hat, a belt, a tote bag, or a costume.

16. The method of claim 8 in which requires preparing the canvas support medium or the art, design or architecture made therewith, thereupon or therefrom referred to herein as the image with one or more of (a)-(h):

(a) making the canvas support medium or the image with a sensor or other means of detection so it can change in response to a person, in response to the environment or in response to light; making the canvas support medium, image or part thereof change in relation to change in natural light or skylight; or making it portray the sky or the light of the sky, wherein this portrayal is static, it changes, it can be changed, or an image maker or a viewer can change it; this portrayal is abstract, representational, realistic, surrealistic, with figures, with landscape, with a still life or it is illusionary; this portrayal is at least partially formed with light in one or more colors, or this portrayal is at least partially formed by color or light changing as the sky changes or in a manner that portrays or represents the sky;

(b) making the canvas support medium or image with: (i) a co-polymer wherein one monomer is methacrylate ester, methacrylamide derivative or methyl methacrylate; (ii) a co-polymer wherein one monomer is methacrylate ester, methacrylamide derivative or methyl methacrylate and another is a monomer that enhances the strength, rigidity, flexibility or permanence of the resultant polymer, canvas support medium or image; (iii) a mixture wherein one polymer is poly(methyl methacrylate) or it is made from methacrylate ester or methacrylamide derivative; or (iv) a mixture wherein the polymer is made with poly(methyl methacrylate) or a polymer made from methacrylate ester or methacrylamide derivative, and a second polymer that enhances the strength, rigidity, flexibility or permanence of the resultant polymer, canvas support medium or image;

(c) making the canvas support medium or image with two or more different layers, one of which is an external surface preparation stabilizer layer on the canvas support medium's main surface that is made with: (c-i) a non absorbent polymer that is transparent, translucent or both, (c-ii) a synthetic absorbent polymer, or (c-iii) a combination of both, wherein this surface preparation stabilizer layer bonds well to at least one kind of conventional artist's painting medium or photographic emulsion, and it bonds well to the part of the image, the canvas support medium or image support beneath it;

(d) forming the canvas support medium or image with an at least one polymer that is absorbent and another ingredient, with the absorbent polymer used in a formulation, an amount and a design sufficient to enable or enhance the canvas support medium's or image's bond with at least one kind of superimposed conventional artist's medium which it absorbs, wherein the other ingredient is of a composition, and is used in an amount and in a design which enhances the canvas support medium's or image's mechanical or structural properties;

(e) the canvas support medium or image is made with: a copolymer or a polymer mixture with at least one synthetic absorbent polymer; a synthetic absorbent polymer and a non absorbent polymer; a synthetic absorbent polymer on an image support made with non absorbent polymer; any of these wherein the canvas support medium or image is transparent or translucent;

(f) the canvas support medium or image has two or more layers or parts made of different polymers which are superimposed or connected, wherein at least one of these polymer layers or parts provides support to the medium, and at least one different layer or part provides or enables the image to have at least one element selected from the group consisting of an aesthetic element, transparency, translucency, an ability to emit visible light, an ability to bond to at least one superimposed application, or an ability to be further developed by cutting, carving, sculpting or incising;

(g) developing the aesthetic image by using one or more transparent or translucent polymeric separating layers to separate applications, layers or attachments of one or more other kinds of aesthetic, design or pictorial elements on it's or on their opposing sides, or such development that: (1) separates applications or layers of one or more kinds of conventional artist's mediums; or (2) separates carving, incising, aesthetic elements in section E of claim 2; separates a combination of these; separates at least one of these with one or more applications of conventional artist's mediums; or separates any of these with at least one LED, OLED or light source; or (h) forming the canvas support medium or image with a stabilizer that: enables or enhances it's color stability or it's ability to remain stabile with exposure to ultraviolet light; is an ultraviolet light stabilizer, an ultraviolet light absorber, or a hindered amine light stabilizer; is a fiberglass surfacing veil, or a fiber that like surfacing veil fiberglass, becomes largely invisible or invisible to the unaided human eye when used within or under transparent colorless polymer or when used within or under transparent colorless polymer that penetrates it, that is at least about a quarter of an inch thick, or both;

a stabilizer that enhances permanence, a stabilizer that is a processing aid, a surface preparation stabilizer, a stabilizer that enables or enhances bonding, a strengthening stabilizer, a stabilizer that modifies the absorbency of at least some of the polymer; a stabilizer that maintains or enhances impact resistance, scratch resistance or hardness; a stabilizer that is radiation which cures or crosslinks the at least one polymer; a stabilizer that crosslinks an absorbent polymer, a stabilizer that is a crossliniking monomer used with an absorbent polymer; or the image, the canvas support medium or some or all of its polymer is reinforced by, made stiffer by, or has its means of display provided or enhanced by a strengthening stabilizer within or on it or a portion of it, or bonded to it or to it's underside or a portion thereof.

17. The method of claim 2, wherein the canvas support medium or the art, design or architecture made therewith, thereupon or therefrom referred to herein as the image is prepared by one or more of (a)-(h):

(a) binding the canvas support medium or image as a book or pad using polymer, using conventional practices for binding, or using a combination of both; developing one or more pages of the canvas support medium pad or book into an aesthetic image; forming such an aesthetic image free or nearly free of visible legible text; displaying the resultant aesthetic image; or preparing the canvas support medium or the image with a means or part of a means of installation or display which is: (i) a means or part of a means for display on a wall or vertical surface or by hanging; a hook or wire attached to enable hanging; or holes to enable hanging, (ii) a base, a stand, a part or a form that enables installation or display, or a means that enables installation or display in a manner that resembles the manner in which conventional aesthetic images are displayed for viewing; (iii) a part, parts or the means by which it can scroll, roll, unroll, fold out, or fold up; or preparing it with a form that scrolls, rolls, unrolls, folds, or unfolds; or (iv) a means of being self supportive or freestanding;

(b) cleaning a surface of the canvas support medium or image sufficiently to be receptive to a conventional artist's medium or to enhance the strength and permanence of the bond formed between that surface and an artist's medium; preparing the canvas support medium or image to bond to a conventional artist's mediums so that the bond endures well through the image making process and through the use or display of the resultant image; or forming the canvas support medium or image so that it is as stable over time or as permanent as possible;

(c) forming or developing the canvas support medium or image using conventional image making practices or using conventional practices for making art; forming or developing the canvas support medium or image by adding: a conventional image making medium, a conventional artist's medium, a primer conventionally used to make images, an underlayer, an imprimatura, a Clarifying Imprimatura, a ground, underdrawing, underpainting, painting, drawing, collage or an attachment which bonds to the image, the canvas support medium or to its polymer; adding at least one paint, ink or other colorant at two or more different spatial depths which are visible to viewers within the transparent or translucent form of the canvas support medium or image; adding a part or layer with a refractive index different from that of the rest of the canvas support medium, the image, the nearest part thereof or any of these made of polymer;

preparing the canvas support medium or image with at least one conductive polymer that provides or enables an aesthetic effect or emitted light, and also with at least one: lens, prism, grating, light effect, at least one of these that effects the light visible in or emitted from the canvas support medium or image, or one or more of these that serve as part of all of an image support; or adding: an image support, a clear external layer of polymer, a colorant; a light source or a means of emitting light, a light effect or a material, a device or another means that effects light properties; a solar cell, a battery, a power source, a lens, a grating, a prism, a filter; crystal, gem, stone, fabric, paper, clay, ceramic, wood, embedding, an air bubble, a hologram, a photographic image, a photographic emulsion, or a photographic transparency; a dichroic or dichromatic ingredient; writing, text, incising, inlay, carving or embossing; texture or an ingredient that adds texture; a moving part or a means to be capable of movement; a photochromic effect; an electrically active feature, or adding an anti-glare, anti-scratch or anti-reflective coating, layer or surface;

(d) preparing the canvas support medium or image with: a computer or part of a computer, an interactive feature, an interactive part or a means of being capable of interactivity; sound, music, a microphone or a speaker; a control mechanism or device, a viewer input device, a switch, a button, a touch control, a mechanism or device which enables control or change when pressure is applied, a drawing device, a trackball, a mouse, a means of responding to sound or voice command; voice recognition technology; a means of controlling or changing the canvas support medium or image from a distance, via wireless communication or via a broadcast method; a sensor, a means of sensing or detecting a viewer, movement, sound, or change in light or in the environment, or such a means of sensing or detecting with a means of responding or of responding by changing an aesthetic element of the canvas support medium or image; or a means so that an image maker or viewer can control, change or vary the electrical current, color, light, form, movement or an aesthetic element in the canvas support medium or image; or making the canvas support medium, the image or part thereof change in relation to change in natural light or skylight; or making it portray the sky or the light of the sky, wherein this portrayal is static, it changes, it can be changed, or an image maker or a viewer can change it; this portrayal is abstract, representational, realistic, surrealistic, with figures, with landscape, with a still life or it is illusionary; this portrayal is at least partially formed with light in one or more colors, or this portrayal is at least partially formed by color or light changing as the sky changes or in a manner that portrays or represents the sky;

(e) making the canvas support medium or image in a shape or form that contributes to the image's aesthetic by being one or more of: representational, figurative, openwork, linear, discontinuous, non geometric, hollow, with a negative space, with an air pocket; with irregularities that make it look handmade; with at least one curve, angle or undulation; capable of folding, unfolding, rolling out or scrolling for viewing; with two or more parts that are joined or separate; with all edges deckled; with a form that is partially or entirely: layered, opaque, transparent, or translucent; with a form that is rigid, flexible or both; or forming or developing the canvas support medium or image so that it has two or more layers, with at least one layer that is: partially or entirely transparent or translucent or such a layer that is external; a polymeric or non polymeric image support, image support stabilizer or strengthening stabilizer; made with or of glass, fabric, embedding, polymer, conductive polymer, a device, a light effect, an aesthetic element that uses electricity, or a non polymeric aesthetic ingredient; providing color, or an internal layer or back layer providing color; or a combination of these;

(f) the canvas support medium or image has an aesthetic effect created by electricity that causes the positions of particles, of liquid crystals, or of liquid crystals in a polymer layer or matrix to change;

(g) developing the aesthetic image by using one or more transparent or translucent polymeric separating layers to separate applications, layers or attachments of one or more other kinds of aesthetic, design or pictorial elements on it's or on their opposing sides, or such development that: (1) separates applications or layers of one or more kinds of conventional artist's mediums; or (2) separates carving, incising, or aesthetic elements in section E of claim 2; separates a combination of these; separates at least one of these with one or more applications of conventional artist's mediums; or separates any of these with at least one LED, OLED or light source; or (h) forming the canvas support medium or the aesthetic image by using one or more of the methods listed above in (a)-(g) to prepare or to develop part of the book or pad, wherein this part is one or more pages or sheets or it is a portion of one or more pages or sheets.

18. The method of claim 2, wherein the canvas support medium or the art, design or architecture made therewith, thereupon or therefrom referred to herein as the image is prepared by one or more of (a)-(h):

(a) making the canvas support medium or image with: (i) a co-polymer wherein one monomer is methacrylate ester, methacrylamide derivative or methyl methacrylate; (ii) a co-polymer wherein one monomer is methacrylate ester, methacrylamide derivative or methyl methacrylate and another is a monomer that enhances the strength, rigidity, flexibility or permanence of the resultant polymer, canvas support medium or image; (iii) a mixture wherein one polymer is poly(methyl methacrylate) or it is made from methacrylate ester or methacrylamide derivative; or (iv) a mixture wherein the polymer is made with poly(methyl methacrylate) or a polymer made from methacrylate ester or methacrylamide derivative, and a second polymer that enhances the strength, rigidity, flexibility or permanence of the resultant polymer, canvas support medium or image;

(b) making the canvas support medium or image with two or more different layers, one of which is an external surface preparation stabilizer layer on the canvas support medium's or image's main surface that is made with: (b-i) a non absorbent polymer that is transparent, translucent or both, (b-ii) a synthetic absorbent polymer, or (b-iii) a combination of both, wherein this surface preparation stabilizer layer bonds well to at least one kind of conventional artist's painting medium or photographic emulsion, and it bonds well to the part of the image, the canvas support medium or image support beneath it;

(c) forming the canvas support medium or image with an at least one polymer that is absorbent and another ingredient, with the absorbent polymer used in a formulation, an amount and a design sufficient to enable or enhance the canvas support medium's or image's bond with at least one kind of superimposed conventional artist's medium which it absorbs, wherein the other ingredient is of a composition, and is used in an amount and in a design which enhances the canvas support medium's or image's mechanical or structural properties;

(d) the canvas support medium or image is made with: a copolymer or a polymer mixture with at least one synthetic absorbent polymer; a synthetic absorbent polymer and a non absorbent polymer; a synthetic absorbent polymer on an image support made with non absorbent polymer; any of these wherein the canvas support medium or image is transparent or translucent;

(e) the canvas support medium or image has two or more layers or parts made of different polymers which are superimposed or connected, wherein at least one of these polymer layers or parts provides support to the medium or image, and at least one different layer or part provides or enables the image to have at least one element selected from the group consisting of an aesthetic element, transparency, translucency, an ability to emit visible light, an ability to bond to at least one superimposed application, or an ability to be further developed by cutting, carving, sculpting or incising;

(f) forming the canvas support medium or image with a stabilizer that: enables or enhances it's color stability or it's ability to remain stabile with exposure to ultraviolet light; is an ultraviolet light stabilizer, an ultraviolet light absorber, or a hindered amine light stabilizer; is a fiberglass surfacing veil, or a fiber that like surfacing veil fiberglass, becomes largely invisible or invisible to the unaided human eye when used within or under transparent colorless polymer or when used within or under transparent colorless polymer that penetrates it, that is at least about a quarter of an inch thick, or both;

a stabilizer that enhances permanence, a stabilizer that is a processing aid, a surface preparation stabilizer, a stabilizer that enables or enhances bonding or flexibility, a strengthening stabilizer, a stabilizer that modifies the absorbency of at least some of the polymer; a stabilizer that maintains or enhances impact resistance, scratch resistance or hardness; a stabilizer that is radiation which cures or crosslinks the at least one polymer; a stabilizer that crosslinks an absorbent polymer, a stabilizer that is a crossliniking monomer used with an absorbent polymer; or the image, the canvas support medium or some or all of its polymer is reinforced by or has its means of display provided or enhanced by a strengthening stabilizer within or on it or a portion of it, or bonded to it or a portion thereof, or it has such a strengthening stabilizer that is: (1) not visible to viewers; (2) made with a different, stronger or more rigid polymer; (3) a means of display or part of a means of display, or (4) fiber, a surfacing veil fiberglass or a fiber that like surfacing veil fiberglass, becomes largely invisible or invisible to the unaided human eye when used within or under transparent colorless polymer or when used within or under transparent colorless polymer that penetrates it, that is at least about a quaffer of an inch thick, or both;

(g) developing the canvas support medium or image by the application a conventional artist's drawing or painting medium to which it bonds; developing the canvas support medium or image so that it shows at least part of a drawing, picture or design, or one of these that is figurative, realistic, representational, abstract, illusionistic, a landscape, or a still life; or making the canvas support medium or image so that serves a second utilitarian function in addition to it's function for image making; or (h) forming the canvas support medium or the aesthetic image by using one or more of the methods listed above in (a)-(g) to prepare or to develop part of the book or pad, wherein this part is one or more pages or sheets or it is a portion of one or more pages or sheets.

19. The method of claim 5 wherein the canvas support medium or the art, design or architecture made therewith, thereupon or therefrom referred to herein as the image is prepared by one or more of (a)-(g):

(a) preparing the canvas support medium so that it is capable of serving the utilitarian purpose of functioning as a medium for forming an aesthetic image and a second utilitarian purpose; preparing the aesthetic image with a utilitarian function; or preparing the canvas support medium or image so that it functions as: a door, a gate, a fence, a partition, a screen, furniture, a chest, a cabinet, a table, a chair, a stool, a bench, a cart, a tent, an awning, a fountain, a basket, a case or container, a light fixture, a candelabrum, a window, a skylight, a lunette, shades, shutters, a tile, a column, or a set, grouping or compositional arrangement of these that is a single work; a building facade, a wall, a ceiling, a floor, stairs or another architectural form or structure; craft design, a vase, a bowl, a tray, a cup, a goblet, a plate, a dish, a pitcher, a soup tureen, a placemat, or a work of design for household use; a stage set; book design free or nearly free of visible legible text; an image of design made to be used and viewed apart from direct contact with the human body rather than worn on it as fashion design; or the canvas support medium is: book design, clothing, fashion design, a fashion or clothing accessory, jewelry, a hat, a belt, a purse, a tote bag, a costume, or work of design to be worn directly on the human body;

(b) developing the canvas support medium or aesthetic image by adding an aesthetic, design or pictorial effect enhanced, enabled or provided by one or more of: a positive or negative form that functions as a lens, a Fresnel lens, a lenticular lens, a prism, a grating or a diffraction grating; a source that emits visible light; crystal, gem, stone, fabric, paper, clay, ceramic, wood, a hologram, an air pocket, embedding or an air bubble; carving, incising, inlay or embossing; a photochromic, dichroic, dichromatic or iridescent effect; a solar cell; a means of detecting or sensing a viewer or the environment and then responding by changing visibly, by changing color, by changing a light property or by moving; irregular texture deeper than a sandblasted surface or a sanded surface; a microphone or a speaker; an electrochromic aesthetic, design or pictorial effect whereby the canvas support medium or image, responds to changes in electrical current by changing it's level of or it's state of: transparency, translucency, reflectivity, light emission employing conductive polymer, changing the path or color of the light passing through it, or a combination of these; or forming the canvas support medium with an electrochromic aesthetic, design or pictorial effect whereby the canvas support medium or image changes in response to changes in electrical current;

(c) preparing an aesthetic effect in the canvas support medium with (i) and (ii):

(i) at least one conductive polymer that emits light, that enables light emission or that is part of an OLED and also with (ii) one or more positive or negative forms that serve as: lenses, prisms, gratings, or as one or more of these that are part or all of an image support, such that this addition to the canvas support medium described in (ii) effects the canvas support medium's visible light or the visible light it emits;

(d) preparing the canvas support medium or image with aesthetic effect is created by electricity that causes the positions of particles, of liquid crystals, or of liquid crystals in a polymer layer or matrix to change;

(e) cleaning the canvas support medium or image sufficiently to render it receptive to conventional artist's paint and to provide enhanced bond strength and permanence to facilitate development of the aesthetic image;

(f) preparing the canvas support medium with conductive polymer that enables or is part of one or more of: a device; a system; an electrical device, an electrical wire or conduit, a computer, computer memory, computer chip, computer hard disk or part of a computer, a computer controlled device, a light emitting device; a LED; an OLED or other light source; a device or another form that is opaque, transparent, translucent or a combination of these; a solar cell, a battery, an energy source, a transistor, a capacitor, a coating or a transparent coating, photovoltaics, a photodiode, a photoconductor, a photorefractive device, a sensor, or a means of detecting a person, sound, light or change in the environment; a means by which the canvas support medium can move visibly, emit music or emit sound; a conductive adhesive, a circuit, an ink, a paint, a colorant; a coating or a coating that is transparent or translucent; conductive fiber, fabric or fabric for use as a conventional canvas surface, a conventional painting surface or a conventional collage surface; a means of being interactive or part thereot a moving or changing picture or image, a video, a film or part thereof; an electroactive layer or part; or an aesthetic effect that uses electricity; or (g) forming or developing the canvas support medium or image using conventional image making practices or using conventional practices for making art.

* * * * *